US007664697B2

(12) United States Patent
Takayama

(10) Patent No.: US 7,664,697 B2
(45) Date of Patent: Feb. 16, 2010

(54) PERSONAL ELECTRONIC SETTLING SYSTEM AND A TERMINAL AND CONTROL APPARATUS THEREFOR

(75) Inventor: Hisashi Takayama, Tokyo (JP)

(73) Assignee: Panasonic Corporation, Osaka (JP)

( * ) Notice: Subject to any disclaimer, the term of this patent is extended or adjusted under 35 U.S.C. 154(b) by 990 days.

(21) Appl. No.: 09/960,923

(22) Filed: Sep. 25, 2001

(65) Prior Publication Data

US 2002/0194121 A1 Dec. 19, 2002

Related U.S. Application Data

(62) Division of application No. 09/101,356, filed on Sep. 8, 1998, now Pat. No. 6,332,133.

(51) Int. Cl.
*G06Q 40/00* (2006.01)

(52) U.S. Cl. ........................................................ 705/39

(58) Field of Classification Search .................... 705/39
See application file for complete search history.

(56) References Cited

U.S. PATENT DOCUMENTS 4,032,931 A * 6/1977 Haker .......................... 341/23
5,221,838 A 6/1993 Gutman et al.
5,336,870 A * 8/1994 Hughes et al. .............. 235/379
5,387,784 A * 2/1995 Sarradin ..................... 235/380
5,608,778 A 3/1997 Partridge, III
5,887,266 A * 3/1999 Heinonene et al. .......... 455/558
6,003,014 A * 12/1999 Lee et al. ...................... 705/13
6,173,272 B1 * 1/2001 Thomas et al. ................ 705/42

OTHER PUBLICATIONS

Cryptography: Policy and Algorithms. Springer-Velag. Mar. 1, 1996. pp. 265-266.*
Frazer, Patrick. Plastic and Electronic Money. Woodhead-Faulkner Ltd. Dover, NH. 1985. pp. 65-69.*
Kirkman, Patrick. Electronic Funds Transfer Systems. Basil Blackwell Ltd. New York, NY. 1987. pp. 172-180.*
Beutelspacher, Albert. Cryptography. The Mathematical Association of America. 1994. pp. 88-91.*

* cited by examiner

*Primary Examiner*—Jason M Borlinghaus
*Assistant Examiner*—James A. Kramer
(74) *Attorney, Agent, or Firm*—Connolly Bove Lodge & Hutz LLP

(57) ABSTRACT

According to the present invention provided is an accounting means that is superior in safety and usability. The accounting means comprises: payment means including a plurality of systems of communication means; charging means including a plurality of systems of communication means; and settlement means including a plurality of systems of communication means. Since the payment means and the settlement means exchange transaction data by communicating with each other, it is possible to prevent the assessment of an illegal charge by the charging means. In addition, since a signature (a digital signature) and an accounting statement are exchanged by communication between the payment means and the charging means, the efficiency of the sale can be improved.

8 Claims, 215 Drawing Sheets

(a)FLOWCHART FOR CUSTOMER SERVICE CALL (b) INQUIRY CALL FLOWCHART

FIG.18B

| | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| INT | DISPLAY POWER STATE | DISPLAY CORDLESS PHONE STATE | FRAME INTERRUPT | CALL RECEPTION INTERRUPT | DATA RECEPTION INTERRUPT | UPDATING INTERRUPT | BATTERY INTERRUPT | KEY INTERRUPT | | | | "END" | "SPEECH" | "MODE" | "EXECUTE" | "POWER" |

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| INT | "F 4" | "F 3" | "F 2" | "F 1" | "#" | "*" | "9" | "8" | "7" | "6" | "5" | "4" | "3" | "2" | "1" | "0" |

FIG.18C

| | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| interrupt | DISPLAY POWER STATE | DISPLAY CORDLESS PHONE STATE | FRAME INTERRUPT | CALL RECEPTION INTERRUPT | DATA RECEPTION INTERRUPT | UPDATING INTERRUPT | BATTERY INTERRUPT | KEY INTERRUPT | | | | "END" | "SPEECH" | "MODE" | "EXECUTE" | "POWER" |

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| interrupt | "F 4" | "F 3" | "F 2" | "F 1" | "#" | "*" | "9" | "8" | "7" | "6" | "5" | "4" | "3" | "2" | "1" | "0" |

FIG.27B

| | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| INT | DISPLAY POWER STATE | DISPLAY PHONE STATE | | CALL RECEPTION INTERRUPT | DATA RECEPTION INTERRUPT | UPDATING INTERRUPT | EXTERNAL 1F INTERRUPT | KEY INTERRUPT | | | | "HOOK" | | "MODE" | "EXECUTE" | "POWER" |

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| INT | "F 4" | "F 3" | "F 2" | "F 1" | "#" | "*" | "9" | "8" | "7" | "6" | "5" | "4" | "3" | "2" | "1" | "0" |

FIG.27C

| | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| interrupt | DISPLAY POWER STATE | DISPLAY PHONE STATE | | CALL RECEPTION INTERRUPT | DATA RECEPTION INTERRUPT | UPDATING INTERRUPT | EXTERNAL 1F INTERRUPT | KEY INTERRUPT | | | | "HOOK" | | "MODE" | "EXECUTE" | "POWER" |

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| interrupt | "F 4" | "F 3" | "F 2" | "F 1" | "#" | "*" | "9" | "8" | "7" | "6" | "5" | "4" | "3" | "2" | "1" | "0" |

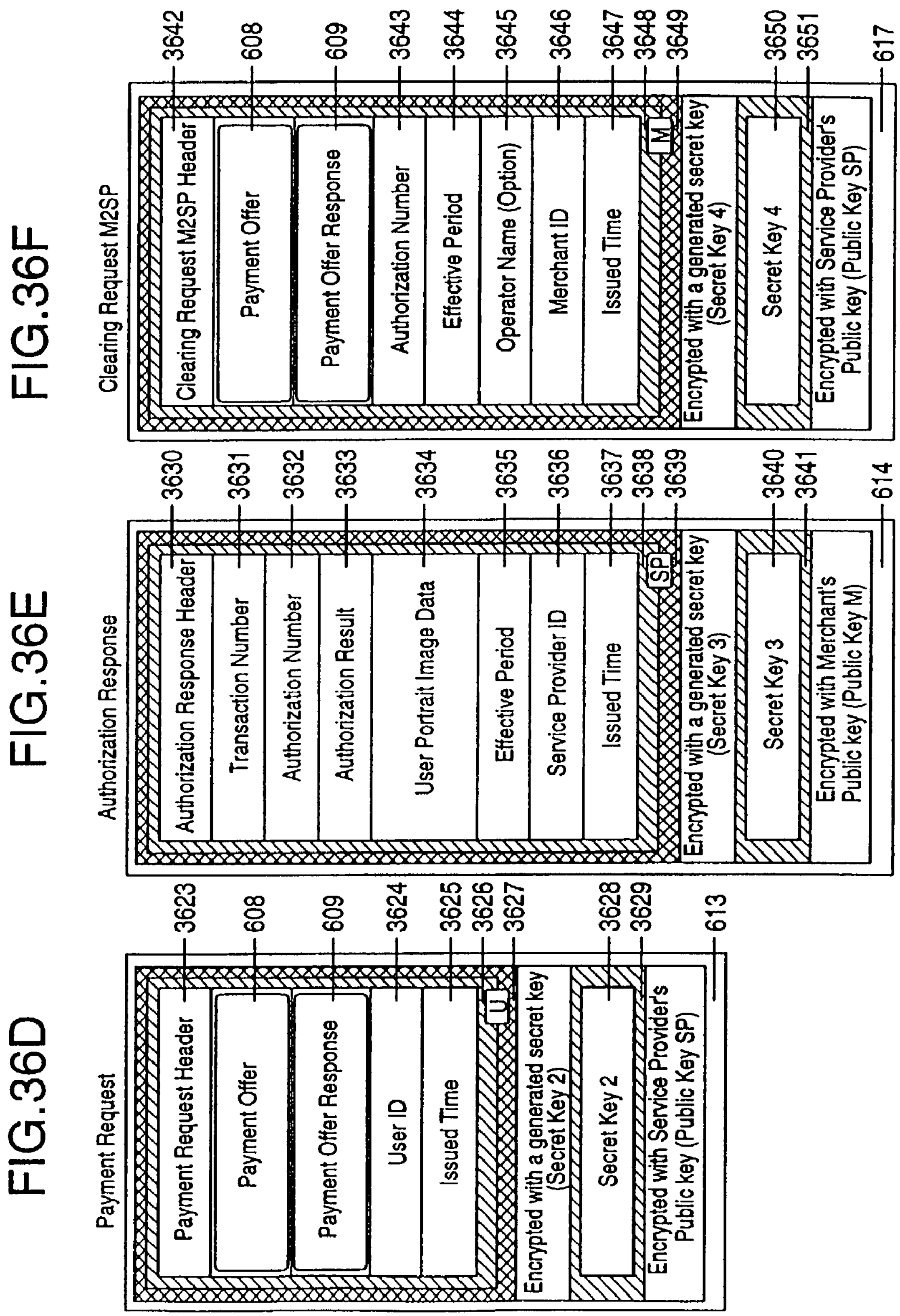

FIG.36D
Payment Request
Payment Request Header
Payment Offer
Payment Offer Response
User ID
Issued Time
U
Encrypted with a generated secret key (Secret Key 2)
Secret Key 2
Encrypted with Service Provider's Public key (Public Key SP)
3623
608
609
3624
3625
3626
3627
3628
3629
613
FIG.36E
Authorization Response
Authorization Response Header
Transaction Number
Authorization Number
Authorization Result
User Portrait Image Data
Effective Period
Service Provider ID
Issued Time
SP
Encrypted with a generated secret key (Secret Key 3)
Secret Key 3
Encrypted with Merchant's Public key (Public Key M)
3630
3631
3632
3633
3634
3635
3636
3637
3638
3639
3640
3641
614
FIG.36F
Clearing Request M2SP
Clearing Request M2SP Header
Payment Offer
Payment Offer Response
Authorization Number
Effective Period
Operator Name (Option)
Merchant ID
Issued Time
M
Encrypted with a generated secret key (Secret Key 4)
Secret Key 4
Encrypted with Service Provider's Public key (Public Key SP)
3642
608
609
3643
3644
3645
3646
3647
3648
3649
3650
3651
617

FIG.47A

| | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| INT | DISPLAY POWER STATE | DISPLAY CORDLESS PHONE STATE | FRAME INTERRUPT | CALL RECEPTION INTERRUPT | DATA RECEPTION INTERRUPT | UPDATING INTERRUPT | BATTERY INTERRUPT | KEY INTERRUPT | | | | "END" | "SPEECH" | "MODE" | "EXECUTE" | "POWER" |

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| INT | "F 4" | "F 3" | "F 2" | "F 1" | "#" | "*" | "9" | "8" | "7" | "6" | "5" | "4" | "3" | "2" | "1" | "0" |

FIG.47B

| | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| interrupt | DISPLAY POWER STATE | DISPLAY CORDLESS PHONE STATE | FRAME INTERRUPT | CALL RECEPTION INTERRUPT | DATA RECEPTION INTERRUPT | UPDATING INTERRUPT | BATTERY INTERRUPT | KEY INTERRUPT | | | | "END" | "SPEECH" | "MODE" | "EXECUTE" | "POWER" |

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| interrupt | "F 4" | "F 3" | "F 2" | "F 1" | "#" | "*" | "9" | "8" | "7" | "6" | "5" | "4" | "3" | "2" | "1" | "0" |

FIG.50A

| NAME OF PROCESS | CONTENTS OF PROCESS |
|---|---|
| PROCESS MANAGEMENT PROCESS | PROCESS FOR SELECTING AND MANAGING A PROCESS TO BE EXECUTED IN A MAIN ROUTINE. UPDATES A PROCESS LIST IN ACCORDANCE WITH A PROCESS STATUS AND A PROCESS PREPARATION REQUEST. |
| POWER-ON PROCESS | PROCESS FOR PERFORMING INITIALIZATION WHEN A POWER SWITCH IS TURNED ON. IN INITIALIZATION PROCESS, REQUESTS PREPARATION OF A DIGITAL CORDLESS PHONE PROCESS, A CREDIT CARD PROCESS AND PERSONAL DATA MANAGEMENT PROCESS. |
| POWER-OFF PROCESS | PROCESS FOR PERFORMING AN END PROCESS WHEN A POWER SWITCH IS TURNED OFF. WHEN A POWER-OFF PROCESS IS COMPLETED, HALTS THE PROCESS OF THE MAIN ROUTINE. |
| DIGITAL CORDLESS PHONE PROCESS | PROCESS FOR PERFORMING A GUI PROCESS AND A DATA PROCESS IN A DIGITAL CORDLESS PHONE MODE. TRANSMITS A REQUEST FOR PREPARATION OF ANOTHER PROCESS TO A PROCESS MANAGEMENT PROCESSOR IN ACCORDANCE WITH A USER'S OPERATION. |
| CREDIT CARD PROCESS | PROCESS FOR PERFORMING A GUI PROCESS AND A DATA PROCESS IN A CREDIT CARD MODE. TRANSMITS A REQUEST FOR PREPARATION OF ANOTHER PROCESS TO A PROCESS MANAGEMENT PROCESSOR IN ACCORDANCE WITH A USER'S OPERATION. |
| PERSONAL DATA MANAGEMENT PROCESS | PROCESS FOR PERFORMING A GUI PROCESS AND A DATA PROCESS IN A PERSONAL DATA MANAGEMENT MODE. TRANSMITS A REQUEST FOR PREPARATION OF ANOTHER PROCESS TO A PROCESS MANAGEMENT PROCESSOR IN ACCORDANCE WITH A USER'S OPERATION. |
| TRANSACTION PROCESS | PROCESS FOR PERFORMING TRANSACTION. IN RESPONSE TO A PAYMENT OPERATION BY A USER, A CREDIT CARD PROCESSOR REQUESTS A PROCESS MANAGEMENT PROCESSOR TO PREPARE A TRANSACTION PROCESS. |
| CANCELLATION PROCESS | PROCESS FOR PERFORMING CANCELLATION. IN RESPONSE TO A CANCELLATION OPERATION BY A USER, A CREDIT CARD PROCESSOR REQUEST A PROCESS MANAGEMENT PROCESSOR TO PREPARE A CANCELLATION PROCESS. |
| CUSTOMER SERVICE CALL PROCESS | PROCESS FOR A CUSTOMER SERVICE CALL. UPON RECEIPT OF A CUSTOMER SERVICE CALL, A DIGITAL CORDLESS PHONE PROCESSOR REQUESTS A PROCESS MANAGEMENT PROCESSOR TO PREPARE THIS PROCESS. |
| INQUIRY CALL PROCESS | PROCESS FOR AN INQUIRY CALL. IN RESPONSE TO AN INQUIRY CALL FROM A USER, A CREDIT CARD PROCESSOR REQUESTS A PROCESS MANAGEMENT PROCESSOR TO PREPARE THIS PROCESS. |
| DATA UPDATING PROCESS | PROCESS FOR UPDATING DATA. WHEN A CLOCK COUNTER VALUE MATCHES UPDATED TIME REGISTER, BY AN INTERRUPT, A PROCESS MANAGEMENT PROCESSOR IS REQUESTED TO PREPARE THIS PROCESS. |
| FORCIBLE DATA UPDATING PROCESS | PROCESS FOR FORCIBLY UPDATING DATA. UPON RECEIPT OF A DATA UPDATING COMMAND, A PROCESS MANAGEMENT PROCESSOR IS REQUESTED TO PREPARE A FORCIBLE UPDATING PROCESS. |
| DATA BACKUP PROCESS | PROCESS FOR DATA BACKUP. WHEN A REMAINING BATTERY CAPACITY IS EQUAL TO OR SMALLER THAN A SETUP VALUE Q, BY AN INTERRUPT, A PROCESS MANAGEMENT PROCESSOR IS REQUESTED TO PREPARE A DATA BACKUP PROCESS. |
| REMOTE ACCESS PROCESS | PROCESS FOR PERFORMING REMOTE ACCESS. WHEN DATA AT A REMOTE ADDRESS IS ACCESSED, A PROCESS MANAGEMENT PROCESSOR IS REQUESTED TO PREPARE A REMOTE ACCESS PROCESS. |
| SESSION ESTABLISHMENT PROCESS | PROCESS FOR ESTABLISHING A SESSION WITH A SERVICE PROVIDING SYSTEM. |
| DIGITAL CORDLESS PHONE SPEECH PROCESS | PROCESS FOR CONTROLLING DIGITAL CORDLESS PHONE COMMUNICATION. |
| INFRARED COMMUNICATION PROCESS | PROCESS FOR INFRARED COMMUNICATION. |

FIG.57A

| | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| INT | DISPLAY POWER STATE | DISPLAY PHONE STATE | | CALL RECEPTION INTERRUPT | DATA RECEPTION INTERRUPT | UPDATING INTERRUPT | EXTERNAL IF INTERRUPT | KEY INTERRUPT | | | | "HOOK" | | "MODE" | "EXECUTE" | "POWER" |

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| INT | "F 4" | "F 3" | "F 2" | "F 1" | "#" | "*" | "9" | "8" | "7" | "6" | "5" | "4" | "3" | "2" | "1" | "0" |

FIG.57B

| | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| interrupt | DISPLAY POWER STATE | DISPLAY PHONE STATE | | CALL RECEPTION INTERRUPT | DATA RECEPTION INTERRUPT | UPDATING INTERRUPT | EXTERNAL IF INTERRUPT | KEY INTERRUPT | | | | "HOOK" | | "MODE" | "EXECUTE" | "POWER" |

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| interrupt | "F 4" | "F 3" | "F 2" | "F 1" | "#" | "*" | "9" | "8" | "7" | "6" | "5" | "4" | "3" | "2" | "1" | "0" |

FIG.60A

| |
|---|
| FIG.60A-1 |
| FIG.60A-2 |
| FIG.60A-3 |

FIG.60A-1

| NAME OF PROCESS | CONTENTS OF PROCESS |
|---|---|
| PROCESS MANAGEMENT PROCESS | PROCESS FOR SELECTING AND MANAGING A PROCESS TO BE EXECUTED IN A MAIN ROUTINE. UPDATES A PROCESS LIST IN ACCORDANCE WITH A PROCESS STATUS AND A PROCESS PREPARATION REQUEST. |
| POWER-ON PROCESS | PROCESS FOR PERFORMING INITIALIZATION WHEN A POWER SWITCH IS TURNED ON. IN INITIALIZATION PROCESS, REQUESTS PREPARATION OF A DIGITAL PHONE PROCESS, A CREDIT CARD PROCESS AND PERSONAL DATA MANAGEMENT PROCESS. |
| POWER-OFF PROCESS | PROCESS FOR PERFORMING AN END PROCESS WHEN A POWER SWITCH IS TURNED OFF. WHEN A POWER-OFF PROCESS IS COMPLETED, HALTS THE PROCESS OF THE MAIN ROUTINE. |
| DIGITAL PHONE PROCESS | PROCESS FOR PERFORMING A GUI PROCESS AND A DATA PROCESS IN A DIGITAL CORDLESS PHONE MODE. TRANSMITS A REQUEST FOR PREPARATION OF ANOTHER PROCESS TO A PROCESS MANAGEMENT PROCESSOR IN ACCORDANCE WITH A MERCHANT'S OPERATION. |
| CREDIT CARD PROCESS | PROCESS FOR PERFORMING A GUI PROCESS AND A DATA PROCESS IN A CREDIT CARD MODE. TRANSMITS A REQUEST FOR PREPARATION OF ANOTHER PROCESS TO A PROCESS MANAGEMENT PROCESSOR IN ACCORDANCE WITH A MERCHANT'S OPERATION. |
| MERCHANT DATA MANAGEMENT PROCESS | PROCESS FOR PERFORMING A GUI PROCESS AND A DATA PROCESS IN A MERCHANT DATA MANAGEMENT MODE. TRANSMITS A REQUEST FOR PREPARATION OF ANOTHER PROCESS TO A PROCESS MANAGEMENT PROCESSOR IN ACCORDANCE WITH A MERCHANT'S OPERATION. |

FIG.60A-2

| | |
|---|---|
| TRANSACTION PROCESS | PROCESS FOR PERFORMING TRANSACTION. IN RESPONSE TO A CREDIT TRANSACTION BY A MERCHANT, A CREDIT CARD PROCESSOR REQUESTS A PROCESS MANAGEMENT PROCESSOR TO PREPARE A TRANSACTION PROCESS. |
| CANCELLATION PROCESS | PROCESS FOR PERFORMING CANCELLATION. IN RESPONSE TO A CANCELLATION OPERATION BY A MERCHANT, A CREDIT CARD PROCESSOR REQUEST A PROCESS MANAGEMENT PROCESSOR TO PREPARE A CANCELLATION PROCESS. |
| CUSTOMER SERVICE CALL PROCESS | PROCESS FOR A CUSTOMER SERVICE CALL. UPON RECEIPT OF A CUSTOMER SERVICE CALL, A DIGITAL CORDLESS PHONE PROCESSOR REQUESTS A PROCESS MANAGEMENT PROCESSOR TO PREPARE THIS PROCESS. |
| INQUIRY CALL PROCESS | PROCESS FOR AN INQUIRY CALL. UPON RECEIPT OF AN INQUIRY CALL, A CREDIT CARD PROCESSOR REQUESTS A PROCESS MANAGEMENT PROCESSOR TO PREPARE THIS PROCESS. |
| DATA UPDATING PROCESS | PROCESS FOR UPDATING DATA. WHEN A CLOCK COUNTER VALUE MATCHES UPDATED TIME REGISTER, BY AN INTERRUPT, A PROCESS MANAGEMENT PROCESSOR IS REQUESTED TO PREPARE THIS PROCESS. |
| FORCIBLE DATA UPDATING PROCESS | PROCESS FOR FORCIBLY UPDATING DATA. UPON RECEIPT OF A DATA UPDATING COMMAND, A PROCESS MANAGEMENT PROCESSOR IS REQUESTED TO PREPARE A FORCIBLE UPDATING PROCESS. |

FIG.60A-3

| | |
|---|---|
| REMOTE ACCESS PROCESS | PROCESS FOR PERFORMING REMOTE ACCESS. WHEN DATA AT A REMOTE ADDRESS IS ACCESSED, A PROCESS MANAGEMENT PROCESSOR IS REQUESTED TO PREPARE A REMOTE ACCESS PROCESS. |
| SESSION ESTABLISHMENT PROCESS | PROCESS FOR ESTABLISHING A SESSION WITH A SERVICE PROVIDING SYSTEM. |
| DIGITAL PHONE SPEECH PROCESS | PROCESS FOR CONTROLLING DIGITAL PHONE COMMUNICATION. |
| INFRARED COMMUNICATION PROCESS | PROCESS FOR INFRARED COMMUNICATION. |
| EXTERNAL IF COMMUNICATIONN PROCESS | PROCESS FOR CONTROLLING DATA COMMUNICATION VIA EXTERNAL INTERFACE. |

FIG.69

| FIG.69A |
|---|
| FIG.69B |

FIG.69A

| | USER PROCESSOR | MERCHANT PROCESSOR | TRANSACTION PROCESSOR |
|---|---|---|---|
| OUTLINE | PROCESSOR THAT IS PROVIDED FOR EACH PERSONAL CREDIT TERMINAL AND SERVES AS AN INTERFACE WITH A SERVICE PROVIDING SYSTEM | PROCESSOR THAT IS PROVIDED FOR EACH CREDIT TRANSACTION TERMINAL AND SERVES AS AN INTERFACE WITH A SERVICE PROVIDING SYSTEM | PROCESSOR THAT IS PROVIDED FOR AN ACCOUNTING SYSTEM AND SERVES AS AN INTERFACE WITH A SERVICE PROVIDING SYSTEM |
| FUNCTION | · CONTROL COMMUNICATION WITH PERSONAL CREDIT TERMINAL<br>· AUTHENTICATION OF USER<br>· ENCRYPTION OF TRANSMITTED DATA<br>· DECRYPTION OF ENCRYPTED RECEIVED DATA<br>· CHECK ON VALIDITY OF RECEIVED DATA<br>· REMOTE ACCESSING<br>· DATA UPDATING<br>· DATA BACKUP | · CONTROL COMMUNICATION WITH CREDIT TRANSACTION TERMINAL<br>· AUTHENTICATION OF MERCHANT<br>· ENCRYPTION OF TRANSMITTED DATA<br>· DECRYPTION OF RECEIVED ENCRYPTED DATA<br>· CHECK ON VALIDITY OF RECEIVED DATA<br>· REMOTE ACCESSING'<br>· DATA UPDATING | · CONTROL COMMUNICATION WITH ACCOUNTING SYSTEM<br>· ENCRYPTION OF TRANSMITTED DATA<br>· DECRYPTION OF RECEIVED ENCRYPTED DATA<br>· CHECK ON VALIDITY OF RECEIVED DATA |
| INTERFACE | PERSONAL CREDIT TERMINAL 23901<br>· RESPONSE TO AUTHENTICATION TEST A<br>· AUTHENTICATION TEST C<br>· RESPONSE TO AUTHENTICATION TEST D<br>· REMOTE ACCESS REQUEST<br>· DATA UPDATING REQUEST<br>· UPLOAD DATA<br>· PAYMENT REQUEST<br>· CANCELLATION REQUEST<br>· RESPONSE TO RECEIVED CALL<br>· INQUIRY CALL REQUEST<br>· TIME-OUT ERROR MESSAGE<br>· SESSION ERROR MESSAGE<br>PERSONAL CREDIT TERMINAL 23902<br>· AUTHENTICATION TEST A<br>· RESPONSE TO AUTHENTICATION TEST B<br>· RESPONSE TO AUTHENTICATION TEST C<br>· REMOTE ACCESS DATA<br>· RESPONSE TO DATA UPDATING<br>· UPDATE DATA | CREDIT TRANSACTION TERMINAL 23907<br>· RESPONSE TO AUTHENTICATION TEST A<br>· AUTHENTICATION TEST C<br>· RESPONSE TO AUTHENTICATION TEST D<br>· REMOTE ACCESS REQUEST<br>· DATA UPDATING REQUEST<br>· UPLOAD DATA<br>· REQUEST PAYMENT<br>· REQUEST CANCELLATION<br>· RESPONSE TO RECEIVED CALL<br>· REQUEST INQUIRY CALL<br>· TIME-OUT ERROR MESSAGE<br>· SESSION ERROR MESSAGE<br>· RESPONSE TO CREDIT REFERENCE<br>· CLEARING CONFIRMATION<br>· RESPONSE TO CALLING<br>· INQUIRY CALL<br>· TIME-OUT ERROR MESSAGE<br>· SESSION ERROR MESSAGE<br>CREDIT TRANSACTION TERMINAL 23908<br>· AUTHENTICATION TEST A<br>· RESPONSE TO AUTHENTICATION TEST B<br>· RESPONSE TO AUTHENTICATION TEST C | ACCOUNTING SYSTEML 23913<br>· CLEARING CONFIRMATION<br>· CANCELLATION CONFIRMATION<br>· TIME-OUT ERROR MESSAGE<br>· SESSION ERROR MESSAGE<br>ACCOUNTING SYSTEML 23914<br>· TRANSACTION REQUEST<br>· CANCELLATION REQUEST<br>· TIME-OUT ERROR MESSAGE<br>· SESSION ERROR MESSAGE<br>· TIME-OUT MESSAGE<br>SERVICE DIRECTOR PROCESS 23915<br>· TRANSACTION REQUEST<br>· CANCELLATION REQUEST<br>· TIME-OUT ERROR MESSAGE<br>· SESSION MESSAGE<br>SERVICE DIRECTOR PROCESS 23916<br>· CLEARING CONFIRMATION<br>· CANCELLATION CONFIRMATION<br>· SESSION ERROR MESSAGE<br>· TIME-OUT MESSAGE |

FIG.70

| FIG.70A |
| --- |
| FIG.70B |

FIG.70A

| | SERVICE DIRECTOR PROCESSOR | SERVICE MANAGER PROCESSOR |
| --- | --- | --- |
| OUTLINE | PROCESSOR THAT COMMUNICATES WITH A USER PROCESSOR, A MERCHANT PROCESSOR AND A TRANSACTION PROCESSOR TO PROVIDE PERSONAL REMOTE CREDIT ACCOUNTING SERVICE. | PROCESSOR FOR MANAGING A USER PROCESSOR, A MERCHANT PROCESSOR, A TRANSACTION PROCESSOR AND A SERVICE DIRECTOR PROCESSOR INCLUDED IN A SERVICE PROVIDING SYSTEM. |
| FUNCTION | · CREDIT ACCOUNTING<br>· CANCELLATION OF CREDIT ACCOUNTING<br>· CUSTOMER SERVICE CALL<br>· INQUIRY CALL | · PREPARE AND DELETE PROCESS<br>· PREPARE AND DELETE PROCESS GROUP |
| INTERFACE | USER PROCESS 23904<br>· PAYMENT REQUEST<br>· CANCELLATION REQUEST<br>· RESPONSE TO RECEIVED CALL<br>· INQUIRY CALL REQUEST<br>· TIME-OUT ERROR MESSAGE<br>· SESSION ERROR MESSAGE<br>· TIME-OUT MESSAGE | USER PROCESS 23906<br>· PAYMENT REQUEST<br>· CANCELLATION REQUEST<br>· INQUIRY CALL REQUEST<br>· OWN PROCESS DELETION REQUEST |
| | USER PROCESS 23903<br>· RECEIPT<br>· CANCELLATION RECEIPT<br>· CUSTOMER SERVICE CALL<br>· RESPONSE TO INQUIRY CALL<br>· RESPONSE TO CALLING<br>· TIME-OUT ERROR MESSAGE<br>· SESSION ERROR MESSAGE | USER PROCESS 23905<br>· PREPARE USER PROCESS<br>· DELETE USER PROCESS<br>MERCHANT PROCESS 23912<br>· CREDIT REFERENCE REQUEST<br>· CANCELLATION REQUEST<br>· CUSTOMER SERVICE CALL REQUEST<br>· OWN PROCESS DELETION REQUEST |
| | MERCHANT PROCESS 23910<br>· CLEARING CONFIRMATION<br>· CANCELLATION CONFIRMATION | MERCHANT PROCESS 23911<br>· PREPARE MERCHANT PROCESS<br>· DELETE MERCHANT PROCESS |

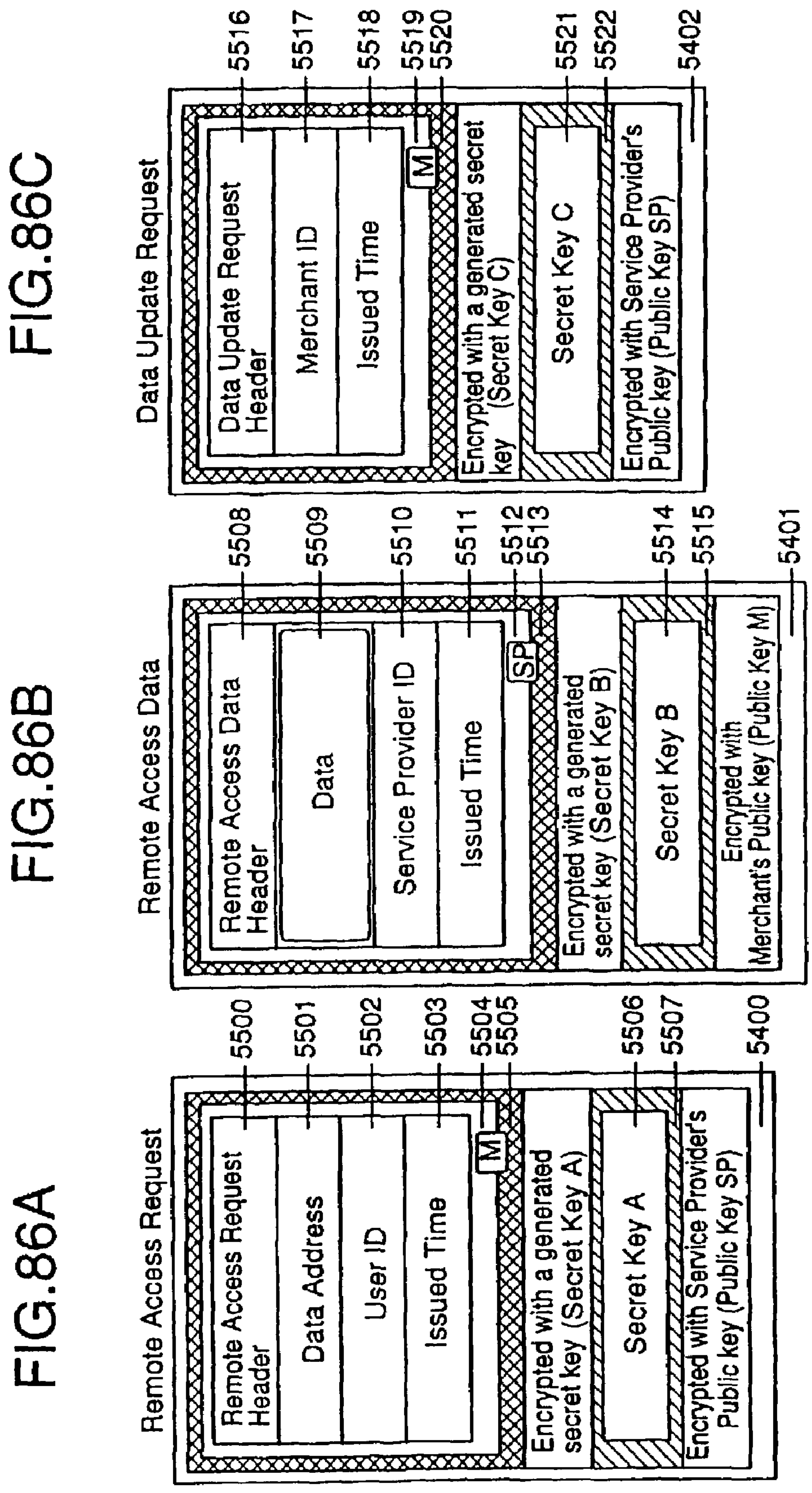
FIG.86A
Remote Access Request
Remote Access Request Header
Data Address
User ID
Issued Time
M
Encrypted with a generated secret key (Secret Key A)
Secret Key A
Encrypted with Service Provider's Public key (Public Key SP)
5500
5501
5502
5503
5504
5505
5506
5507
5400
FIG.86B
Remote Access Data
Remote Access Data Header
Data
Service Provider ID
Issued Time
SP
Encrypted with a generated secret key (Secret Key B)
Secret Key B
Encrypted with Merchant's Public key (Public Key M)
5508
5509
5510
5511
5512
5513
5514
5515
5401
FIG.86C
Data Update Request
Data Update Request Header
Merchant ID
Issued Time
M
Encrypted with a generated secret key (Secret Key C)
Secret Key C
Encrypted with Service Provider's Public key (Public Key SP)
5516
5517
5518
5519
5520
5521
5522
5402

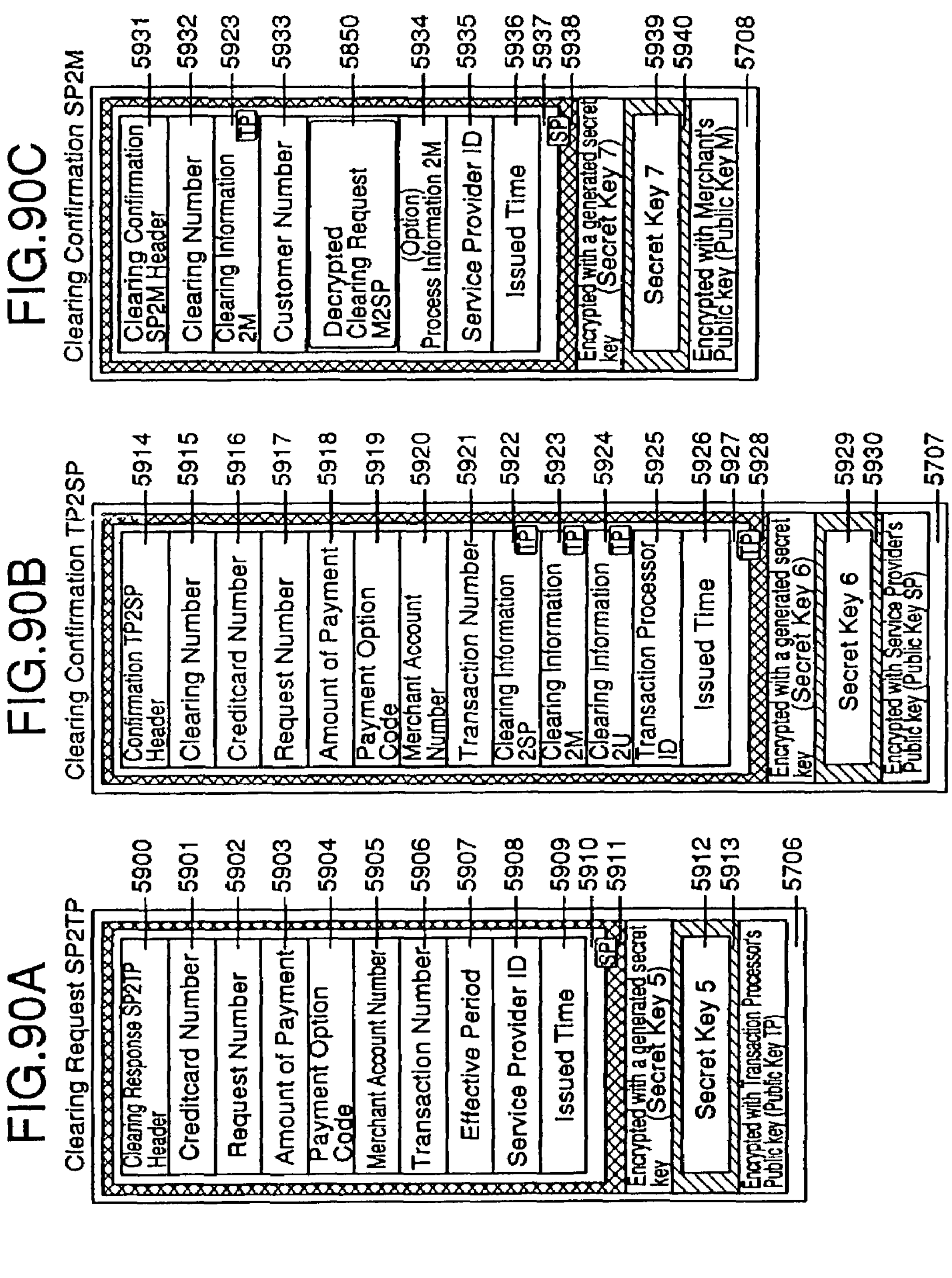
FIG.90A
Clearing Request SP2TP
Clearing Response SP2TP Header
Creditcard Number
Request Number
Amount of Payment
Payment Option Code
Merchant Account Number
Transaction Number
Effective Period
Service Provider ID
Issued Time
SP
Encrypted with a generated secret key (Secret Key 5)
Secret Key 5
Encrypted with Transaction Processor's Public key (Public Key TP)
5900
5901
5902
5903
5904
5905
5906
5907
5908
5909
5910
5911
5912
5913
5706
FIG.90B
Clearing Confirmation TP2SP
Confirmation TP2SP Header
Clearing Number
Creditcard Number
Request Number
Amount of Payment
Payment Option Code
Merchant Account Number
Transaction Number
Clearing Information 2SP
Clearing Information 2M
Clearing Information 2U
Transaction Processor ID
Issued Time
TP
Encrypted with a generated secret key (Secret Key 6)
Secret Key 6
Encrypted with Service Provider's Public key (Public Key SP)
5914
5915
5916
5917
5918
5919
5920
5921
5922
5923
5924
5925
5926
5927
5928
5929
5930
5707
FIG.90C
Clearing Confirmation SP2M
Clearing Confirmation SP2M Header
Clearing Number
Clearing Information 2M
TP
Customer Number
Decrypted Clearing Request M2SP
(Option) Process Information 2M
Service Provider ID
Issued Time
SP
Encrypted with a generated secret key (Secret Key 7)
Secret Key 7
Encrypted with Merchant's Public key (Public Key M)
5931
5932
5923
5933
5850
5934
5935
5936
5937
5938
5939
5940
5708

Receipt M2SP

Receipt SP2U

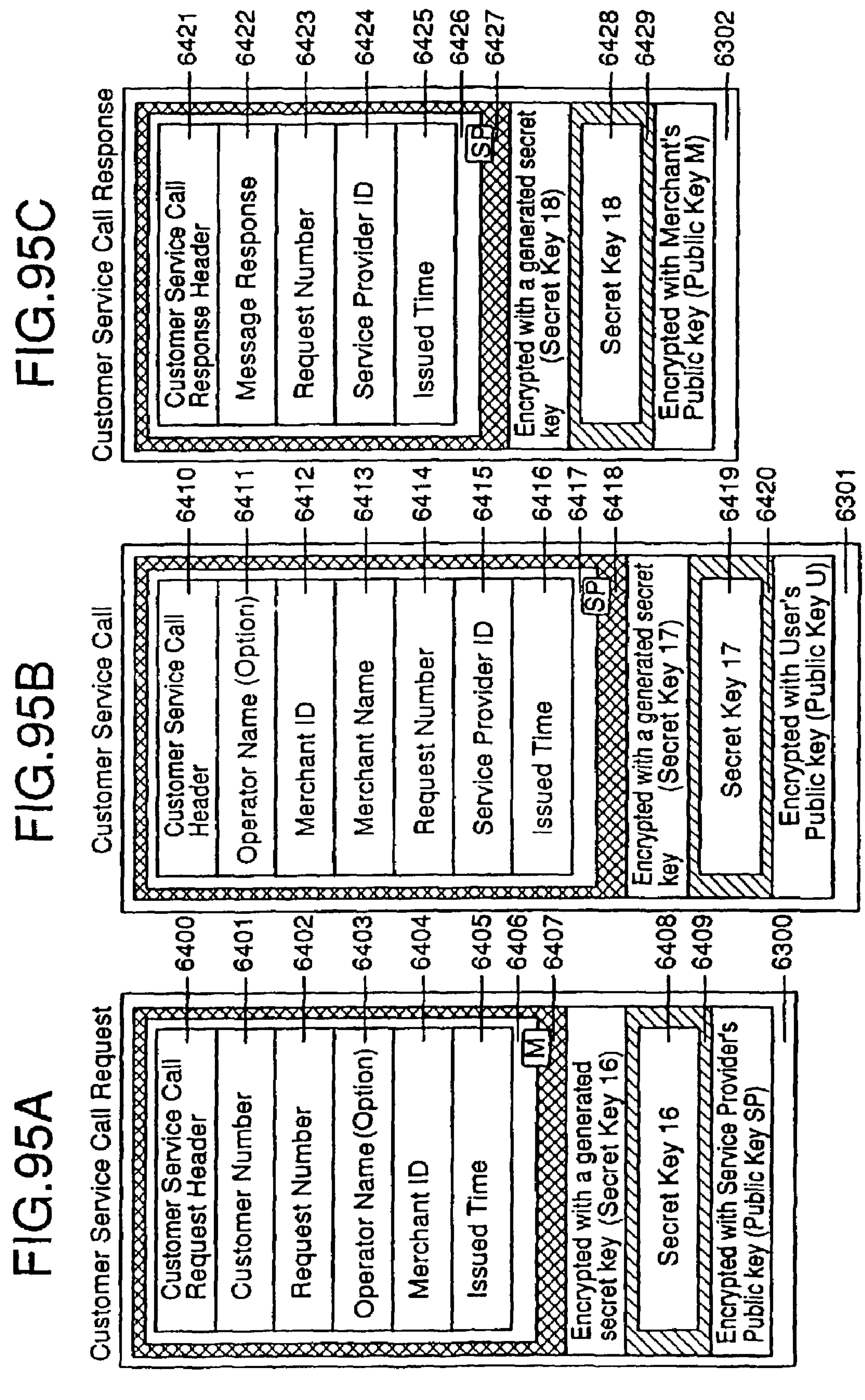
FIG.95A
Customer Service Call Request
Customer Service Call Request Header
Customer Number
Request Number
Operator Name (Option)
Merchant ID
Issued Time
M
Encrypted with a generated secret key (Secret Key 16)
Secret Key 16
Encrypted with Service Provider's Public key (Public Key SP)
6400
6401
6402
6403
6404
6405
6406
6407
6408
6409
6300
FIG.95B
Customer Service Call
Customer Service Call Header
Operator Name (Option)
Merchant ID
Merchant Name
Request Number
Service Provider ID
Issued Time
SP
Encrypted with a generated secret key (Secret Key 17)
Secret Key 17
Encrypted with User's Public key (Public Key U)
6410
6411
6412
6413
6414
6415
6416
6417
6418
6419
6420
6301
FIG.95C
Customer Service Call Response
Customer Service Call Response Header
Message Response
Request Number
Service Provider ID
Issued Time
SP
Encrypted with a generated secret key (Secret Key 18)
Secret Key 18
Encrypted with Merchant's Public key (Public Key M)
6421
6422
6423
6424
6425
6426
6427
6428
6429
6302

PERSONAL ELECTRONIC SETTLING SYSTEM AND A TERMINAL AND CONTROL APPARATUS THEREFOR

CROSS-REFERENCE TO RELATED APPLICATION

The present application is a divisional of U.S. patent application Ser. No. 09/101,356, filed Sep. 8, 1998, now U.S. Pat. No. 6,332,133.

TECHNICAL FIELD

The present invention relates to an electronic settling or settlement system that provides a settling function for retail sales transactions involving the use of credit cards (bank cards), and a terminal and a control apparatus or management device therefor. In particular, the present invention pertains to an electronic settlement, transaction or clearing system that provides ensured protection for sales transactions, while further ensuring the uncomplicated execution of such settlement or transactions.

BACKGROUND ART

As the employment of bank cards, such as credit cards, has spread, retail sales transactions involving the use of credit cards have become quite common. Concurrently, however, in consonance with the growing popularity of credit card use, there has been a corresponding increase in such criminal activities as the counterfeiting of credit cards, the theft and the illegal use of credit cards by unauthorized persons, and the illegal assessment of charges by shops, so that a need exists for means by which to improve the safety of transactions handled by settlement systems. Recently, as a countermeasure to prevent credit card forgery, an IC credit card has been introduced.

A description will now be given of a settlement system for which conventional credit cards, to include IC credit cards, are used.

As is disclosed in Japanese Examined Patent Publication No. Hei 3-32100, for transactions involving the use of bank cards, such as credit cards, many settlement systems have been proposed and are now employed that permit the exchange of authorization and credit clearance data by terminals at shops and at control centers.

In FIG. 42 is shown the general structure of such a conventional settlement system.

In FIG. 42, a credit settlement terminal 4201 is installed at a shop for the performance of various credit transactions. The credit settlement terminal 4201 is connected to a remote settlement system 4202 via a telephone line 4204, a public network 4203, and a communication line 4205. The credit settlement terminal 4201 includes a card reader for reading information stored on a credit card 4200, a modem for connecting to the public network 4203, and a printer for printing a statement of accounts.

The settlement system 4202 is an information processing system for handling credit settlement or transactions, and for managing manage consumer credit information and account information under the terms of credit service contracts entered into by consumers.

On credit cards bearing the signatures of card holders, ID information is electronically recorded that corresponds to raised impressions of the names of the card holders and their assigned account numbers. The credit cards 4200 that are currently being used in this manner are magnetic credit cards and IC credit cards, the differences between them being that they require different external interfaces and that card readers used for reading their internally stored data must be those that correspond to the specific cards that are employed. Incidentally, in addition to the aforementioned ID data, on some types of credit cards various other personal data items can be stored.

The thus structured settlement system performs credit transactions using the following process.

First, when requesting the initiation of a credit transaction, a consumer hands a credit card 4200 to a shop clerk. The shop clerk then uses the card reader of the credit settlement terminal 4201 to read the credit card 4200, and proceeds to process the credit transaction.

When the card reader has read the ID data from the credit card 4200, the settlement terminal 4201 transmits to the settlement system 4202, via a modem connected to a data communication network, a message that includes the ID data, and a request for credit reference data and for the initiation of a credit transaction. Thereafter, the settlement system 4202 employs the ID data, and price data, which is also included in the message, to perform a credit reference process and other procedures required for the credit transaction, and then transmits a transaction completion message to the credit settlement terminal 4201. Upon receiving this message, the credit settlement terminal 4201 uses the printer to prepare a statement of account.

Finally, the shop clerk asks the consumer to sign the statement of account and confirms the consumer's signature by comparing it with the signature on the credit card 4200, and completes the credit transaction by returning the credit card 4200 to the customer with a copy of the statement of account.

When such a conventional settlement system is employed, however, since the credit card 4200 is physically transferred to the shop clerk and possession of the credit card 4200 number is thus acquired by the shop, the possibility exists that the number could be illegally used by the shop.

In addition, since according to the conventional credit system the shop is the dominant party in the credit process, in the course of a credit transaction the shop could cheat the consumer by charging a higher than actual price.

Furthermore, since according to the conventional settlement system a credit card 4200 is loaded directly into a credit settlement terminal that is installed in a shop and is thus susceptible to tampering by the shop, the shop could alter data recorded on the card, or illegally read personal data, other than ID data, stored on the card.

And then, with the conventional settlement system, a consumer is inconvenienced by having to carry a large number of credit cards, one for each credit service for which a contract has been entered into with a credit company.

Moreover, since with the conventional settlement system a physical card, i.e., a credit card, must be used as an authentication means, if a consumer desires to cancel a transaction for which the credit card was used, he or she must return to the location at which that transaction was concluded.

Also, with a conventional settlement system an account statement must be printed out on paper, and the time required for the printing constitutes an interruption that detracts from the efficiency with which the system handles a sale. Further, since a credit settlement terminal must be equipped with a printer, this adversely affects efforts to reduce the size and the cost of a credit settlement terminal.

In addition, since according to a conventional settlement system the signature of a consumer is required on an account statement, the time required for a clerk to request that a consumer sign a statement and for the consumer to actually sign it occupies the major portion of the credit transaction time, and further detracts from the efficiency of such a sale.

To resolve the above problems encountered with a conventional settlement system, one objective of the present invention is to provide transaction means for which superior safety and convenience are ensured.

SUMMARY OF THE INVENTION

According to the present invention, therefore, provided is a personal electronic settlement system that comprises: payment means including a plurality of types of communication means; charging means including a plurality of types of communication means; and transaction means (settlement means) including a plurality of types of communication means (or service providing means including a plurality of types of communication means, and transaction means (settlement means) connected by a communication line to the service providing means). The payment means, the charging means, and the transaction means (or the service providing means and the transaction means) communicate with each other using different types of communication means.

Since the payment means and the transaction means (or the service providing means) exchange transaction data by communicating with each other, it is possible to prevent the assessment of an illegal charge by the charging means, and to also prevent the leakage of individual data from the payment means, or personal data for the owner of the payment means, to a person in charge of the charging means. In addition, since necessary data are exchanged by communication between the payment means and the charging means, the efficiency of the sale can be improved.

The invention comprises:

payment means including a plurality of types of communication means;

charging means including a plurality of types of communication means; and transaction means (settlement means) including a plurality of types of communication means, wherein communication among the payment means, the charging means and the transaction means is performed by employing different types of communication means. Since transaction data are exchanged by communications conducted between the payment means and the transaction means, an illegal charge assessment by the charging means can be prevented, and since identification data for payment data, money to be paid, transaction identification data, and signatures (digital signatures) are exchanged, the efficiency of the sales process can be enhanced.

In the invention, the payment means comprises different types of wireless communication means that are used for communications conducted between the charging means and the transaction means. Therefore, its employment in a mobile environment is more convenient.

In the invention, as wireless communication means for communications between the payment means and the charging means, a type of wireless communication means is selected whose effective communication distance is shorter and whose directivity is higher than are those of the radio communication means used for communications conducted between the payment means and the transaction means. Since the distance between the payment means and the charging means is at most 1 to 2 meters, the selection of such a wireless communication means can provide a system having a form that is appropriate for the environment in which it is employed.

In the invention, the payment means includes optical communication means to be used for wireless communications conducted with the charging means, and radio communication means to be used for wireless communications conducted with the charging means. The optical communication means, such as infrared ray radiation, is employed for short distance communications conducted between the payment means and the charging means, and the radio communication means is employed for long distance communications conducted between the payment means and the transaction means, so that a system can be provided that has a form that is appropriate for the environment in which it is employed.

In the invention, the payment means includes:

optical communication means and radio communication means;

input means, for entering a money amount to be paid;

a central processing unit, for generating data to be transmitted by the optical communication means and the radio communication means, and for processing data received by the optical communication means and the radio communication means;

first storage means, for storing a control program for controlling operations performed by the central processing unit;

display means, for visually presenting the results obtained by the data processing performed by the central processing unit; and second storage means, for storing data processed by the central processing unit. As a result, the operation of the payment means can be performed by the owner of the payment means, and data stored in the payment means can be displayed for the owner, so that the employment of the payment means is more convenient.

In the invention, the charging means includes:

optical communication means, for communicating with the payment means;

radio communication means, for communicating with the transaction means;

input means, for entering a money amount to be paid;

a central processing unit, for generating data to be transmitted by the optical communication means and the radio communication means, and for processing data received by the optical communication means and the radio communication means;

first storage means, for storing a control program for controlling all operations performed by the central processing unit;

display means for visually presenting results obtained by the data processing performed by the central processing unit; and second storage means, for storing data processed by the central processing unit. As a result, the operation of the charging means can be performed by the person in charge, and data stored in the charging means can be displayed for to the person in charge, so that the employment of the charging means is more convenient.

In the invention, the transaction means includes:

first storage means, for storing data concerning the payment means;

second storage means, for storing data concerning the charging means; and a computer system, for processing data for a transaction. The performance of the settlement processing is based on data received from the payment means and the charging means.

In the invention, the central processing unit of the payment means generates and transmits to the transaction means message data requesting the performance of a money transaction for an amount that corresponds to a value input by the input means of the payment means, processes and outputs to the display means message data received from the transaction means indicating the completion of a payment, and stores the processed data in the second storage means of the payment means. The owner of the payment means can send a transaction request directly to the transaction means while designating an money amount to be paid so that the assessment of an illegal charge by the charging means can be prevented, and so that the owner of the payment means can manage the history of his or her payments (transaction data).

In the invention, the central processing unit of the payment means generates and transmits to the charging means message data offering a money payment that corresponds to an amount input by the input means of the payment means. For the transaction, the owner of the payment means can designate an amount to be paid directly to the charging means and notify the transaction means, so that the assessment of an illegal charge by the charging means can be prevented.

In the invention, the central processing unit of the charging means generates and transmits to the payment means message data requesting a money payment that corresponds to an amount input by the input means of the charging means, generates and transmits to the transaction means message data requesting a transaction by employing the message data received from the payment means to offering payment and the message data requesting payment, processes message data that is received from the transaction means that indicates the completion of the transaction, and outputs the resultant data to the display means of the charging means while also storing the resultant data in the second storage means of the charging means. Since the message requesting a transaction can not be transmitted to the transaction means by only the charging means, an illegal charge instituted by the charging means can be prevented, and the owner of the payment means can manage the history of the transactions (transaction data).

In the invention, the central processing unit of the charging means generates and transmits to the payment means message data requesting a payment; the central processing unit of the payment means generates and transmits to the transaction means message data requesting a transaction by employing the message data offering a payment and the message data received from the charging means requesting a payment; and the transaction means performs a transaction by comparing the message data received from the charging means requesting a payment with the message data received from the payment means requesting a transaction, generates and transmits to the charging means message data indicating that a payment has been completed, and generates and transmits to the payment means message data indicating that a transaction has been completed. The illegal assessment of a charge by the charging means and the submission of a false payment statement by the payment means can be prevented.

In the invention, the central processing unit of the payment means adds, to message data offering a payment to the charging means, identification data for identifying the message data, and, to message data that is to be transmitted to the transaction means requesting a payment, identification data for message data offering a payment, identification data for the payment means, and identification data for message data requesting a payment; the central processing unit of the charging means adds, to message data requesting a payment from the payment means, identification data for identifying the message data, and, to message data that is to be transmitted to the transaction means requesting a transaction, identification data for message data requesting a payment, identification data for the charging means and identification data for message data offering a payment; and the transaction means compares the identification data for the message data offering a payment, which are included in the message data requesting a payment and in the message data requesting a transaction, with the identification data for the message data requesting a payment. The transaction can be performed without informing the charging means of either the identification data for the payment means or the public identification data for the owner of the payment means, and the leaking of identification data, which correspond to a credit card number, can be prevented.

In the invention, identification data for a plurality of payment methods are stored in the second storage means of the payment means, and the central processing unit of the payment means adds, to the message data offering a payment and the message data requesting a payment, identification data for a payment method that is selected by the input means of the payment means. Since a single payment means can be employed to select an appropriate payment method from among a number of payment methods, the owner of the payment means need not carry multiple credit cards, and the convenience of use for the owner is enhanced.

In the invention, the transaction means generates for the person in charge of the charging means valid identification data for the owner of the payment means, adds the identification data to the message data indicating the transaction has been completed, and transmits the message data to the charging means. Not all the identification data for the payment means and the public identification data for the owner are transmitted to the charging means; the only identification data for the owner of the payment means that are transmitted are those that are generated by the transaction means while taking into consideration their usefulness for the processing that is to be performed later by the charging means.

In the invention, the payment means includes battery capacity detection means for detecting the capacity of a battery used by the payment means. When the battery capacity is equal to or less than Q ($Q>0$), the central processing unit of the payment means transmits to the transaction means data stored in the second storage means of the payment means wherein data processed by the central processing unit are stored, and the transaction means stores the received data in the first storage means of the transaction means wherein data concerning the payment means are stored. Therefore, the loss of data stored in the payment means due to a lack of battery power can be prevented.

In the invention, data processed by the central processing unit of the payment means are stored either in the second storage means of the payment means, or in the first storage means of the transaction means, wherein data concerning the payment means are stored.

The data are managed by entering identification data in the data in the second storage means of the payment means, and an address in the pertinent storage means, wherein the data are stored. To process address data in the first storage means of the transaction means, the central processing unit of the payment means generates and transmits to the transaction means a message requesting the address data. Upon receipt of the message, the transaction means generates and transmits to the payment means a message in which are included the address data that are requested. Then, the central processing unit in the payment means extracts the requested data from the message received from the transaction means. Even when the second storage means of the payment means has a small capacity, a large quantity of transaction data can be managed, and the size and the cost of the payment means can be reduced.

In the invention, data processed by the central processing unit of the charging means are stored either in the second storage means of the charging means, or in the second storage means of the settlement means, wherein data concerning the charging means are stored. The data are managed by entering, in the second storage means of the charging means, identification data for the data and an address in the pertinent storage means, wherein the data are stored. To process the address data in the second storage means of the transaction means, the central processing unit of the charging means generates and transmits to the transaction means a message requesting the address data. Upon receiving the message, the settlement means generates and transmits to the charging means a message in which are included the requested data. Then, the central processing unit in the charging means extracts the requested data from the message received from the transaction means. Thus, even when the second storage means of the charging means has a small capacity, a large quantity of transaction data can be managed, and the size and the cost of the charging means can be reduced.

In the invention, at a time designated by the transaction means, the central processing unit of the payment means generates and transmits to the transaction means a message in which are included data that are stored in the second storage means of the payment means. Upon receiving the message data, the transaction means generates and transmits to the payment means a message in which are included data for updating the second storage means of the payment means. Then, the central processing unit of the payment means extracts the updating data from the message data received from the transaction means, and updates the data stored in the second storage means of the payment means. Since the data stored in the payment means are automatically updated, the owner of the payment means does not need to perform any maintenance for data stored in the payment means, and the convenience of use afforded by the payment means can be improved. Further, the consistency of data stored in the charging means and the data stored in the transaction means can be maintained, and there liability of the system enhanced.

In the invention, at a time designated by the transaction means, the central processing unit of the charging means generates and transmits to the transaction means a message in which are included data that are stored in the second storage means of the charging means. Upon receiving the message, the transaction means generates and transmits to the charging means a message in which are included data for updating the second storage means of the charging means. Then, the central processing unit of the charging means extracts the updating data from the message received from the transaction means, and updates the data stored in the second storage means of the charging means. Since the data stored in the charging means are automatically updated, a person in charge of the charging means does not need to perform any maintenance for data stored in the charging means, and the convenience of use afforded by the charging means can be improved. Further, the consistency of data stored in the charging means and data stored in the transaction means can be maintained, and the reliability of the system enhanced.

In the invention, when the transaction means receives from the payment means a message in which are included data stored in the second storage means of the payment means, in order to generate data for updating the second storage means of the payment means, the transaction means compares the times at which all the data concerned were generated, and allots to data that were generated at a later time an address in the second storage means of the payment means, while allotting to data that were generated at an earlier time an address in the first storage means of the transaction means in which data concerning the payment means are stored. Since new data for which the probability that they will be accessed is comparatively high are stored in the payment means, the owner of the payment means can access data without waiting, and the convenience of use afforded by the payment means can be improved.

In the invention, when the transaction means receives from the payment means a message in which are included data stored in the second storage means of the payment means, in order to generate data for updating the second storage means of the payment means, the transaction means compares the times at which all the data concerned were accessed by the owner of the payment means, and allots to data that were accessed at a later time an address in the second storage means of the payment means, while allotting to data that were accessed at an earlier time an address in the first storage means of the transaction means in which data concerning the payment means are stored. Since data that were more recently accessed are stored in the payment means, the owner of the payment means can access such data without waiting for the data to be transmitted to the payment means.

In the invention, when the transaction means receives from the charging means a message in which are included data stored in the second storage means of the charging means, in order to generate data for updating the second storage means of the charging means, the transaction means compares the times at which all the data concerned were generated, and allots to data that were generated at a later time an address in the second storage means of the charging means, while allotting to data that were generated at an earlier time an address in the second storage means of the transaction means in which data concerning the charging means are stored. Since new data for which the probability that they will be accessed is comparatively high are stored in the charging means, a person in charge of the charging means can access such data without delay, and the convenience of use afforded by the charging means is improved.

In the invention, when the transaction means receives from the payment means a message that includes data stored in the second storage means of the payment means, the transaction means extracts from the message the data that are stored in the second storage means of the payment means and compares them with the data stored in the first storage means of the transaction means in which data concerning the payment means are stored.

When an illegal alteration is found, the transaction means transmits to the payment means a message to halt a function that is being performed by the payment means. In this fashion, illegal alteration of the information stored in the payment means can be prevented.

In the invention, when the transaction means receives from the charging means a message in which are included data stored in the second storage means of the charging means, the transaction means extracts from the message the data that are stored in the second storage means of the charging means and compares them with the data stored in the second storage means of the transaction means in which data concerning the charging means are stored. When an illegal alteration is found, the transaction means transmits to the charging means a message to halt a function that is being performed by the charging means. In this fashion, illegal alteration of the information stored in the charging means can be prevented.

In the invention, the central processing unit of the payment means employs a message to transmit data indicating that a payment has been completed to generate and transmit to the transaction means a message requesting a transaction be canceled; and the central processing unit of the charging means employs a message to transmit data indicating a transaction has been completed to generate and transmit to the transaction means a message requesting the transaction be canceled. The transaction means compares the message data received from the payment means and from the charging means, transmits to the payment means a message indicating the cancellation of the payment is completed, and also transmits to the charging means message data indicating cancellation of the transaction is completed. Even when the payment means and the charging means are at widely separated locations, the transaction can be canceled and the convenience of use is improved.

In the invention, the central processing unit of the charging means employs identification data for the owner of the payment means, which are included in the message that is received from the transaction means and which indicate a transaction has been completed, to generate and transmit to the transaction means a message requesting a connection for communicating with the payment means. The transaction means generates and transmits to the payment means identified by the identification data a message that a connection will be established for communication between the payment means and the charging means, and then establishes the connection across a communication line. Upon receiving the message from the transaction means, the central processing unit of the payment means displays on the display means of the payment means the identification data for the owner of the payment means, and a notification that a connection has been established with the charging means across the communication line. In this manner, even when the person in charge of the charging means does not possess any public identification data (e.g., a telephone number) for the owner of the payment means, he or she can contact the owner of the payment means while not infringing on the privacy of the owner, and a business transaction between the owner of the payment means and the person in charge of the charging means can be concluded without difficulty.

In the invention, before connecting the payment means to the charging means across the communication line, the transaction means refers to access control data that are established by the owner of the payment means and are stored in the first storage means of the transaction means. When an access by the charging means is inhibited, the transaction means does not connect the charging means to the payment means, and better protection of privacy is afforded the owner of the payment means.

In the invention, the central processing unit of the payment means employs the data that are received from the transaction means and that indicate a payment has been completed, and generates and transmits to the transaction means a message requesting a connection for communicating with the charging means. The transaction means generates and transmits to the charging means a message including the identification data for the owner of the payment means, which was contained in the message indicating a transaction had been completed, notifying the charging means a connection will be established with the payment means along a communication line, and thereafter connects the payment means to the charging means. Upon receiving the message the central processing unit of the charging means displays on the display means of the charging means the identification data for the owner of the payment means and the state of the connection with the payment means. Thus, while no public identification data (e.g., a telephone number) for the owner of the payment means are revealed, the owner can contact the person in charge of the charging means, and the person in charge of the charging means can communicate with the owner. As a result, a business transaction between the owner of the payment means and the person in charge of the charging means can be concluded without difficulty.

In the invention, the payment means provides the digital signature of the owner of the payment means in a message that is to be transmitted to the charging means or to the transaction means. Thus, it is possible to prevent an unauthorized person from approving an illegal payment that is to be made by the payment means.

In the invention, the charging means includes in a message that is to be transmitted to the payment means or to the transaction means the digital signature of the owner of the charging means. Thus, it is possible to prevent an unauthorized person from approving an illegal charge to be made by the charging means.

In the invention, the transaction means includes in a message to be transmitted to the payment means or the charging means the digital signature of the owner of the transaction means. Thus, for the transaction means, the performance by an unauthorized person of an illegal transaction can be prevented.

In the invention, the payment means includes audio input means; audio output means; and audio data processing means, for converting audio data input by the audio input means into data to be transmitted by the communication means, and for converting data received by the communication means into audio data to be output by the audio output means. Audio data communication is thereby facilitated, so that the possessor of a payment can discuss conditions with another person and can without difficulty proceed with the processing of a business transaction.

In the invention, the charging means includes audio input means; audio output means; and audio data processing means, for converting audio data input by the audio input means into data to be transmitted by the communication means, and for converting data received by the communication means into audio data to be output by the audio output means. Audio data communication is thereby facilitated, so that the possessor of a payment can discuss conditions with a customer and can without difficulty proceed with the processing of a business transaction.

In the invention, the payment means includes cryptography processing means, for encrypting messages to be transmitted and for decrypting encrypted messages that are received; and audio cryptography processing means, for encrypting audio data to be transmitted and for decrypting encrypted audio data that is received. Transmission and reception of encrypted data messages and audio data are thereby facilitated, and transaction security is improved by protecting against the invasion of privacy by wiretapping.

In the invention, the charging means includes cryptography processing means, for encrypting messages to be transmitted and for decrypting encrypted messages that are received; and audio cryptography processing means, for encrypting audio data to be transmitted and for decrypting encrypted audio data that are received. Transmission and reception of encrypted messages and audio data are thereby facilitated, and transaction security is improved by protecting business transactions from being compromised through wiretapping.

In the invention, the payment means adds the digital signature of the owner of the payment means to data for a message to the transaction means, and closes and addresses the data message to the person in charge of the transaction means. In this fashion, an illegal payment by a third person, who pretends to be the owner of the payment means, can be prevented, and the privacy of a transaction can be protected.

In the invention, the charging means adds the digital signature of the person in charge of the transaction means to data for a message to be transmitted to the transaction means, and closes and addresses the data message to the person in charge of the transaction means. In this fashion, the submission of an illegal charge by a third person, who pretends to be the person in charge of the charging means, can be prevented, and business secrets can be protected.

In the invention, the transaction means adds the digital signature of the person in charge of the transaction means to data for a message to be transmitted to the payment means, and closes and addresses the data message to the owner of the payment means. The transaction means also adds the digital signature of the person in charge of the transaction means to data for a message to be transmitted to the charging means, and closes and addresses the data message to the person in charge of the charging means. In this fashion an illegal clearance, effected by a third person pretending to be the person in charge of the transaction means, can be prevented, and business secrets can be protected.

In the invention, the transaction means in a second accumulation means thereof, wherein information concerning the charging means is stored, accumulates data in messages that are transmitted to the charging means to confirm the completion of a transaction, and in a first accumulation means thereof, wherein information concerning the payment means is stored, accumulates data in messages that are transmitted to the payment means to confirm the completion of a payment. As a result, even when the payment means or the charging means malfunctions and internal data are lost, the data can be recovered by using the data that are stored in the first or the second accumulation means of the transaction means.

In the invention, the transaction means includes service providing means, for providing an electronic transaction service to the owner of the payment means and the person in charge of the charging means via the communication means of the payment means and the communication means of the charging means; and clearing means (settlement means), connected to the service providing means via communication means, for performing transactions involving the owner of the payment means and the person in charge of the charging means. In this fashion, a system can be constructed without greatly changing the conventional clearing means.

In the invention, the service providing means includes: first accumulation means for accumulating information concerning the payment means and the owner of the payment means; second accumulation means for accumulating information concerning the charging means and the person in charge of the charging means; and a computer system for executing program data for providing an electronic transaction service. With this arrangement, the service providing means can perform an intermediary process without difficulty, servicing the payment means and the charging means, and the clearing means (settlement means).

In the invention, the clearing means includes: first accumulation means for accumulating information concerning a transaction contract involving the owner of the payment means; second accumulation means for accumulating information concerning a transaction contract involving the person in charge of the charging means; and a computer system for executing program data for the transaction. In this fashion, the transaction means can be provided without greatly changing the conventional clearing means.

In the invention, the service providing means compares data in a message transmitted by the charging means requesting a settlement processing with data in a message transmitted by the payment means requesting a payment process, and generates and transmits a message containing data requesting a settlement processing. The clearing means that performs the settlement processing generates and transmits to the service providing means a message containing data reporting that the settlement processing has been completed. The service providing means employs the data in the message reporting the completion of the transaction to generate data for a message reporting that the transaction has been completed and data for a message reporting that payment has been completed, and transmits the data in the messages to the charging means and the payment means. In this fashion the submission of an illegal charge by the charging means and the submission of a false payment statement by the payment means can be prevented without changing the conventional clearing means greatly.

In the invention, the service providing means, in the second accumulation means thereof, accumulates data in messages that are transmitted to the charging means to report that transaction have been completed, and in the first accumulation means thereof, accumulates data in messages that are transmitted to the payment means to report that payments have been completed. With this structure, even when, for example, the payment means or the charging means malfunctions and internal data is lost, the data in the messages stored in the first or the second accumulation means of the transaction means can be accessed to recover the lost data.

In the invention, the clearing means is composed of a plurality of clearing means that each handle a different settlement processing, and a third accumulation means for storing information concerning the clearing means is provided for the service providing means. The owner of the payment means can thus employ a plurality of payment methods, and the usability of the payment means is thereby enhanced.

In the invention, the service providing means employs the result of a comparison of the data in a message requesting a settlement processing with the data in a message requesting a payment process to select one of the plurality of clearing means to transmit a message containing the data requesting a settlement processing. Thus, an optimal clearing means can be selected that is consonant with the data in the message requesting the payment process.

In the invention, the service providing means, in the third accumulation means thereof, accumulates data in a message that is received from the clearing means to report the completion of a settlement processing. The data in the message reporting the completion of the settlement processing, the data in the message reporting the completion of the clearing, and the data in the message reporting the completion of the payment can be stored and managed while the matching of these data continues, and as a result, the reliability of the system is enhanced.

In the invention, information concerning a contract for a transaction involving the owner of the payment means and information attributed to the possessor of the payment means is included in the information, concerning the possessor of the payment means, that is accumulated in the first accumulation means of the service providing means. And information concerning a contract for a transaction involving the person in charge of the charging means and information attributed to the person in charge of the charging means is included in the information, concerning the possessor of the charging means, that is accumulated in the second accumulation means of the service providing means. The service providing means can authenticate the owner of the payment means and can furnish authorization for the owner of the payment means to the person in charge of the charging means. Further, the information stored in the second accumulation means of the service providing means can be employed to authenticate the person in charge of the charging means and furnish authorization for the person in charge of the charging means to the owner of the payment means. Thus, a transaction can be easily performed by the owner of the payment means and the person in charge of the charging means.

In the invention, information stored in the first accumulation means of the service providing means is managed for each owner of a payment means, and information stored in the second accumulation means of the service providing means is managed for each person in charge of a charging means. As a result, information privacy for the transaction can be securely and efficiently managed, and the reliability of the system can be enhanced.

In the invention, the central processing unit in the payment means inserts valid time period information into data for a message that offers payment and into data for a message that requests the initiation of a settlement processing; the central processing unit in the charging means inserts valid time period information into data for a message that requests a payment process be established and into data for a message that requests the initiation of a settlement processing; and the transaction means or the service providing means examines the valid time period information before comparing the data for the message requesting a payment process be established with the data for a message requesting the initiation of a settlement processing. Therefore, approval of an unauthorized request for which old message data are used is prevented.

In the invention, before generating data for a message requesting a settlement processing, the central processing unit of the charging means generates and transmits to the service providing means a message containing data requesting a credit reference process be performed for the owner of the payment means; the service providing means compares the data in the message requesting a payment process be established with the data in the message requesting a credit reference process be performed, and employs information concerning the owner of the payment means, which is stored in the first accumulation means of the service providing means, to generate and to transmit to the charging means a message containing data conveying the results of a credit reference process performed for the owner; and the central processing unit of the charging means processes data in the message and transmits the resultant data to the display means of the charging means. As the person in charge of the charging means can initiate the process for the transaction after confirming the credit status of the owner of the payment means and the identification of the owner, the security provided for the business transaction can be improved.

In the invention, photo and age information for the owner of the payment means are included in the data, concerning the owner of the payment means, that are stored in the first accumulation means of the service providing means; and the service providing means adds the photo and the age information for the owner of the payment means to data supplied in the message that conveys the results of the credit reference process performed for the owner. Since the person in charge of the charging means can confirm the identity of the owner of the payment means by referring to a full face photograph and the age of the owner that are displayed on the display means of the charging means, the security provided for the business transaction can be improved.

In the invention, if the capacity when empty of the second accumulation means of the payment means is smaller than AU (AU>0), the central processing unit of the payment means transmits to the transaction means, or to the service providing means, data stored in the second accumulation means of the payment means, and receives from the transaction means, or from the service providing means, updated data with which to update the data stored in the second accumulation means. In this fashion, the leakage of data from the second accumulation means of the payment means can be prevented.

In the invention, if the capacity when empty of the second accumulation means of the charging means is smaller than AM (AM>0), the central processing unit of the charging means transmits to the transaction means, or to the service providing means, data stored in the second accumulation means of the payment means, and receives from the transaction means, or the service providing means, updated data to update the data stored in the second accumulation means. In this fashion, the leakage of data from the second accumulation means of the charging means can be prevented.

In the invention, upon receiving from the payment means the message containing data in which are included data stored in the second accumulation means thereof, the transaction means, or the service providing means, generates and transmits to the payment means a message containing data that include updated data, for the second accumulation means of the payment means, and a control program for a central processing unit of a new payment means. Upon receiving the data contained in the message, the central processing unit of the payment means stores, in the first or the second accumulation means thereof, the control program for the central processing unit of the new payment means, and thereafter executes the control program. In this fashion, updating to the latest version of the control program can be continuously performed by the payment means, without requiring any action by the owner, and neither the transaction means nor the service providing means need cope with differences in the version of the control program used by the payment means.

In the invention, upon receiving from the charging means the message containing data in which are included data that are stored in the second accumulation means thereof, the transaction means, or the service providing means, generates and transmits to the charging means a message containing data that include updated data, for the second accumulation means of the charging means, and a control program for a central processing unit of a new charging means. Upon receiving the data message data, the central processing unit of the charging means stores, in the first or the second accumulation means thereof, the control program for the central processing unit of the new charging means, and thereafter executes the control program. In this fashion, updating to the latest version of the control program can be continuously performed by the charging means, without requiring any action by the person in charge, and neither the transaction means nor the service providing means need cope with differences in the version of the control program used by the charging means.

In the invention, the transaction means, or the service providing means, adds identification information for a settlement processing to the message containing data indicating a transaction has been completed and to the message containing data indicating payment has been completed; the central processing units of the payment means and the charging means add identification information for the settlement processing to respective messages containing data requesting the cancellation of a payment process and of a settlement processing; and the transaction means, or the service providing means, compares both the identification information additions to the settlement processing in order to compare the messages containing data that are respectively received from the payment means and the charging means requesting cancellation of the payment process and the settlement processing. An unauthorized request for a cancellation process can be prevented by comparing the identification information additions to the settlement processing.

In the invention, in order to compare the message data that are respectively received from the payment means and the charging means requesting cancellation of a payment process and of a settlement processing, the service providing means compares the data in the message requesting the cancellation of the payment process with the data in the message stored in the first accumulation means of the service providing means that indicates the payment has been completed, and also compares data in the message requesting cancellation of the settlement processing with data in the message stored in the second accumulation means of the service providing means that indicates the transaction has been completed. Therefore, the approval of an unauthorized request for a cancellation can be prevented by comparing the data in the message requesting cancellation of a payment process with the data in the message stored in the first accumulation means of the service providing means that indicates the payment has been completed, and by comparing the data in the message requesting the cancellation of a transaction with the data in the message stored in the second accumulation means of the service providing means that indicates the transaction has been completed.

In the invention, the service providing means accumulates, in the second accumulation means thereof, the data in the message transmitted to the charging means indicating that the cancellation of a settlement processing has been completed, and accumulates, in the first accumulation means thereof, the data in the message transmitted to the payment means indicating that the cancellation of a payment process has been completed. Even when the payment means or the charging means malfunctions and internal data is lost, the data in the message stored in the first or the second accumulation means of the transaction means can be employed to recover the lost data.

In the invention, the payment means and the charging means are connected to each other via a communication line by the transaction means, or the service providing means, and can exchange audio data. Thus, the owner of the payment means and the person in charge of the charging means can talk to each other and can proceed with a business transaction without difficulty.

In the invention, the payment means and the charging means are connected to each other via a communication line by the transaction means, or the service providing means, and exchange encryption keys to enable transmission of encrypted audio data. Thus, the owner of the payment means and the person in charge of the charging means can proceed with a business transaction without difficulty and without their conversation being wiretapped.

In the invention, the computer system of the service providing means includes: user information processing means, for communicating with the payment means and for processing information stored in the first accumulation means of the service providing means; merchant information processing means, for communicating with the charging means and for processing information stored in the second accumulation means of the service providing means; settlement system information processing means, for communicating with the clearing means and for processing information stored in the third accumulation means of the service providing means; and service director information processing means, for interacting with the user information processing means, the merchant information processing means and the settlement system processing means to process data for a service providing process. Since the user information processing means, the merchant information processing means, the settlement system information processing means, and the service director information processing means can perform parallel processing, the service providing process can be performed efficiently.

In the invention, the computer system of the service providing means includes: service manager information processing means, for generating and deleting the user information processing means, the merchant information processing means, the settlement system information processing means, and the service director information processing means, so that the user information processing means, the merchant information processing means, the settlement system information means, and the service director information processing means can be generated or deleted as needed by the service manager information processing means. The computation function of the computer system can be efficiently distributed among the individual information processing means.

In the invention, the service manager information processing means generates the user information processing means for a payment means in order to communicate with the payment means; generates the merchant information processing means for a charging means in order to communicate with the charging means; generates the settlement system information processing means for a transaction means in order to communicate with the transaction means; and generates the service director information processing means for a combination composed of the several information processing means in order to individually interact with the user information processing means, the merchant transaction means, or the settlement system information processing means. Since a plurality of service providing processes can be simultaneously performed, and the process for each information processing means can be simplified, system maintenance can be facilitated and there liability of the system can be improved.

In the invention, before generating the service director information processing means the service manager information processing means defines a group of information processing means, including the service director processing means, with which to interact; and after being generated the service director information processing means communicates only with an information processing means that belongs to the group, interacting with the information processing means of the group to process data employed for providing a service. The process performed by one information processing means of a group does not adversely affect another information processing means of that group, and the reliability of the system can be improved.

In the invention, when, before processing data for providing a service, the service director information processing means must interact with an information processing means that does not belong to the same group, the service director information processing means transmits, to the service manager information processing means, a message requesting the required information processing means be added to the group; and the service manager information processing means generates the required information processing means, which is added to the group. Since a new information processing means can be added during the cooperative operation of the information processing means group, a process providing a service can be performed with a high degree of freedom.

In the invention, the user information processing means communicates only with a corresponding payment means, the service director information processing means of the same group and the service manager information processing means, and processes information that is stored in the first accumulation means of the service providing means that concerns the payment means and the owner thereof; the merchant information processing means communicates only with a corresponding charging means, the service director information processing means of the same group and the service manager information processing means, and processes information that is stored in the second accumulation means of the service providing means that concerns the charging means and the person in charge thereof; and the settlement system information processing means communicates only with a corresponding clearing means, the service director information processing means of the same group and the service manager information processing means, and processes information that is stored in the third accumulation means of the service providing means and concerns the clearing means. Since the process performed by one information processing means of a group does not adversely affect another information processing means, and since one information processing means (the user information processing means, the merchant information processing means or the settlement system information processing means) does not handle information that is not related to a means that corresponds to that information processing means, the reliability of the system can be improved.

In the invention, before the payment means is connected with the service providing means via a communication line, the payment means and a corresponding user information processing means perform mutual authentication processes, and before the charging means is connected with the service providing means via a communication line, the charging means and a corresponding merchant information processing means perform mutual authentication processes. Therefore, it is possible to prevent an unauthorized person from being connected to another person and illegally reading or rewriting information.

In the invention, the payment means, the charging means and the clearing means provide the digital signatures of the holders of the respective means for the transmission of data in messages to the user information processing means, the merchant information processing means, or the settlement system information processing means that corresponds to the user providing means; the user information processing means, the merchant information processing means and the settlement system information processing means provide a digital signature of the holders of the service providing means for transmission of data in messages to the payment means, the charging means, or the clearing means; and upon receiving the messages in which data is accompanied by the digital signatures, the payment means, the charging means and the transaction means, and the user information processing means, the merchant information processing means and the settlement system information processing means, three of which are included in the service providing means, individually authenticate the digital signatures. As a result, the performance of an illegal operation by an unauthorized person can be prevented. Further, the process of providing a digital signature for transmission with data included in a message, and the process of authenticating the digital signature can be efficiently performed in parallel by the user information processing means, the merchant information processing means and the settlement system information processing means of the service providing means.

In the invention, the payment means, the charging means and the clearing means perform a closing process for data in messages that are to be transmitted to the user information processing means, the merchant information processing means, or the settlement system information processing means, which corresponds to the service providing means, so that data in the message are addressed to the person in charge of the service providing means; the user information processing means, the merchant information processing means and the settlement system information processing means perform a closing process for messages containing data that are to be transmitted to the payment means, the charging means, or the clearing means, so that data in the messages are addressed to the person in charge of the payment, the charging means, or the clearing means; and the payment means, the charging means and the clearing means, and the user information processing means, the merchant in formation processing means and the settlement system information processing means of the service providing means individually decrypt the encrypted data in the closed messages. Thus, secrets concerning business transactions can be protected from being compromised through wiretapping, and the user information processing means, the merchant information processing means and the settlement system information processing means of the service providing means can efficiently perform in parallel the closing of messages containing data and the decryption of encrypted data in closed messages.

In the invention, the payment means, the charging means and the clearing means, and the user information processing means, the merchant information processing means and the settlement system information processing means of the service providing means provide digital signatures for data in message to be transmitted and close the messages containing data; and upon receipt of the message data, the payment means, the charging means and the clearing means, and the user information processing means, the merchant information processing means and the settlement system information means of the service providing means decrypt the encrypted data in the message data that are closed, and authenticate the digital signatures. Therefore, secrets concerning business transactions can be protected from being compromised through wiretapping, and the performance of an illegal operation by an unauthorized person can be prevented. In addition, the service providing means can efficiently perform a digital signature and closing process for data in a message, and the decryption of encrypted data received in a message and the authentication of an accompanying digital signature.

In the invention, upon receiving from the charging means the message containing data requesting a settlement processing, the merchant information processing means generates a message requesting a settlement processing and transmits the message to the service manager information processing means; upon receiving from the payment means the message containing data requesting a payment process, the user information processing means generates a message requesting a payment process and transmits the message to the service manager information processing means; the service manager information means employs identification information included in the message to compare the received messages, and generates the service director information processing means to define an information processing means group that is composed of the merchant information processing means, the user information processing means and the service director information processing means; the service director information processing means selects a clearing means to perform a clearing process by comparing the message requesting a settlement processing with the message requesting a payment process, and requests that the service manager information processing means add to the group an settlement system information processing means that corresponds to the selected transaction means; the service manager information processing means generates and adds to the group the requested settlement system information processing means; the service director information means generates a message requesting a settlement processing and transmits the message to the settlement system information processing means; upon receiving the message, the settlement system information processing means generates data for a message requesting settlement processing and transmits the message containing the data to the clearing means; when a message containing data that indicate the settlement processing has been completed is returned from the clearing means, the settlement system information processing means generates a message reporting the completion of the settlement processing and transmits the message to the service director information processing means, and also accumulates data for the message in the third accumulation means of the service providing means; upon receiving the message that reports the completion of the settlement processing, the service director information processing means generates a message reporting the completion of the transaction and a message reporting the completion of the payment, and transmits the respective messages to the merchant information processing means and the user information processing means; upon receiving the message, the merchant information processing means generates data for a message indicating the transaction has been completed and transmits the message to the charging means, and also accumulates the data for the message in the second accumulation means of the service providing means; and the payment means employs the received message to generate and transmit to the payment means a message containing data indicating that the payment has been completed, and accumulates the data for the message in the first accumulation means of the service providing means. The settlement processing can be efficiently performed, while the leakage of secrets concerning a business transaction, and the performance of an illegal operation by an unauthorized person are prevented.

In the invention, upon receiving from the charging means the message containing data requesting cancellation of a settlement processing, the merchant information processing means generates a message requesting cancellation of a settlement processing and transmits the message to the service manager information processing means; upon receiving the data in the message from the payment means requesting cancellation of a payment process, the user information processing means generates a message requesting cancellation of a payment process and transmits the message to the service manager information processing means; the service manager information means employs identification information included in the message to compare the received messages, and generates the service director information processing means to define an information processing means group that is composed of the merchant information processing means, the user information processing means and the service director information processing means; the service director information processing means specifies a clearing means that has performed the clearing process by comparing the message that requests cancellation of the settlement processing with the message that requests cancellation of the payment process, and requests the service manager information processing means to add to the group an settlement system information processing means that corresponds to the selected clearing means; the service manager information processing means generates and adds to the group the requested settlement system information processing means; the service director information means generates a message requesting cancellation of the settlement processing and transmits the message to the settlement system information processing means; upon receiving the message, the settlement system information processing means generates data for a message that requests cancellation of the settlement processing, and transmits the message data to the clearing means; when data in a message that indicate the transaction has been cleared are returned from the clearing means, the settlement system information processing means generates a message reporting the clearing of the transaction and transmits the message to the service director information processing means, and also accumulates data for the message in the third accumulation means of the service providing means; upon receiving the message reporting the transaction has been cleared, the service director information processing means generates a message reporting the clearing of the transaction and a message reporting the clearing of the payment, and transmits the respective messages to the merchant information processing means and the user information processing means; upon receiving the message, the merchant information processing means generates data for a message indicate the transaction has been cleared and transmits the message to the charging means, and also accumulates the data in the message in the second accumulation means of the service providing means; and the payment means employs the received message to generate and transmit to the payment means a message containing data indicating the payment has been cleared and accumulates the data for the message in the first accumulation means of the service providing means. The cancellation process can be efficiently performed, while the leakage of secrets concerning a business transaction, and the performance of an illegal operation by an unauthorized person are prevented.

In the invention, the charging means employs identification information for the owner of the payment means, which is included with data in the message indicating the completion of a transaction, to generate for a message data requesting communication be established with the payment means, and transmits the message containing the data to the merchant information processing means; upon receiving the message, the merchant information processing means generates a message requesting that communication be established with the payment means, and transmits the message to the service manager information processing means; upon receiving the message, the service manager information processing means generates the service director information processing means to define an information processing means group that is composed of the merchant information processing means and the service director information processing means; the service director information processing means specifies the payment means and the owner thereof that correspond to the identification information of the owner of the payment means included in the message, and requests the service manager information processing means add to the group a user information processing means that corresponds to the specified payment means; the service manager information processing means generates and adds to the group the requested user information processing means; the service director information processing means refers to access control information that is established by the owner of the payment means and is stored in the first accumulation means of the service providing means; the service director information processing means, when access from the charging means is not inhibited, generates a message reporting that the connection with the charging means has been established via a communication line, and transmits the message to the user information processing means; and the user information processing means employs the received message to generate and transmit to the payment means a message reporting that the connection has been established with the charging means via the communication line. Therefore, the customer service call process can be efficiently performed, while the leakage of secrets concerning a business transaction, and the performance of an illegal operation by an unauthorized person can be prevented.

In the invention, the payment means employs for a message data indicating the completion of a clearing process to generate message data requesting communication be established with the charging means, and transmits the message containing the data to the user information processing means; upon receiving the data in the message, the user information processing means generates a message that requests communication be established with the charging means and transmits the message to the service manager information processing means; upon receiving the message, the service manager information processing means generates the service director information processing means to define an information processing means group that is composed of the user information processing means and the service director information processing means; the service director information processing means requests that the service manager information processing means add to the group a merchant information processing means that corresponds to the charging means; the service manager information processing means generates and adds to the group the requested merchant information processing means; the service director information processing means generates a message reporting that the connection with the payment means has been established via a communication line, and transmits the message to the merchant information processing means; and the merchant information processing means employs the received message to generate and to transmit to the charging means a message reporting that a connection with the payment means has been established via the communication line. Therefore, an inquiry call process can be efficiently performed, while the leakage of secrets concerning a business transaction, and the performance of an illegal operation by an unauthorized person can be prevented.

In the invention, when the transaction means or the service providing means generates data for a message requesting the updating of data stored in the second accumulation means of the payment means or the charging means, and transmits the message data to the payment means or the charging means, the central processing unit of the payment or the charging means generates data for a message, which includes data stored in the second accumulation means, and transmits the data in the message to the transaction means or the service providing means; upon receiving the data in the message, the transaction means or the service providing means generates data for a message, which includes update data in the second accumulation means of the payment means or the charging means, and transmits the data in the message to the payment means or the charging means; and the central processing unit of the payment means or the charging means extracts the update data from the data in the message to update the data stored in the accumulation means. Since the service providing means can forcibly update the data stored in the second accumulation means of the payment means and of the charging means, this is effective when the contents of a contract are altered, and the data in the second accumulation means of the payment means or the charging means must be updated.

In the invention, the transaction means is constituted by a plurality of transaction means that are separately located and are mutually connected via communication lines. Since the processing performed by the transaction means is distributed, the processing efficiency is increased.

In the invention, the plurality of transaction means for areas or for organizations are located separately. Since the processing performed by the transaction means for the areas or for the organizations is distributed, the processing efficiency is increased.

In the invention, information concerning the payment means and the owner thereof is stored in the first accumulation means of the transaction means that has the same attribute as the payment means or the owner thereof; information concerning the charging means and the owner thereof is stored in the second accumulation means of the transaction means that has the same attribute as the charging means or the owner thereof; identification information for all of the payment means that are permitted to communicate with corresponding transaction means is stored in the first accumulation means of all of the transaction means, along with location information that designates a location where at the information concerning the payment means and the owner thereof is stored; and identification information for all of the charging means that are permitted to communicate with corresponding transaction means is stored in the second accumulation means of all of the transaction means, and location information that designates a location where at the information concerning the charging means and the owner thereof is stored. Since each transaction means can efficiently store and manage information concerning the payment means and the owner thereof, and information concerning the charging means and the person in charge thereof, the payment means and the charging means can access such information by communicating with any transaction means.

In the invention, the service providing means is constituted by a plurality of service providing means that are separately located and are mutually connected via communication lines. Since the processing for the service providing means is distributed, the processing efficiency is increased.

In the invention, the plurality of service providing means for areas or for organizations are located separately. Since the processing performed by the service providing means for the areas or for the organizations is distributed, the processing efficiency is increased.

In the invention, information concerning the payment means and the owner thereof is stored in the first accumulation means of the service providing means that has the same attribute as the payment means or the owner thereof; information concerning the charging means and the person in charge thereof is stored in the second accumulation means of the service providing means that has the same attribute as the charging means or the person in charge thereof; identification information for all of the payment means that are permitted to communicate with corresponding service providing means is stored in the first accumulation means of all of the service providing means, along with location information that designates a location where at the information concerning the payment means and the owner thereof is stored; and identification information for all of the charging means that are permitted to communicate with corresponding service providing means is stored in the second accumulation means of all of the service providing means, along with location information that designates a location where at the information concerning the charging means and the person in charge thereof is stored. Since each transaction means can efficiently store and manage information concerning the payment means and the owner thereof, and information concerning the charging means and the person in charge thereof, the payment means and the charging means can access such information by communicating with any service providing means.

In the invention, the attribute is an "organization." The information concerning the charging means and the person in charge thereof, or the payment means and the owner thereof is stored and managed by the transaction means or the service providing means for the organization to which the specified person belongs.

In the invention, the attribute is an "area." The information concerning the charging means and the person in charge thereof, or the payment means and the owner thereof is stored and managed by the transaction means or the service providing means for the area in which the specified person lives.

In the invention, the payment means is connected via a communication line to a second service providing means; a service manager information processing means for the second service providing means, when the second service providing means differs from a first service providing means that stores the information concerning the payment means and the owner thereof, specifies the first service providing means by employing the identification information for the payment means, which is stored in the first accumulation means of the second service providing means, and the location information, which designates a location at which is stored the information for the payment means and the owner thereof, and requests that a service manager information processing means for the first service providing means generate a home user information processing means that corresponds to the payment means; the second service providing means generates a mobile user information processing means that corresponds to the payment means when the first service providing means generates the home user information processing means; and the mobile user information processing means and the home user information means interact to communicate with the payment means and to process information concerning the payment means and the owner thereof. Therefore, since the payment means can access information concerning the payment means and the owner thereof by communicating with any service providing service via a communication line, the settlement processing can be efficiently performed.

In the invention, the payment means is connected to a user information processing means of the second service providing means via a communication line and requests cancellation of a payment process; a service manager information processing means for the second service providing means, when the second service providing means differs from the first service providing means that stores information concerning the charging means that is associated with the payment and the person in charge of the charging means, specifies the first service providing means by employing the identification information, for the charging means, that is stored in the second accumulation means of the second service providing means, along with the location information that designates a location at which is stored the information for the charging means and the person in charge thereof, and transmits, to the service manager information processing means of the first service providing means, a message received from the user information processing means requesting cancellation of the payment; and the service manager information processing means of the first service providing means compares a message received from a merchant information processing means of the first service providing means with a message received from the service information processing means of the second service providing means requesting a cancellation process be performed for the payment, and generates a service director information processing means for the first service providing means in order to define an information processing means group that is composed of the service director information processing means, the merchant information processing means, and the user information processing means of the second service providing means. The payment means, in addition to when it is connected via a communication line to a service providing means that stores information concerning the charging means and the person in charge thereof, can perform a cancellation process for the payment by communicating with any service providing means. Therefore, electronic settling performed while traveling can be canceled later when at home.

In the invention, the charging means transmits a "message requesting communication be established with the payment means" to the merchant information processing means of the second service providing means; the service manager information processing means, of the second service providing means, that received the "message requesting communication be established with the payment means" from the merchant information processing means, when the second service providing means differs from the first service providing means for storing the information concerning the payment means and the possessor thereof, generates a service director information processing means for the second service providing means, and defines an information processing means group that is composed of the merchant information processing means and the service director information processing means; the service director information processing means specifies which payment means the request applies to, and an owner thereof, and transmits a request to the service manager information processing means to add to the group a user information processing means that corresponds to the specified payment means; the service manager information processing means, upon receiving the request, specifies the first service providing means by employing the identification information, for the payment means, that is stored in the first accumulation means of the second service providing means, along with the location information that designates a location at which is stored the information for the payment means and the possessor thereof, and requests that the service manager information processing means of the first service providing means generate a user information processing means that corresponds to the payment means; and the user information means is added to the information processing means group when the user information processing means that corresponds to the payment means is generated for the first service providing means. Thus, the charging means can communicate with a payment means that is controlled by another service providing means.

In the invention, the payment means transmits "message requesting communication be established with the charging means" to the user information processing means of the second service providing means; the service manager information processing means, of the second service providing means, that received the "message requesting communication be established with the charging means" from the user information processing means, when the second service providing means differs from the first service providing means for storing the information concerning the charging means and the person in charge thereof, specifies the first service providing means by employing the identification information, for the charging means, that is stored in the second accumulation means of the second service providing means, along with the location information that designates a location at which is stored the information for the charging means and the person in charge thereof, and transmits the "message requesting communication be established with the charging means" that was received from the user information processing means; the service manager information processing means of the first service providing means, upon receiving the message, generates a service director information processing means for the first service providing means, and defines an information processing means group that is composed of the service director information processing means and the user information processing means of the second service providing means; the service manager information processing means transmits a request that the service manager information processing means of the first service providing means add to the group a merchant information processing means that corresponds to the requested charging means; and the merchant information means is added to the information processing means group when following the receipt of the request the merchant information processing means that corresponds to the charging means is generated for the first service providing means. The payment means, in addition to when it is connected via the communication line to the service providing means that stores information concerning the payment means and the owner thereof, can communicate with a charging means by being connected via a communication line to any service providing means.

In the invention, a ferroelectric memory is provided as an accumulation means for the payment means. And the service life of a battery in the payment means can be extended.

In the invention, the control program for the central processing unit of the payment according to an embodiment is recorded on a recording medium, and in a readable form, by a computer. As a result, the program can be distributed in a portable form.

In the invention, the control program for the central processing unit of the charging means according to an embodiment is recorded on a recording medium, and in a readable form, by a computer. As a result, the program can be distributed in a portable form.

In the invention, the processing program for the computer system for the transaction means according to an embodiment is recorded on a recording medium, and in a readable form, by a computer. As a result, the program can be distributed in a portable form.

In the invention, the processing program for the computer system for the service providing means according to an embodiment is recorded on a recording medium, and in a readable form, by a computer. As a result, the program can be distributed in a portable form.

In the invention, the processing program for the computer system for the clearing means according to an embodiment is recorded on a recording medium, and in a readable form, by a computer. As a result, the program can be distributed in a portable form.

BRIEF DESCRIPTION OF THE DRAWINGS

FIG. 18B is a diagram showing a bit field in an INT register for the personal credit terminal according to the first embodiment of the present invention;

FIG. 18C is a diagram showing a bit field for a variable “interrupt” in the RAM of the personal credit terminal according to the first embodiment of the present invention;

FIG. 27B is a diagram showing a bit field in an INT register in the credit settlement terminal according to the first embodiment of the present invention;

FIG. 27C is a diagram showing a bit field for a variable “interrupt” in the RAM of the credit settlement terminal according to the first embodiment of the present invention;

FIG. 36D is a specific diagram showing the data structure for a payment request according to the first embodiment of the present invention;

FIG. 36E is a specific diagram showing the structure of a response to an authorization request according to the first embodiment of the present invention;

FIG. 36F is a specific diagram showing the data structure for a settlement or clearing request that is transmitted by the credit settlement terminal to the service providing system according to the first embodiment of the present invention;

FIG. 47A is a diagram showing a bit field in an INT register for the personal credit terminal according to the second embodiment of the present invention;

FIG. 47B is a diagram showing a bit field of a variable "interrupt" in the RAM of the personal credit terminal according to the second embodiment of the present invention;

FIG. 50A is a diagram showing a process list for the CPU of the personal credit terminal according to the second embodiment of the present invention;

FIG. 57A is a diagram showing a bit field in an INT register for the credit settlement terminal according to the second embodiment of the present invention;

FIG. 57B is a diagram showing a bit field of a variable "interrupt" in the RAM of the credit settlement terminal according to the second embodiment of the present invention;

FIG. 60A is a diagram showing a process list for the CPU of the credit settlement terminal according to the second embodiment of the present invention;

FIGS. 60A-1, 2 and 3 show descriptions of processes performed in a main CPU routine for processing data to be transmitted and data which are received, and for controlling components of the invention;

FIG. 64B is a diagram for explaining the digital signature processing according to the second embodiment of the present invention;

FIG. 65A is a flowchart showing message closing processing according to the second embodiment of the present invention;

FIG. 65B is a diagram for explaining the message closing processing according to the second embodiment of the present invention;

FIG. 66A is a flowchart showing closed message decryption processing according to the second embodiment of the present invention;

FIG. 66B is a diagram for explaining the closed message decryption processing according to the second embodiment of the present invention;

FIG. 67A is a flowchart showing digital signature verification processing according to the second embodiment of the present invention;

FIG. 67B is a diagram for explaining the digital signature verification processing according to the second embodiment of the present invention;

FIG. 68 is a diagram for explaining the processing architecture of a service providing system according to the second embodiment of the present invention;

FIGS. 69, 69A and 69B are diagrams showing a process list for the service providing system according to the second embodiment of the present invention;

FIGS. 70, 70A and 70B are diagrams showing a process list (continued) for the service providing system according to the second embodiment of the present invention;

FIG. 71 is a specific diagram showing data that are stored for each user in a user information server in the service providing system according to the second embodiment of the present invention;

FIG. 72 is a specific diagram showing data that are stored for each merchant in a merchant information server in the service providing system according to the second embodiment of the present invention;

Figure 73:
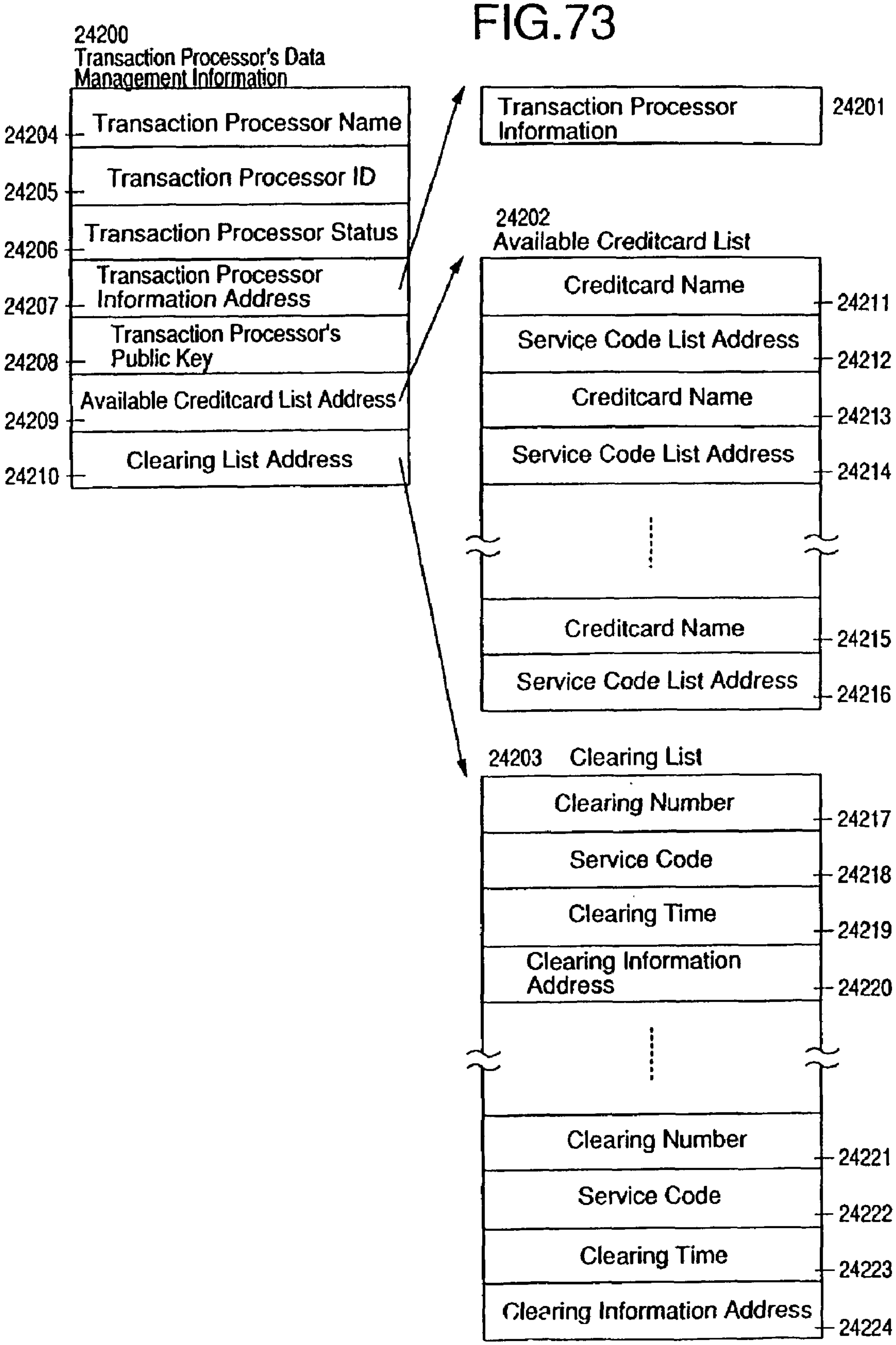
Figure 74:
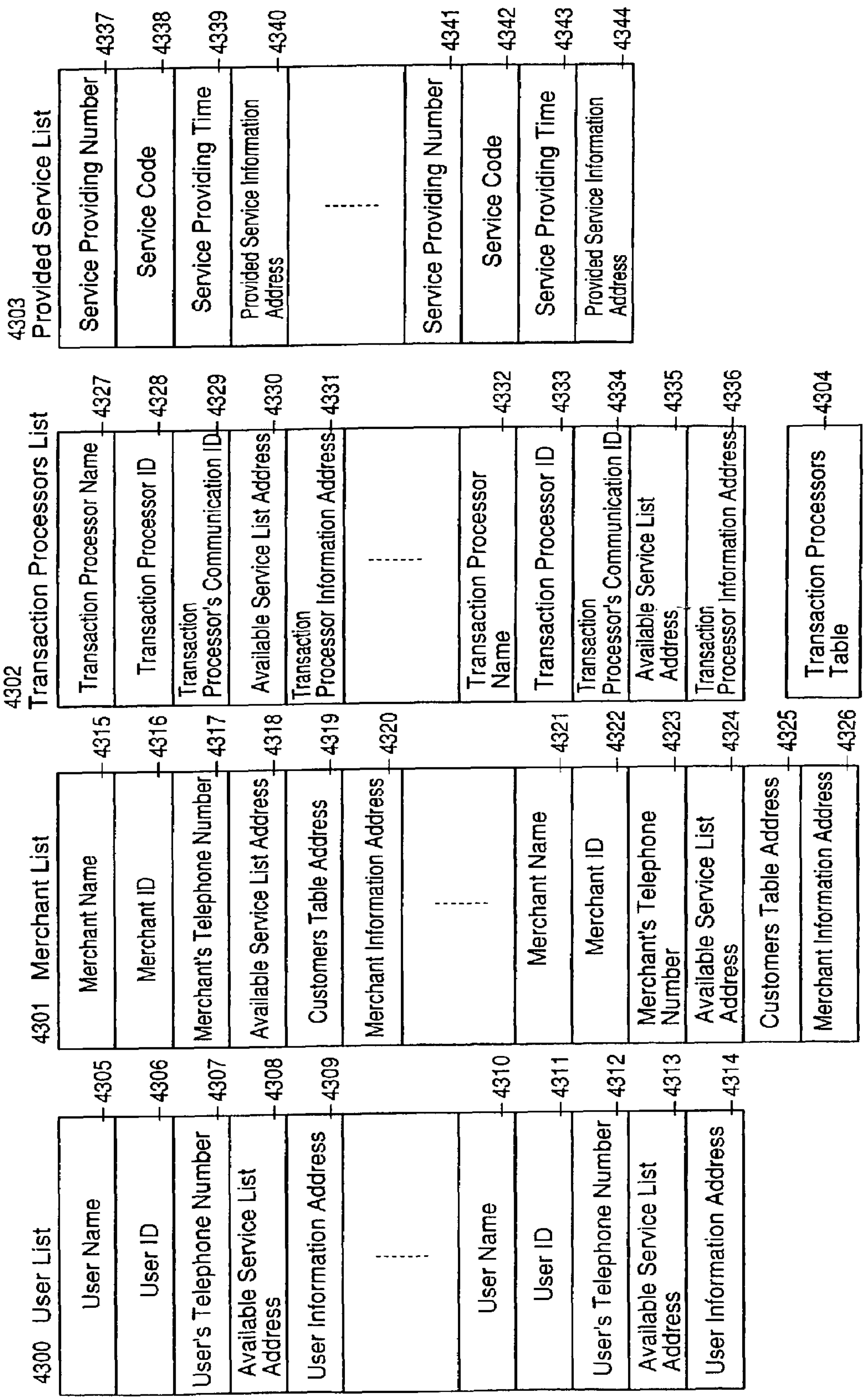
Figure 75A:
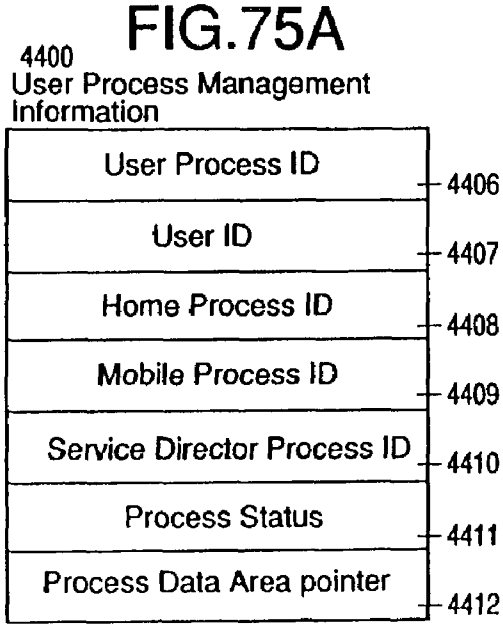
Figure 75B:
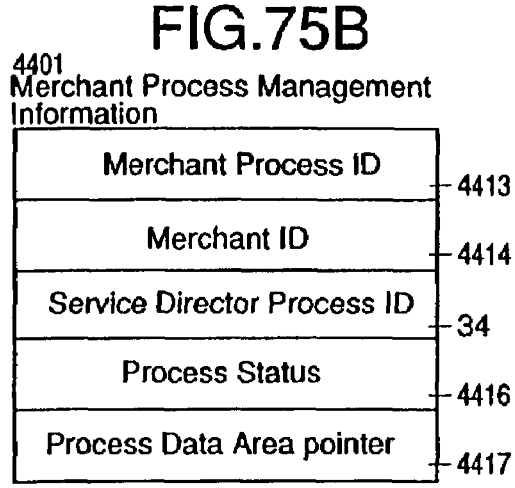
Figure 75C:
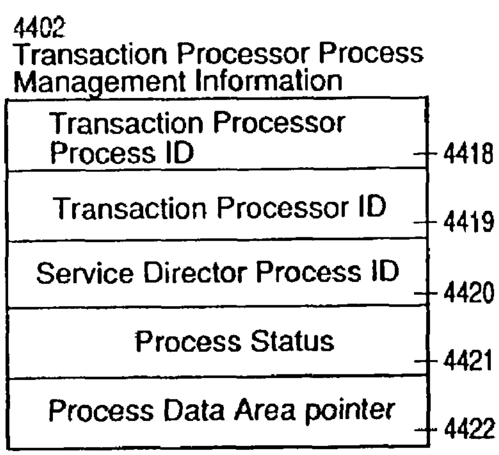
Figure 75D:
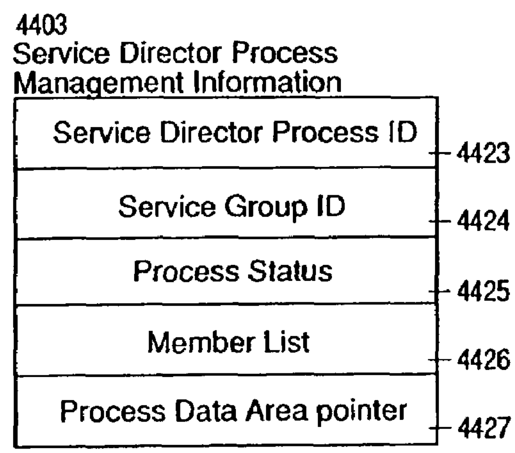
Figure 75E:
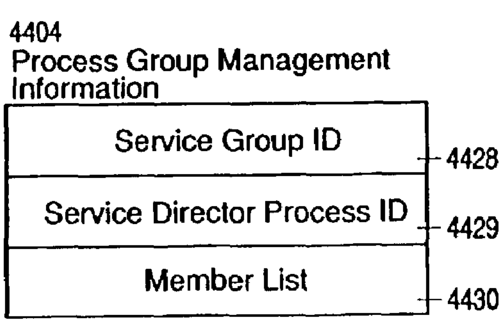
Figure 75F:
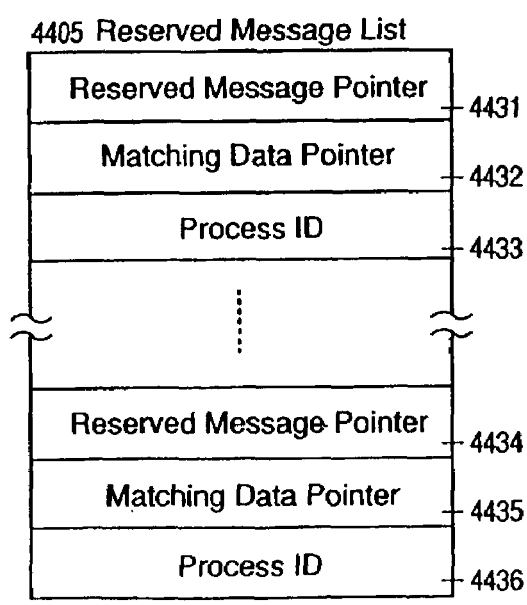
Figure 76:
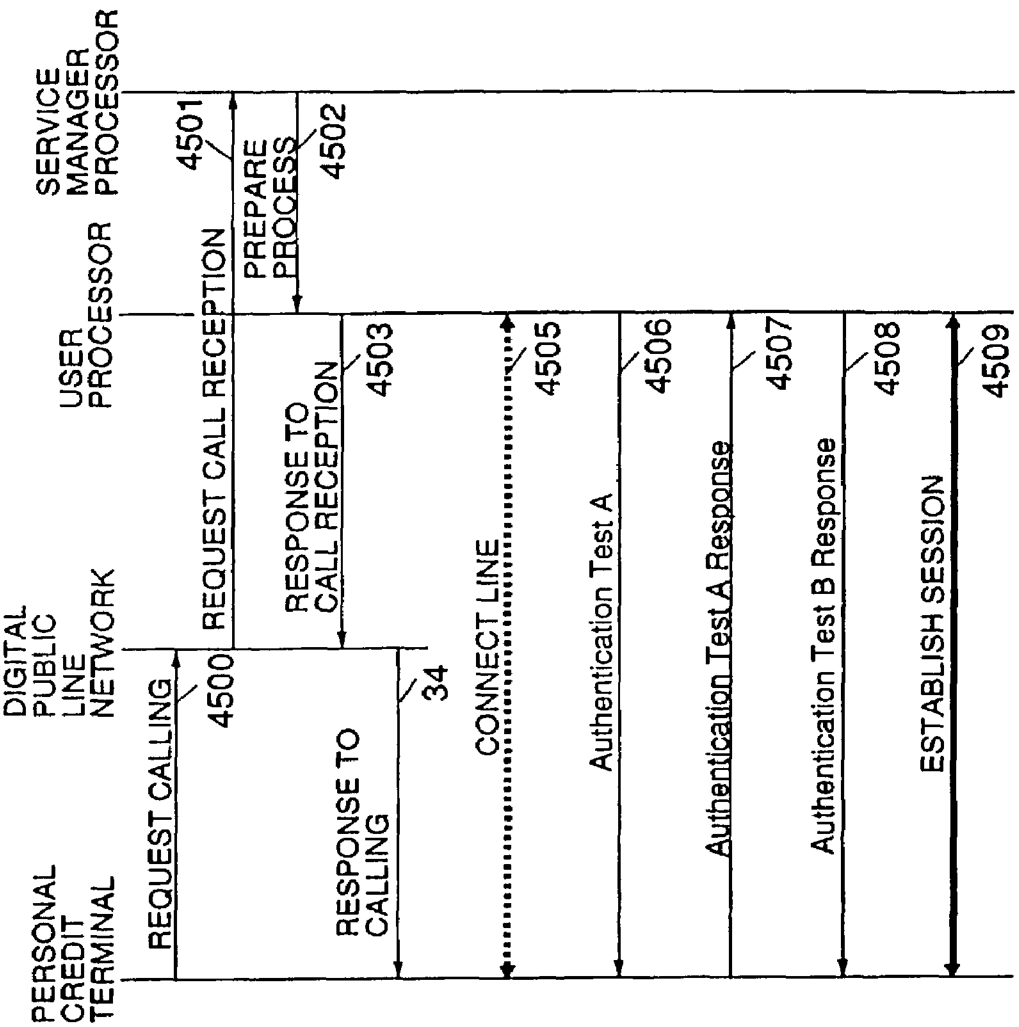
Figure 77:
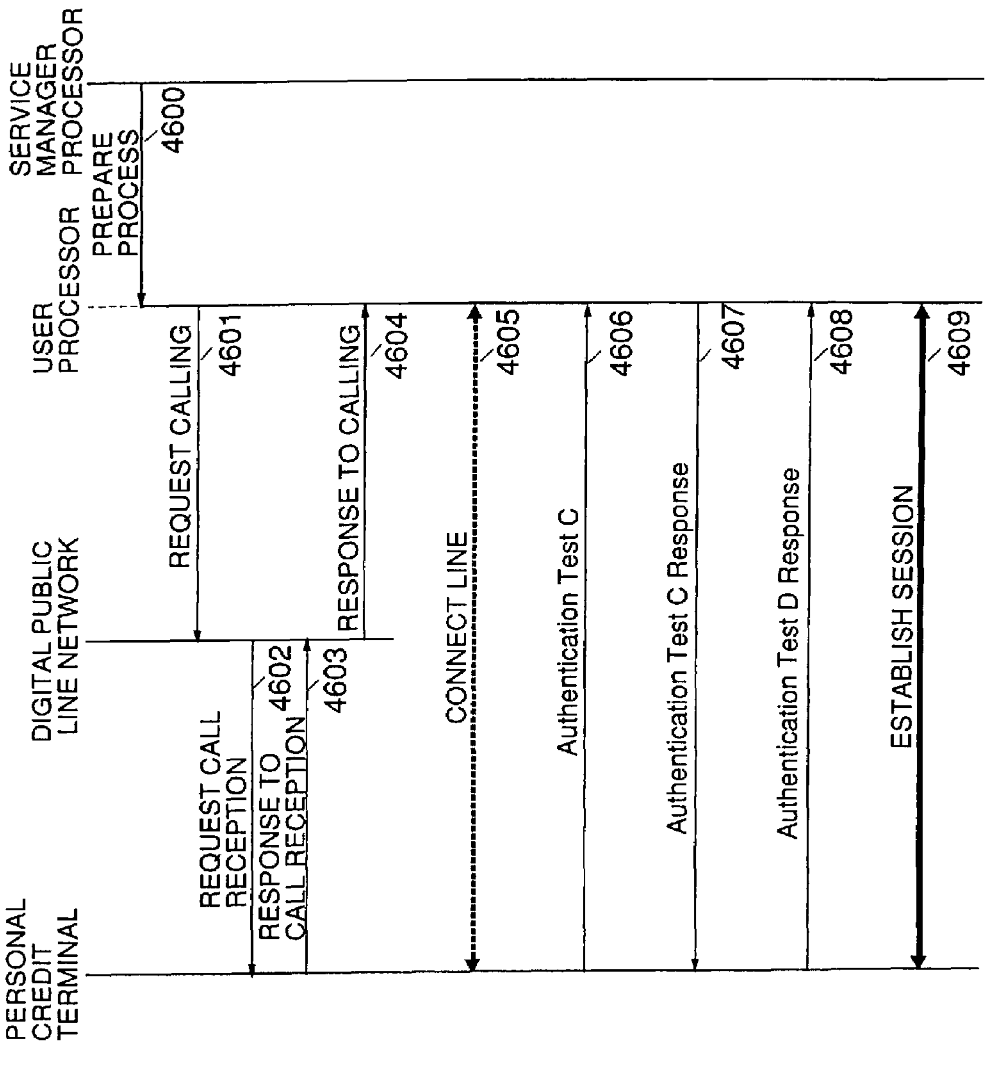
Figure 78A:
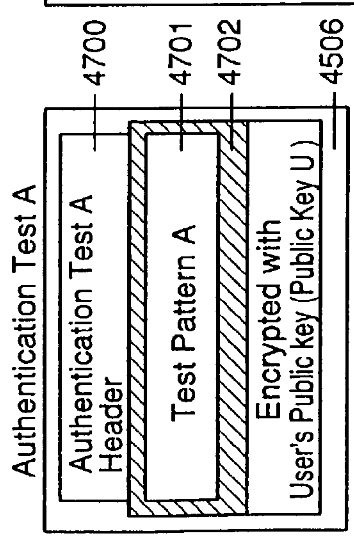
Figure 78B:
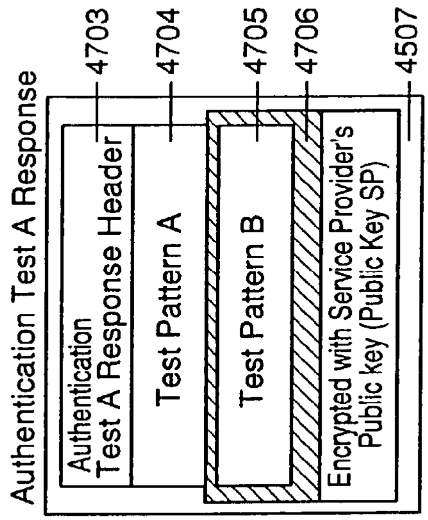
Figure 78C:
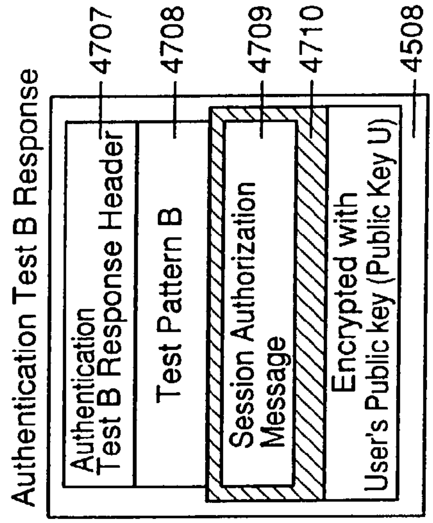
Figure 78D:
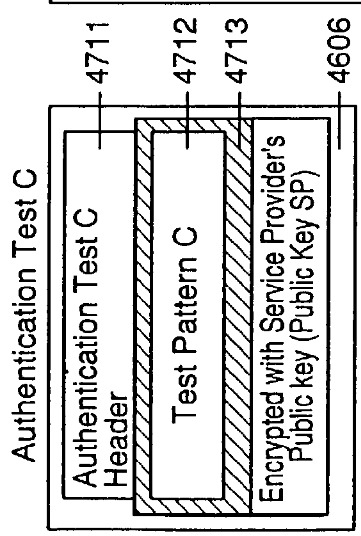
Figure 78E:
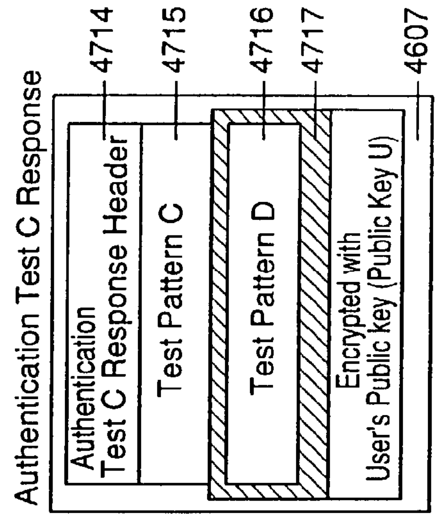
Figure 78F:
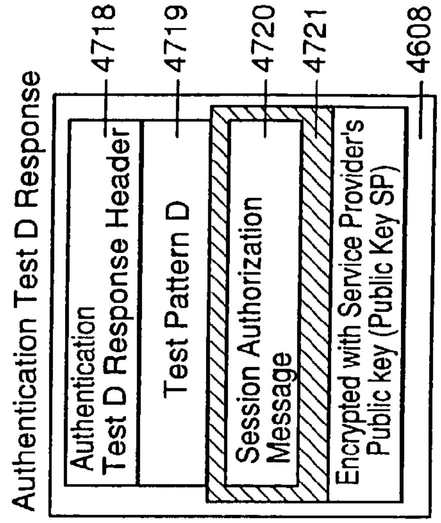
Figure 79:
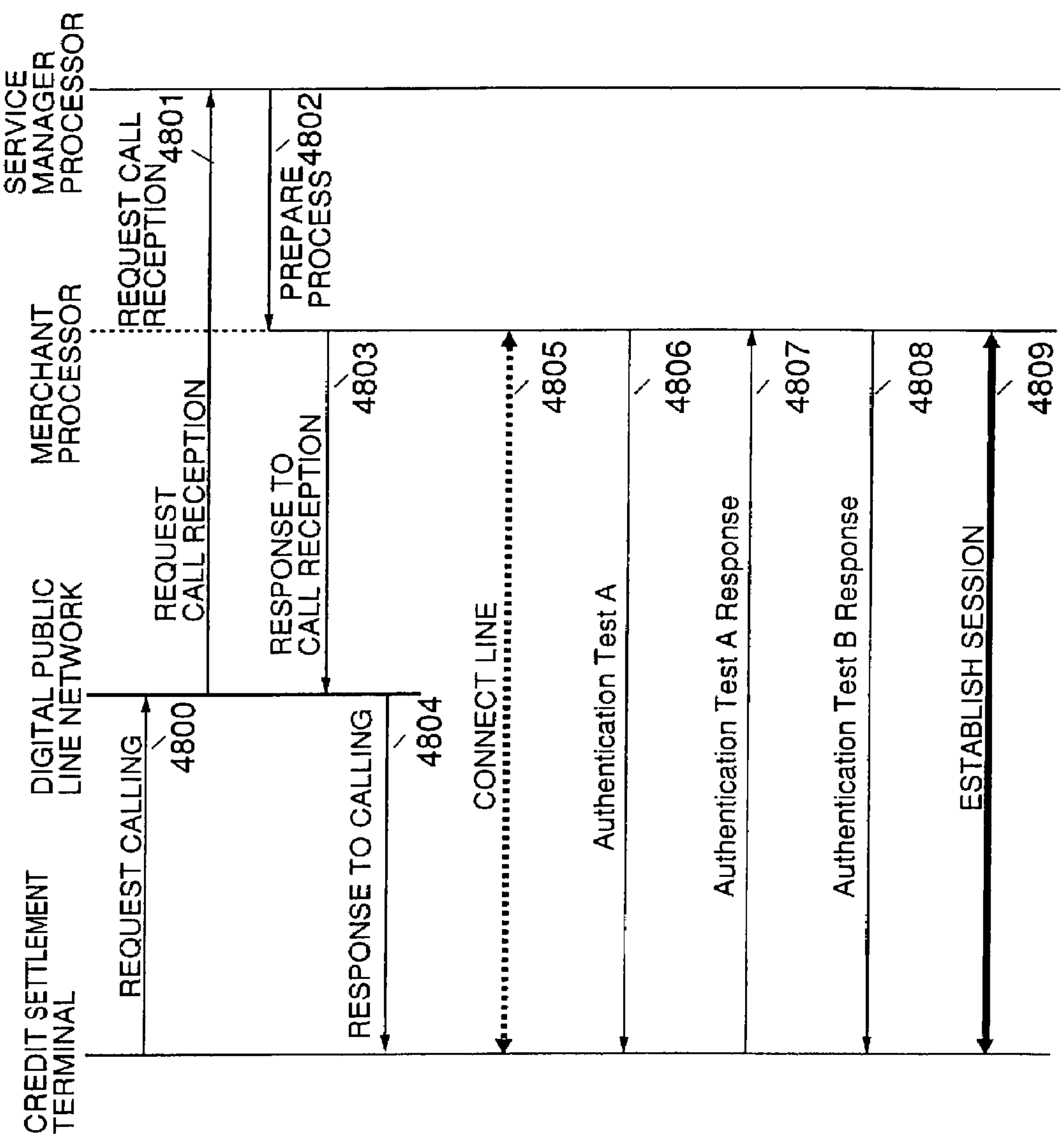
Figure 80:
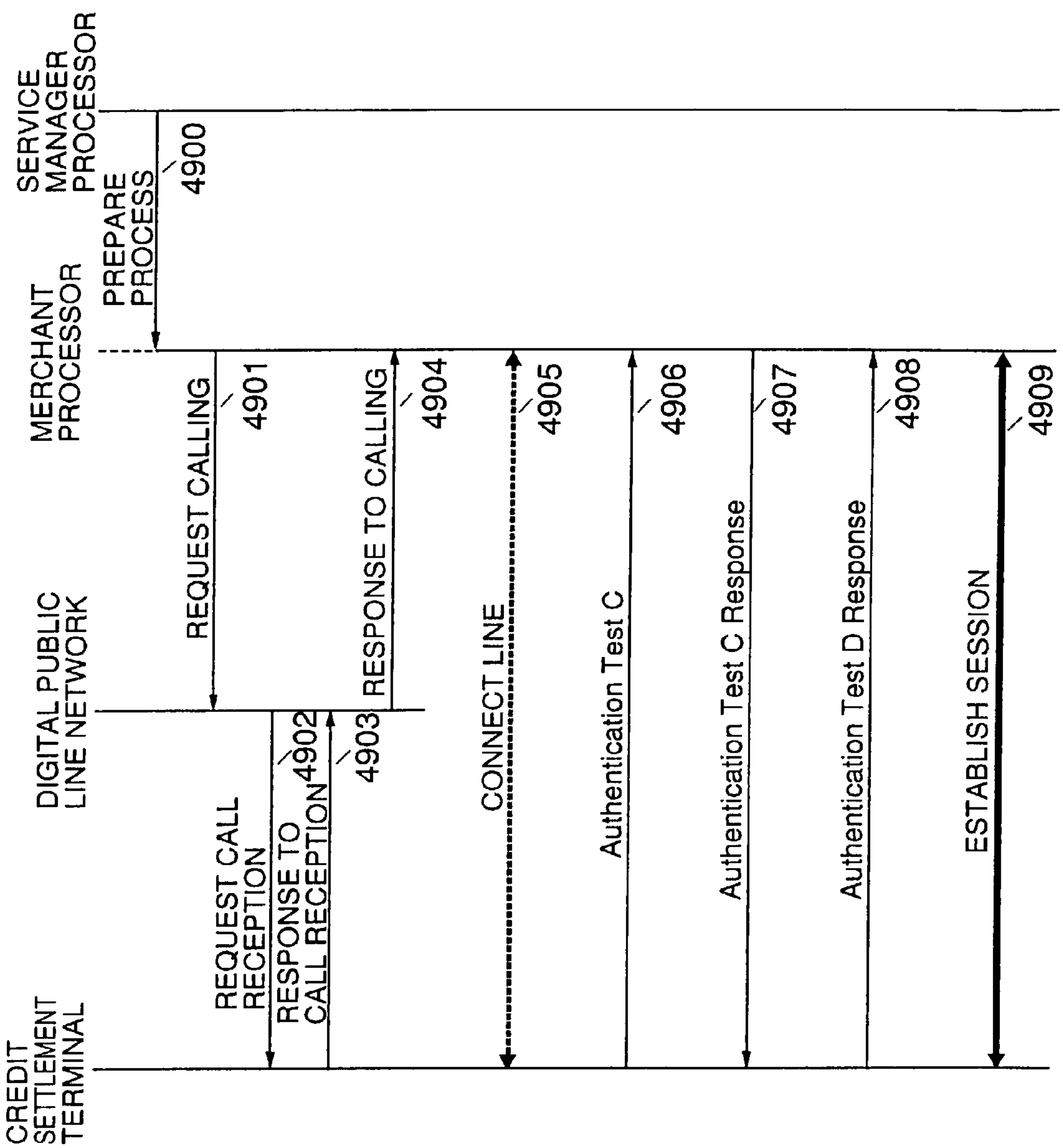
Figure 81A:
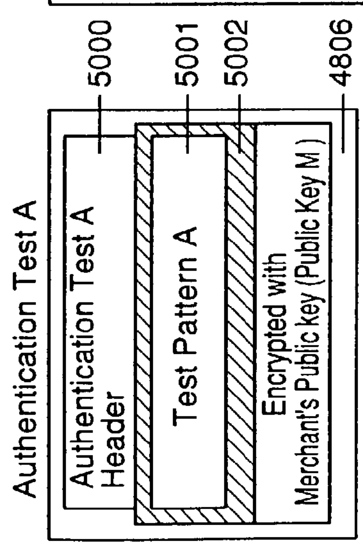
Figure 81B:
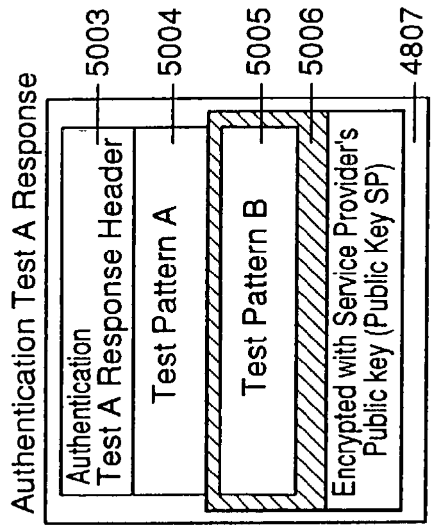
Figure 81C:
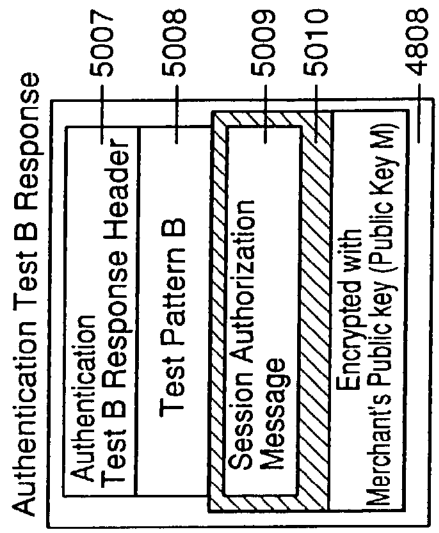
Figure 81D:
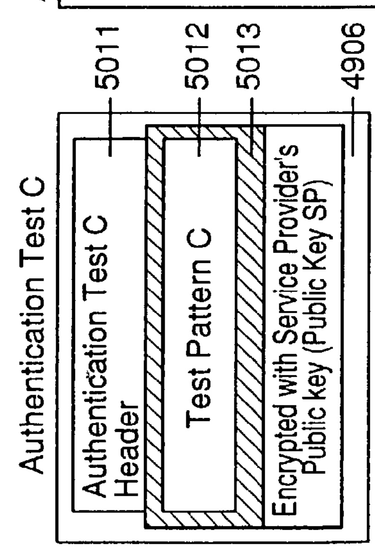
Figure 81E:
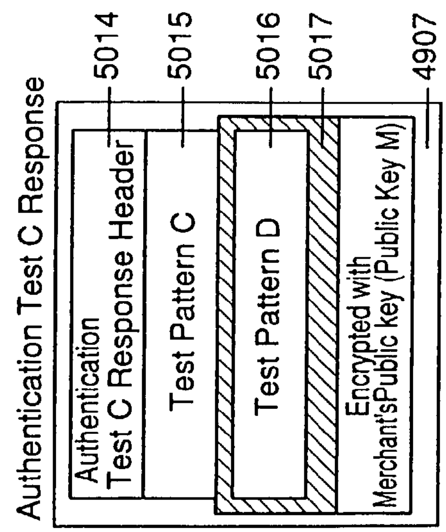
Figure 81F:
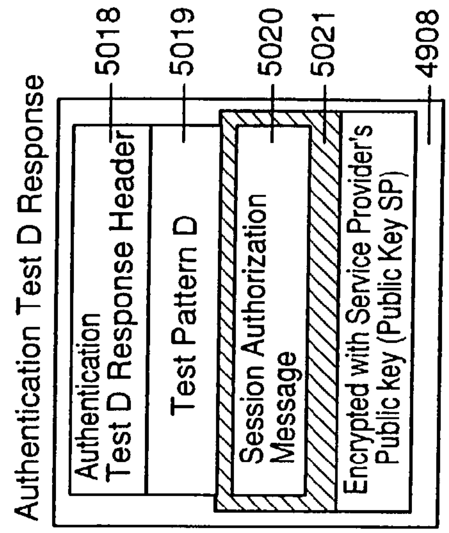
Figure 82B:
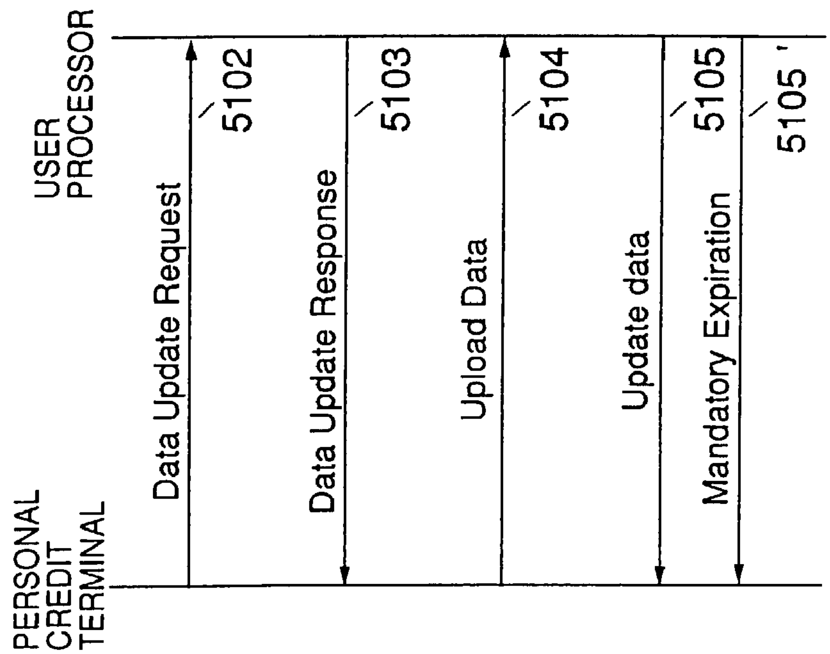
Figure 82A:
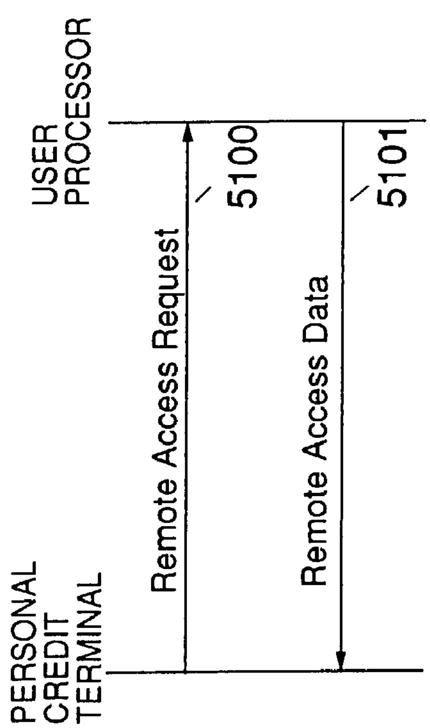
Figure 82C:
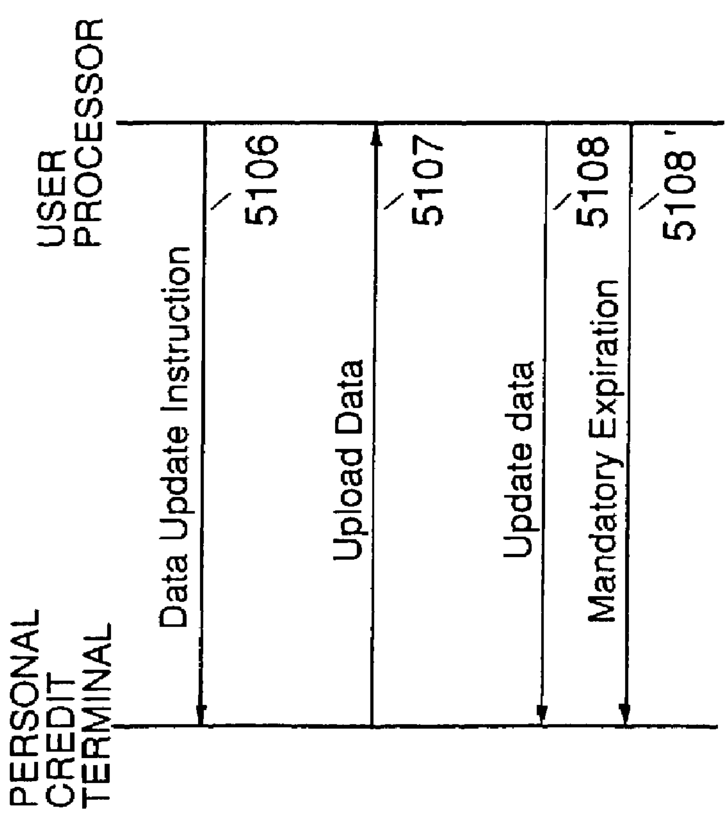
Figure 82D:
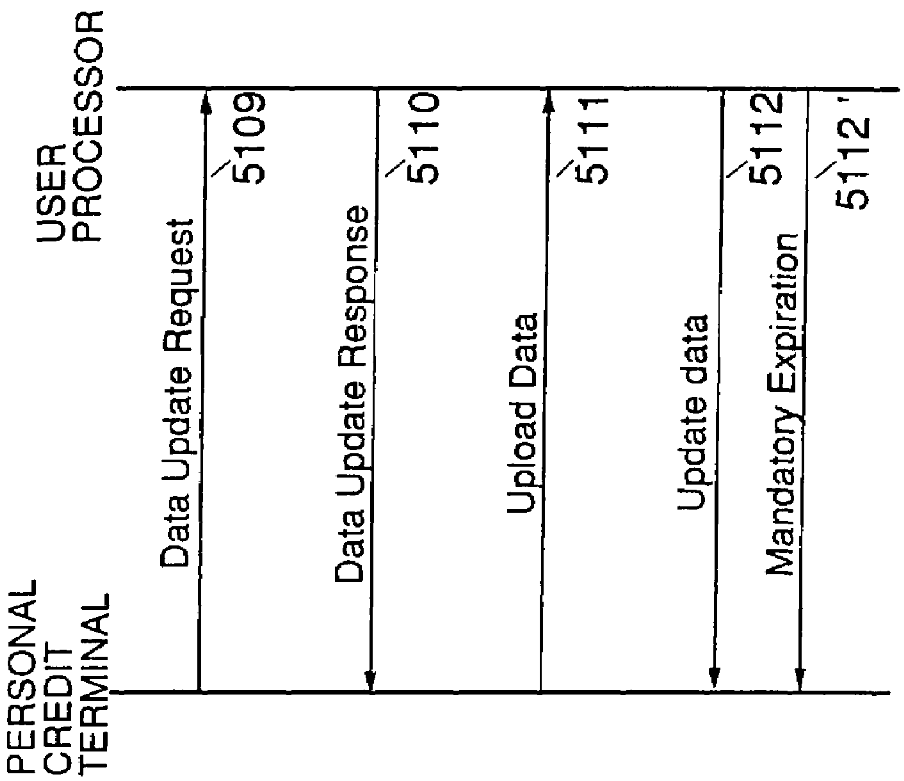
Figures 83A, 83B, 83C:
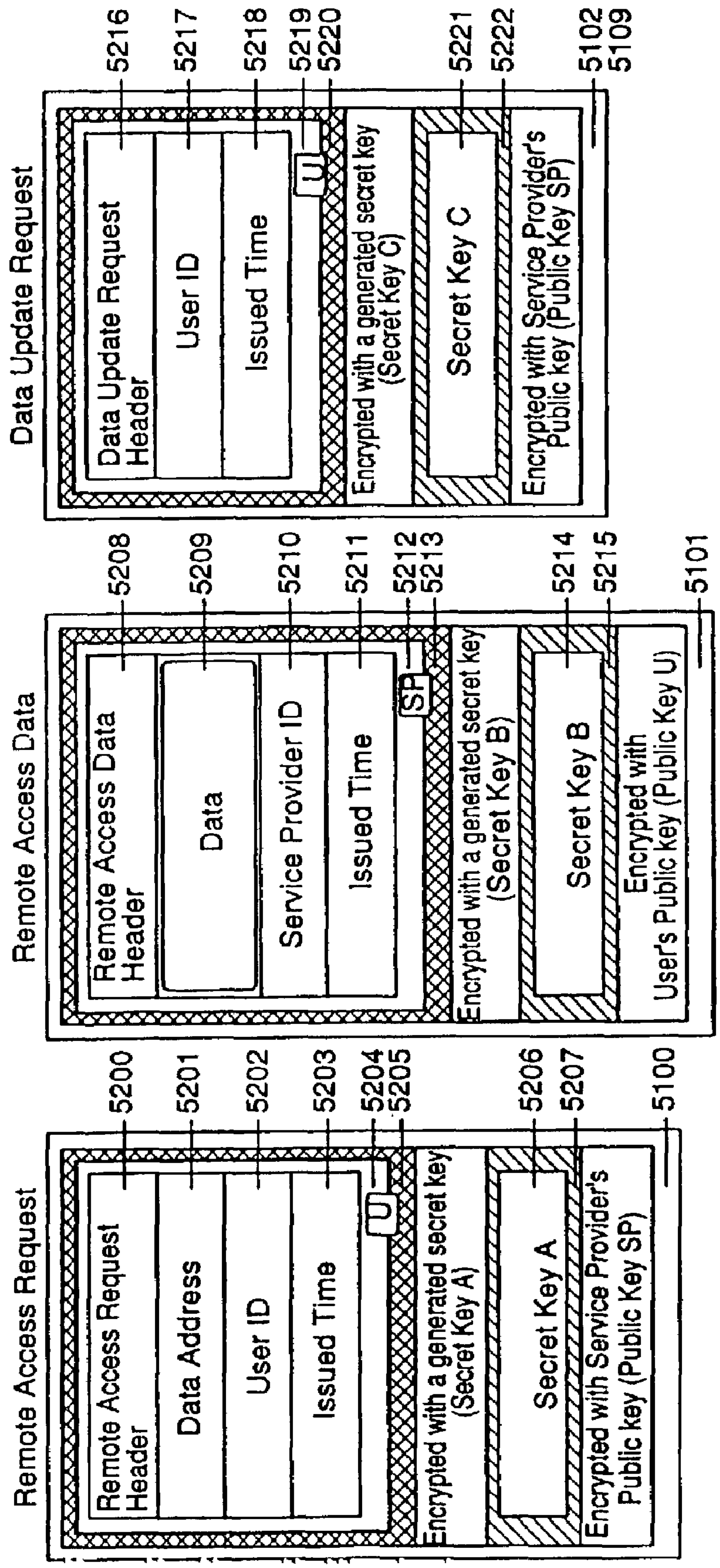
Figure 83D:
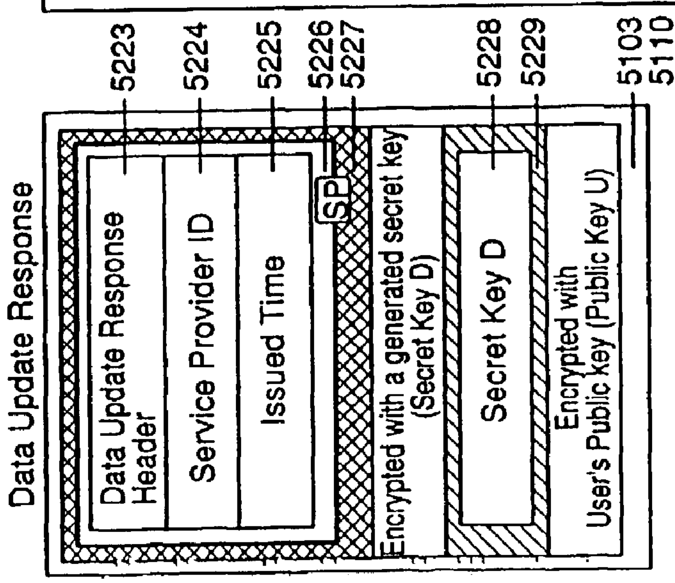
Figure 83E:
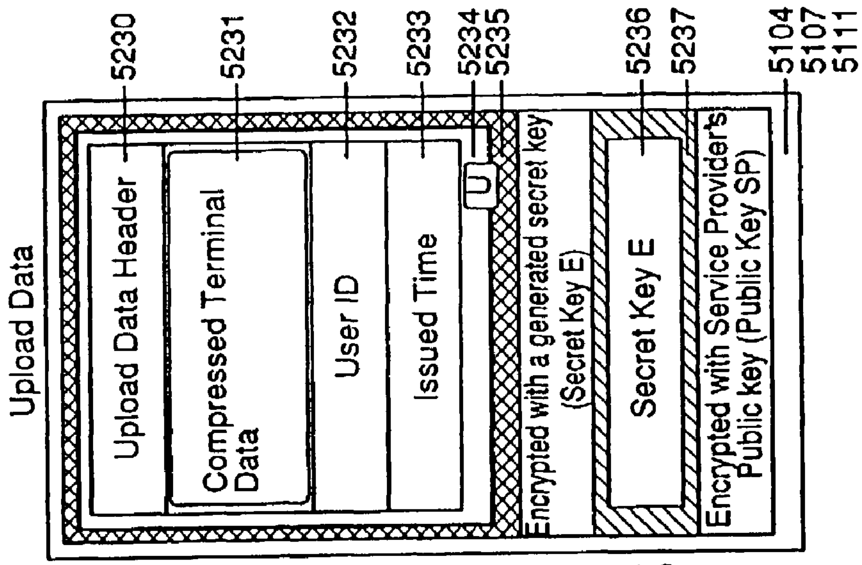
Figure 83F:
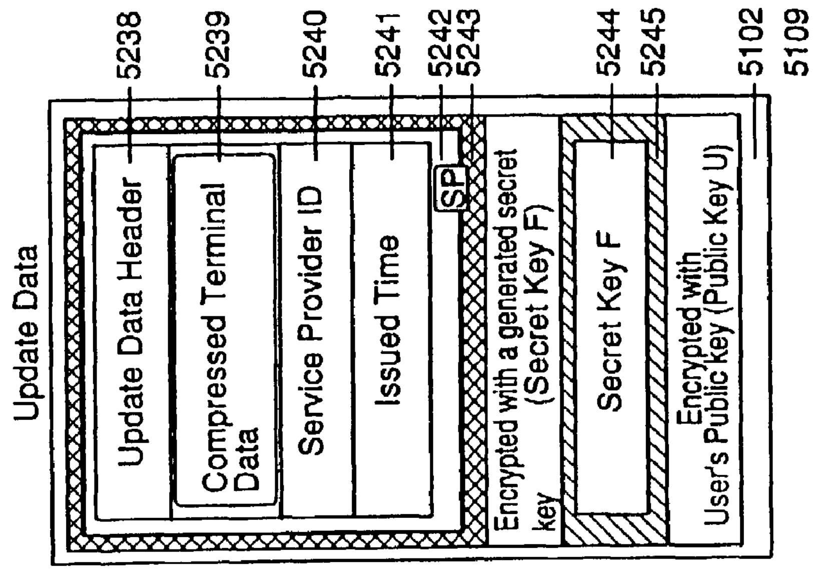
Figure 84A:
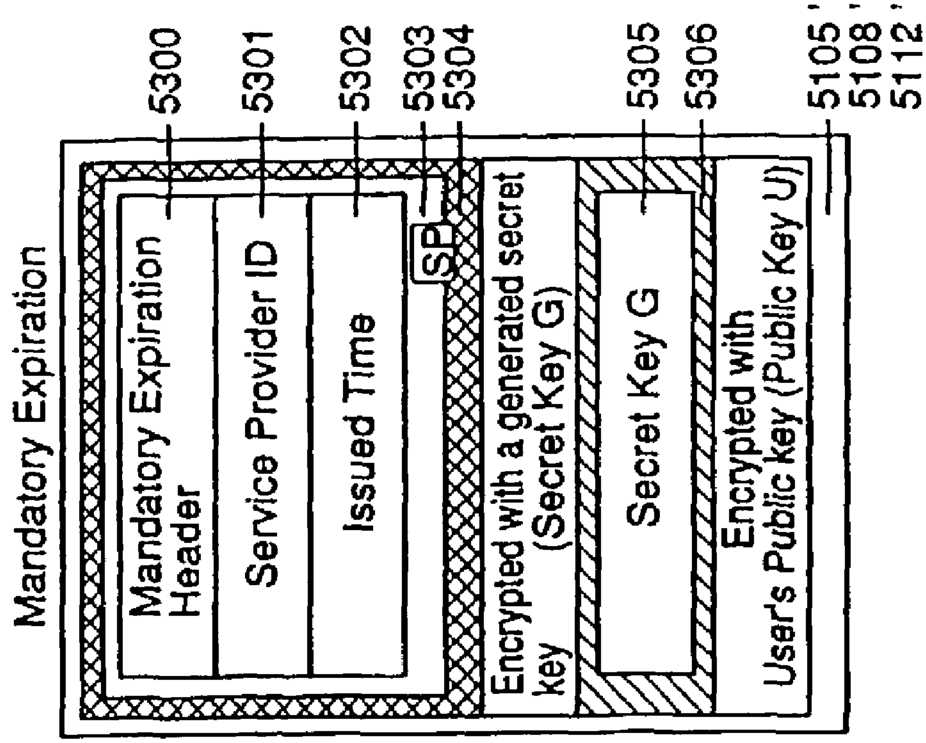
Figure 84B:
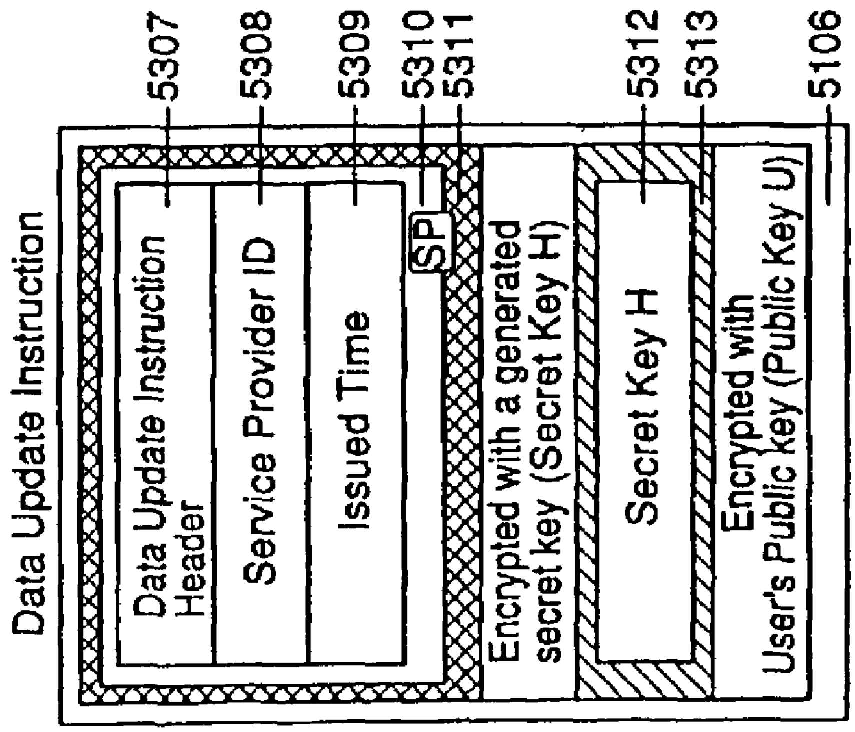
Figure 85B:
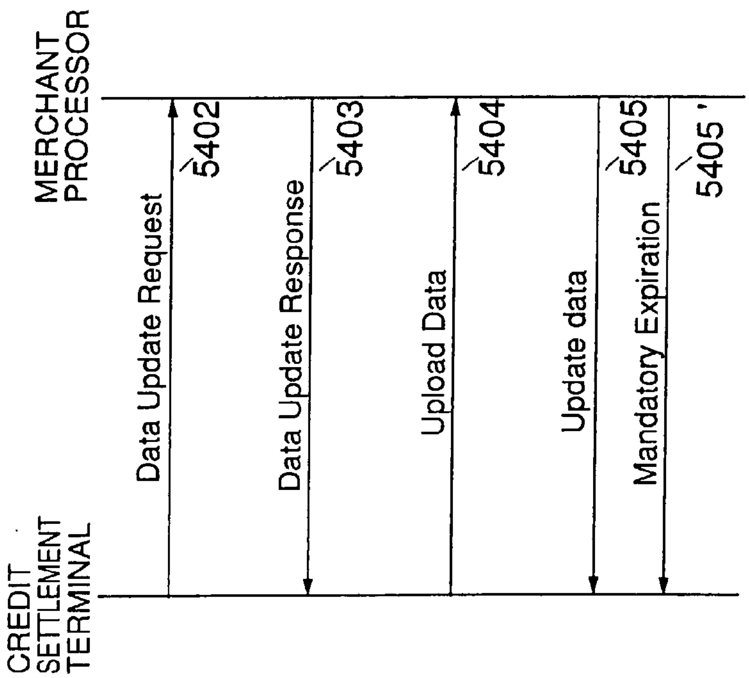
Figure 85A:
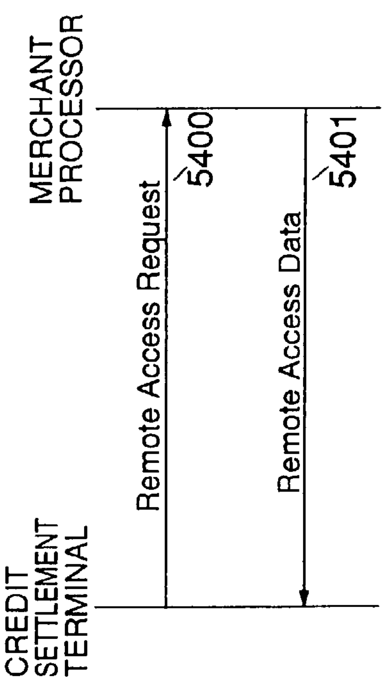
Figure 85C:
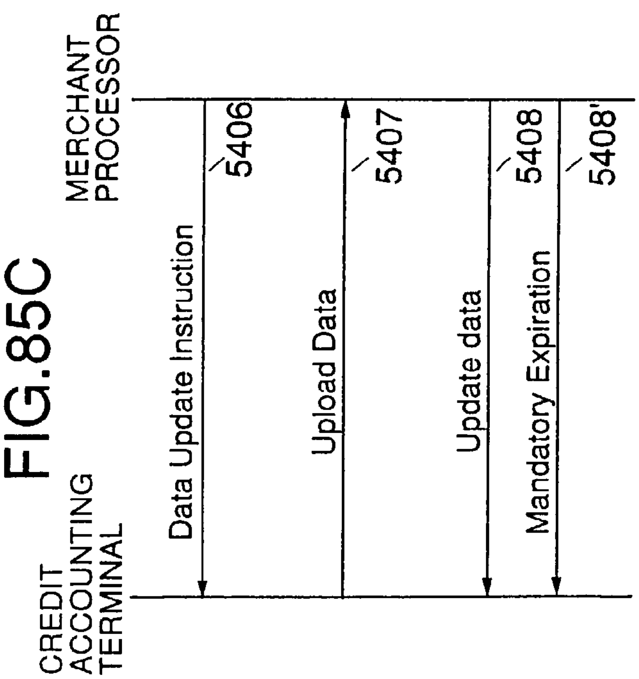
Figure 86F:
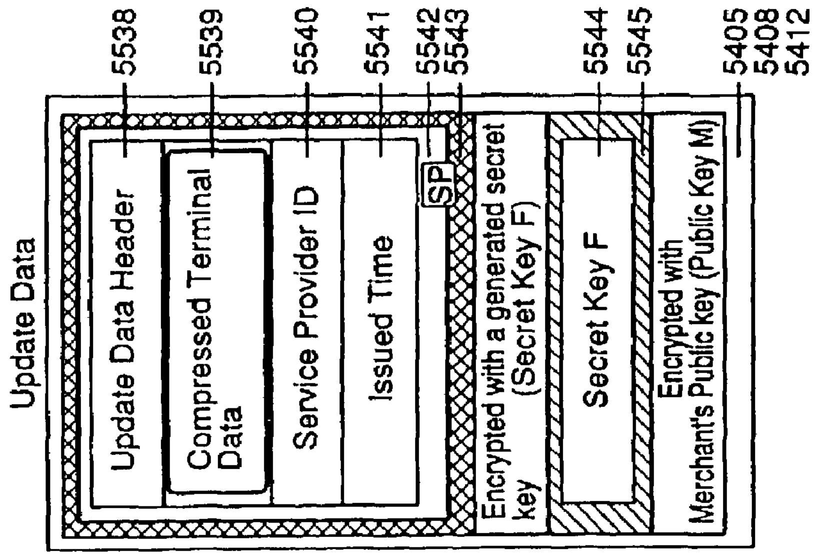
Figure 86E:
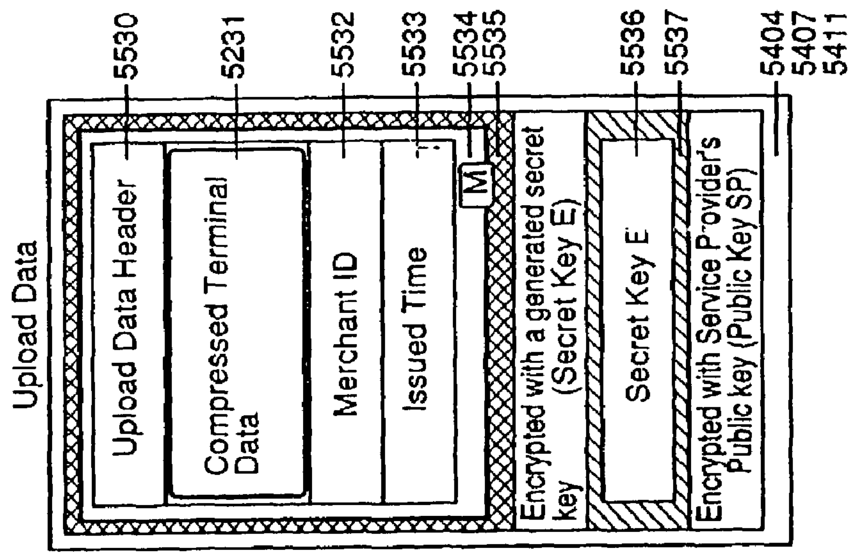
Figure 86D:
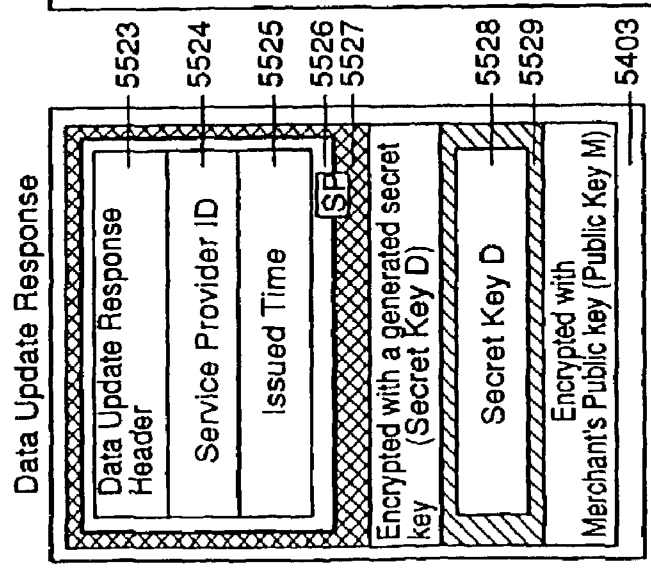
Figure 87B:
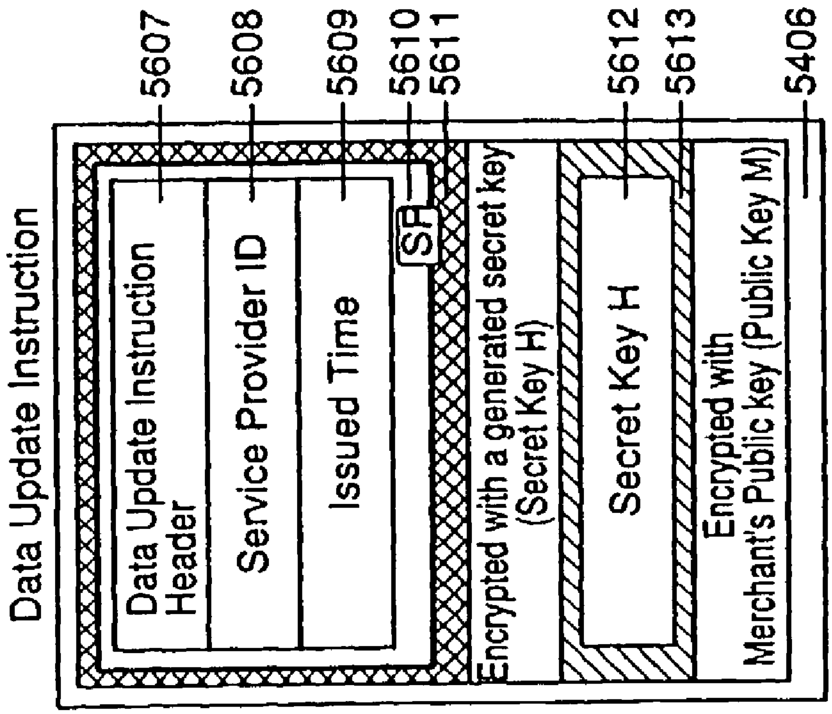
Figure 87A:
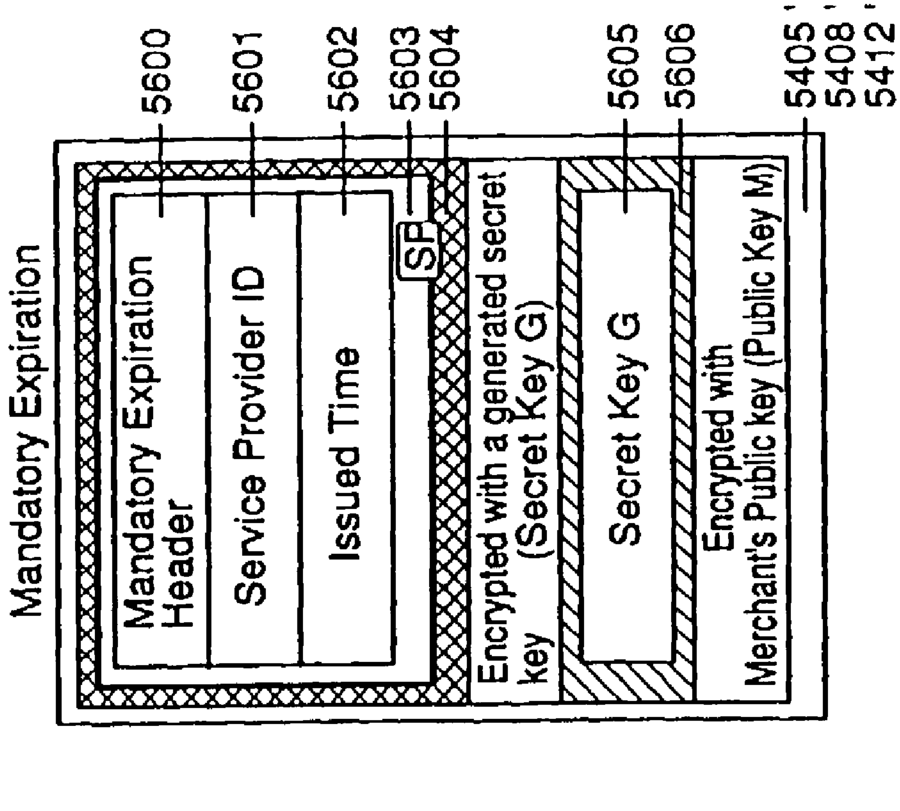
Figure 88:
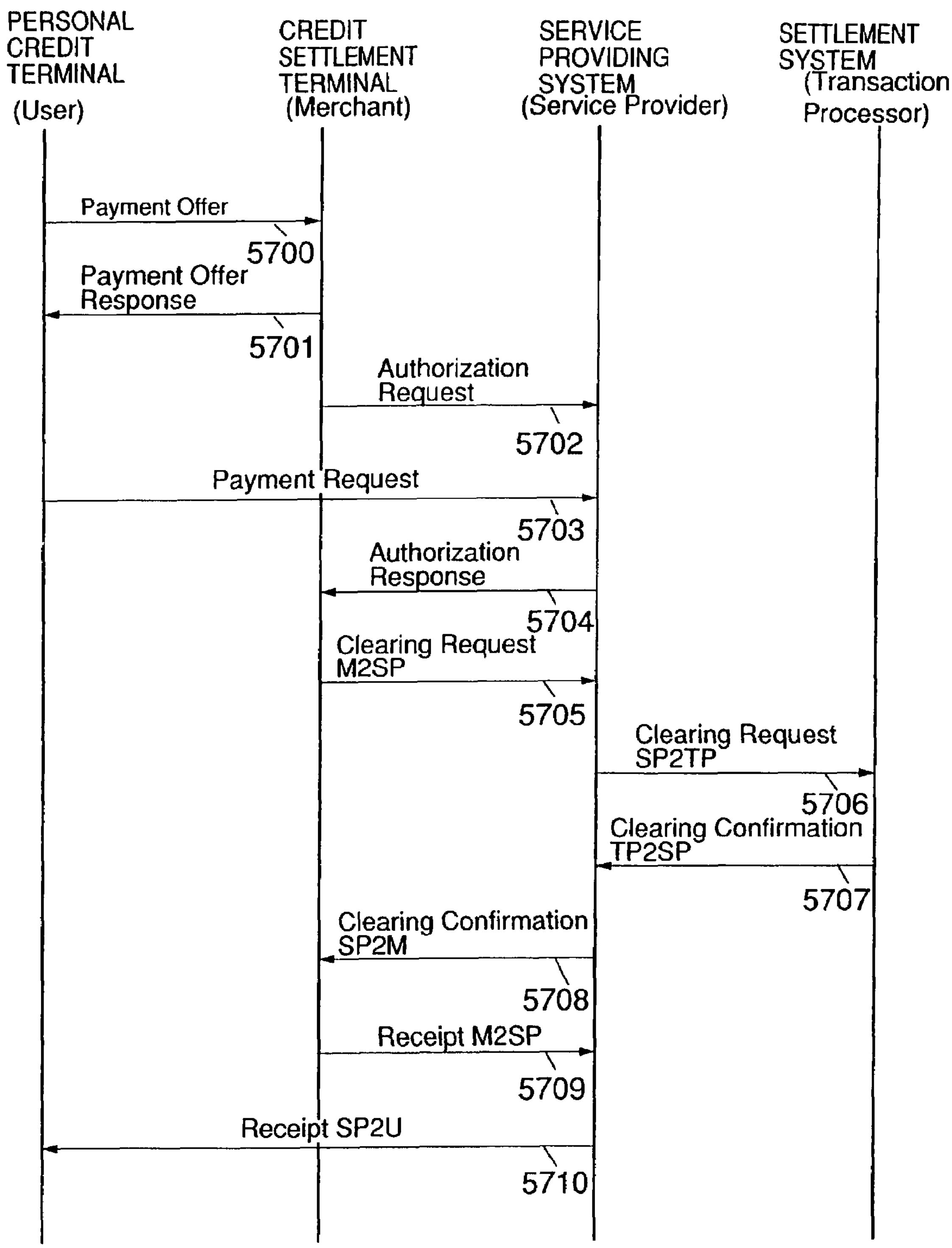
Figure 89A:
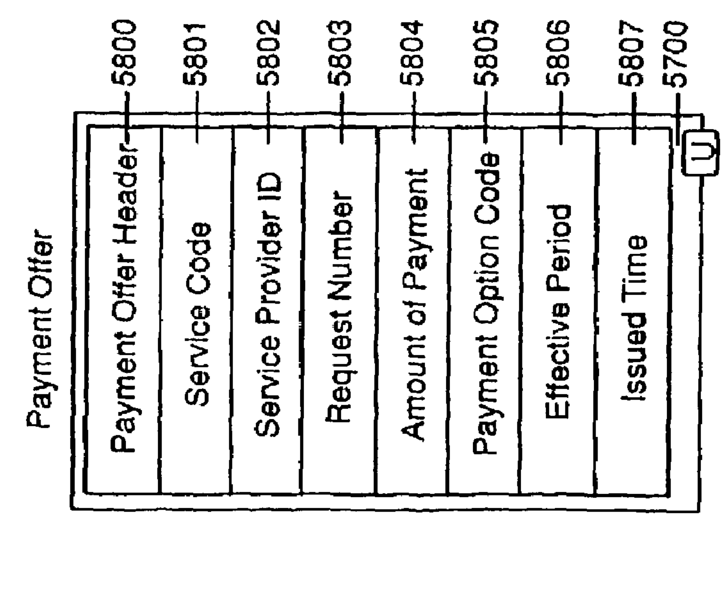
Figure 89B:
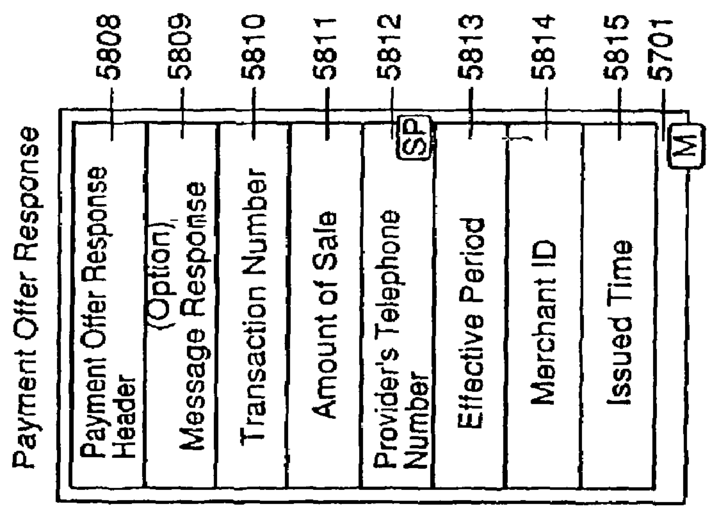
Figure 89C:
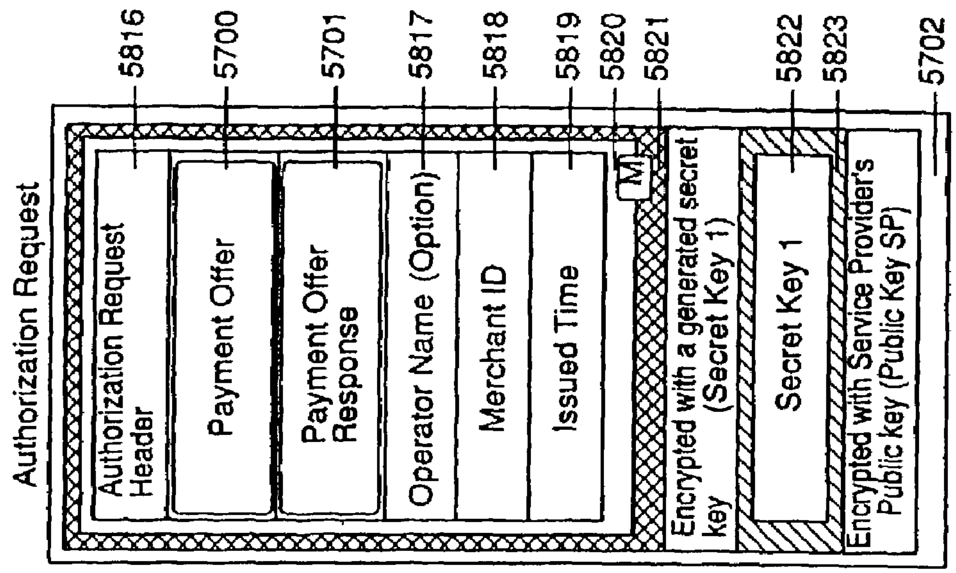
Figures 89D, 89E, 89F:
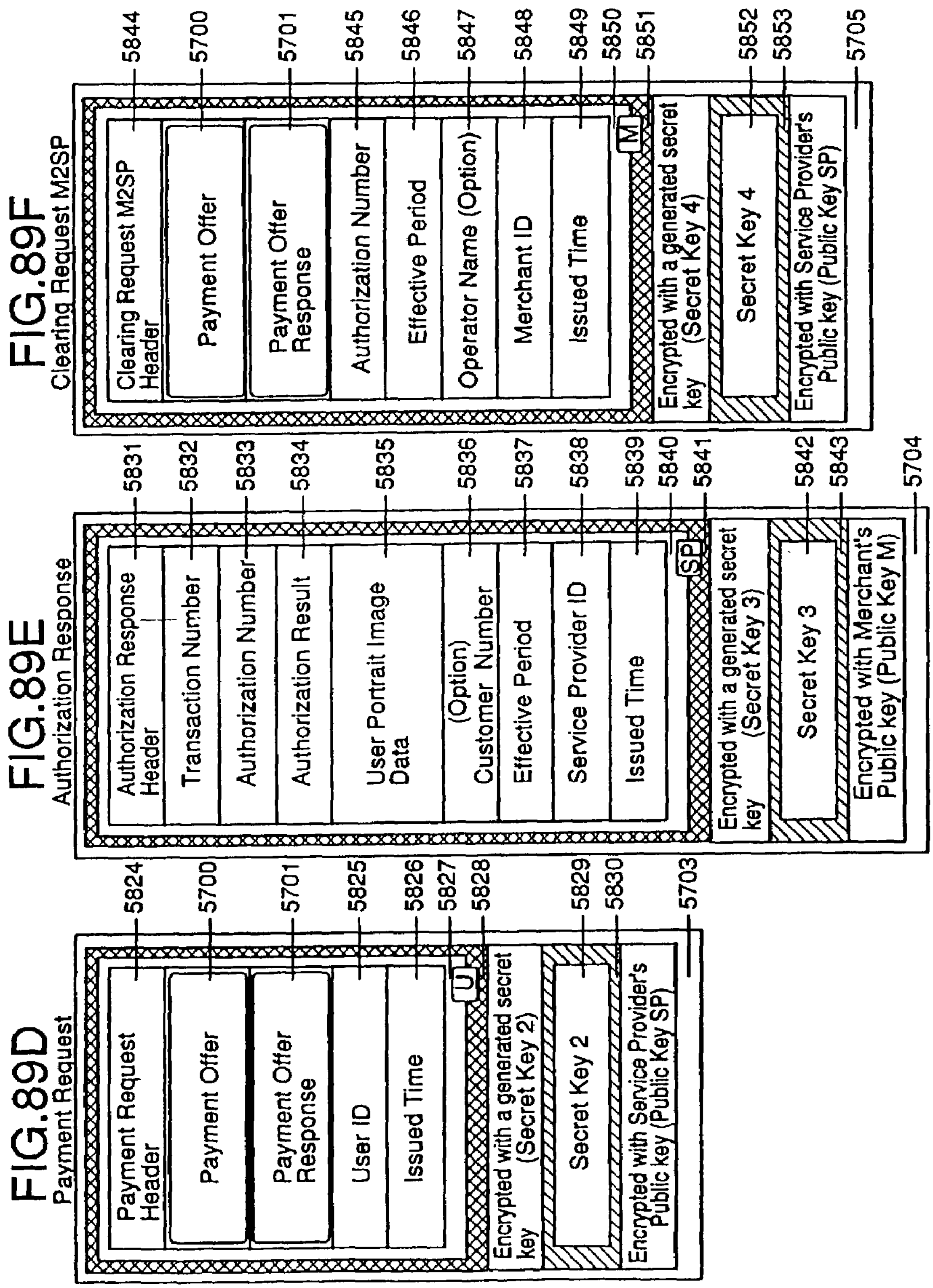
Figure 91A:
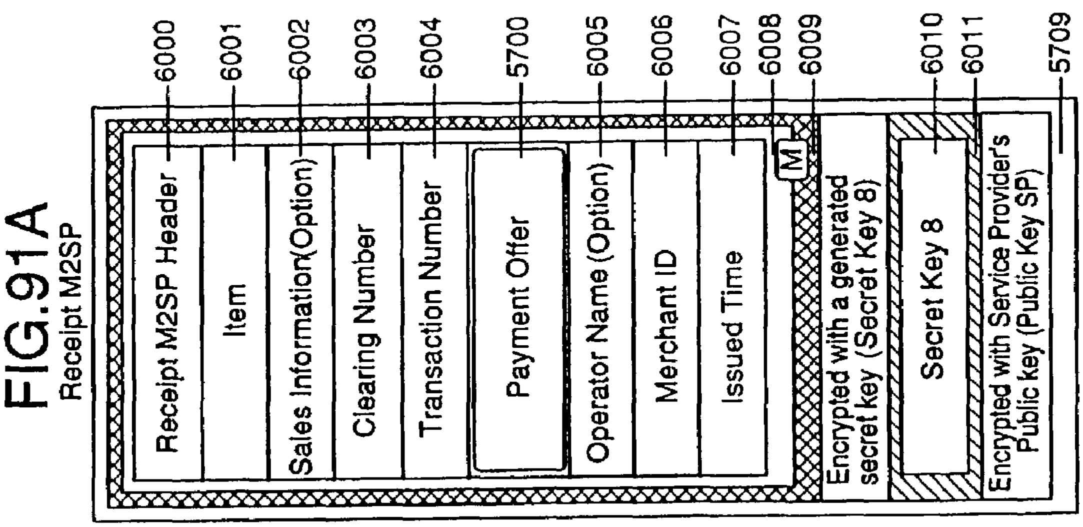
Figure 91B:
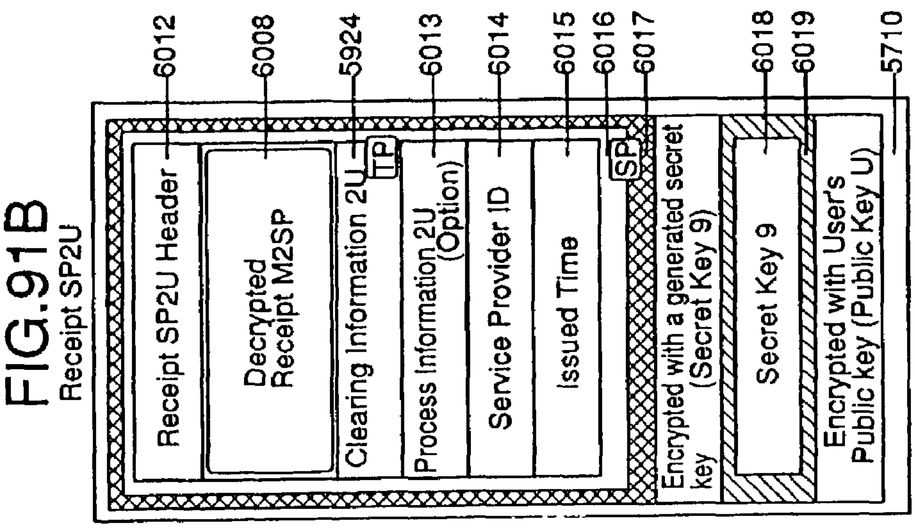
Figure 92:
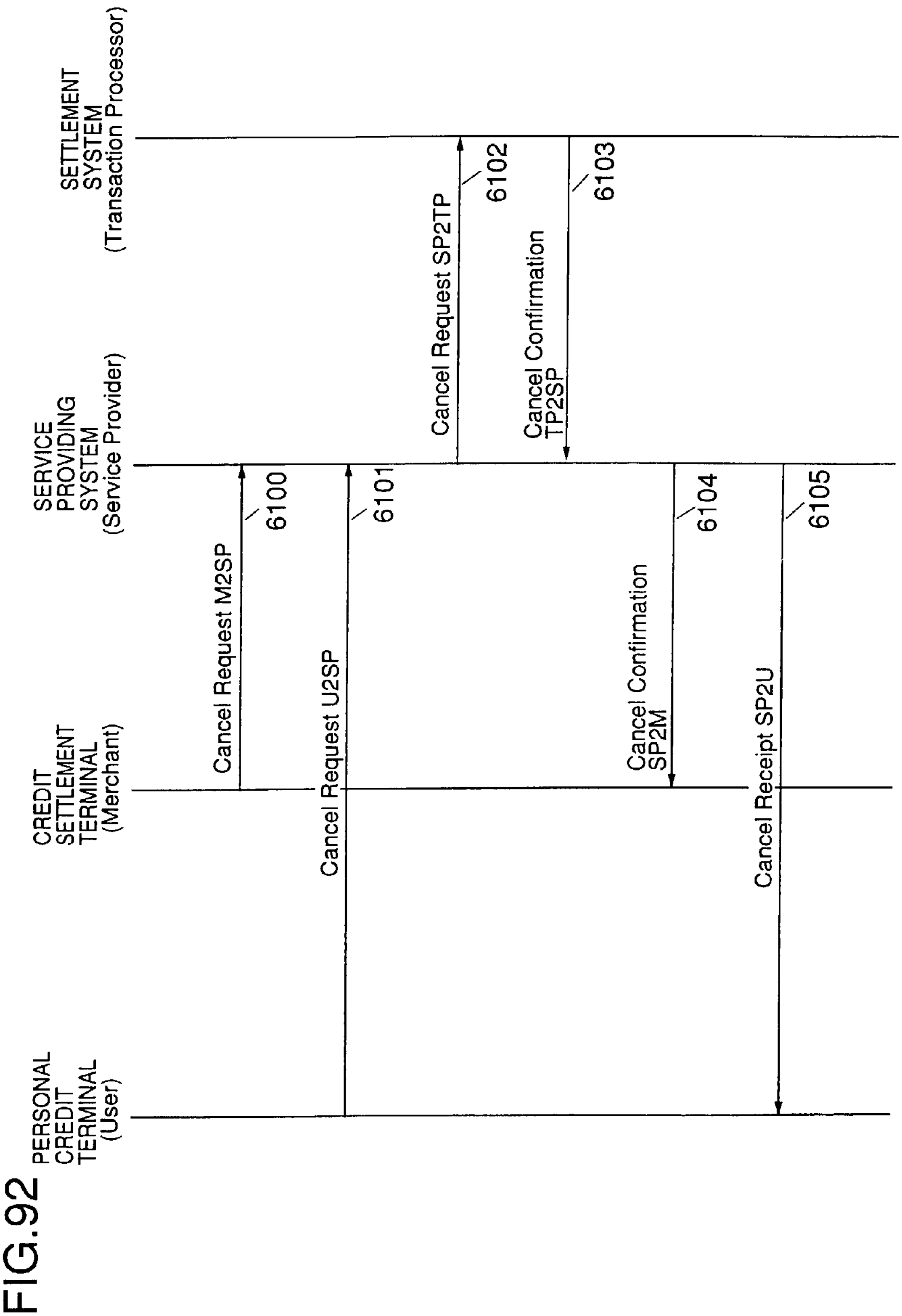
Figures 93A, 93B, 93C:
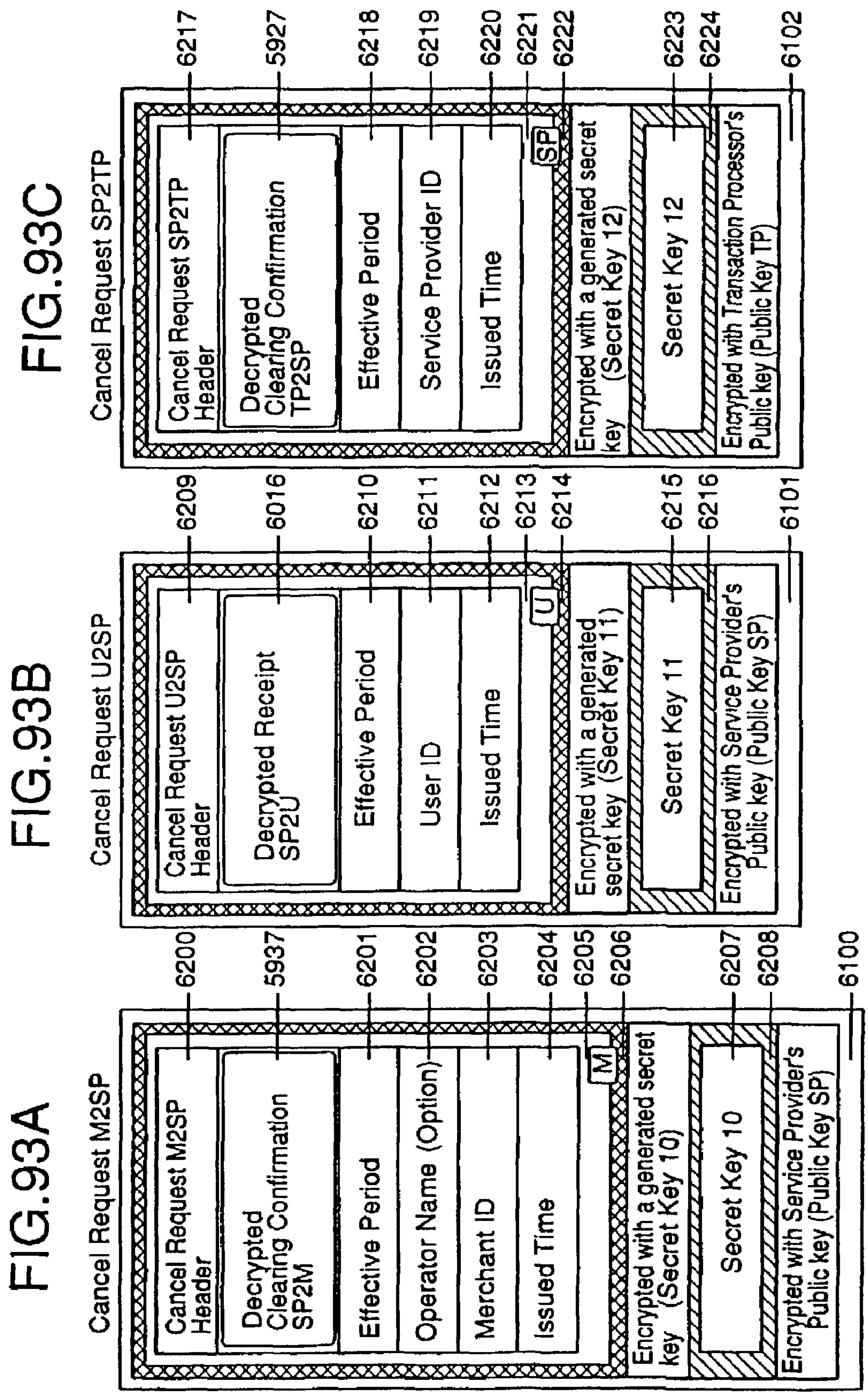
Figures 93D, 93E, 93F:
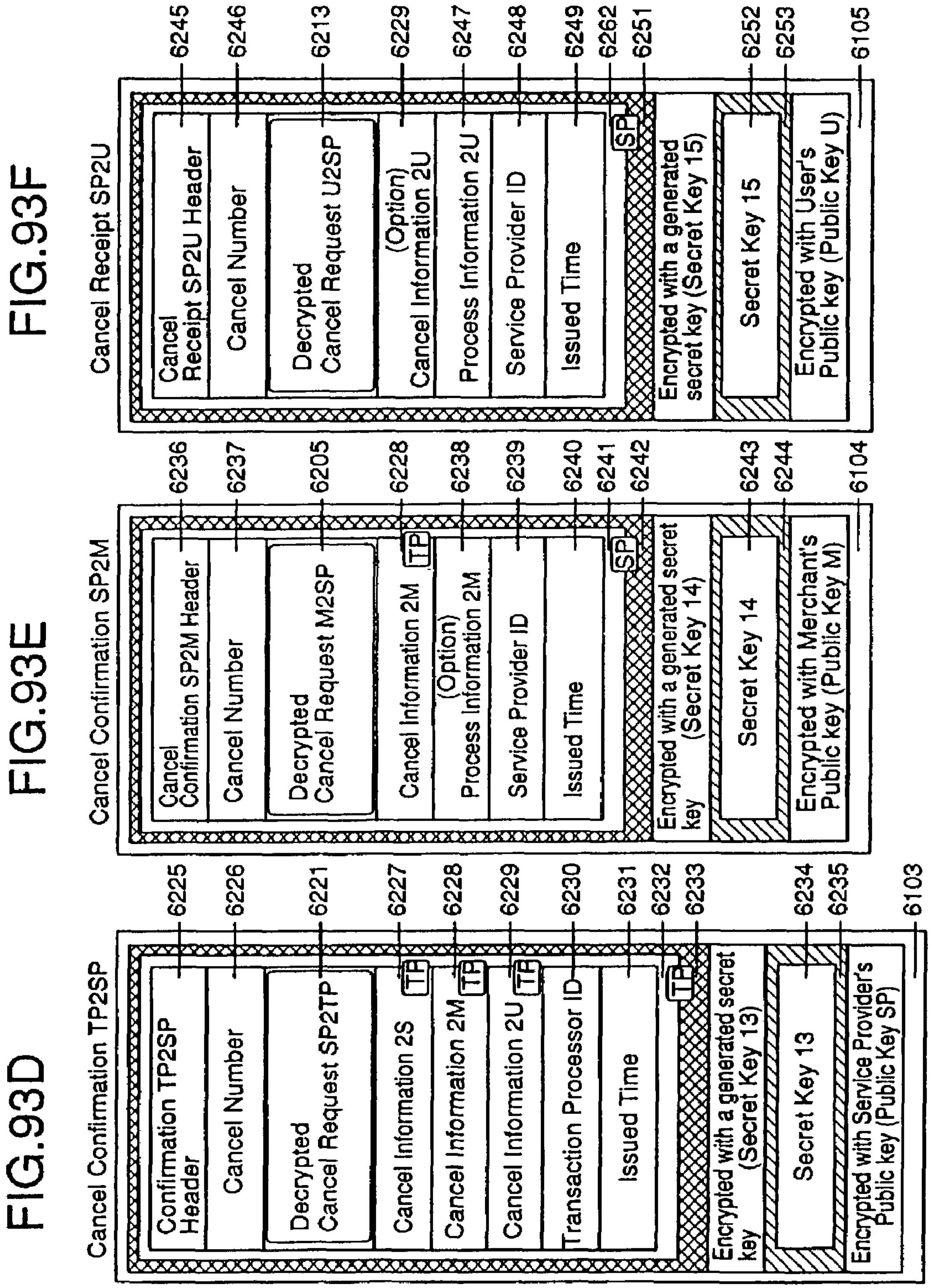
Figure 94A:
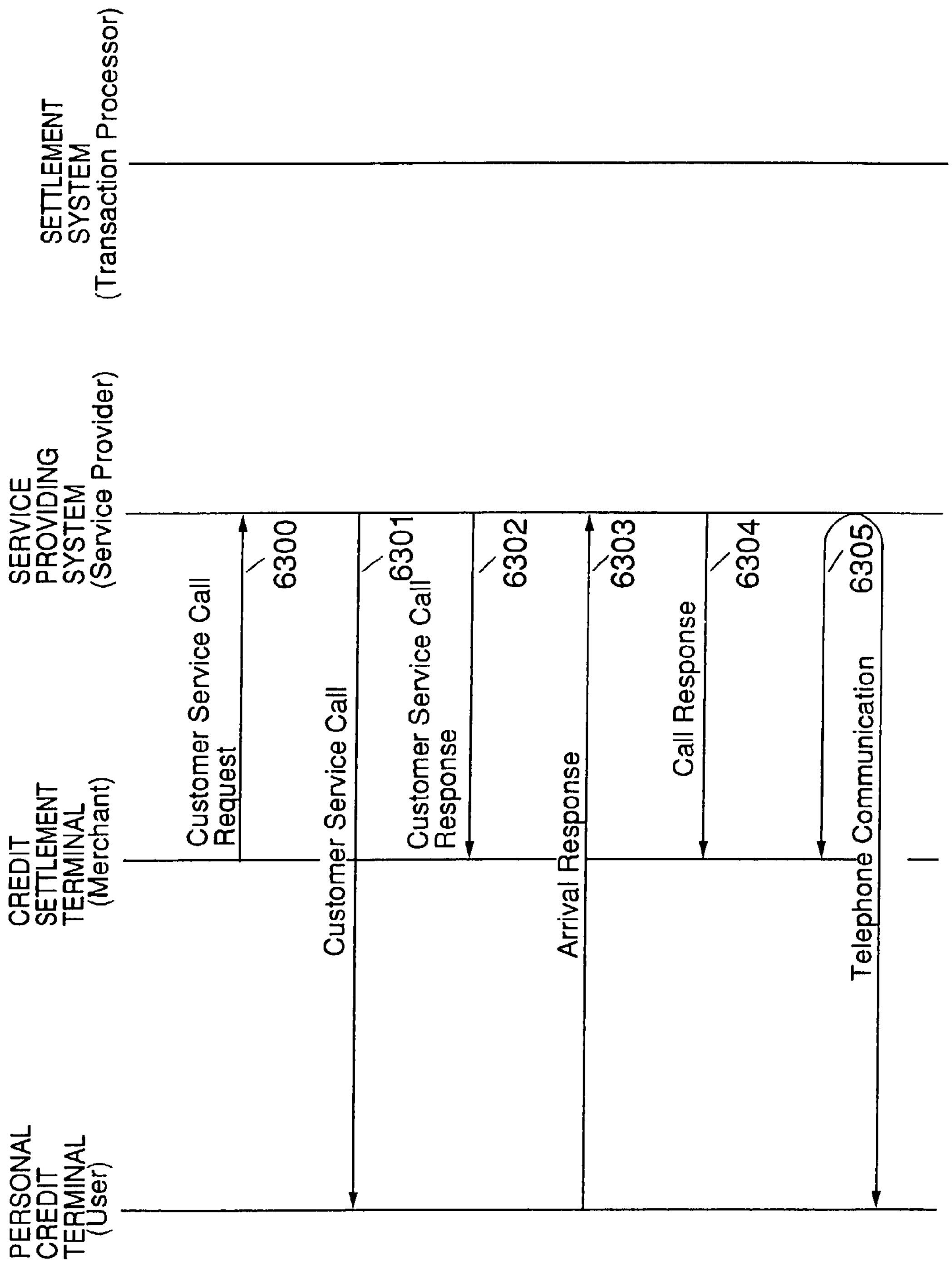
Figure 94B:
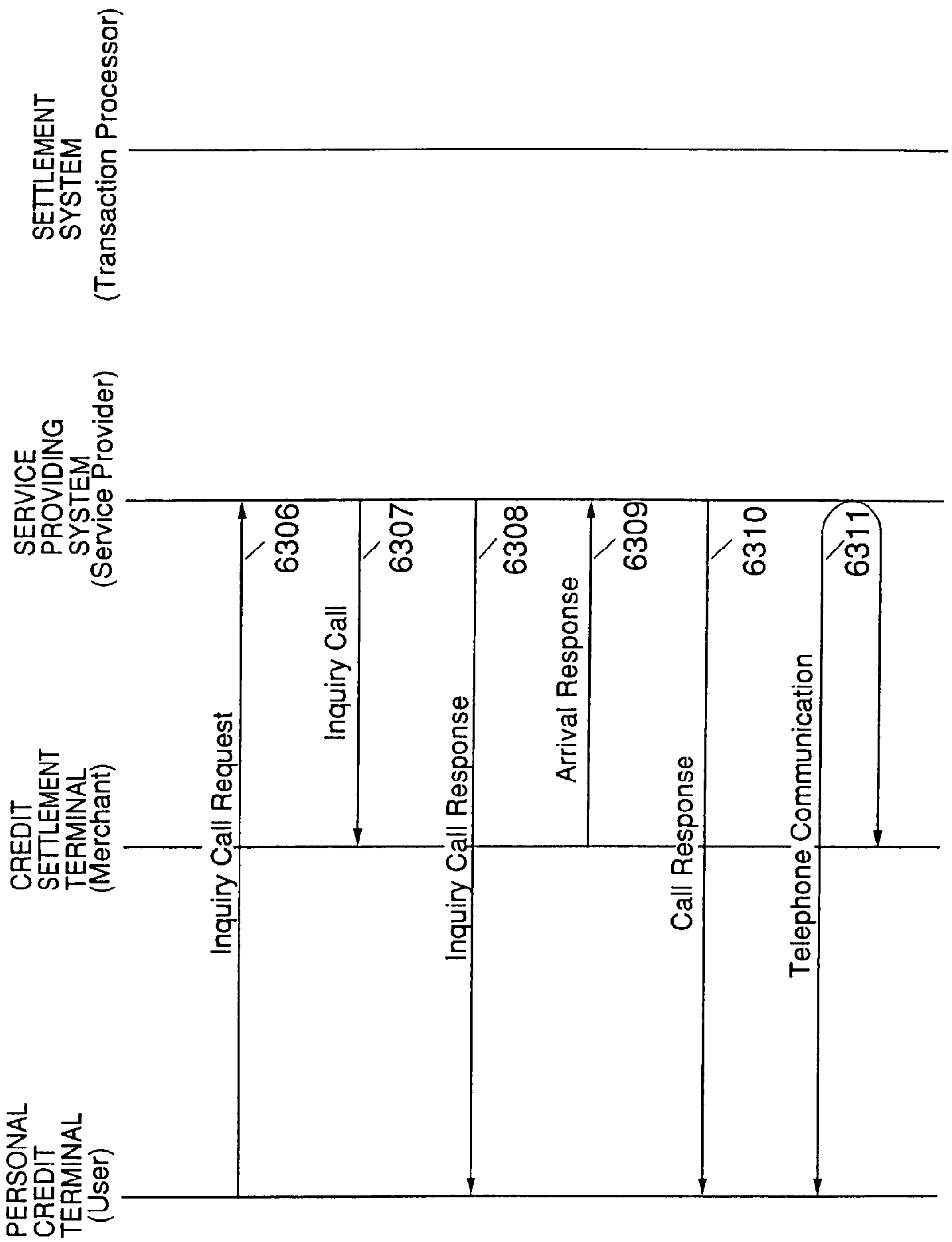
Figure 95D:
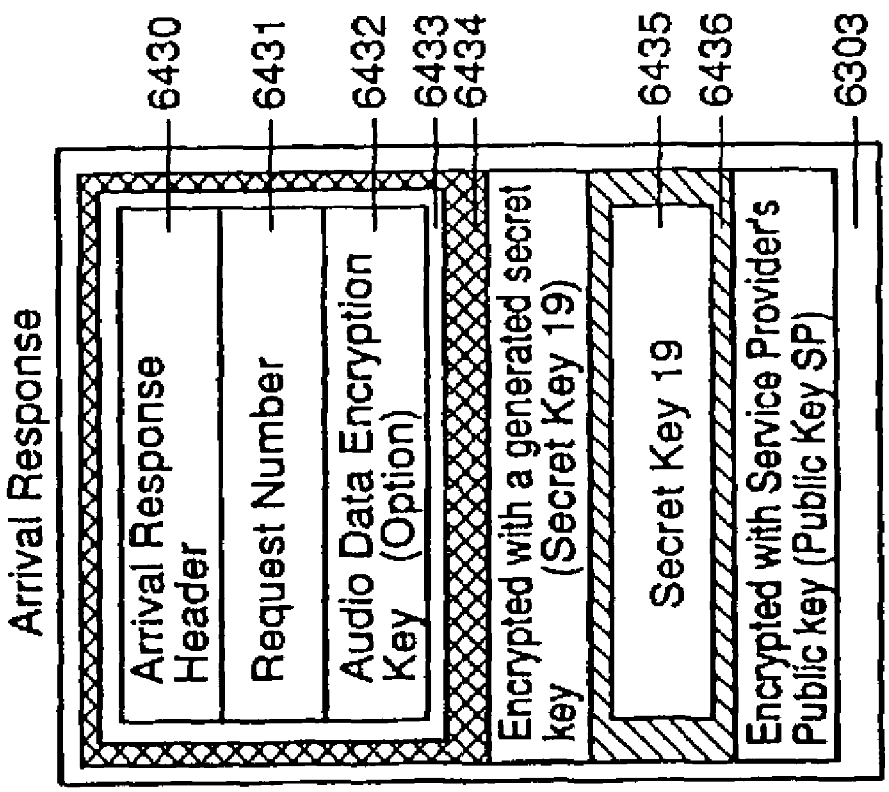
Figure 95E:
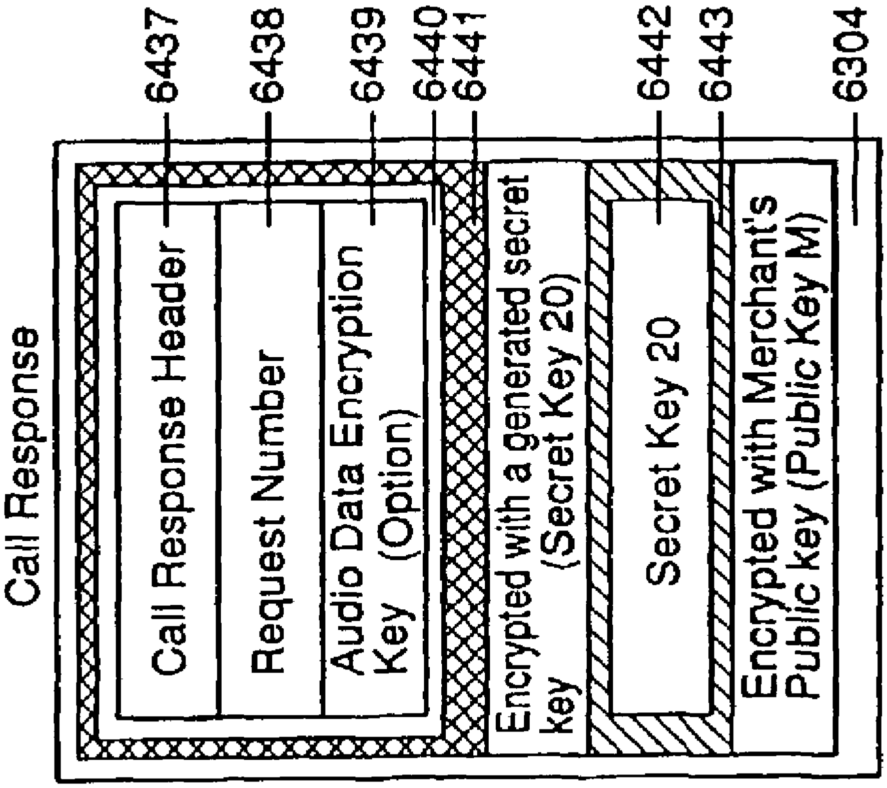
Figures 96A, 96B, 96C:
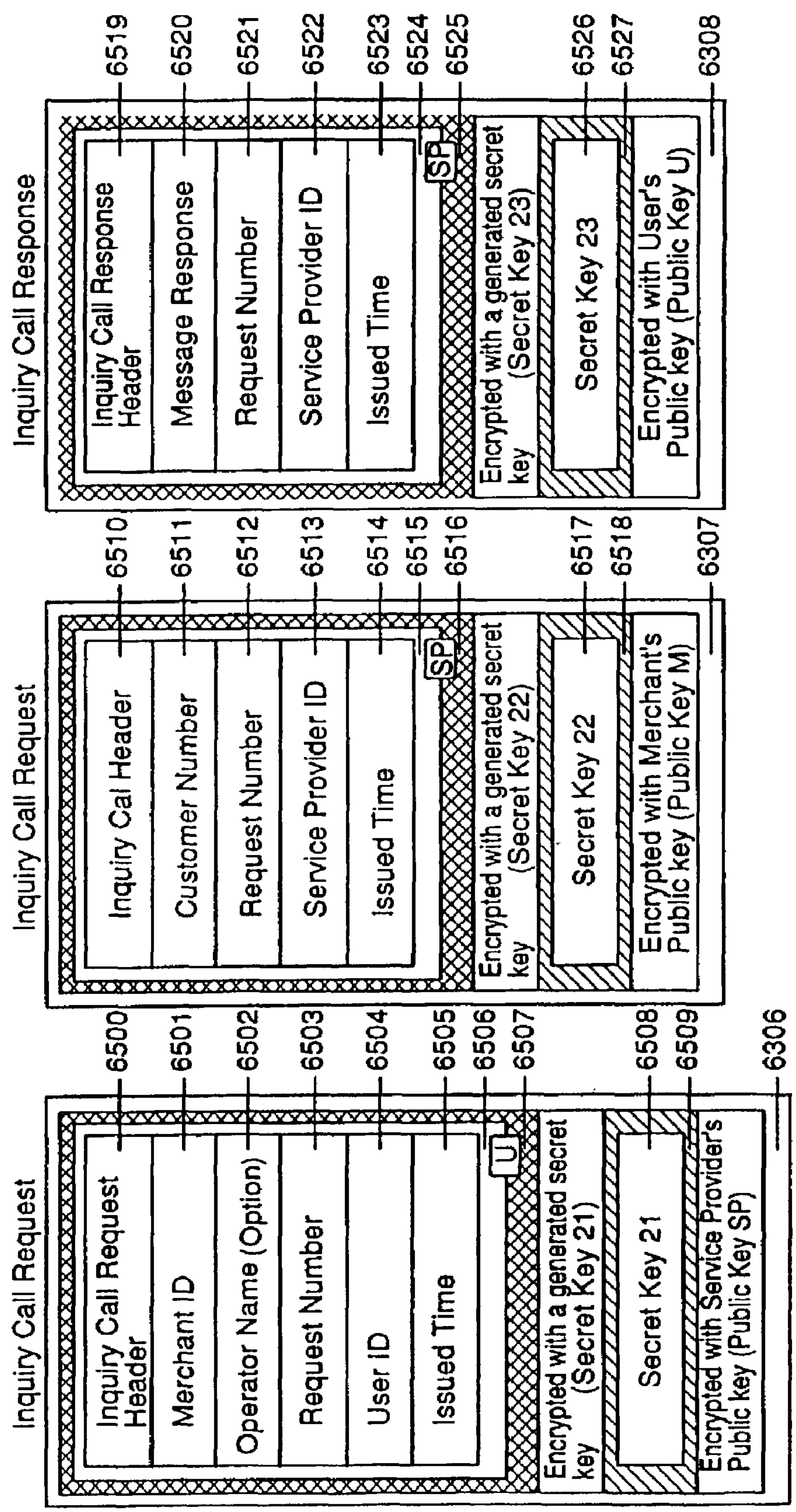
Figure 96D:
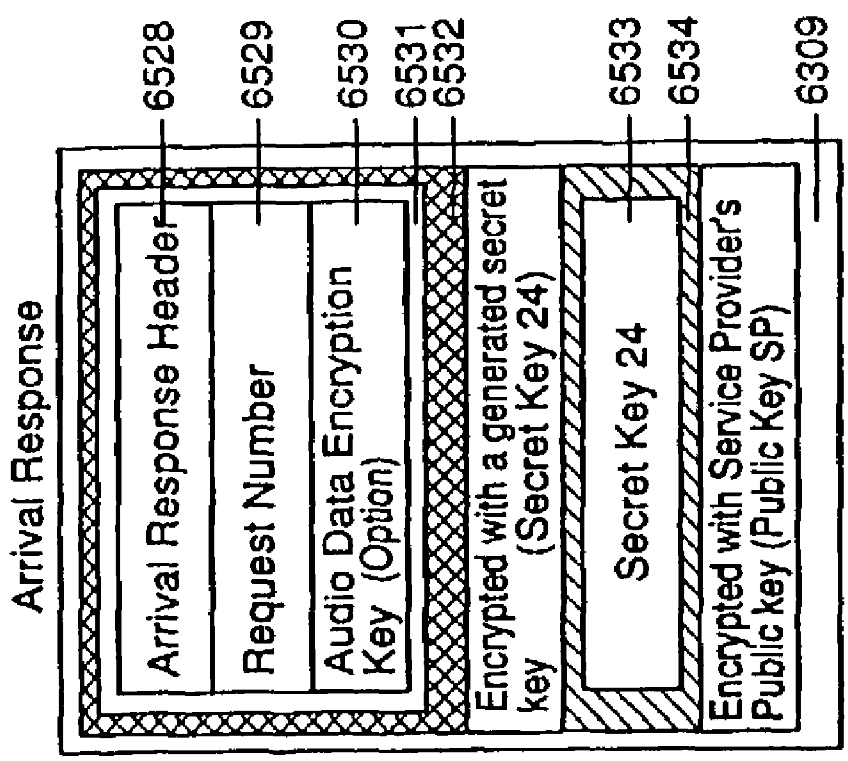
Figure 96E:
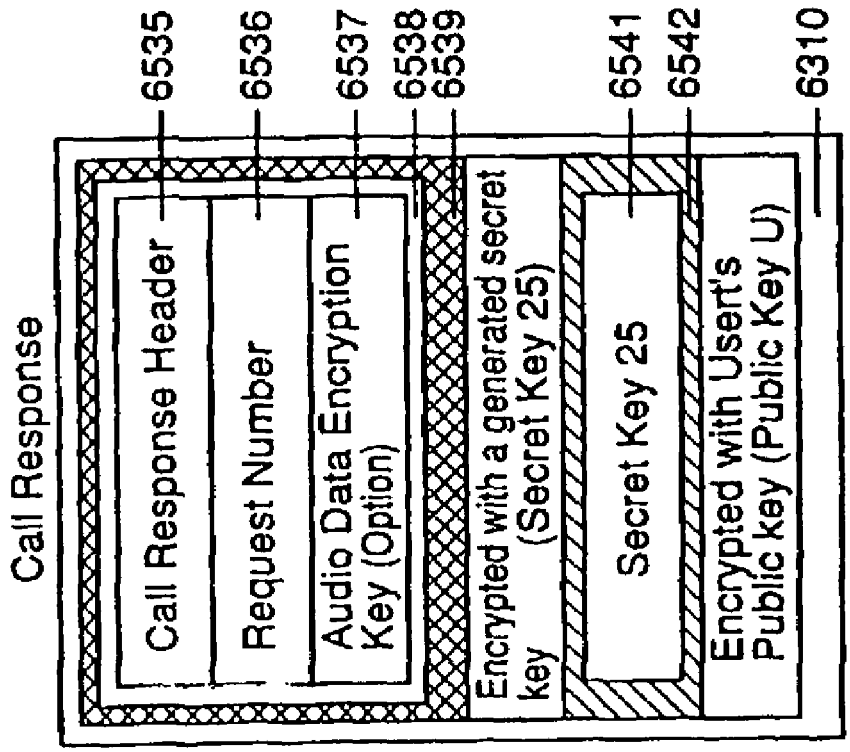
Figure 97A:
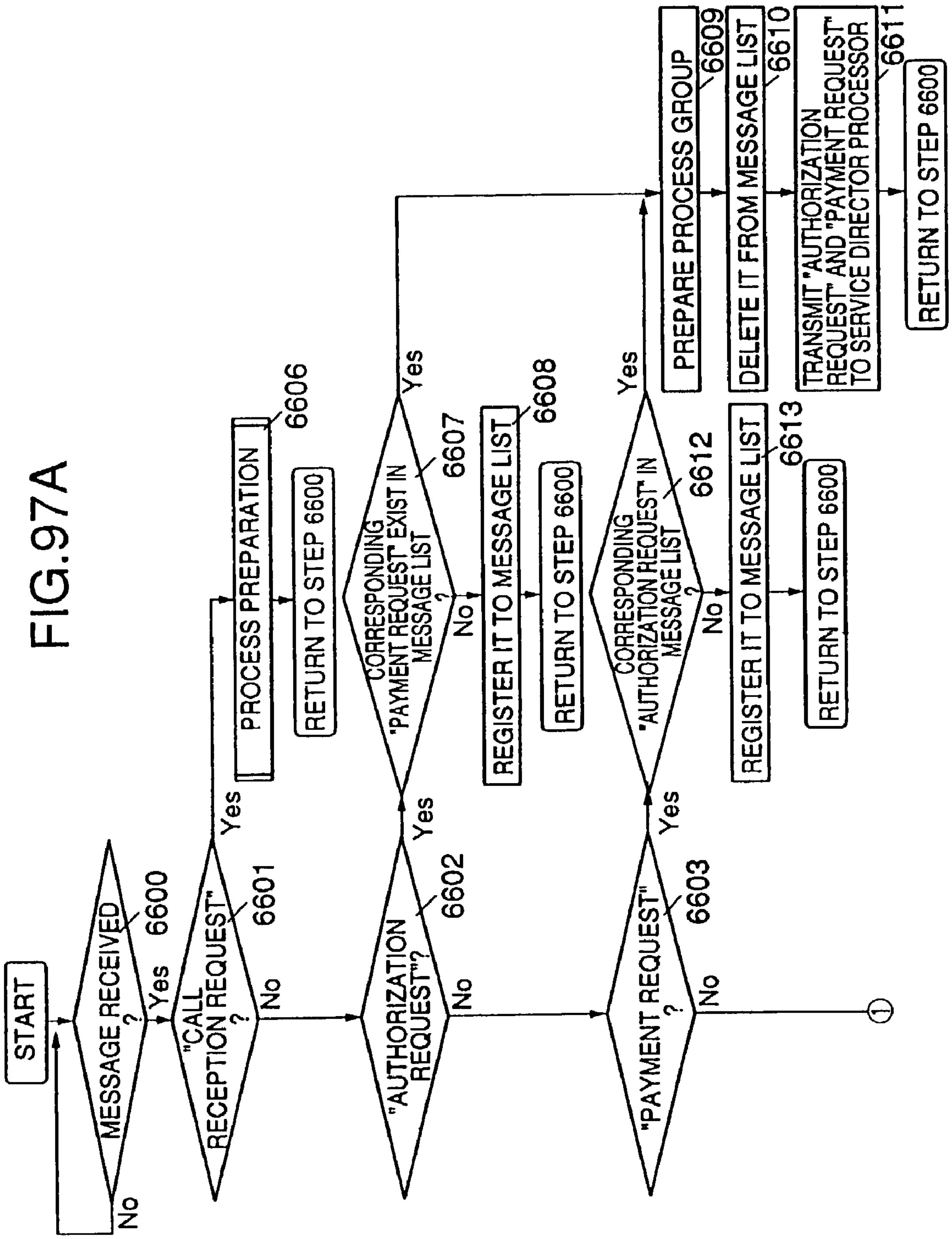
Figure 97B:
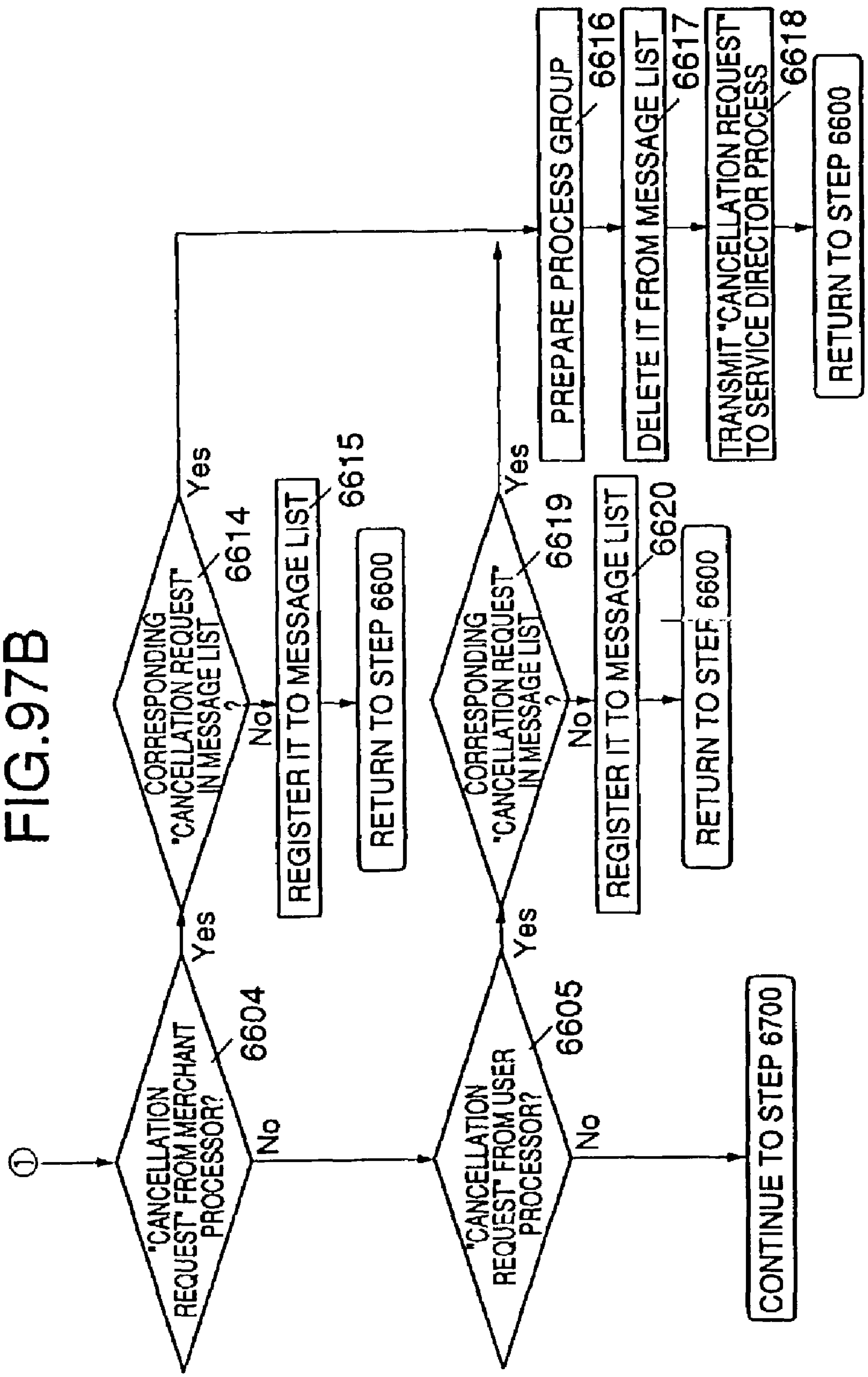
Figure 98:
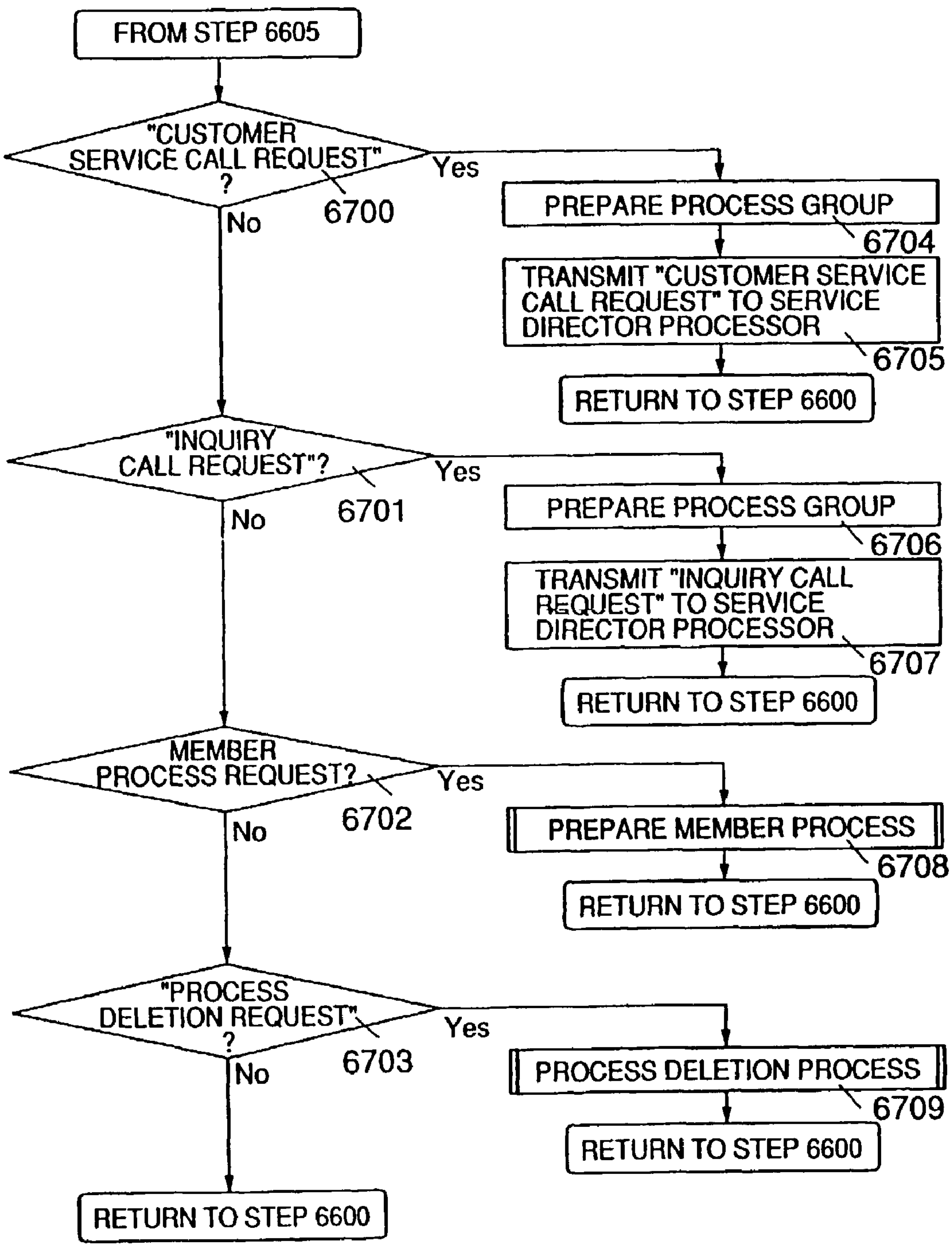
Figure 99:
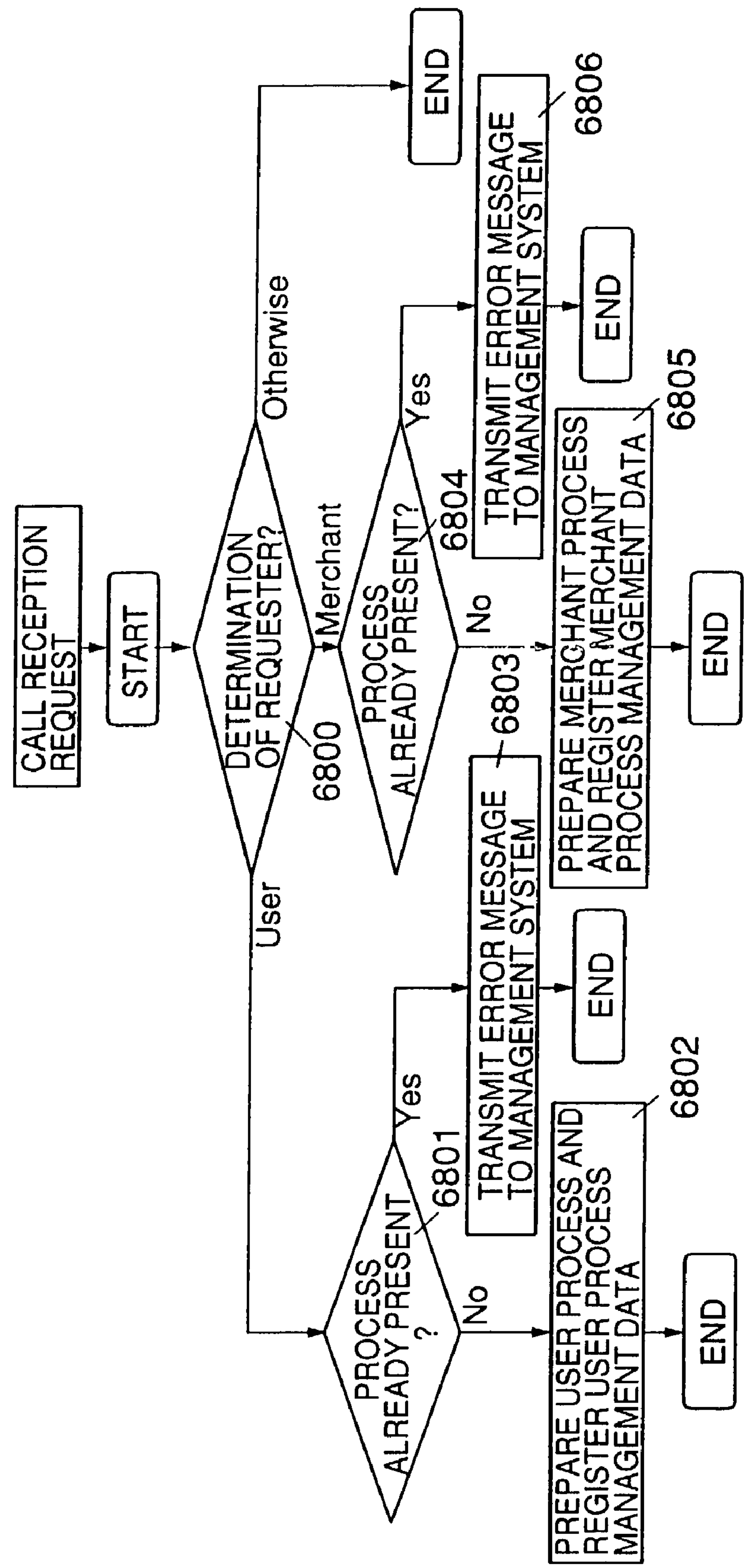
Figure 100:
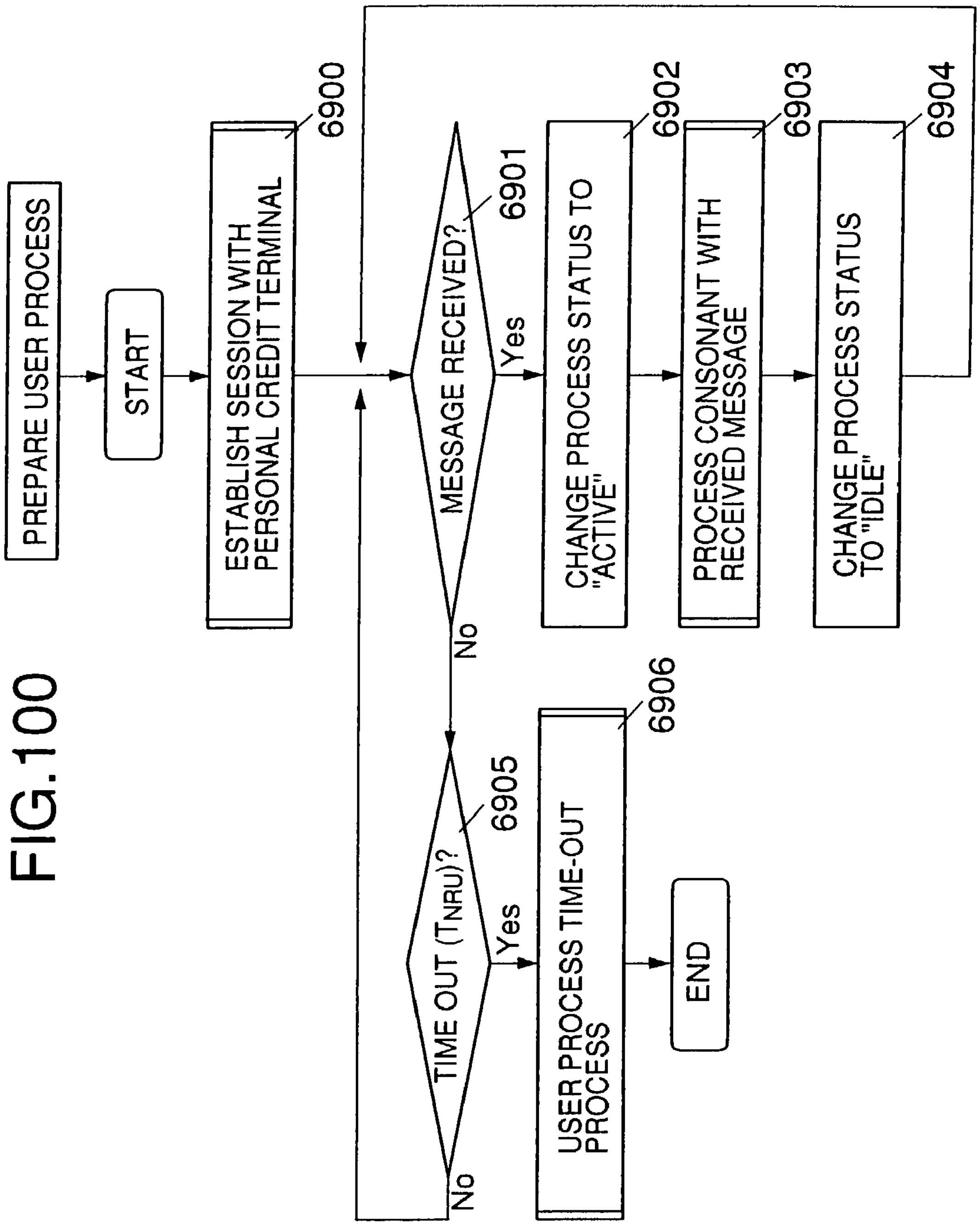
Figure 101:
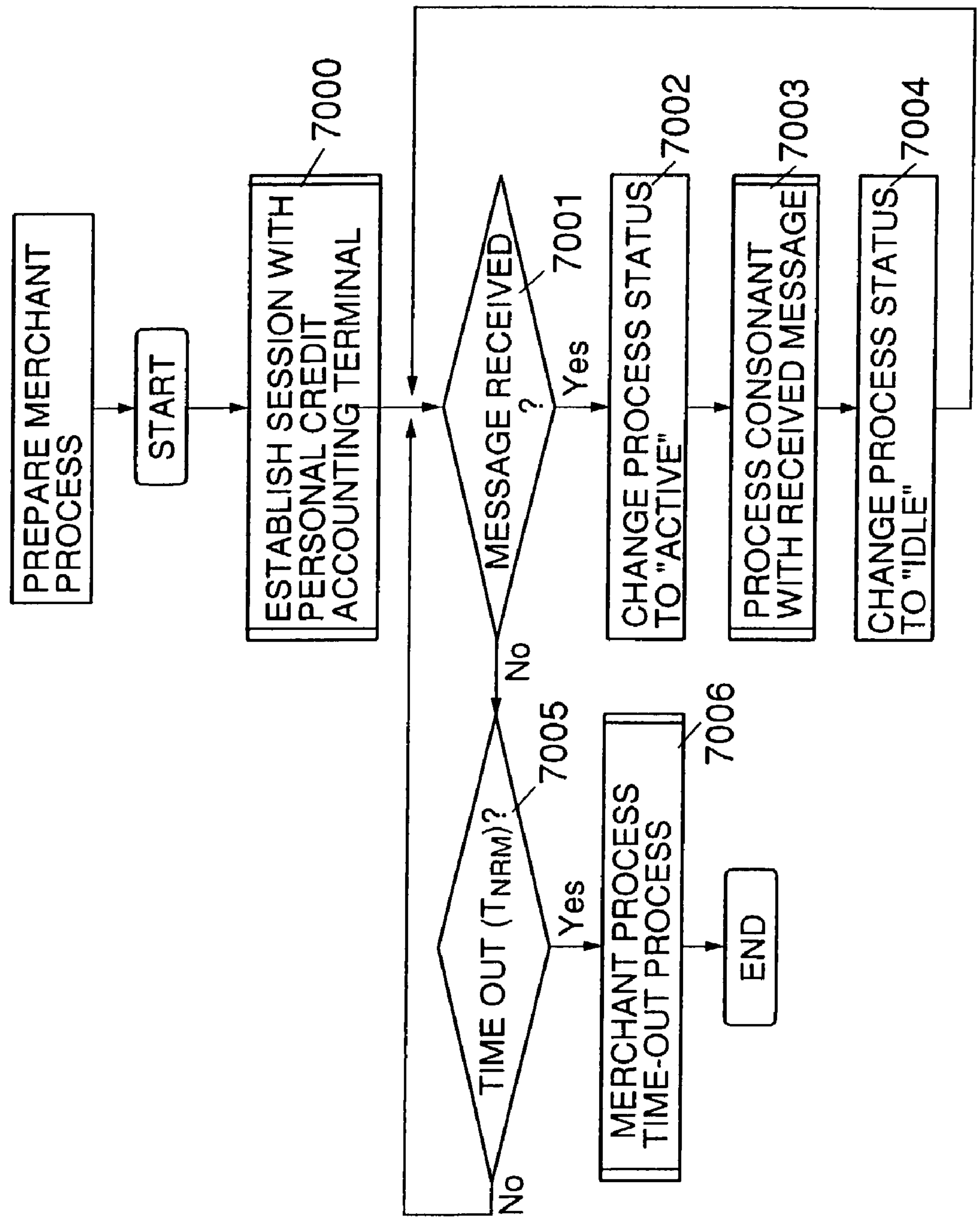
Figure 102:
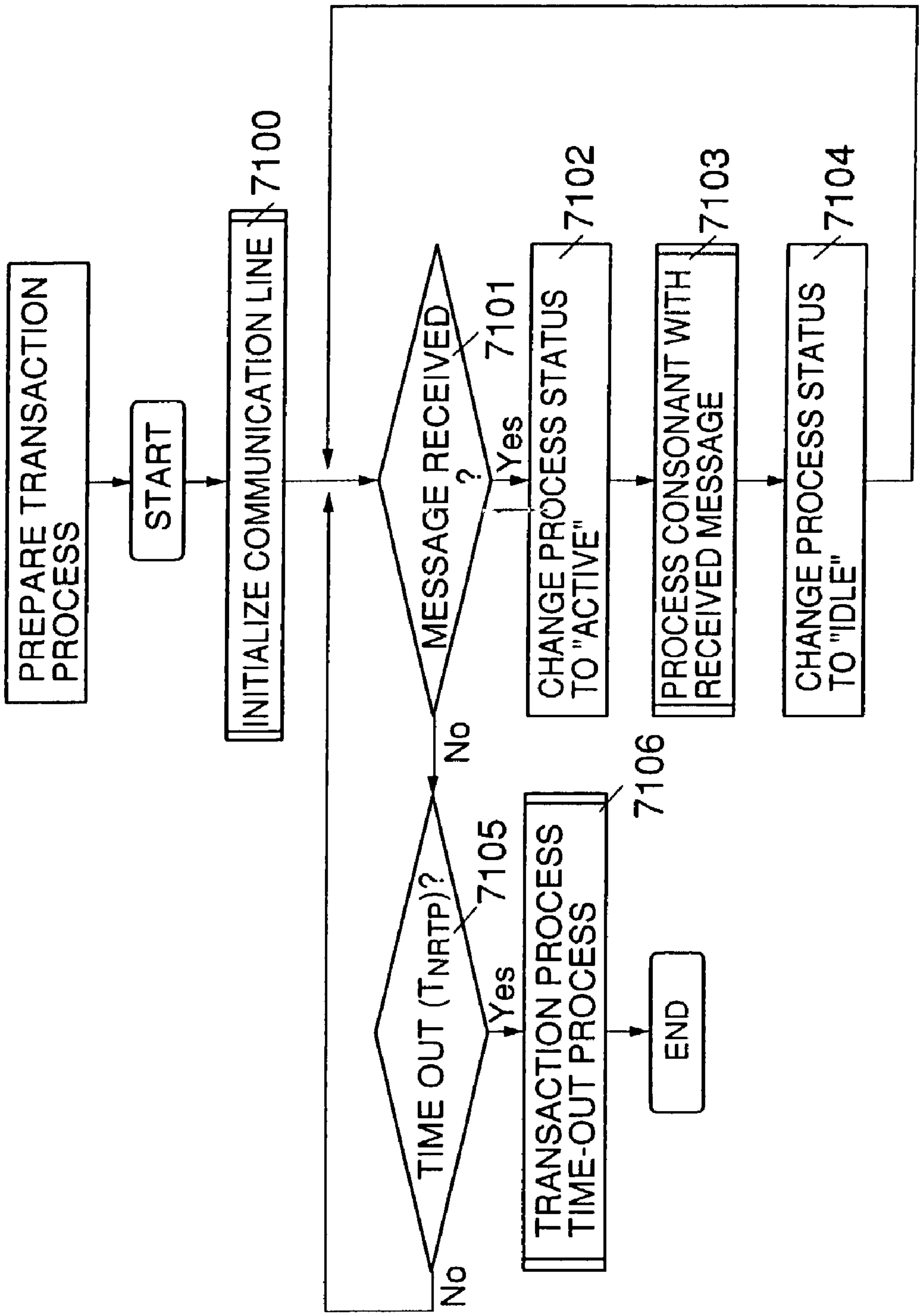
Figure 103A:
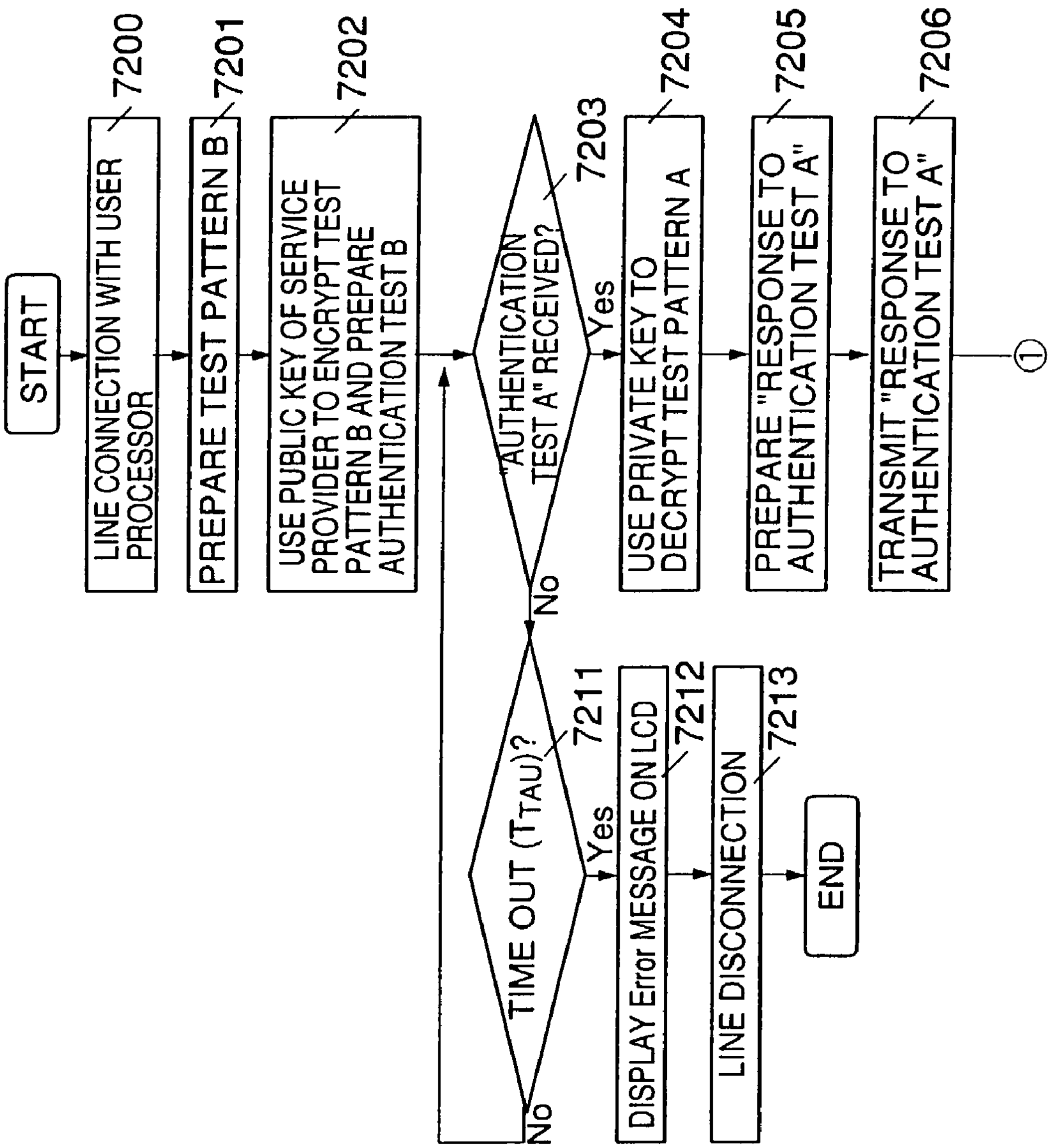
Figure 103B:
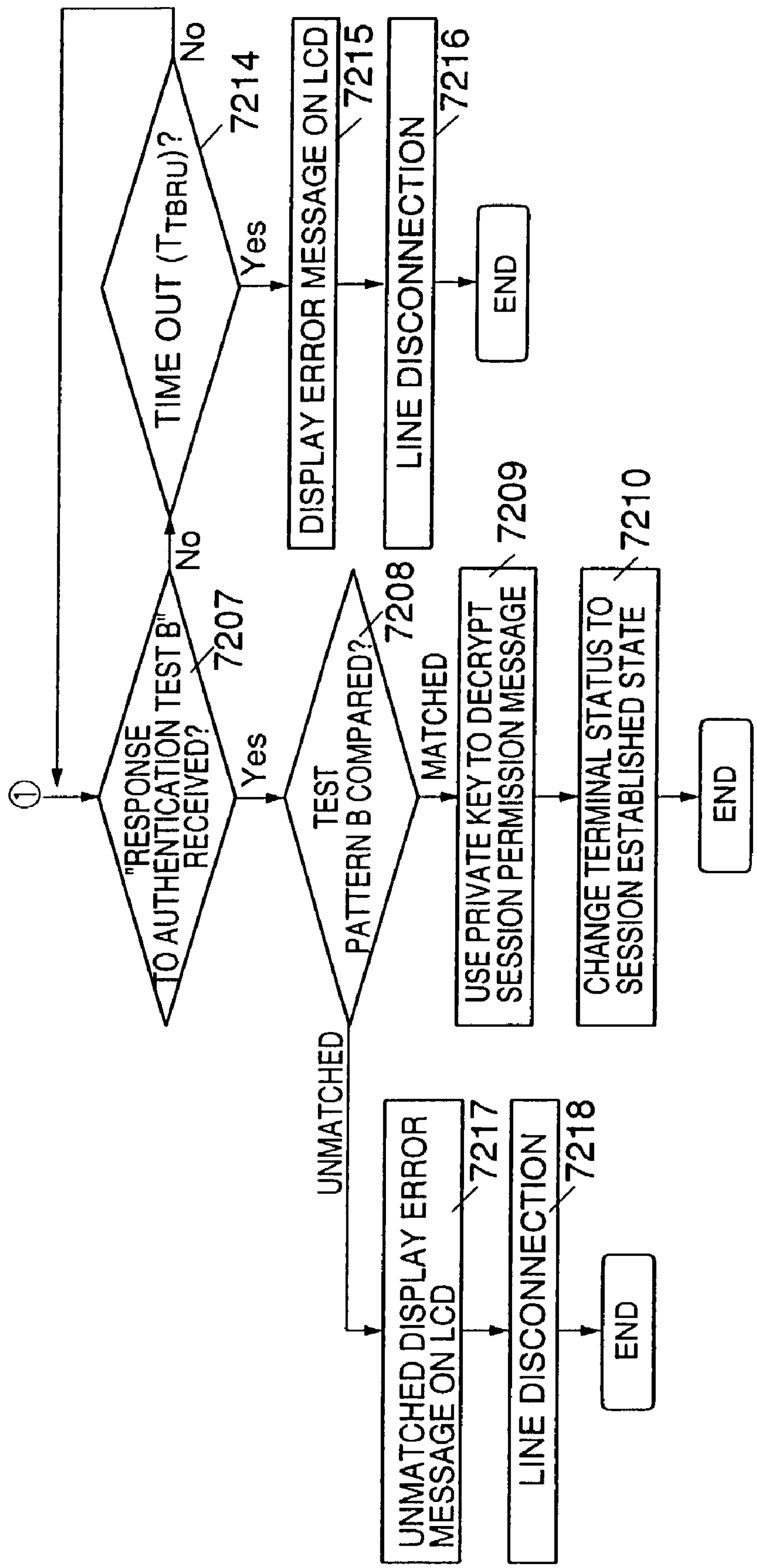
Figure 104:
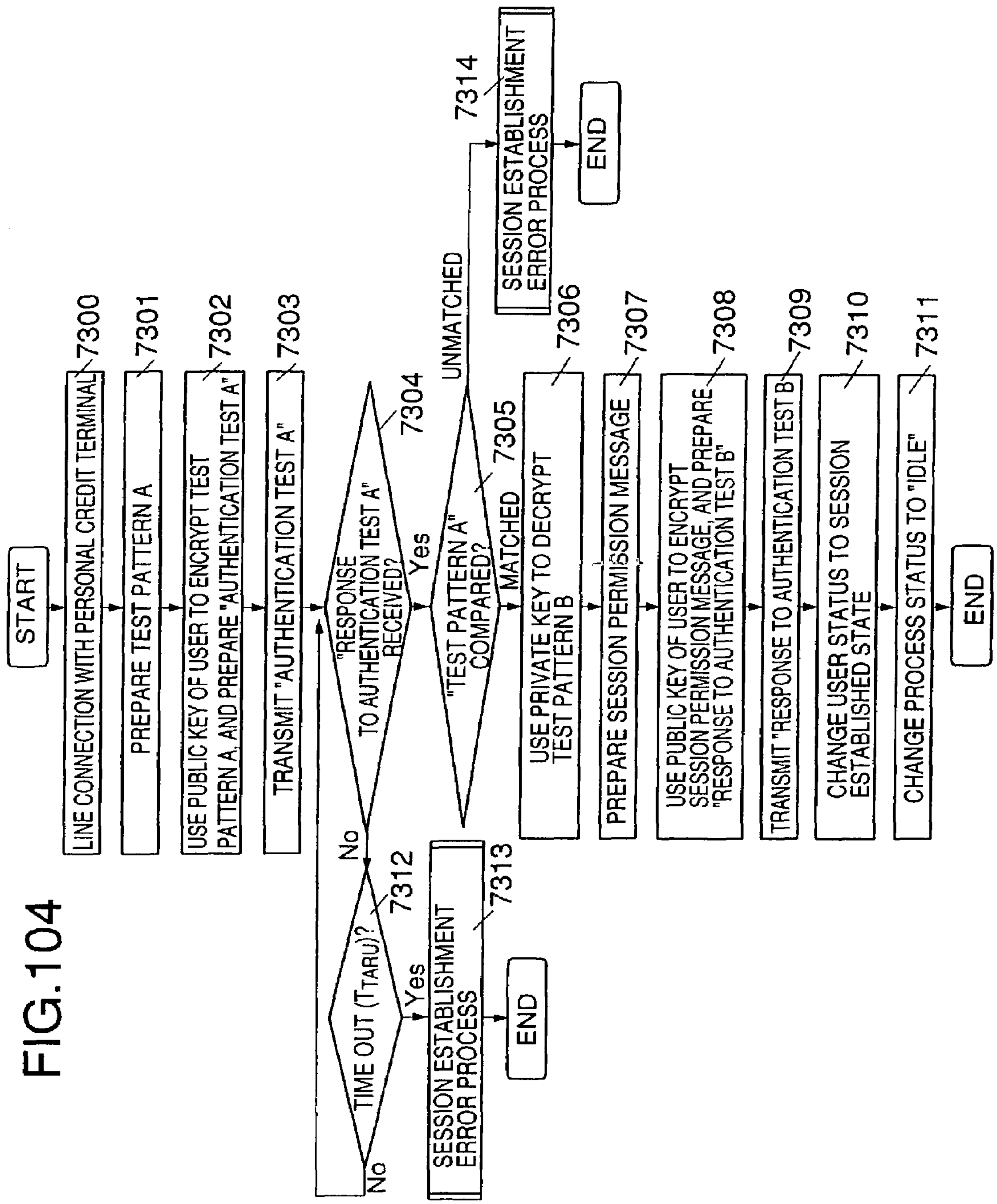
Figure 105:
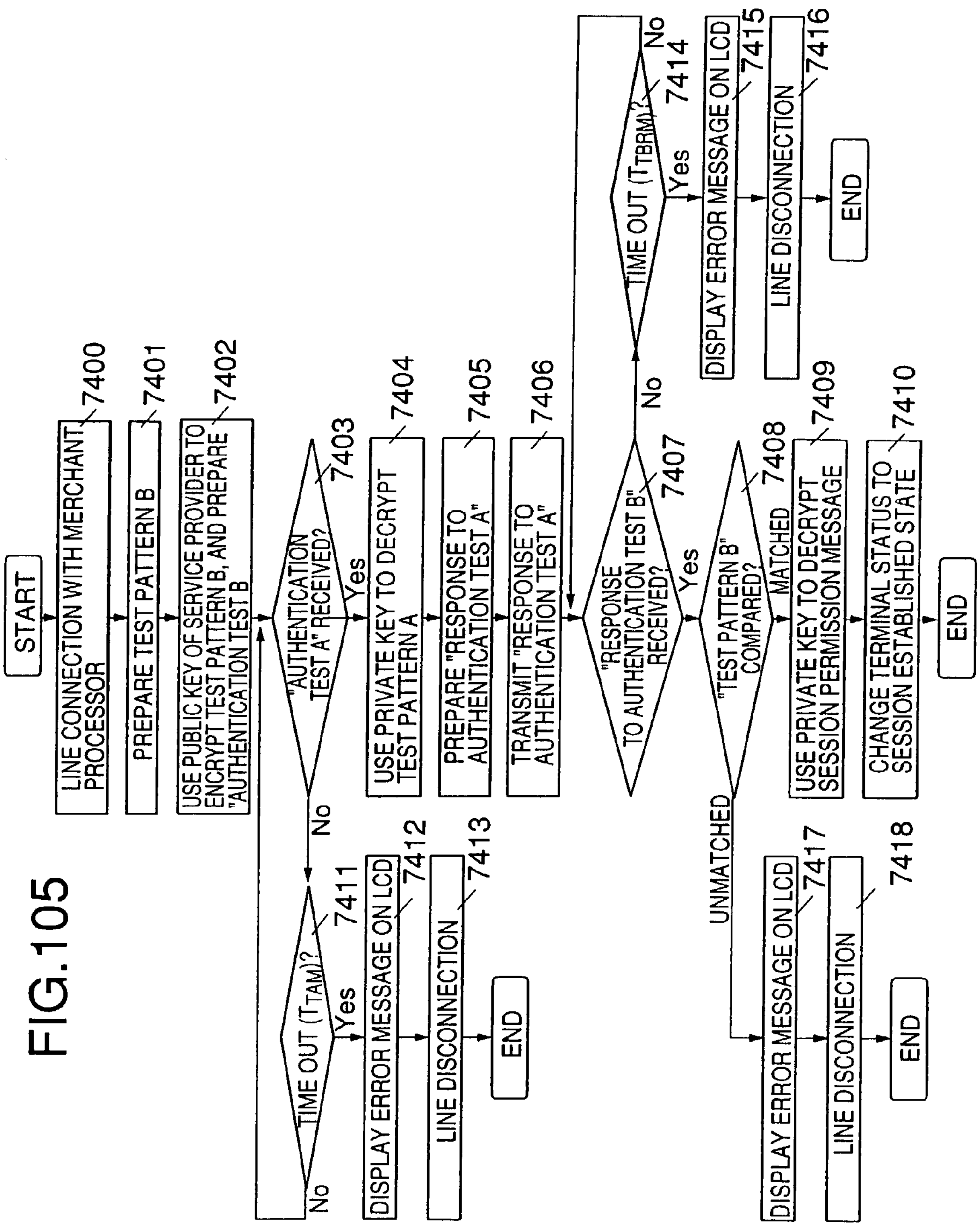
Figure 106A:
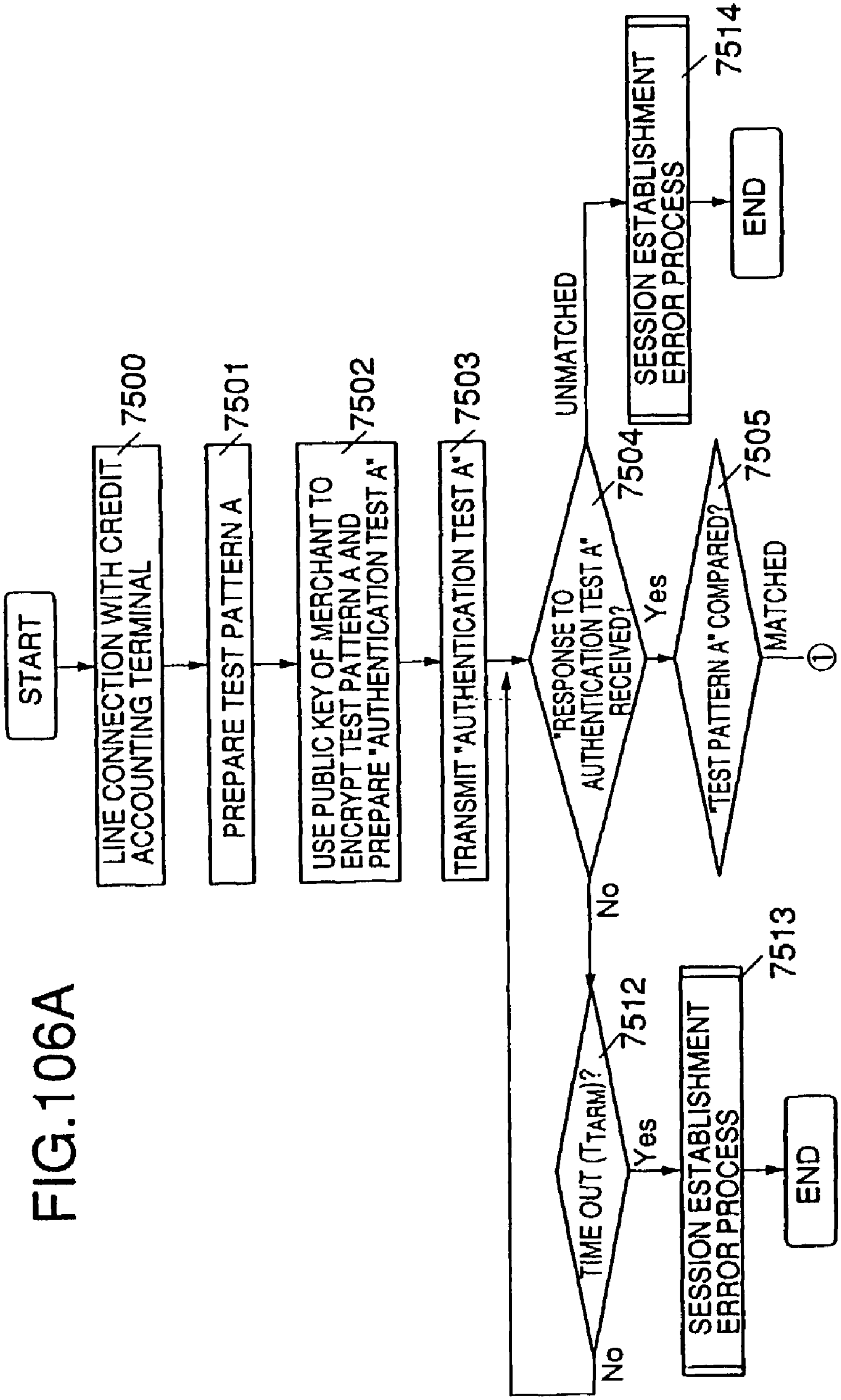
Figure 106B:
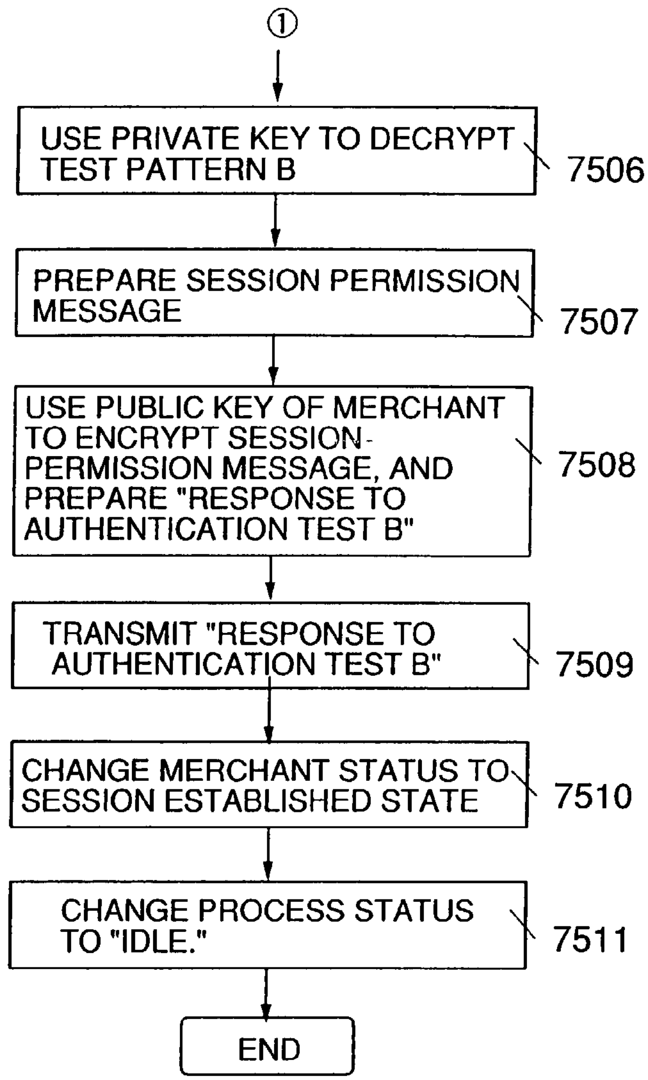
Figure 107A:
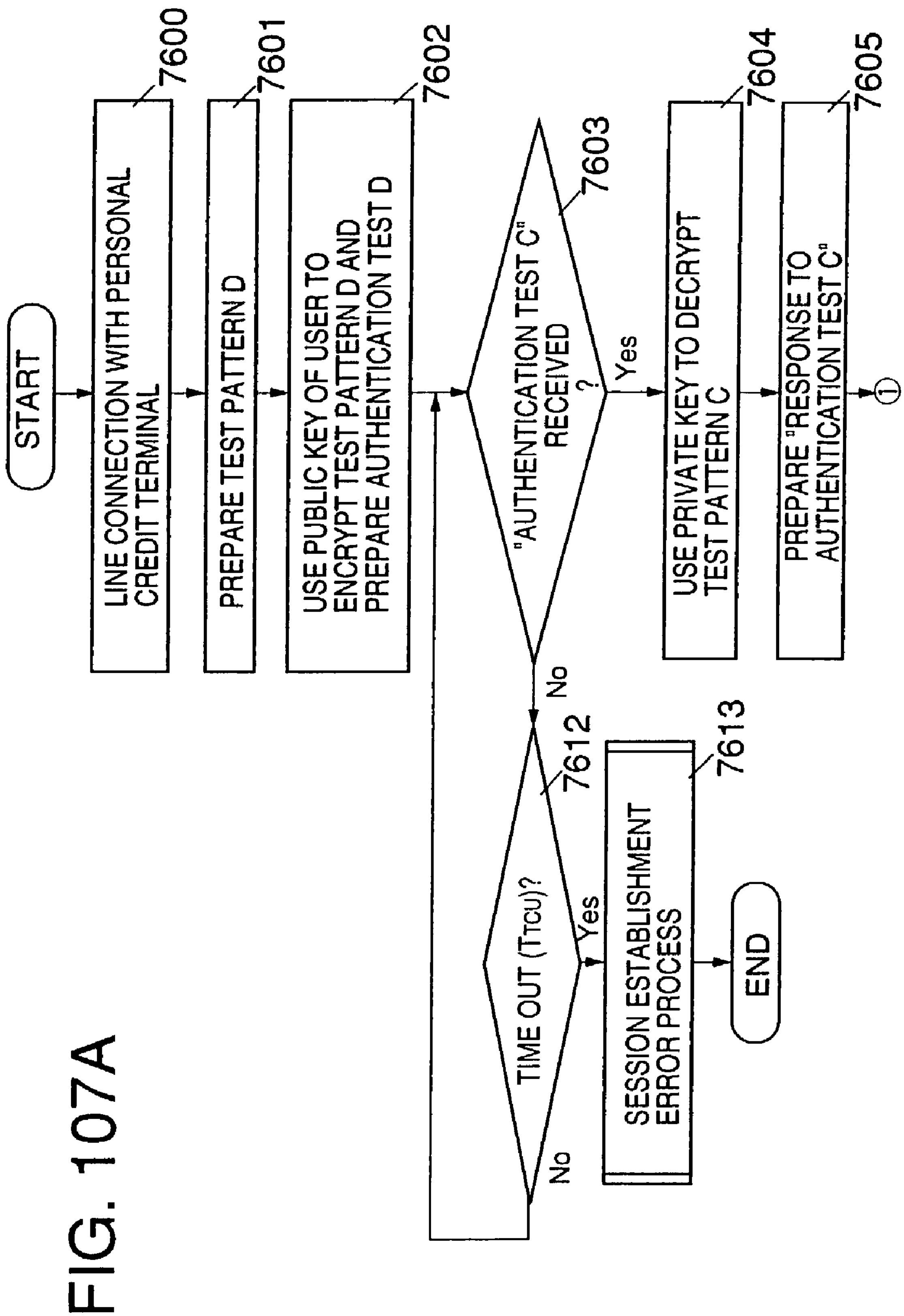
Figure 107B:
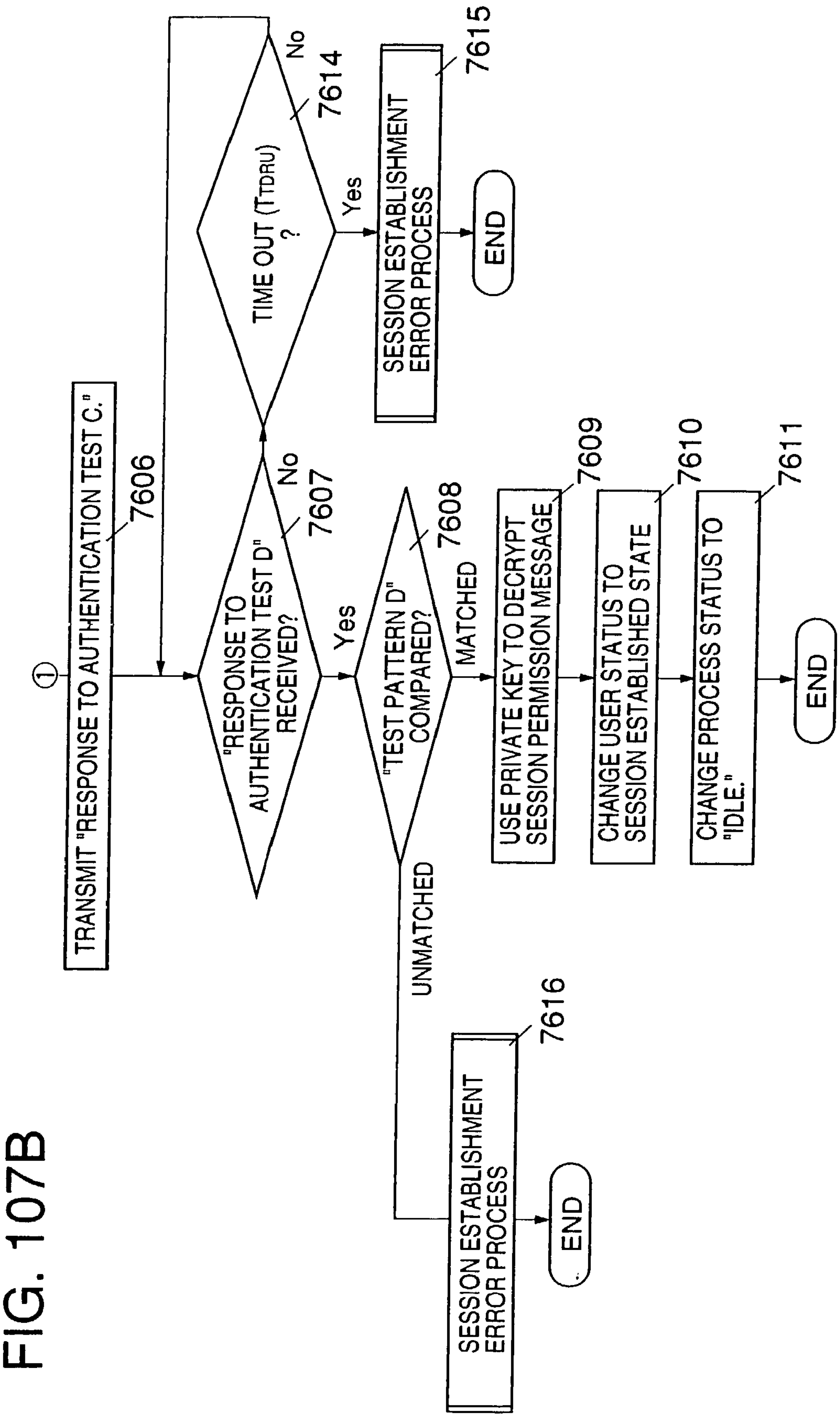
Figure 108:
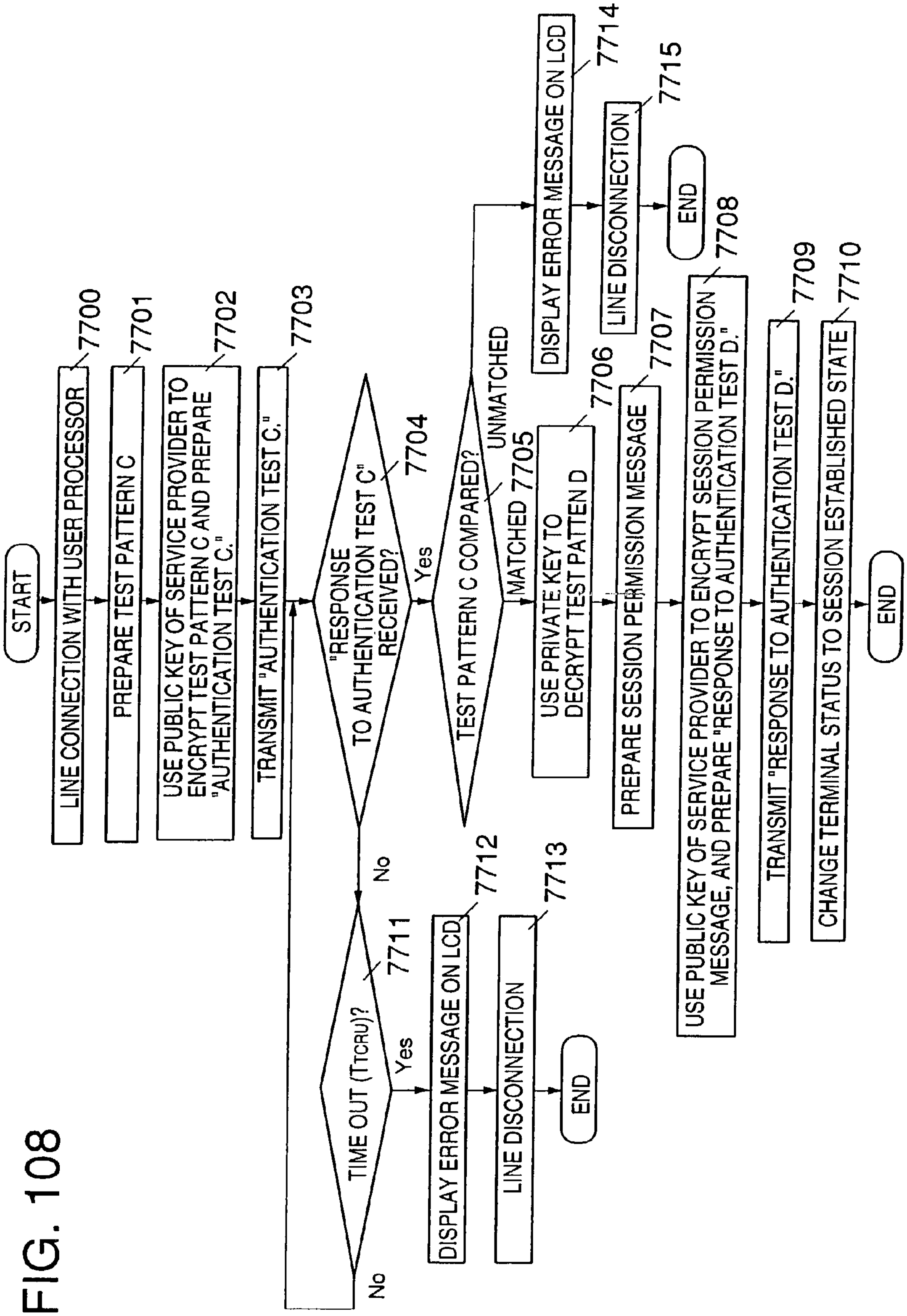
Figure 109A:
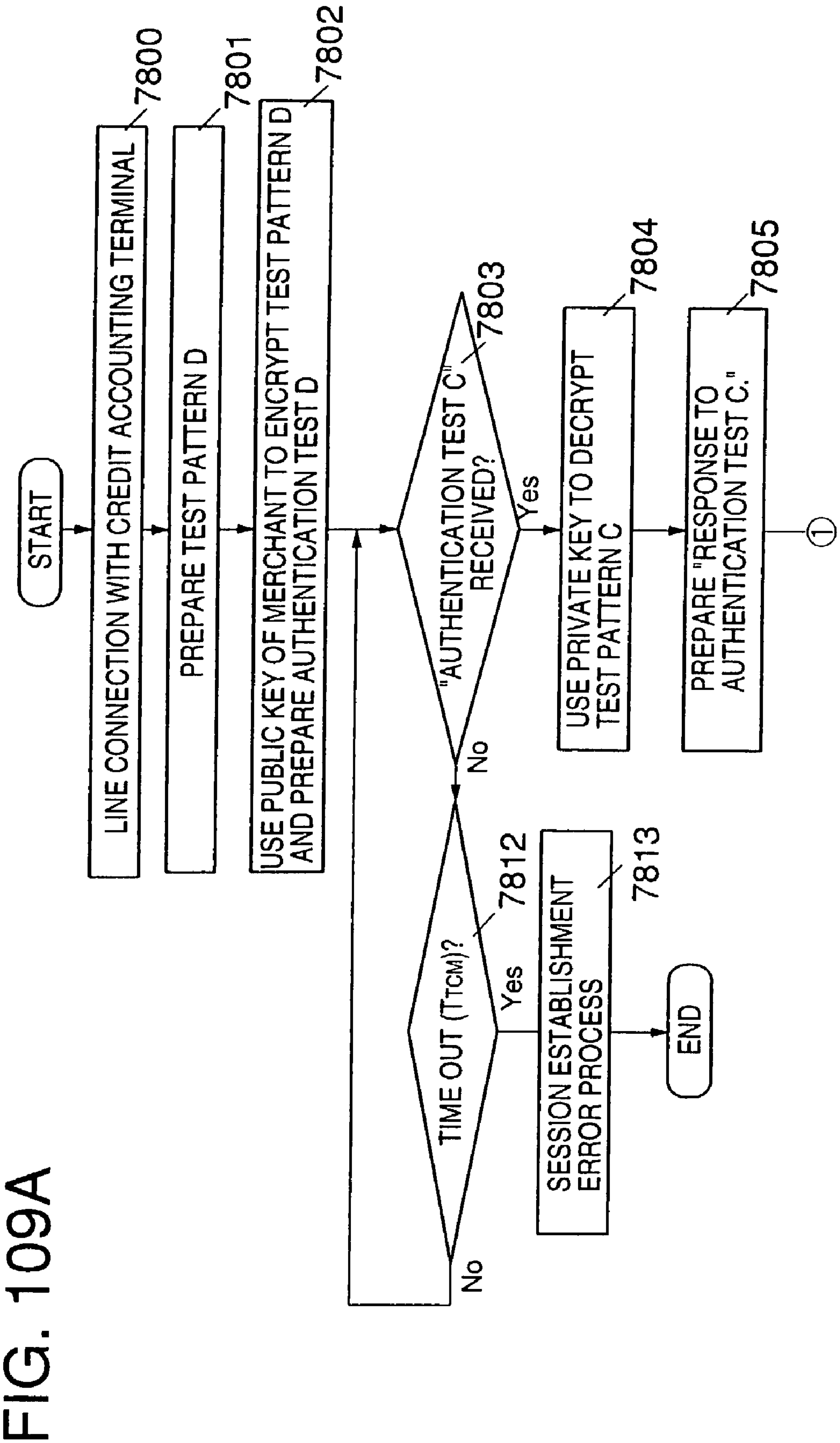
Figure 109B:
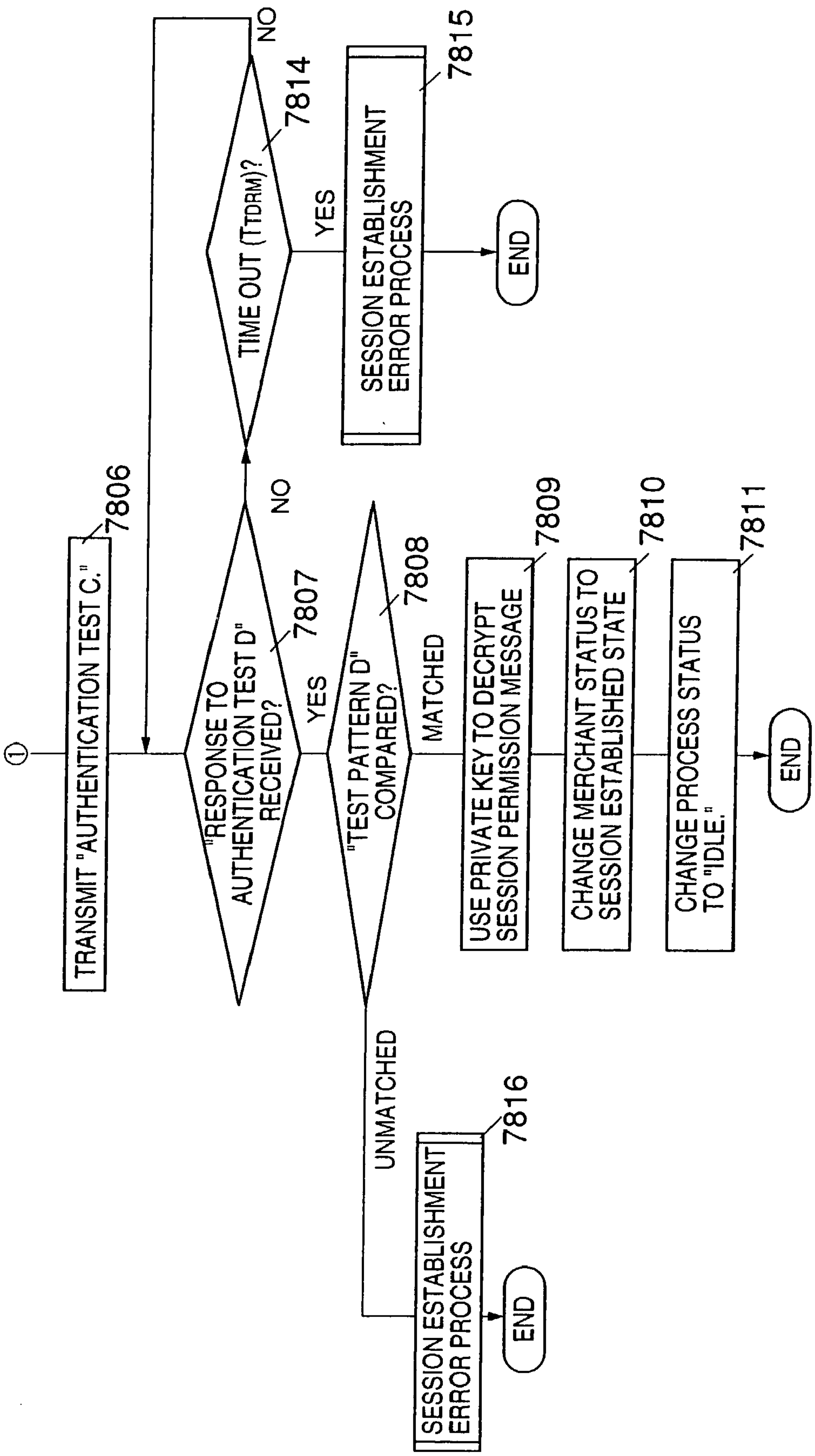
Figure 110:
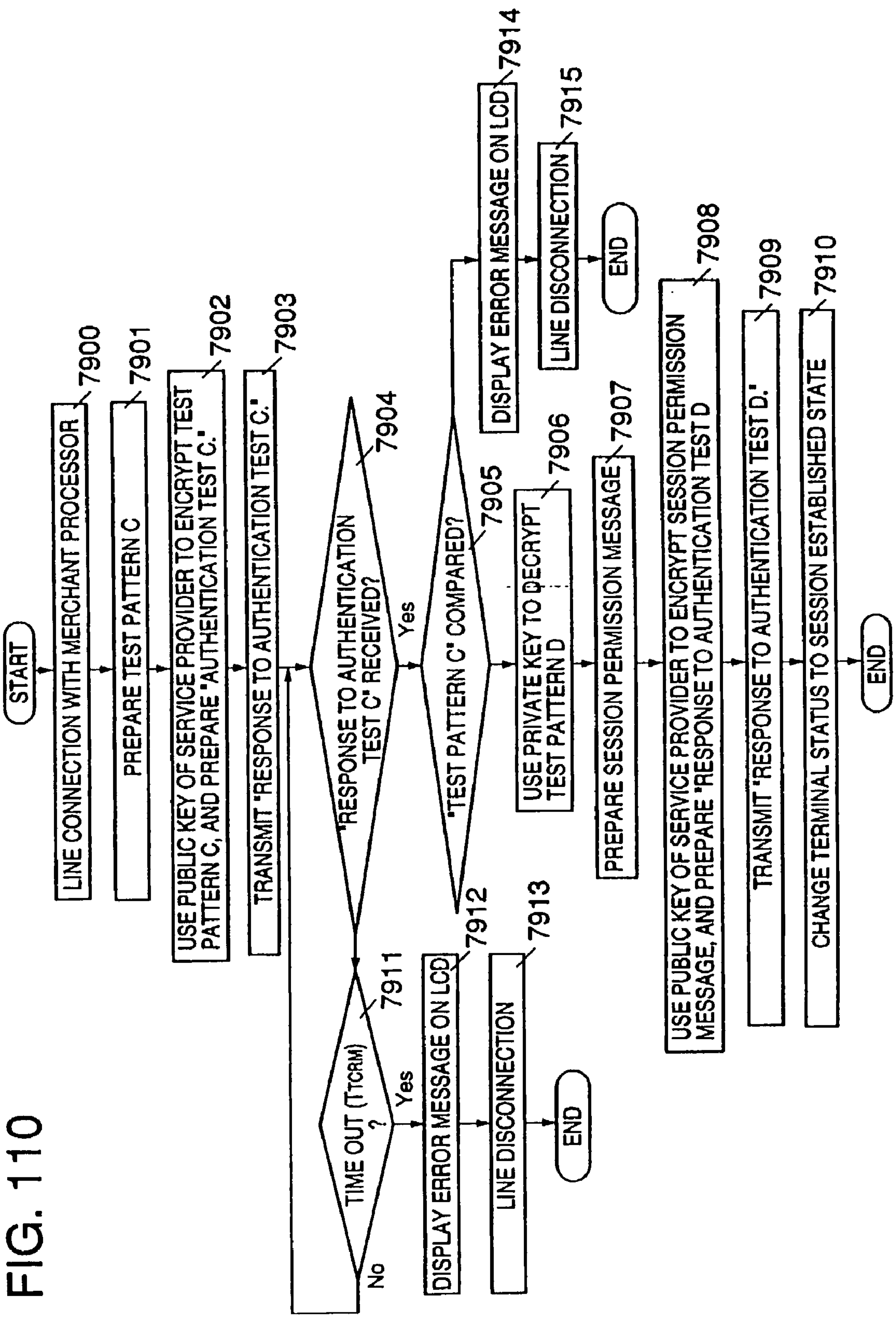
Figure 111A:
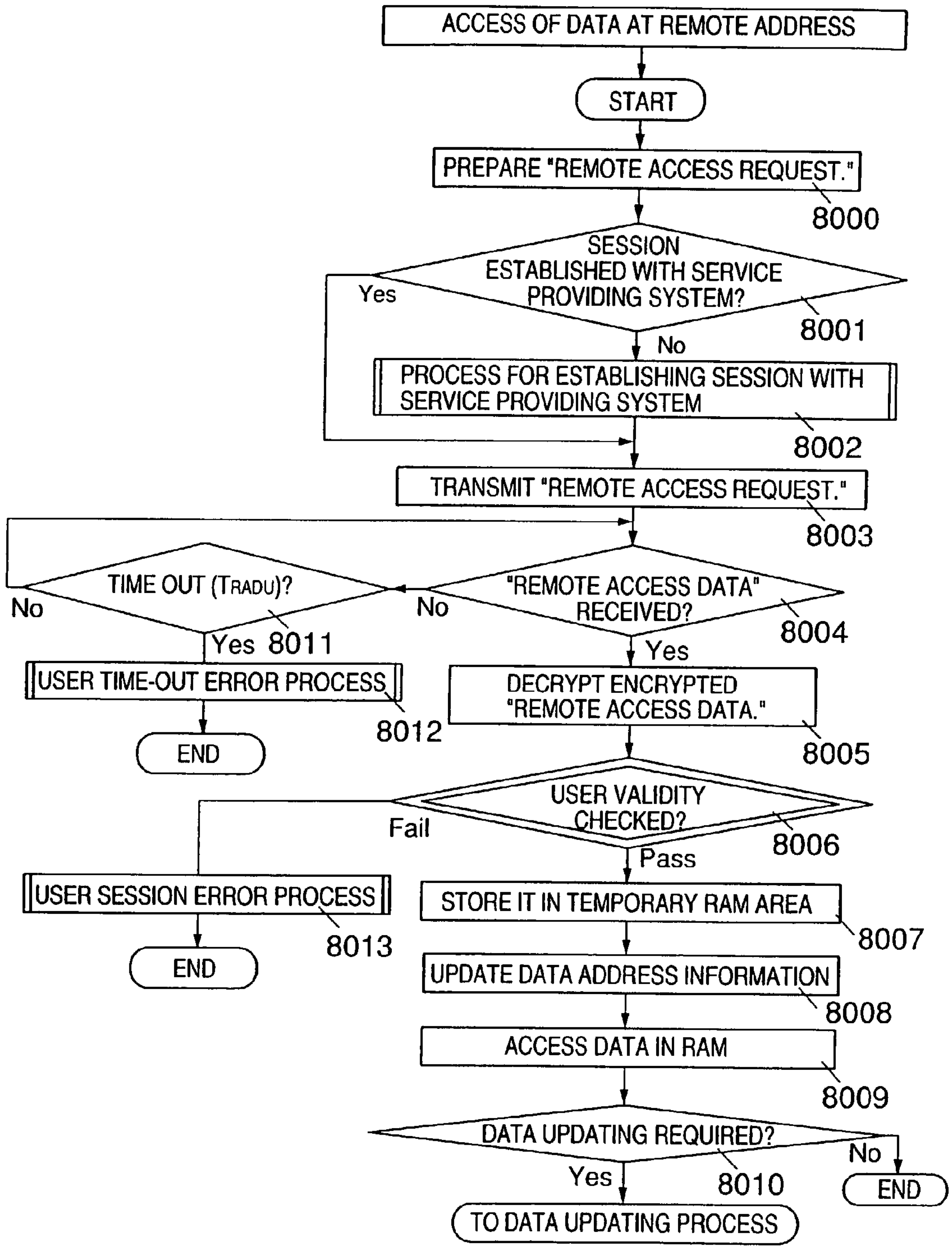
Figure 111B:
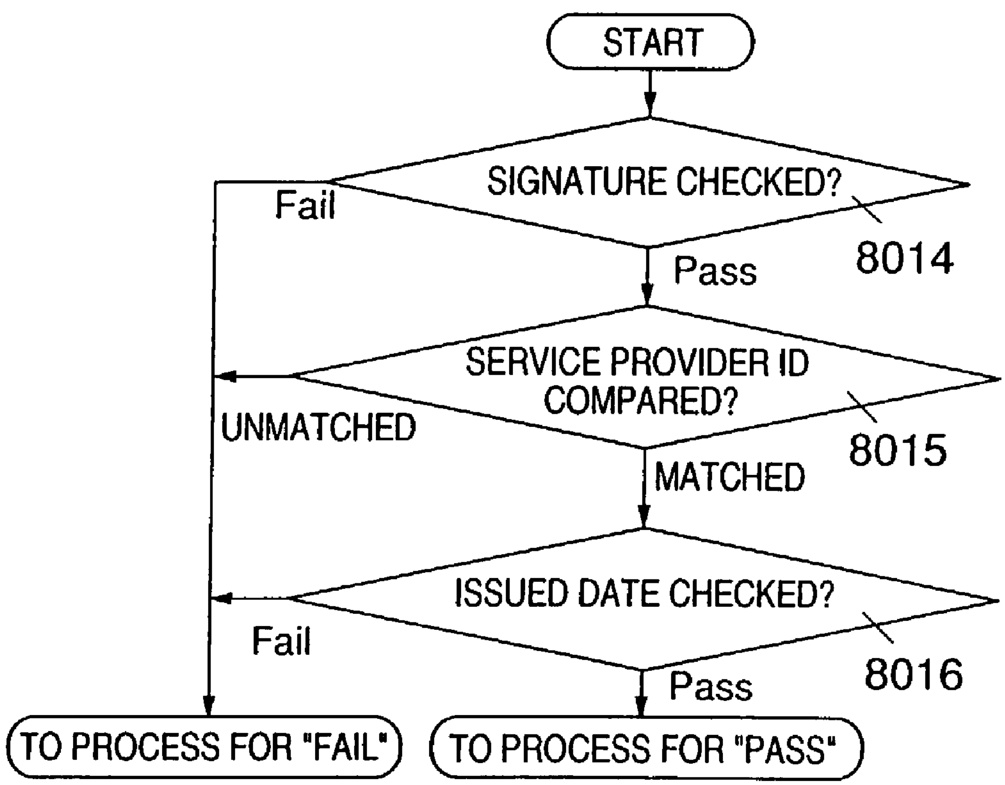
Figure 112A:
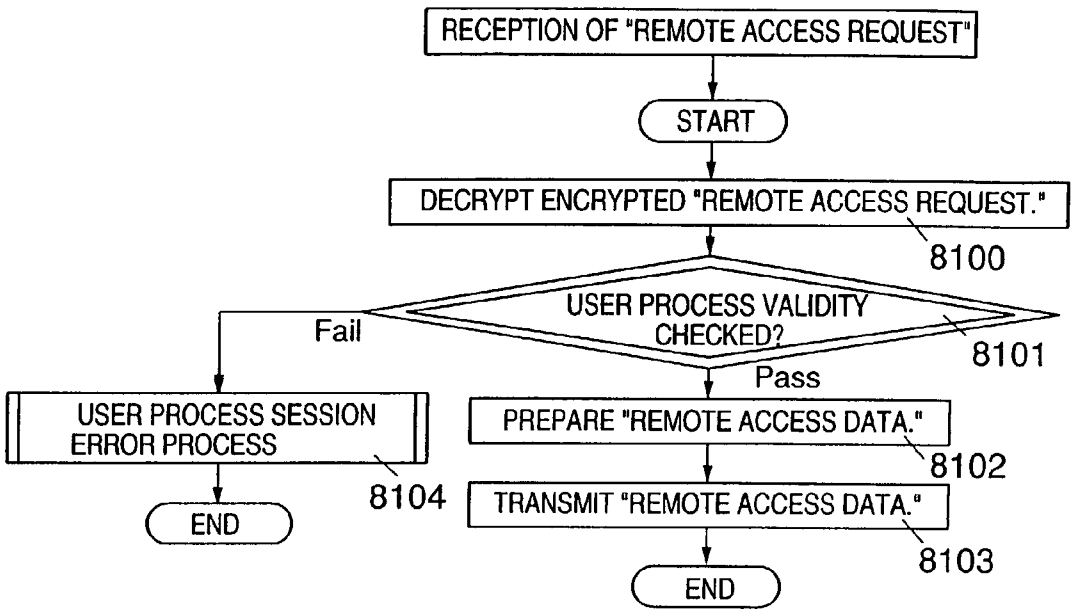
Figure 112B:
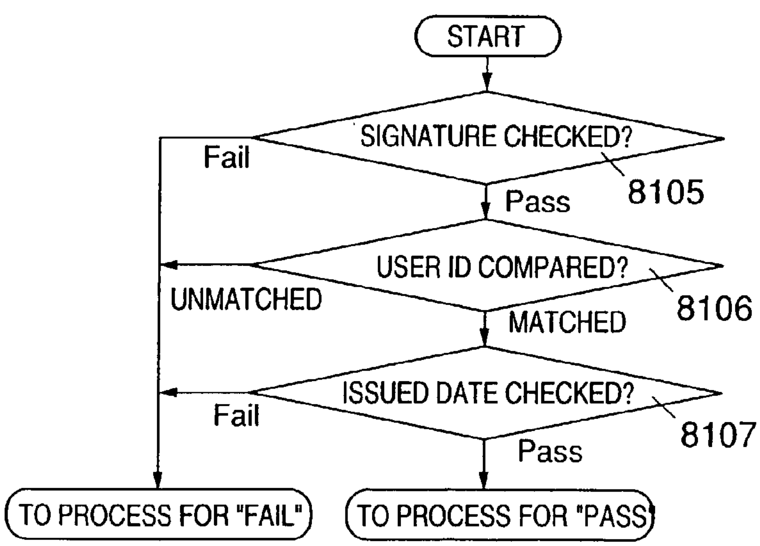
Figure 113A:
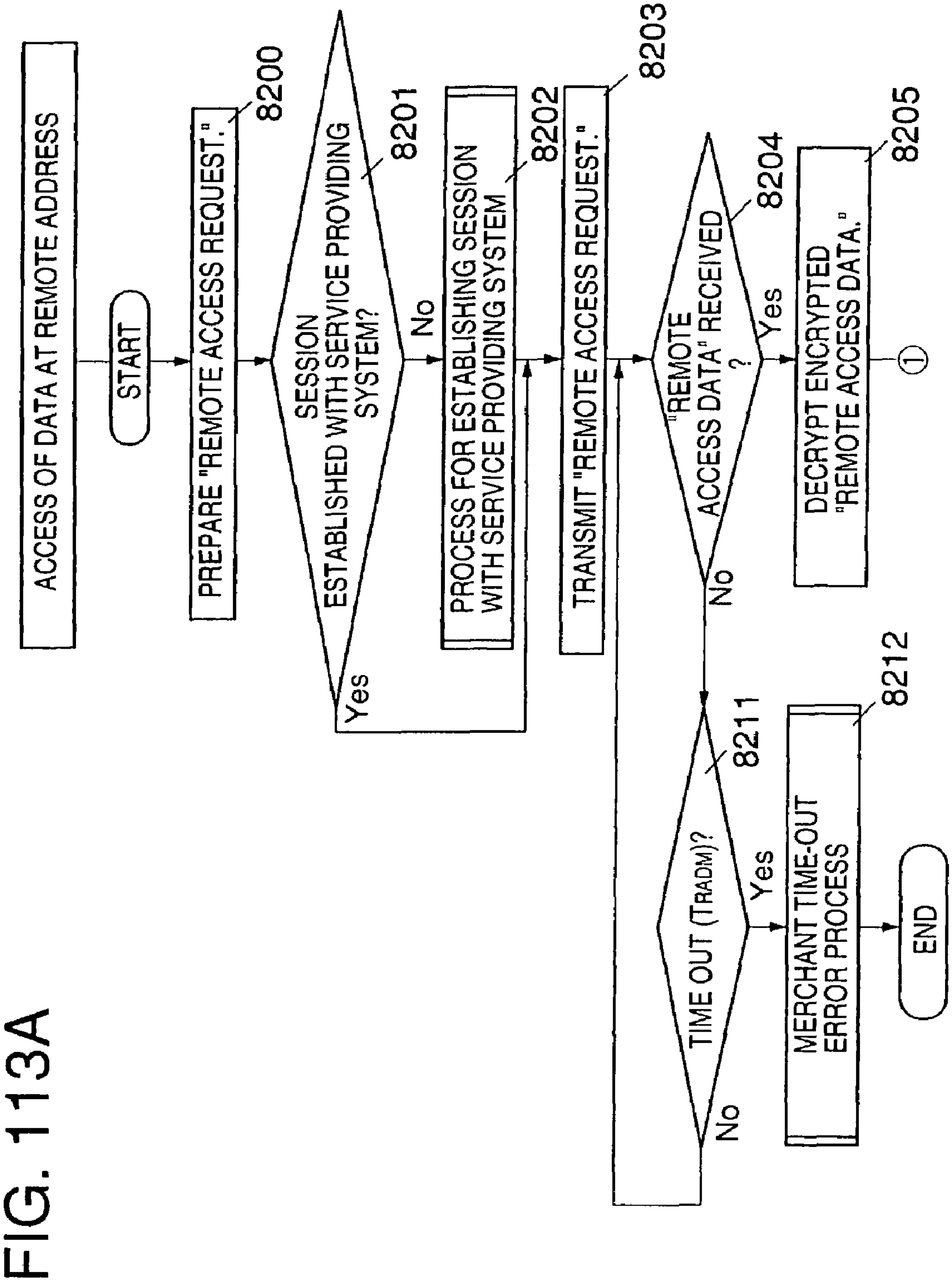
Figure 113B:
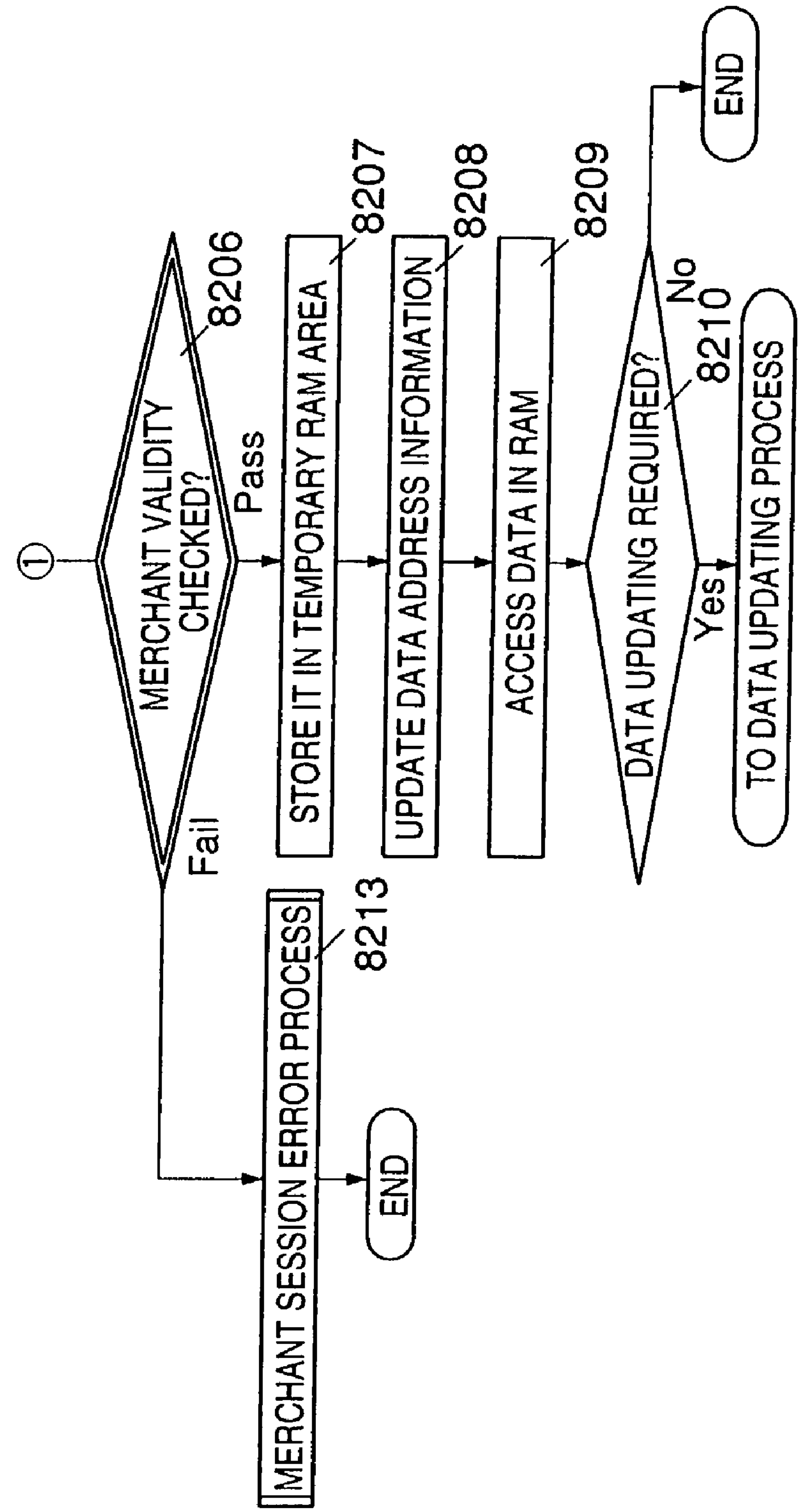
Figure 113C:
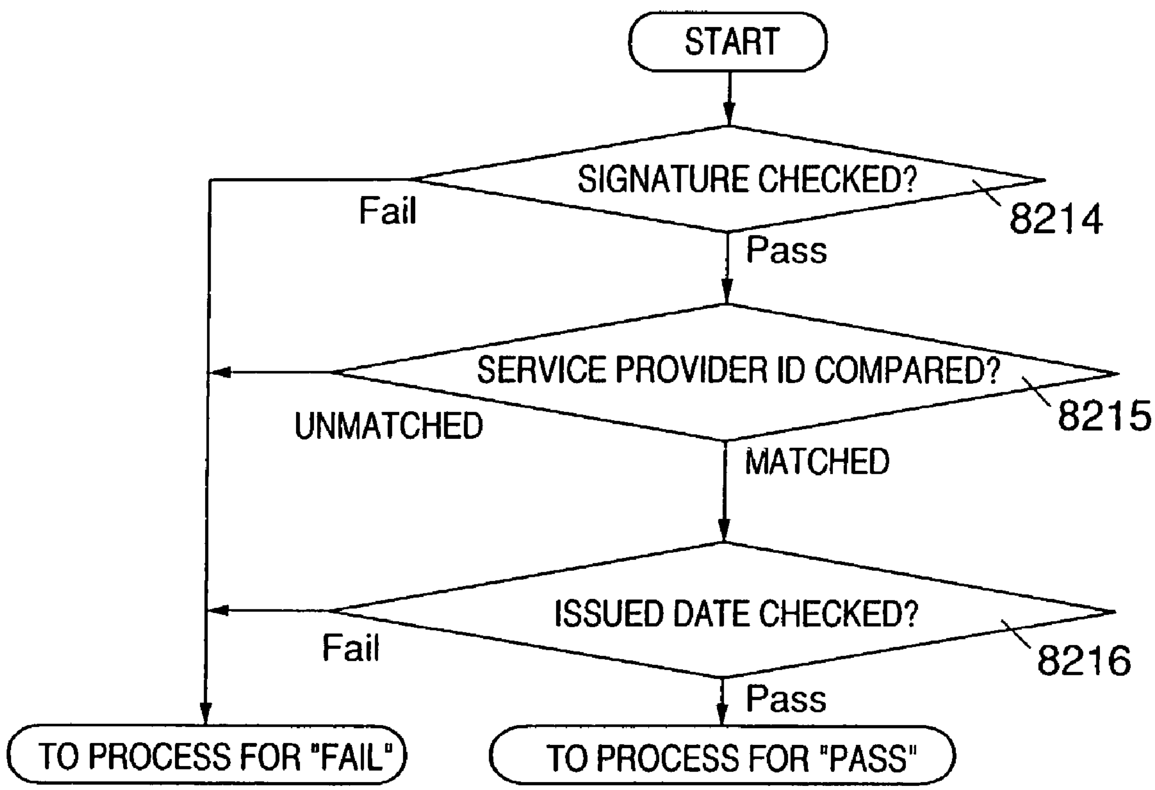
Figure 114A:
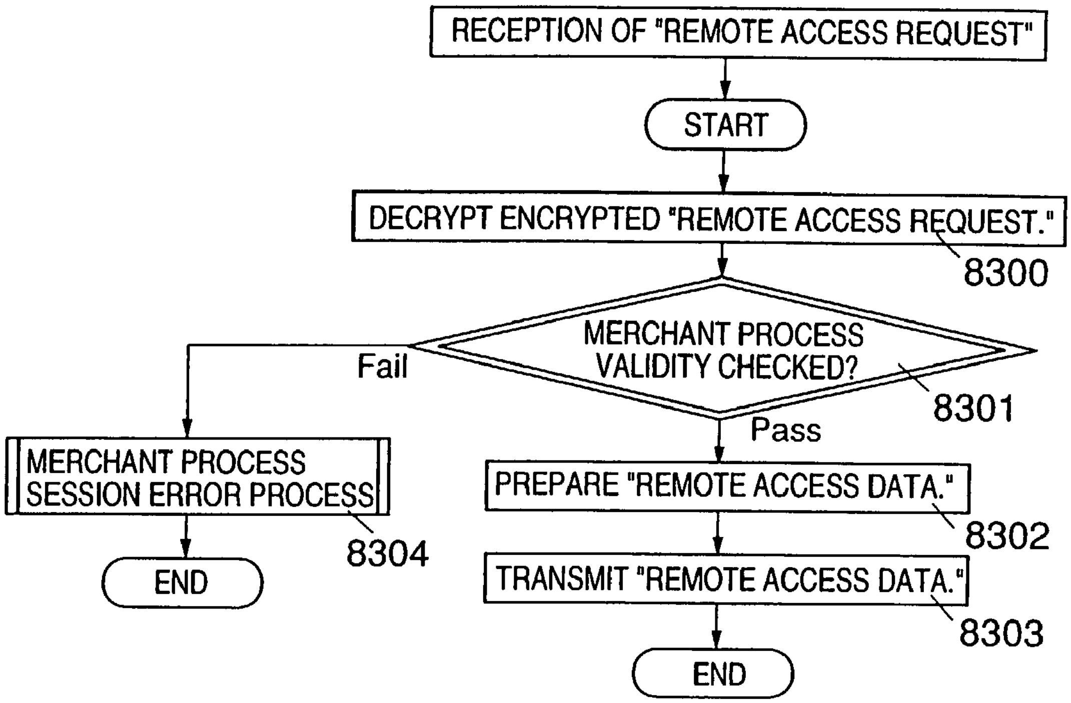
Figure 114B:
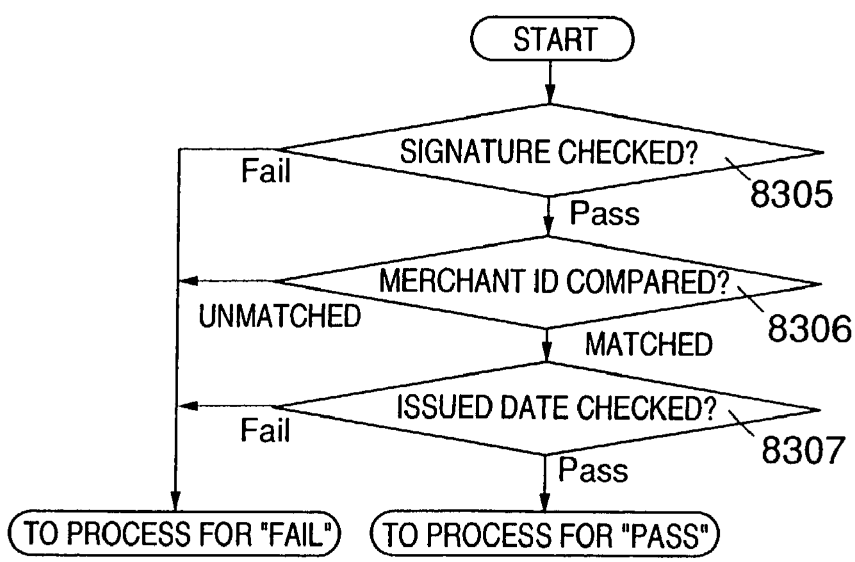
Figure 115A:
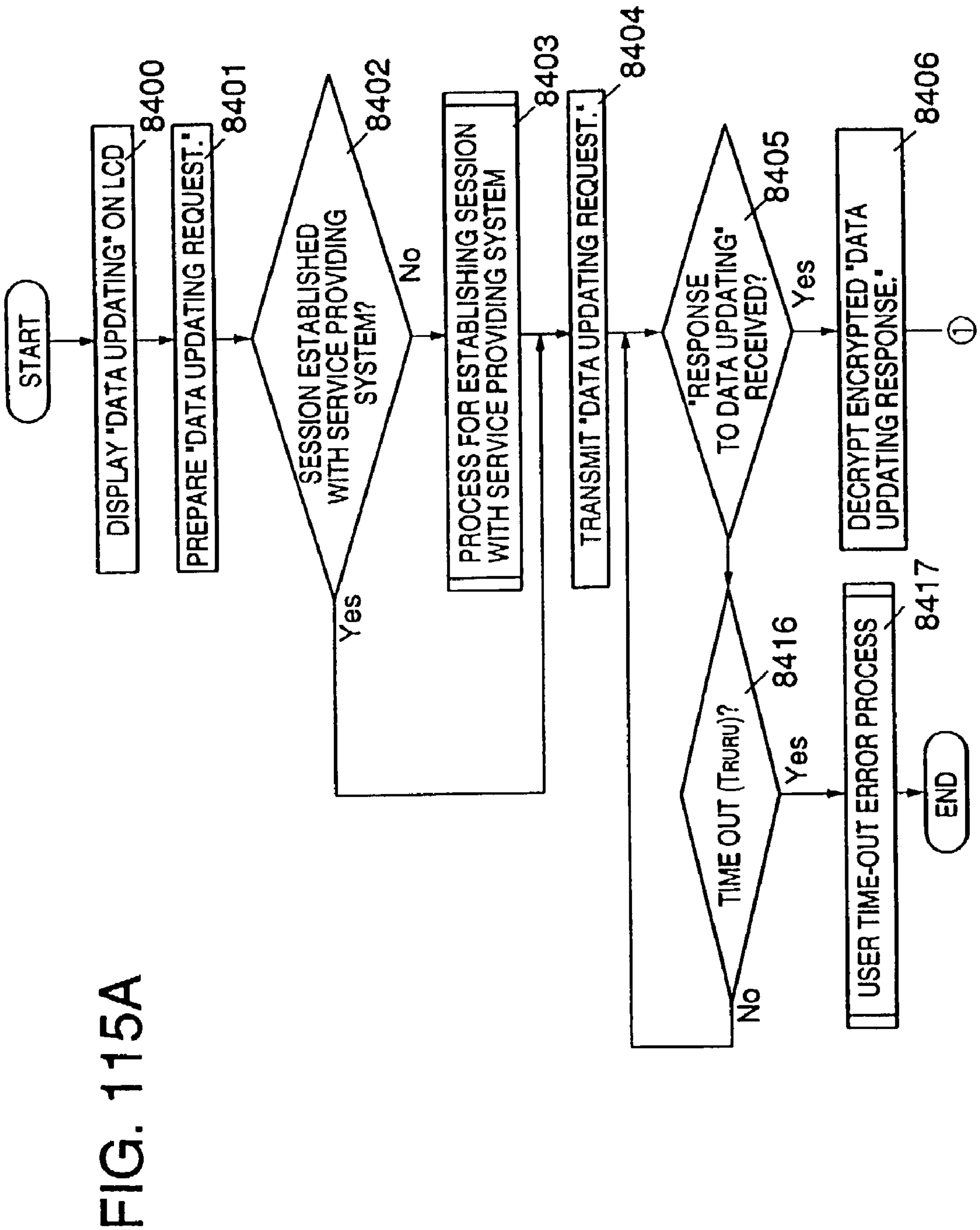
Figure 115B:
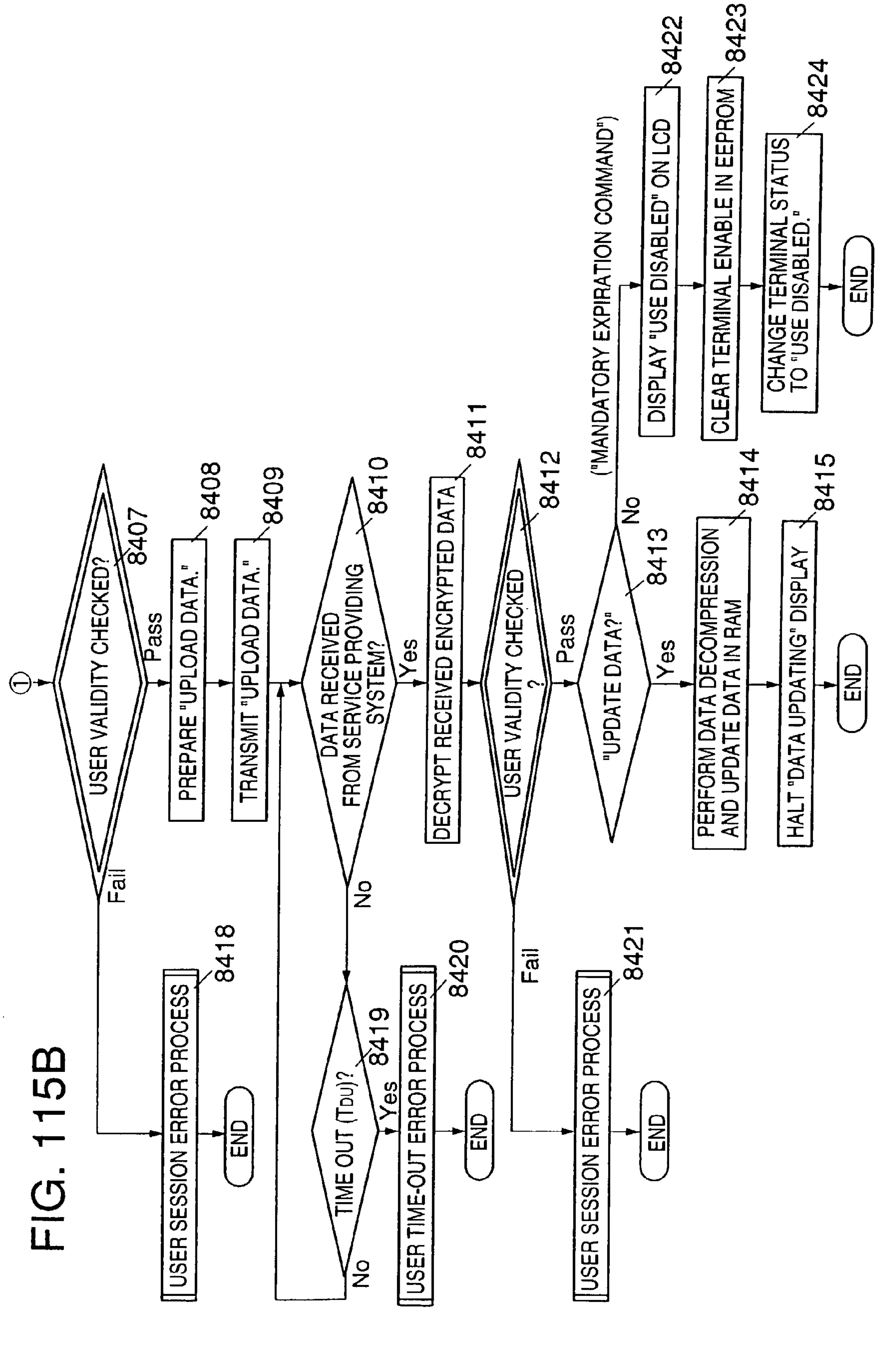
Figure 116:
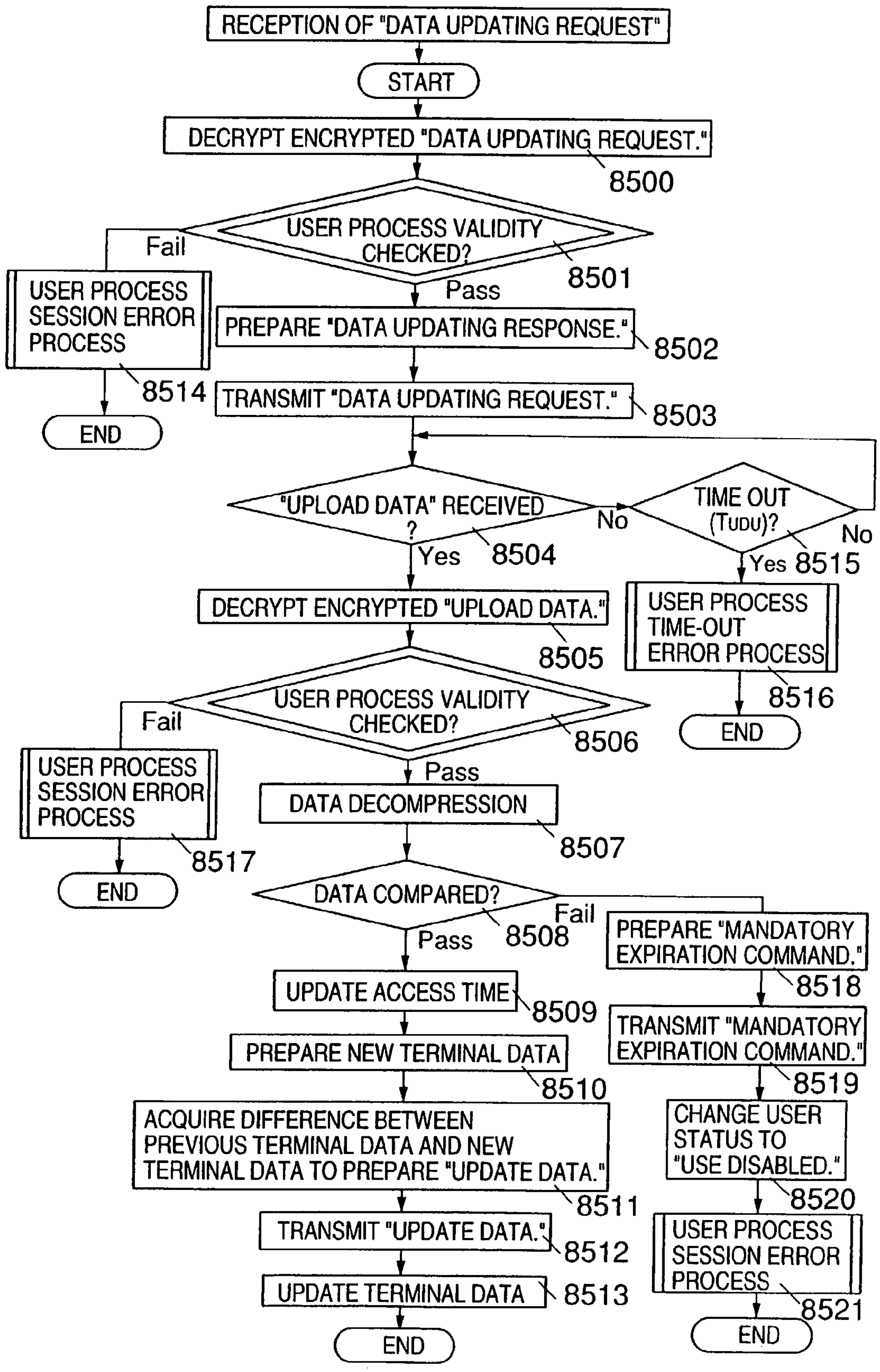
Figure 117:
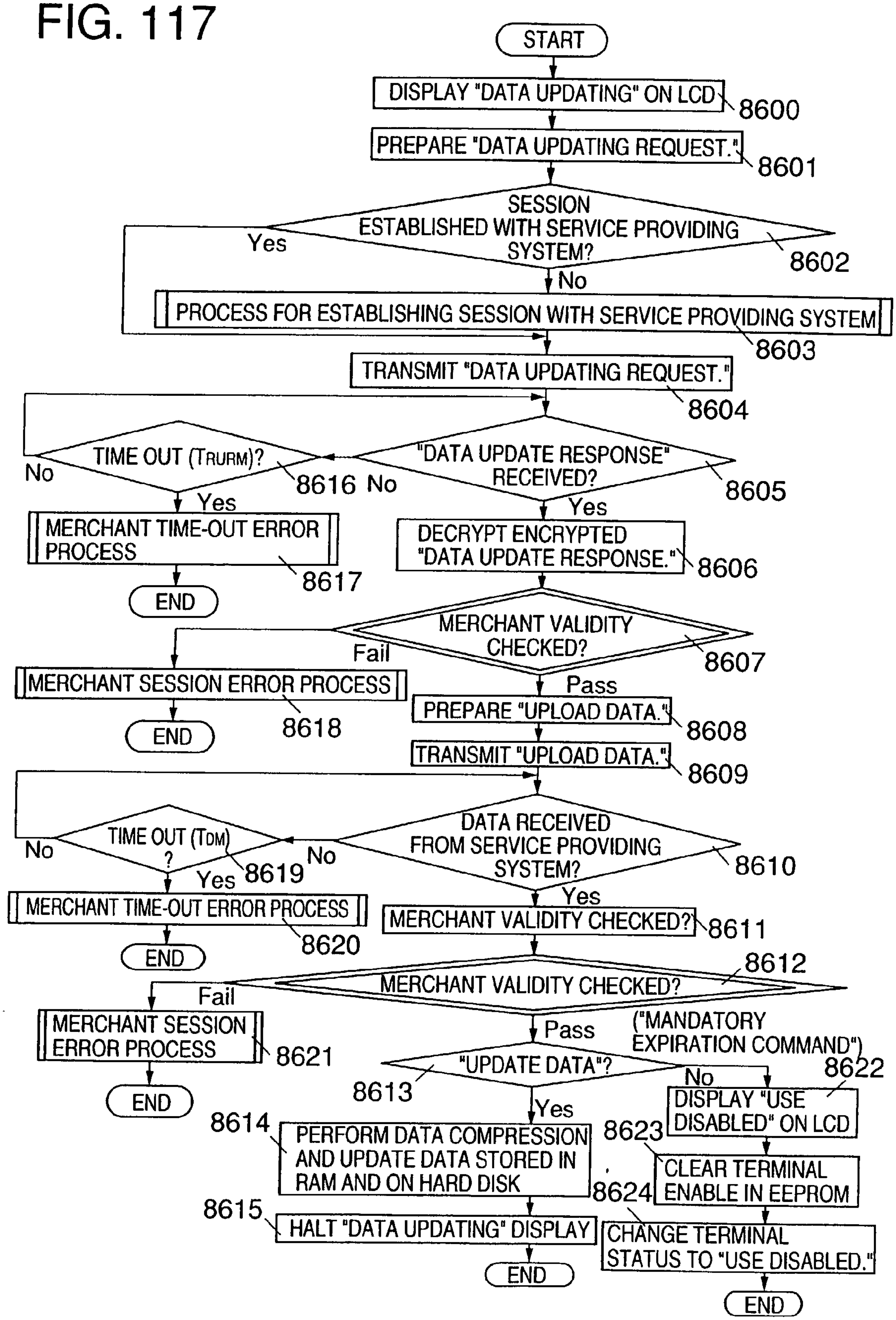
Figure 118:
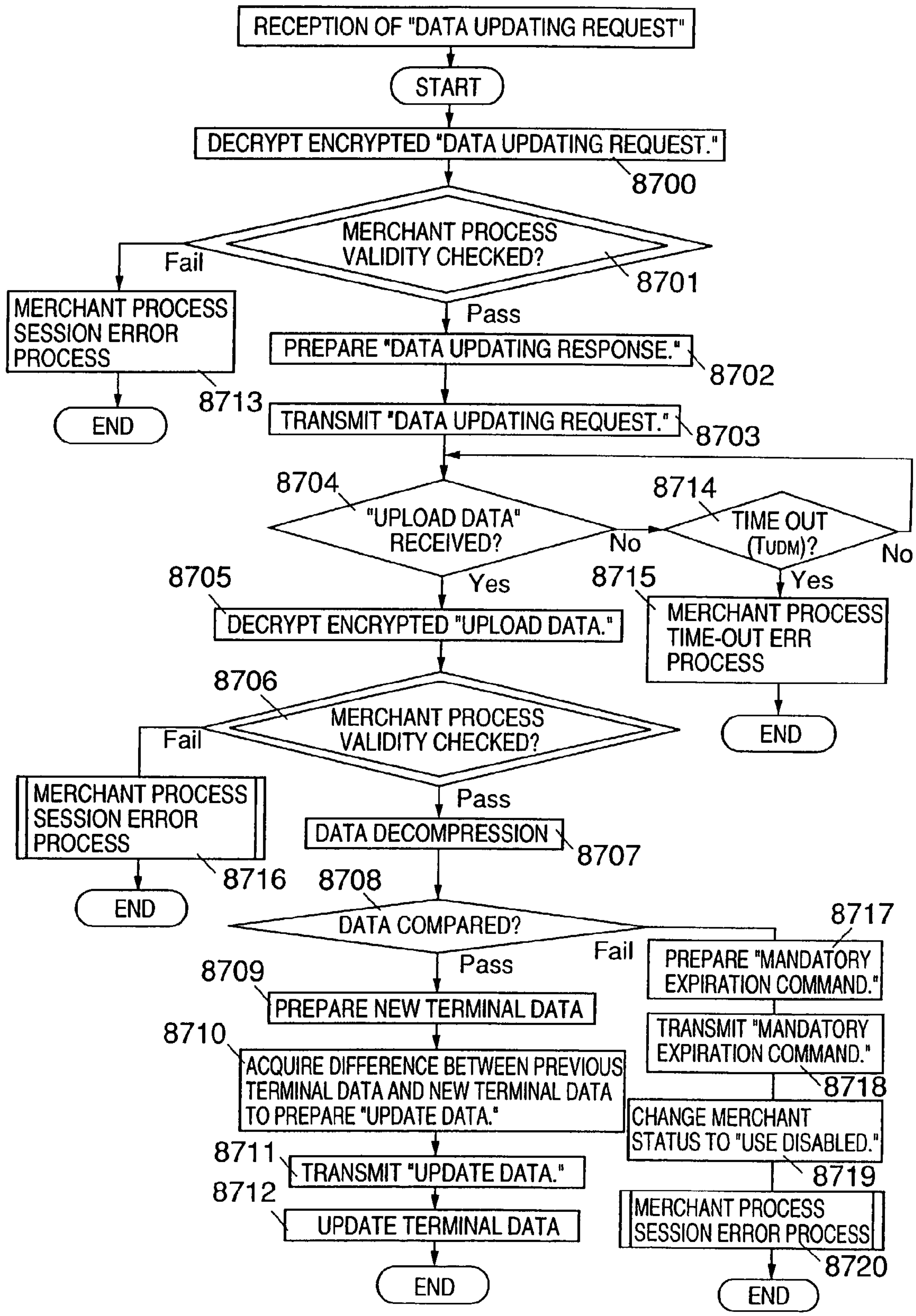
Figure 119:
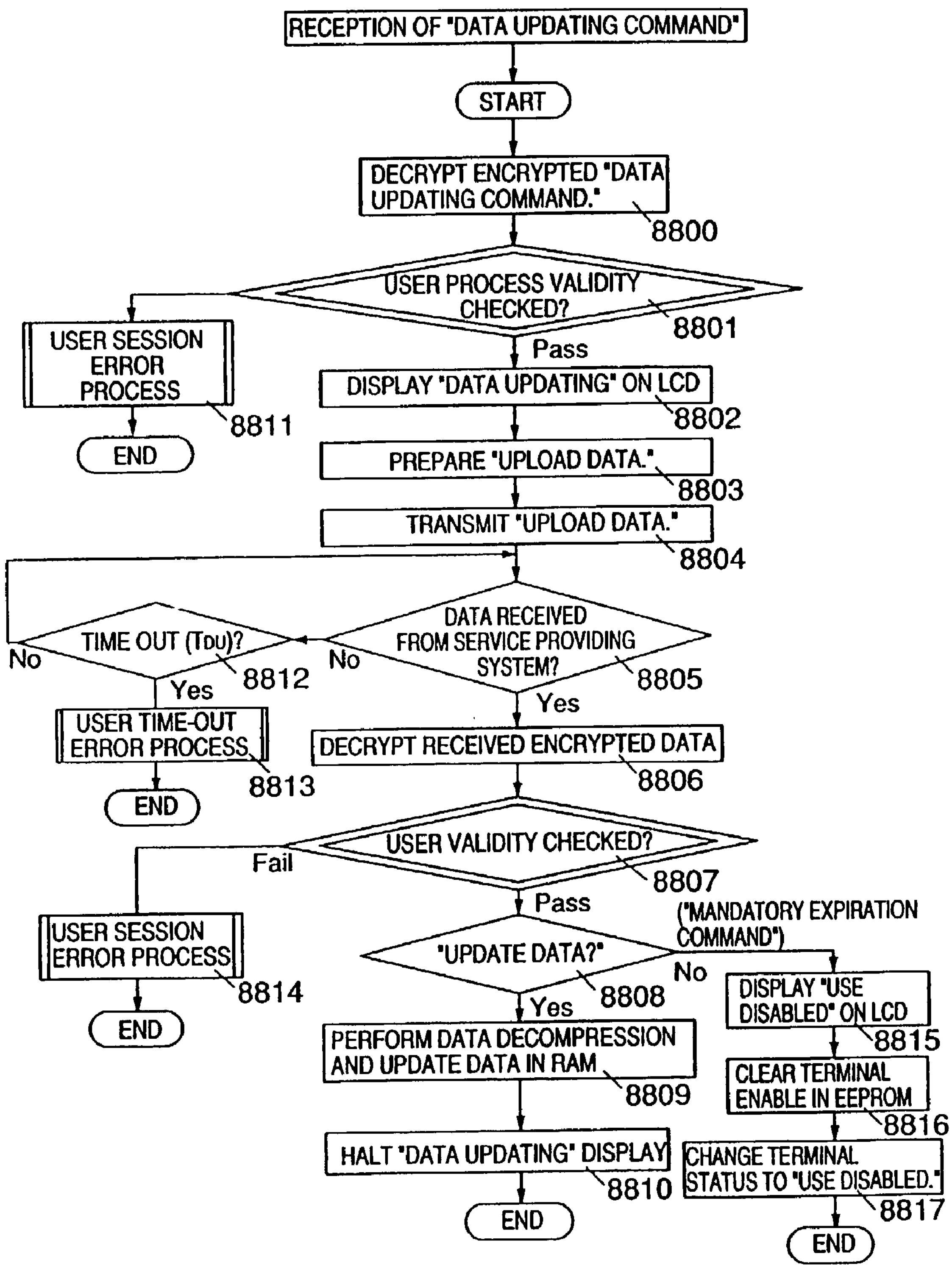
Figure 120A:
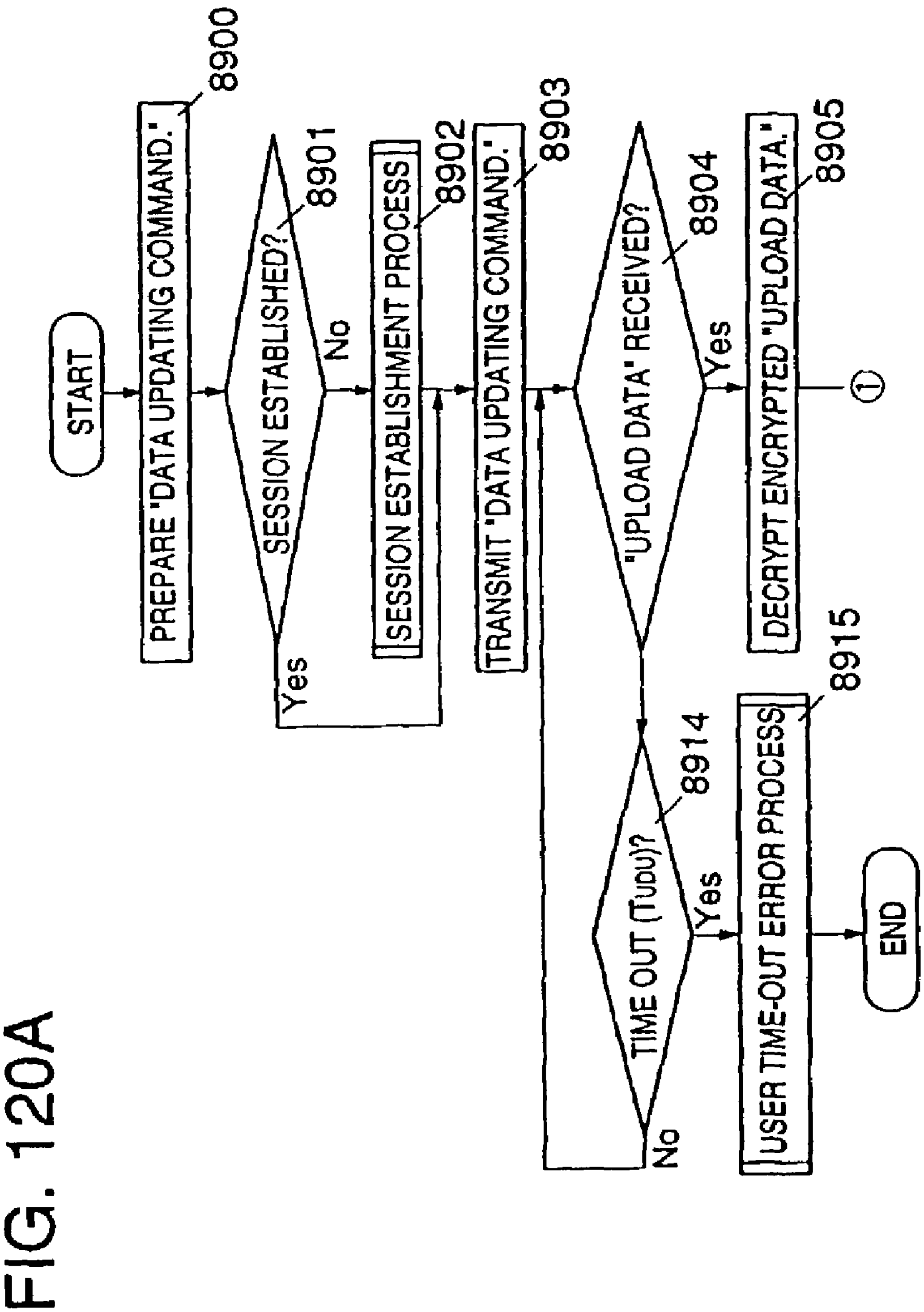
Figure 120B:
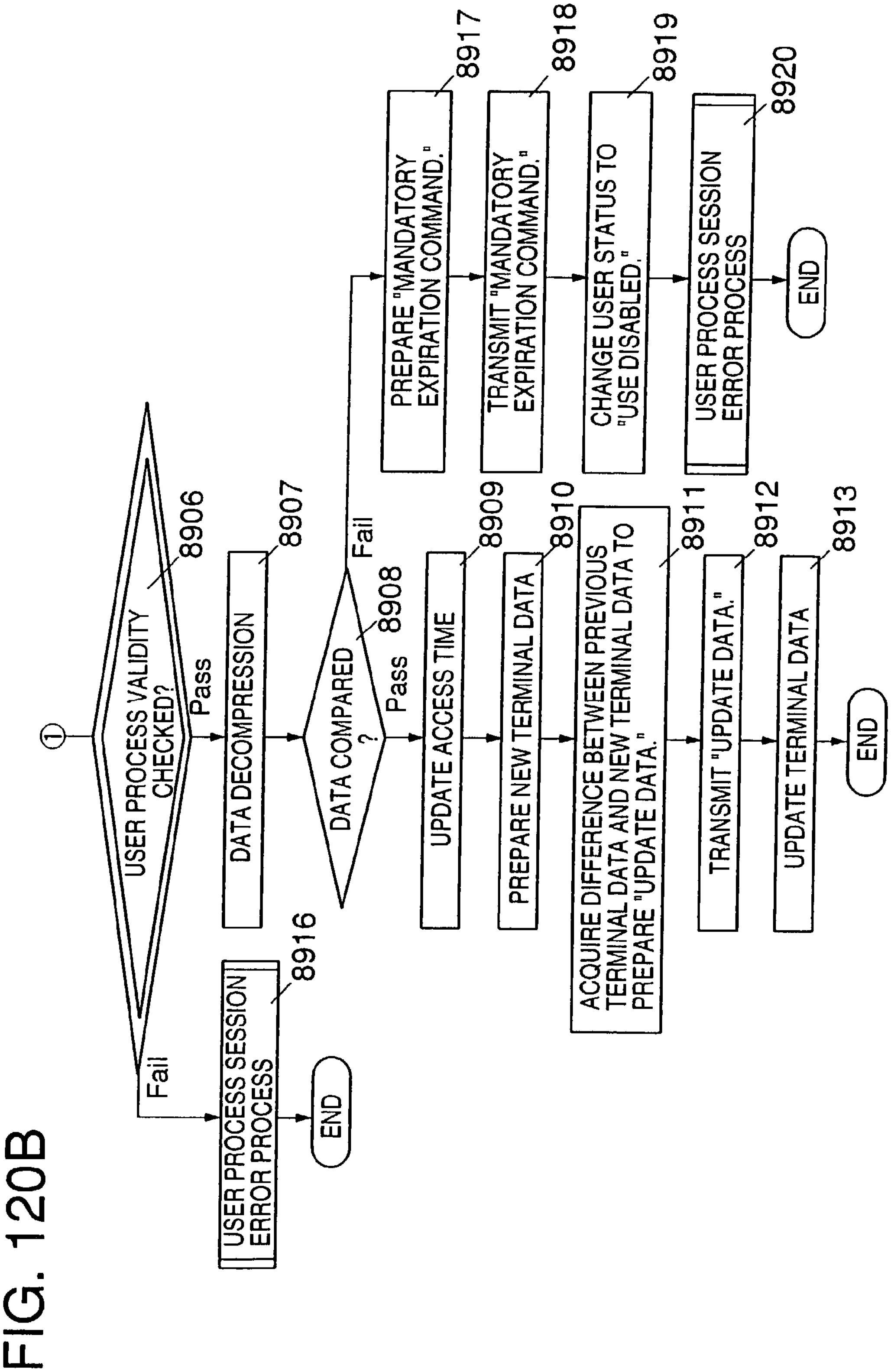
Figure 121:
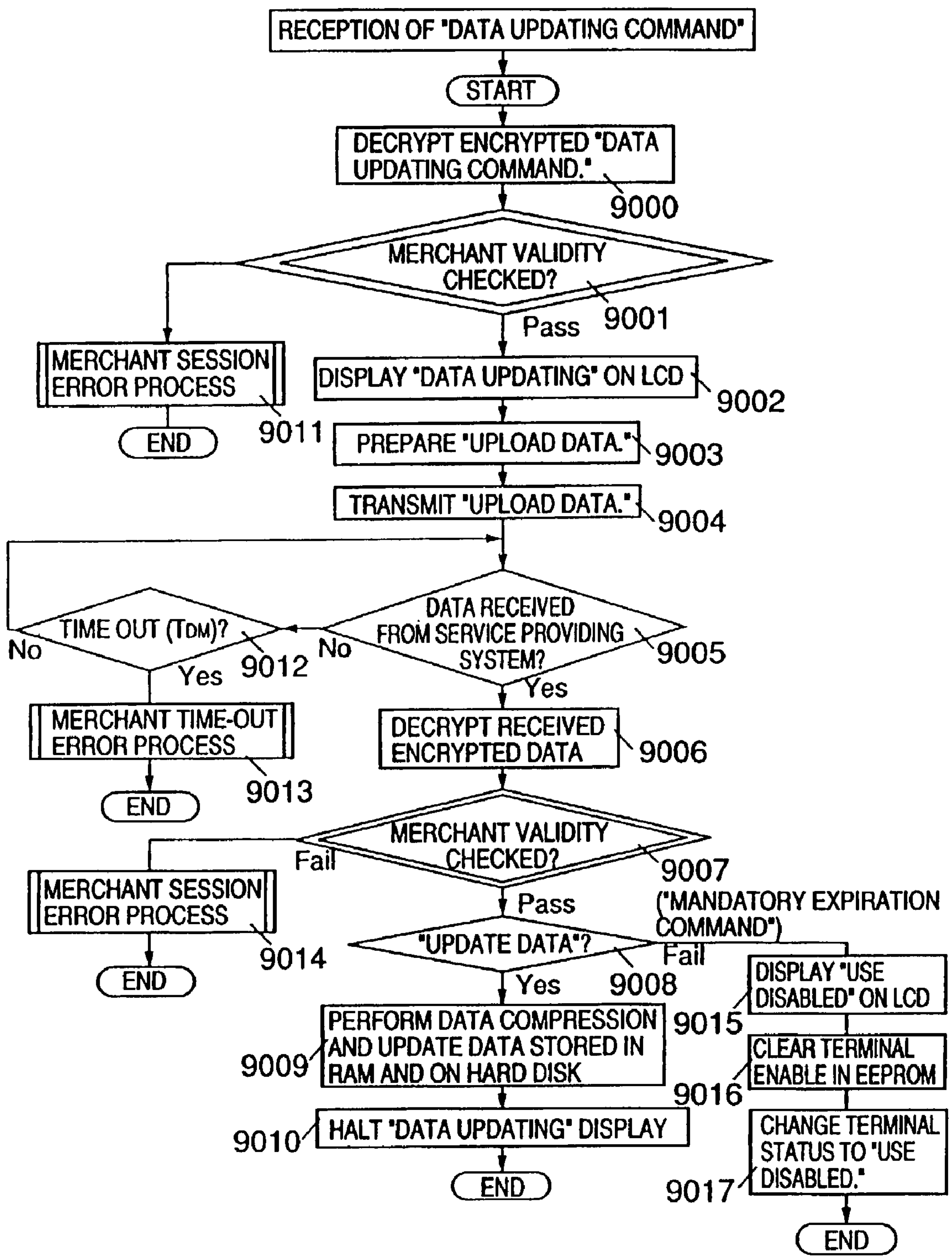
Figure 122:
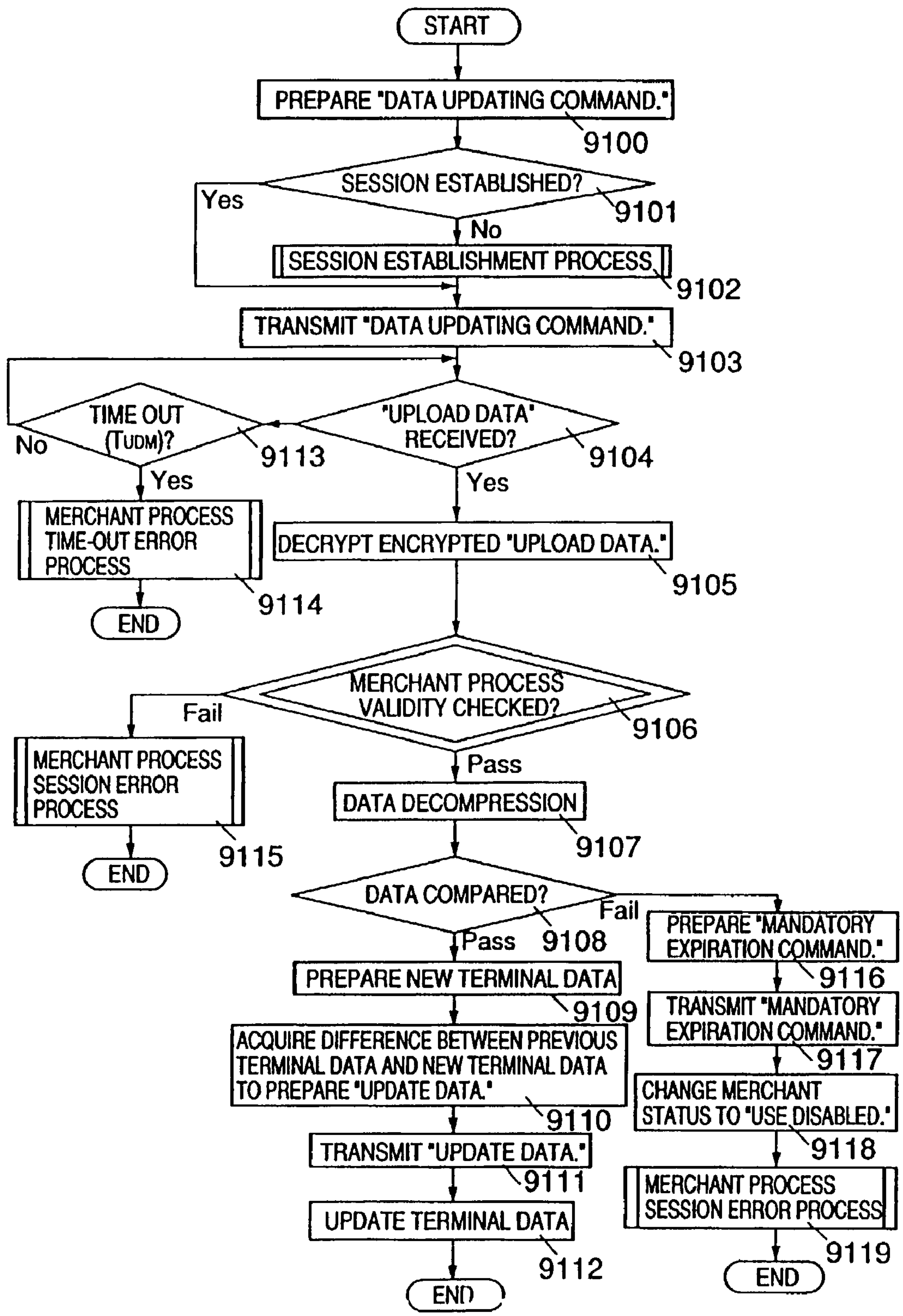
Figure 123:
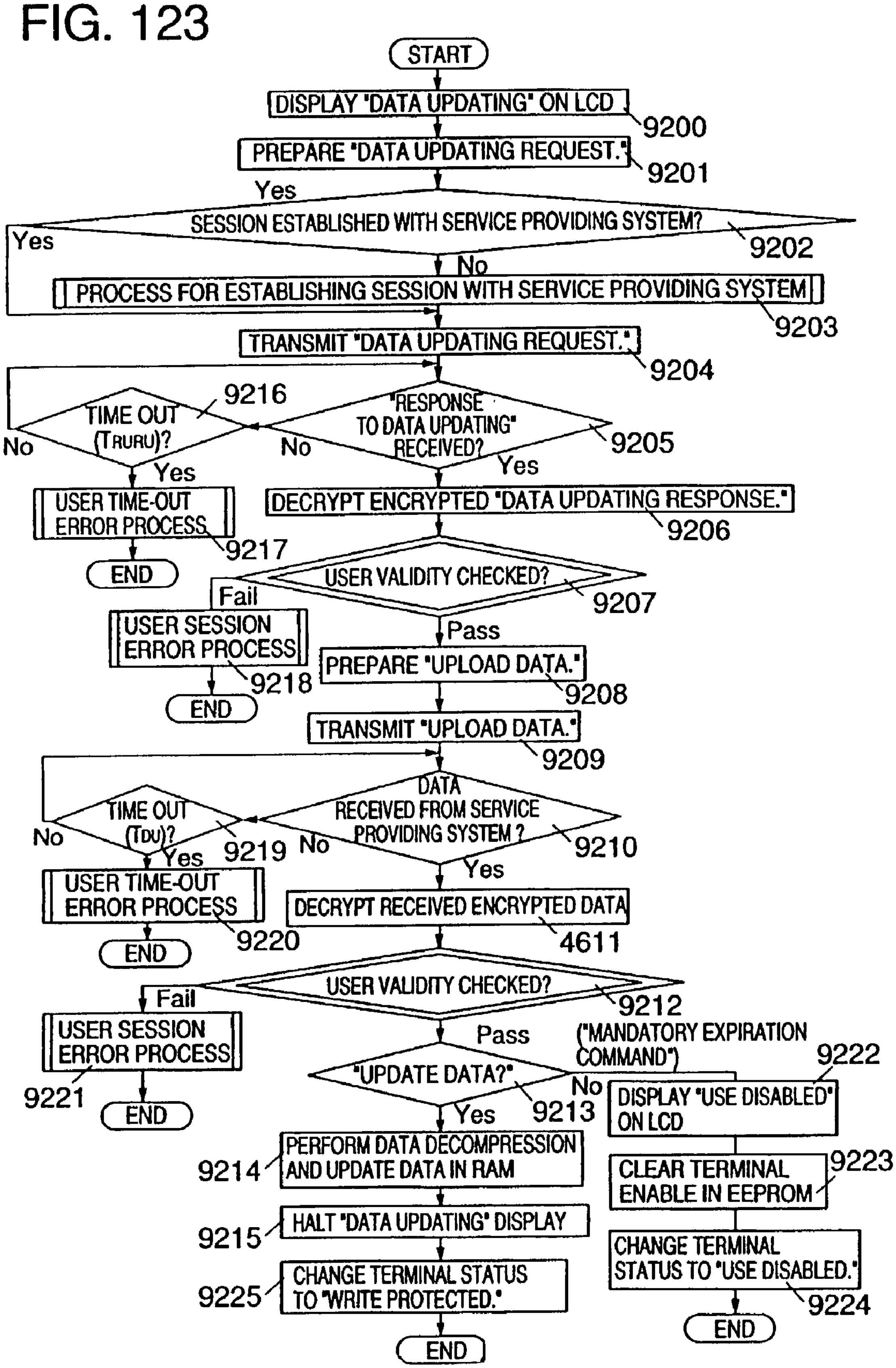
Figure 124A:
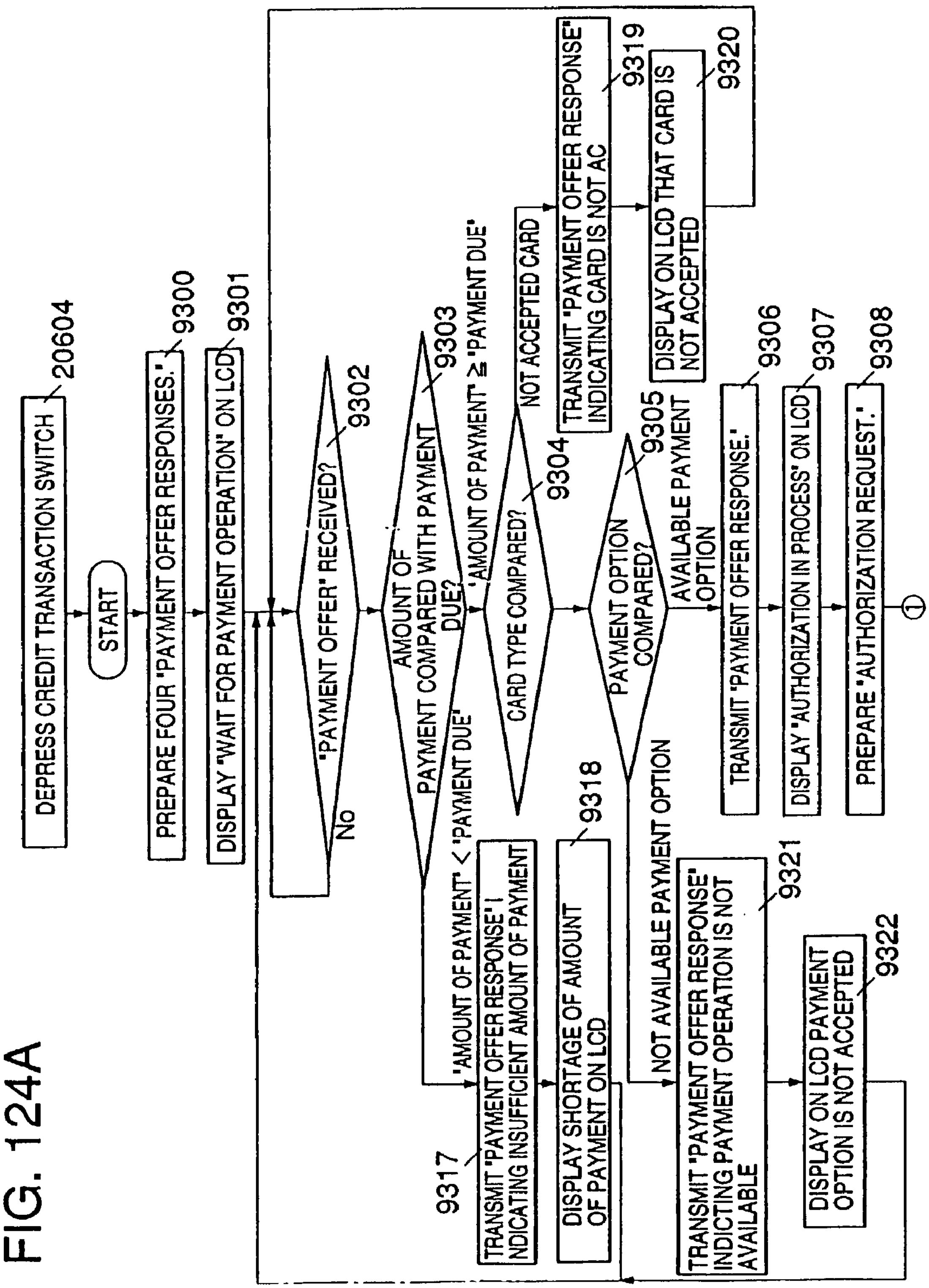
Figure 124B:
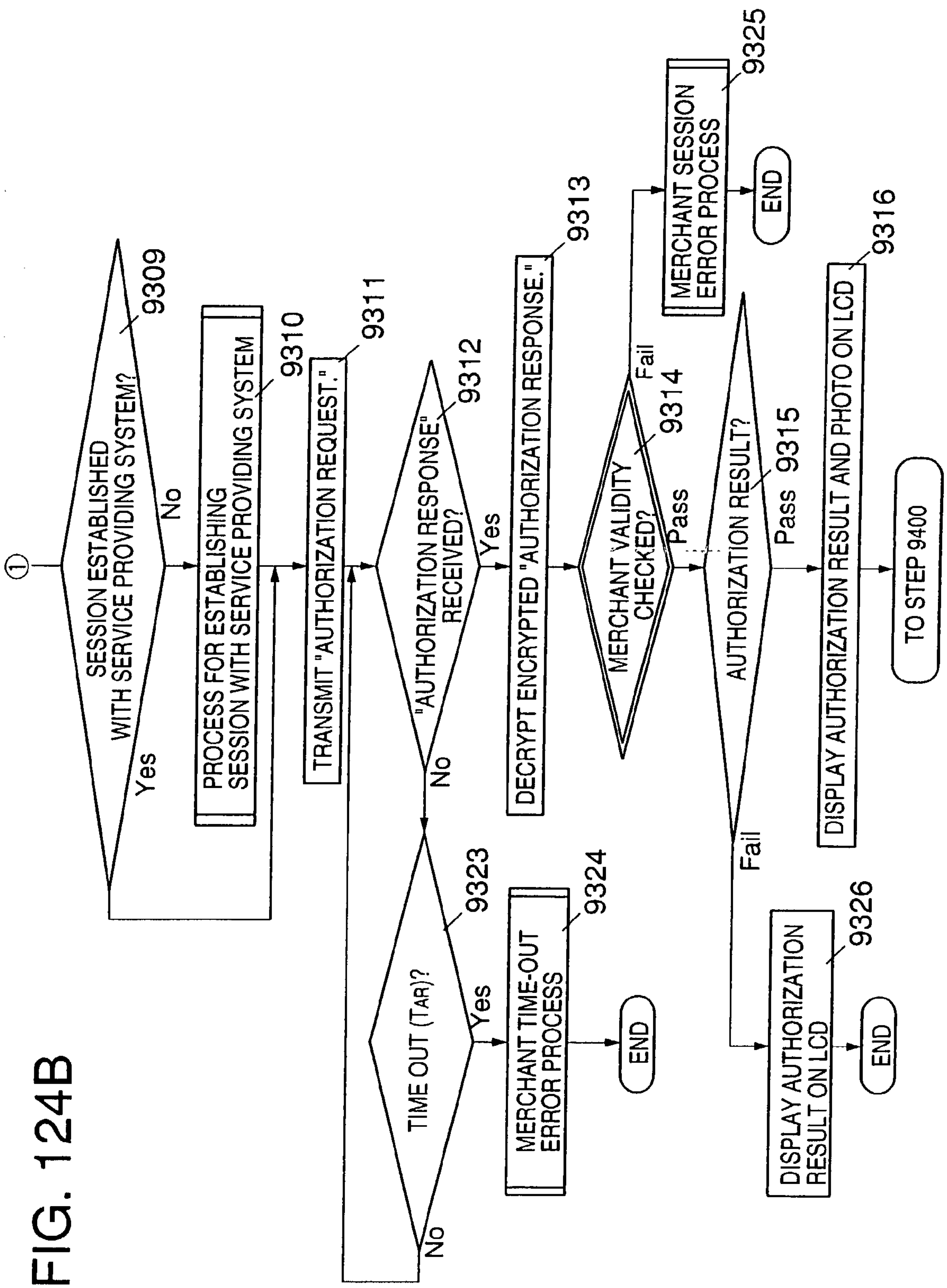
Figure 125A:
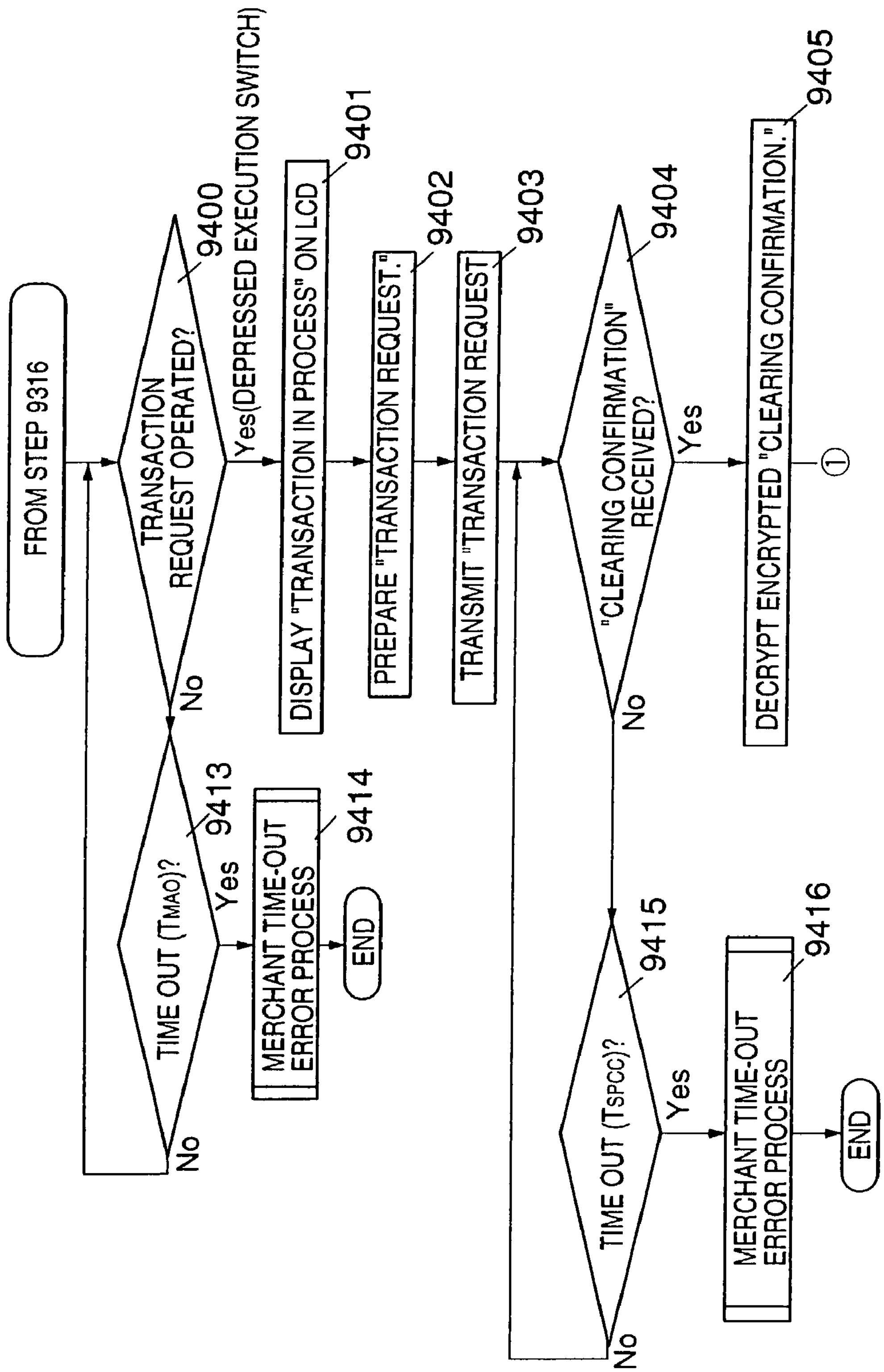
Figure 125B:
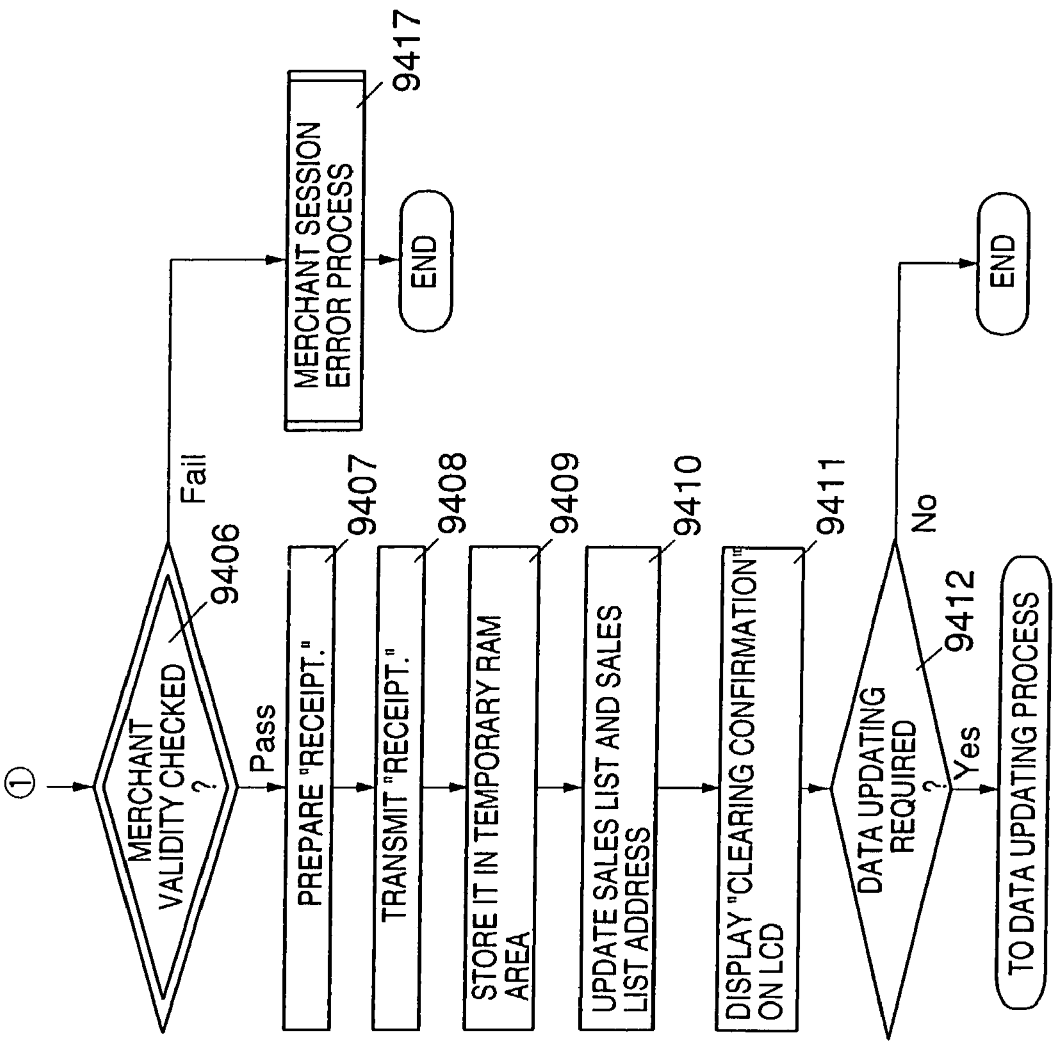
Figure 126A:
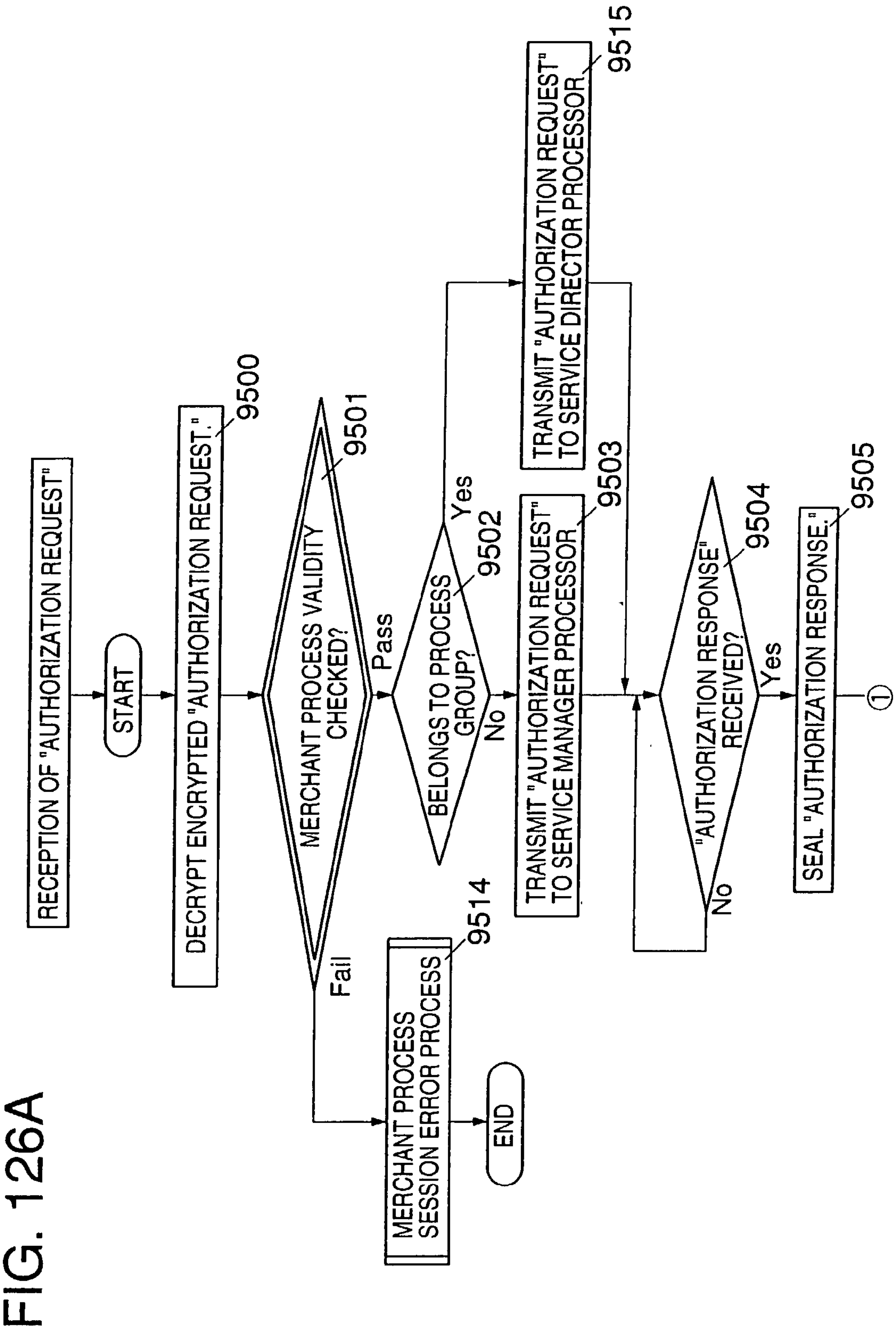
Figure 126B:
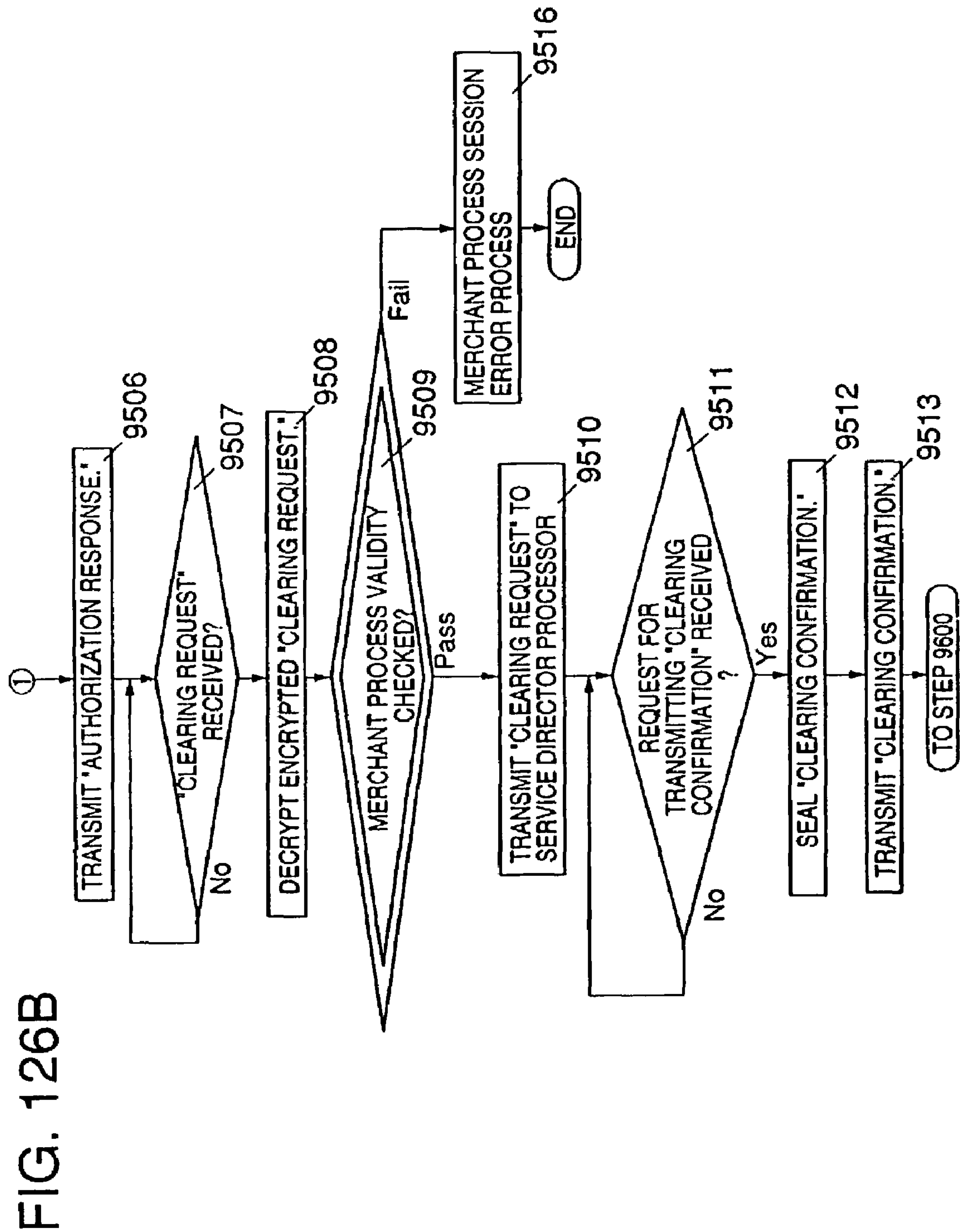
Figure 127:
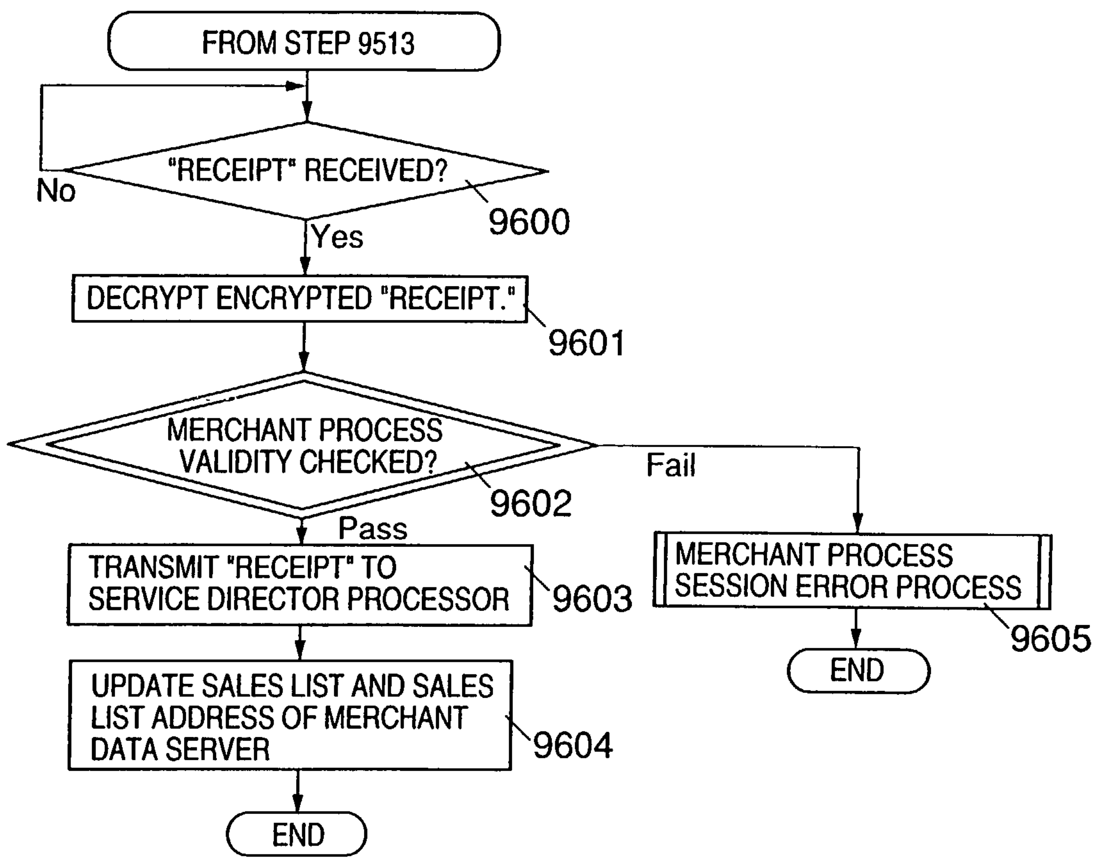
Figure 128A:
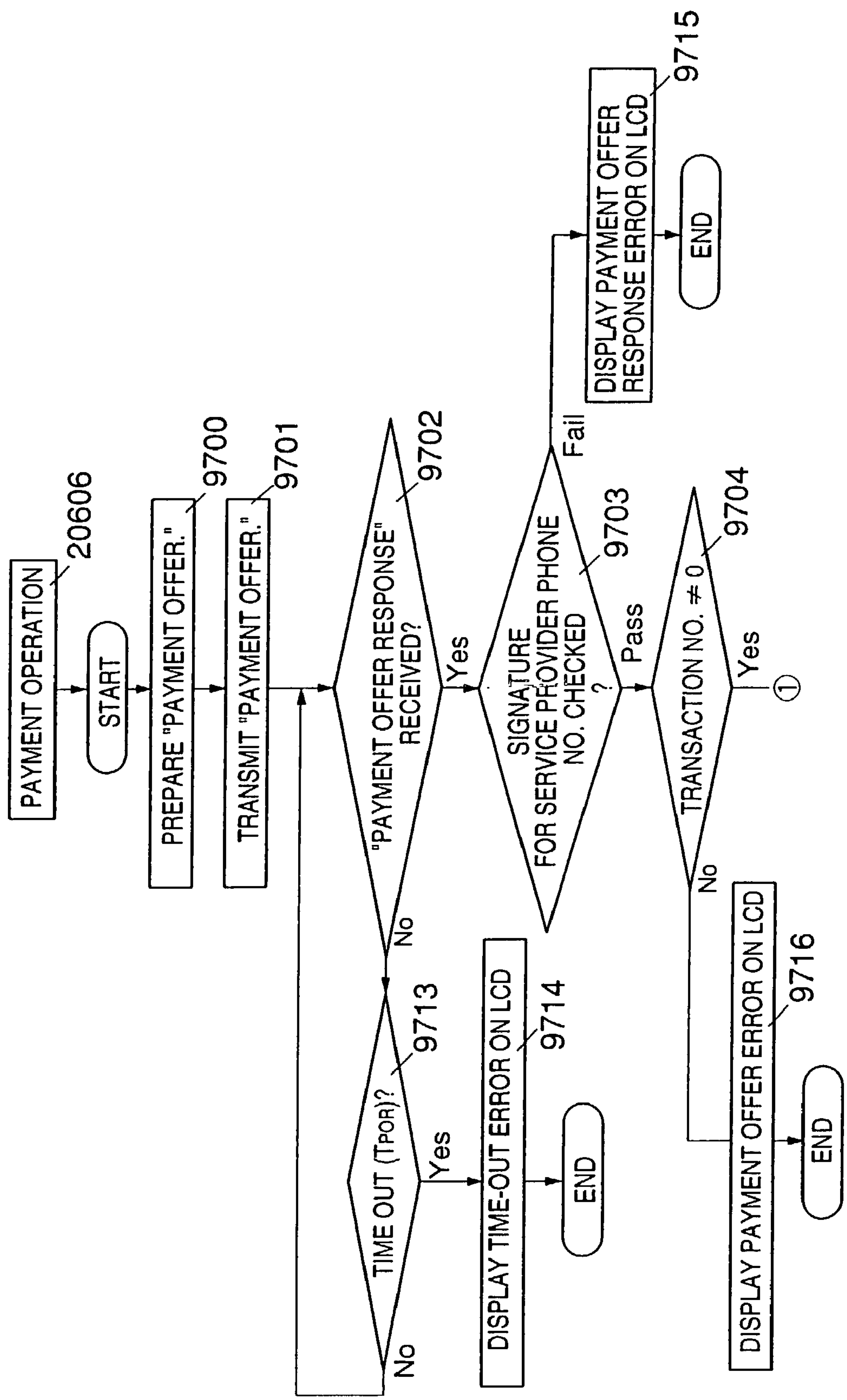
Figure 128B:
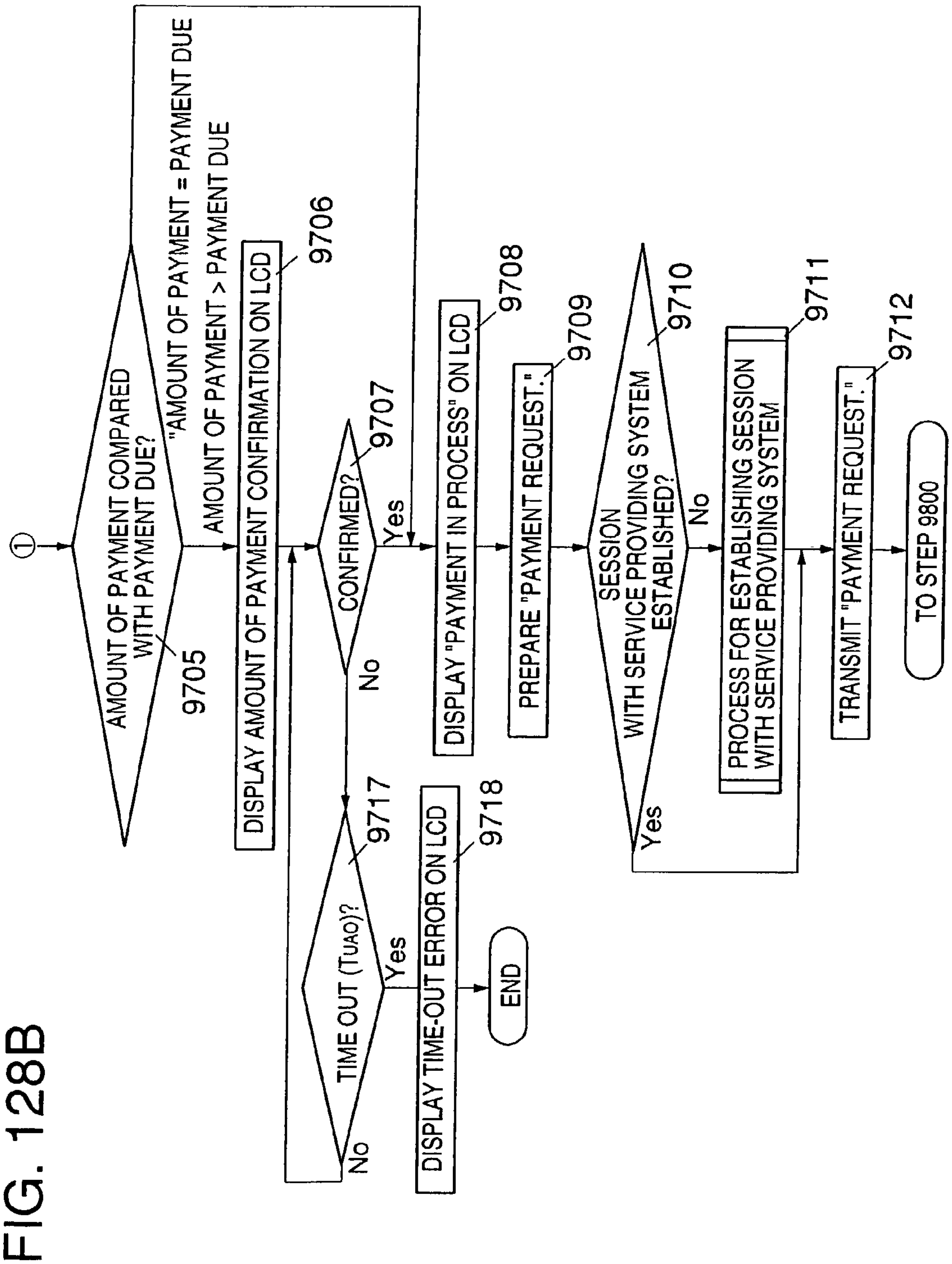
Figure 129:
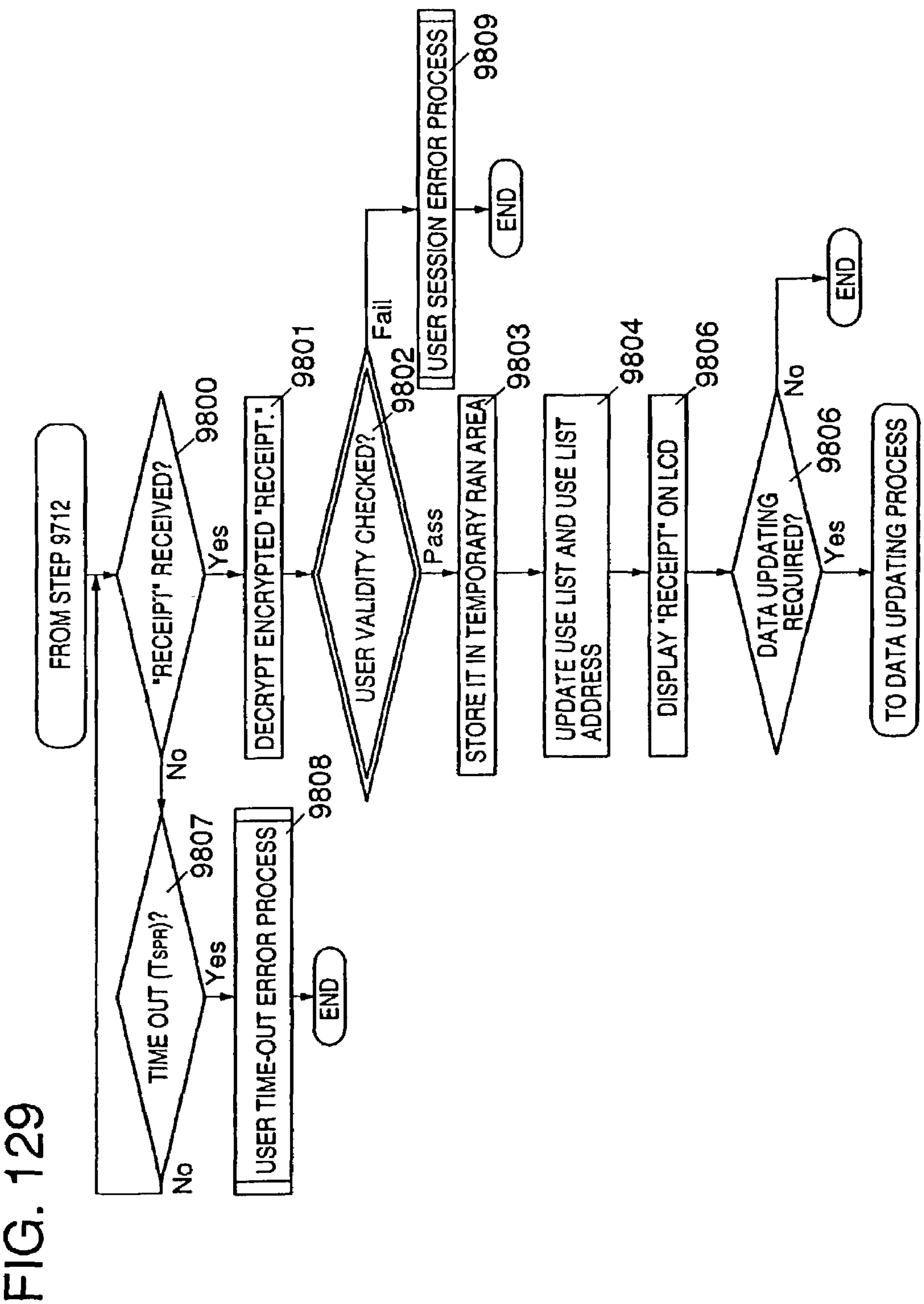
Figure 130:
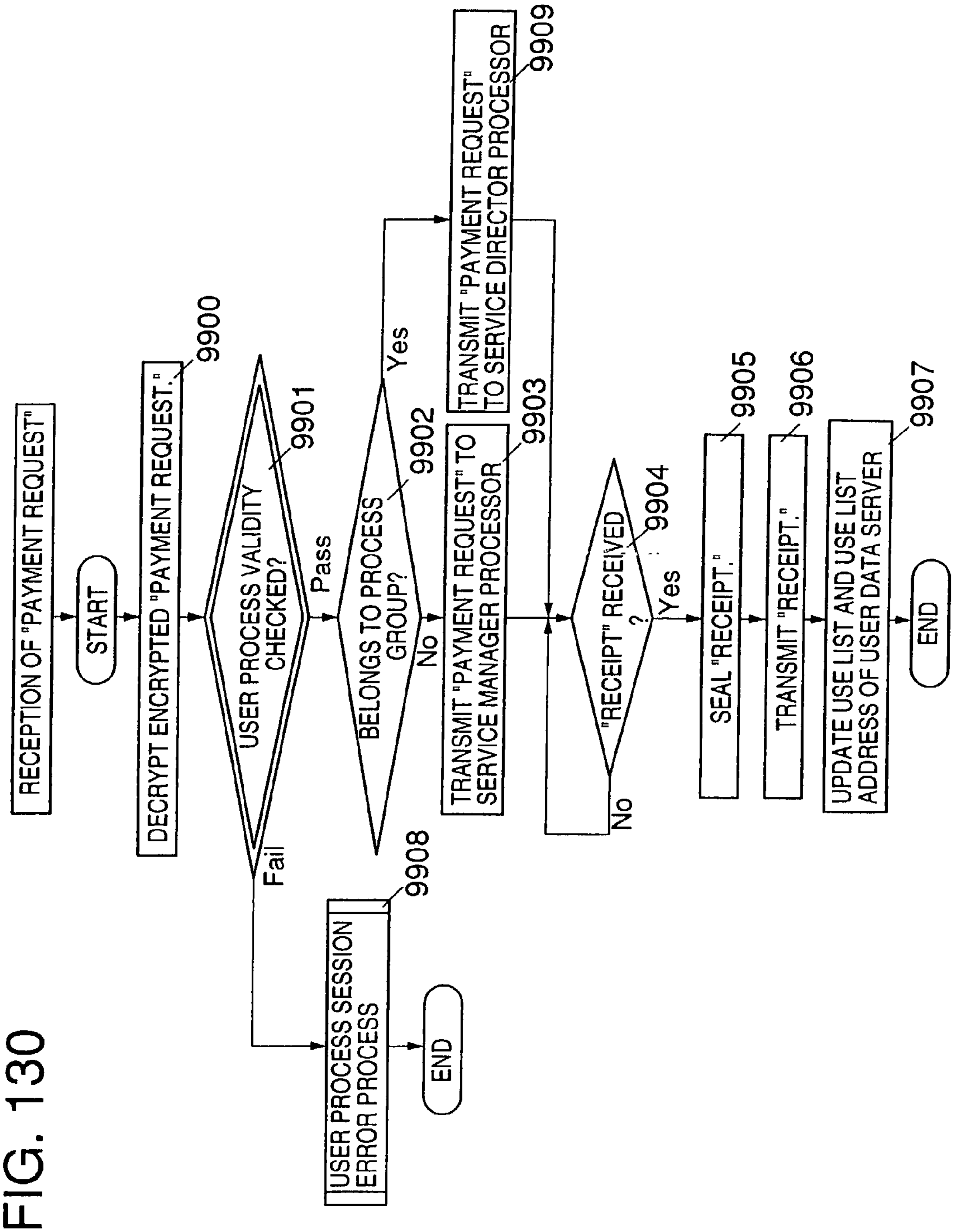
Figure 131A:
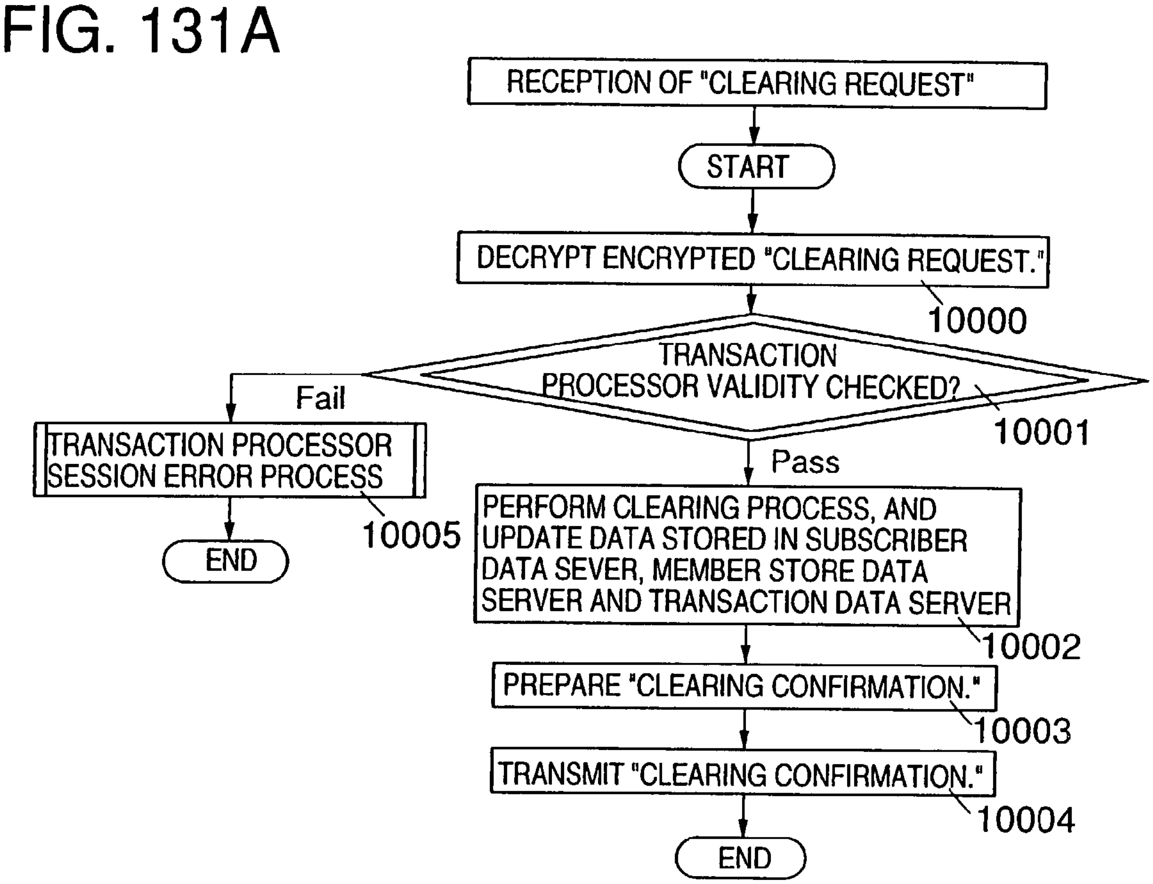
Figure 131B:
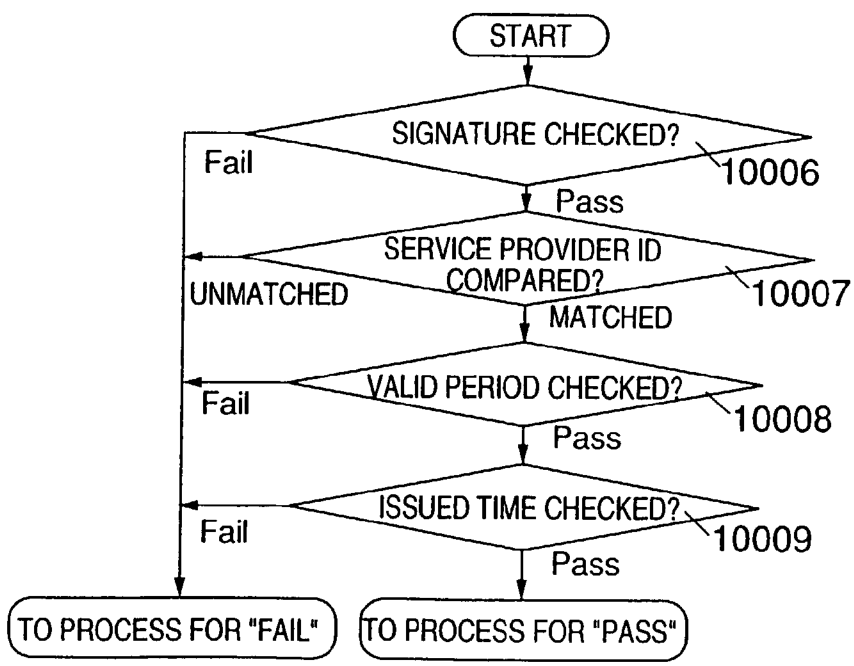
Figure 132A:
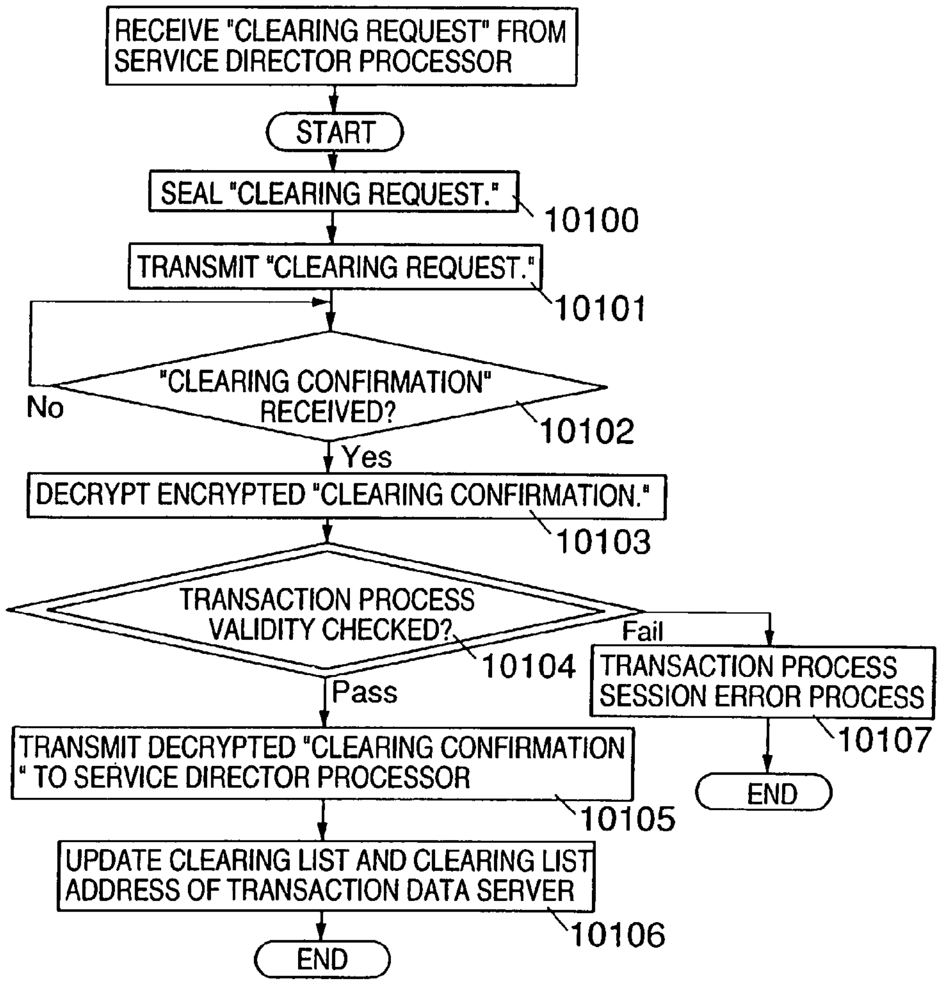
Figure 132B:
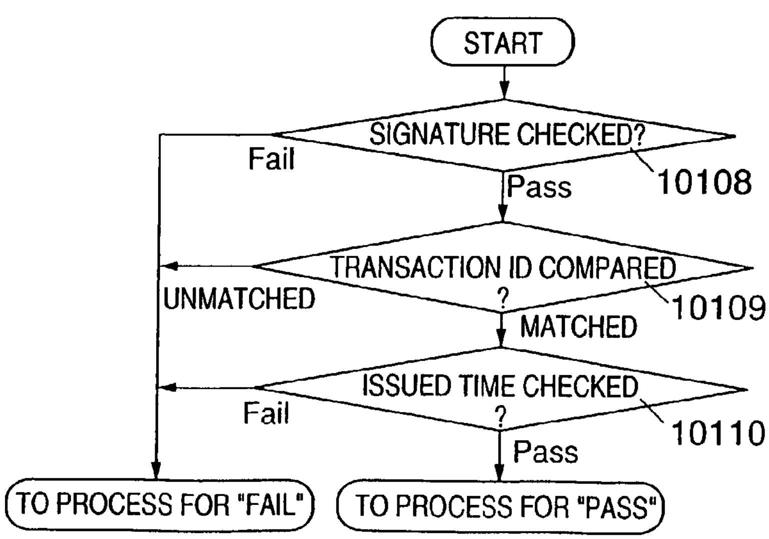
Figure 133A:
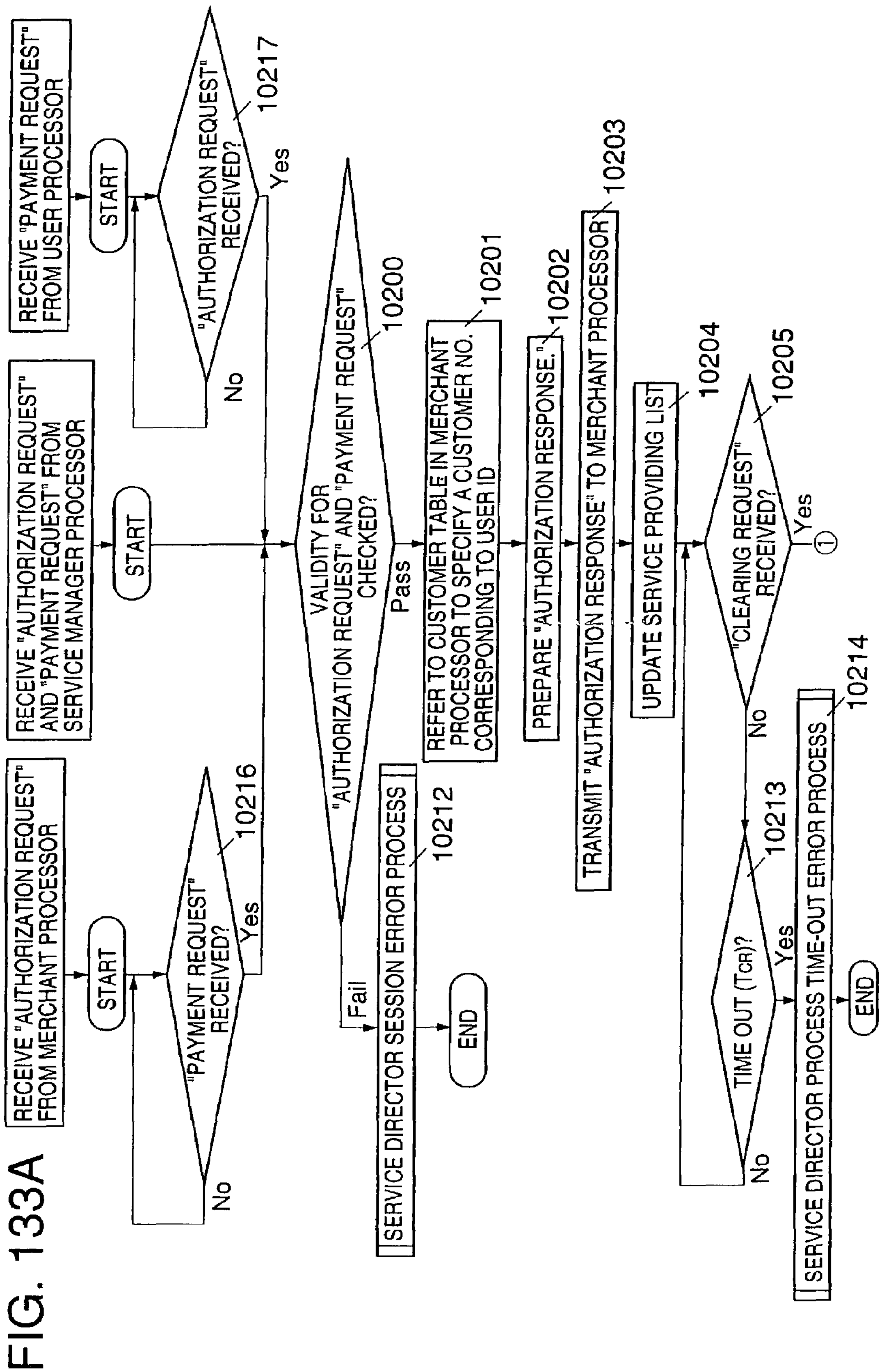
Figure 133B:
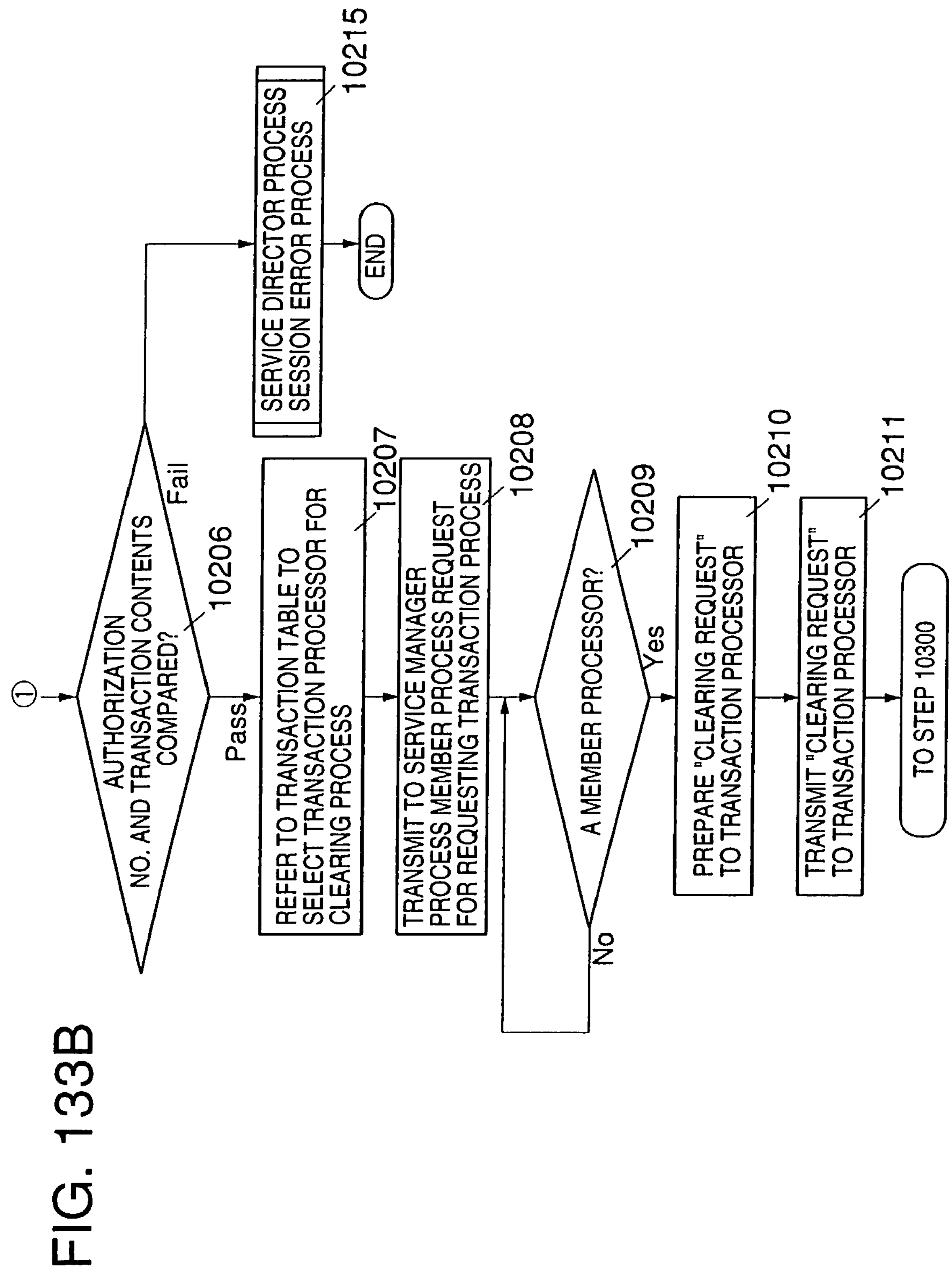
Figure 134:
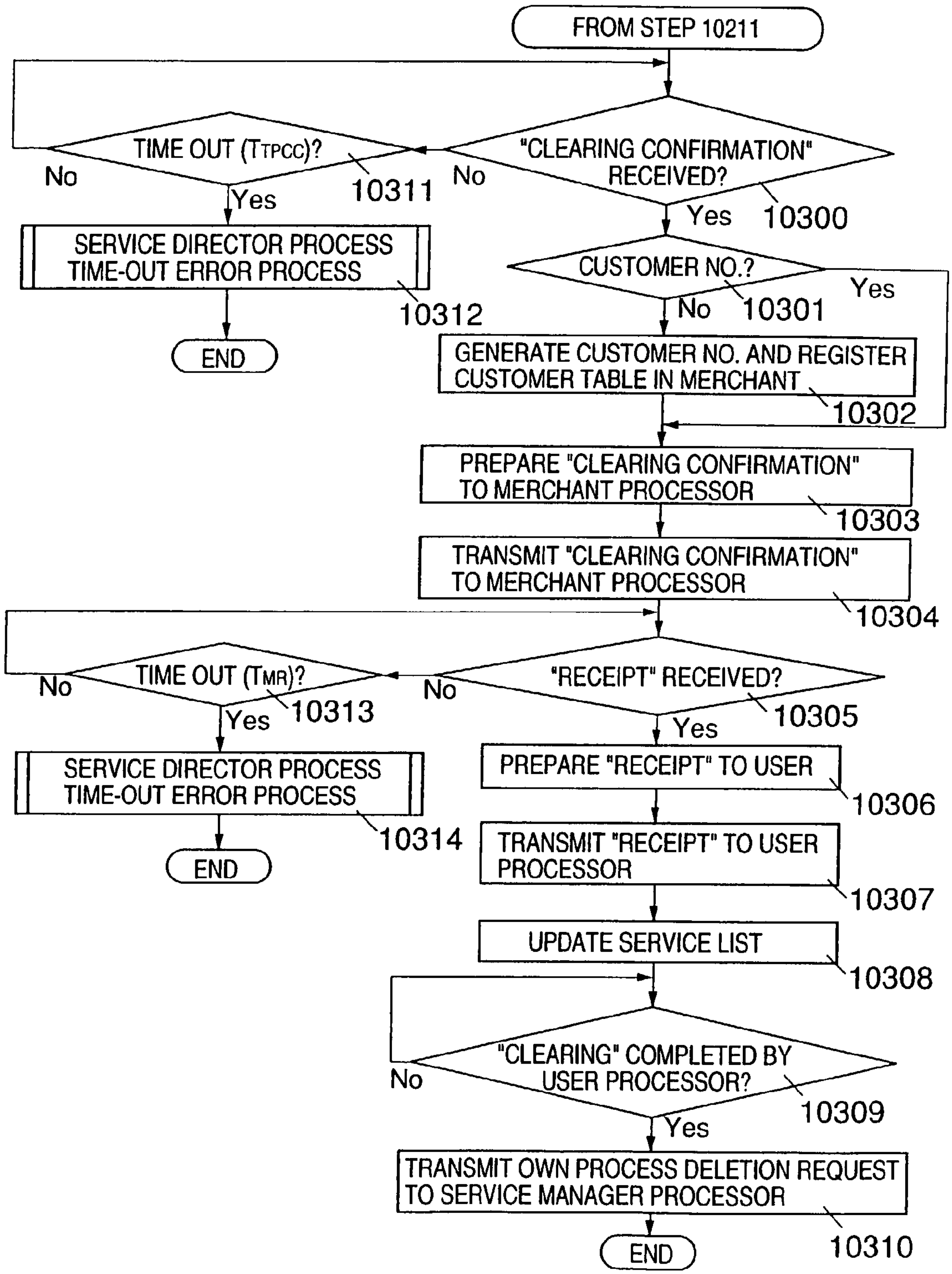
Figure 135A:
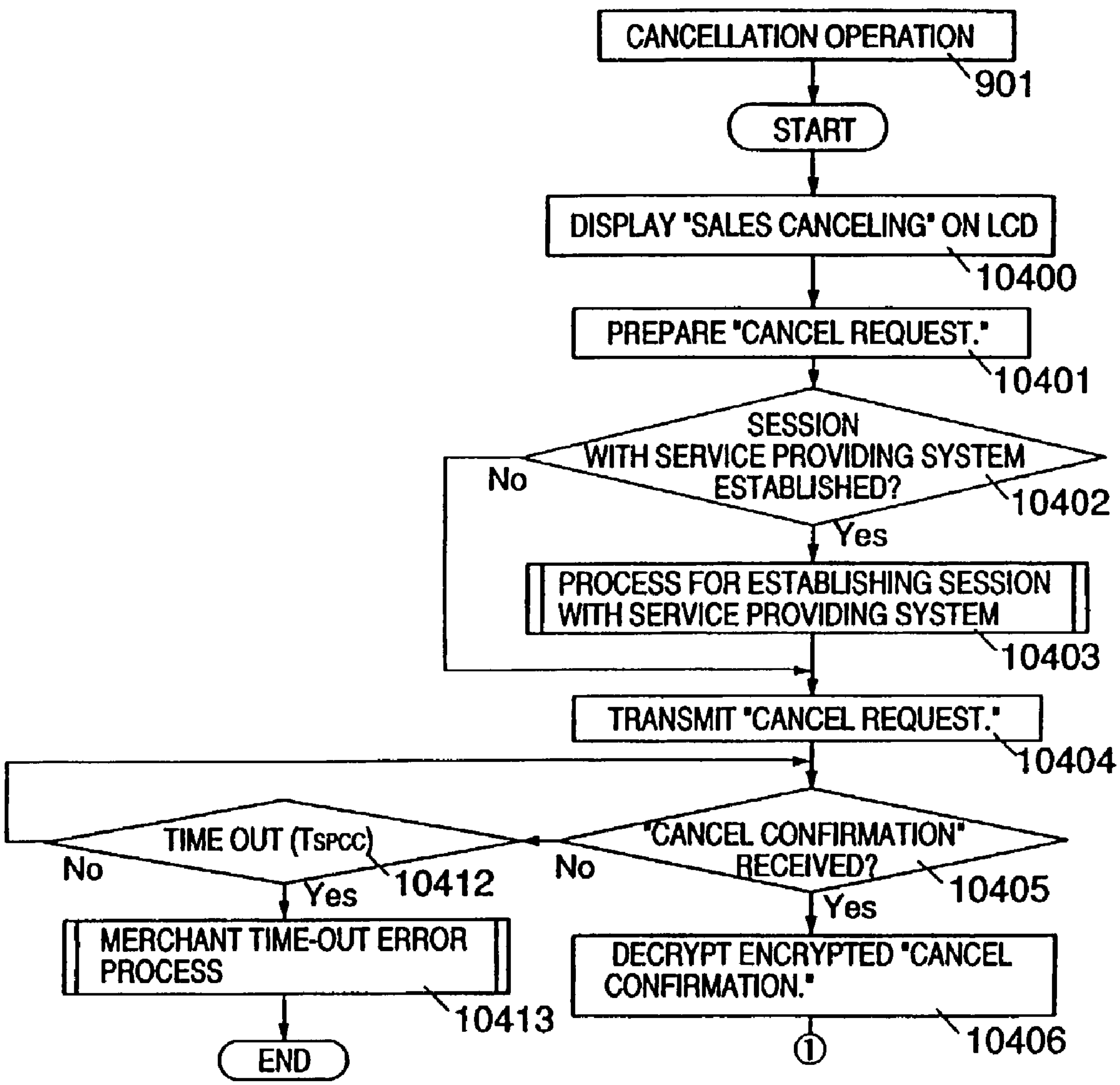
Figure 135B:
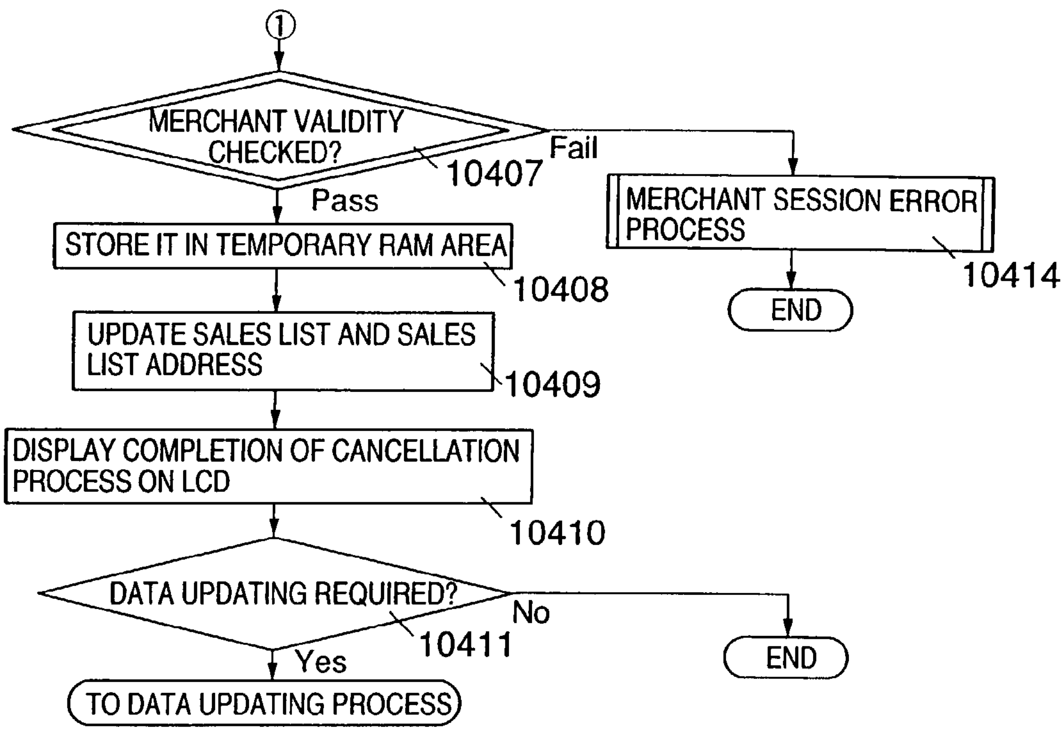
Figure 136:
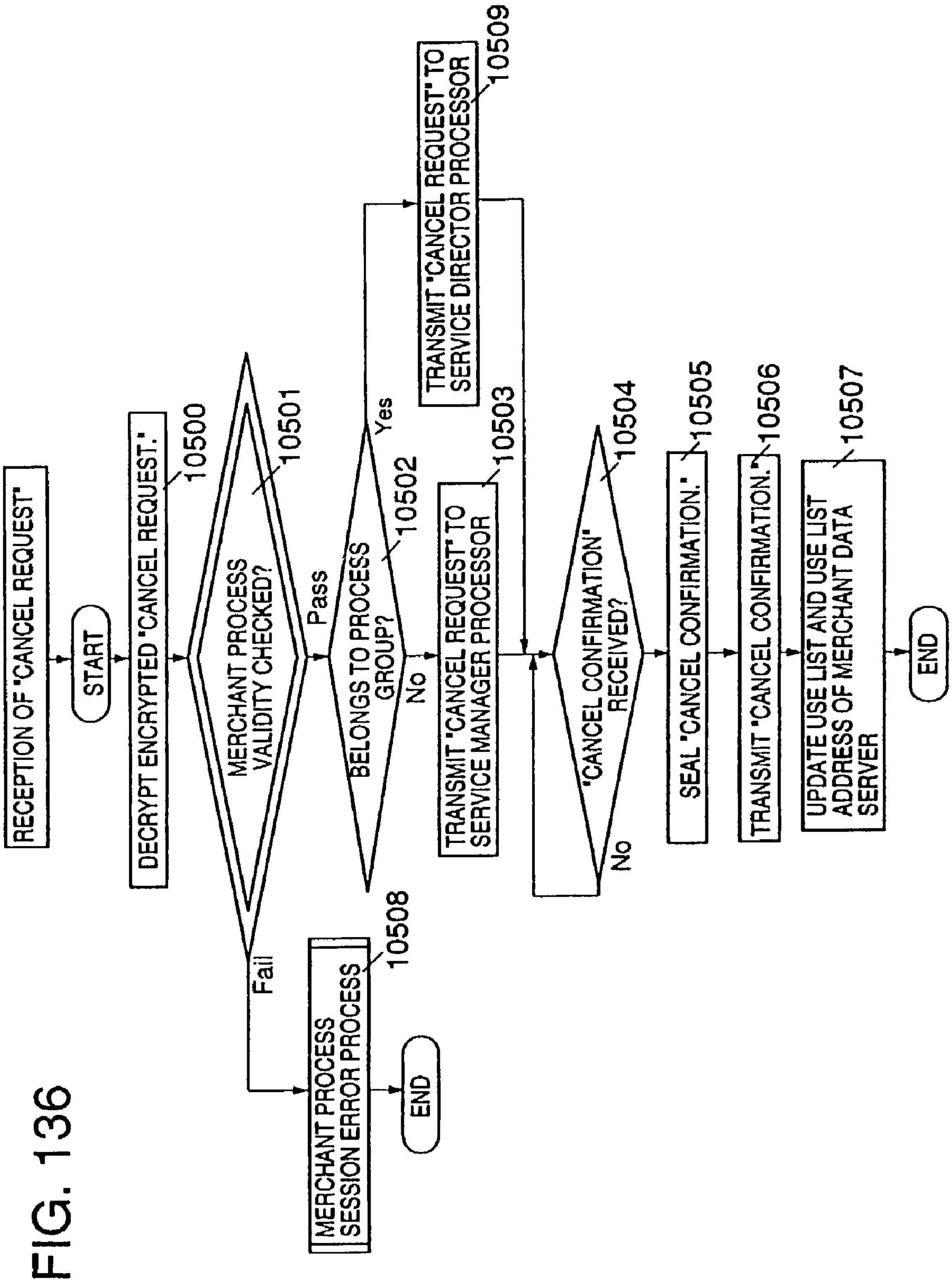
Figure 137A:
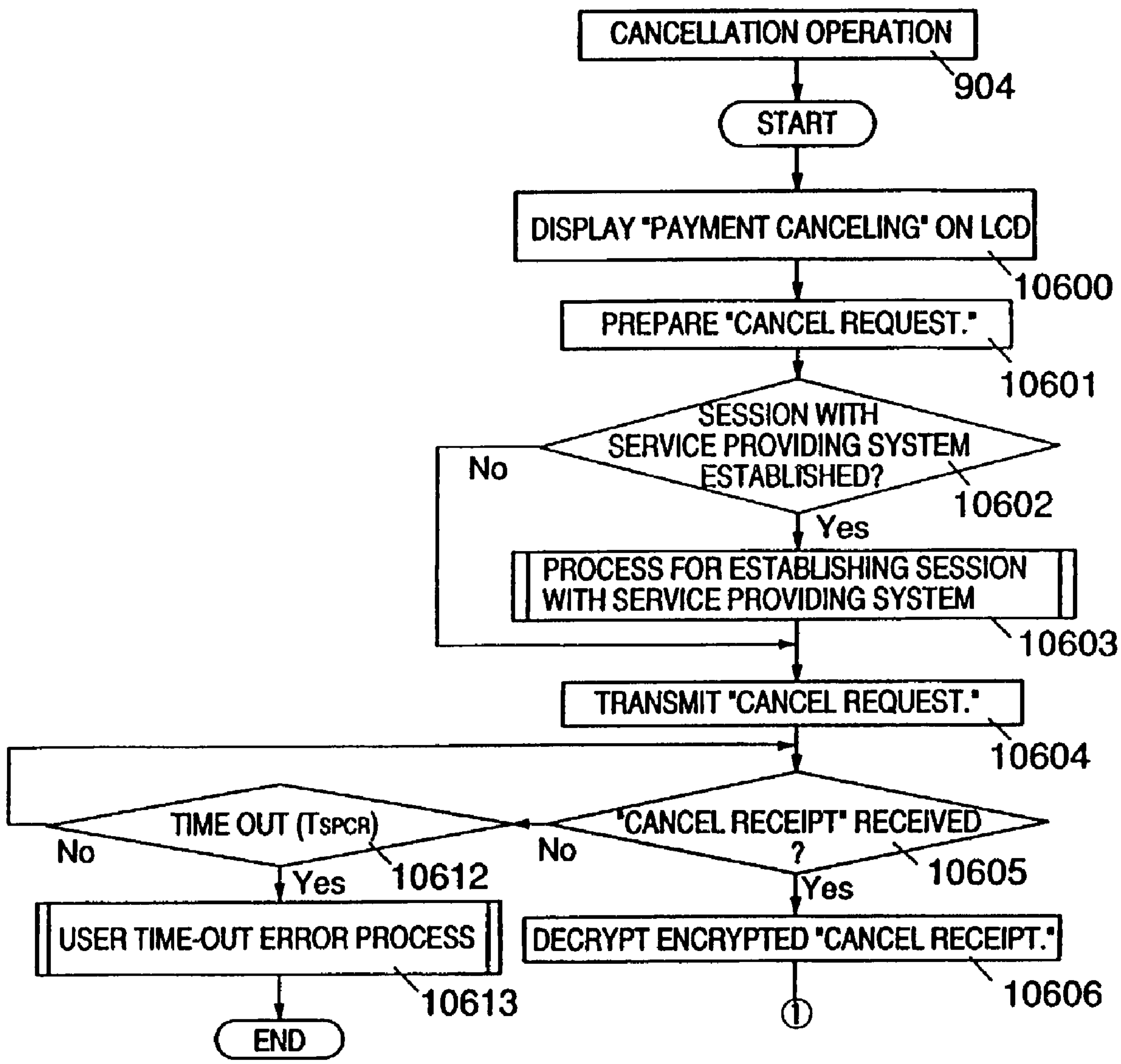
Figure 137B:
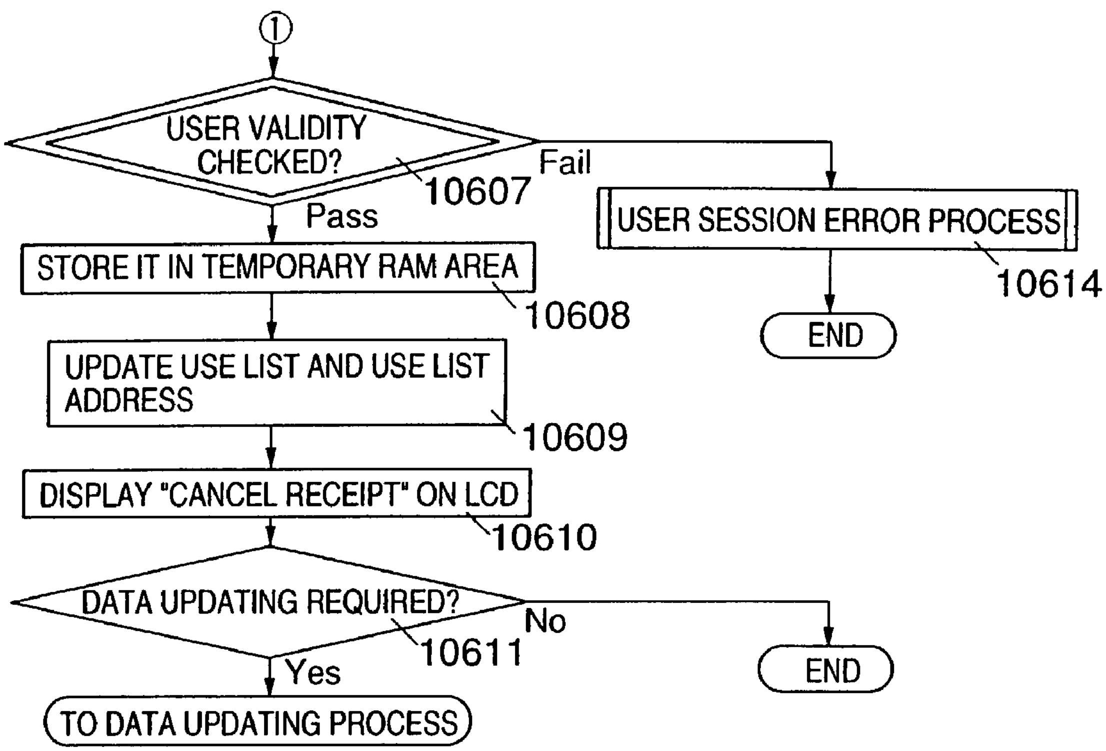
Figure 138:
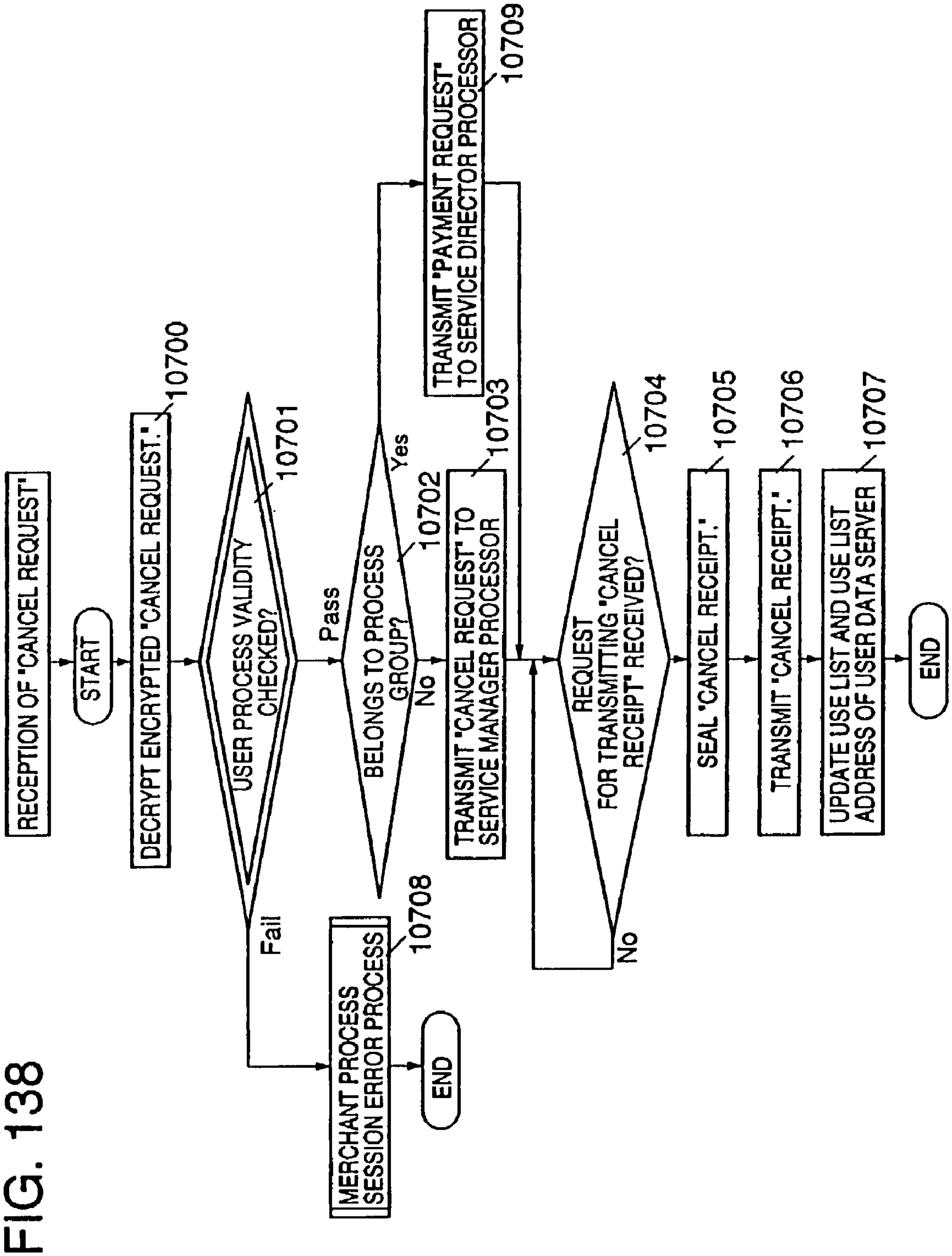
Figure 139:
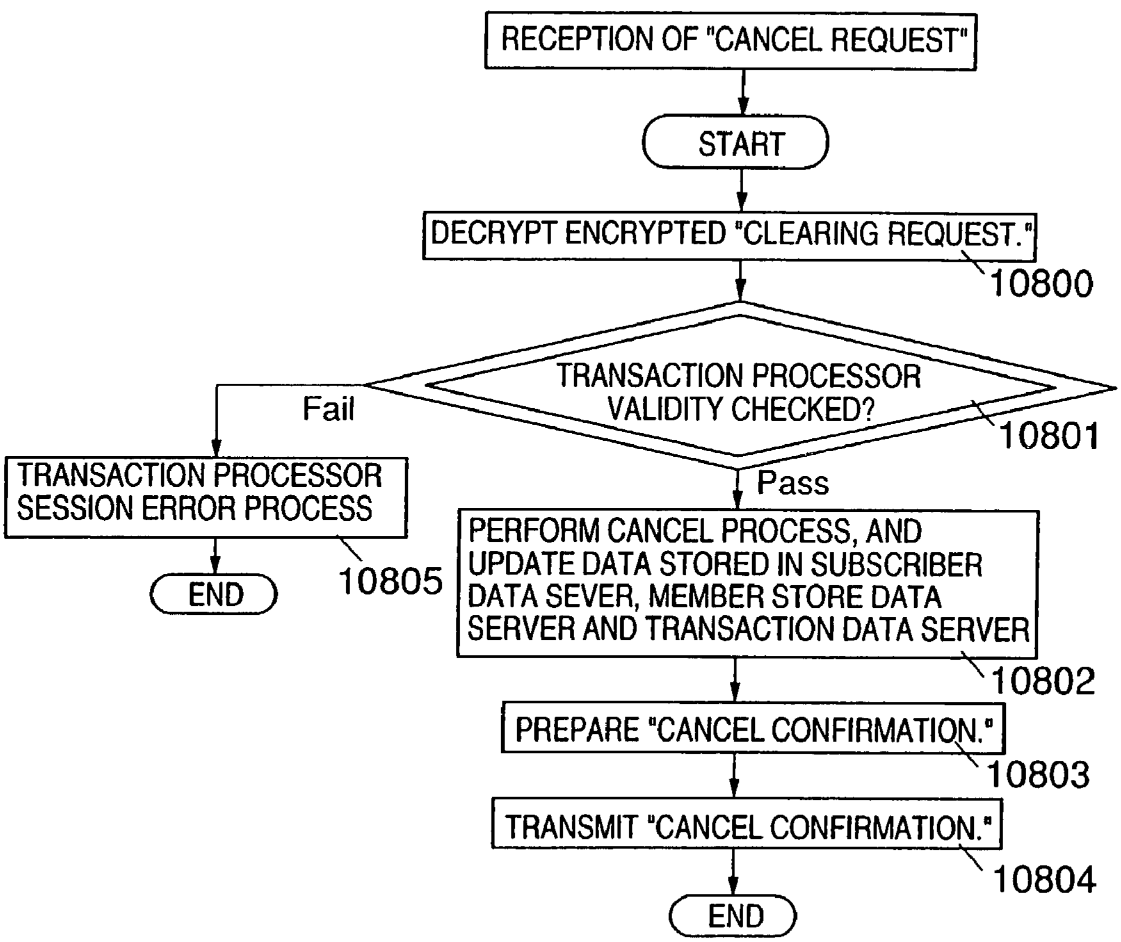
Figure 140:
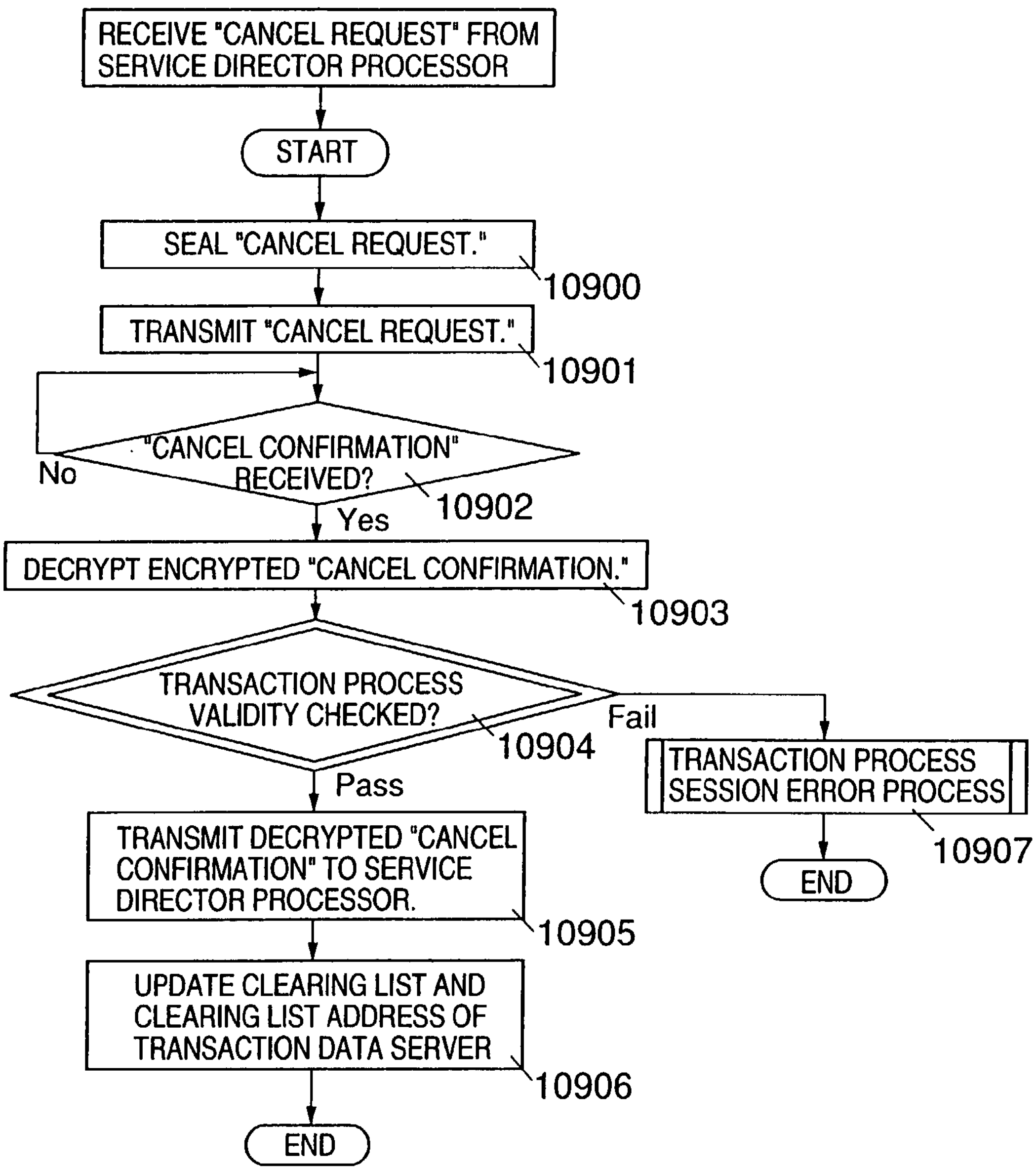
Figure 141A:
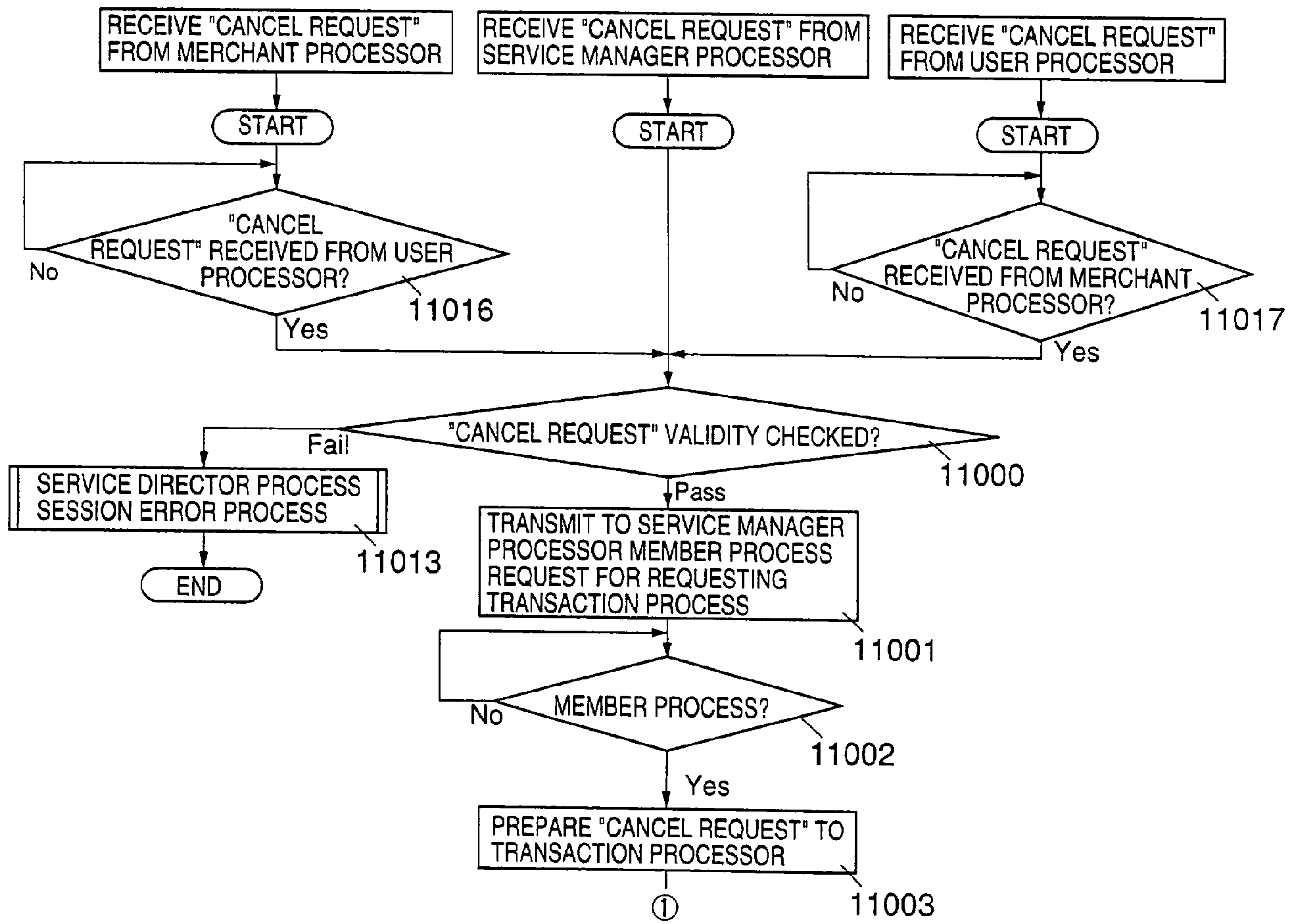
Figure 141B:
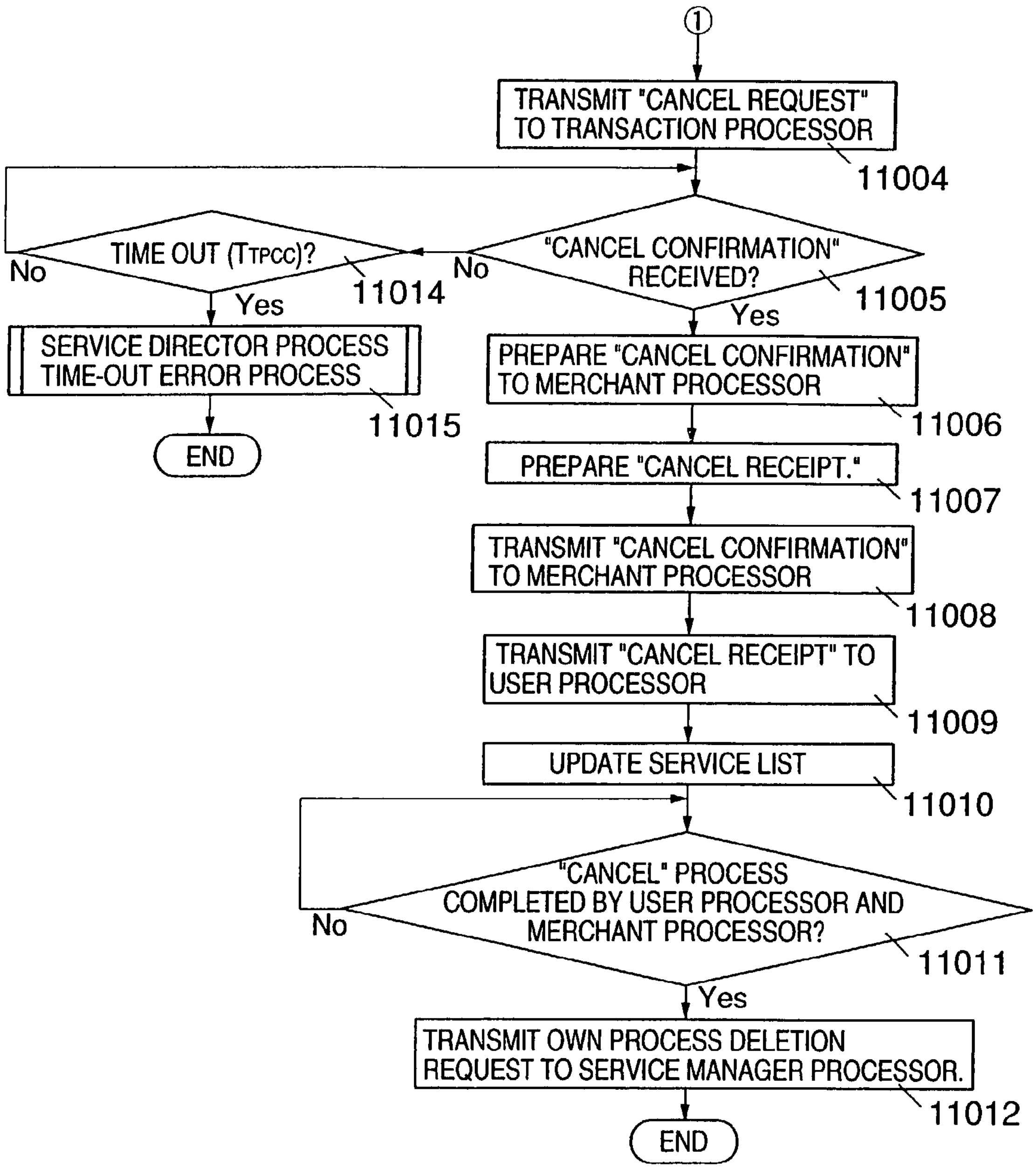
Figure 142A:
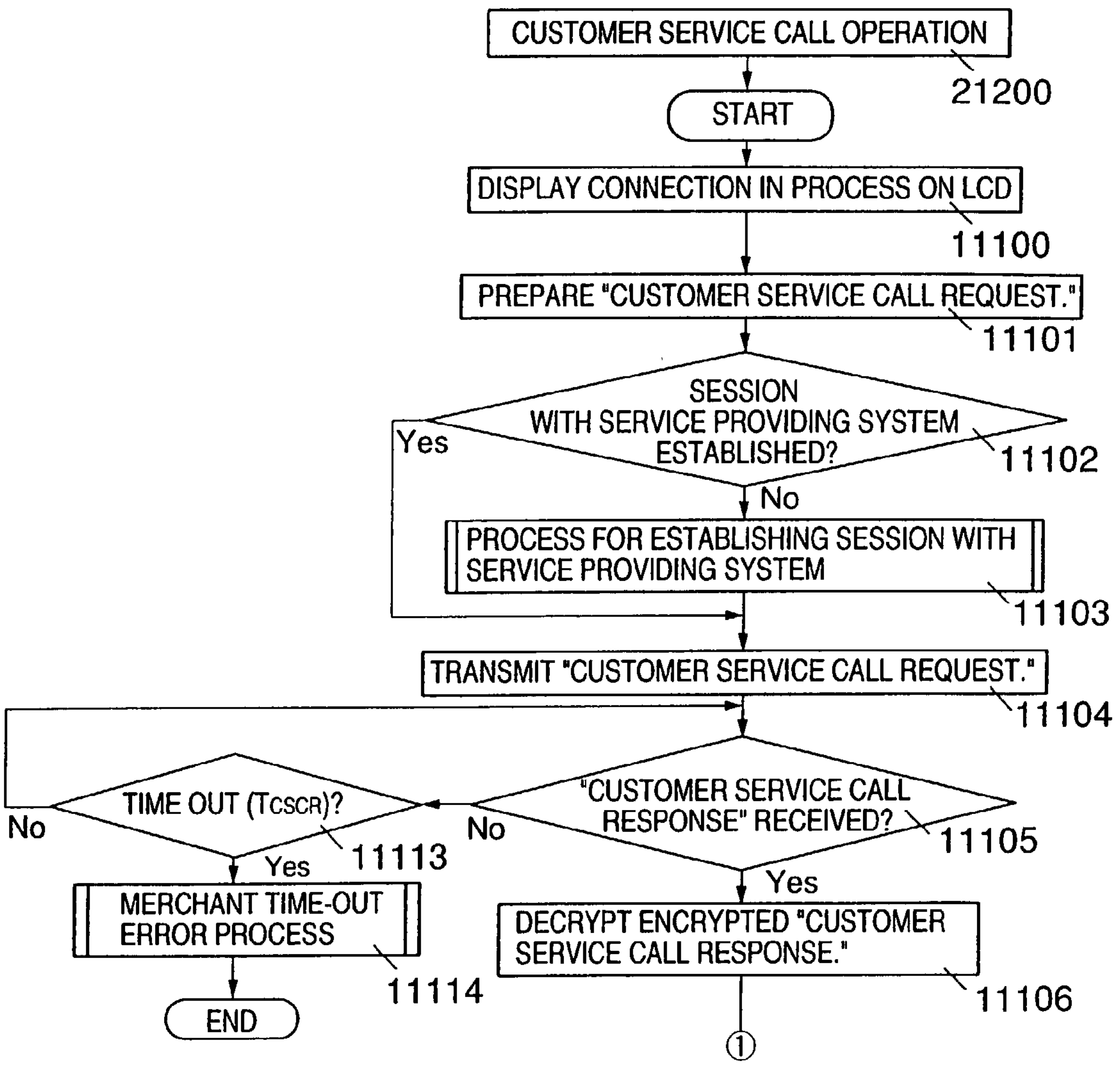
Figure 142B:
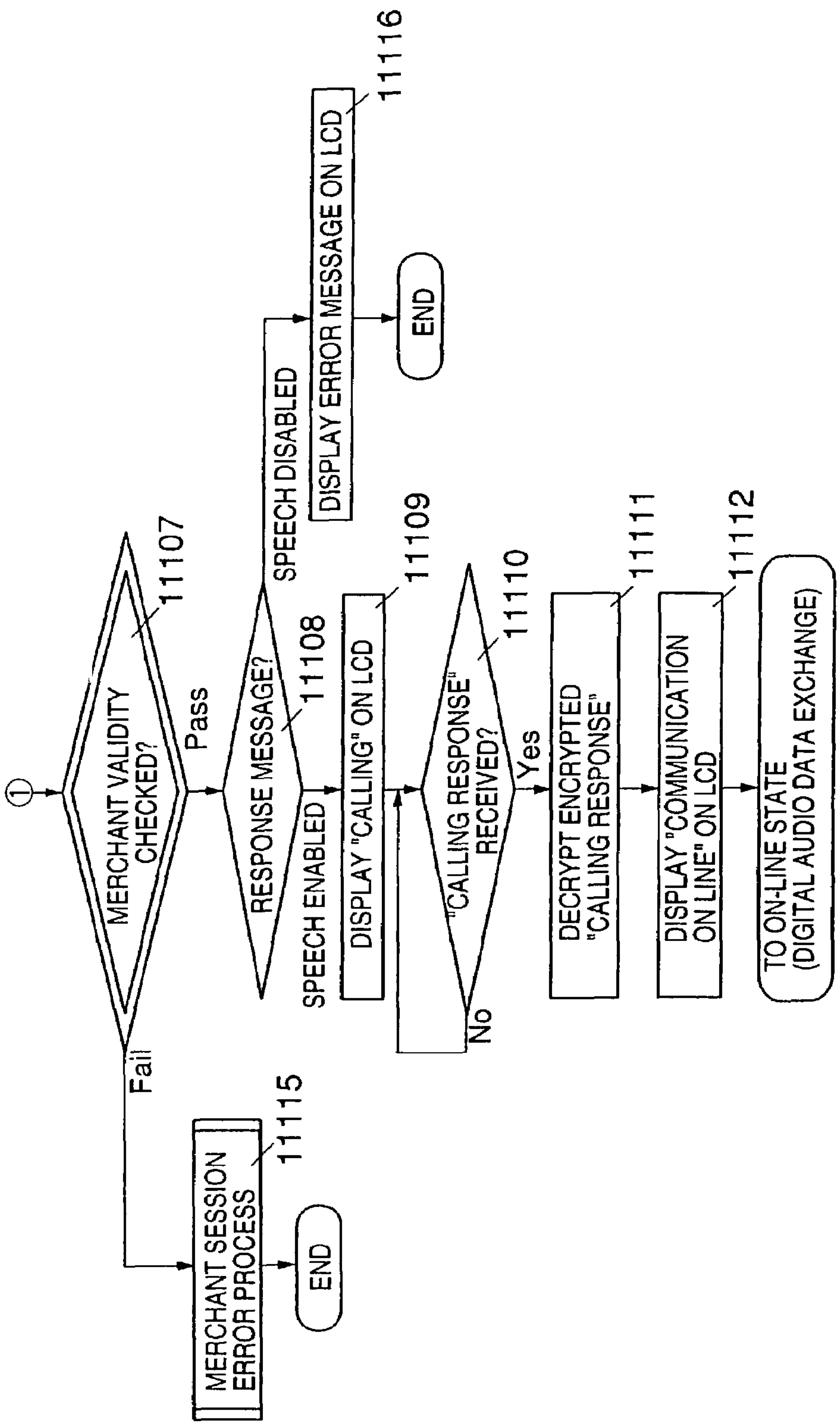
Figure 143A:
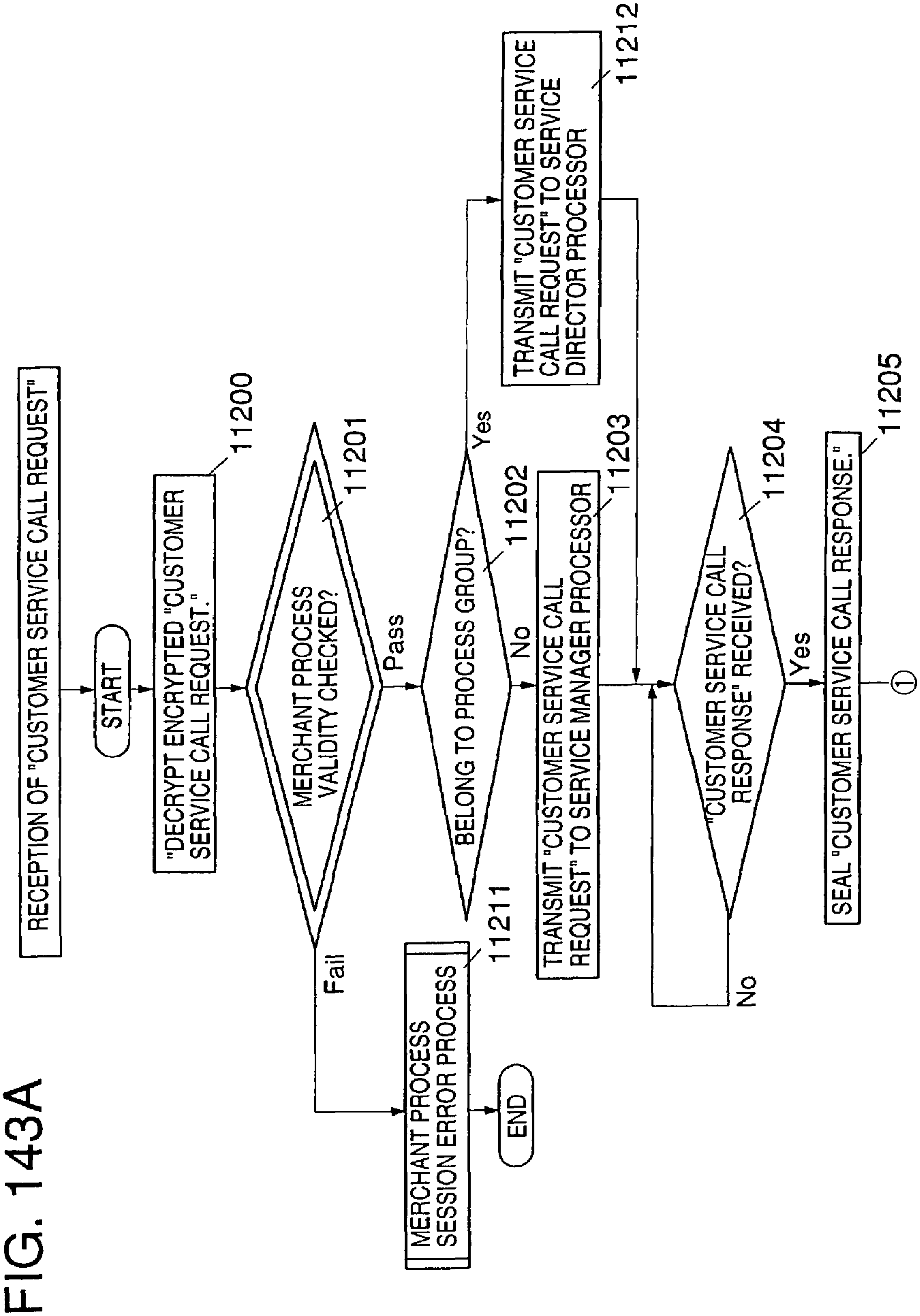
Figure 143B:
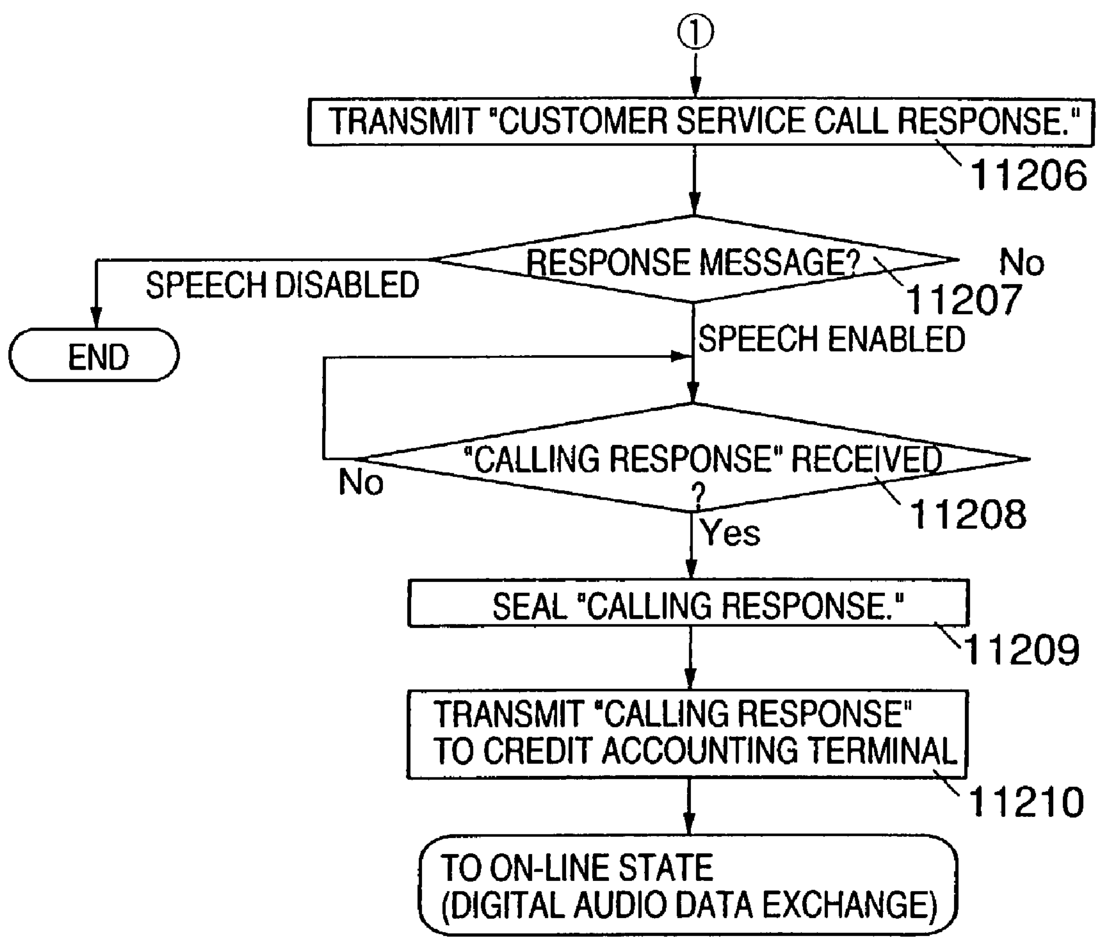
Figure 144:
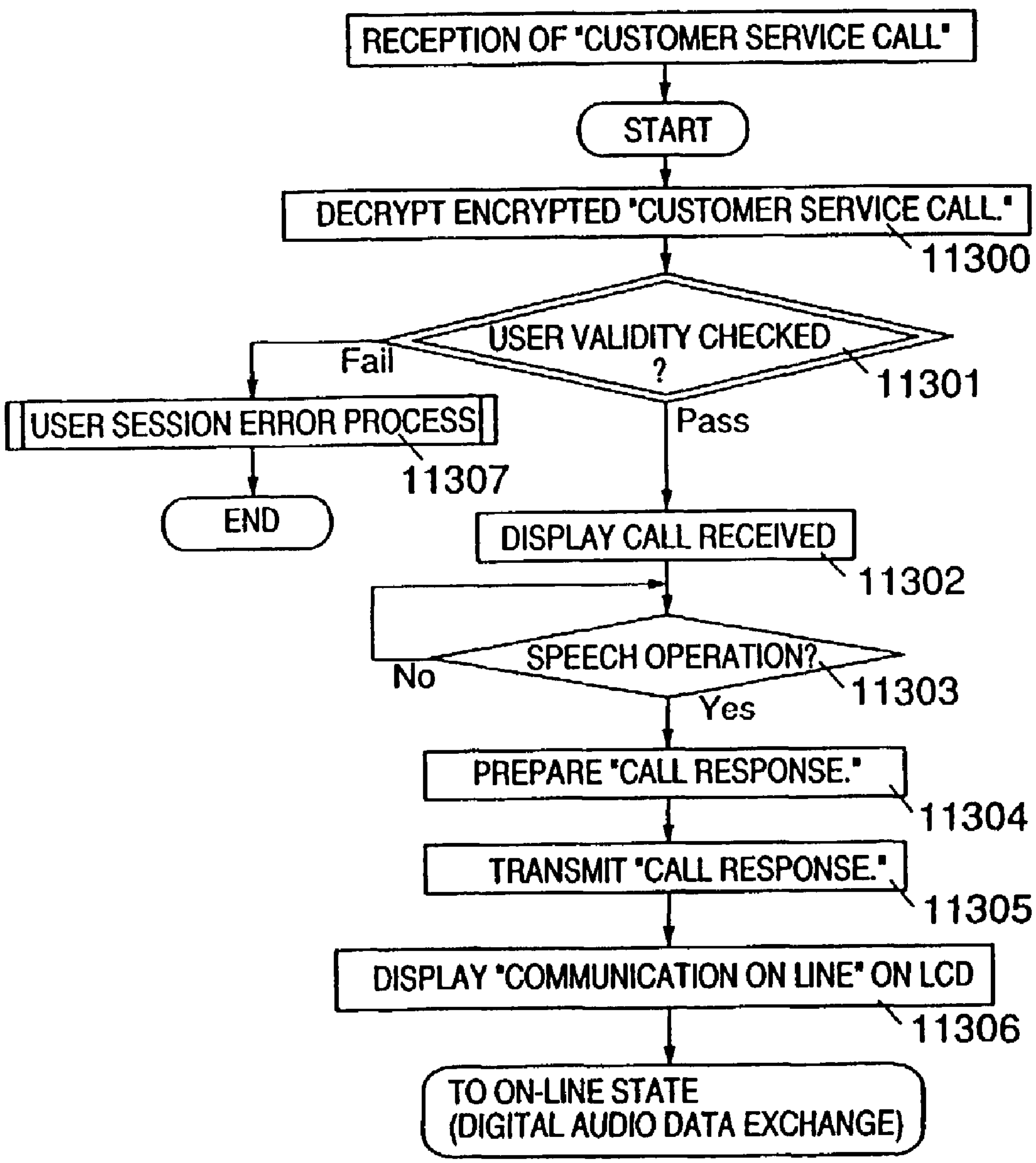
Figure 145:
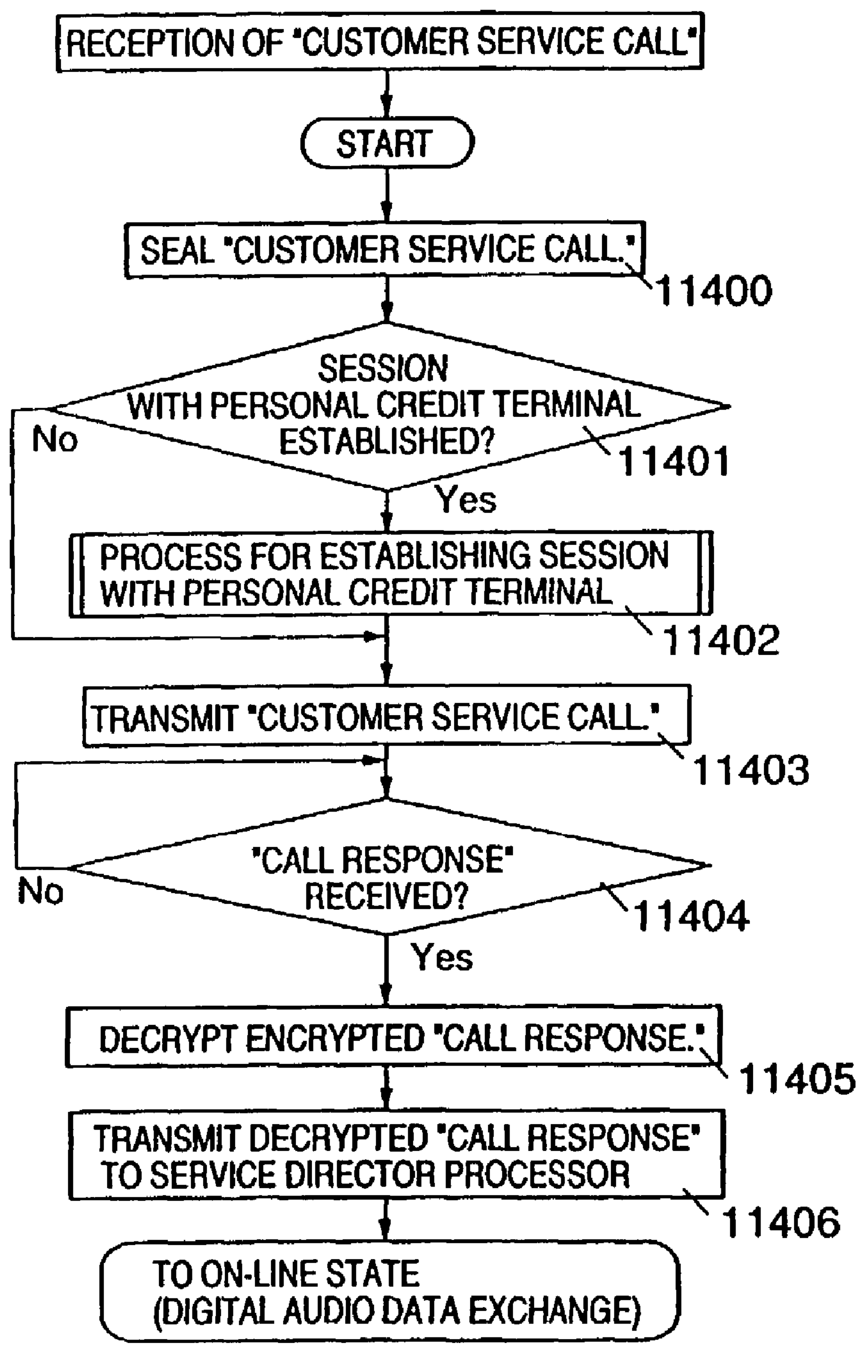
Figure 146A:
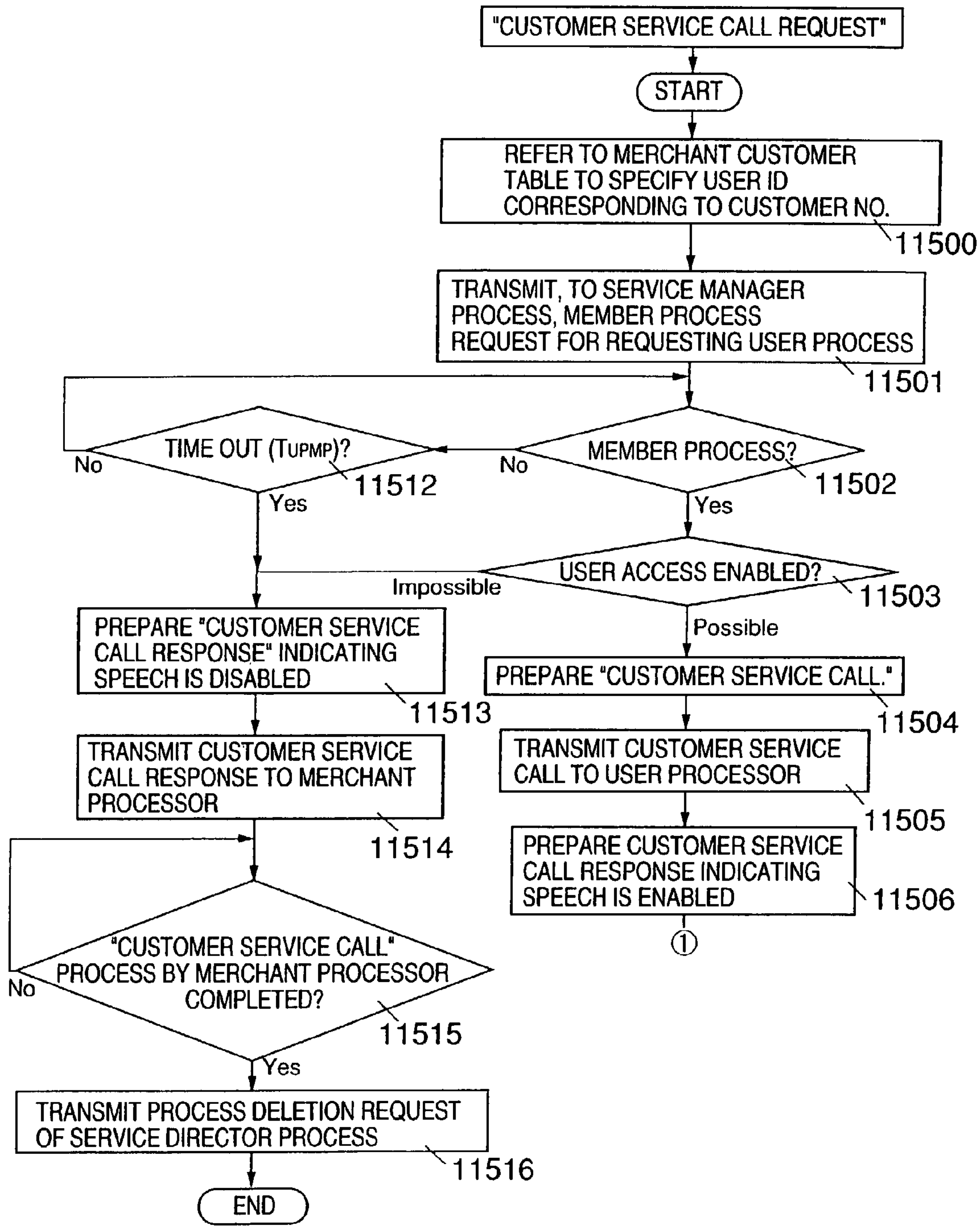
Figure 146B:
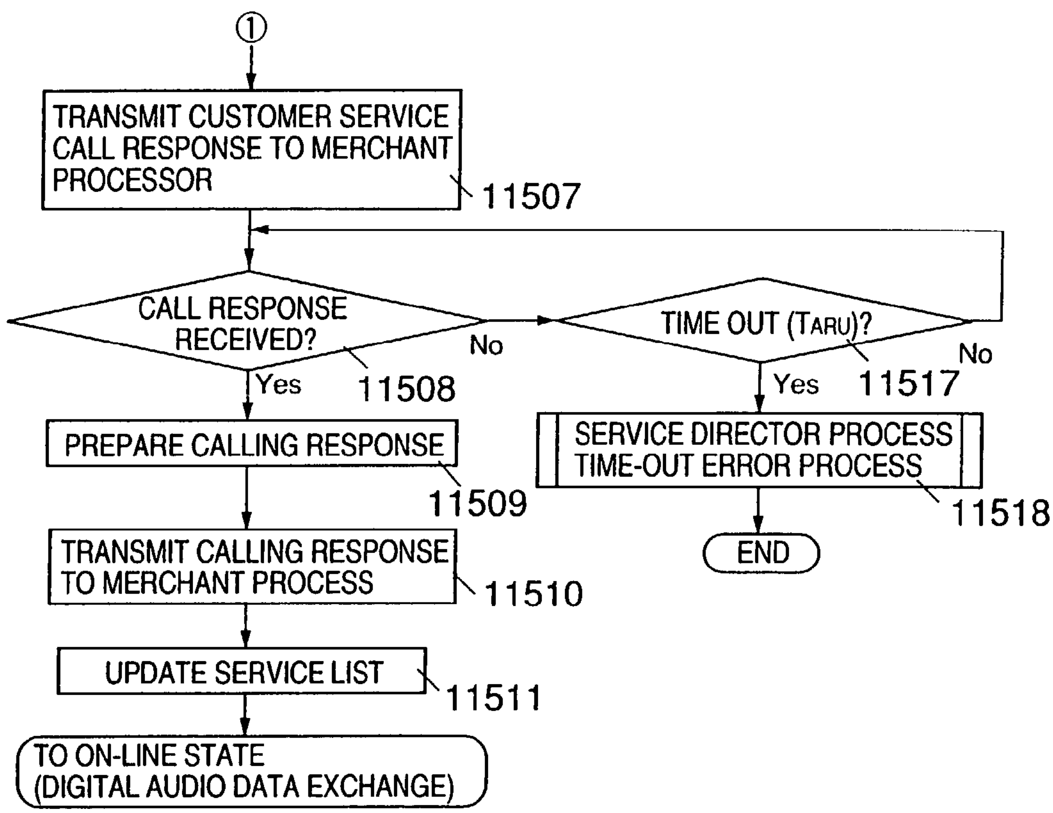
Figure 147A:
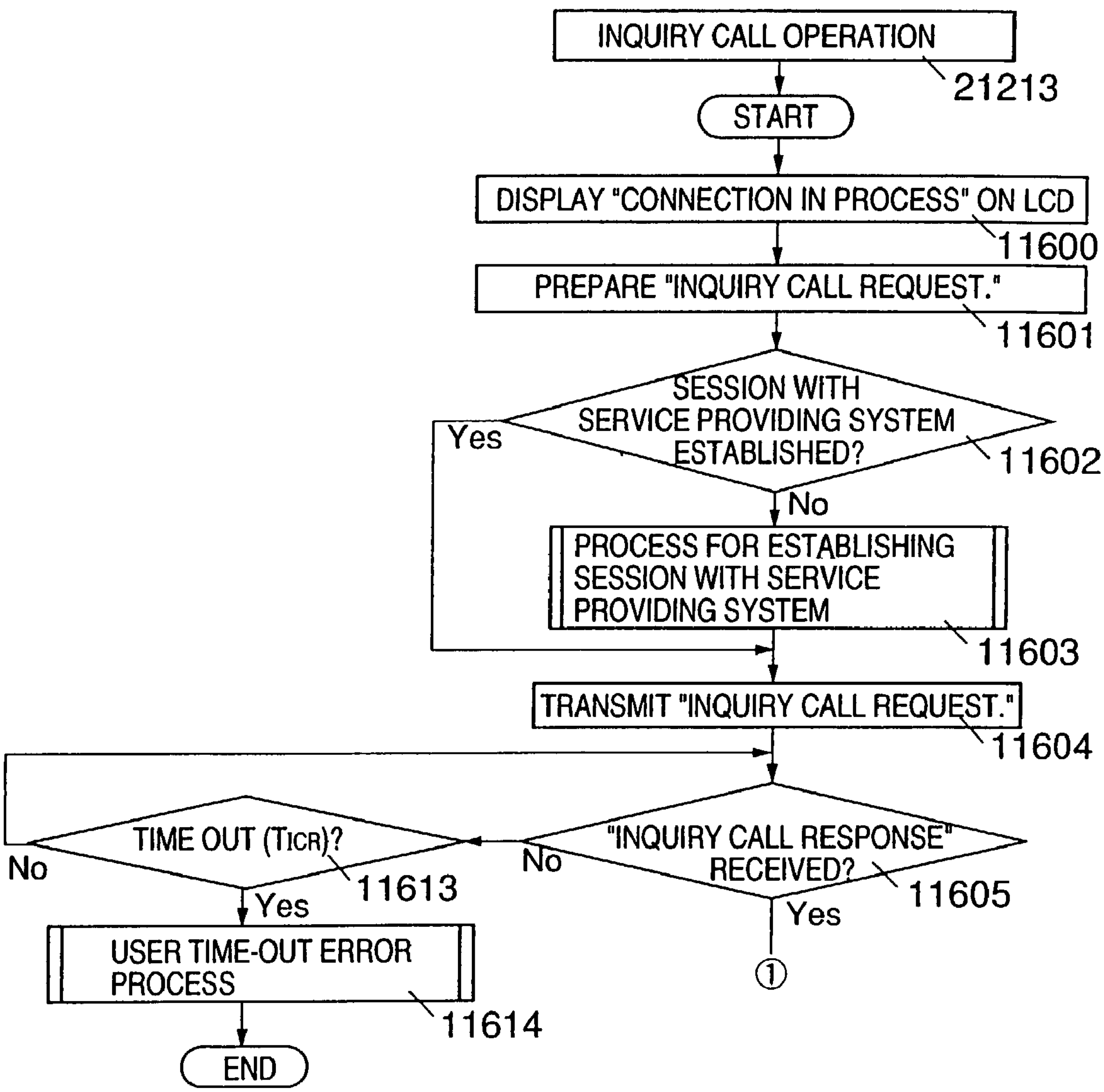
Figure 147B:
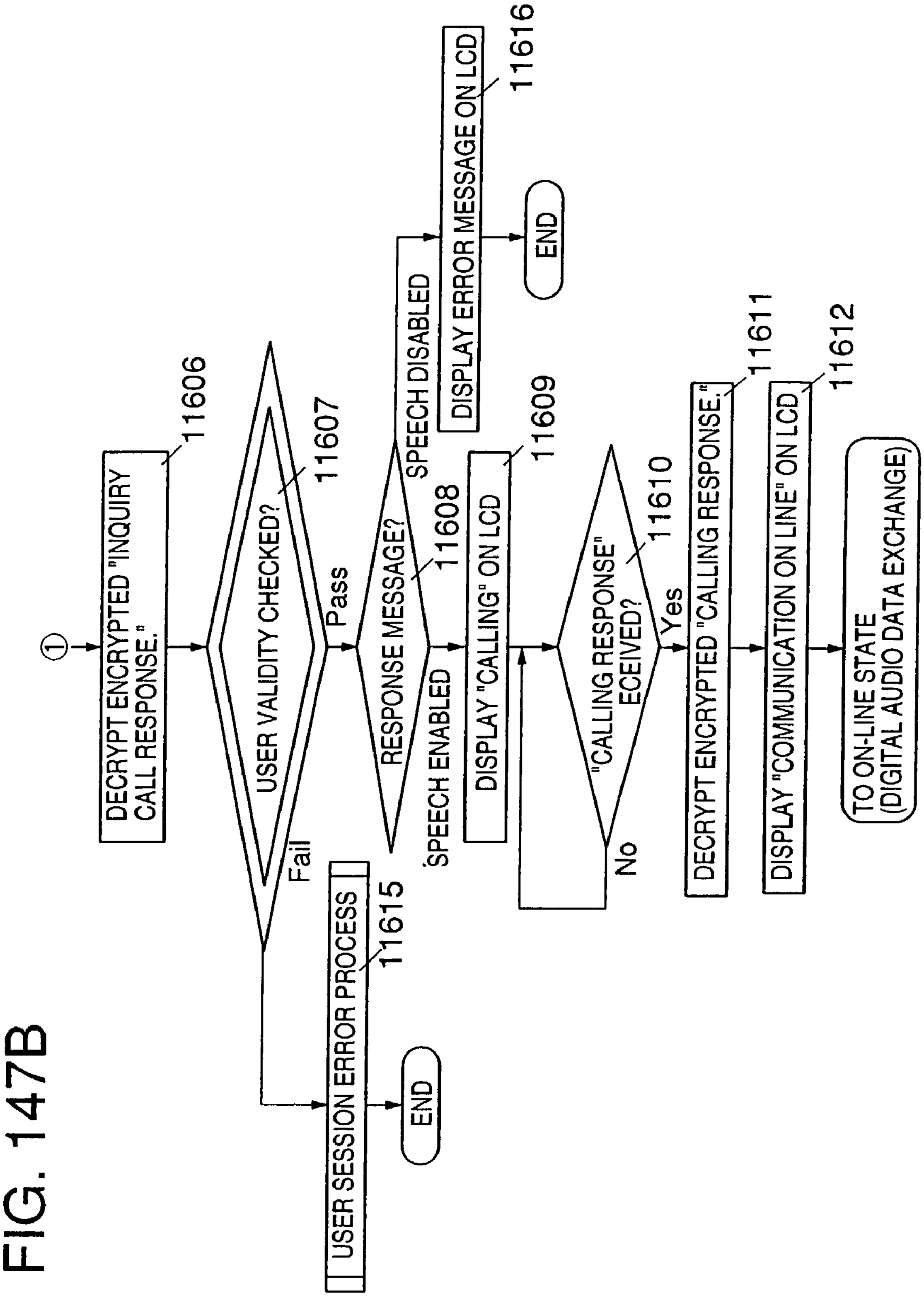
Figure 148A:
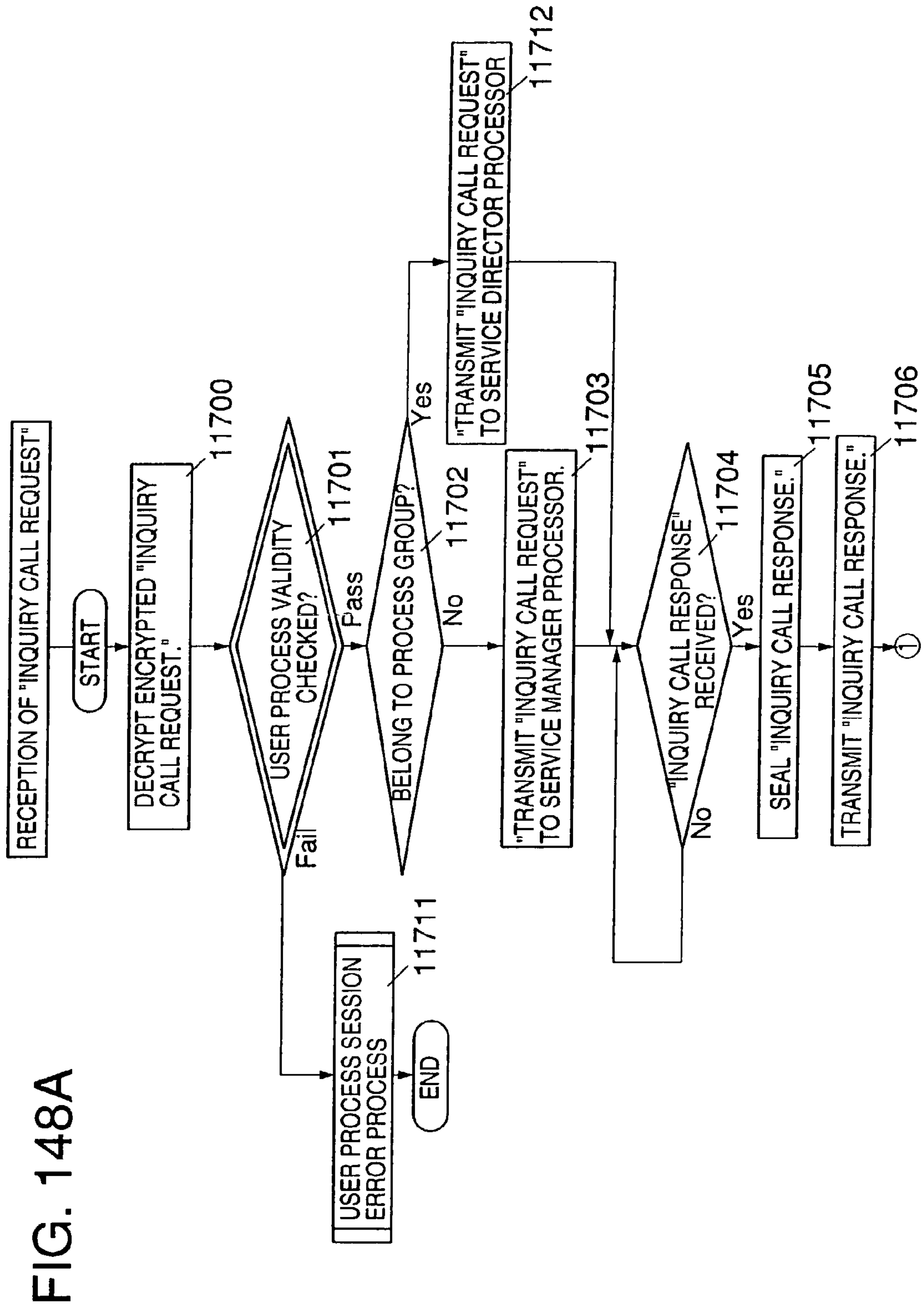
Figure 148B:
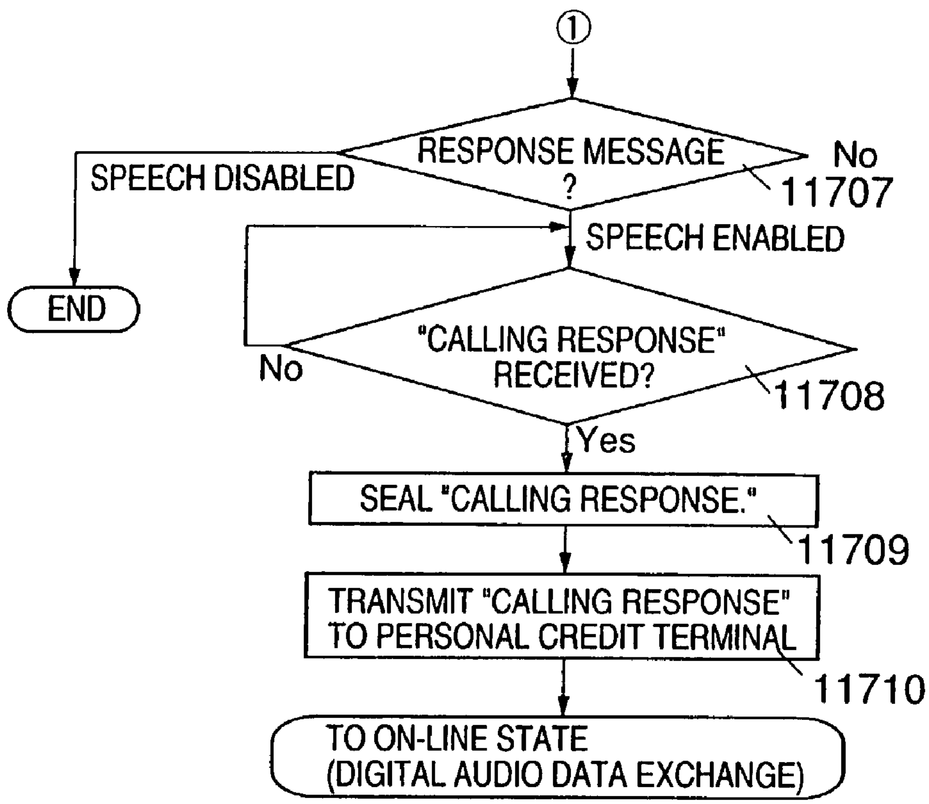
Figure 149:
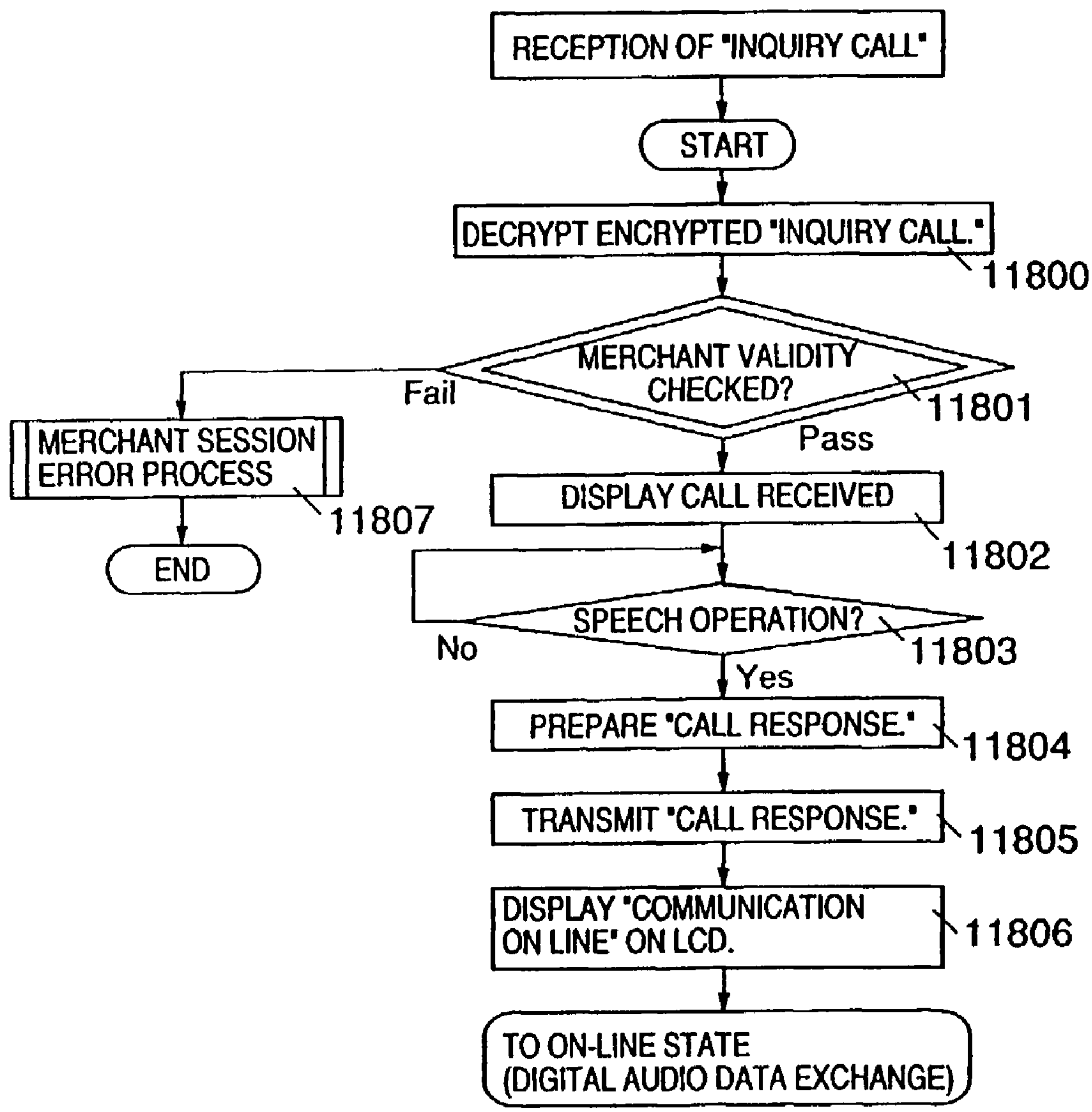
Figure 150:
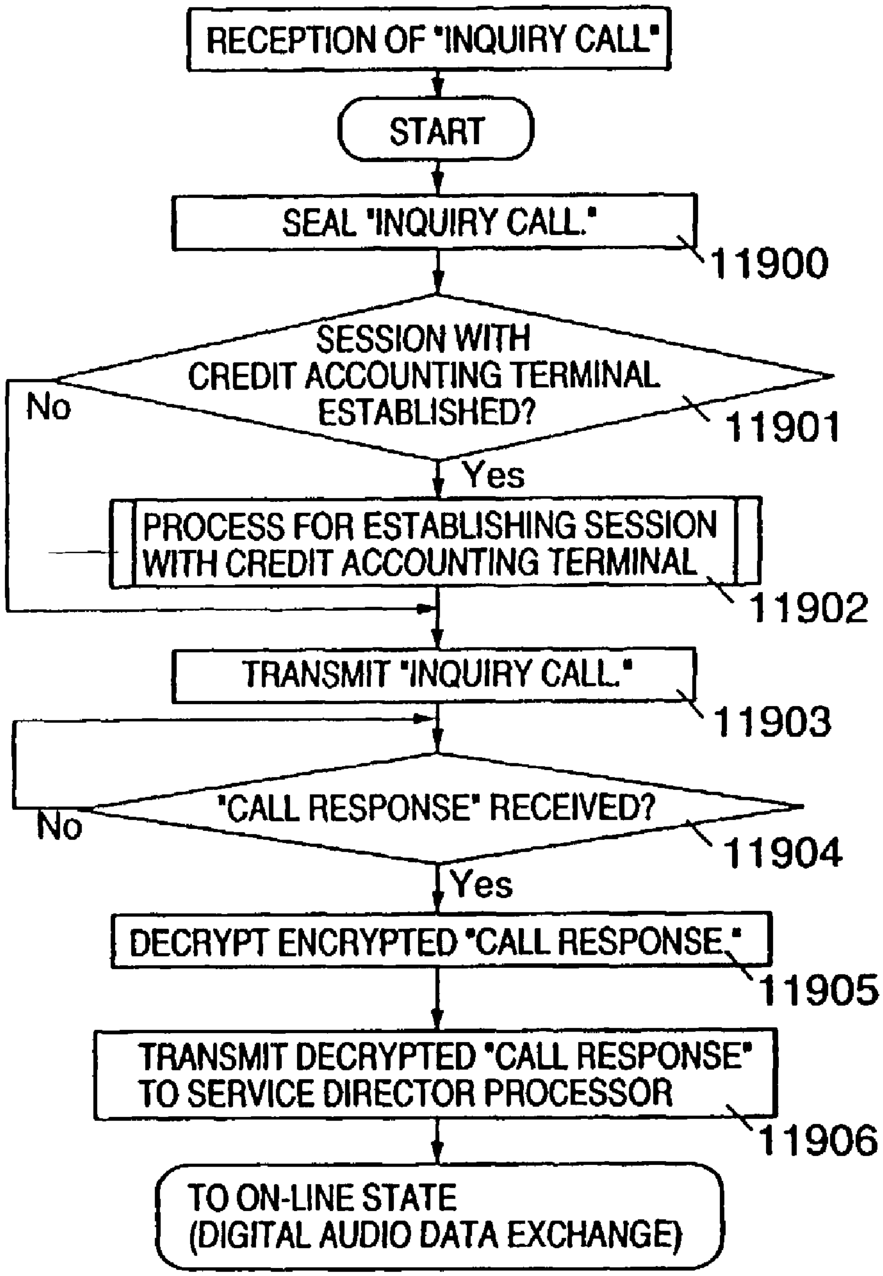
Figure 151A:
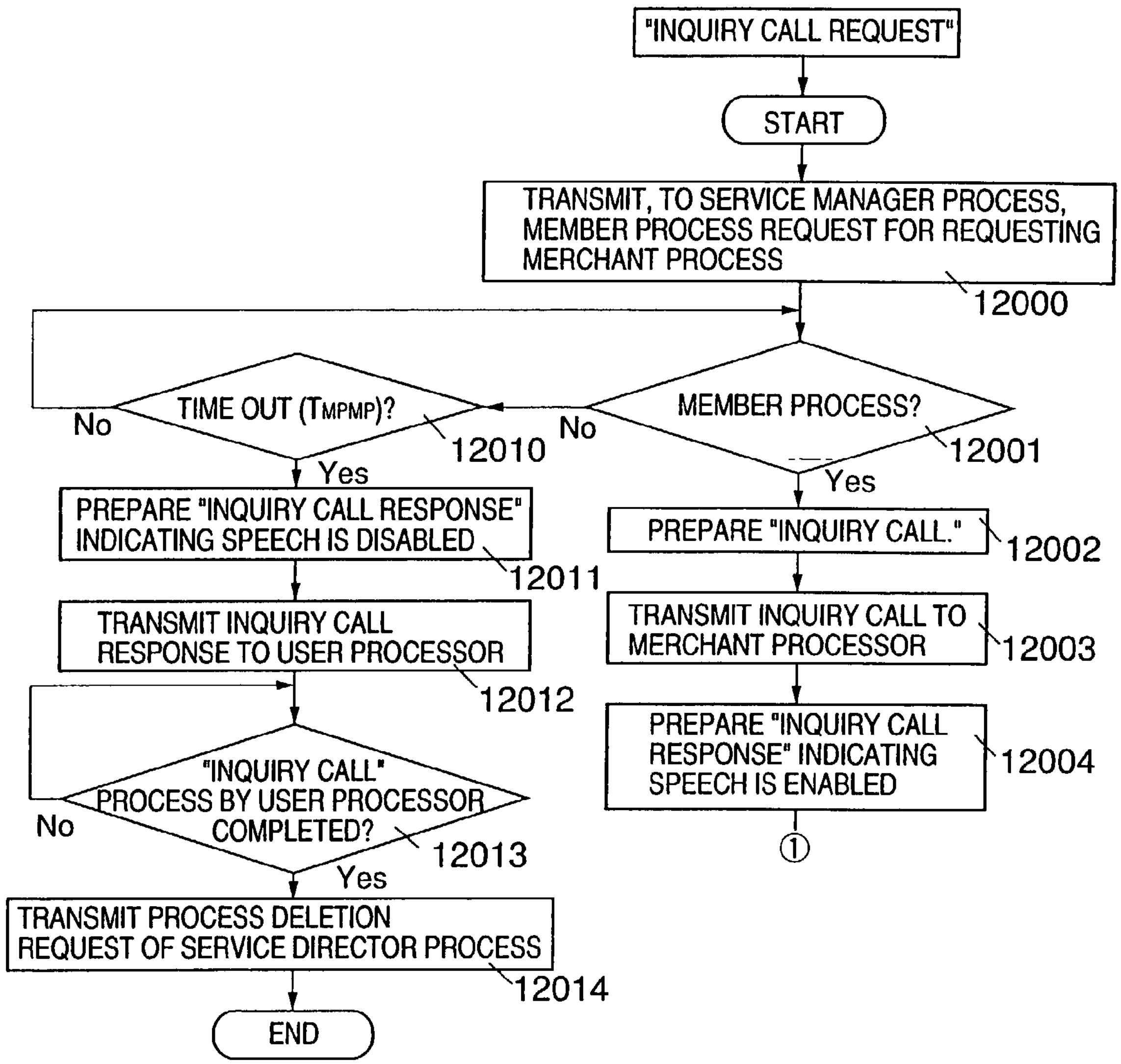
Figure 151B:
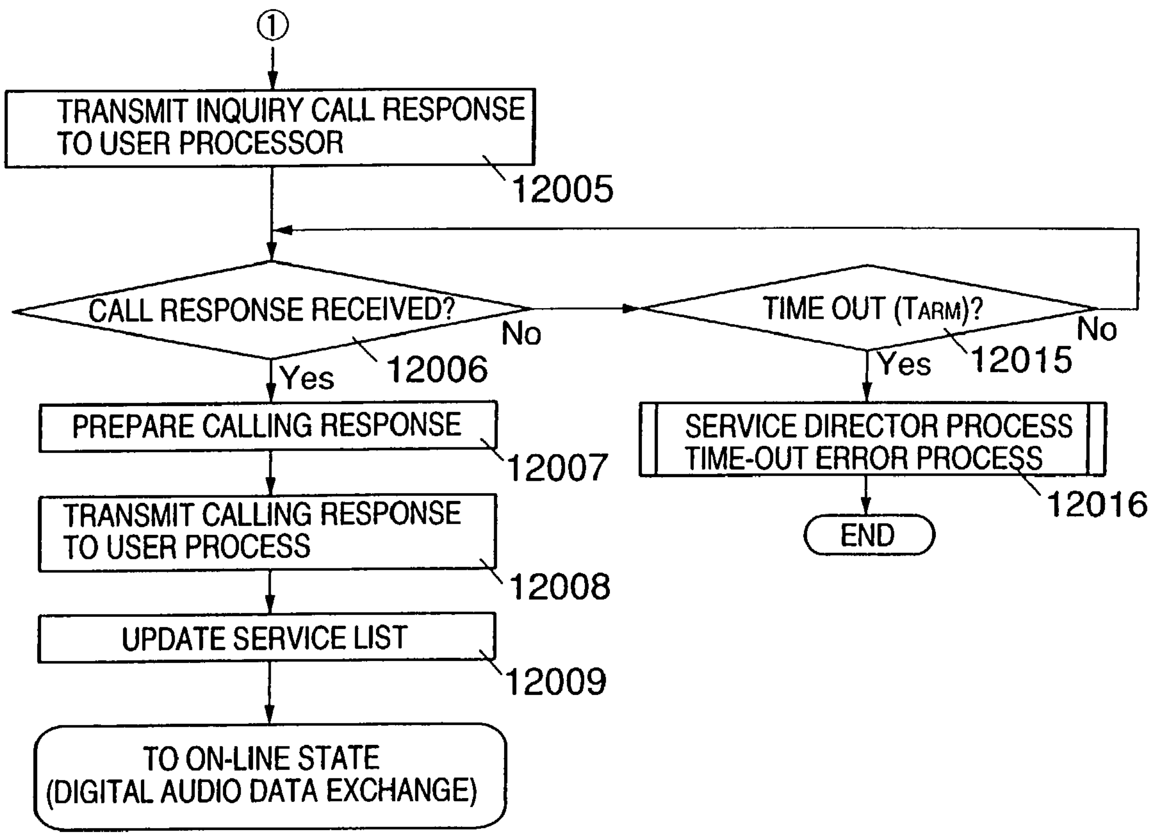
Figure 152A:
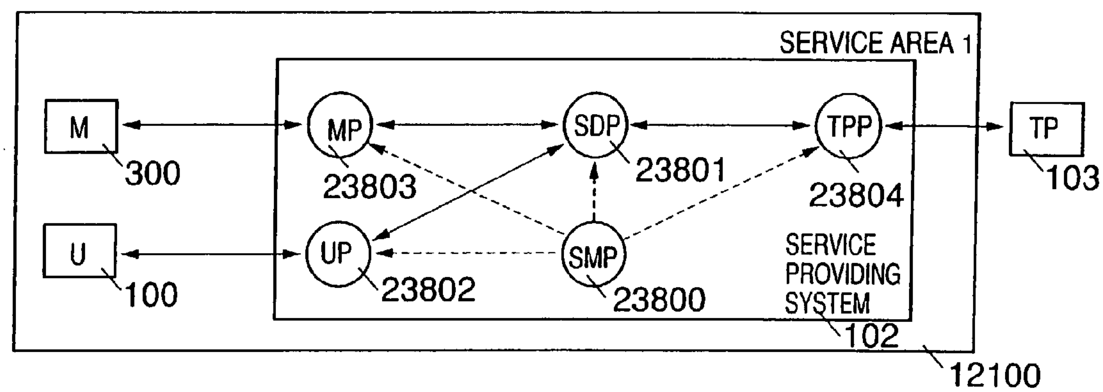
Figure 152B:
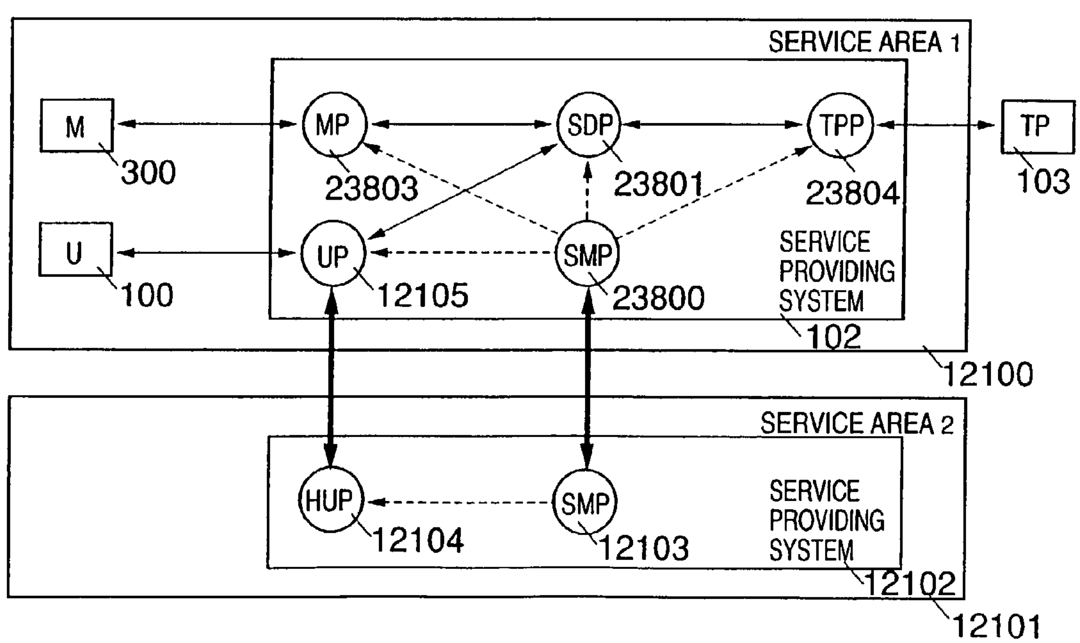
Figure 153A:
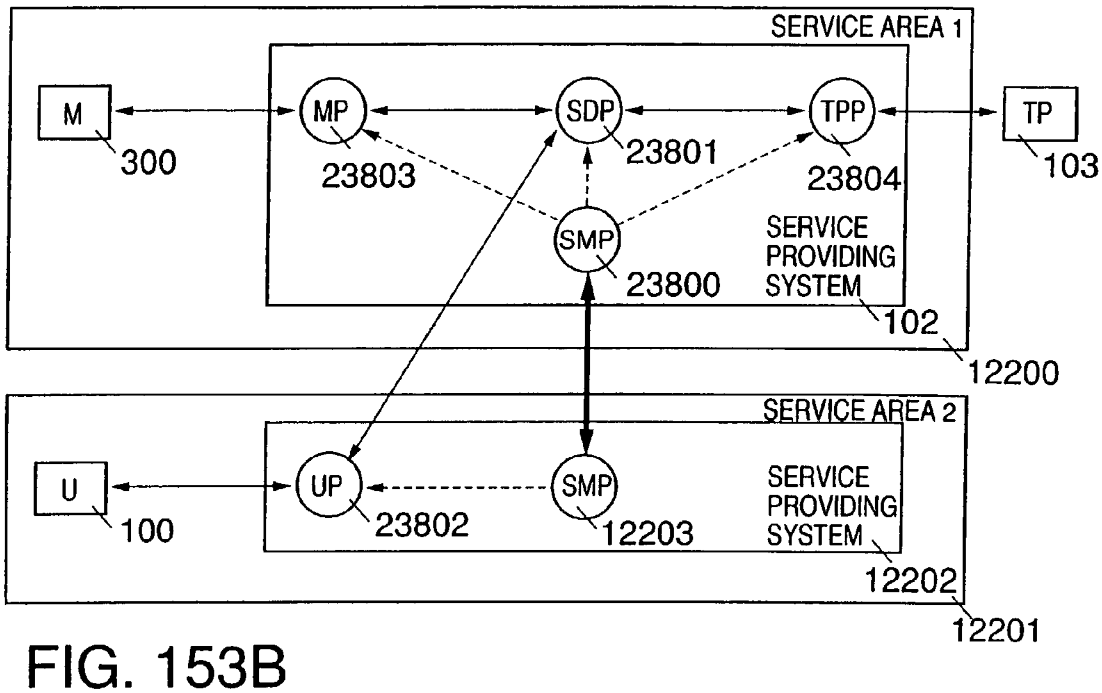
Figure 153B:
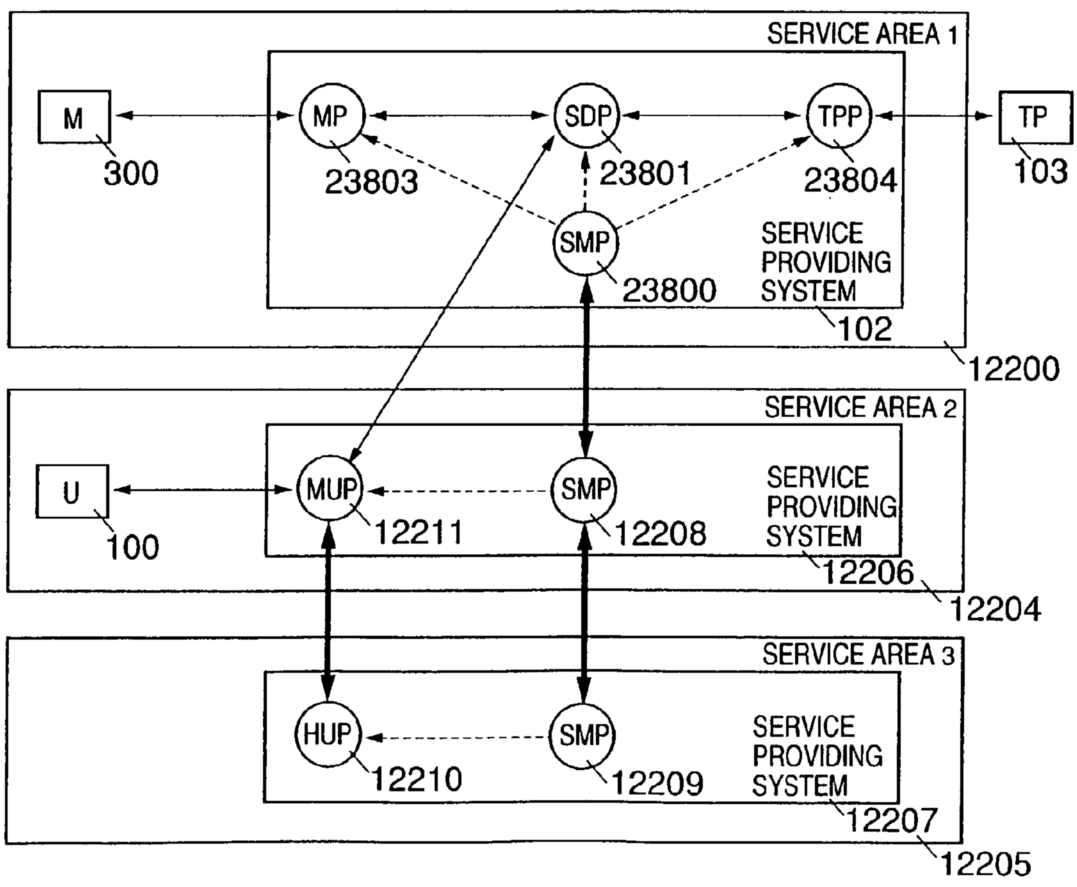
Figure 154A:
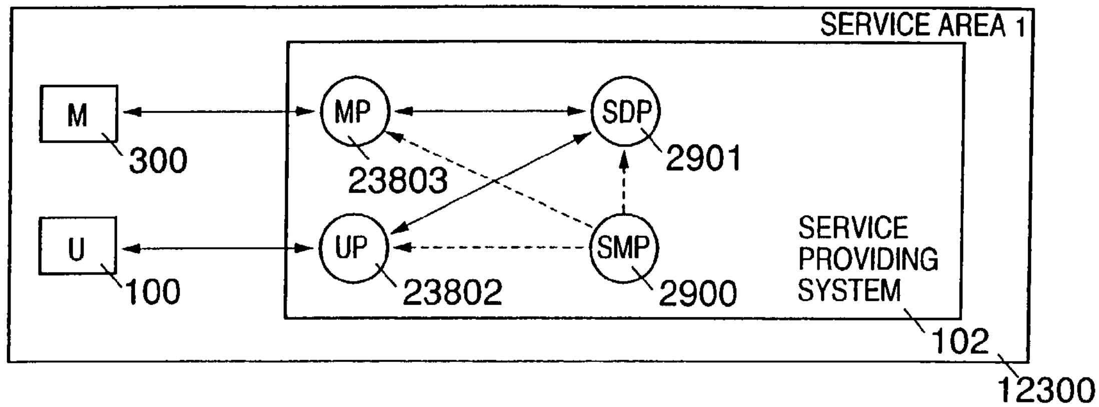
Figure 154B:
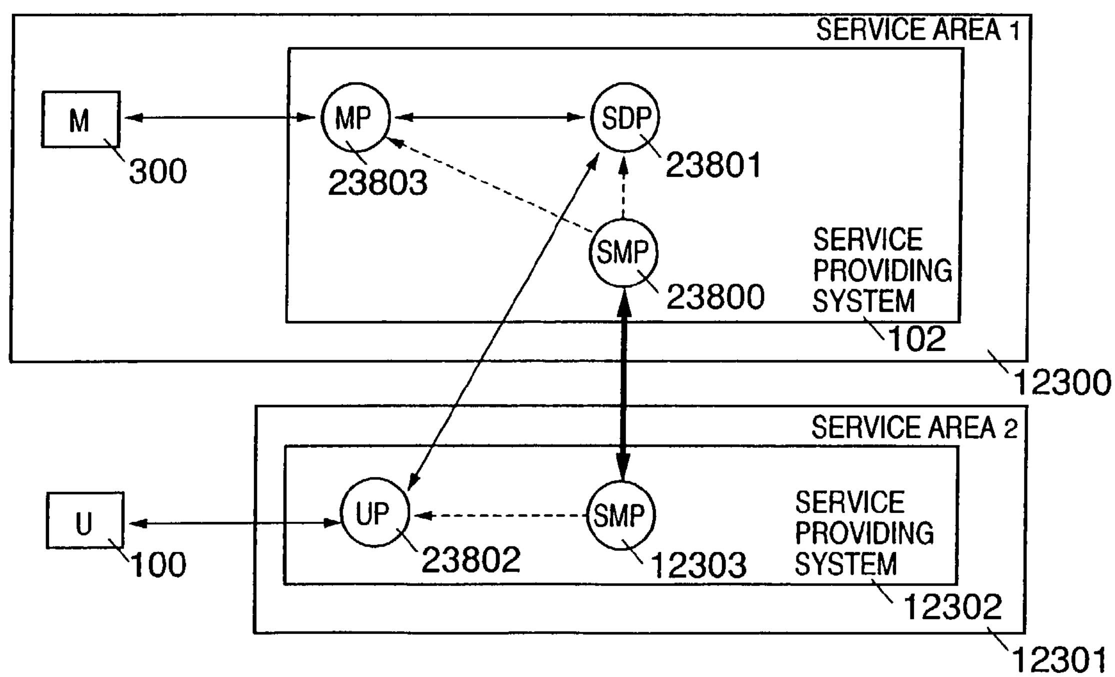
Figure 155A:
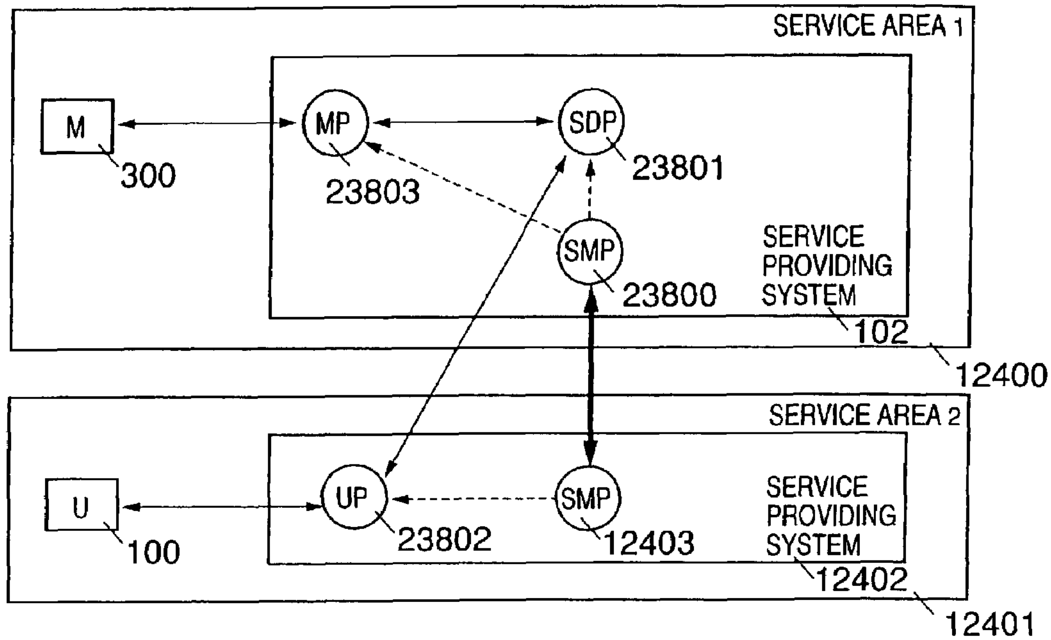
Figure 155B:
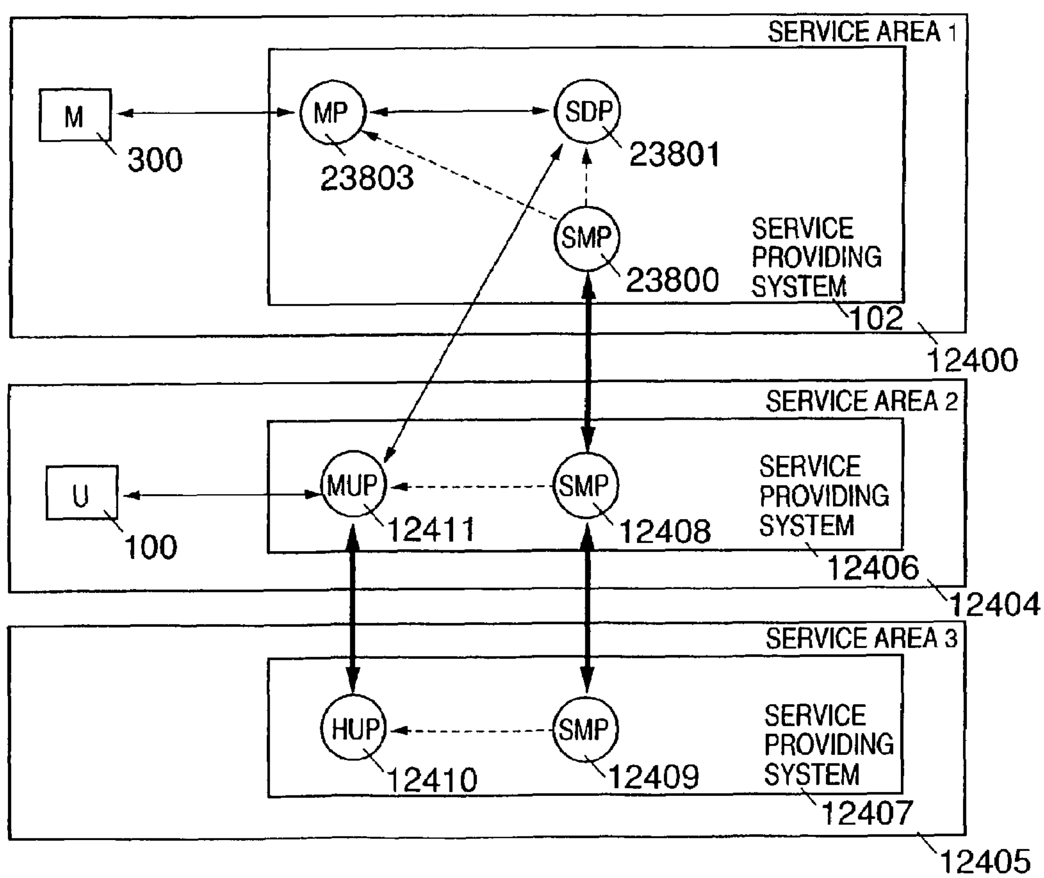

FIG. 73 is a specific diagram showing data that are stored for each settlement processor in a settlement processor information server in the service providing system according to the second embodiment of the present invention;

FIG. 74 is a specific diagram showing data that are stored in a service director information server in the service providing system according to the second embodiment of the present invention;

FIG. 75A is a specific diagram showing user process management information that is generated for each user processor by the service providing system according to the second embodiment of the present invention;

FIG. 75B is a specific diagram showing merchant process management information that is generated for each merchant processor by the service providing system according to the second embodiment of the present invention;

FIG. 75C is a specific diagram showing settlement processing management information that is generated for each settlement processor by the service providing system according to the second embodiment of the present invention;

FIG. 75D is a specific diagram showing service director process management information that is generated for each service director processor by the service providing system according to the second embodiment of the present invention;

FIG. 75E is a specific diagram showing process group management information that is generated for each process group by the service providing system according to the second embodiment of the present invention;

FIG. 75F is a specific diagram showing a list of messages that are generated by the service providing system according to the second embodiment of the present invention;

FIG. 76 is a flowchart showing the session establishment process performed when the personal credit terminal is connected to the service providing system according to the second embodiment of the present invention;

FIG. 77 is a flowchart showing the session establishment process performed when the service providing system is connected to the personal credit terminal according to the second embodiment of the present invention;

FIG. 78A is a specific diagram showing the data structure of authentication test A for the session establishment process performed when the service providing system is connected to the personal credit terminal according to the second embodiment of the present invention;

FIG. 78B is a specific diagram showing the data structure for a response to authentication test A;

FIG. 78C is a specific diagram showing the data structure for a response to authentication test B;

FIG. 78D is a specific diagram showing the data structure of authentication test C;

FIG. 78E is a specific diagram showing the data structure for a response to authentication test C;

FIG. 78F is a specific diagram showing the data structure for a response to authentication test D;

FIG. 79 is a flowchart showing the session establishment process performed when the credit settlement terminal is connected to the service providing system according to the second embodiment of the present invention;

FIG. 80 is a flowchart showing the session establishment process performed when the service providing system is connected to the credit settlement terminal according to the second embodiment of the present invention;

FIG. 81A is a specific diagram showing the data structure of authentication test A for the session establishment process performed when the service providing system is connected to the credit settlement terminal according to the second embodiment of the present invention;

FIG. 81B is a specific diagram showing the data structure for a response to authentication test A;

FIG. 81C is a specific diagram showing the data structure for a response to authentication test B;

FIG. 81D is a specific diagram showing the data structure of authentication test C;

FIG. 81E is a specific diagram showing the data structure for a response to authentication test C;

FIG. 81F is a specific diagram showing the data structure for a response to authentication test D;

FIG. 82A is a flowchart showing remote access processing performed by the personal credit terminal and the user processor according to the second embodiment of the present invention;

FIG. 82B is a flowchart showing updating processing performed by the personal credit terminal and the user processor according to the second embodiment of the present invention;

FIG. 82C is a flowchart showing forcible updating processing performed by the personal credit terminal and the user processor according to the second embodiment of the present invention;

FIG. 82D is a flowchart showing data backup processing performed by the personal credit terminal and the user processor according to the second embodiment of the present invention;

FIG. 83A is a specific diagram showing the data structure for a remote access request that is transmitted between the personal credit terminal and the user processor according to the second embodiment of the present invention;

FIG. 83B is a specific diagram showing the structure of remote access data that are exchanged between the personal credit terminal and the user processor according to the second embodiment of the present invention;

FIG. 83C is a specific diagram showing the data structure for a data updating request that is transmitted between the personal credit terminal and the user processor according to the second embodiment of the present invention;

FIG. 83D is a specific diagram showing the data structure for a data updating request response that is transmitted between the personal credit terminal and the user processor according to the second embodiment of the present invention;

FIG. 83E is a specific diagram showing the structure of upload data that are transmitted between the personal credit terminal and the user processor according to the second embodiment of the present invention;

FIG. 83F is a specific diagram showing the structure of update data that are transmitted between the personal credit terminal and the user processor according to the second embodiment of the present invention;

FIG. 84A is a specific diagram showing the data structure for a mandatory expiration command that is transmitted between the personal credit terminal and the user processor according to the second embodiment of the present invention;

FIG. 84B is a specific diagram showing the data structure for an update command that is transmitted between the personal credit terminal and the user processor according to the second embodiment of the present invention;

FIG. 85A is a flowchart showing remote access processing performed by the credit settlement terminal and the merchant processor according to the second embodiment of the present invention;

FIG. 85B is a flowchart showing updating processing performed by the credit settlement terminal and the merchant processor according to the second embodiment of the present invention;

FIG. 85C is a flowchart showing forcible updating processing performed by the credit settlement terminal and the merchant processor according to the second embodiment of the present invention;

FIG. 86A is a specific diagram showing the data structure for a remote access request that is transmitted between the credit settlement terminal and the merchant processor according to the second embodiment of the present invention;

FIG. 86B is a specific diagram showing the structure of remote access data that are exchanged between the credit settlement terminal and the merchant processor according to the second embodiment of the present invention;

FIG. 86C is a specific diagram showing the data structure for a data updating request that is transmitted between the credit settlement terminal and the merchant processor according to the second embodiment of the present invention;

FIG. 86D is a specific diagram showing the data structure for a data updating request response that is transmitted between the credit settlement terminal and the merchant processor according to the second embodiment of the present invention;

FIG. 86E is a specific diagram showing the structure of upload data that are transmitted between the credit settlement terminal and the merchant processor according to the second embodiment of the present invention;

FIG. 86F is a specific diagram showing the structure of update data that are transmitted between the credit settlement terminal and the merchant processor according to the second embodiment of the present invention;

FIG. 87A is a specific diagram showing the data structure for a mandatory expiration command that is transmitted between the credit settlement terminal and the merchant processor according to the second embodiment of the present invention;

FIG. 87B is a specific diagram showing the data structure for an update command that is transmitted between the credit settlement terminal and the merchant processor according to the second embodiment of the present invention;

FIG. 88 is a diagram for explaining the message exchange procedures for the settlement processing according to the second embodiment of the present invention;

FIG. 89A is a specific diagram showing the data structure for a payment offer according to the second embodiment of the present invention;

FIG. 89B is a specific diagram showing the data structure for a payment offer response according to the second embodiment of the present invention;

FIG. 89C is a specific diagram showing the data structure for an authorization request according to the second embodiment of the present invention;

FIG. 89D is a specific diagram showing the data structure for a payment request according to the second embodiment of the present invention;

FIG. 89E is a specific diagram showing the structure of a response to an authorization request according to the second embodiment of the present invention;

FIG. 89F is a specific diagram showing the data structure for a settlement request that is transmitted by the credit settlement terminal to the service providing system according to the second embodiment of the present invention;

FIG. 90A is a specific diagram showing the data structure for a settlement request that is transmitted by the service providing system to the settlement system according to the second embodiment of the present invention;

FIG. 90B is a specific diagram showing the data structure for a clearing confirmation notification that is transmitted by the settlement system to the service providing system according to the second embodiment of the present invention;

FIG. 90C is a specific diagram showing the data structure for a clearing confirmation notification that is transmitted by the service providing system to the credit settlement terminal according to the second embodiment of the present invention;

FIG. 91A is a specific diagram showing the data structure for a receipt that is transmitted by the credit settlement terminal to the service providing system according to the second embodiment of the present invention;

FIG. 91B is a specific diagram showing the data structure for a receipt that is transmitted by the service providing system to the personal credit terminal according to the second embodiment of the present invention;

FIG. 92 is a diagram for explaining the message exchange procedures for the cancellation process according to the second embodiment of the present invention;

FIG. 93A is a specific diagram showing the data structure for a cancellation request that is transmitted by the credit settlement terminal to the service providing system according to the second embodiment of the present invention;

FIG. 93B is a specific diagram showing the data structure for a cancellation request that is transmitted by the personal credit terminal to the service providing system according to the second embodiment of the present invention;

FIG. 93C is a specific diagram showing the data structure for a cancellation request that is transmitted by the service providing system to the settlement system according to the second embodiment of the present invention;

FIG. 93D is a specific diagram showing the data structure for a cancellation confirmation notification that is transmitted by the settlement system to the service providing system according to the second embodiment of the present invention;

FIG. 93E is a specific diagram showing the data structure of a cancellation confirmation notification that is transmitted by the service providing system to the credit settlement terminal according to the second embodiment of the present invention;

FIG. 93F is a specific diagram showing the data structure of a cancellation receipt according to the second embodiment of the present invention;

FIG. 94A is a diagram for explaining the message exchange procedures for the customer service call process according to the second embodiment of the present invention;

FIG. 94B is a diagram for explaining the message exchange procedures for the inquiry call process according to the second embodiment of the present invention;

FIG. 95A is a specific diagram showing the data structure of a customer service call request according to the second embodiment of the present invention;

FIG. 95B is a specific diagram showing the structure of a customer service call according to the second embodiment of the present invention;

FIG. 95C is a specific diagram showing the data structure of a response to a customer service call request according to the second embodiment of the present invention;

FIG. 95D is a specific diagram showing the data structure of a response to reception of a customer service call according to the second embodiment of the present invention;

FIG. 95E is a specific diagram showing the structure of a response to a customer service call according to the second embodiment of the present invention;

FIG. 96A is a specific diagram showing the structure of an inquiry call request according to the second embodiment of the present invention;

FIG. 96B is a specific diagram showing the data structure of an inquiry call according to the second embodiment of the present invention;

FIG. 96C is a specific diagram showing the data structure of a response to an inquiry call request according to the second embodiment of the present invention;

FIG. 96D is a specific diagram showing the data structure of a response to reception of an inquiry call according to the second embodiment of the present invention;

FIG. 96E is a specific diagram showing the data structure of a response to an inquiry call according to the second embodiment of the present invention;

FIG. 97A is a main flowchart (1) for the service manager processor according to the second embodiment of the present invention;

FIG. 97B is a flowchart showing the processing continued from FIG. 97A;

FIG. 98 is a main flowchart (2) for the service manager processor according to the second embodiment of the present invention;

FIG. 99 is a flowchart showing the processor generation processing performed by the service manager processor according to the second embodiment of the present invention;

FIG. 100 is a main flowchart for the user processor according to the second embodiment of the present invention;

FIG. 101 is a main flowchart for the merchant processor according to the second embodiment of the present invention;

FIG. 102 is a main flowchart for the settlement processor according to the second embodiment of the present invention;

FIGS. 103A and 103B are flowcharts showing the session establishment processing performed by the personal credit terminal when it is connected to the service providing system according to the second embodiment of the present invention;

FIG. 104 is a flowchart showing the session establishment processing performed by the personal credit terminal when it is connected to the service providing system according to the second embodiment of the present invention;

FIG. 105 is a flowchart showing the session establishment processing performed by the credit settlement terminal when it is connected to the service providing system according to the second embodiment of the present invention;

FIG. 106A is a flowchart showing one part of the session establishment processing performed by the merchant processor when the credit settlement terminal is connected to the service providing system according to the second embodiment of the present invention;

FIG. 106B is a flowchart showing the processing continued from FIG. 106A;

FIG. 107A is a flowchart showing one part of the session establishment processing performed by the user processor when the service providing system is connected to the credit settlement terminal according to the second embodiment of the present invention;

FIG. 107B is a flowchart showing the processing continued from FIG. 107A;

FIG. 108 is a flowchart showing the session establishment processing performed by the personal credit terminal when the service providing system is connected to the personal credit terminal according to the second embodiment of the present invention;

FIG. 109A is a flowchart showing one part of the session establishment processing performed by the merchant processor when the service providing system is connected to the credit settlement terminal according to the second embodiment of the present invention;

FIG. 109B is a flowchart showing the processing continued from FIG. 109A;

FIG. 110 is a flowchart showing the session establishment processing performed by the credit settlement terminal when the service providing system is connected to the credit settlement terminal according to the second embodiment of the present invention;

FIG. 111A is a flowchart showing the remote access processing performed by the personal credit terminal according to the second embodiment of the present invention;

FIG. 111B is a flowchart showing the user validity check processing performed by the personal credit terminal according to the second embodiment of the present invention;

FIG. 112A is a flowchart showing the remote access processing performed by the user processor according to the second embodiment of the present invention;

FIG. 112B is a flowchart showing the user validity check processing performed by the user processor according to the second embodiment of the present invention;

FIG. 113A is a flowchart showing one part of the remote access processing performed by the credit settlement terminal according to the second embodiment of the present invention;

FIG. 113B is a flowchart showing the processing continued from FIG. 113A;

FIG. 113C is a flowchart showing the merchant validity check processing performed by the credit settlement terminal according to the second embodiment of the present invention;

FIG. 114A is a flowchart showing the remote access processing performed by the merchant processor according to the second embodiment of the present invention;

FIG. 114B is a flowchart showing the merchant validity check processing performed by the merchant processor according to the second embodiment of the present invention;

FIG. 115A is a flowchart showing one part of the data updating processing performed by the personal credit terminal according to the second embodiment of the present invention;

FIG. 115B is a flowchart showing the processing continued from FIG. 115A;

FIG. 116 is a flowchart showing the data updating processing performed by the user processor according to the second embodiment of the present invention;

FIG. 117 is a flowchart showing the data updating processing performed by the credit settlement terminal according to the second embodiment of the present invention;

FIG. 118 is a flowchart showing the data updating processing performed by the merchant processor according to the second embodiment of the present invention;

FIG. 119 is a flowchart showing the forcible data updating processing performed by the personal credit terminal according to the second embodiment of the present invention;

FIG. 120A is a flowchart showing one part of the forcible data updating processing performed by the user processor according to the second embodiment of the present invention;

FIG. 120B is a flowchart showing the processing continued from FIG. 120A;

FIG. 121 is a flowchart showing the forcible data updating processing performed by the credit settlement terminal according to the second embodiment of the present invention;

FIG. 122 is a flowchart showing the forcible data updating processing performed by the merchant processor according to the second embodiment of the present invention;

FIG. 123 is a flowchart showing the data backup processing performed by the personal credit terminal according to the second embodiment of the present invention;

FIG. 124A is a flowchart (1) showing one part of the settlement processing performed by the credit settlement terminal according to the second embodiment of the present invention;

FIG. 124B is a flowchart showing the processing continued from FIG. 124A;

FIG. 125A is a flowchart (2) showing one part of the settlement processing performed by the credit settlement terminal according to the second embodiment of the present invention;

FIG. 125B is a flowchart showing the processing continued from FIG. 125A;

FIG. 126A is a flowchart (1) showing one part of the settlement processing performed by the merchant processor according to the second embodiment of the present invention;

FIG. 126B is a flowchart showing the processing continued from FIG. 126A;

FIG. 127 is a flowchart (2) showing the settlement processing performed by the merchant processor according to the second embodiment of the present invention;

FIG. 128A is a flowchart (1) showing one part of the settlement processing performed by the personal credit terminal according to the second embodiment of the present invention;

FIG. 128B is a flowchart showing the processing continued from FIG. 128A;

FIG. 129 is a flowchart (2) showing the settlement processing performed by the personal credit terminal according to the second embodiment of the present invention;

FIG. 130 is a flowchart showing the settlement processing performed by the user processor according to the second embodiment of the present invention;

FIG. 131A is a flowchart showing the settlement processing performed by the settlement system according to the second embodiment of the present invention;

FIG. 131B is a flowchart showing the transaction validity check processing performed by the settlement system according to the second embodiment of the present invention;

FIG. 132A is a flowchart showing the settlement processing performed by the settlement processor according to the second embodiment of the present invention;

FIG. 132B is a flowchart showing the transaction validity check processing performed by the settlement processor according to the second embodiment of the present invention;

FIG. 133A is a flowchart (1) showing one part of the settlement processing performed by the service director processor according to the second embodiment of the present invention;

FIG. 133B is a flowchart showing the processing continued from FIG. 133A;

FIG. 134 is a flowchart (2) showing the settlement processing performed by the service director processor according to the second embodiment of the present invention;

FIG. 135A is a flowchart (1) showing one part of the cancellation processing performed by the credit settlement terminal according to the second embodiment of the present invention;

FIG. 135B is a flowchart showing the processing continued from FIG. 135A;

FIG. 136 is a flowchart showing the cancellation processing performed by the merchant processor according to the second embodiment of the present invention;

FIG. 137A is a flowchart showing one part of the cancellation processing performed by the personal credit terminal according to the second embodiment of the present invention;

FIG. 137B is a flowchart showing the processing continued from FIG. 137A;

FIG. 138 is a flowchart showing the cancellation processing performed by the user processor according to the second embodiment of the present invention;

FIG. 139 is a flowchart showing the cancellation processing performed by the settlement system according to the second embodiment of the present invention;

FIG. 140 is a flowchart showing the cancellation processing performed by the settlement processor according to the second embodiment of the present invention;

FIG. 141A is a flowchart showing one part of the cancellation processing performed by the service director processor according to the second embodiment of the present invention;

FIG. 141B is a flowchart showing the processing continued from FIG. 141A;

FIG. 142A is a flowchart showing one part of the customer service call processing performed by the credit settlement terminal according to the second embodiment of the present invention;

FIG. 142B is a flowchart showing the processing continued from FIG. 142A;

FIG. 143A is a flowchart showing one part of the customer service call processing performed by the merchant processor according to the second embodiment of the present invention;

FIG. 143B is a flowchart showing the processing continued from FIG. 143A;

FIG. 144 is a flowchart showing the customer service call processing performed by the personal credit terminal according to the second embodiment of the present invention;

FIG. 145 is a flowchart showing the customer service call processing performed by the user processor according to the second embodiment of the present invention;

FIG. 146A is a flowchart showing one part of the customer service call processing performed by the service director processor according to the second embodiment of the present invention;

FIG. 146B is a flowchart showing the processing continued from FIG. 146A;

FIG. 147A is a flowchart showing one part of the inquiry call processing performed by the personal credit terminal processor according to the second embodiment of the present invention;

FIG. 147B is a flowchart showing the processing continued from FIG. 147A;

FIG. 148A is a flowchart showing one part of the inquiry call processing performed by the user processor according to the second embodiment of the present invention;

FIG. 148B is a flowchart showing the processing continued from FIG. 148A;

FIG. 149 is a flowchart showing the inquiry call processing performed by the credit settlement terminal according to the second embodiment of the present invention;

FIG. 150 is a flowchart showing the inquiry call processing performed by the merchant processor according to the second embodiment of the present invention;

FIG. 151A is a flowchart showing one part of the inquiry call processing performed by the service director processor according to the second embodiment of the present invention;

FIG. 151B is a flowchart showing the processing continued from FIG. 151A;

FIG. 152A is a diagram for explaining the operation according to the second embodiment of the present invention when the same home service area is employed for a user and a merchant, and when the user performs a settlement processor a cancellation process in the home service area;

FIG. 152B is a diagram for explaining the operation according to the second embodiment of the present invention when different home service areas are employed for a user and a merchant, and when the user performs a settlement processor a cancellation process in the home service area for the merchant;

FIG. 153A is a diagram for explaining the operation according to the second embodiment of the present invention when different home service areas are employed for a user and a merchant, and when the user performs a cancellation process in the home service area for the user;

FIG. 153B is a diagram for explaining the operation according to the second embodiment of the present invention when different home service areas are employed for a user and a merchant, and when the user performs a cancellation process in a service area other than the home service areas for the user and for the merchant;

FIG. 154A is a diagram for explaining the operation according to the second embodiment of the present invention when the same home service area is employed for a user and a merchant, and when the user and the merchant perform a customer service call process or an inquiry call process in the home service area;

FIG. 154B is a diagram for explaining the operation according to the second embodiment of the present invention when different home service areas are employed for a user and a merchant, and when the merchant performs a customer service call process for the user;

FIG. 155A is a diagram for explaining the operation according to the second embodiment of the present invention when different home service areas are employed for a user and a merchant, and when the user performs an inquiry call process in the home service area for the user; and FIG. 155B is a diagram for explaining the operation according to the second embodiment of the present invention when different home service areas are employed for a user and a merchant, and when the user performs an inquiry call process in a service area other than the home service areas for the user and for the merchant.

The reference numerals used in the drawings are as follows:

| | |
|---|---|
| 100: | personal credit terminal (payment means) |
| 101: | credit settling device (charging means) |
| 102: | service providing system |
| 103, 4202: | settlement system (manager) |
| 104: | base station |
| 108: | digital public line network |
| 200: | infrared communication port |
| 201: | antenna |
| 202: | receiver/loudspeaker |
| 203, 302: | LCD |
| 204, 304: | mode switch |
| 205: | speech switch |
| 206: | end switch |
| 207, 306: | function switch |
| 208, 307: | number key switch |
| 209, 309: | power switch |
| 210: | microphone |
| 211, 208: | execution switch |
| 212: | headphone jack |
| 300: | credit settlement terminal |
| 301: | infrared emission module |
| 303: | telephone handset |
| 305: | hook switch |
| 310: | serial cable |
| 311: | cash register |

-continued

| | |
|---|---|
| 312: | credit clearing switch |
| 313: | RS-232C cable |
| 400: | service server |
| 401: | service director information server |
| 402: | user information server |
| 403: | merchant information server |
| 404: | settlement processor information server |
| 405, 408, 504, 507: | ATM-LAN switch |
| 406, 505: | ATM switchboard |
| 407, 506: | management system |
| 500: | transaction server |
| 501: | subscriber information server |
| 502: | member information storage server |
| 503: | transaction information server |
| 1507: | infrared communication module |
| 1500, 2400, 22400: | CPU |
| 1501, 2401, 22501: | ROM |
| 1502, 2402, 22502: | RAM |
| 1503, 2404, 22504: | EEPROM |
| 1504, 2405, 22505: | LCD controller |
| 1505, 2406, 22506: | encryption processor |
| 1506, 2407, 22507: | data codec |
| 1508, 2410, 22510: | control logic unit |
| 1509, 2411, 22511: | key operator |
| 1510, 2412, 22512: | loudspeaker |
| 1511, 2413, 22513: | audio processor |
| 1512, 2114, 22514: | audio codec |
| 1513, 2415, 22515: | channel codec |
| 1514: | modulator |
| 1515: | demodulator |
| 1517: | RF unit |
| 1518: | battery capacity detector |
| 1560, 2408, 22508: | series/parallel converter |
| 1561, 2456, 22556: | modulator/demodulator |
| 1800, 21600: | frame counter |
| 1801, 21601: | start frame counter |
| 1802, 2700, 21602, 22600: | clock counter |
| 1803, 2701, 21603, 22601: | update time register |
| 1804, 2702, 21604, 22602: | interrupt register |
| 1805, 2703, 21605, 22603: | ID register |
| 1806, 2704, 21606, 22604: | channel codec control register |
| 1807, 2705, 21607, 22605: | audio transmission buffer |
| 1808, 2706, 21608, 22606: | audio reception buffer |
| 1809, 2707, 21609, 22607: | data transmission buffer |
| 1810, 2708, 21610, 22608: | data reception buffer |
| 1811, 2709, 21611, 22609: | audio processor control buffer |
| 1812, 2710, 21612, 22610: | key operator control register |
| 21613, 22611: | audio data encryption key register |
| 2403, 22503: | hard disk |
| 2409, 2455, 22503, 22555: | serial port |
| 2416, 22516: | digital communication adaptor |
| 2417, 22517: | RS-232C interface |
| 4200: | credit card |
| 4201: | credit settlement terminal |
| 4203: | public line network |

DETAILED DESCRIPTION OF THE PREFERRED EMBODIMENTS

The embodiments of the present invention will now be described while referring to the drawings.

First Embodiment

A first embodiment of the present invention will now be described while referring to FIGS. 1 through 41E, inclusive.

When an individual consumer purchases a product at an ordinary store, a credit settlement system in the first embodiment employs radio communication to perform a credit transaction, without a credit card and a specification being directly exchanged by the consumer and the store. This system is called a personal remote credit settlement system, and the credit settling service provided by this system is called a personal remote credit settling service.

Figure 1:
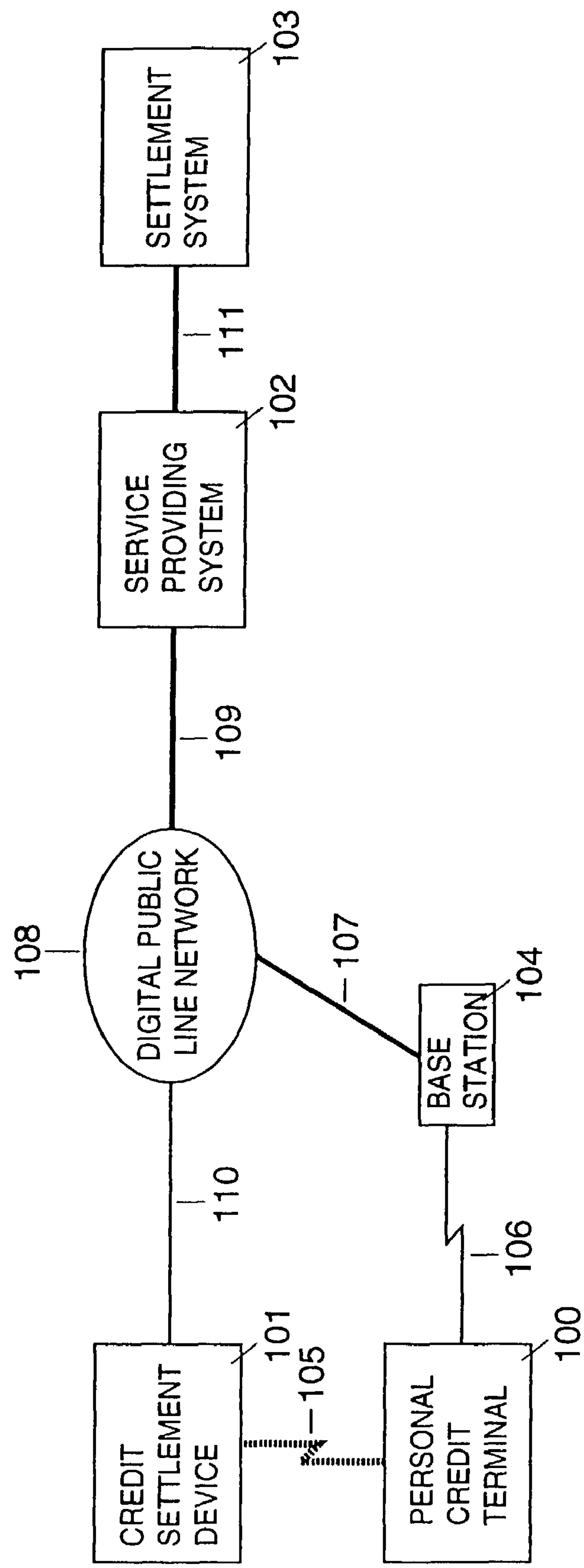
FIG. 1 is a block diagram illustrating the arrangement of a personal electronic settlement system according to a first and a second embodiment of the present invention.

As is shown in the system arrangement in FIG. 1, the personal remote credit settlement system comprises: a personal credit terminal 100 having two types of bidirectional radio communication functions and an electronic credit card function; a credit settling device 101 for performing a credit transaction at a store; an settlement system 103 for performing credit settling at a credit service company or a transaction company; a service providing system 102, which is located at the center of a network that links it to the personal credit terminal 100, the credit settling device 101 and the settlement system 103, which provide a personal remote credit settling service; and a wireless telephone base station 104, which links the personal credit terminal is 100 to a digital public line network 108 to provide a data transmission path.

The personal credit terminal (first terminal) 100 is a portable wireless telephone terminal that has two types of bidirectional wireless communication functions, i.e., an infrared communication function and a digital wireless telephone function, and an electronic credit card function. A credit settling device (second terminal) 101 that performs a credit settlement processing at a store also has two types of bidirectional communication functions, i.e., an infrared communication and a digital telephone communication.

In FIG. 1, reference numeral 105 denotes a transmission path for infrared communication performed between the personal credit terminal 100 and the credit settling device 101; 106, a transmission path for digital radio communication performed between the personal credit terminal 100 and the base station 104; 107, a digital communication line connecting the base station 104 and the digital public line network 108; 109, a digital communication line connecting the digital public line network 108 and the service providing system 102; 110, a digital telephone communication line connecting the credit settling device 101 and the digital public line network 108; and 111, a digital communication line connecting the service providing system 102 and the settlement system 103.

The following mode is assumed as the operating mode for the personal remote credit settling service.

Assume that the settlement system 103 is installed at a credit card company or a transaction company, the credit settling device 101 is installed in a store, and the personal credit terminal 100 is carried by a consumer. The service providing system 102 is installed at a company that provides the personal remote credit settling service, and when the credit card company provides that service, the service providing system 102 is installed at the credit card company.

As a further assumption, for the credit service the consumer enters into a membership contract with the credit card company, a membership contract for the personal remote credit settling service with the company that provides the personal remote credit settling service, and a contract for wireless telephone service with a telephone company. Similarly, the store enters into a member contract with the credit card company for credit service; a member contract with the company that provides the personal remote credit settling service for the personal remote credit settling service; and a contract for digital telephone communication service with the telephone company.

When the personal remote credit settling service is provided by a company other than the credit card company, the company that provides the personal remote credit settling service enters into a contract with a member who has a contract for a credit service with the credit card company so that the personal remote credit settling service providing company can take the place of the credit card company and can issue an electronic credit card and operate a personal remote settling service.

When the transaction company employs the settlement system 103 to perform a credit settlement processing, the credit card company enters into a contract with the transaction company so that the transaction company can act to perform the credit transaction.

To simplify the explanation of the system of the present invention, a consumer who owns the personal credit terminal 100 is called a user, a store wherein the credit settling device 101 is installed is called a merchant, a sales clerk who operates the credit settling device 101 is called an operator, a company that provides the personal remote credit settling service is called a service provider, and a credit card company or a transaction company that employs the settlement system 103 to perform the credit transaction is called a settlement processor.

With this system, when a user employs credit to pay a merchant the cost of a product, to perform the credit settlement processing the personal credit terminal 100, the credit settling device 101 and the service providing system 102 exchange transaction information electronically, and the service providing system 102 and the settlement system 103 exchange transaction information electronically.

In essence, the service providing system 102 receives a payment request and a settlement request from the personal credit terminal 100 and the credit settling device 101, compares these requests, and acts for the user and the merchant by requesting that the settlement system 100 perform the settlement processing. Then, the settlement system 103 performs the actual transaction.

At this time, the personal credit terminal 100 and the credit settling device 101 engage in infrared communication across the transmission path 105. And the personal credit terminal 100 and the service providing system 102 use a digital wireless telephone to engage in digital telephone communication via the transmission path 106 to the base station 104 and across the digital communication line 107, the digital public line network 108 and the digital communication line 109. Further, the credit settling device 101 and the service providing system 102 engage in digital telephone communication across the digital telephone communication line 110, the digital public line network 108 and the digital communication line 109. In addition, the service providing system 102 and the settlement system 103 engage in digital data communication across the digital communication line 111.

The transaction information that is encrypted is exchanged by the personal credit terminal 100 and the service providing system 102, by the credit settling device 101 and the service providing system 102, and by the service providing system 102 and the settlement system 103. An encryption method that uses a secret key and an encryption method that uses a public key are combined to electronically close information and transmit it.

The individual components of the system in this embodiment will now be described.

First, an explanation for the personal credit terminal 100 will be given.

Figure 2A:
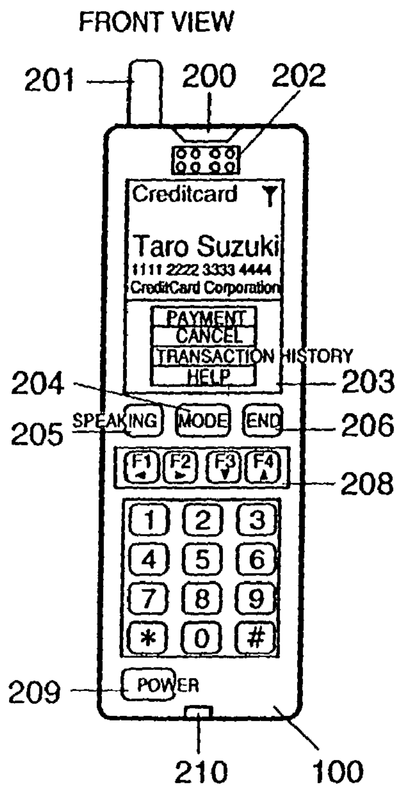
FIG. 2A is a front elevational view and FIG. 2B is rear elevational view of a personal credit terminal according to the first and the second embodiments of the present invention.
Figure 2B:
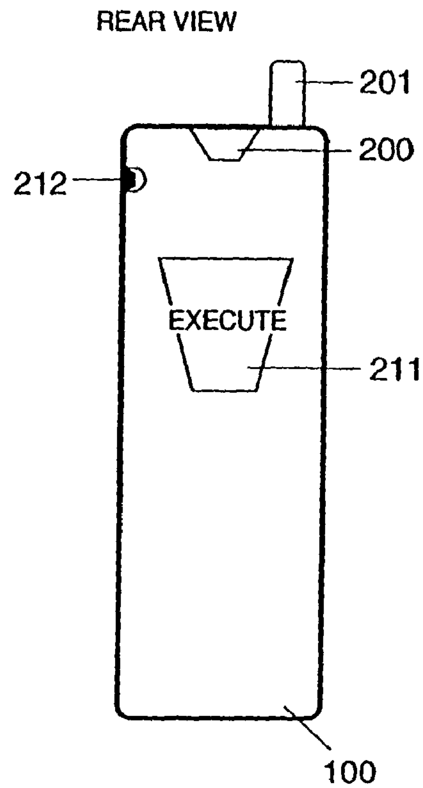

FIGS. 2A and 2B are a front view and a rear view of the personal credit terminal 100.

In FIG. 2A, reference numeral 200 denotes an infrared communication port (infrared ray reception/emission section) for engaging in infrared communication with the credit settling device 101; 201, an antenna whereby electronic waves for a digital wireless telephone are transmitted and received; 202, a receiver/loudspeaker; 203, a color liquid crystal display (LCD) for displaying 120×160 pixels; 204, a mode switch used for changing the operating mode of the personal credit terminal 100; 205, a speech switch for a digital wireless phone; 206, an end switch for a digital wireless phone; 207, a function switch; 208, a number key switch; 209, a power switch; and 210, a microphone.

In FIG. 2B, reference numeral 211 denotes an execution switch whereby is transmitted an instruction for the initiation of a process requiring the confirmation of a user, such as the payment of a price, the confirmation of the contents of a transaction, or the cancellation of credit settling; and 212, a headphone jack for connecting a headphone.

The personal credit terminal 100 has two operating modes: a credit card mode and a digital wireless telephone mode, which can be alternately selected using the mode switch 204. The personal credit terminal 100 serves as a digital wireless telephone in the digital wireless telephone mode, and as an electronic credit transmission means, i.e., an electronic credit card, in the credit card mode.

The electronic credit card is registered at the personal credit terminal 100 while it is assumed that the user has entered into a membership contact for the credit service with the credit card company. When the user has membership contracts for a plurality of credit services, a corresponding number of credit cards are registered at the terminal 100.

In order to make a call using the personal credit terminal 100, first, the user selects the digital wireless telephone mode using the mode switch 204, and then enters a telephone number using the number key switch 208 and depresses the speech switch 205. Through this process, the user can complete a call to the destination represented by the telephone number that was entered.

When a call is received at the personal credit terminal 100, it generates a call arrival tone, regardless of its current operating mode. In this case, the user need only depress the speech switch 205 to automatically change the operating mode to the digital wireless telephone mode and answer the call.

In order to use credit to make a payment to a merchant, first, the user employs the mode switch 204 to set the operating mode to the credit card mode, following which he employs the function switch 207 to select a credit card to use for the payment. Then, the user enters the amount of the payment using the number key switch 208, and depresses the execution switch 211, while at the same time pointing the communication port 200 toward the credit settling device 101 of the merchant. Through the execution of the above process, the personal credit terminal 100 engages in infrared communication with the credit settling device 101 and digital wireless telephone communication with the service providing system 102, while exchanging transaction information with them and thus performing the credit settlement processing. A detailed description of the internal structure of the personal credit terminal 100 and the operation thereof will be given later.

Next, the credit settling device 101 will be described.

Figure 3:
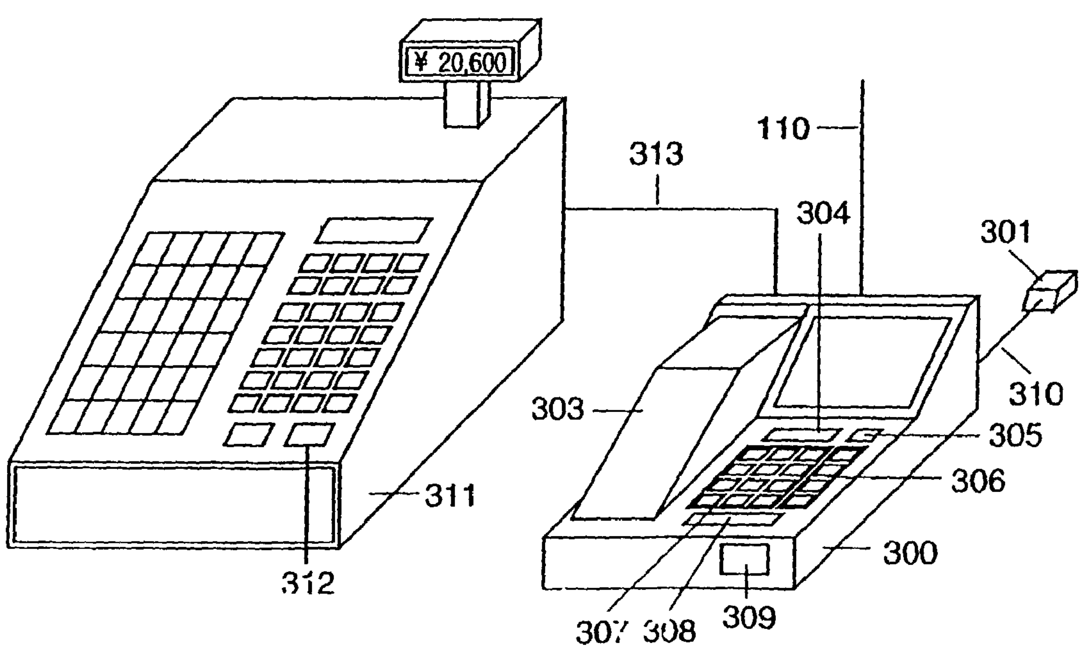
FIG. 3 is a perspective view of illustrating a credit settlement terminal according to the first and the second embodiment of the present invention.

FIG. 3 is a diagram showing the external appearance of the credit settling device 101. This device comprises: a credit settlement terminal 300, which has a credit transaction function and a digital telephone function; a cash register 311, which is used to calculate the cost of a product; an RS-232C cable 313, along which the credit settlement terminal 300 is connected to the cash register 311; and an infrared light reception/emission module 301, which is connected to the credit settlement terminal 300 via a serial cable 310.

In FIG. 3, reference numeral 314 denotes a color liquid crystal display (LCD) for displaying 320×240 pixels; 303, a telephone handset; 304, a mode switch, for changing the operating mode of the credit settlement terminal 300; 305, a telephone hook switch; 306, a function switch; 307, a number key switch; 308, an execution switch, for initiating a process that requires the confirmation of a merchant, such as a payment for a product, the confirmation of the contents of a transaction, or the cancellation of a credit transaction; 309, a power switch; and 312, a credit transaction switch for selecting the credit settlement processing at the cash register 311.

The credit settlement terminal 300 has two operating modes: a credit transaction mode and a digital telephone mode, which can be alternately selected using the mode switch 304. The credit settlement terminal 300 serves as a digital telephone in the digital telephone mode, and as a credit settlement terminal for the personal remote credit transaction service in the credit transaction mode.

In order to make a call using the credit settlement terminal 300, first, an operator selects the digital telephone mode using the mode switch 304, following which he enters a telephone number using the number key switch 307. Through this process, the operator can complete a call to the destination represented by the telephone number that was entered.

When a call is received at the credit settlement terminal 300, it generates a call arrival tone, regardless of its current operating mode. In this case, the operator need only raise the telephone handset 303 or depress the hook switch 305 to automatically change the operating mode to the digital telephone mode and answer the call.

In order to perform the credit settlement processing, first, the operator uses the cash register 311 to calculate a total for the price of a product and the sales tax, and transmits the total to the user. Then, in accordance with the user's request to use credit for the payment, the operator depresses the credit transaction switch 312 of the cash register 311 and waits until the user has completed the payment operation using the personal credit terminal 100. When the user has executed the payment process, the payment price that the user entered is displayed on the LCD 302 along with the results of the credit reference check performed for the user. The operator confirms the display contents and depresses the execution switch 308.

Through the execution of this process, the credit settling device 101 exchanges transaction information with the personal credit terminal 100 and the service providing system 102, and performs the credit settlement processing. A detailed description of the internal structure of the credit settlement terminal 300 and the operation thereof will be given later.

Now, the service providing system 102 will be described.

Figure 4:
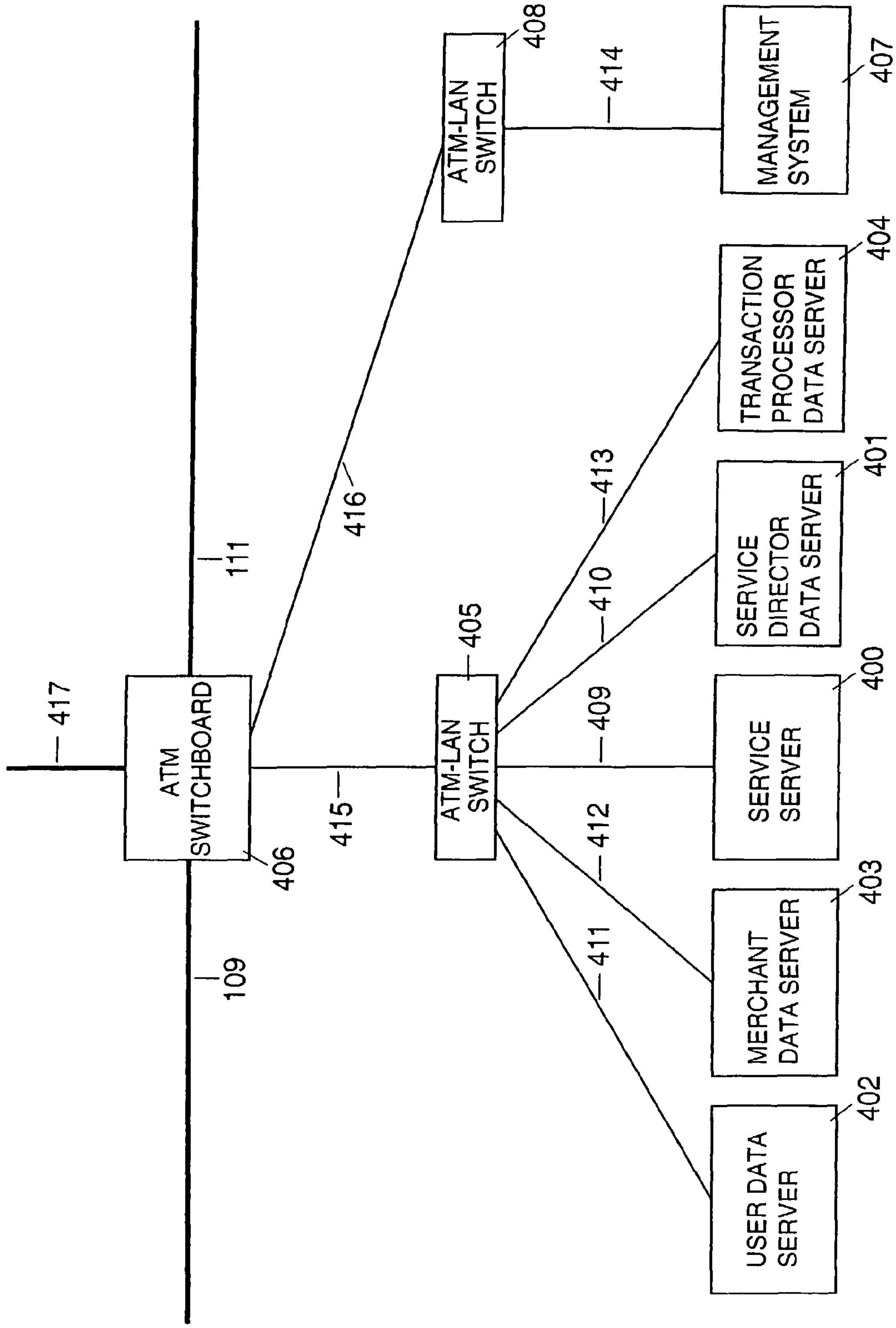
FIG. 4 is a block diagram illustrating the arrangement of a service providing system according to the first and the second embodiment of the present invention.

FIG. 4 is a block diagram illustrating the arrangement of the service providing system 102. The service providing system 102 comprises: a service server 400, which processes transaction information, for the personal remote credit transaction service, that is to be exchanged with the personal credit terminal 100, the credit settling device 101 and the settlement system 103; a service director information server 401, which manages attribute information that concerns the user, the merchant and the settlement processor, and service history information that is provided by the service providing system 102; a user information server 402, which manages the attribute information for the user, and the data stored in the personal credit terminal 100; a merchant information server 403, which manages the attribute information for the merchant, and data stored in the credit settlement terminal 300; a settlement processor information server 404, which manages the attribute information for the settlement processor, and history information for the settlement processing; and a management system 407, with which a service provider operates and manages the service providing system 102. Each of the servers 400 to 404, and the management system 407, is constituted by one or more computers.

The service server 400, the service director information server 401, the user information server 402, the merchant information server 403 and the settlement processor information server 404 are respectively connected to an ATM-LAN switch 405 by ATM-LAN cables 409, 410, 411, 412 and 413. The service server 400 accesses the service director information server 401, the user information server 402, the merchant information server 403 or the settlement processor information server 404 via the ATM-LAN switch 405.

The ATM-LAN switch 405 is connected to an ATM switch board 406 by an ATM-LAN cable 415. The ATM switch board 406 is connected to the digital communication line 109, which is extended to the digital public line network 108, and the digital communication line 111, which extends to the settlement system 103. The service server 400 communicates, along the ATM-LAN switch 405 and the ATM switch board 406, with the personal credit terminal 100, the credit settling device 101 and the settlement system 103.

The management system 407 is connected by an ATM-LAN cable 414 to an ATM-LAN switch 408, and from there to the ATM switch board 406 by an ATM-LAN cable 416. The management system 407 accesses the service server 400, the service director information server 401, the user information server 402, the merchant information server 403 or the settlement processor information server 404 via the ATM-LAN switch 408, the ATM switch board 406 and the ATM-LAN switch 405, and operates and manages the service providing system 102.

The ATM switch board 406 serves as a data communication switch board for external/internal communication by the service providing system 102 and inter-communication therefor. The ATM switch board 405 serves as a communication adaptor that is compatible with a plurality of communication types. For example, for communications conducted between the service server 400 and the credit settling device 101, first, an ISDN packet is exchanged by the credit settling device 101 and the ATM switch board 406. Then, the ATM switch board 406 converts the ISDN data packet into an ATM packet, an inverted conversion, and exchanges the ATM packet with the service server 400. Similarly, for communications conducted between the service server 400 and the personal credit terminal 100, and between the service server 400 and the settlement system 103, the ATM switch board 406 converts data in accordance with a corresponding communication type.

In addition, in order to reduce the expenses for communication between the personal credit terminal 100 and the service providing system 102, and between the credit settling device 101 and the service providing system 102, generally a service providing system 102 is installed in each area to provide the personal remote credit settling service. For this purpose, a special digital communication line 417 is connected to the ATM switch board 406 that links it with a service providing system 102 in each area. In this case, all the service providing systems 102 share data, and cooperate in the processing of the data.

The settlement system 103 will be briefly described.

Figure 5:
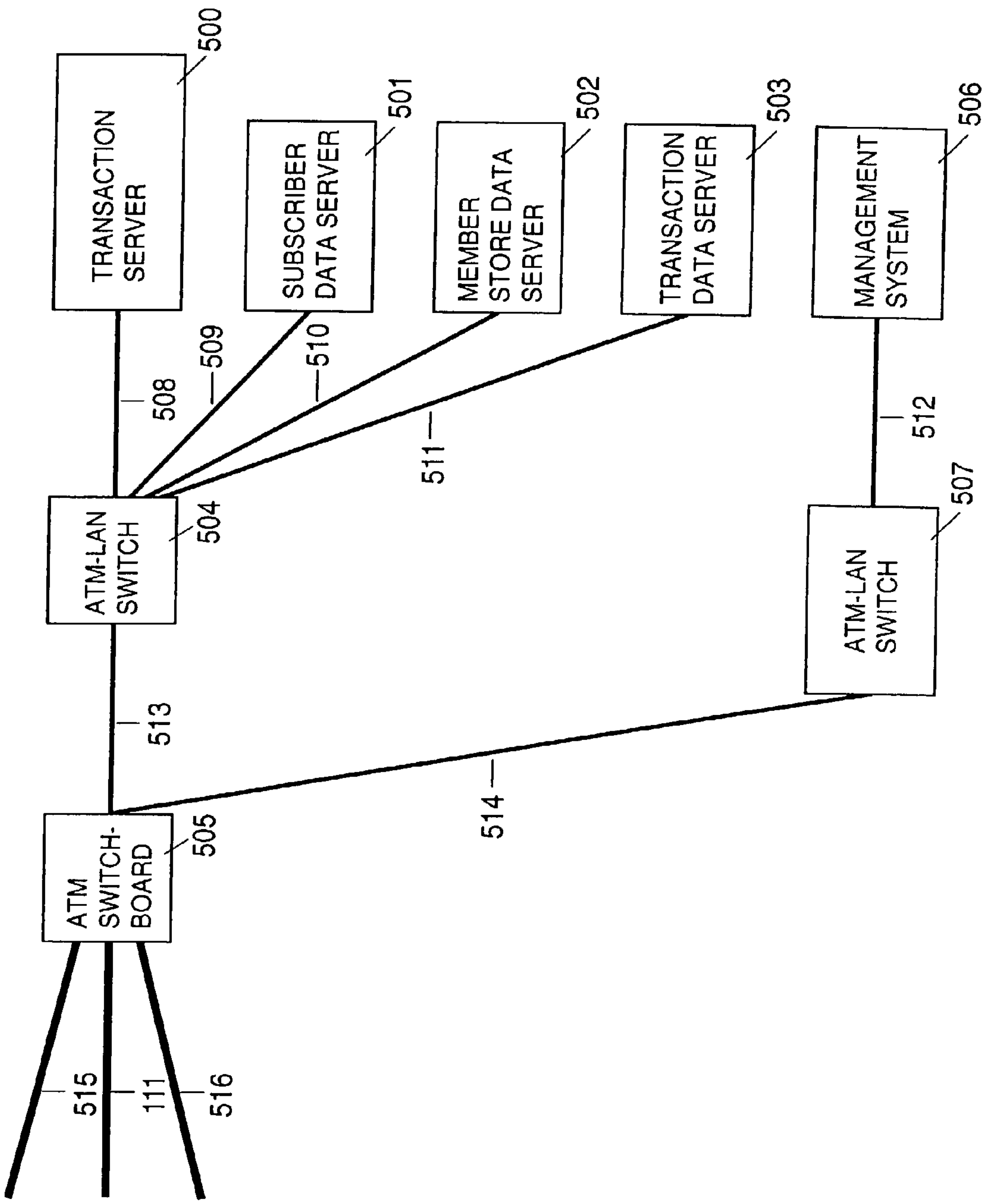
FIG. 5 is a block diagram illustrating the arrangement of an settlement system according to the first and the second embodiment of the present invention.

FIG. 5 is a block diagram illustrating the arrangement of the settlement system 103. The settlement system 103 comprises: a transaction server 500, which processes transaction information that is to be exchanged with the service providing system 102 for the personal remote credit transaction service; subscriber information server 501, which manages personal information for a credit service subscriber; a member information storage server 502, which manages information for a credit service member store; a transaction information server 503, which manages transaction information for credit settling; and a management system 506, with which the settlement processor operates and manages the settlement system 103. Each of the individual servers 500 to 503, and the management system 506, are constituted by one or more computers.

The transaction server 500, the subscriber information server 501, the member information storage server 502 and the transaction information server 504 are respectively connected to an ATM-LAN switch 504 by ATM-LAN cables 508, 509, 510 and 511. The transaction server 500 accesses the subscriber information server 501, the member information storage server 502 or the transaction information server 503 via the ATM-LAN switch 504.

The ATM-LAN switch 504 is connected to an ATM switch board 505 by an ATM-LAN cable 513, and the ATM switch board 505 is connected to the digital communication line 111, which extends to the service providing system 102. The transaction server 500 communicates with the service providing system 102 via the ATM-LAN switch 504 and the ATM switch board 505.

For the personal remote credit transaction service, the credit settlement processing performed by the settlement system 103 is initiated when, after a transaction request is received from the service providing system 102, the transaction server 500 updates data stored in the subscriber information server 501, the member information storage server 502, and the transaction information server 503.

The ATM switch board 505 is connected not only to the digital communication line 111 that extends to the service providing system 102, but also to a bank line 515 that is connected to a bank on-line system, and to a special digital line 516 that is connected to an settlement system for another settlement processor. The settlement system 103 communicates with the bank on-line system and the settlement system for the other settlement processor when performing a settlement processing between financial organizations.

The management system 506 is connected to an ATM-LAN switch 507 by an ATM-LAN cable 512, and to the ATM switch board 505 by an ATM-LAN cable 514. The management system 506 accesses the transaction server 500, the subscriber information server 501, the member information storage server 502, or the transaction information server 503 via the ATM-LAN switch 507, the ATM switch board 505 and the ATM-LAN switch 504, and operates and manages the settlement system 103.

The ATM switch board 505 serves as a data communication switch board for the external-internal communication of the settlement system 103 and the inter-communication therefor. The ATM switch board 505 serves as a communication adaptor that is compatible with a plurality of communication types, and performs data conversion in accordance with the communication type used for communication between the transaction server 500 and the service providing system 102, between the transaction server 500 and the bank on-line system, and between the transaction server 500 and the settlement system for the other settlement processor.

The personal remote credit transaction service provided by the system in this embodiment will now be described.

Roughly four processes are employed for the personal remote credit transaction service: "transaction," "cancellation", "customer service call," and "inquiry call."

The settlement processing is one whereby a credit transaction, for which a user employs credit to make a payment to a merchant, is performed by employing wireless communication, without the direct exchange of a credit card or payment specifications. The cancellation process is one whereby trading that has been completed as a transaction performed by the personal remote credit transaction service is canceled, based on an agreement reached by a user and a merchant while employing wireless communication. The customer service call process is a process whereby a merchant can contact a user for whom a personal remote credit transaction service has been completed, even when the merchant does not know the telephone number of the user. The inquiry call process is a process whereby a user can place an inquiry call to a merchant to whom the results of a personal remote credit transaction service has been provided, without the merchant being notified of the telephone number of the user.

The settlement processing will be described first.

Figure 6:
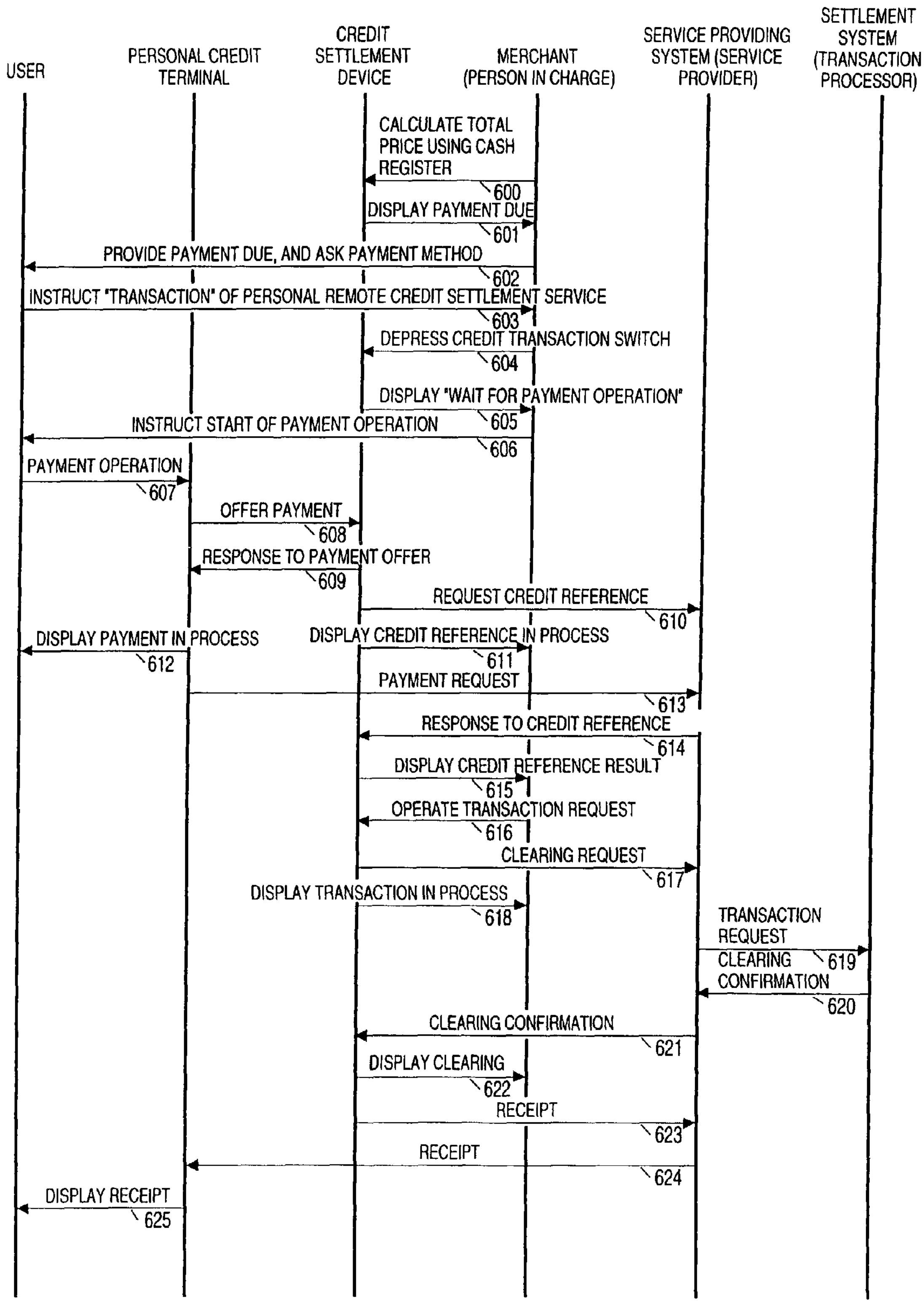
FIG. 6 is a flowchart for settlement processing according to the first embodiment of the present invention.

FIG. 6 is a flowchart showing the settlement processing for the personal remote credit transaction service. In FIGS. 7A to 7H are shown example displays for the LCD 203 of the personal credit terminal 100, and in FIGS. 8A to 8G are shown example displays for the LCD 302 of the credit settlement terminal 300.

Figure 7A:
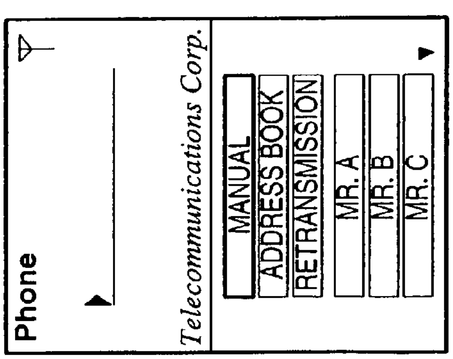
FIGS. 7A to 7H are specific diagrams showing screens to be displayed on the LCD of the personal credit terminal during settlement processing according to the first embodiment of the present invention.
Figure 7B:
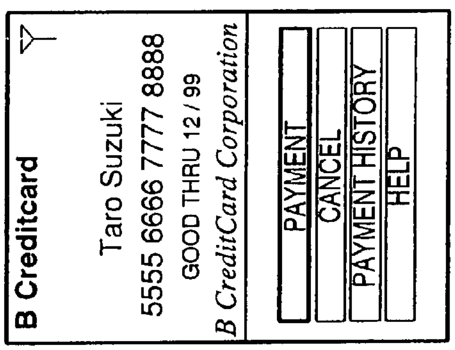
Figure 7C:
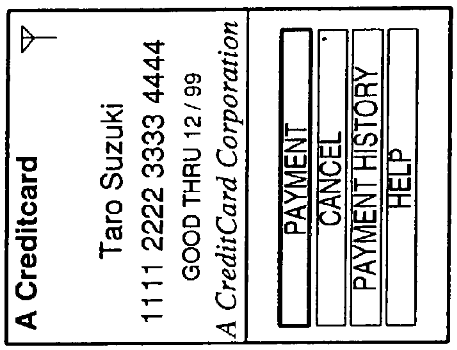
Figure 8A:
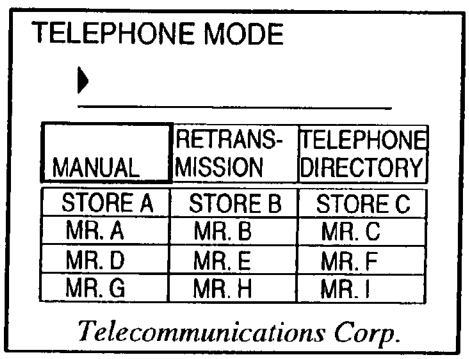
FIGS. 8A to 8G are specific diagrams showing screens to be displayed on the LCD of the credit settlement terminal during settlement processing according to the first embodiment of the present invention.
Figure 8B:
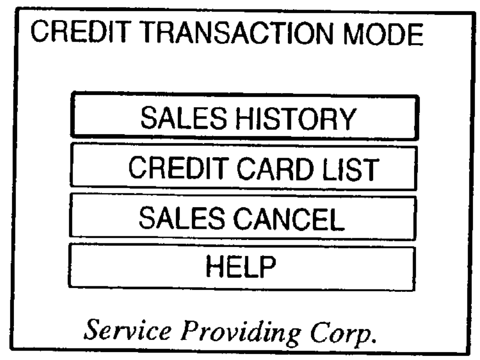

In FIG. 7A is shown an initial screen when the personal credit terminal 100 is in the digital wireless telephone mode; in FIG. 7B is shown an initial screen when the personal credit terminal 100 is in the credit card mode; in FIG. 8A is shown an initial screen when the credit settlement terminal 300 is in the digital telephone mode; and in FIG. 8B is shown an initial screen when the credit settlement terminal 300 is in the credit transaction mode.

The settlement processing is initiated when the user provides a product to be purchased to a person in charge, and the person in charge calculates the payment of the product.

In FIG. 6, first, the person in charge employs the cash register 311 of the credit settling device 101 to calculate the total charge of the product (600: calculation of the charge using the cash register).

Figure 8C:
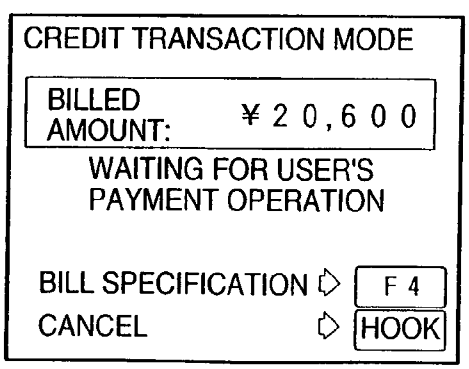
Figure 8D:
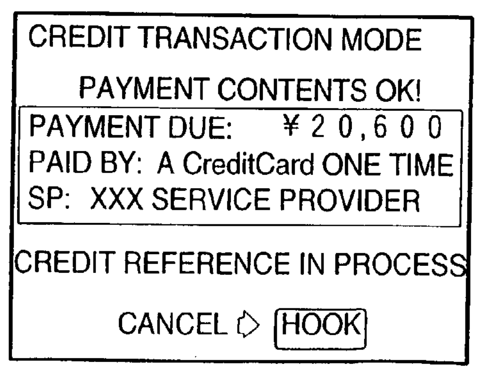

Then, the cash register 311 displays the total charge (601: display the charge). The person in charge tells the user what the total charge for the products is and asks the user how he wishes to pay it (602: relay the charge and ask the payment method). The user desires a transaction be initiated using the personal remote credit transaction service (603: instruct transaction using the personal remote credit transaction service) The person in charge depresses the credit transaction switch 312 (604: depress credit transaction switch) of the credit settling device to instruct the user to initiate the payment operation at the personal credit terminal 100 (606: instruct the start of the payment operation). At this time, a credit transaction command is transmitted from the cash register 311 to the credit settlement terminal 300 over the RS-232C cable 313. The credit settlement terminal 300 is automatically set to the credit transaction mode, and the screen shown in FIG. 8C is displayed on the LCD 302 (605: display screen and wait for the payment operation).

Figure 7D:
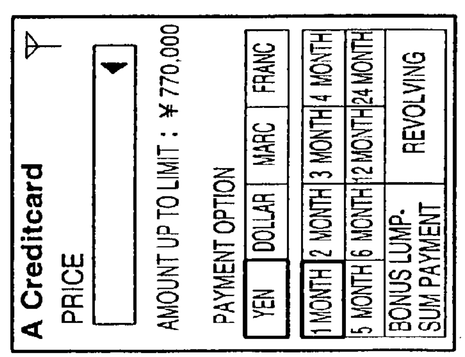
Figure 7E:
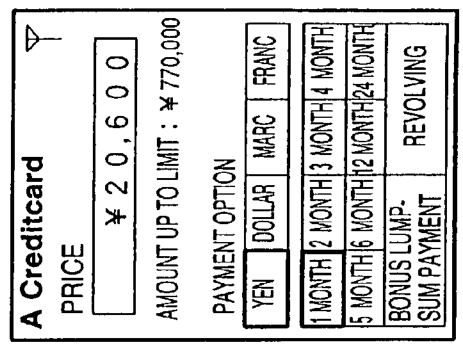
Figure 7F:
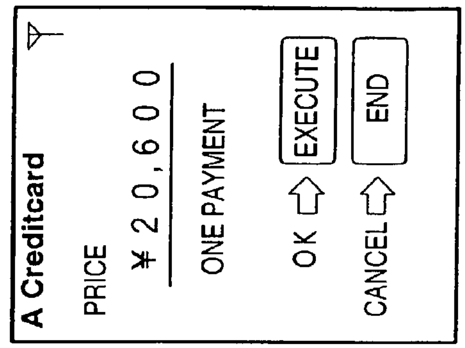
Figure 7G:
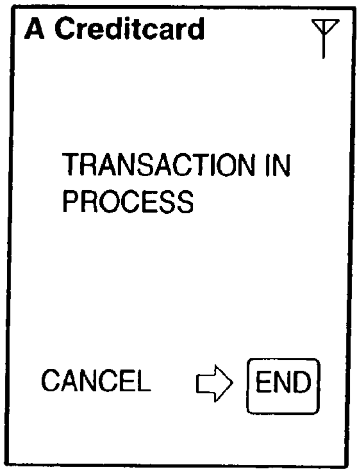

The user sets the personal credit terminal 100 to the credit card mode using the mode switch 204, changes the credit card displayed on the LCD 203 by using the function switch 207 and selecting a credit card to use for the payment. At this time, the personal credit terminal 100 exchanges the display shown in FIG. 7B for the display shown in FIG. 7C. Thereafter, the user selects "payment" from the menu using the function switch 207, and depresses the execution switch 211. The screen at the personal credit terminal 100 is then as shown in FIG. 7D. As is shown in FIG. 7E, the user enters the amount of the payment using the number key switch 208, designates the payment option using the function switch 207, and depresses the execution switch 211. The confirmation screen shown in FIG. 7F is displayed, and the user depresses the execution switch 211 while pointing the infrared communication port 200 toward the credit settlement terminal 300 (607: payment operation). The personal credit terminal 100 then transmits a payment offer 608 i.e., a message indicating the amount of the payment, to the credit settling device 101 by employing infrared radiation for the communication.

The credit settlement terminal 300 receives the payment offer 608 from the infrared ray reception/emission module 301, and compares the amount of the payment included in the offer with the amount of the charge, and transmits a payment offer response 609, i.e., a response to the payment offer, to the personal credit terminal 100 by employing infrared radiation for the communication. The credit settlement terminal 300 transmits a credit reference request 610, i.e., a message requesting a credit reference be supplied for the user, to the service providing system 102 using digital telephone communication. At this time, the credit settlement terminal 300 displays the screen shown in FIG. 8D (611: display credit reference in progress).

The personal credit terminal 100 receives the payment offer response 609 from the infrared communication port 200, and compares the amount of the charge included in the response with the amount of the payment, and transmits a payment request 613, i.e., a message requesting that credit be used for the payment to the service providing system 102 by using digital wireless telephone communication. At this time, the personal credit terminal 100 displays the screen shown in FIG. 7G (612: display payment in progress).

The service providing system 102 receives the credit reference request 610 from the credit settlement terminal 300, and the payment request 613 from the personal credit terminal 100, and compares the contents of the requests. In addition, the service providing system 102 examines the credit condition of the user, and generates and transmits, to the credit settlement terminal 300, a credit reference response 614, i.e., a response to the credit reference request 610.

Figure 8E:
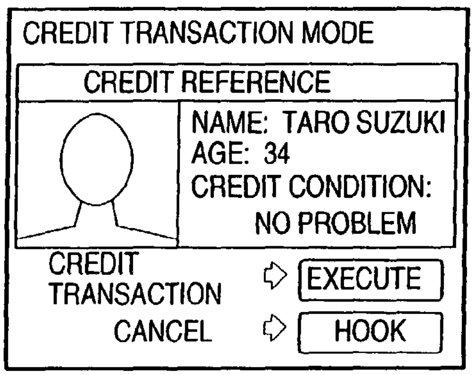
Figure 8F:
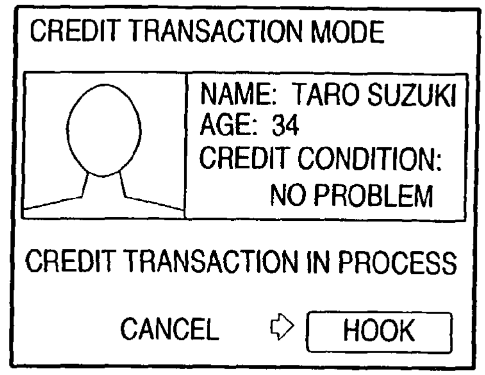

Upon receiving the credit reference response 614 from the service providing system 102, as is shown in FIG. 8E, the credit settlement terminal displays the contents of the response 614 to inform the person in charge of result obtained by the credit reference request (615: display credit reference result).

The person in charge confirms the credit reference result and depresses the execution button 308 of the credit settlement terminal 300 to instruct the start of the settlement processing (616: request settlement processing). Then, the credit settlement terminal 300 transmits a transaction request 617, i.e., a message requesting a settlement processing be performed, to the service providing system 102 by using digital telephone communication, and displays the screen shown in FIG. 8F (618: display transaction in process).

Upon receiving the transaction request 617 from the credit settlement terminal 300, the service providing system 102 transmits a transaction request, i.e., a message requesting a settlement processing be initiated, to the settlement system 103. Upon receiving the transaction request 619 from the service providing system 102, the settlement system 103 performs a settlement processing, and transmits a clearing confirmation notification 620, i.e., a message indicating the settlement processing has been completed, to the service providing system 102.

The service providing system 102 receives the clearing confirmation notification 620 from the settlement system 102, and transmits a clearing confirmation notification 621, i.e., a message indicting the settlement processing has been completed, to the credit settlement terminal 300.

Figure 8G:
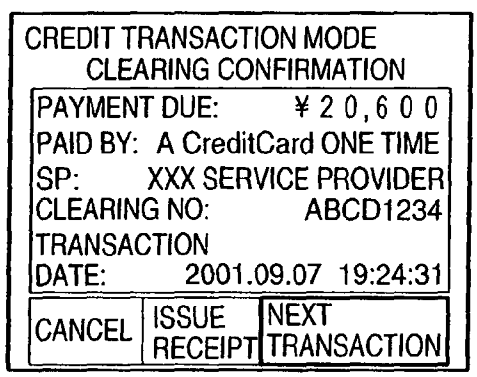

Upon receiving the clearing confirmation notification 621, as is shown in FIG. 8G, the credit settlement terminal 300 displays the contents of the notification 621 to inform the person in charge that the settlement processing has been completed (622: display clearing confirmation). Further, the credit settlement terminal 300 issues an electronic receipt 623 and transmits it to the service providing system 102 by using digital telephone communication.

The service providing system 102 receives the receipt from the credit settlement terminal 300, converts it into a receipt 624 using a data format for the personal credit terminal, and transmits it to the personal credit terminal 100 by using digital telephone communication.

Figure 7H:
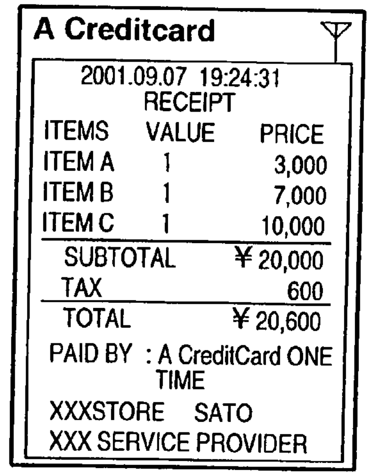

The personal credit terminal 100 displays the contents of the receipt 624 that it receives from the service providing system 102, as is shown in FIG. 7H, and informs the user that the settlement processing has been completed (625: display a receipt).

In the above described manner, the required procedures are completed for the performance of the settlement processing for the personal credit transaction service. For the above process, the contents of the data exchanged by the devices will be explained in detail later.

The cancellation process will now be described.

Figure 9:
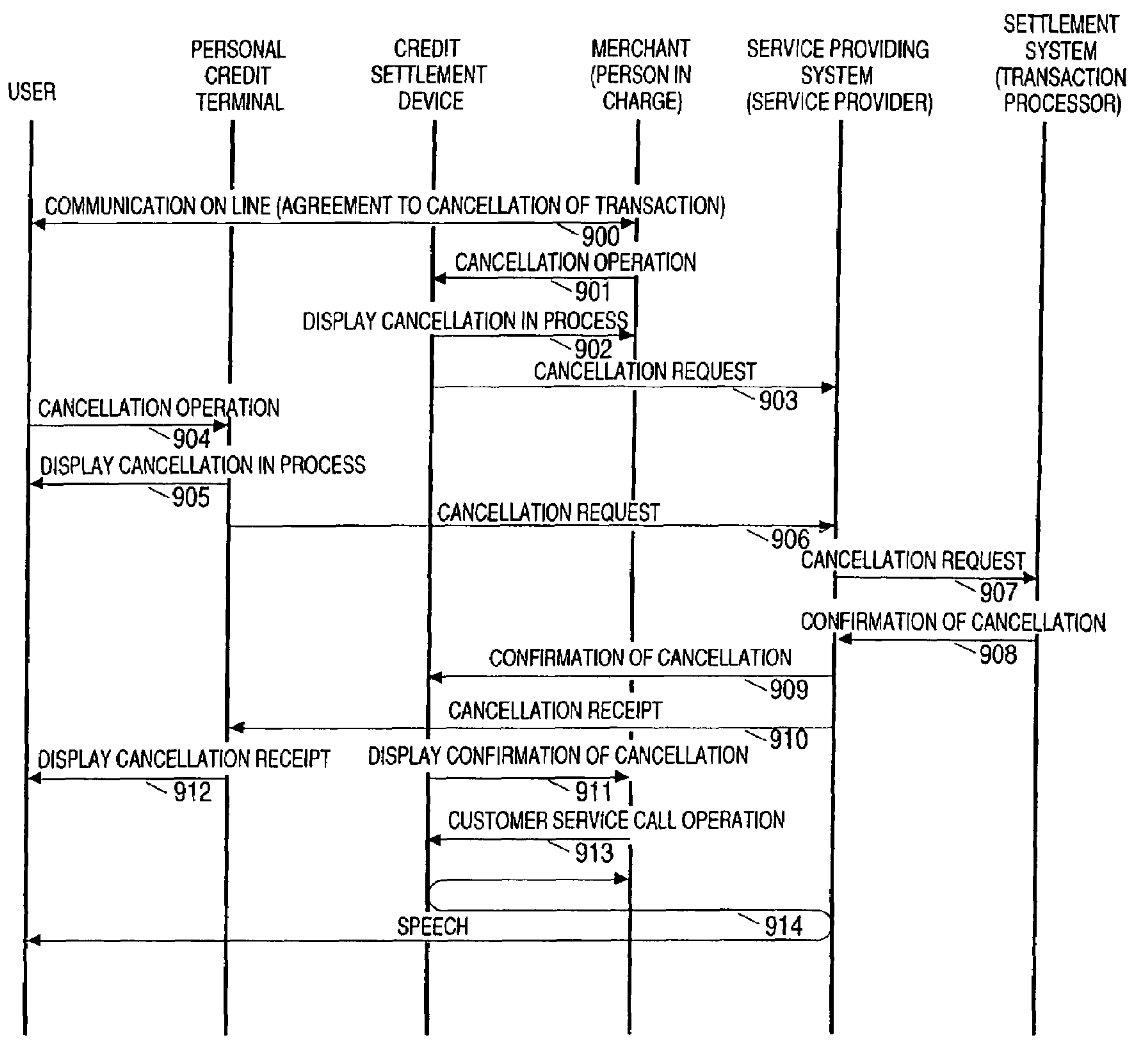
FIG. 9 is a flowchart for cancellation processing according to the first and the second embodiment of the present invention.

In FIG. 9 is shown the cancellation process for the personal remote credit transaction service.

In FIGS. 10A to 10E are shown example displays for the LCD 203 of the personal credit terminal 100 that are used during the cancellation process, and in FIGS. 11A to 11G are shown example displays for the LCD 302 of the credit settlement terminal 300.

The conditions under which the cancellation process for the personal remote credit transaction service can be performed are when a user and a merchant are near enough to each other that they hear each other's natural voice, and when they are at a distance from each other. The difference between the two cases lies in whether an agreement between the user and the merchant to perform the first cancellation process is reached while they are communicating using their natural voices, or while they are communicating by telephone, since the same processing is performed once the two have reached an agreement. Therefore, in this embodiment, the case where the two are at a distance from each other, at remote locations, will be employed.

The cancellation process is begun when a user and the person in charge for a merchant agree to perform the cancellation process for a business deal that was finalized using the settlement processing.

In FIG. 9, the user and the person in charge for the merchant agree by telephone to perform the cancellation process (900: communication by speech) and the two initiate the cancellation process.

Figure 11A:
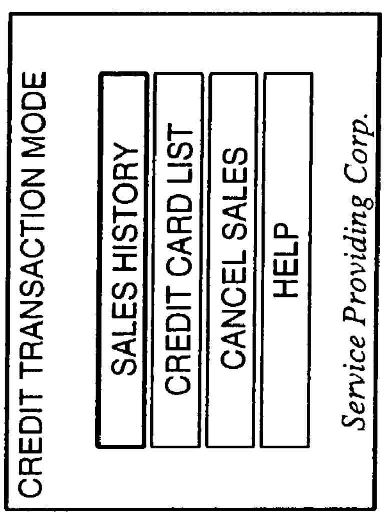
FIGS. 11A to 11G are specific diagrams showing screens to be displayed on the LCD of the credit settlement terminal during cancellation processing according to the first and the second embodiment of the present invention.
Figure 11B:
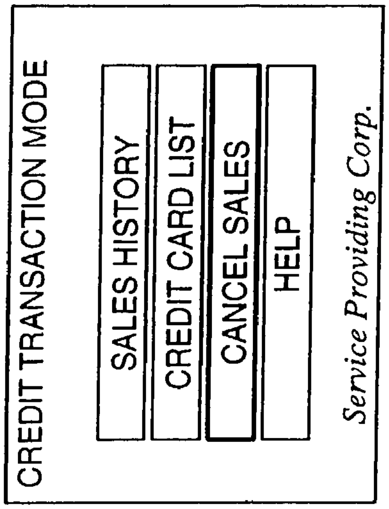
Figure 11C:
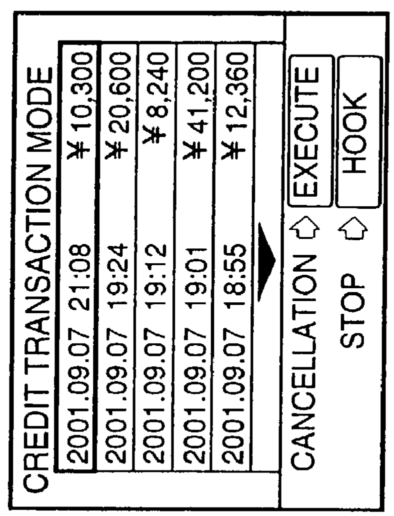
Figure 11D:
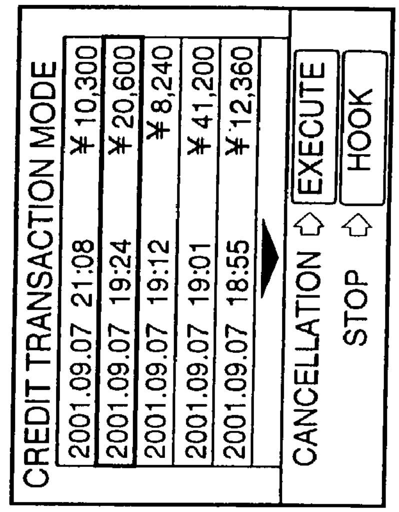
Figure 11E:
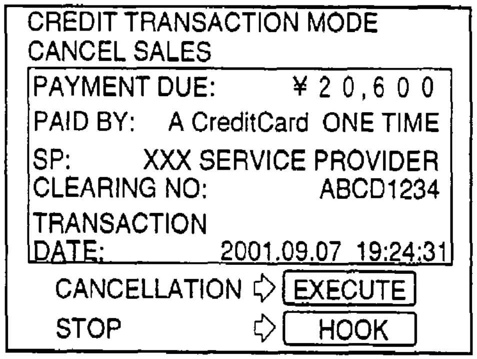
Figure 11F:
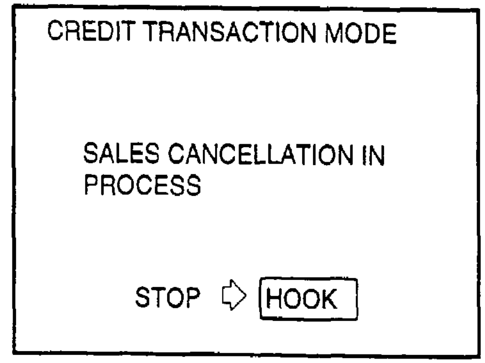

First, the person in charge for the merchant sets the credit settlement terminal 300 to the credit transaction mode using the mode switch 304, and the screen shown in FIG. 11A is displayed. Then, the person in charge selects "cancel sale" from the menu on the screen shown in FIG. 11B, and depresses the execution switch 307. The sales history list shown in FIG. 11C is displayed on the credit settlement terminal 300, and the person in charge uses the function switch 306, as is shown on the screen in FIG. 11D, to select the business deal to be canceled, and depresses the execution switch 308. When the confirmation screen shown in FIG. 11E is displayed, the person in charge depresses the execution switch 308 (901: cancellation operation).

The credit settlement terminal 300 transmits a cancellation request 903, i.e., a message requesting a cancellation process be initiated, to the service providing system 102 by employing digital telephone communication. At this time, the credit settlement terminal 300 displays the screen shown in FIG. 11F (902: display cancellation in process).

Figure 10A:
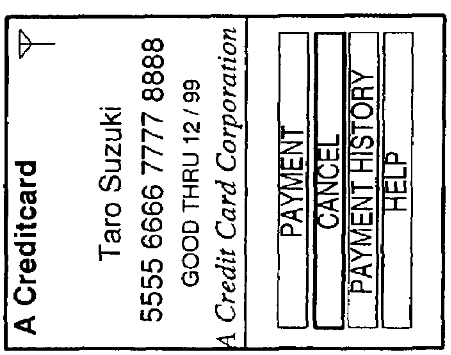
FIGS. 10A to 10E are specific diagrams showing screens to be displayed on the LCD of the personal credit terminal during cancellation processing according to the first and the second embodiment of the present invention.
Figure 10B:
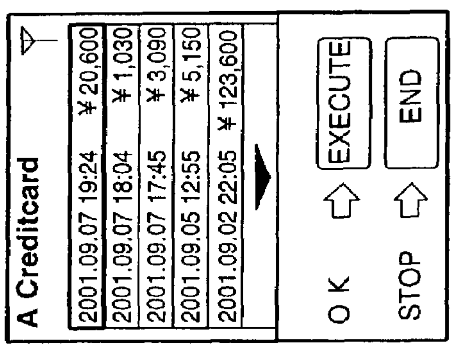
Figure 10C:
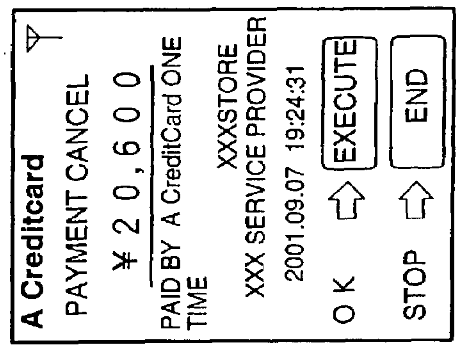
Figure 10D:
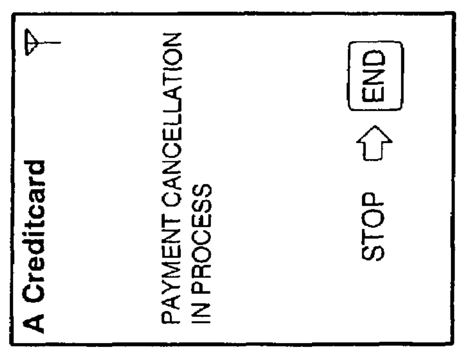

The user sets the personal credit terminal 100 to the credit card mode using the mode switch 204, and employs the function switch 207 to exchange the credit card displayed on the LCD 203 for the credit card that was used for the payment. In addition, the user selects "cancel" from the menu shown on the screen in FIG. 10A, and depresses the execution switch 211. Then, the personal credit terminal 100 displays on the screen the purchase history list shown in FIG. 10B. The user employs the function switch 207 to select the business deal to be canceled, and depresses the execution switch 211. Thereafter, the confirmation screen shown in FIG. 10C is displayed, and the user depresses the execution switch 211 (904: cancellation operation).

The personal credit terminal 100 transmits a cancellation request 906, i.e., a message requesting the cancellation process be initiated, to the service providing system 102 by employing digital wireless telephone communication. At this time, the personal credit terminal 100 displays the screen shown in FIG. 10D (905: display cancellation in process).

The service providing system 102 receives the cancellation request 903 from the credit settlement terminal 300 and the cancellation request 903 from the personal credit terminal 100, compares the contents of the two requests, and transmits a cancellation request 907, i.e., a message requesting the cancellation process be performed, to the settlement system 103.

Upon receiving the cancellation request 907 from the service providing system 102, the settlement system 103 performs the cancellation process for the requested business deal, and transmits a cancellation notification 908, i.e., a message indicating that the cancellation process has been is completed, to the service providing system 102.

Upon receiving the cancellation completion notification 908 from the settlement system 103, the service providing system 102 transmits a cancellation completion notification 909, i.e., a message indicating that the cancellation process has been completed, to the credit settlement terminal 300 by employing digital telephone communication, and generates a cancellation process receipt 910, i.e., a message indicating that the cancellation process has been completed, and transmits it to the personal credit terminal 100 by employing digital wireless telephone communication.

Figure 11G:
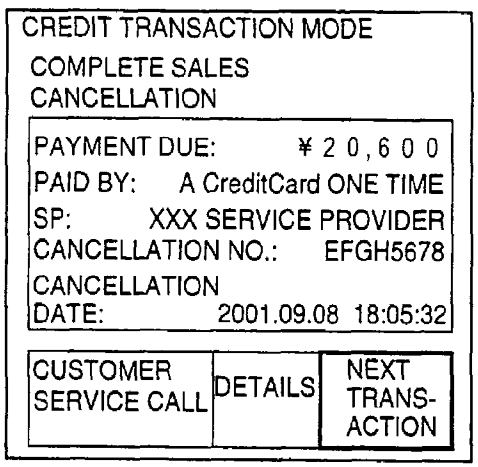

The credit settlement terminal 300 receives the cancellation completion notification 909, and displays the contents of the notification 909 as shown in FIG. 11G to inform the person in charge that the cancellation process has been completed (911: display completion of cancellation process).

Figure 10E:
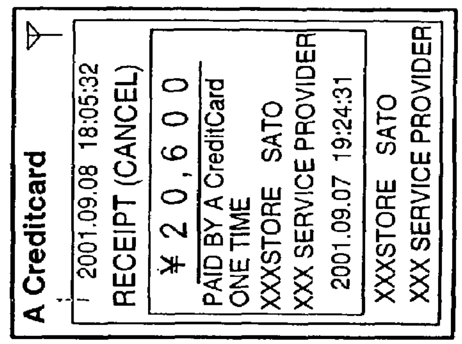

The personal credit terminal 100 displays the received cancellation process receipt shown in FIG. 10E to inform the user that the cancellation process has been completed (912: display cancellation receipt).

The cancellation process for the personal remote credit transaction service is performed as is described above. And thereafter, the person in charge performs a customer service call operation (913: customer service call) to talk with the user by telephone (914: speech communication). The customer service call will be described later. The contents of the data that are exchanged by the devices will also be described in detail later.

The customer service call process will now be described.

Figure 12A:
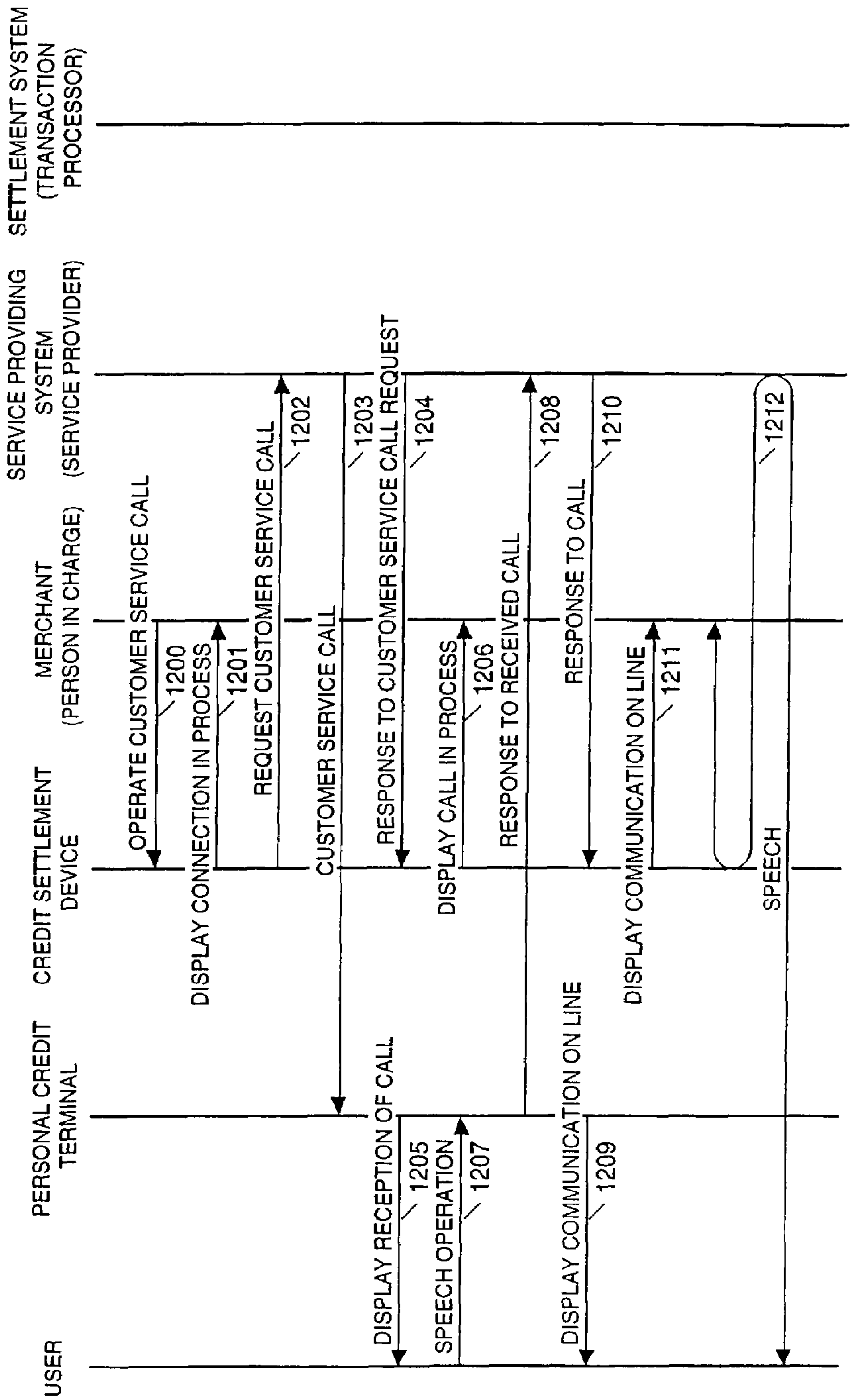
FIG. 12A is a flowchart for customer service call processing according to the first embodiment of the present invention.

In FIG. 12A is shown the customer service call process for the personal remote credit transaction service; in FIGS. 13A-13I are shown example displays for the LCD 203 of the personal credit terminal 100 for the customer service call process; and in FIGS. 14A to 14G are shown example displays for the LCD 203 of the credit settlement terminal 300.

For the customer service call process, even when a merchant does not know the telephone number of a user who dealt with him in the settlement processing for the personal remote credit transaction service, the merchant can contact the user by phone. Therefore, the customer service call is placed with the assumption that the user dealt with the merchant during the settlement processing for the personal remote credit transaction service.

The customer service call process is begun when the person in charge for the merchant employs the credit settlement terminal 300 to initiate the customer service call operation.

Figure 14A:
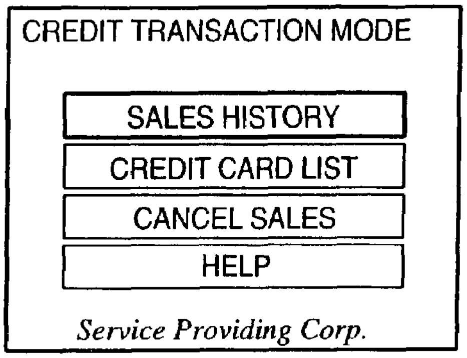
FIGS. 14A to 14E and 14G are specific diagrams showing screens to be displayed on the LCD of the credit settlement terminal during customer service call processing according to the first and the second embodiment of the present invention.
Figure 14B:
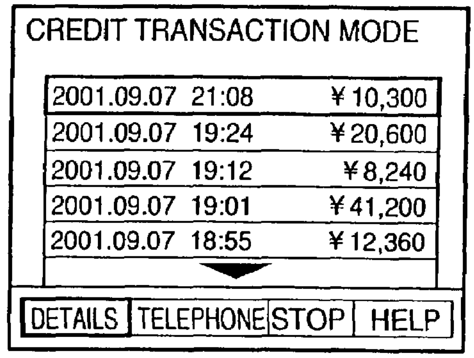
Figure 14C:
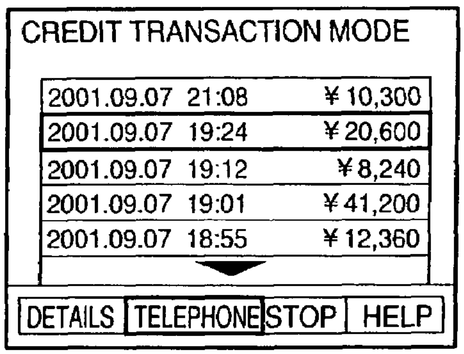
Figure 14D:
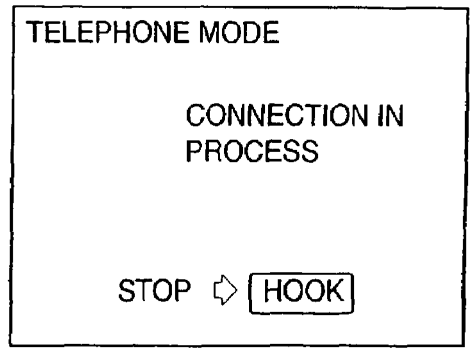

In FIG. 12A, first, the person in charge for the merchant employs the mode switch 304 to set the credit settlement terminal 300 in the credit transaction mode and to display the screen shown in FIG. 14A. Then, the person in charge selects "sales history" from the menu using the function switch 306, and depresses the execution switch 308. Thereafter, the credit settlement terminal 300 displays the sales history list shown in FIG. 14B. As is shown on the screen in FIG. 14C, the person in charge uses the function switch 306 to select the business deal for which one party was the user to whom the person in charge is going to place a call, selects "phone" from the menu on the screen, and depresses the execution switch 308 (1200: customer service call operation). The credit settlement terminal 300 automatically changes to the digital telephone mode, displays the screen shown in FIG. 14D (1201: display connection in process), and transmits a customer service call request 1202, i.e., a message requesting the customer service call process be initiated, to the service providing system 102 by employing digital telephone communication.

Upon receiving the customer service call request 1202, the service providing system 102 compares it with access control data set by the user, and transmits a customer service call 1203, i.e., a message for placing a call to the user, to the personal credit terminal 100 of the user by employing digital wireless telephone communication. In addition, the service providing system 102 transmits a customer service call request response 1204, i.e., a message requesting permission to speak with the user, to the credit settlement terminal 300 by employing digital telephone communication.

Figure 14E:
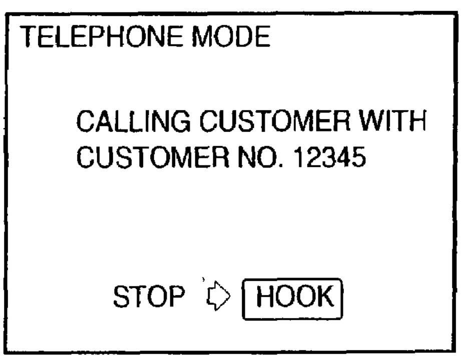

Upon receiving the customer service call request response 1204 from the service providing system 102, the credit settlement terminal 300 displays the screen shown in FIG. 14E to inform the person in charge that the call to the user has been initiated (1206: display call in progress).

Figure 13A:
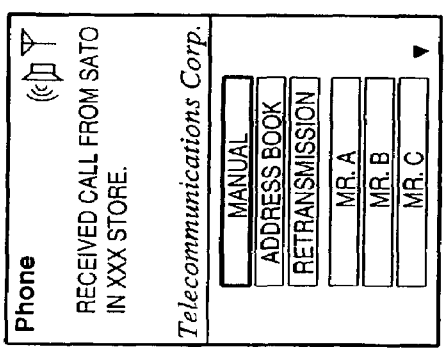
FIG. 13A is a specific diagram showing a screen to be displayed on the LCD of the personal credit terminal during customer service call processing according to the first and the second embodiment of the present invention.

The personal credit terminal 100 receives the customer service call 1203, outputs a call reception tone, displays the screen shown in FIG. 13A, and informs the user that a call from the merchant has been received (1205: display call reception). When the user depresses the speech switch 205 (1207: speech operation), the personal credit terminal 100 transmits a call reception response 1208, i.e., a message indicating that the user has accepted the call, to the service providing system 102 by employing digital wireless telephone communication, and displays the screen shown in FIG. 13B (1209: display speech in process).

Upon receiving the call reception response 1208, the service providing system 102 transmits a call response 1210, i.e., a message indicating the user has accepted a call, to the credit settlement terminal 300 by employing digital telephone communication.

Figure 14F:
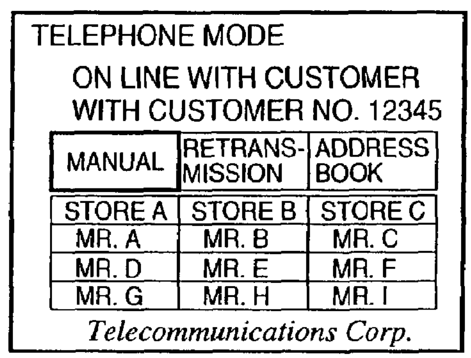
FIG. 14F is a specific diagram showing a screen to be displayed on the LCD of the credit settlement terminal during customer service call processing and inquiry call processing.

The credit settlement terminal 300 receives the call response 1210 and displays the screen shown in FIG. 14F (1211: display speech in progress), and the merchant begins to converse with the user (1212: speech communication).

In the above described manner, the required procedures are completed for the performance of the customer service call process for the personal remote credit transaction service.

Figure 14G:
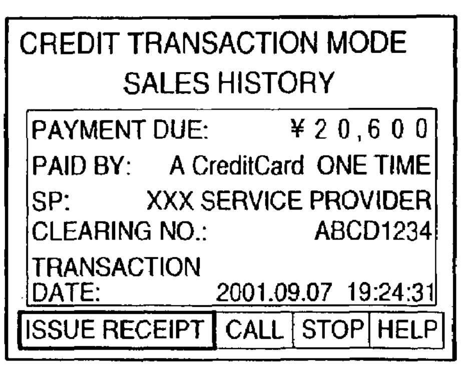

The customer service call process can also be initiated when the person in charge for the merchant selects "phone" from the menu on the screen for the detailed sales history shown in FIG. 14G, and depresses the execution switch 308 (1200: customer service call operation), or when the person in charge for the merchant selects "customer service call" from the menu on the cancellation process completion screen shown in FIG. 11G, and depresses the execution switch 308 (1200: customer service call operation).

The contents of the data to be exchanged by the devices during the customer service call process will be described in detail later.

The inquiry call process will be now explained.

Figure 12B:
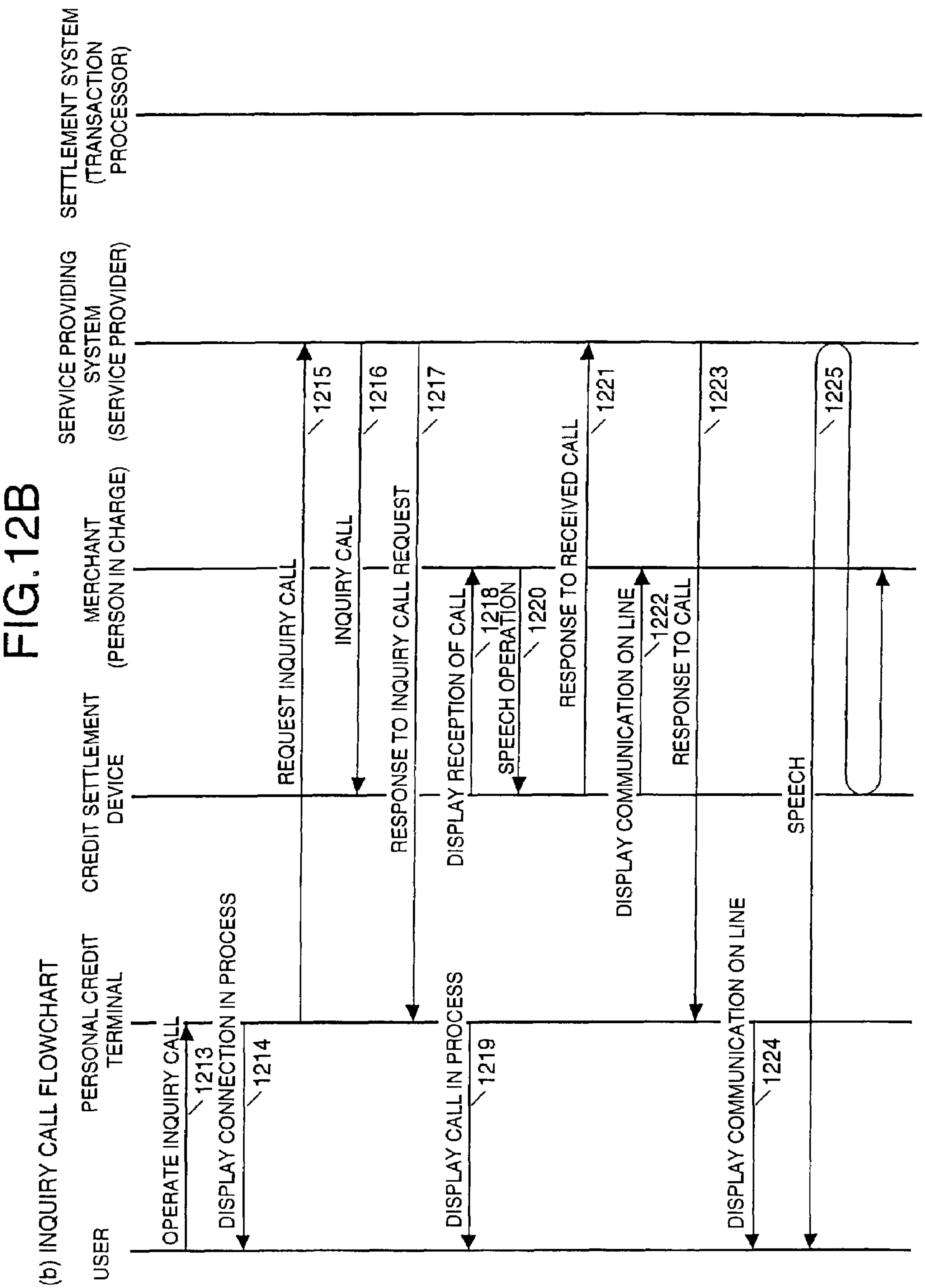
FIG. 12B is a flowchart for inquiry call processing according to the first embodiment of the present invention.

In FIG. 12B is shown the inquiry call processing for the personal remote credit transaction service.

Figure 13B:
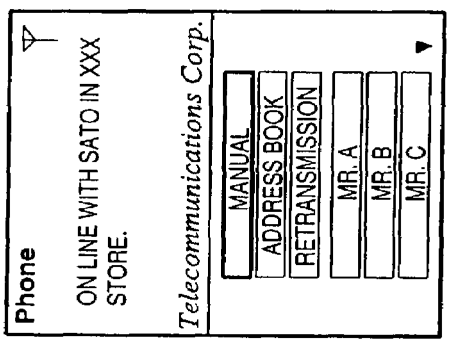
FIG. 13B is a specific diagram showing a screen to be displayed on the LCD of the personal credit terminal during customer service call processing and the inquiry call processing.
Figure 13C:
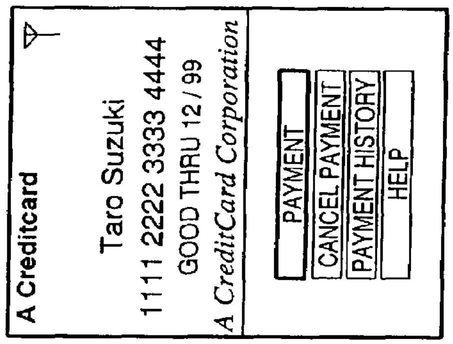
FIGS. 13C to 13I are specific diagrams showing screens to be displayed on the LCD of the personal credit terminal during inquiry call processing.
Figure 13D:
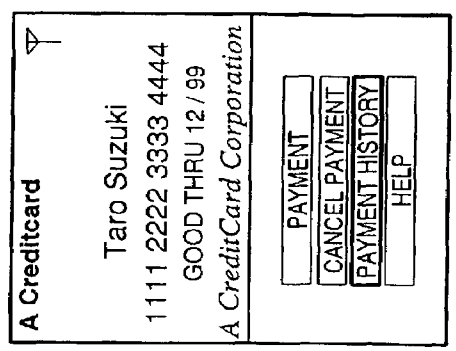
Figure 13E:
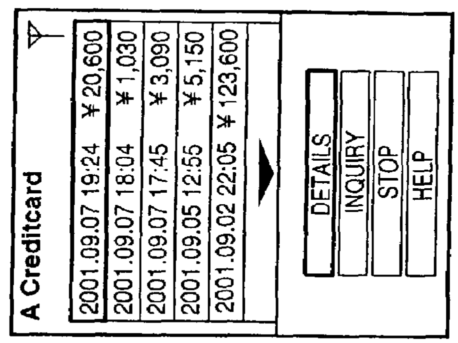
Figure 13F:
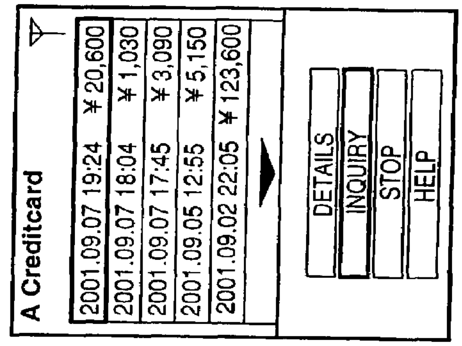
Figure 13G:
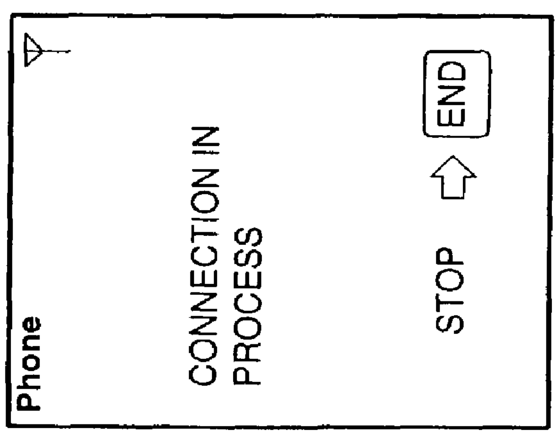
Figure 14H:
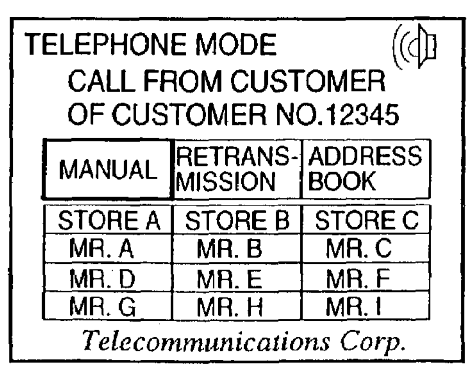
FIG. 14H is a specific diagram showing a screen to be displayed on the LCD of the credit settlement terminal during inquiry call processing.

In FIGS. 13B to 13F are shown example displays for the LCD 203 of the personal credit terminal 100 during the inquiry call process, and in FIGS. 14F and 14H are shown example displays for the LCD 302 of the credit settlement terminal 300.

The inquiry call process is a process whereby a user can place an inquiry call to a merchant with whom the user dealt during a settlement processing, performed as part of the personal remote credit transaction service, without the telephone number of the user being reported to the merchant.

The inquiry call process is begun when the user initiates the inquiry call operation at the personal credit terminal 100.

In FIG. 12B, the user employs the mode switch 204 to set the personal credit terminal 100 to the credit card mode and to display the screen shown in FIG. 13C. Then, the user employs the function switch 207 to select "use history" from the menu on the screen shown in FIG. 13D, and depresses the execution switch 211. The personal credit terminal 100 displays the use history list shown in FIG. 13E. As is shown on the screen in FIG. 13F, the user employs the function switch 207 to select the business deal that was handled by the merchant to whom the user is to make a call, selects "inquiry" from the menu, and depresses the execution switch 211 (1213: inquiry call operation). The personal credit terminal 100 automatically changes to the digital wireless telephone mode, displays the screen shown in FIG. 13G (1214: display connection in process), and transmits an inquiry call request 1215, i.e., a message requesting that the inquiry call process be initiated, to the service providing system 102 by employing digital wireless telephone communication.

Upon receipt of the inquiry call request 1215, the service providing system 102 transmits an inquiry call 1216, i.e., a message for initiating a call to the merchant, to the credit settlement terminal 300 of the merchant by employing digital telephone communication. In addition, the service providing system 102 transmits an inquiry call request response 1217, i.e., a message that a conversation with the merchant is permitted, to the personal credit terminal 100 by employing digital wireless telephone communication.

Figure 13H:
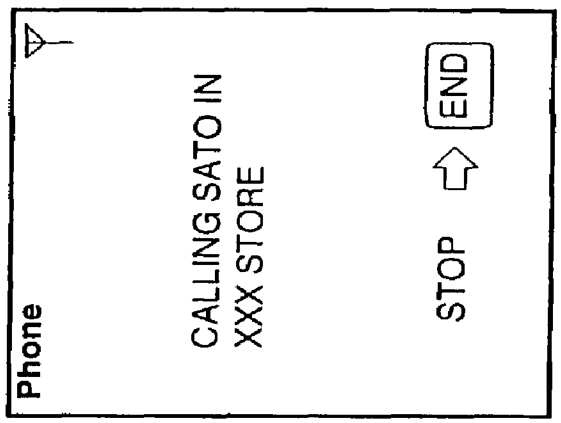

Upon receipt of the inquiry call request response 1217 from the service providing system 102, the personal credit terminal 100 displays the screen shown in FIG. 13H to inform the user that the merchant is being called (1219: display call in progress).

The credit settlement terminal 300 receives the inquiry call 1216, outputs a call reception tone, displays the screen shown in FIG. 14H, and informs the merchant that a call from the user has arrived (1218: display call reception). When the person in charge for merchant raises the handset 303 (1220: speech operation), the credit settlement terminal 300 transmits a call reception response 1221, i.e., a message indicating the merchant has accepted the call, to the service providing system 102 by employing digital telephone communication, and displays the screen shown in FIG. 14F (1222: display speech in progress).

Upon receiving the call reception response 1221, the service providing system 102 transmits a call response 1223, i.e., a message indicating the merchant has accepted a call, to the personal credit terminal 100 by employing digital wireless telephone communication.

The personal credit terminal 100 receives the call response 1223 and displays the screen shown in FIG. 13B (1224: display speech in progress), and the user begins to converse with the merchant (1225: speech communication).

In the above described manner, the required procedures are performed for the inquiry call process for the personal remote credit transaction service.

Figure 13I:
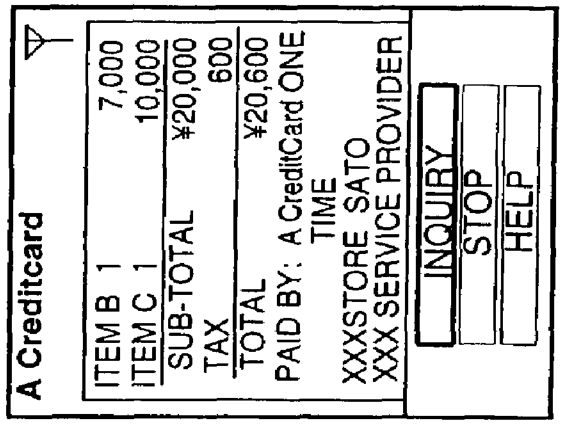

The inquiry call process can also be initiated when the user selects "inquiry" from the menu on the screen for the detailed use history shown in FIG. 13I, and depresses the execution switch 211 (1213: inquiry call operation).

The contents of the data to be exchanged between the devices during the inquiry call process will be described in detail later.

The internal structure of the personal credit terminal 100 will now be described.

Figure 15A:
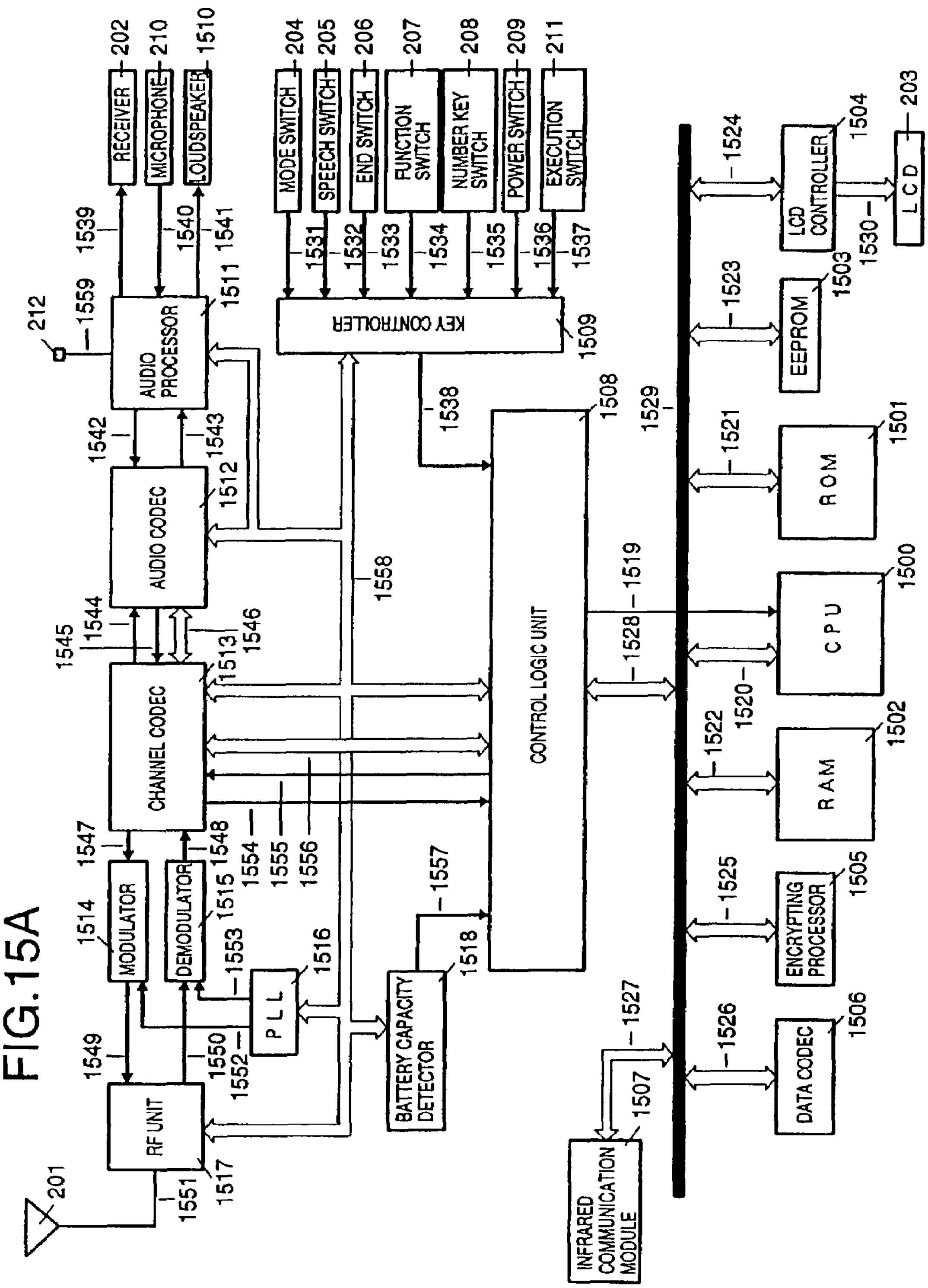
FIG. 15A is a block diagram illustrating the arrangement of the personal credit terminal according to the first and the second embodiment of the present invention.

FIG. 15A is a block diagram illustrating the arrangement of the personal credit terminal 100. This terminal 100 comprises: a CPU (Central Processing Unit) 1500, which processes data to be transmitted, receives data, and controls the other components via a bus 1529; a RAM (Random Access Memory) 1502, in which data processed by the CPU 1500 are stored; a EEPROM (Electric Erasable Programmable Read Only Memory) 1503, in which are stored a terminal ID for the personal credit terminal 100, a user ID for a user, a private key and a public key, a service provider ID for the service providing system 102, and the telephone number and the public key of a service provider; an LCD controller 1504, which operates the LCD 203 under the control of the CPU 1500, and which displays on the LCD 203 an image set by the CPU 1500; an encryption processor 1505, which encrypts and decrypts data under the control of the CPU 1500; a data codec 1506, which codes data to be transmitted and decodes received data under the control of the CPU 1500; an infrared communication module 1507, which transmits and receives infrared rays during infrared communication; a key operation controller 1509, which detects the manipulation by the user of the mode switch 204, the speech switch 205, the end switch 206, the function switch 207, the number key switch 208, the power switch 209 and the execution switch 211; an audio processor 1511, which drives a loudspeaker 1510, a receiver 202 or a headphone jack 212, and amplifies an analog audio signal that is input through the microphone 210 or the headphone jack 212; an audio codec 1512, which encodes an analog audio signal 1542 to provide digital audio data, and decodes digital audio data to provide an analog audio signal 1543; a channel codec 1513, which generates data 1544 to be transmitted along a radio channel, and extracts, from received data 1545, data that is addressed to the personal credit terminal 100; a modulator 1514, which modulates a serial digital signal 1547 input by the channel codec 1513 to obtain an analog transmission signal 1549 that employs as a baseband an electric signal 1552 that is generated and transmitted by a PLL 1516; a demodulator 1515, which, to obtain a serial digital signal 1548, demodulates a received analog signal 1550 that employs as a baseband an electric signal 1553 that is generated and supplied by the PLL 1516, and which transmits the serial digital signal 1548 to the channel codec 1513; an RF unit 1517, which changes the analog transmission signal 1549 received from the modulator 1514 into a radio wave and outputs it through an antenna 201, and which, upon receiving a radio wave through the antenna 201, transmits an analog reception signal 1550 to the demodulator 1515; a battery capacity detector 1518, which detects the capacity of the battery of the personal credit terminal 100; and a logic controller 1508, which activates the channel codec 1513, the PLL 1516 and the RF unit 1517, and which processes interrupt signals that are transmitted by the key operation controller 1509, the channel codec 1513 and the battery capacity detector 1518, and serves as an interface when the PU 1500 accesses the internal registers of the key operation controller 1509, the audio processor 1511 and the channel codec 1513.

The encryption processor 1505 includes a secret key encryption and decryption function and a public key encryption and decryption function. The encryption processor 1505 employs an encryption method determined by the CPU 1500 and the keys to encrypt or decrypt data set by the CPU 1500.

The data codec 1506 encodes data to be transmitted or decodes received data under the control of the CPU 1500. In this case, the encoding is a process for generating data to be transmitted that includes communication control information and error correction information, and the decoding is a process for performing error correction on the received data and removing extra communication control information in order to obtain the data that a sender was to originally transmit. The data codec 1506 has a function for encoding or decoding data during data communication over a digital wireless phone, and a function for encoding or decoding data during infrared communication. The data codec 1506 performs encoding or decoding determined by the CPU 1500 for data that are set by the CPU 1500.

Figure 15B:
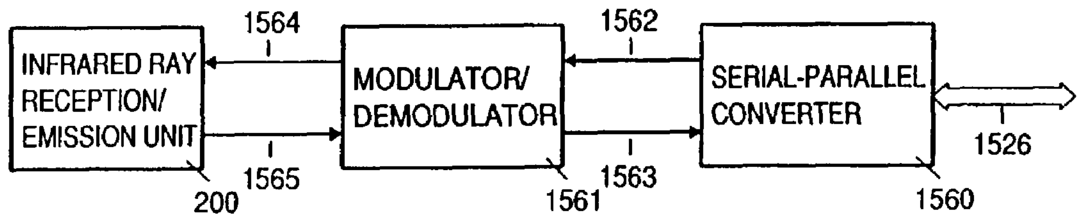
FIG. 15B is a block diagram illustrating the arrangement of an infrared communication module in the personal credit terminal according to the first and the second embodiment of the present invention.

The infrared communication module 1507 internally includes, as is shown in FIG. 15B, a serial/parallel converter 1560, which performs the bidirectional conversion of parallel data and serial data; a modulator/demodulator 1561, which receives a serial digital signal 1562 from the serial-parallel converter 1560 and modulates it to obtain an infrared transmission signal 1564, and which demodulates a received analog signal 1565 to obtain a serial digital signal 1563; and an infrared ray reception/emission unit 200, which converts a signal 1564 obtained by the modulator/demodulator 1561 into an infrared ray and emits it, and which converts a received infrared ray into an analog signal 1565.

When the user depresses either the mode switch 204, the speech switch 205, the end switch 206, the function switch 207, the number key switch 208, the power switch 209 or the execution switch 211, the key operation controller 1509 detects the switch manipulation by the user and asserts an interrupt signal 1538 requesting the performance by the CPU 1500 of a process corresponding to the switch manipulation. As is shown in FIG. 18A, the key operation controller 1509 includes a key control register (KEYCTL) 1812 for setting the valid/invalid state of each switch.

Figure 18A:
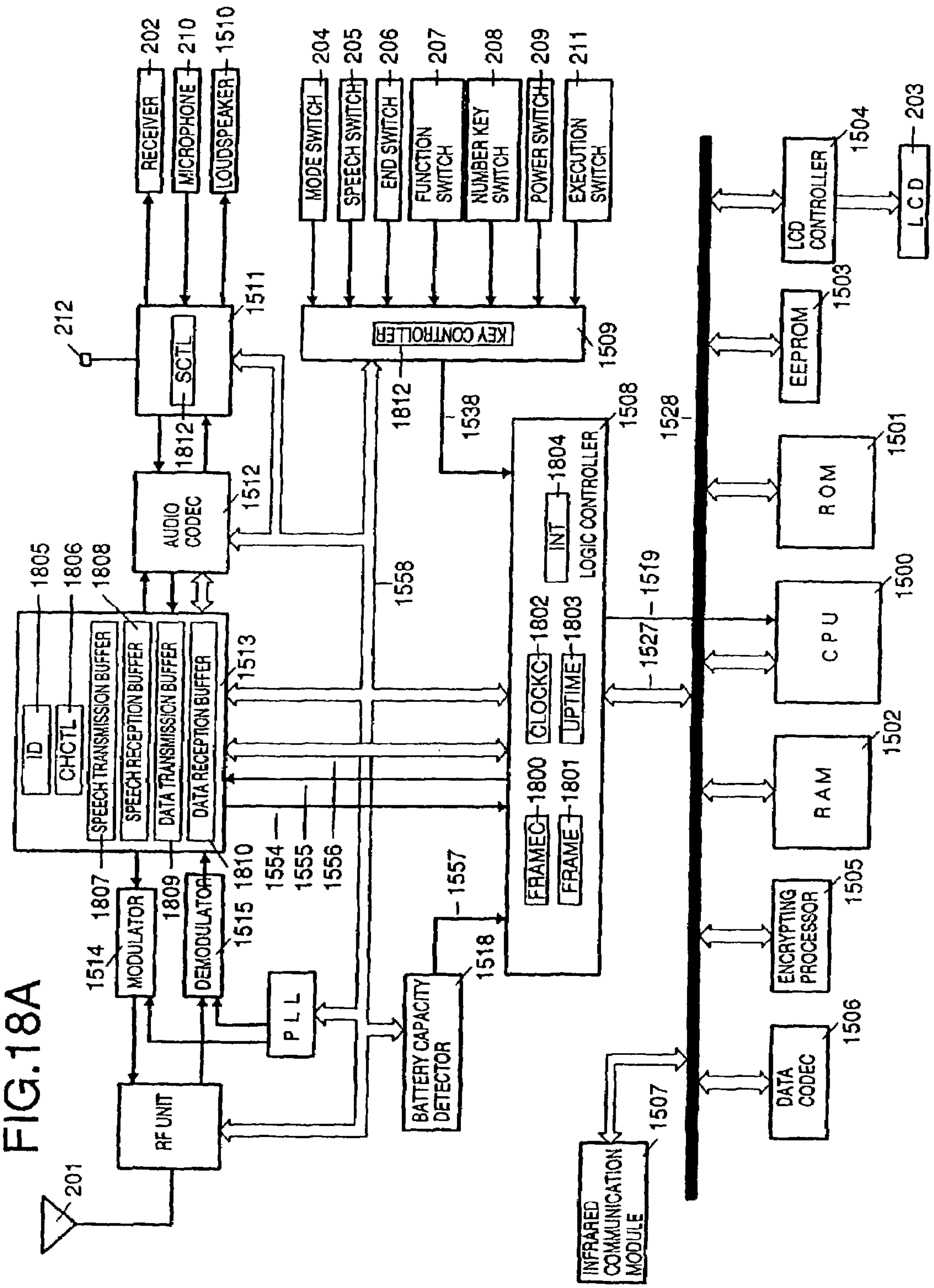
FIG. 18A is a diagram illustrating the arrangement of an internal register in the personal credit terminal according to the first embodiment of the present invention.

The audio processor 1511 includes an audio control register (SCTL) 1812 for controlling the audio process, as is shown in FIG. 18A.

The audio codec 1512 encodes an analog audio signal 1542 received from the audio processor 1511 to provide digital audio data, and decodes digital audio data received from the channel codec 1513 to provide an analog audio signal 1543. The analog audio signal 1543 is transmitted to the audio processor 1511, which amplifies the signal 1543 and drives the receiver 202 to produce sounds. The encoded digital audio data are transmitted to the channel codec 1513, which changes the data into data that can be transmitted across the radio channel.

Two types of data to be transmitted are received by the channel codec 1513: one type is digital audio data originating at the audio codec 1512, and the other type is data-communication data originating at the CPU 1500 that pass through the logic controller 1508.

The channel codec 1513 adds identification data, as header information, to digital audio data and data communication data, and then converts the data into a serial digital signal 1547 having a data format suitable for a digital wireless telephone and transmits the signal 1547 to the modulator 1514.

In addition, upon receiving a serial digital signal 1548 from the demodulator 1515, the channel codec 1513 examines a terminal ID and extracts only such data as is addressed to the channel codec 1513, removes the communication control information for the digital wireless phone, identifies the digital audio data and the data communication data using the header information, and transmits these data to the audio codec 1512 and the logic controller 1508 respectively. Further, when the channel codec 1513 receives a digital wireless call or data-communication data, it asserts an interrupt signal 1554 requesting the CPU 1500 to perform a process required for a digital wireless telephone call that is received and a process for data-communication data.

In order to perform these processes, as is shown in FIG. 18A, the channel codec 1513 includes: an ID register (ID) 1805, in which is stored a terminal ID; a channel codec control register (CHCTL) 1806, which controls the operation of the channel codec 1513; a audio transmission buffer 1807, in which are stored digital audio data received from the audio codec 1512; an audio reception buffer 1808, in which are stored digital audio data extracted from received data; a data transmission buffer 1809, in which are stored data communication data received from the logic controller 1508; and a data reception buffer 1810, in which are stored communication data extracted from received data.

The modulator 1514 modulates a serial digital signal 1547 received from the channel codec 1513 to provide an analog transmission signal 1549, which is employed as a base band for an electric signal 1552 that is generated and supplied by the PLL 1516, and transmits the signal 1549 to the RF unit 1517. The analog transmission signal 1549 received by the RF unit 1517 is output as a radio wave through the antenna 201.

When a radio wave is received at the antenna 201, an analog reception signal 1550 is transmitted by the RF unit 1517 to the demodulator 1515. The demodulator 1515 demodulates the analog signal 1550, while employing as its baseband an electric signal 1553 that is generated and supplied by the PLL 1516, and transmits an obtained serial digital signal 1548 to the channel codec 1513.

The battery capacity detector 1518, for detecting the capacity of a battery, asserts an interrupt signal 1557 when the remaining capacity of the battery of the personal credit terminal 100 is equal to or less than a value Q (Q>0) set by the CPU 1500. The interrupt signal 1557 is a signal for requesting the CPU 1500 to perform a data backup process for the RAM 1502, the value Q being large enough to permit the performance of a backup process by the personal credit terminal 100.

The logic controller 1508 includes five internal registers, as is shown in FIG. 18A: a frame counter (FRAMEC) 1800, a start frame register (FRAME) 1801, a clock counter (CLOCKC) 1802, an update time register (UPTIME) 1803 and an interrupt register (INT) 1804.

The frame counter 1800 is employed to count the number of frames for the digital wireless phone; the start frame register 1801 is employed to store the frame number of the frame that is to be activated next; the clock counter 1802 is employed to measure the current time; the update time register 1803 is employed to store the time at which the personal credit terminal 100 will communicate with the service providing system 102 to update data in the RAM 1502; and the interrupt register 1804 is employed to indicate the reason an interrupt is generated for the CPU 1500.

Generally, to receive a call, the digital wireless telephone intermittently acquires control data for a control channel and compares it with the terminal ID. The personal credit terminal 100 employs the frame counter 1800 and the start frame register 1801 to intermittently acquire control data. First, the number of the frame to be activated next is stored in advance in the start frame register 1801, and when the count value of the frame counter 1800 equals the value held by the start frame register 1801, to acquire control data the logic controller 1508 activates the channel codec 1513, the PLL 1516 and the RF unit 1517 via an address data signal line 1558.

When one of the interrupt signals 1538, 1554 and 1557 is asserted, the logic controller 1508 writes the reason for the interrupt in the interrupt register (INT) 1804, and asserts an interrupt signal 1519 requesting the CPU 1500 perform an interrupt process.

For the interrupt processing, the CPU 1500 reads the reason stored in the interrupt register 1804 and then performs a corresponding process.

The individual bit fields of the interrupt register (INT) 1804 are defined as is shown in FIG. 18B.

FIG. 18C characterizes the bit fields in terms of an "interrupt" variable.

Bit 31 represents the state of the power switch 209. When the bit value is 0, it indicates the state is the power-OFF state, and when the bit value is 1, it indicates the state is the power-ON state.

Bit 30 represents the digital wireless telephone communication state. When the bit value is 0, it indicates the state is one where no digital wireless telephone communication is being performed, and when the bit value is 1, it indicates the state is one where digital wireless telephone communication is in progress.

Bit 29 represents the generation of a frame interrupt requesting the intermittent acquisition of control data. When the bit value is 1, it indicates a condition that exists when a frame interruption has occurred. In this bit field, a 1 is set when the value in the frame counter 1800 equals the value held in the start frame register 1801.

Bit 28 represents the generation of a call arrival interrupt. When the bit value is 1, it indicates that a digital wireless call has arrived. In this bit field, a 1 is set when the terminal ID is matched and the interrupt signal 1554 is generated during the intermittent acquisition of control data for the digital wireless phone.

Bit 27 represents the generation of a data reception interrupt. When the bit value is 1, it indicates that data is being received. In this bit field, a 1 is set when the data-communication data are received and the interrupt signal 1554 is generated during the course of digital wireless telephone communication.

Bit 26 represents the generation of an update interrupt requesting the performance of a data updating process. When the bit value is 1, it indicates the generation the update interrupt. In this bit field, a 1 is set when the value in the clock counter 1802 matches the value in the update time register 1803.

Bit 25 represents the generation of a battery interrupt requesting a backup process. When the bit value is 1, it represents the generation of the battery interrupt. In this bit field, a 1 is set when the interrupt signal 1557 received from the battery capacity detector 1518 is asserted.

Bit 24 represents the generation of a key interrupt by manipulation of the switch. When the bit value is 1, it represents the generation of the key interrupt.

Bits 0 to 9 correspond to switches 0 to 9 for the number key switch 208. Bit 10 and bit 11 correspond to number key switches "*" and "#" and bits 12 to 15 corresponds to function switches F1 to F4. Bits 16 to 20 respectively correspond to the power switch 209, the execution switch 211, the mode switch 204, the speech switch 205 and the end switch 206. When the value of a bit is 1, it indicates that a switch corresponding to that bit has been depressed.

Data stored in the RAM 1502 will now be described.

Figure 16:
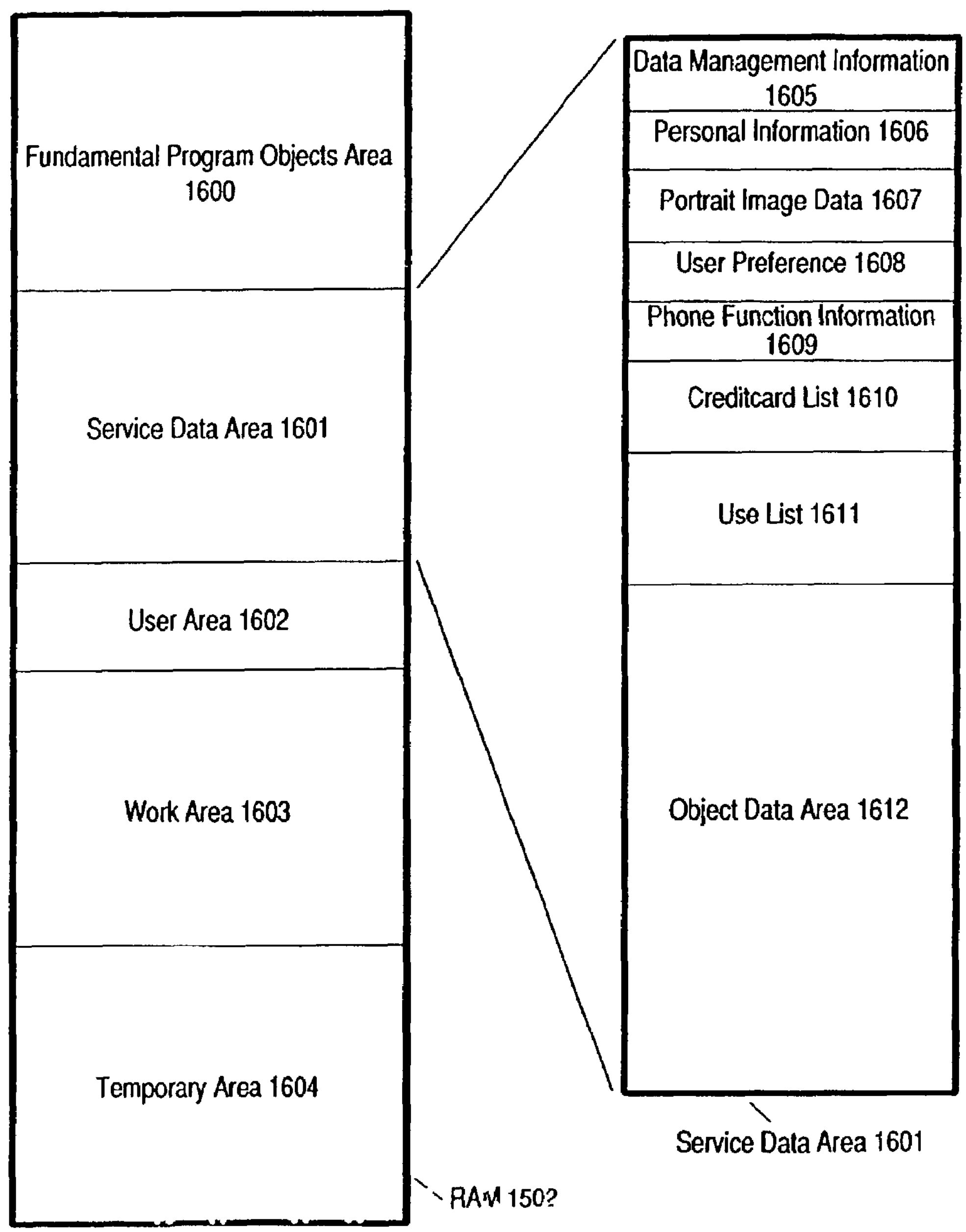
FIG. 16 is a specific diagram showing a RAM map for the personal credit terminal according to the first embodiment of the present invention.

FIG. 16 is a specific diagram showing a RAM map for data stored in the RAM 1502.

The RAM 1502 is constituted by five areas: a fundamental program objects area 1600, a service data area 1601, a user area 1602, a work area 1603, and a temporary area 1604. In the fundamental program objects area 1600 are stored an upgraded module for a program stored in the ROM 1501, and a patch program.

The user area 1602 is an area that can be freely used by a user, the work area 1603 is a work area that the CU 1500 employs when executing a program, and the temporary area 1604 is an area in which information received by the personal credit terminal 100 is stored temporarily. The service data area 1601 is an area in which is stored ID information for the personal remote credit transaction service, credit card information, and history information; the data in this area are managed by the service providing system 102.

The service data area 1601 is constituted by eight subareas: a data management information area 1605, a personal information area 1606, a portrait image data area 1607, a user preference area 1608, a telephone function area 1609, a credit card list area 1610, a use list area 1611, and an object data area 1612. The data management information area 1605 is an area in which is stored management information for data stored in the service data area 1601; the personal information area 1606 is an area in which are stored the name, age and gender of a user; the portrait image data area 1607 is an area in which the portrait image data for the face of a user are stored; the user preference area 1608 is an area in which is stored preference information for a user concerning the personal remote credit transaction service; the telephone function information area 1609 is an area in which information concerning a digital wireless telephone is stored; the credit card list area 1610 is an area in which list information for credit cards registered by a user is stored; the use list area 1611 is an area in which is stored use history information for the personal remote credit transaction service; and the object data area 1612 is an area in which are stored object data for information managed in the other seven areas.

The information stored in the service data area 1601 will now be described in detail.

Figure 17:
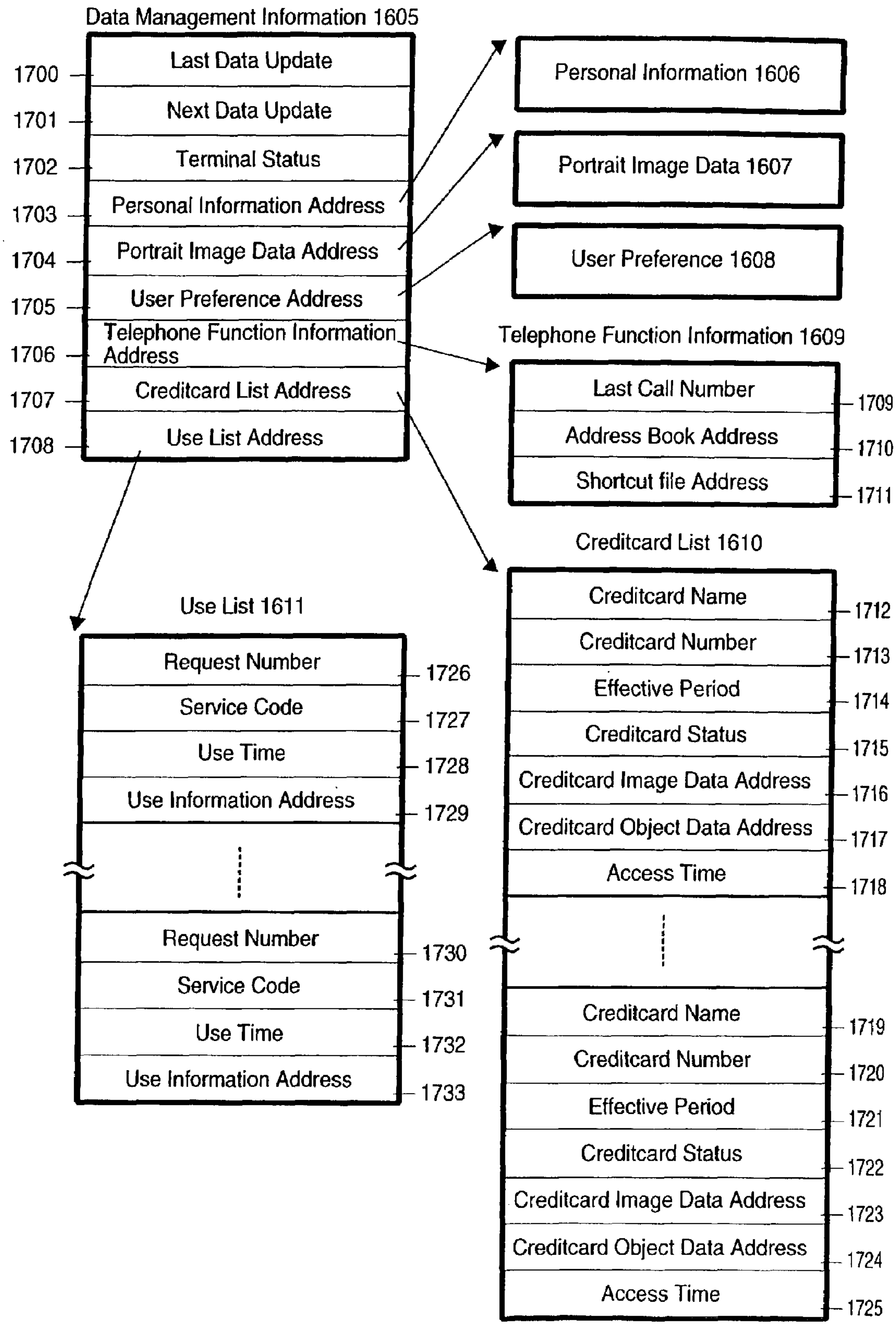
FIG. 17 is a specific diagram showing data stored in a service data area in the personal credit terminal according to the first embodiment of the present invention.

FIG. 17 is a detailed, specific diagram showing the relationship existing between information stored in the service data area 1601.

The data management information 1605 consists of nine types of information: a last data update date 1700, a next data update date 1701, a terminal status 1702, a personal information address 1703, a portrait data address 1704, a user preference address 1705, a telephone function information address 1706, a credit card list address 1707, and a use list address 1708.

The last data update date 1700 represents the date on which the service providing system 102 last updated the data in the service data area 1601, and the next data update date 1701 represents the date on which the service providing system 102 will next update data in the service data area 1601. The personal credit terminal 100 automatically initiates the update process when the time set in accordance with the next data update date 1701 is reached.

The data updating process is a process whereby the service providing system 102 updates the data in the service data area 1601. The data updating process will be described in detail later.

The terminal status 1702 represents the status of the personal credit terminal 100; and the personal information address 1703, the portrait data address 1704, the user preference address 1705, the telephone function information address 1706, the credit card list address 1707, and the user list address 1708 respectively represent the first addresses of the areas in which are stored personal information 1606, portrait image data 1607, user preference information 1608, telephone function information 1609, a credit card list 1610, and a use list 1611.

The telephone function information 1609 consists of three types of information: a last called number 1709, an address book address 1710, and a shortcut file address 1711. The last called number 1709 represents a telephone number employed for a prior call, and is employed when re-dialing a digital wireless phone. The address book address 1710 and the shortcut file address 1711 respectively represent addresses in the object data area 1612 at which address book information and a shortcut file are stored.

The credit card list 1610 includes list information for credit cards that are registered by a user. In the credit card list 1610, seven types of information are entered for each credit card: a credit card name 1712 (1719), a credit card number 1713 (1720), an effective period 1714 (1721), a credit card status 1715 (1722), an image data address 1716 (1723), an object data address 1717 (1724), and an access time 1718 (1725).

The credit card status 1715 (1722) indicates whether or not the credit card is effective, and also the credit limit, while the image data address 1716 (1723) represents an address in the object data area 1612 at which image data for the credit card are stored. The object data address 1717 (1724) represents an address at which are stored object data for a program for the credit card, and the access time 1718 (1725) represents the last time that the user employed the credit card.

At the object data address 1717 (1724) is stored a local address that is an address in the object data area 1612, or a remote address that is an address in the user information server 402 of the service providing system 102. When a remote address is stored at the object data address 1717 (1724), and when the user selects a corresponding credit card, the personal credit terminal 100 downloads object data from the service providing system 102 to the temporary area 1604, and executes a program for the credit card. In order to simply display the credit card, the image data at the image data address 1716 (1723) in the object data area 1612 are displayed, and object data are not downloaded.

An address to be stored at the object data address 1717 (1724) is determined by the service providing system 102. As part of the data updating process, the access times for the individual credit cards are compared, and a local address is assigned for the credit card having the latest access time. When there is adequate space in the object data area 1612, the object data addresses of all the credit cards can be local addresses.

In the use list 1611, four types of information are stored for one personal remote credit transaction service: a request number 1726 (1730), a service code 1727 (1731), a use time 1728 (1732), and a use information address 1729 (1733).

The request number 1726 (1730) uniquely represents the deal with the merchant, and is issued by the personal credit terminal 100 when it generates the payment offer 608. The service code 1727 (1731) is a code number that indicates the type of credit card service that is provided. The use time 1728 (1732) is the time at which when the personal remote credit transaction service is provided, and the use information address 1279 (1733) is an address at which a receipt is stored.

At the use information address 1729 (1733) is stored a local address that is an address in the object data area 1612, or a remote address that is an address in the user information server 402 of the service providing system 102.

When a remote address is stored at the use information address 1729 (1733), and when the user accesses the use information, the personal credit terminal 100 downloads the use information from the service providing system 102 to the temporary area 1604 and displays it on the LCD 203.

The address stored at the use information address 1729 (1733) is also determined by the service providing system 102. A part of the data updating process, the use times for the individual use information items are compared, and a local address is assigned for the use information having the latest use time. When there is adequate space in the object data area 1612, all the use information addresses can be local addresses.

The process performed by the CPU 1500 will now be described.

Figure 19A:
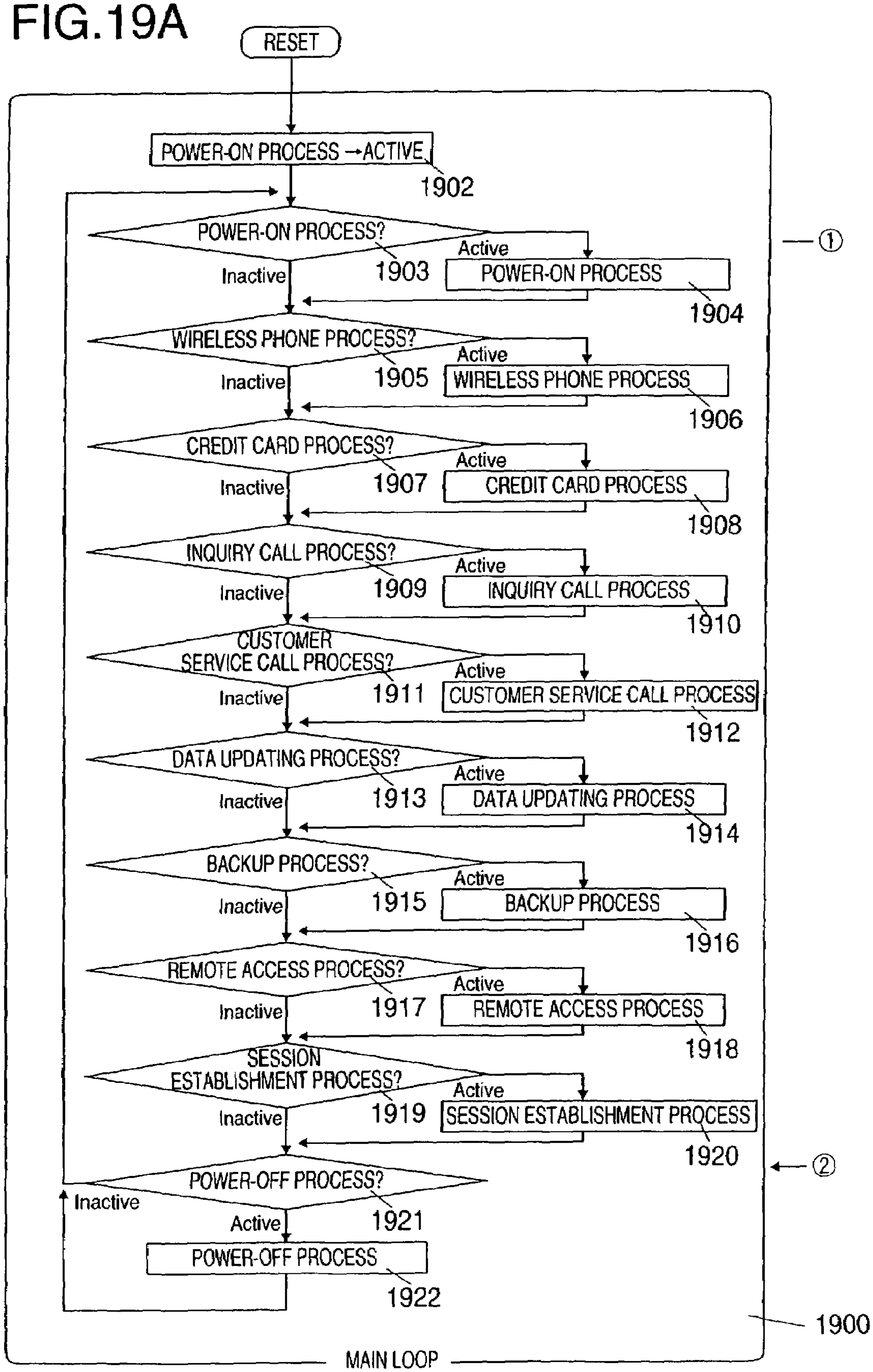
FIG. 19A is a flowchart for the processing performed by a CPU in the personal credit terminal according to the first embodiment of the present invention.
Figure 19B:
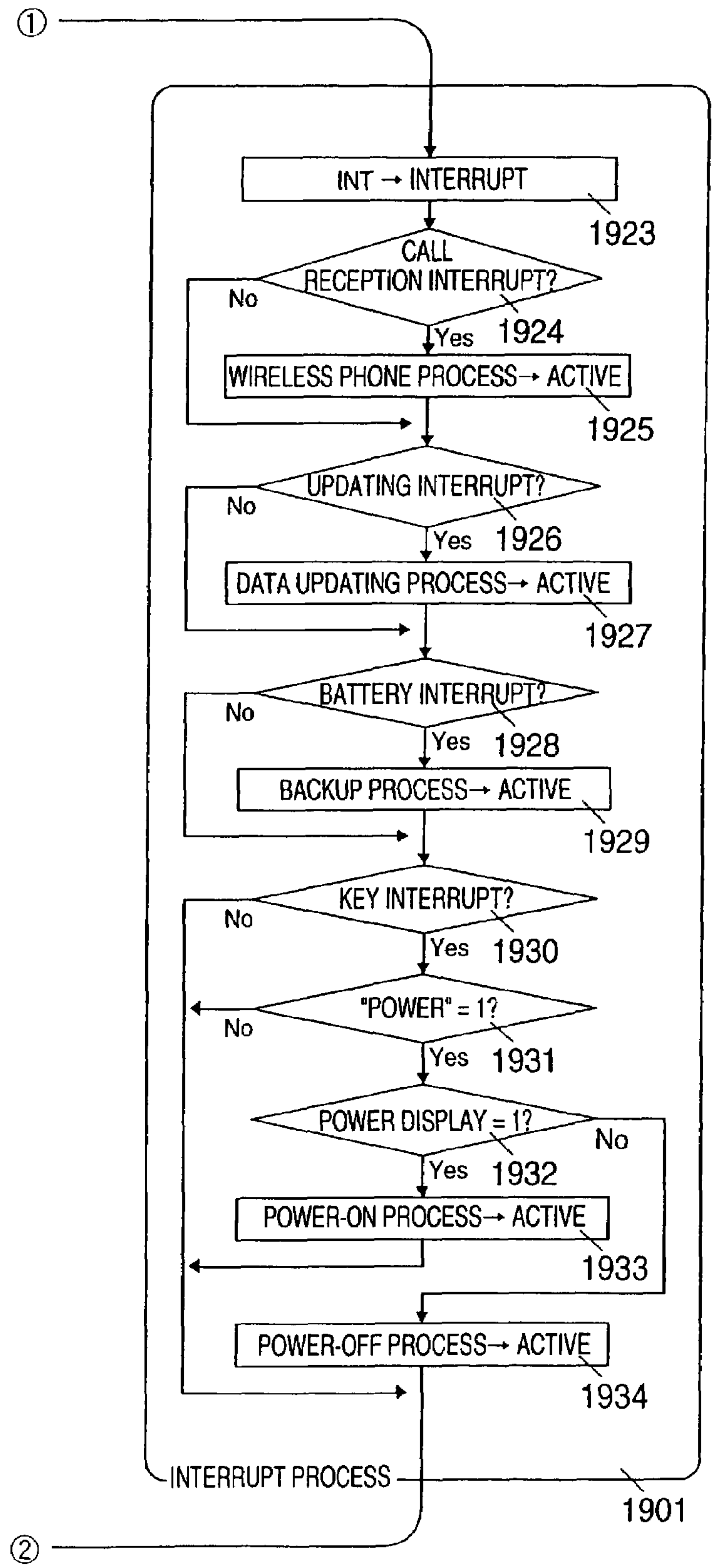
FIG. 19B is a partial flowchart for the processing that follows the processing shown in FIG. 19A.

FIGS. 19A and 19B are conceptual flowcharts for the processing performed by the CPU 1500.

As is shown in FIGS. 19A and 19B, the processes for the CPU 1500 can be roughly sorted into ten processes and an interrupt process 1901.

The ten processes are a power-ON process, a wireless telephone function process, a credit card process, an inquiry call process, a customer service call process, a data updating process, a backup process, a remote access process, a session establishment process, and a power-OFF process, which are executed in a main loop 1900.

For each process, a corresponding word field indicating the status of the process is maintained in the RAM 1502, and the CPU 1500 performs the process in accordance with the process status entry.

The power-ON process is an initialization process that is performed when the power switch of a unit is turned on by a user. The wireless telephone function process is a process performed when the unit is in a digital wireless telephone mode. The credit card process is a process performed when the unit is in a credit card mode. The inquiry call process is a process for handling an inquiry call, and the customer service call process is a process for handling a customer service call. The data updating process is a process employed for updating data, and the backup process is a process employed for backing up data. The remote access process is a process for accessing data held in the user information server 402 of the service providing system 102. The session establishment process is a process for establishing a communication session with the service providing system 102. The power-OFF process is an end process that is performed when the power switch is turned off by the user.

In FIGS. 19A and 19B, when the personal credit terminal 100 is reset, program control advances to step 1902, where at the CPU 1500 renders the power-ON process active.

At step 1903, a check is performed to determine whether the power-ON process is active. When the power-ON process is inactive, program control moves to step 1905. When the power-ON process is active, program control goes to step 1904, where at the power-ON process is performed for a specified period of time. Thereafter, program control moves to step 1905.

At step 1905, a check is performed to determine whether the wireless telephone function process is active. When the wireless telephone function process is inactive, program control moves to step 1907. When the wireless telephone function process is active, program control goes to step 1906, where at the wireless telephone function process is performed for a specified period of time. Thereafter, program control moves to step 1907.

At step 1907, a check is performed to determine whether the credit card process is active. When the credit card process is inactive, program control moves to step 1909. When the credit card process is active, program control goes to step 1908, where at the credit card process is performed for a specified period of time. Thereafter, program control moves to step 1909.

At step 1909, a check is performed to determine whether the inquiry call process is active. When the inquiry call process is inactive, program control moves to step 1911. When the inquiry call process is active, program control goes to step 1910, where at the inquiry call process is performed for a specified period of time. Thereafter, program control moves to step 1911.

At step 1911, a check is performed to determine whether the customer service call process is active.

When the customer service call process is inactive, program control moves to step 1913. When the customer service call process is active, program control goes to step 1912, where at the customer service call process is performed for a specified period of time. Thereafter, program control moves to step 1913.

At step 1913, a check is performed to determine whether the data updating process is active. When the data updating process is inactive, program control moves to step 1915. When the data updating process is active, program control goes to step 1916, where at the data updating process is performed for a specified period of time. Thereafter, program control moves to step 1915.

At step 1915, a check is performed to determine whether the backup process is active. When the backup process is inactive, program control moves to step 1917. When the backup process is active, program control goes to step 1916, where at the backup process is performed for a specified period of time. Thereafter, program control moves to step 1917.

At step 1917, a check is performed to determine whether the remote access process is active. When the remote access process is inactive, program control moves to step 1919. When the remote access process is active, program control goes to step 1918, where at the remote access process is performed for a specified period of time. Thereafter, program control moves to step 1919.

At step 1919, a check is performed to determine whether the session establishment process is active.

When the session establishment process is inactive, program control moves to step 1921. When the session establishment process is active, program control goes to step 1920, where at the session establishment process is performed for a specified period of time. Thereafter, program control moves to step 1921.

At step 1921, a check is performed to determine whether the power-OFF process is active. When the power-OFF process is active, program control goes to step 1922, where at the power-OFF process is performed. When the power-OFF process is inactive, program control returns to step 1903. When the interrupt signal 1557 is asserted requesting the CPU 1500 perform an interrupt process, it performs the interrupt process 1901 and then returns to the processing for the main loop 1900.

For the interrupt process 1901, first, at step 1923 the CPU 1500 reads the interrupt register (INT) 1804 and copies its contents to the word interrupt in the RAM (work area). After being read by the CPU 1500, the interrupt register (INT) 1804 is echo-reset.

At step 1924, the interrupt bit value 28 is employed to determine whether the interrupt 1518 is a reception interrupt. When the interrupt 1518 is not a reception interrupt (interrupt (bit28)=0), program control advances to step 1926. When the interrupt 1518 is a reception interrupt (interrupt (bit28)=1), program control moves to step 1925, where at the status of the wireless telephone process is set to active. Program control thereafter moves to step 1926.

At step 1926, the interrupt bit value 26 is employed to determine whether the interrupt 1518 is an update interrupt. When the interrupt 1518 is not an update interrupt (interrupt (bit26)=0), program control advances to step 1928. When the interrupt 1518 is an update interrupt (interrupt (bit26)=1), program control moves to step 1927, where at the status of the data updating process is set to active. Program control thereafter moves to step 1928.

At step 1928, the interrupt bit value 25 is employed to determine whether the interrupt 1518 is a backup interrupt. When the interrupt 1518 is not a backup interrupt (interrupt (bit25)=0), program control advances to step 1930. When the interrupt 1518 is a backup interrupt (interrupt (bit25)=1), program control moves to step 1929, where at the status of the backup process is set to active. Program control thereafter moves to step 1930.

At step 1930, the interrupt bit value 24 is employed to determine whether the interrupt 1518 is a key interrupt. When the interrupt 1518 is not a key interrupt (interrupt (bit24)=0), the interrupt process is terminated and program control returns to the main loop. When the interrupt 1518 is a key interrupt (interrupt (bit24)=1), program control moves to step 1931.

At step 1931, the "power" bit value (bit 16) of the interrupt is examined. When the bit value is 0, the interrupt process is terminated and program control returns to the main loop 1900. When the bit value is 1, it is assumed that the power switch has been manipulated and program control moves to step 1932.

At step 1932, the "power display" bit value (bit 31) of the interrupt is examined. When the bit value is 0, it is assumed that the power-OFF operation has been performed, and program control goes to step 1934. When the bit value is 1, it is assumed that the power-ON operation has been performed, and program control moves to step 1933.

At step 1933, the status of the power-ON process is set to active, and the interrupt process is terminated. Program control thereafter returns to the main loop 1900.

At step 1934, the status of the power-OFF process is set to active, and the interrupt process is terminated. Program control thereafter returns to the main loop 1900.

In the interrupt process 1901, a process for which the status has been set to active is returned to the main loop 1900 to be performed.

An explanation will now be given for a digital signature process and a closing process that are performed by the personal credit terminal 100 before generating a message to be transmitted to the credit settlement terminal 300 and to the service providing system 102.

Since the credit settlement terminal 300 performs the same digital signature process and closing process, instead of the user, the merchant and the service provider, common terms, such as Mr. A and Mr. B, are employed to describe persons in the following explanation.

In the digital signature process, an electronic signature is provided for a message by using the property of the encryption method that employs a public key, "a message encrypted using a private key can only be decrypted by using a public key that corresponds to the private key."

Figure 20A:
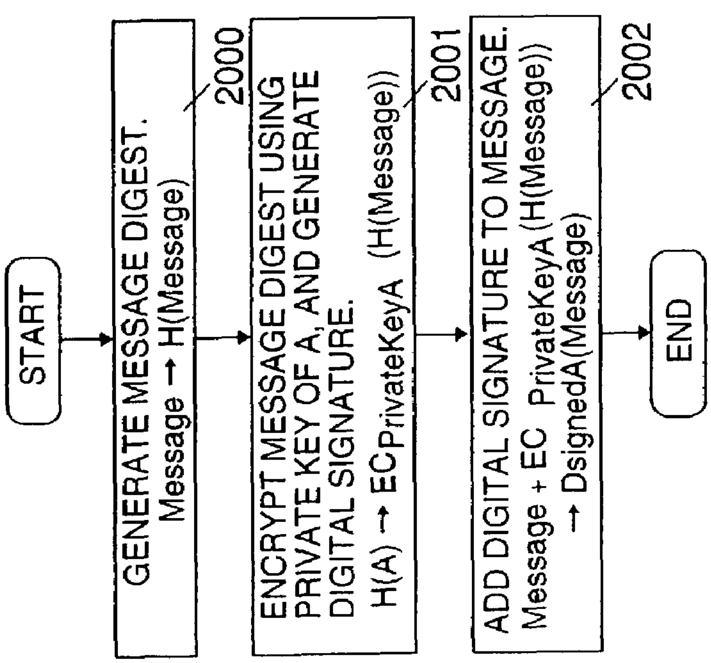
FIG. 20A is a flowchart showing digital signature processing according to the first embodiment of the present invention.
Figure 20B:
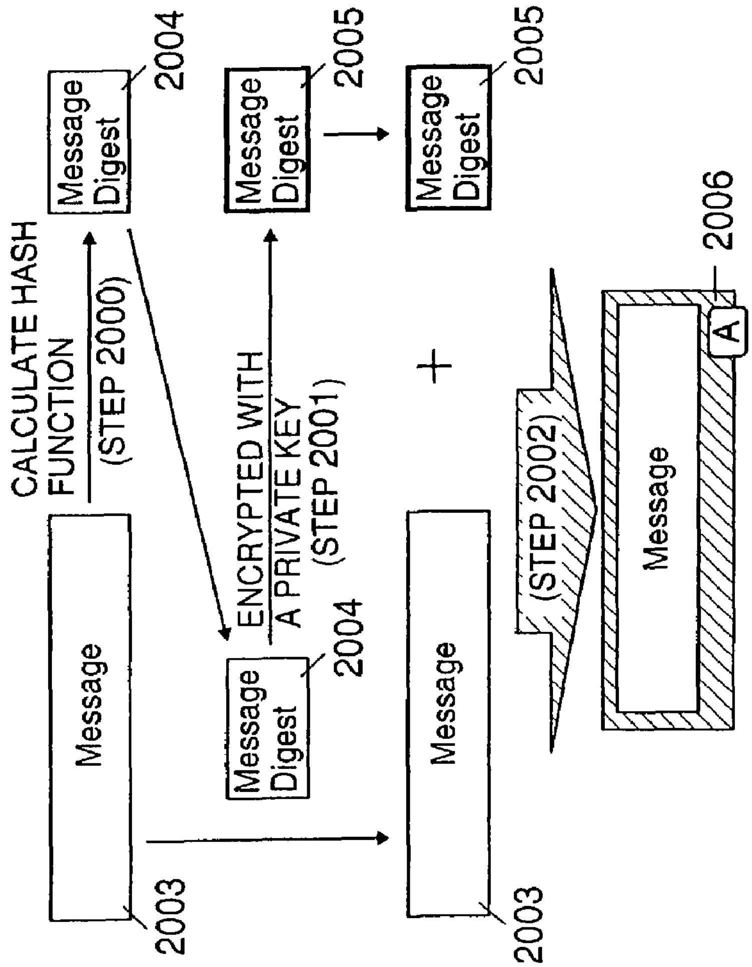
FIG. 20B is a diagram for explaining digital signature processing according to the first embodiment of the present invention.

FIGS. 20A and 20B are a flowchart and a diagram explaining the concept of the digital signature processing when Mr. A provides his digital signature for a message.

First, at step 2000 the CPU 1500 calculates a hash function for a message 2003 to prepare a message digest 2004.

At step 2001, the CPU 1500 employs the encryption processor 1505 to encrypt the message digest 2004 using Mr. A's private key, and generates a digital signature 2005.

At step 2002, the CPU 1500 affixes the digital signature 2005 to the original message 2003. In this manner, the CPU 1500 generates a message 2006 to which Mr. A's digital signature is affixed.

The message to which Mr. A's digital signature is affixed is represented as shown by message 2006 in FIG. 20B, and in the following explanation a message to which is affixed a digital signature will be represented as is message 2006.

The closing process will now be described.

Following the closing process, only a specific person can use a public key to access the contents of a message because of the property of the encryption method: "a message encrypted using a private key can be decrypted only by using a public key that corresponds to the private key."

Figure 21A:
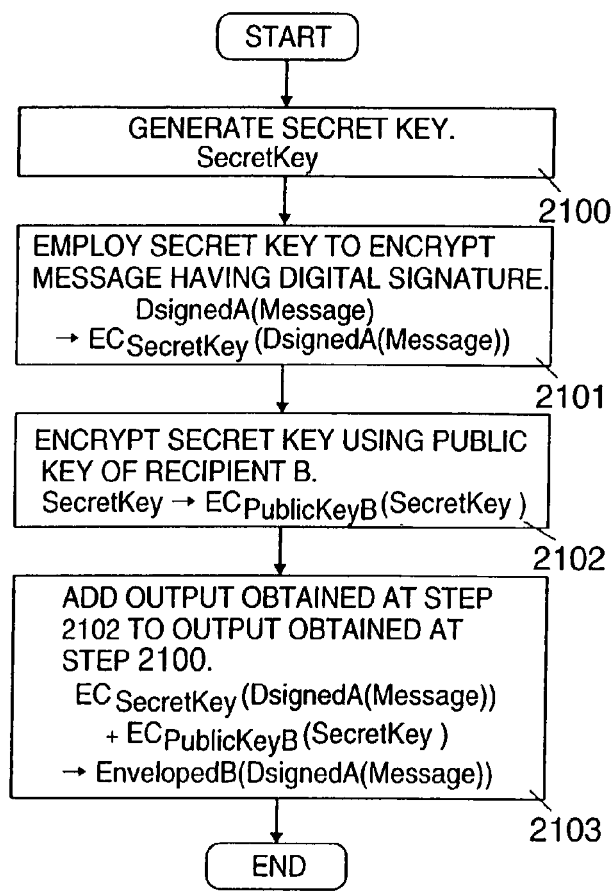
FIG. 21A is a flowchart showing message closing processing according to the first embodiment of the present invention.
Figure 21B:
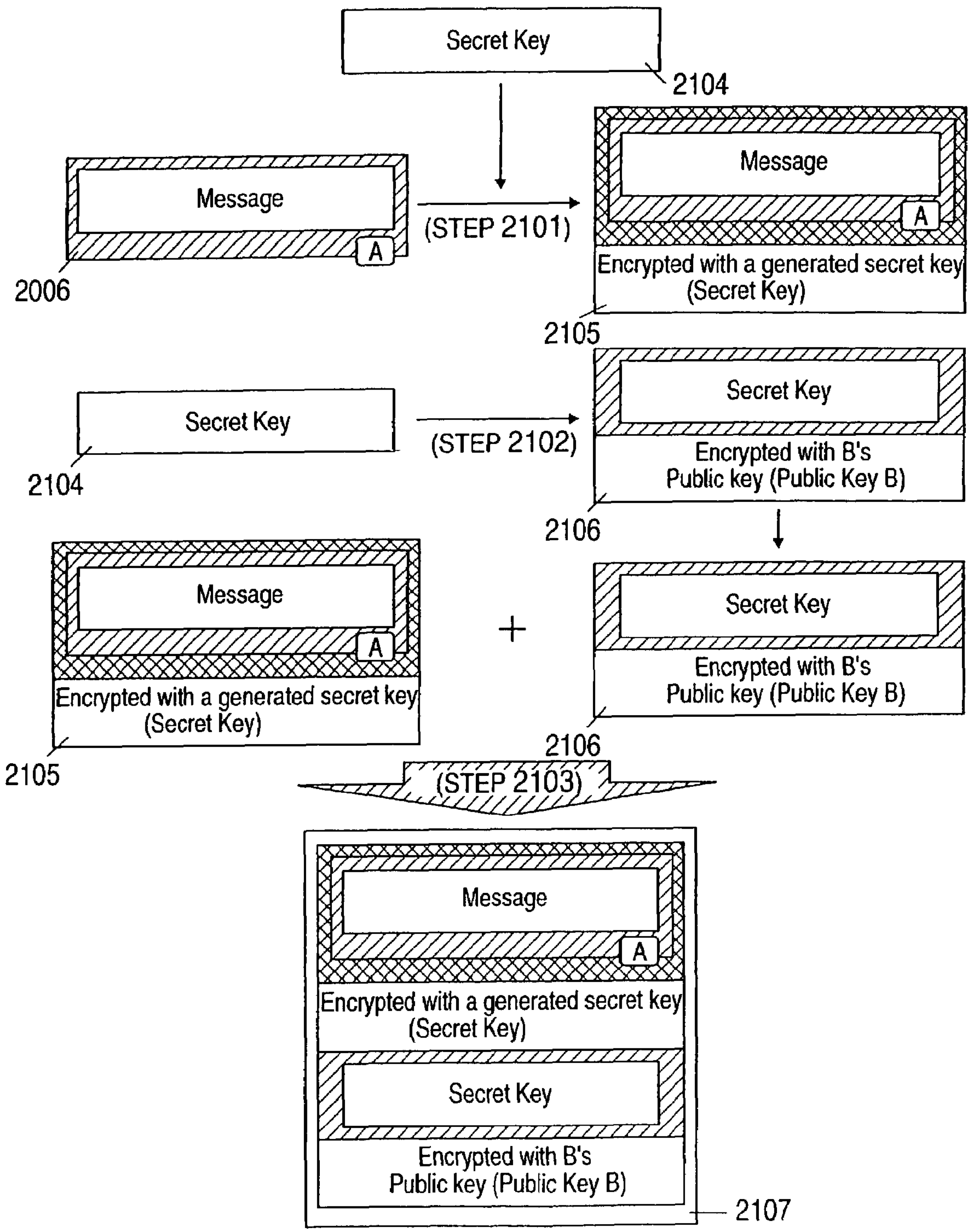
FIG. 21B is a diagram for explaining message closing processing according to the first embodiment of the present invention.

FIGS. 21A and 21B are a flowchart and a diagram for explaining the concept of the processing performed to close the message to which Mr. A's digital signature is affixed, and for addressing it to Mr. B, the intended recipient.

At step 2100, the CPU 1500 employs a random number function to generate a secret key 2104 that is used for secret key encryption. At step 2101, the CPU 1500 employs the encryption processor 1505 and uses the secret key 2104 to encrypt the message 2006 to which the digital signature is affixed.

At step 2102, the CPU 1500 employs the encryption processor 1505 to encrypt the secret key 2104 using the public key belonging to Mr. B, the intended recipient.

At step 2103, the CPU 1500 adds the output 2106 provided at step 2102 to the output 2105 provided at step 2101. In this manner, a closed message 2107 is generated for Mr. B.

The closed message for Mr. B is represented as shown by message 2007 in FIG. 21B, and in the following explanation the closed message will be represented the same way.

An explanation will now be given for a decryption process for an closed, encrypted message and a verification process for a digital signature that are performed by the personal credit terminal 100 when it receives a message from the service providing system 102. For these processes, the persons concerned are generalized.

First, the decryption process will be explained.

Figure 22A:
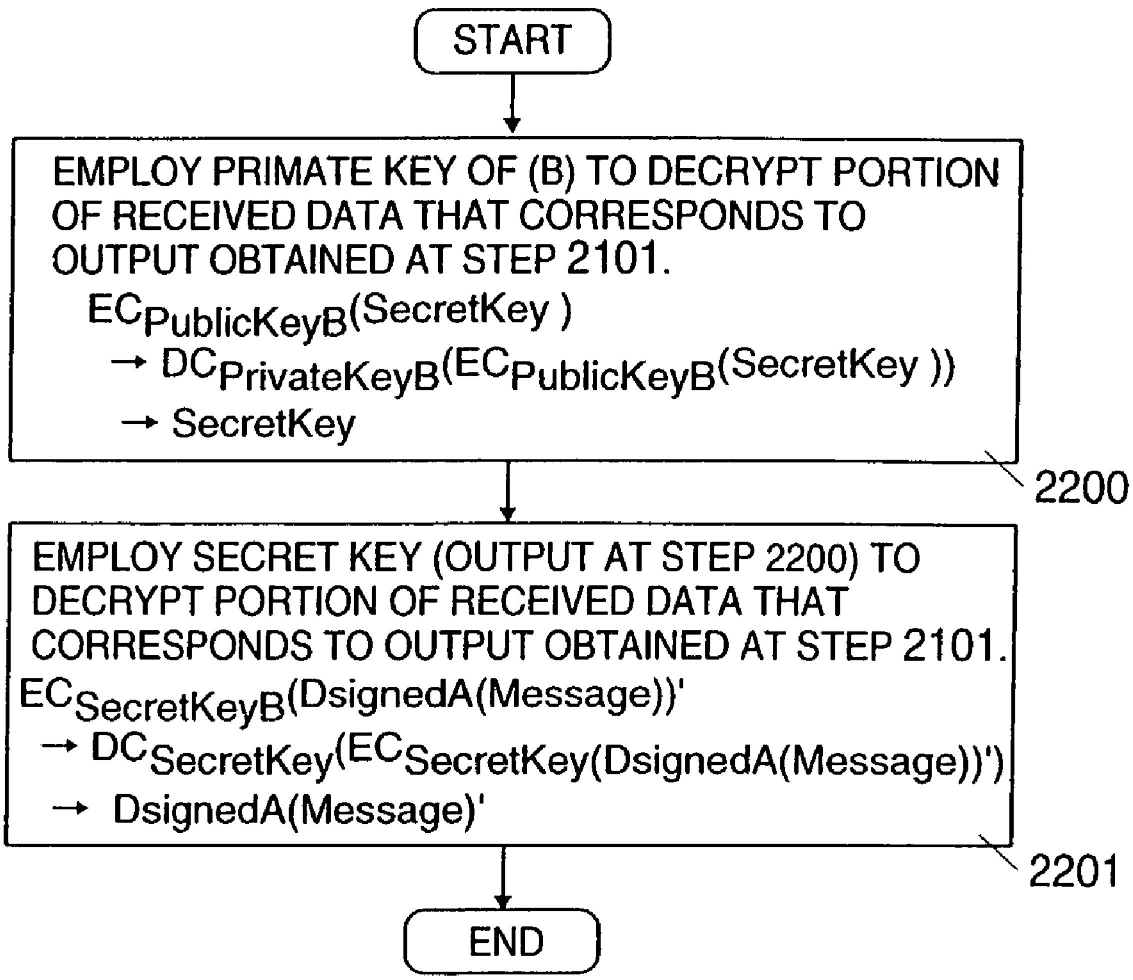
FIG. 22A is a flowchart showing closed message decryption processing according to the first embodiment of the present invention.
Figure 22B:
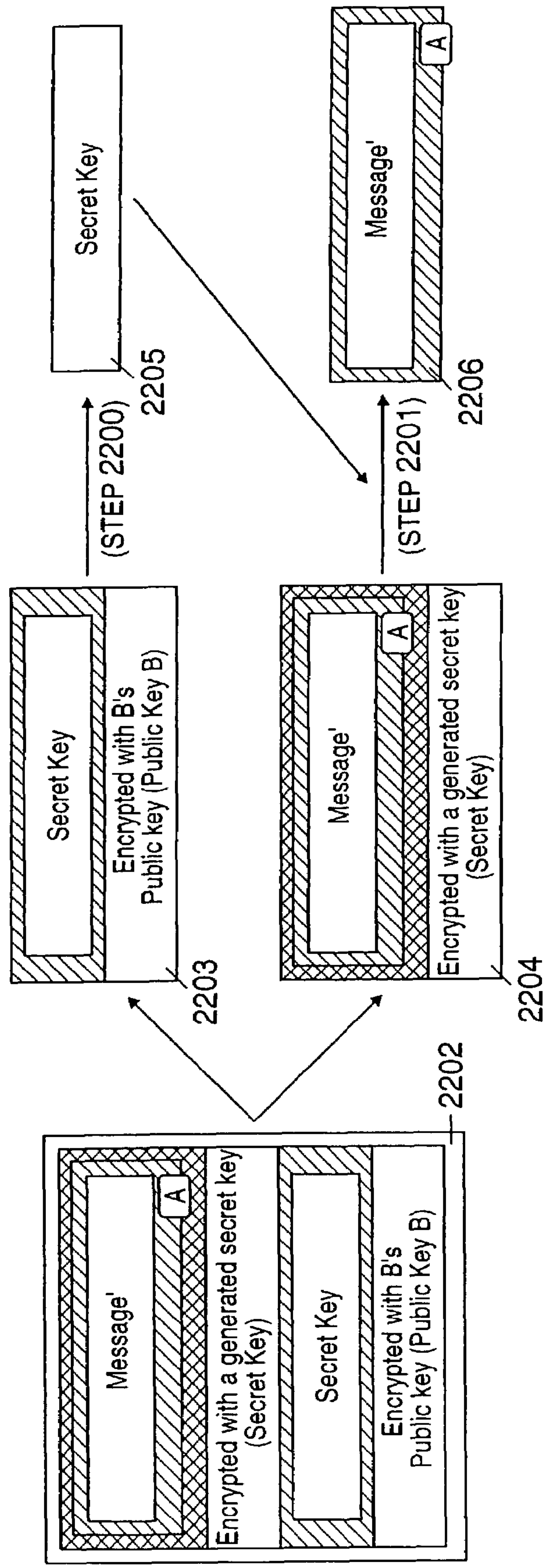
FIG. 22B is a diagram for explaining closed message decryption processing according to the first embodiment of the present invention.

FIGS. 22A and 22B are a flowchart and a diagram for explaining the concept of the process used for decrypting a closed message addressed to Mr. B.

At step 2200, the CPU 1500 divides the closed message 2202 to Mr. B into a secret key portion 2203, which was encrypted using Mr. B's public key, and a message that was encrypted using the secret key. Then, the encryption processor 1505 of the CPU 1500 employs Mr. B's private key to decrypt the secret key portion 2203 encrypted using his public key, and extracts a secret key 2205.

Then, at step 2201, the CPU 1500 permits the encryption processor 1505 to use the secret key 2205 to decrypt the message portion 2204 that was encrypted using the secret key to form a decrypted message 2206.

A closed message is decrypted in the above manner.

The process for verifying a digital signature will now be explained.

Figure 23A:
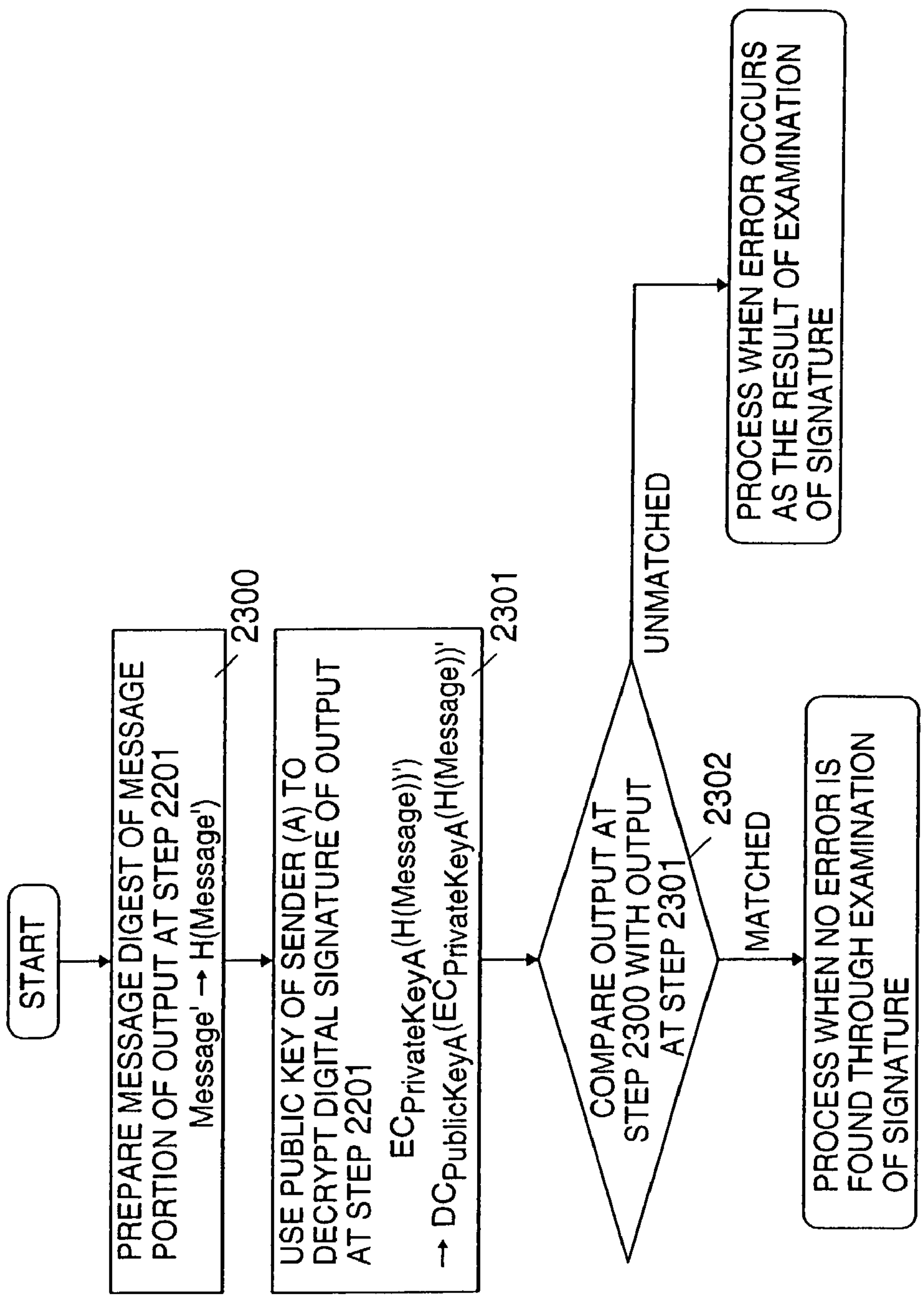
FIG. 23A is a flowchart showing digital signature verification processing according to the first embodiment of the present invention.
Figure 23B:
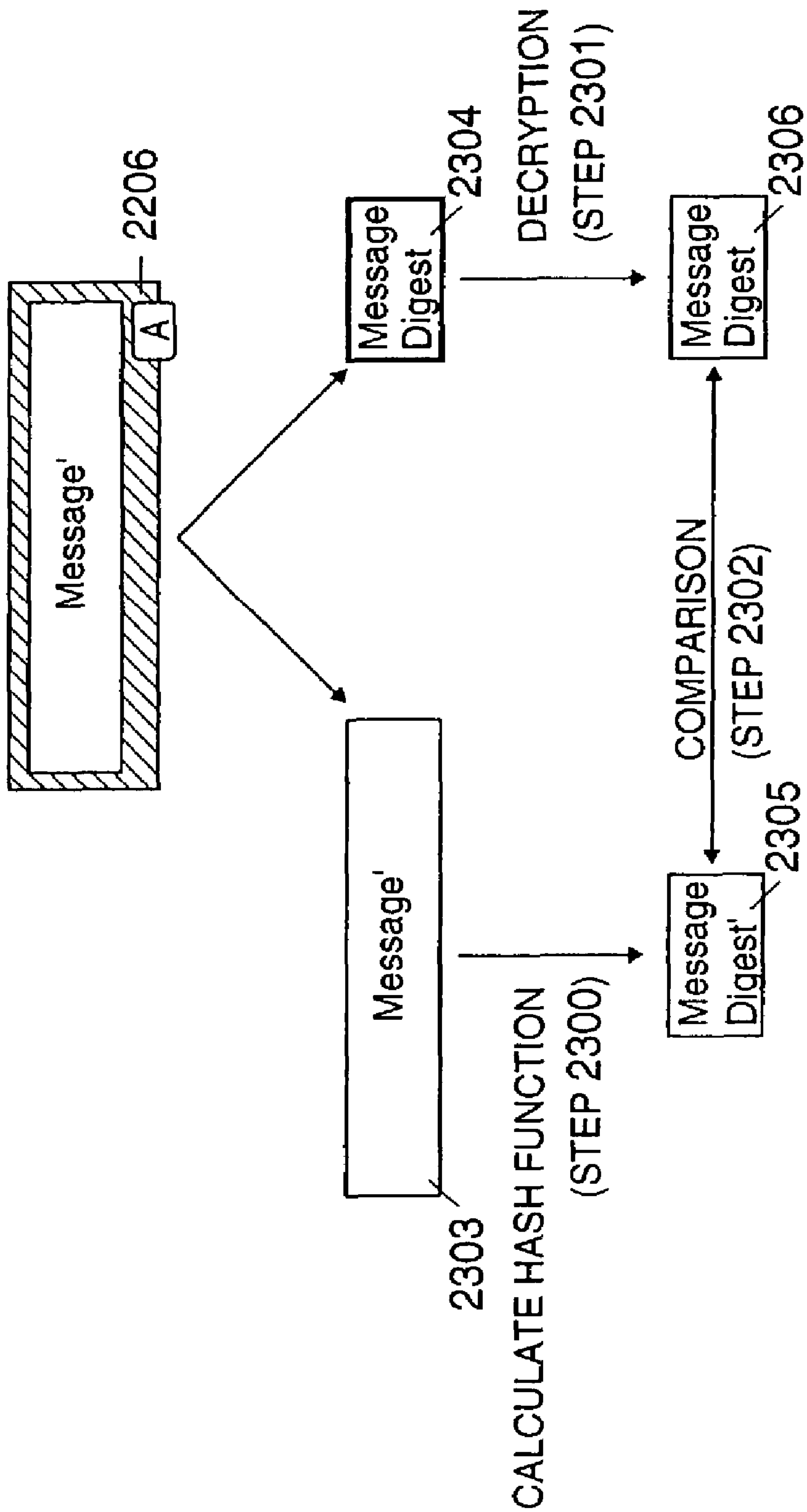
FIG. 23B is a diagram for explaining digital signature verification processing according to the first embodiment of the present invention.

FIGS. 23A and 23B are a flowchart and a diagram for explaining the concept of the process employed when verifying the digital signature of Mr. A, the sender of the message, that is affixed to a message.

First, at step 2300 the CPU 1500 calculates the hash function for the portion (Message' 2303) of the message 2206 to which the digital signature is affixed, and generates a message digest 2305.

At step 2301, the encryption processor 1505 of the CPU 1500 employs Mr. A's public key to decrypt the digital signature portion 2304 of the message 2206 to which the digital signature is affixed.

At step 2302, the CPU 1500 compares the output 2305 obtained at step 2300 with the output 2304 obtained at step 2301 resulting in an output 2306. When the contents of the outputs match, it is assumed that the digital signature has been verified, and when they do not match, it is assumed that a verification error has occurred.

The process for verifying the digital signature is performed in the above described manner.

The internal structure of the credit settlement terminal 300 will now be explained.

Figure 24A:
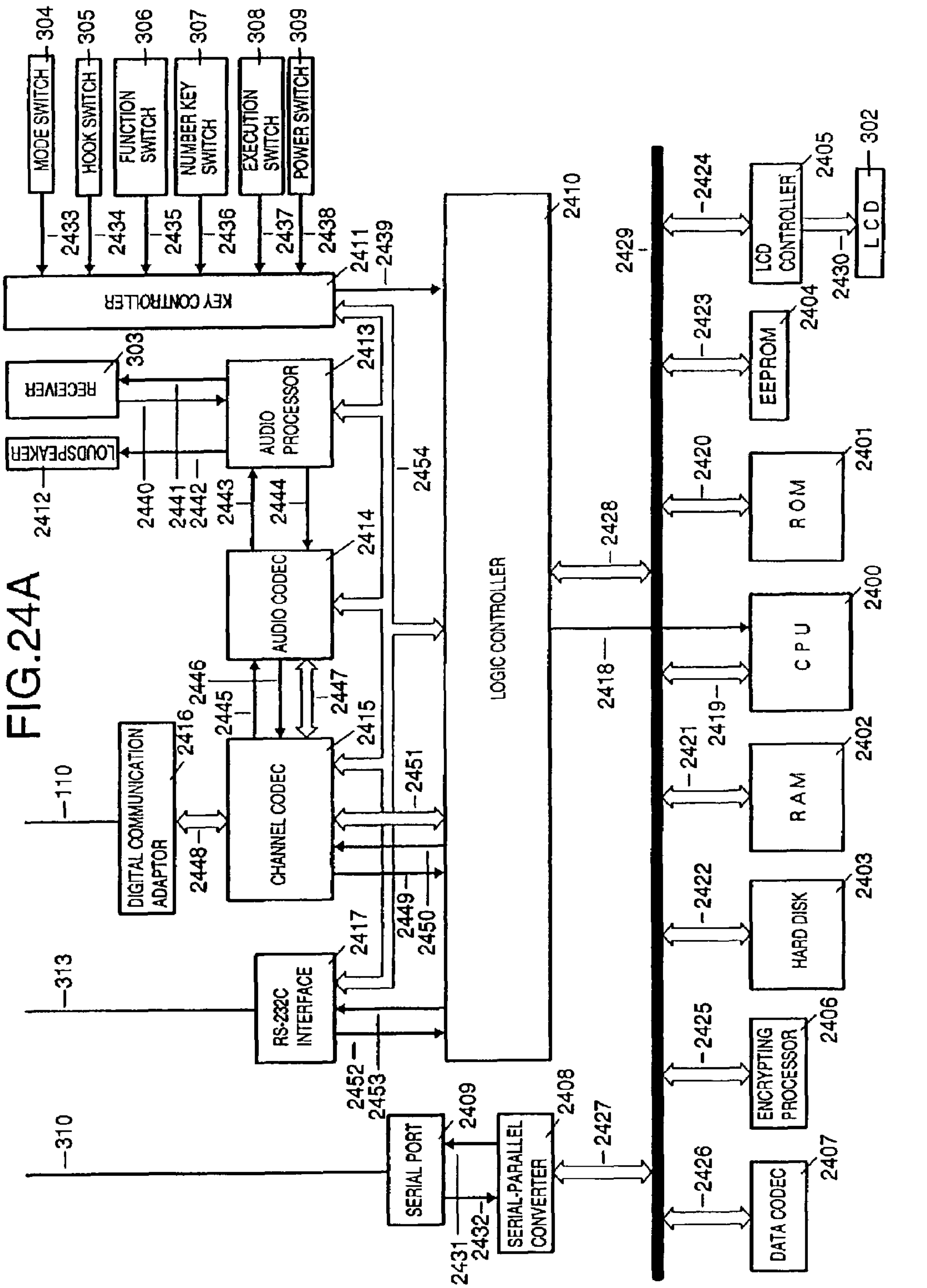
FIG. 24A is a block diagram illustrating the arrangement of the credit settlement terminal according to the first embodiment of the present invention.

FIG. 24A is a block diagram illustrating the arrangement of the credit settlement terminal 300. The terminal 300 comprises: a CPU (Central Processing Unit) 2400, which processes data that is to be transmitted and data that is received in accordance with a program stored in a ROM (Read Only Memory) and which controls the other components via a bus 2429; a RAM (Random Access Memory) 2402 in which are stored data that are to be processed and data that have been processed by the CPU 2400; a hard disk 2403, on which are stored object data for information that is designated by management information for data in the RAM 2402; a EEPROM (Electric Erasable Programmable Read Only memory) 2404, in which are stored the terminal ID of the credit settlement terminal 300, a telephone number, a merchant ID for a merchant, a private key and a public key, the service provider ID of the service providing system 102, a telephone number, and the public key of the service provider; an LCD controller 2405, which operates the LCD 302 under the control of the CPU 2400 and which displays on the LCD 302 an image set by the CPU 2400; an encryption processor 2406, which encrypts or decrypts data under the control of the CPU 2400; a data codec 2407, which encodes data to be transmitted and decodes received data under the control of the CPU 2400; a serial-parallel converter 2408, which is connected to the infrared module 301 at a serial port 2409 by the serial cable 310, and which performs bidirectional conversion of parallel data and serial data; a key operation controller 2411, which detects a merchant's manipulation of a mode switch 304, a hook switch 305, a function switch 306, a number key switch 307, an execution switch 308 or a power switch 309, and which asserts an interrupt signal 2439; an audio processor 2413, which encodes an analog audio signal 2444 to provide digital audio data and decodes digital audio data to provide an analog audio signal 2443; an audio codec 2414, which encodes an analog audio signal 2444 to digital audio data and decodes digital audio data to an analog audio signal 2443; a channel codec 2415, which generates data to be transmitted along the communication channel, and identifies received data as either digital audio data or data-communication data; a digital communication adaptor 2416, which converts a digital signal 2448 to provide data having a format suitable for digital telephone communication, or which performs an inverted conversion; an RS-232C interface 2417, which is connected to an RS-232C cable 313; and a logic controller 2410, which processes an interrupt signal received from the key operation controller 2411, the channel codec 2415 or the RS-232C interface 2417, and which serves as an interface when the CPU 2400 accesses the internal register of the key operation controller 2411, the audio processor 2413 or the channel codec 2415.

The encryption processor 2406 includes a private key encryption and decryption function and a public key encryption and decryption function. The encryption processor 2406 employs an encryption method, as determined by the CPU 2400, and the keys to encrypt or decrypt data set by the CPU 2400.

The data codec 2407 encodes data to be transmitted, or decodes received data under the control of the CPU 2400. In this case, the encoding is a process for generating data to be transmitted that includes communication control information and error correction information, and the decoding is a process for performing error correction for the received data and for removing extra communication control information in order to obtain the data that a sender originally intended to transmit. The data codec 2407 has a function for encoding or decoding data while data communication employing a digital telephone is in progress, and a function for encoding or decoding data while infrared communication is in progress. The data codec 2407 performs encoding or decoding as determined by the CPU 2400 for data that are set by the CPU 2400.

Figure 24B:
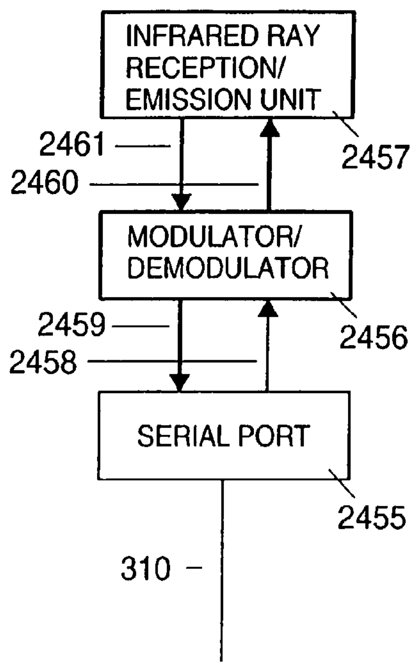
FIG. 24B is a block diagram illustrating the arrangement of an infrared reception/emission module in the credit settlement terminal according to the first embodiment of the present invention.

The infrared communication module 301 is connected via the serial cable 310 and the serial port 2409 to the serial-parallel converter 2408. As is shown in FIG. 24B, the infrared communication module 301 includes internally a serial port 2455, which functions as an interface with the credit settlement terminal 300; a modulator/demodulator 2456, which receives a digital signal 2458 from the serial-parallel converter 2408 and modulates it provide an infrared transmission signal 2460, and which demodulates a received analog signal 2461 to provide a serial digital signal 2459; and an infrared ray reception/emission unit 2457, which converts a signal 2460 received from the modulator/demodulator 2456 into an infrared ray and then emits it, and which converts a received infrared ray into an analog signal 2461.

The infrared module 301 performs transmission and reception of infrared rays, in addition to implementing infrared communication. The infrared module 301 changes data set by the CPU 2400 into an infrared ray and then emits it, or converts a received infrared ray into data.

Figure 27A:
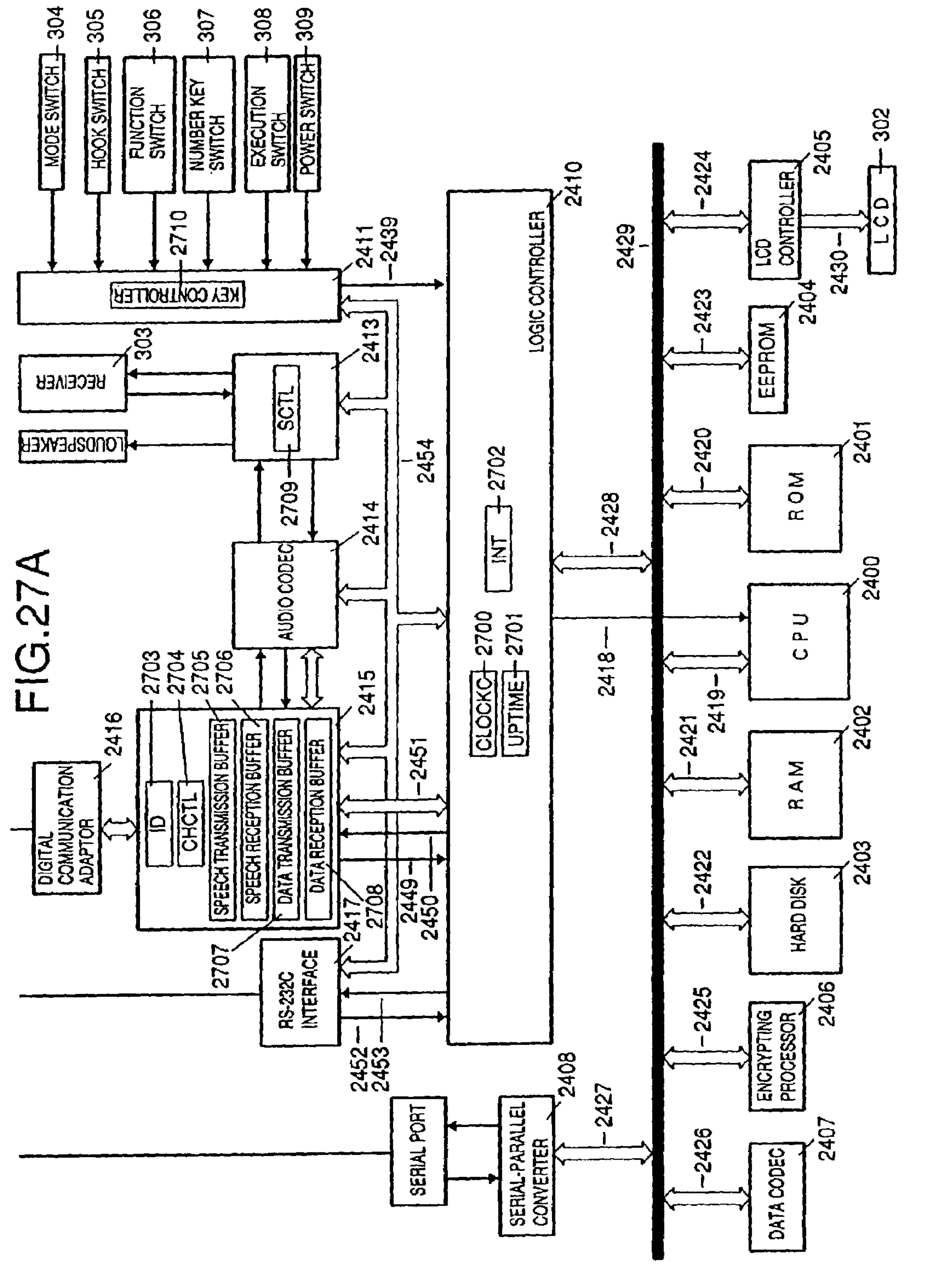
FIG. 27A is a diagram illustrating the arrangement for an internal register in the credit settlement terminal according to the first embodiment of the present invention.

When the merchant depresses either the mode switch 304, the hook switch 305, the function switch 306, the number key switch 307, the execution switch 308 or the power switch 209, the key operation controller 2411 asserts an interrupt signal 2439 requesting the CPU 2400 perform a process corresponding to the switch manipulation. As is shown in FIG. 27A, the key operation controller 2411 includes a key control register (KEYCTL) 2710 for setting a valid/invalid state for each switch. The CPU 2400 accesses the key control register (KEYCTL) 2710 to determine whether a switch is effective or not.

The audio processor 2413 includes an audio control register (SCTL) 2709 for controlling the audio process, as is shown in FIG. 27A. The CPU 2400 accesses the audio control register (SCTL) 2709 to control the operation of the audio processor 2413. When, for example, a request for a digital telephone call is received, the CPU 2400 accesses the audio control register (SCTL) 2709 to output an arrival tone for a digital call. Therefore, the audio processor 2413 drives the loudspeaker 2412 to output an arrival tone for a digital call.

The audio codec 2414 encodes an analog audio signal 2444 received from the audio processor 2413 to provide digital audio data, and decodes digital audio data received from the channel codec 2415 to provide an analog audio signal 2443. The analog audio signal 2443 is transmitted to the audio processor 2414, which amplifies the signal 2443 and drives the receiver of the telephone handset 303 to release sounds. The encoded digital audio data are transmitted to the channel codec 2415, which then changes the data into data suitable for transmission across the communication channel.

Two types of data to be transmitted are received by the channel codec 2415: one type is digital audio data produced by the audio codec 2414, and the other type is data-communication data produced by the CPU 2400 that pass through the logic controller 2410.

The channel codec 2415 adds as header information for digital the audio data and the data-communication data, information identifying the data types, and multiplexes the digital audio data and the data-communication data and transmits a resultant digital signal 2448 to the digital communication adaptor 2416.

In addition, upon receiving a digital signal 2448 from the digital communication adaptor 2416, the channel codec 2415 examines a terminal ID, identifies the digital audio data and the data communication data using the header information, and transmits the respective data to the audio codec 2412 and the logic controller 2410. Thereafter, when the channel codec 2415 receives a digital call or data-communication data, it asserts an interrupt signal 2449 requesting the CPU 2400 perform a process for a received digital telephone and a process for data-communication data.

In order to perform these processes, as is shown in FIG. 27A, the channel codec 2415 includes: an ID register (ID) 2703, in which a terminal ID is stored; a channel codec control register (CHCTL) 2704, which controls the operation of the channel codec 2415; an audio transmission buffer 2705, in which are stored digital audio data received from the audio codec 2414; an audio reception buffer 2706, in which are stored digital audio data extracted from received data; a data transmission buffer 2707, in which are stored data-communication data received from the logic controller 2410; and a data reception buffer 2708, in which are stored data communication data extracted from received data.

The digital communication adaptor 2416 encodes a digital signal 2448 to obtain data having a format suitable for digital telephone communication, and outputs the resultant signal to a digital telephone communication line 110. The digital communication adaptor 2416 further decodes a signal received along the digital telephone communication line 110, and supplies an obtained digital signal 2448 to the channel codec 2415.

The RS-232C interface 2417 is an interface circuit for connecting the RS-232C cable 313. The credit settlement terminal 300 communicates with the cash register 311 via the RS-232C interface 2417. The RS-232C interface 2417 receives data from the cash register 311 and asserts an interrupt signal 2452 requesting the CPU 2400 exchange data with the cash register 311 via the RS-232C interface 2417.

The logic controller 2410 internally includes three registers as is shown in FIG. 27A: a clock counter (CLOCKC) 2700, an update time register (UPTIME) 2701, and an interrupt register (INT) 2702.

The clock counter 2700 measures the current time; the update time register 2701 is used to store the time at which the credit settlement terminal 300 updates data in the RAM 2402 and on the hard disk 2403 through communication conducted with the service providing system 102; and the interrupt register 2702 is used to indicate for the CPU the reason an interrupt is generated.

When one of the interrupt signals 2439, 2449 and 2452 is asserted, the logic controller 2410 writes the reason the interrupt was generated in the interrupt register (INT) 2702, and asserts an interrupt signal 2418 requesting the CPU 2400 perform the interrupt process. For the interrupt process, the CPU 2400 reads from the interrupt register 2702 the reason the interrupt was generated, and performs a corresponding process.

The individual bit fields in the interrupt register (INT) 2702 are defined as is shown in FIG. 27B.

FIG. 27C characterizes the bit fields in terms of an "interrupt" variable.

Bit 31 represents the state of the power switch 309. When the bit value is 0, it represents the power-OFF state, and when the bit value is 1, it represents the power-ON state.

Bit 30 represents the digital telephone communication state. When the bit value is 0, it represents the state during which no digital telephone communication is performed, and when the bit value is 1, it represents the state during which digital wireless telephone communication is performed.

Bit 28 represents the generation of a call arrival interrupt. When the bit value is 1, it signals the arrival of a digital call. In this bit field, a 1 is set when a digital telephone call is received and the interrupt signal 2449 is asserted.

Bit 27 represents the generation of a data reception interrupt. When the bit value is 1, it signals the reception of data. In this bit field, a 1 is set when the data-communication data are received and the interrupt signal 2449 is asserted during the conduct of digital telephone communication.

Bit 26 represents the generation of an update interrupt requesting the performance of a data updating process. When the bit value is 1, it signals the generation of the update interrupt. In this bit field, a 1 is set when the value in the clock counter 2700 matches the value in the update time register 2701.

Bit 25 represents the generation of an external IF interrupt requesting data communication be initiated with the cash register 311. When the bit value is 1, it signals the generation of the external IF interrupt. In this bit field, a 1 is set when the interrupt signal 2452 received from the RS-232C interface 2417 is asserted.

Bit 24 represents the generation of a key interrupt by the manipulation of a switch. When the bit value is 1, it represents the generation of the key interrupt.

Bits 0 to 9 correspond to switches 0 to 9 of the number key switch 307. Bits 10 and 11 correspond to number key switches "*" and "#," and bits 12 to 15 correspond to function switches F1 to F4. Bits 16 to 18 respectively correspond to the power switch 309, the execution switch 308 and the mode switch 304, and bit 20 corresponds to the hook switch 306. When a bit value is 1, it indicates that a switch corresponding to the bit has been depressed.

Data stored in the RAM 2402 will now be described.

Figure 25:
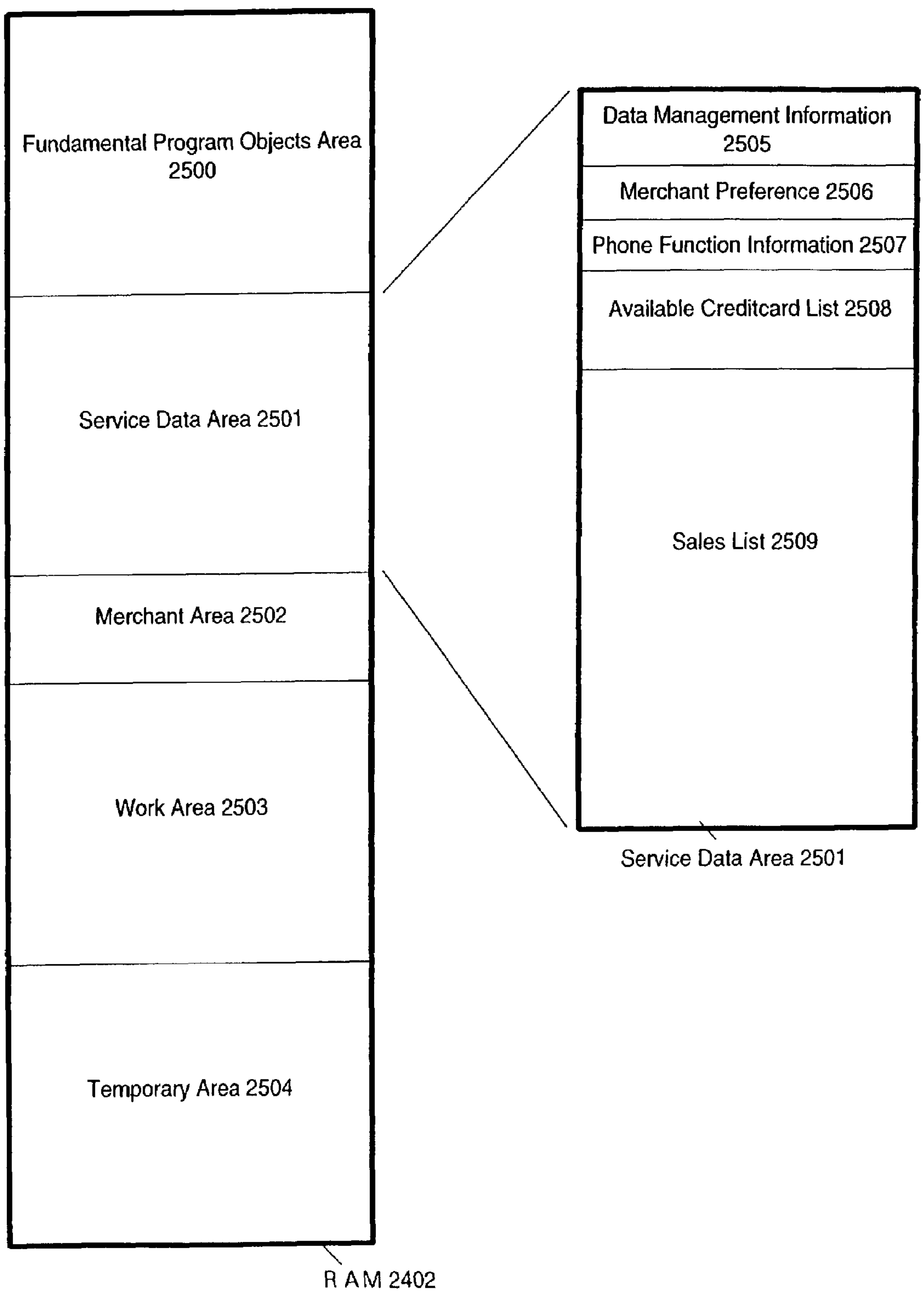
FIG. 25 is a specific diagram showing a RAM map in the credit settlement terminal according to the first embodiment of the present invention.

FIG. 25 is a specific diagram of a RAM map for data stored in the RAM 2402.

The RAM 2402 is constituted by five areas: a fundamental program object area 2500, a service data area 2501, a merchant area 2502, a work area 2503 and a temporary area 2504. In the fundamental program object area 2500 are stored an upgraded module of a program stored in the ROM 2401, and a patch program. The merchant area 2502 is an area that a merchant can freely use, the work area 2503 is a work area that the CPU 2400 employs when executing a program, and the temporary area 2504 is an area in which information received by the credit settlement terminal 300 is stored temporarily.

The service data area 2501 is an area in which is stored ID information for the personal remote credit transaction service, available credit card information, and history information, and the data in this area are managed by the service providing system 102.

The service data area 2501 is constituted by five sub-areas: a data management information area 2505, a merchant preference area 2506, a telephone function area 2507, an available credit card list area 2508 and a sales list area 2509.

The data management information area 2505 is an area in which is stored management information for data stored in the service data area 2501; the merchant preference area 2506 is an area in which is stored preference information for a merchant that concerns the personal remote credit transaction service; the telephone function information area 2507 is an area in which information concerning a digital telephone is stored; the available credit card list area 2508 is an area in which is stored list information for credit cards the merchant can handle; and the sales list area 2509 is an area in which is stored sales information for the personal remote credit transaction service.

The information stored in the service data area 2501 will now be described in detail.

Figure 26:
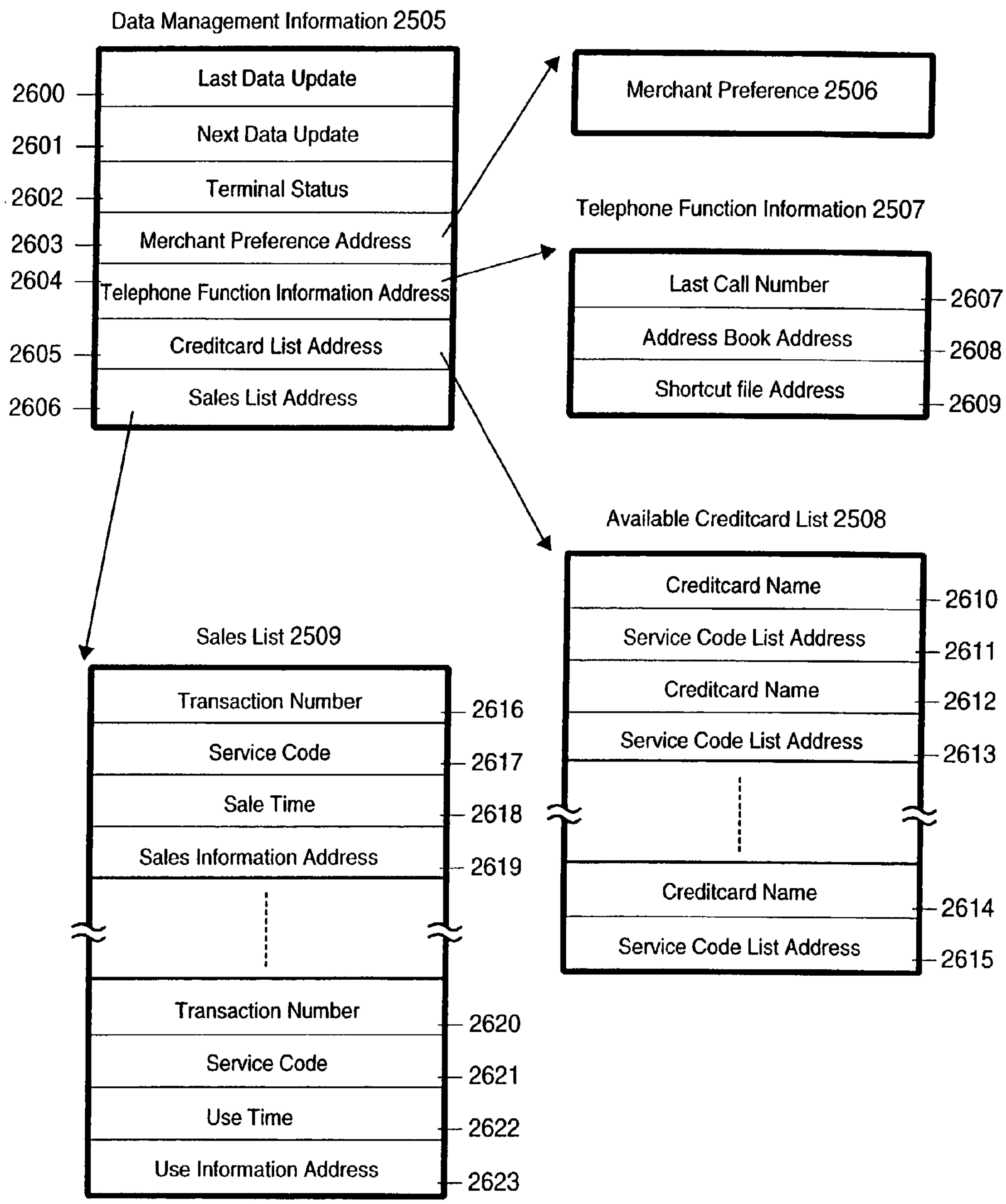
FIG. 26 is a specific diagram showing data stored in a service data area in the credit settlement terminal according to the first embodiment of the present invention.

FIG. 26 is a detailed, specific diagram showing the relationships established for information stored in the service data area 2501.

The data management information 2505 consists of seven types of information: a last data update date 2600, a next data update date 2601, a terminal status 2602, a merchant preference address 2603, a telephone function information address 2604, a credit card list address 2605, and a sales list address 2606.

The last data update date 2600 represents the date on which the service providing system 102 last updated the data in the service data area 2501, and the next data update date 2601 represents the date on which the service providing system 102 will next update the data in the service data area 2501. The credit settlement terminal 300 automatically initiates an update process when the time set according to the next data update date 2501 is reached. The data updating process is a process whereby the service providing system 102 updates the data held in the service data area 2501. The data updating process will be described in detail later.

The terminal status 2602 represents the status of the credit settlement terminal 300; and the merchant preference address 2603, the telephone function information address 2604, the credit card list address 2605, and the sales list address 2606 respectively represent the first addresses for the areas in which are stored the merchant preference information 2506, the telephone function information 2507, the available credit card list 2508, and the sales list 2509.

The telephone function information 2507 consists of three types of information: a last called number 2607, an address book address 2608, and a shortcut file address 2609. The last called number 2607 represents a telephone number for a prior call placed by the merchant, and is employed for the re-dialing of a digital telephone. The address book address 2608 and the short cut file address 2609 respectively represent addresses on the hard disk 2403 at which address book information and a shortcut file are stored.

The available credit card list 2508 includes list information for credit cards that can be handled by a merchant. In the available credit card list 2508, two types of information are entered for each credit card: a credit card name 2610 (2612 or 2614), and a service code list address 2611 (2613 or 2615). The credit card name 2610 (2612 or 2614) represents the name of a credit card that the merchant can handle, and the service code list address 2611 (2613 or 2615) is an address on the hard disk 2403 at which is stored a service code list that shows the types of services that can be provided by the merchant when the credit card is used.

The sales list 2509 is used to store sales information for the personal remote credit transaction service. In the sales list 2509, four types of information are stored for one personal remote credit transaction service: a transaction number 2616 (2620), a service code 2617 (2621), a sale time 2618 (2622), and a sales information address 2619 (2623).

The transaction number 2616 (2620) uniquely represents a deal with the user, and is issued by the credit settlement terminal 300 when it generates the payment offer response 609. The service code 2617 (2621) is a code number that indicates the type of credit card service that is provided for the user. The sale time 2618 (2622) is the time at which the personal remote credit transaction service was provided, and the sales information address 2619 (2623) is an address at which a clearing confirmation notification is stored.

At the sales information address 2619 (2623) is stored a local address, which is an address on the hard disk 2403, for a remote address that is an address entered in the merchant information server 403 of the service providing system 102. When a remote address is stored at the sales information address 2619 (2623), and when the merchant accesses the sales information, the credit settlement terminal 300 downloads the sales information from the service providing system 102 to the temporary area 2504 and displays it on the LCD 302.

The address stored at the sales information address 2619 (2623) is also determined by the service providing system 102. As part of the data updating process, the sale times for the individual sales information items are compared, and a local address is assigned to the sales information for the latest sale time. When there is adequate on the hard disk 2403, all the sales information addresses can be local addresses.

The process performed by the CPU 2400 will now be described.

Figure 28A:
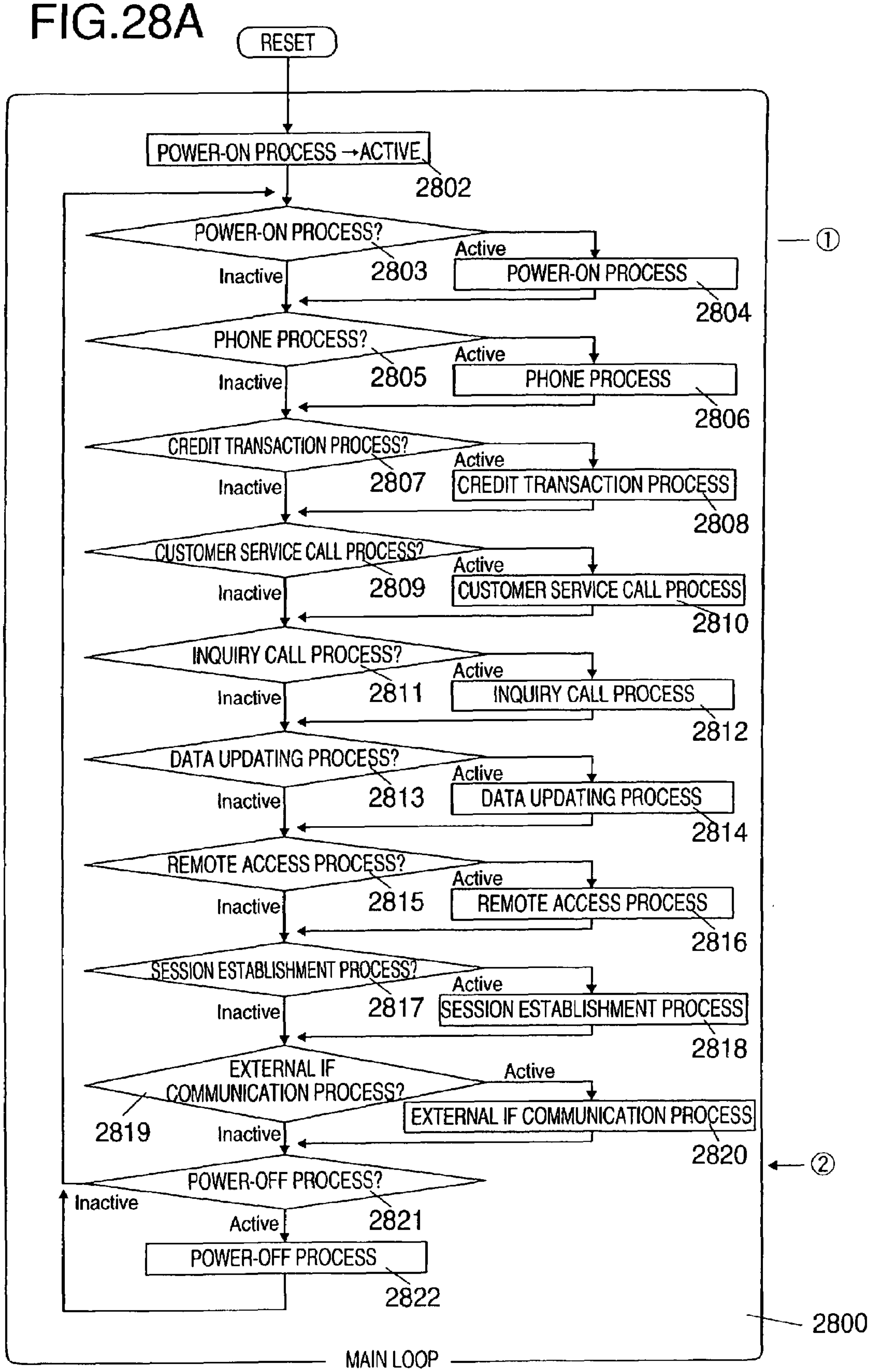
FIG. 28A is a flowchart for the processing performed by a CPU in the credit settlement terminal according to the first embodiment of the present invention.
Figure 28B:
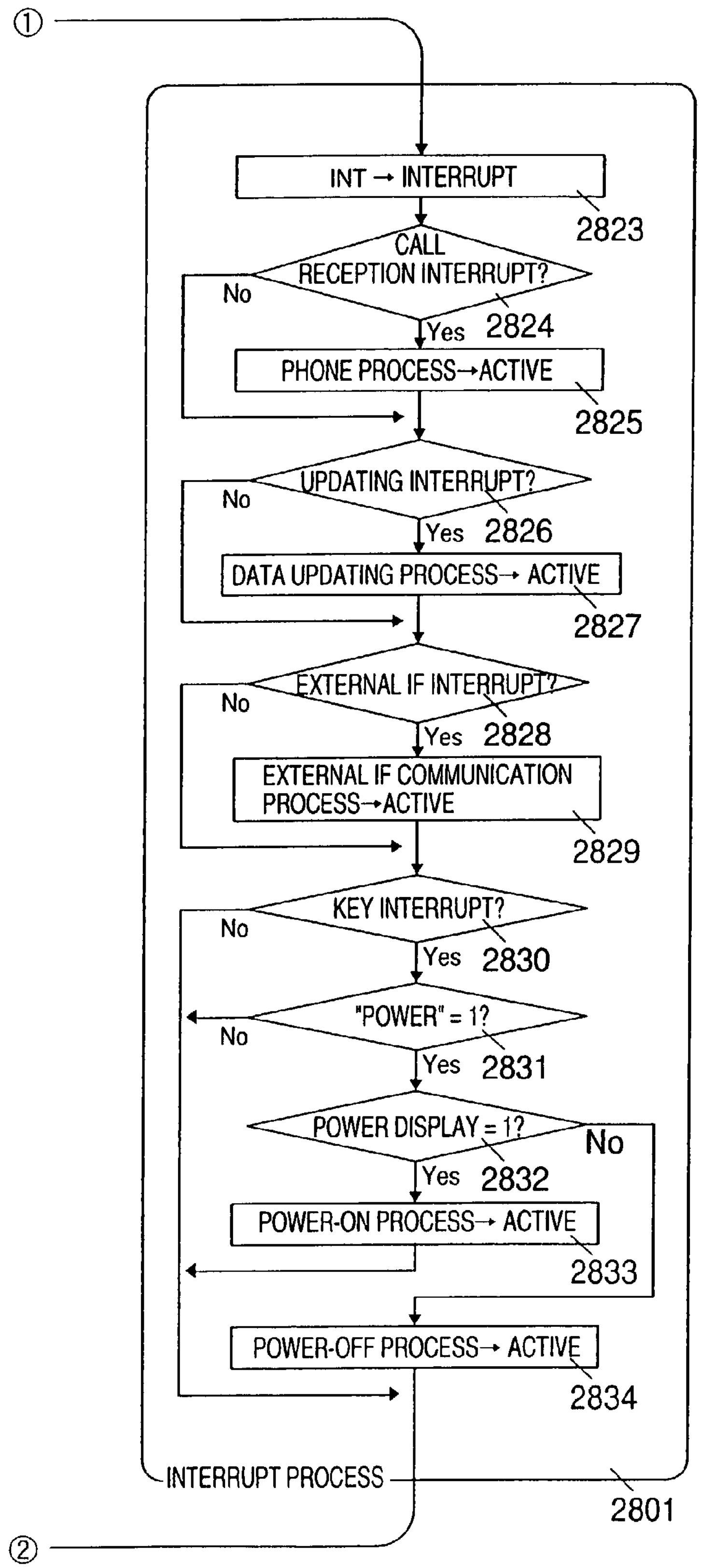
FIG. 28B is a partial flowchart for the processing that follows the processing shown in FIG. 28A.

FIGS. 28A and 28B are conceptual flowcharts for the processing performed by the CPU 2400.

As is shown in FIGS. 28A and 28B, the processing performed by the CPU 2400 can be roughly sorted into ten processes, and an interrupt process 2801.

The ten processes area power-ON process, a telephone function process, a credit settlement processing, a customer service call process, an inquiry call process, a data updating process, a remote access process, a session establishment process, an external IF communication process, and a power-OFF process, which are executed in a main loop 2800. For each process, a corresponding word field indicating the status of the process exists in the RAM 2402, and the CPU 2400 performs the process in accordance with the value of the process status.

The power-ON process is a process in which the initialization is performed when the power switch is turned on by the merchant. The telephone function process is a process in a digital telephone mode. The credit settlement processing is a process in a credit transaction mode. The customer service call process is a process for handing a customer service call and the inquiry call process is a process for handing an inquiry call. The data updating process is a process for updating data. The remote access process is a process for accessing data in the merchant information server 403 of the service providing system 102. The session establishment process is a process for establishing a communication session with the service providing system 102. The external IF communication process is a process for exchanging data with the cash register 311. The power-OFF process is a process whereby the end process is performed when the power switch is turned off by the merchant.

In FIGS. 28A and 28B, when the credit settlement terminal 300 is reset, program control advances to step 2802, where at the CPU 2400 renders the power-ON process active.

At step 2803, a check is performed to determine whether the power-ON process is active. When the power-ON process is inactive, program control moves to step 2805. When the power-ON process is active, program control goes to step 2804, where at the power-ON process is performed for a specified period of time, and program control thereafter moves to step 2805.

At step 2805, a check is performed to determine whether the telephone function process is active. When the telephone function process is inactive, program control moves to step 2807. When the telephone function process is active, program control goes to step 2806, where at the telephone function process is performed for a specified period of time, and program control thereafter moves to step 2807.

At step 2807, a check is performed to determine whether the credit settlement processing is active.

When the credit settlement processing is inactive, program control moves to step 2809. When the credit settlement processing is active, program control goes to step 2808, where at the credit settlement processing is performed for a specified period of time, and program control thereafter moves to step 2809.

At step 2809, a check is performed to determine whether the customer service call process is active.

When the customer service call process is inactive, program control moves to step 2811. When the customer service call process is active, program control goes to step 2810, where at the customer service call process is performed for a specified period of time, and program control thereafter moves to step 2811.

At step 2811, a check is performed to determine whether the inquiry call process is active. When the inquiry call process is inactive, program control moves to step 2813. When the inquiry call process is active, program control goes to step 2812, where at the inquiry call process is performed for a specified period of time, and program control thereafter moves to step 2813. At step 2813, a check is performed to determine whether the data updating process is active. When the data updating process is inactive, program control moves to step 2815. When the data updating process is active, program control goes to step 2814, where at the data updating process is performed for a specified period of time, and program control thereafter moves to step 2815.

At step 2815, a check is performed to determine whether the remote access process is active. When the remote access process is inactive, program control moves to step 2817. When the remote access process is active, program control goes to step 2816, where at the remote access process is performed for a specified period of time, and program control thereafter moves to step 2817. At step 2817, a check is performed to determine whether the session establishment process is active. When the session establishment process is inactive, program control moves to step 2819. When the session establishment process is active, program control goes to step 2818, where at the session establishment process is performed for a specified period of time, and program control thereafter moves to step 2819.

At step 2819, a check is performed to determine whether the external IF communication process is active. When the external IF communication process is inactive, program control moves to step 2821. When the external IF communication process is active, program control goes to step 2820, where at the backup process is performed for a specified period of time, and program control thereafter moves to step 2821.

At step 2821, a check is performed to determine whether the power-OFF process is active. When the power-OFF process is active, program control goes to step 2822, where at the power-OFF process is performed. When the power-OFF process is inactive, program control returns to step 2803.

When the interrupt signal 2418 is asserted to the CPU 2400, it performs the interrupt process 1901 and then returns to the process of the main loop 2800.

In the interrupt process 2801, first, at step 2823 the CPU 2400 reads the interrupt register (INT) 2702 and copies them to the word interrupt in the work area 2503 of the RAM 2402. The interrupt register (INT) 2702 read by the CPU 2400 are echo-reset.

At step 2824, the interrupt bit value 28 is employed to determine whether the interrupt 2418 is a reception interrupt. When the interrupt 2418 is not a reception interrupt (interrupt (bit28)=0), program control advances to step 2826. When the interrupt 2418 is a reception interrupt (interrupt (bit28)=1), program control moves to step 2825, where at the status of the wireless telephone process is set to active. Program control thereafter moves to step 2826.

At step 2826, the interrupt bit value 26 is employed to determine whether the interrupt 2418 is an update interrupt. When the interrupt 2418 is not an update interrupt (interrupt (bit26)=0), program control advances to step 2828. When the interrupt 2418 is an update interrupt (interrupt (bit26)=1), program control moves to step 2827, where at the status of the data updating process is set to active. Program control thereafter moves to step 2828.

At step 2828, the interrupt bit value 25 is employed to determine whether the interrupt 2418 is an external IF interrupt. When the interrupt 2418 is not an external IF interrupt (interrupt (bit25)=0), program control advances to step 2830. When the interrupt 2418 is an external IF interrupt (interrupt (bit25)=1), program control moves to step 2829, where at the status of the backup process is set to active. Program control thereafter moves to step 2830.

At step 2830, the interrupt bit value 24 is employed to determine whether the interrupt 2418 is a key interrupt. When the interrupt 2418 is not a key interrupt (interrupt (bit24)=0), the interrupt process is terminated and program control returns to the main loop 2800. When the interrupt 2418 is a key interrupt (interrupt (bit24)=1), program control moves to step 2831.

At step 2831, the "power" bit value (bit 16) of the interrupt is examined. When the bit value is 0, the interrupt process is terminated and program control returns to the main loop 2800. When the bit value is 1, it is assumed that the power switch has been manipulated and program control moves to step 2832.

At step 2832, the "power display" bit value (bit 31) of the interrupt is examined. When the bit value is 0, it is assumed that the power-OFF operation has been performed, and program control goes to step 2834. When the bit value is 1, it is assumed that the power-ON operation has been performed, and program control moves to step 2833.

At step 2833, the status of the power-ON process is set to active, and the interrupt process is terminated. Program control thereafter returns to the main loop 2800.

At step 2834, the status of the power-OFF process is set to active, and the interrupt process is terminated. Program control thereafter returns to the main loop 2800.

In the interrupt process 2801, the process the status of which has been set to active returns to the main loop 2800, and is performed therein.

The information stored in the user information server 402 of the service providing system 102 will now be explained.

Figure 29:
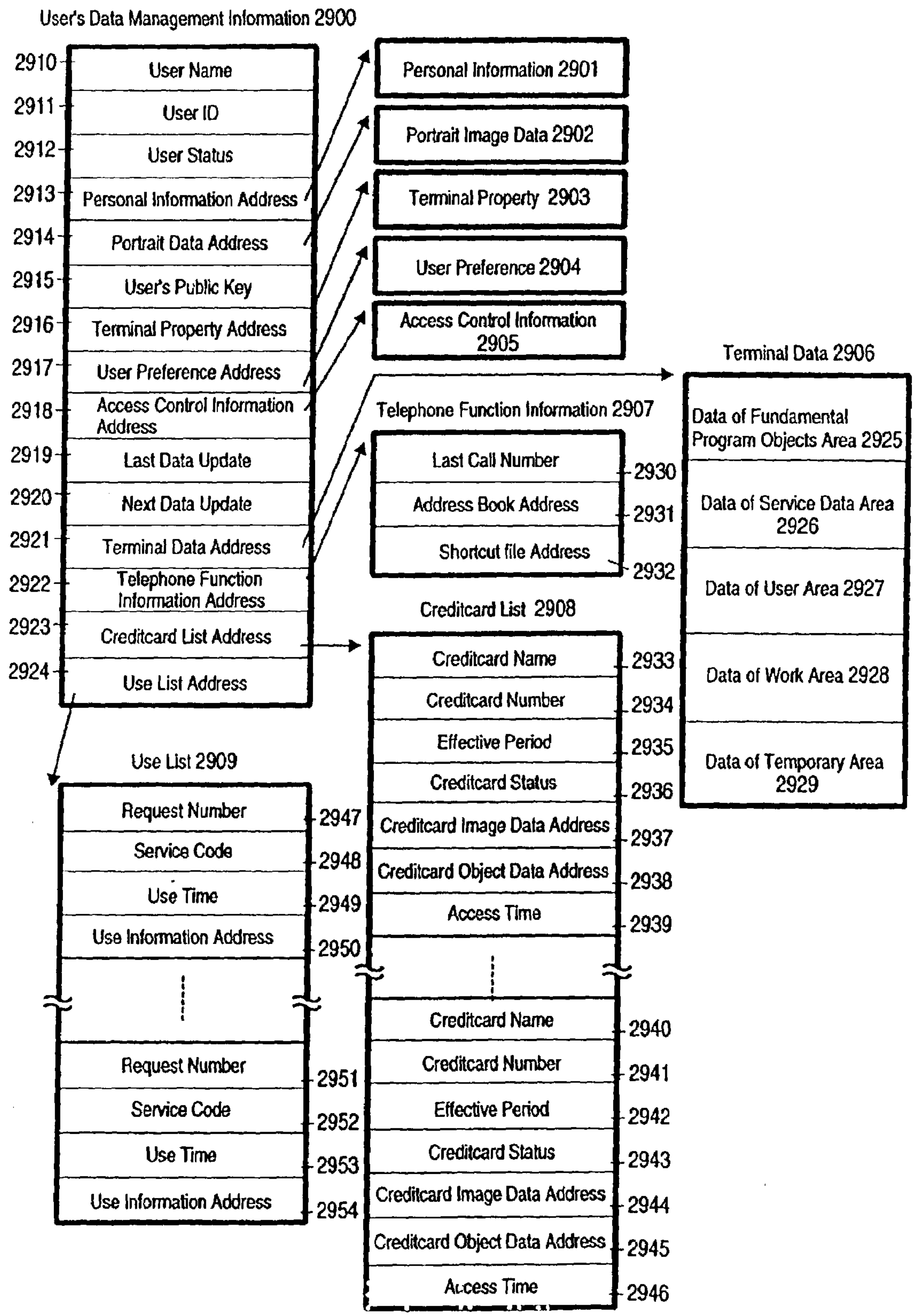
FIG. 29 is a specific diagram showing data that are stored for individual users in a user information server in a service providing system according to the first embodiment of the present invention.

FIG. 29 is a specific diagram showing information stored for each user in the user information server 402.

The user information server 402 stores ten types of information for each user: user's data management information 2900, personal information 2901, portrait image data 2902, a terminal property 2903, user preference 2904, access control information 2905, terminal data 2906, telephone function information 2907, a credit card list 2908 and a use list 2909. The user's data management information 2900 is management information for data to be stored for each user in the user information server 402.

The personal information 2901 is information concerning a user, such as the age, the date of birth, occupation, account number and contents of a contract, and one part of this information corresponds to the personal information 1606 of the personal credit terminal 100.

The portrait data 2902 are data for the portrait of a user, and the terminal property 2903 is attribute information of the personal credit terminal 100, such as the model number, the serial number, the memory capacity of a RAM and the version of a program stored.

The user preference 2904 is preference information concerning the personal remote credit transaction service, and corresponds to the user preference 1608 in the personal credit terminal 100.

The access control information 2905 is information set by the user concerning the access control for a customer service call; the terminal data 2906 are RAM data in the personal credit terminal 100; the telephone function information 2907 is information concerning a digital wireless telephone, and corresponds to the telephone function information 1609 of the personal credit terminal 100.

The credit card list 2908 is list information for credit cards registered by the user, and the use list 2909 is use history information for the personal remote credit transaction service.

The user's data management information 2900 consists of 15 types of information: a user name 2910, a user ID 2911, a user status 2912, a personal information address 2913, a portrait data address 2914, a user's public key 2915, a terminal property address 2916, a user preference address 2917, an access control information address 2918, a last update date 2919, a next update date 2920, a terminal data address 2921, a telephone function information address 2922, a credit card list address 2923 and a use list address 2924.

The user status 2912 indicates the status of the personal credit terminal 100, and corresponds to the terminal status 1702 of the personal credit terminal 100.

The last update date 2919 indicates the last date when the data in the service data area 1601 of the personal credit terminal 100 were updated; and the next update date 2920 indicates the date when the data in the service data area 1601 will be updated next.

These dates correspond to the last update date 1700 and the next update date 1701 of the personal credit terminal 100.

The personal information address 2913, the portrait data address 2914, the terminal property address 2916, the user preference address 2917, the access control information address 2918, the terminal data address 2921, the telephone information address 2922, the credit card list address 2923 and the use list address 2924 indicate addresses in the user information server 402 at which a restored respectively the personal information 2901, the portrait image data 2902, the terminal property 2903, the user preference 2904, the access control information 2905, the terminal data 2906, the telephone function information 2907, the credit card list 2908 and the use list 2909.

The terminal data 2906 are data in the RAM 1502 of the personal credit terminal 100 when the updating process was previously performed, and are used for data comparison in the next data updating process and also employed as backup data.

The credit card list 2908 and the use list 2909 correspond to the credit card list 1610 and the use list 1611 of the personal credit terminal 100. An image data address 2944, an object data address 2945 and use information address 2954 are addresses in the user information server 402.

The information stored in the merchant information server 403 of the service providing system 102 will now be explained.

Figure 30:
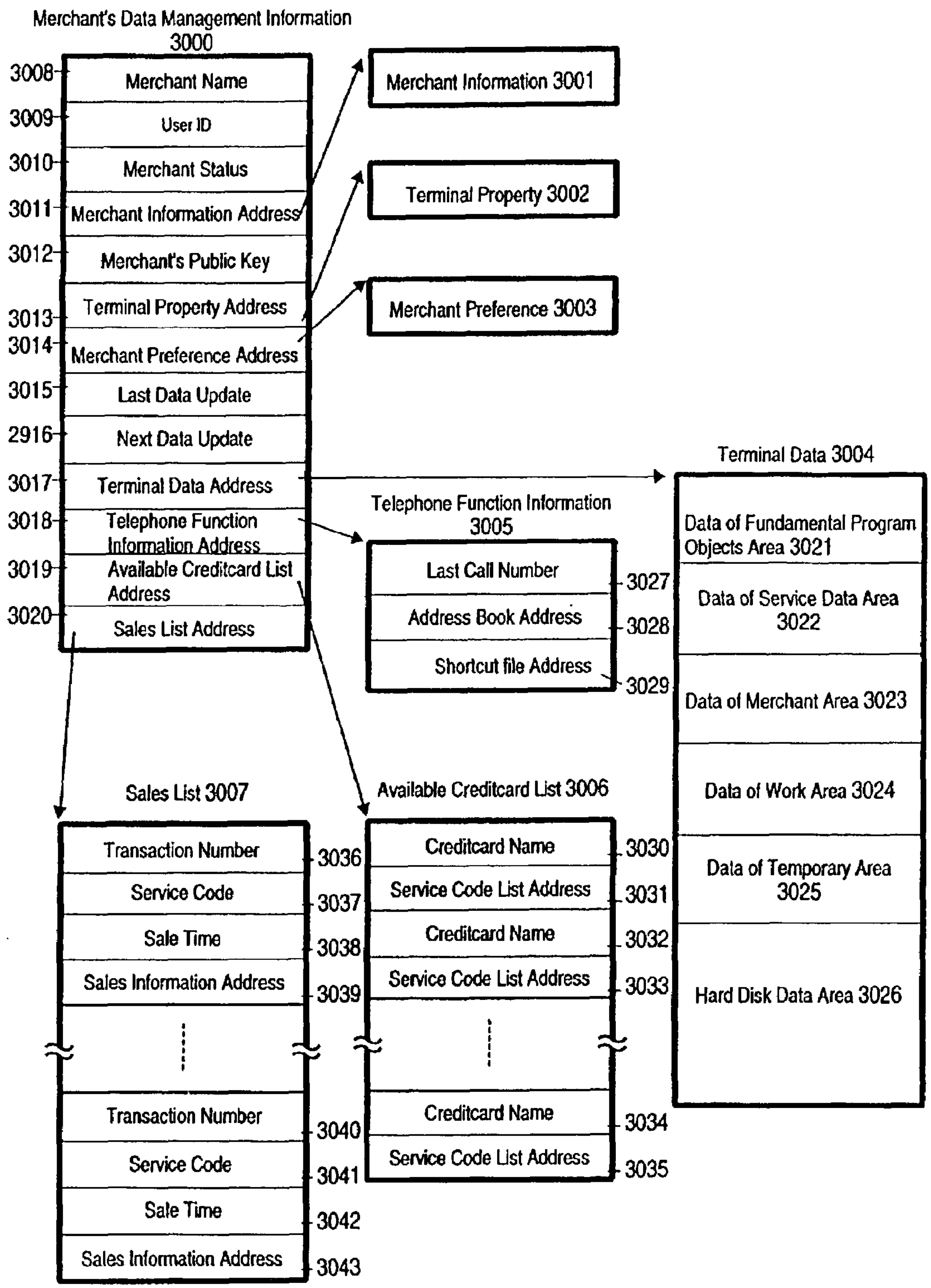
FIG. 30 is a specific diagram showing data that are stored for individual merchants in a merchant information server in the service providing system according to the first embodiment of the present invention.

FIG. 30 is a specific diagram showing information stored for each merchant in the merchant information server 403.

The merchant information server 403 stores eight types of information for each merchant: merchant's data management information 3000, merchant information 3001, a terminal property 3002, merchant preference 3003, terminal data 3004, telephone function information 3005, an available credit card list 3006 and a sales list 3007. The merchant's data management information 3000 is management information for data to be stored for each merchant in the merchant information server 403.

The merchant information 3001 is information concerning a merchant, such as an address, an account number and the contents of a contract, and the terminal property 3002 is attribute information of the credit settlement terminal 300, such as the model number, the serial number, the memory capacity of a RAM, the hard disk memory capacity and the version of a program stored.

The merchant preference 3003 is preference information concerning the personal remote credit transaction service, and corresponds to the merchant preference 2506 in the credit settlement terminal 300.

The terminal data 3004 are data in the RAM 2402 and the hard disk 2403 in the credit settlement terminal 300; the telephone function information 3005 is information concerning a digital telephone, and corresponds to the telephone function information 2507 of the credit settlement terminal 300.

The available credit card list 3006 is list information for credit cards the merchant can handle, and the sales list 3007 is sales history information for the personal remote credit transaction service.

The merchant's data management information 3000 consists of 13 types of information: a merchant name 3008, a merchant ID 3009, a merchant status 3010, a merchant information address 3011, a merchant's public key 3012, a terminal property address 3013, a merchant preference address 3014, a last update date 3015, a next update date 3016, a terminal data address 3017, a telephone function information address 3018, an available credit card list address 3019 and a sales list address 3020.

The merchant status 3010 indicates the status of the credit settlement terminal 300, and corresponds to the terminal status 2602 of the credit settlement terminal 300.

The last update date 3015 indicates the last date when the data in the service data area 2501 of the credit settlement terminal 300 were updated; and the next update date 3016 indicates the date when the data in the service data area 2501 will be updated next. These dates correspond to the last update date 2600 and the next update date 2601 of the credit settlement terminal 300.

The merchant information address 3011, the terminal property address 3013, the merchant preference address 3014, the terminal data address 3017, the telephone information address 3018, the credit card list address 3019, and the sales list address 3020 indicate addresses in the merchant information server 403 at which are stored respectively the merchant information 3001, the terminal property 3002, the merchant preference 3003, the terminal data 3004, the telephone function information 3005, the credit card list 3006 and the sales list 3007.

The terminal data 3004 are data in the RAM 2402 and on the hard disk 2403 of the credit settlement terminal 300 when the updating process was previously performed, and are used for data comparison in the next data updating process and also employed as backup data.

The credit card list 3006 and the sales list 3007 correspond to the credit card list 2508 and the sales list 2509 of the credit settlement terminal 300. A sales information address 3043 is an address in the merchant information server 403.

The information stored in the settlement processor information server 404 of the service providing system 102 will now be explained.

Figure 31:
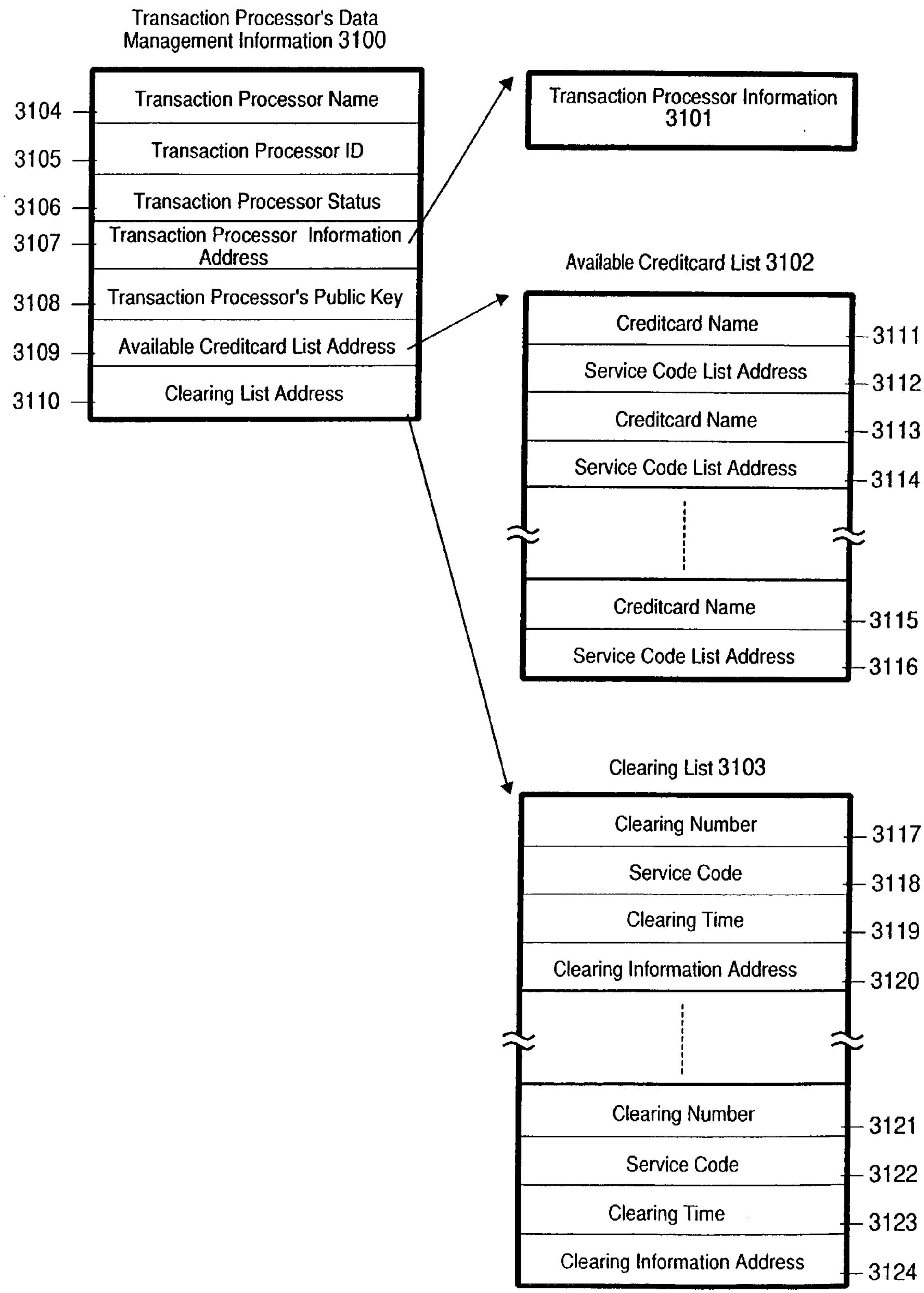
FIG. 31 is a specific diagram showing the data that are stored for each settlement processing house or settlement processor in a settlement processing house or settlement processor information server in the service providing system according to the first embodiment of the present invention.

FIG. 31 is a specific diagram showing information stored for each settlement processor in the settlement processor information server 404.

The settlement processor information server 404 stores four types of information for each settlement processor: settlement processor's data management information 3100, settlement processor information 3101, an available credit card list 3102 and a clearing list 3103.

The settlement processor's data management information 3100 is management information for data to be stored for each settlement processor in the settlement processor information server 404. The settlement processor information 3101 is information concerning a settlement processor, such as an address, an account number and the contents of a contract, and the available credit card list 3102 is list information for credit cards the settlement processor can handle, and the clearing list 3103 is clearing history information for the personal remote credit transaction service.

The settlement processor's data management information 3100 consists of seven types of information: a settlement processor name 3104, a settlement processor ID 3105, a settlement processor status 3106, a settlement processor information address 3107, a settlement processor's public key 3108, an available credit card list address 3109 and a clearing list address 3110.

The settlement processor status 3106 indicates the service status in the settling process of the settlement system 103. The settlement processor information address 3107, the available credit card list address 3109, and the clearing list address 3102 indicate addresses in the settlement processor information server 404 at which are stored respectively the settlement processor information 3101, the credit card list 3102 and the clearing list 3103.

The available credit card list 3102 includes list information for credit cards that can be handled by a settlement processor. In the available credit card list 3102, two types of information are entered for each credit card: a credit-card name 3111 (3113 or 3115) and a service code list address 3112 (3114 or 3116).

The credit card name 3111 (3113 or 3115) represents the name of a credit card that the settlement processor can handle, and the service code list address 3112 (3114 or 3116) is an address of the settlement processor information server 404 in which is stored a service code list that shows the types of services that can be provided using the credit card by the settlement processor.

The clearing list 3103 is used to store sales information for the personal remote credit transaction service.

In the clearing list 3103, four types of information are stored for clearing of one personal remote credit transaction service: a clearing number 3117 (3121), a service code 3118 (3122), a clearing time 3119 (3123) and a clearing information address 3120 (3124).

The clearing number 3117 (3121) uniquely represents the clearing process and is issued by the settlement system 103 when it generates the clearing confirmation notification 620. The service code 3118 (3122) is a code number that indicates the type of a credit card service that is provided for the user. The clearing time 3119 (3123) is the time when the personal remote credit transaction service is cleared, and the clearing information address 3120 (3124) is an address of the settlement processor information server 404 in which is stored a clearing confirmation notification issued by the settlement system 103.

The information stored in the service director information server 401 in the service providing system 102 will now be explained.

FIGS. 32A to 32E are specific diagrams showing information stored in the service director information server 401.

The service director information server 401 stores five types of information: a user list 3200, a merchant list 3201, a settlement processors list 3202, a provided service list 3203 and a settlement processors table 3204.

Figures 32A, 32B:
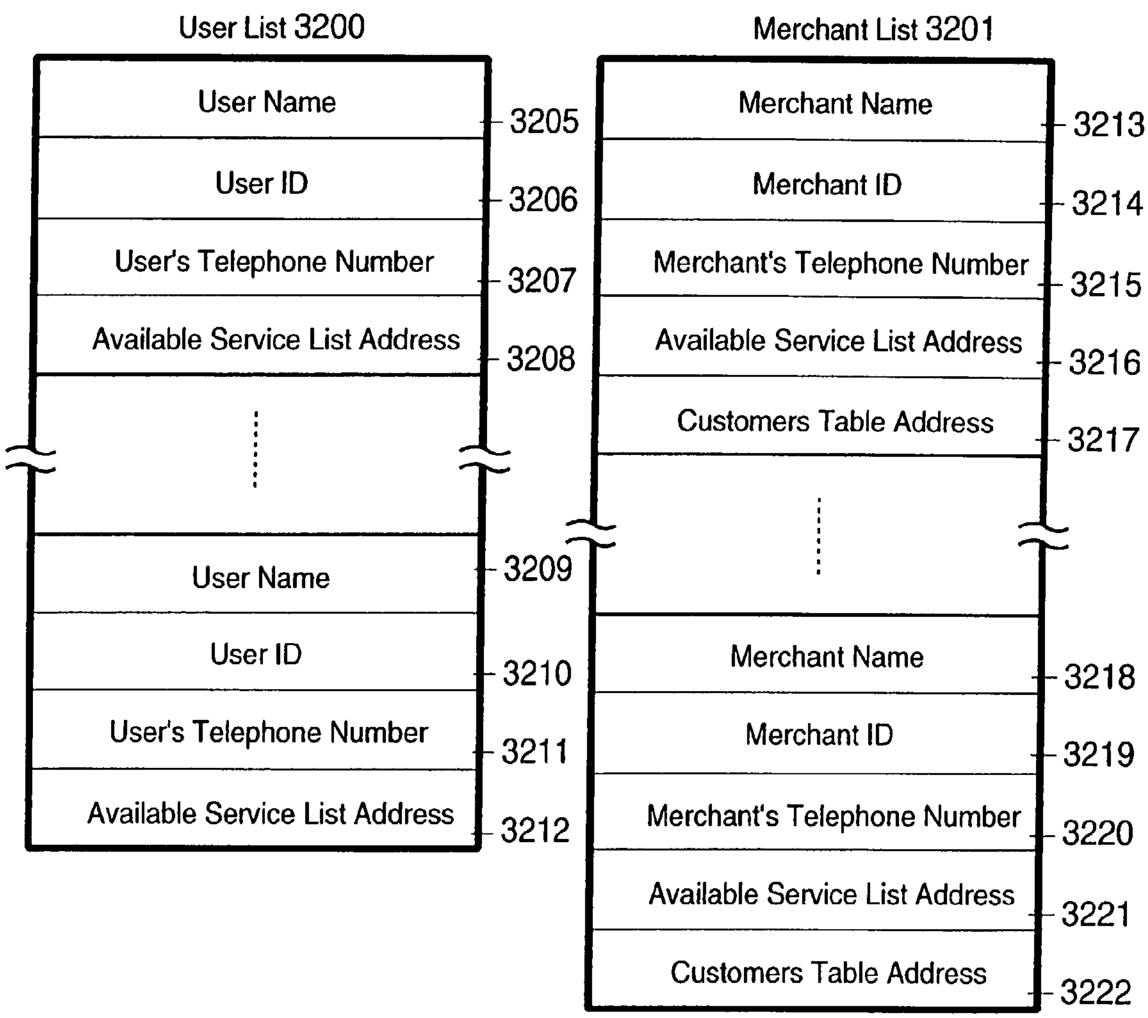
FIGS. 32A to 32E are specific diagrams showing the data that a restored in a service director information server in the service providing system according to the first embodiment of the present invention.
Figure 32C:
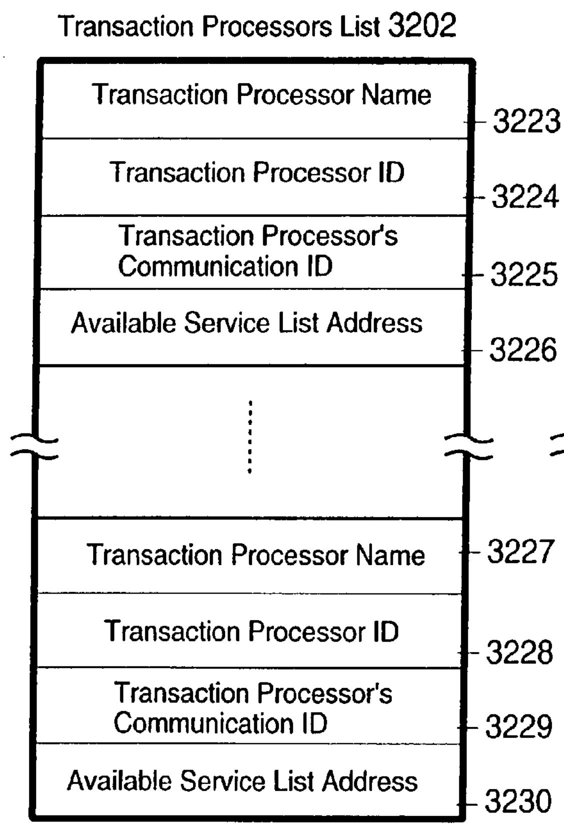
Figure 32D:
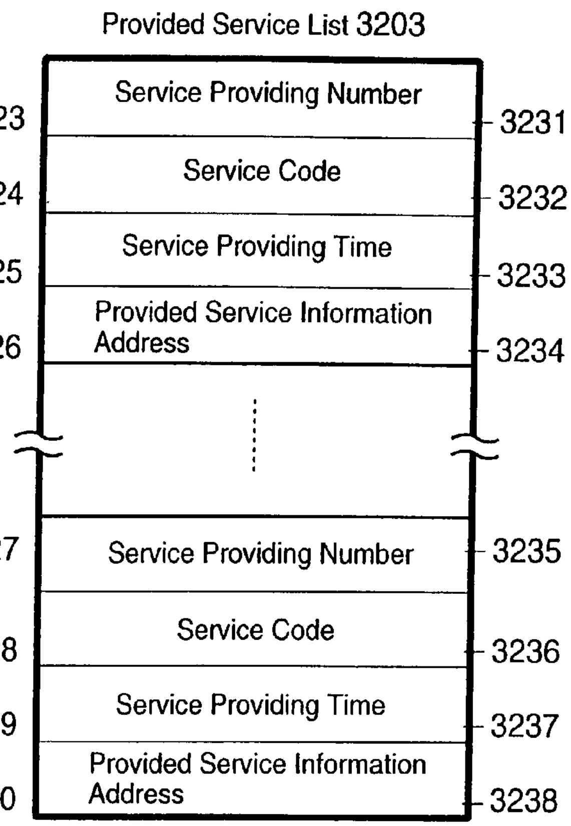
Figure 32E:

The user list 3200 is a list for attribute information of all the users who have made contracts with a service provider; the merchant list 3201 is a list for attribution information of all the merchants who have made a contract with the service provider; the settlement processors list 3203 is a list for attribution information of all the settlement processors that have made a contract with the service provider; the provided service list 3202 is a list for information for service provided through the personal remote credit transaction service; and the settlement processors table 3204 as shown in FIG. 32E is a table in which are entered requests for personal remote credit transaction service by a user and a merchant, and corresponding optimal settlement processors.

In the user list 3200, four types of information are stored for each user: a user name 3205 (3209), a user ID 3206 (3210), a user's telephone number 3207 (3211) and a service list address 3208 (3212).

In the merchant list 3201, five types of information are stored for each merchant: a merchant name 3213 (3218), a merchant ID 3114 (3219), a merchant's telephone number 3215 (3220), an available service list address 3216 (3221) and a customers table address 3217 (3222).

The available service list address 3216 (3221) indicates an address in the service director information server 401 in which is stored a list of service code that the merchant can handle.

The customers table address 3217 (3222) indicates the address in the service director information server 401 in which is stored table information that represents the correspondence of the customer number and the user ID.

In the settlement processors list 3202 four types of information a restored for each settlement processor: a settlement processor name 3223 (3227); a settlement processor ID 3224 (3228), a settlement processor's communication ID 3225, a service list address 3226 (3230)

The settlement processor's communication ID 3225 (3229) is an ID for the settlement system 103 when the service providing system 102 communicates with the settlement system 103 via the digital communication line 111. The service list address 3226 (3230) is an address in the service director information server 401 in which is stored a list of service code that the settlement processor can handle.

In the provided service list 3203 four types of information are stored for one provided service through the personal remote credit transaction service: a service providing number 3231 (3235), a service code 3232 (3236), a service providing time 3233 (3237) and a provided service information address 3234 (3238).

The service providing number 3231 (3235) uniquely represents the process performed by the service providing system 102 to provide one service. The service code 3232 (3236) is a code number indicating the type of a credit card service used by the user. The service providing time 3233 (3237) is the time when the service is provided through the personal remote credit transaction service. The provided service information address 3224 (3238) is an address in the service director information server 401 in which is stored history information for the processes performed by the service providing system 102 to provide one service.

An explanation will now be given for the downloading process performed by the personal credit terminal 100 or the credit settlement terminal 300 when it accesses specific data at a remote address. This process is herein after called a remote access process.

Figure 33A:
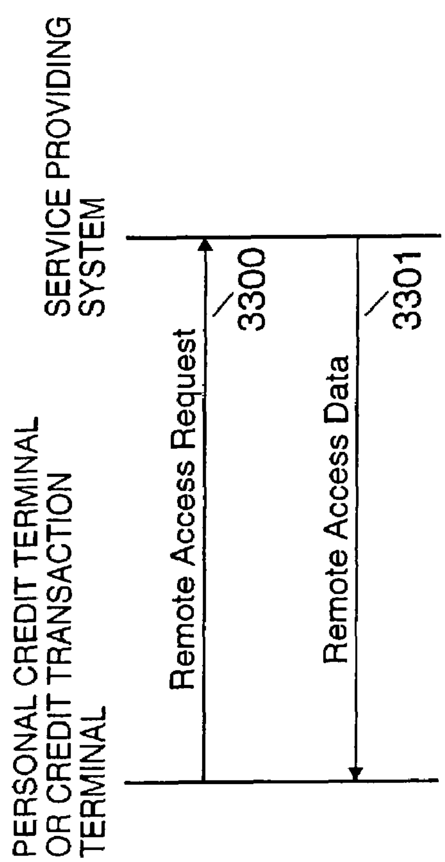
FIG. 33A is a flowchart showing remote access processing according to the first embodiment of the present invention.
Figures 34A, 34B, 34C:
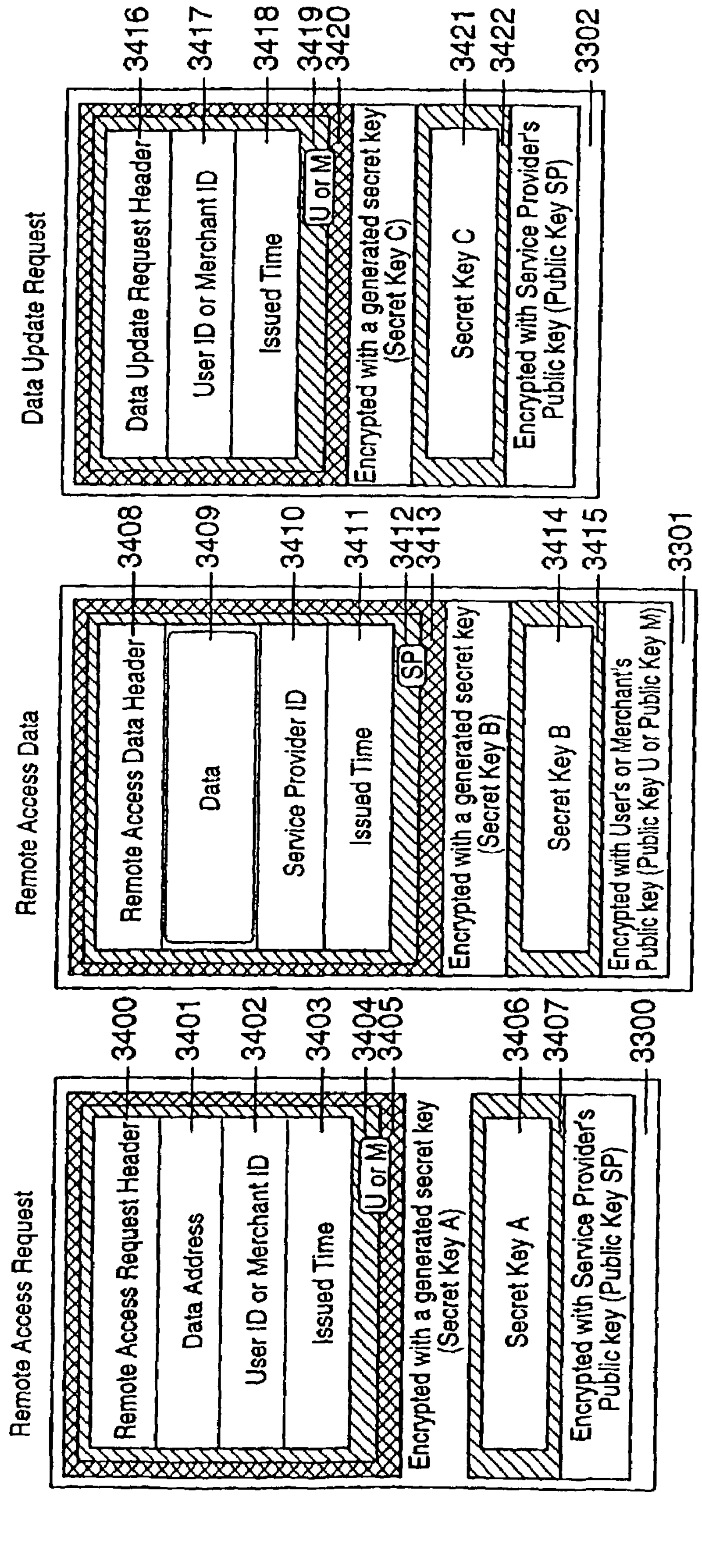
FIG. 34A is a specific diagram showing the data structure for a remote access request according to the first embodiment of the present invention.
FIG. 34B is a specific diagram showing the structure of remote access data according to the first embodiment of the present invention.
FIG. 34C is a specific diagram showing the data structure for a data updating request according to the first embodiment of the present invention.

In FIG. 33A is shown the remote access process and in FIGS. 34A and 34B are shown the contents of messages to be exchanged. When data to be accessed is at the remote address, the personal credit terminal 100 (or the credit settlement terminal 300) generates a remote access request 3300, i.e., a message for requesting the service providing system 102 to access data, and transmits it to the service providing system 102.

As is shown in FIG. 34A, a digital signature 3404 of a user (merchant) is provided for data that consists of a remote access header 3400, which is header information indicating the message is the remote access request 3300; a data address 3401, which indicates a remote address; a user ID (or a merchant ID) 3402; and an issued time 3403, which indicates the date when the remote access request 3300 is issued, and the data are closed to address to the service provider, thereby providing the remote access request 3300.

The service providing system 102 receives the remote access request 3300, decrypts it, examines the digital signature, generates a remote access data message 3301 and transmits it to the personal credit terminal 100 (or the credit settlement terminal 300).

As is shown in FIG. 34B, a digital signature of a service provider is provided for data that consists of a remote access header 3408, which is header information indicating that the message is the remote access data 3301; data that are requested 3409; a service provider ID 3410; and an issued time 3411, which indicates the date when the remote access data 3301 is issued. The data are closed to address to the user (merchant) thereby providing the remote access data 3301.

The personal credit terminal 100 (or the credit settlement terminal 300) receives the remote access data 3301, decrypts it, examines the digital signature, stores it in the temporary area, and accesses the data.

An explanation will now be given for the data updating process performed by the personal credit terminal 100 and the credit settlement terminal 300.

Figure 33B:
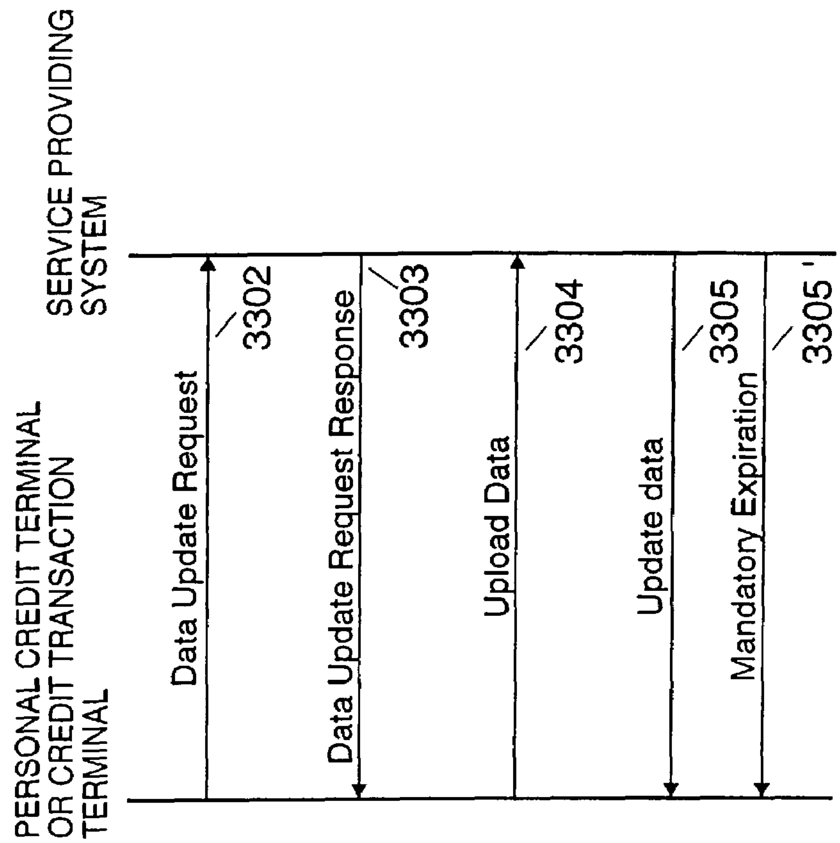
FIG. 33B is a flowchart showing data updating processing according to the first embodiment of the present invention.

In FIG. 33B is shown the data updating process and in FIGS. 34C to 34F and 35 are shown the contents of messages to be exchanged.

The personal credit terminal 100 (or the credit settlement terminal 300) generates a data update request 3302, i.e., a message for requesting the service providing system 102 to update data, and transmits it to the service providing system 102.

As is shown in FIG. 34C, a digital signature of a user (merchant) is provided for data that consists of a data update request header 3416, which is header information indicating the message is the data update request 3302; a user ID (or a merchant ID) 3417; and an issued time 3418, which indicates the date when the data update request 3302 is issued. The data are closed to address to the service provider, thereby providing the data updating request 3302.

The service providing system 102 receives the data update request 3302, decrypts it, examines the digital signature, generates a data update request response 3303, i.e., a message indicating that the system is ready for accepting the request, and transmits it to the personal credit terminal 100 (or the credit settlement terminal 300).

Figures 34D, 34E, 34F:
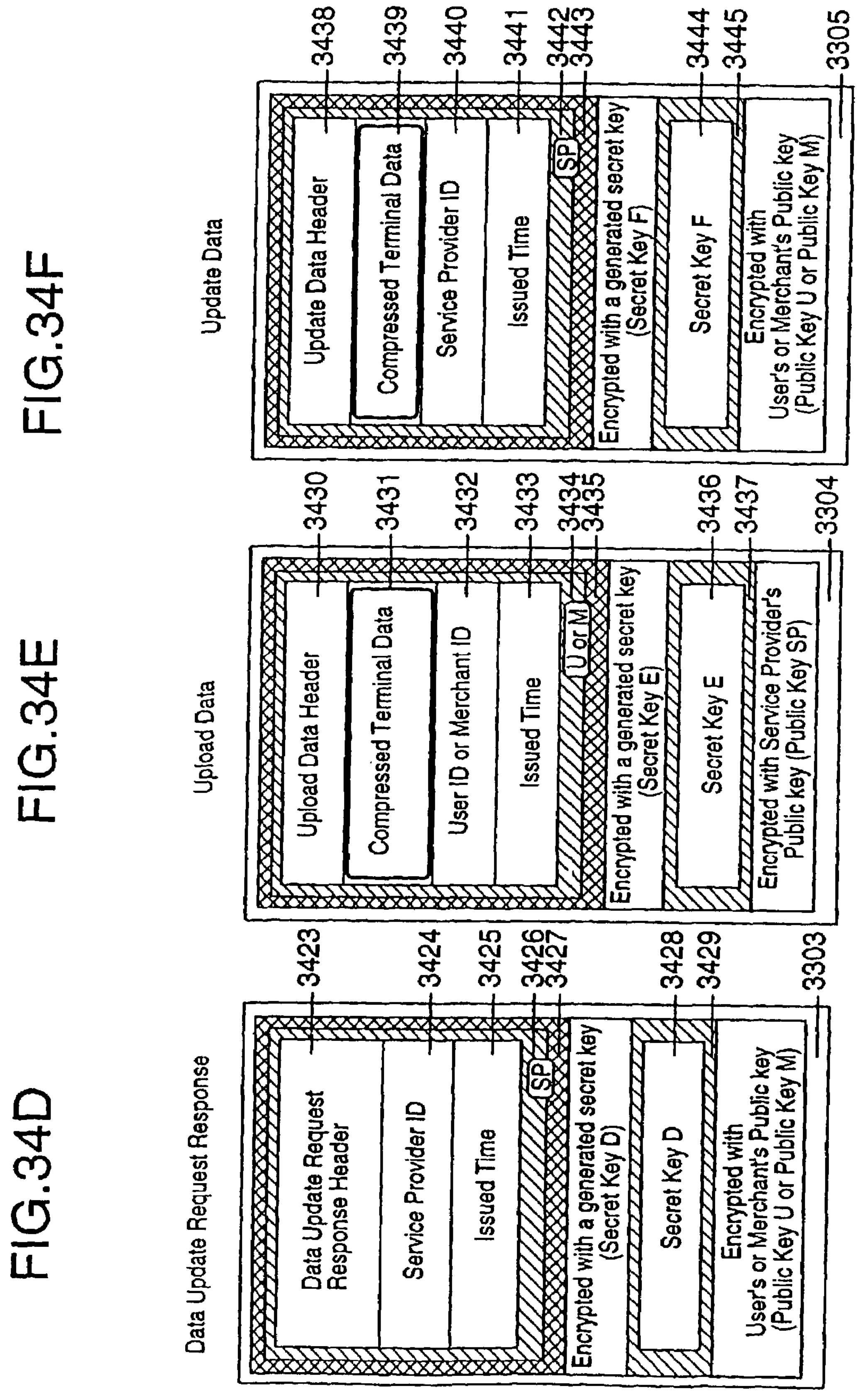
FIG. 34D is a specific diagram showing the data structure for a response to a data updating request according to the first embodiment of the present invention.
FIG. 34E is a specific diagram showing the structure of upload data according to the first embodiment of the present invention.
FIG. 34F is a specific diagram showing the structure of update data according to the first embodiment of the present invention.

As is shown in FIG. 34D, a digital signature of a service provider is provided for data that consists of a data update request response header 3423, which is header information indicating that the message is the data update request response 3303; a service provider ID 3424; and an issued time 3425, which indicates that the date when the data update request response 3303 is issued. The data are closed to address the user (merchant), thereby providing the data update request response 3303.

The personal credit terminal 100 (or the credit settlement terminal 300) receives the data update request response 3303, decrypts it, examines the digital signature, generates upload data 3304, i.e., a message that indicates to upload the data from the RAM 1502 (for the credit settlement terminal 300, the RAM 2402 and the hard disk 2403) to the service providing system 102, and transmits the data 3304 to the service providing system 102.

As is shown in FIG. 34E, a digital signature of a user (a merchant) is provided for data that consists of an upload data header 3430, which is header information indicating that the message is the upload data 3304; terminal data 3431 that are obtained by compressing the data in the RAM 1502 (for the credit settlement terminal 300, the RAM 2402 and the hard disk 2403); a user ID (merchant ID) 3432; and an issued time 3433, which indicates the date when the upload data 3304 is issued. The data are closed to address to the user (merchant), thereby providing the upload data 3304.

The service providing system 102 receives the upload data 3304, decrypts it, examines the digital signature, decompresses the terminal data 3431 and compares the obtained terminal data 3431 with the terminal data 2906 (or the terminal data 3004) in the user information server 402 (or the merchant information server 403).

Then, the service providing system 102 generates new terminal data 2906 (terminal data 3004), the update data 3305, which is a message for updating data in the personal credit terminal 100 (the credit settlement terminal 300), and transits them to the personal credit terminal 100 (the credit settlement terminal 300).

As is shown in FIG. 34F, a digital signature of a service provider is provided for data that consists of an update data header 3438, which is header information indicating that the message is the update data 3305; terminal data 3439 that are obtained by compressing new terminal data; a service provider ID 3440; and an issued time 3441, which indicates the date when the update data 3305 is issued. The data are closed to address to the user (merchant), thereby providing the update data 3305.

The personal credit terminal 100 (the credit settlement terminal 300) receives the update data 3305, decrypts it, examines the digital signature, decompresses the terminal data 3439, and updates the data in the RAM 1502 (for the credit settlement terminal 300, the RAM 2402 and the hard disk 2403).

In order to generate new terminal data, when there is no extra space in the object data area 1601 of the personal credit terminal 100, the service providing system 102 compares the access times for the individual credit cards and assigns a local address to the object data address for a credit card for which the access time is the latest; and compares the use times of the information items and assigns a local address to the use information address for the information for which the use time is the latest. When there is no extra space in the hard disk 2403 of the credit settlement terminal 300, the service providing system 102 compares the use times for the sales information and assigns a local address to the sales information address for sale information for which the use time is the latest.

When the service providing system 102 compares the upload data with the terminal data and finds the illegal alteration of the data, the service providing system 102 generates, instead of the update data 3305, a mandatory expiration command 3505' that is a message for halting the function of the personal credit terminal 100 (or the credit settlement terminal 300), and transmits the command 3305' to the personal credit terminal 100 (the credit settlement terminal 300).

Figure 35:
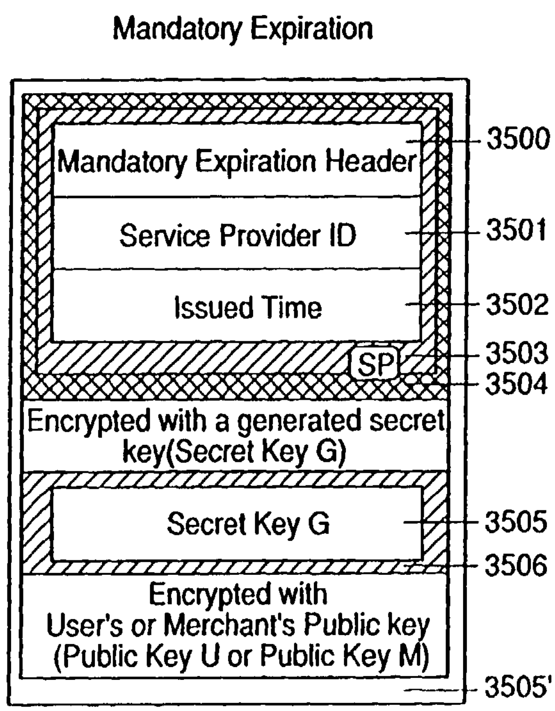
FIG. 35 is a specific diagram showing the data structure for a mandatory expiration command according to the first embodiment of the present invention.

As is shown in FIG. 35, a digital signature of a service provider is provided for data that consists of a mandatory expiration header 3500, which is header information indicating that the message is the mandatory expiration command 3505'; a service provider ID 3501; and an issued time 3502, which indicates that the date when the mandatory expiration command 3305' is issued. The data are closed to address to the user (merchant) thereby providing the mandatory expiration command 3505'.

Upon receipt of the mandatory expiration command 3505', the personal credit terminal 100 (the credit settlement terminal 300) decrypts it, examines the digital signature, changes the terminal status 1702 (or the terminal status 2602) to "use disabled." As a result, the use of the personal credit terminal 100 (the credit settlement terminal 300) is inhibited.

Further, the personal credit terminal 100 employs the backup processor to perform the backup process in the same manner as for the data updating process. When the update data 3305 are received and the data in the RAM 1502 are updated, the terminal status 1702 is changed to "writing disabled" to inhibit the input new data to the RAM until the battery capacity becomes fully sufficient.

The contents of data exchanged between devices in the settlement processing will now be described in detail.

In FIGS. 36A to 36F, 37A to 37C, and 38A and 38B are shown the contents of data to be exchanged in the settlement processing.

First, when the user conducts the payment operation 607, the personal credit terminal 100 generates a payment offer 608, and transmits it to the credit settlement terminal 300 through infrared communication.

Figure 36C:
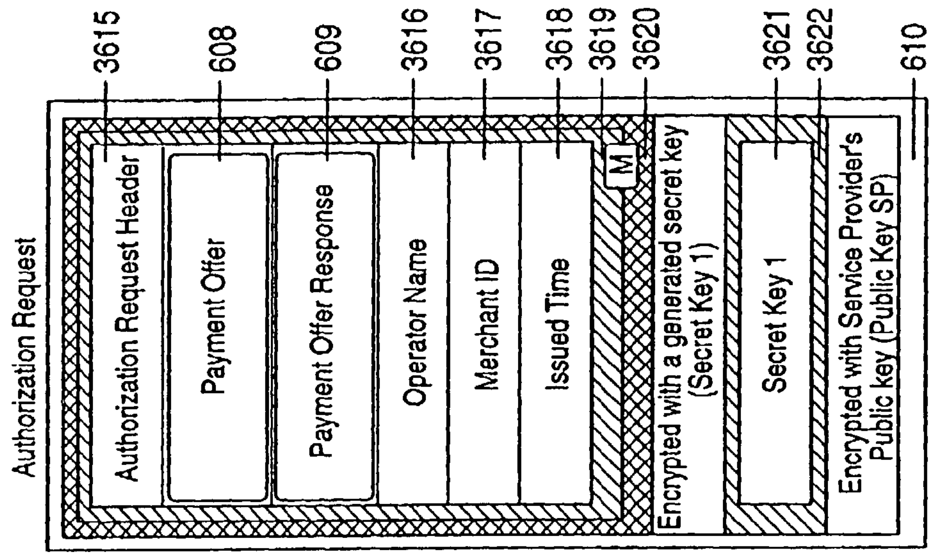
FIG. 36C is a specific diagram showing the data structure for an authorization request according to the first embodiment of the present invention.
Figure 36B:
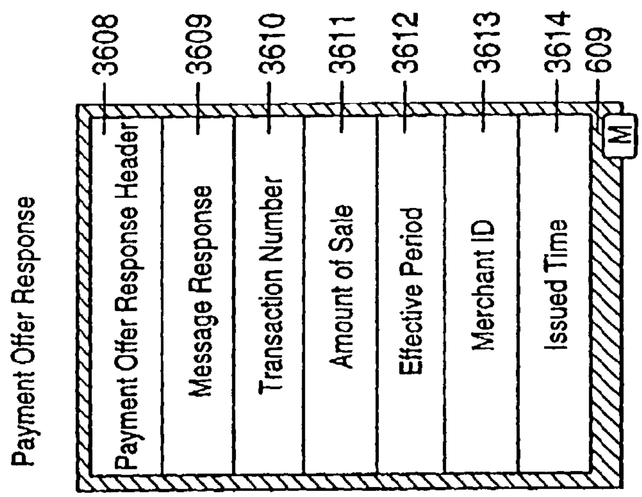
FIG. 36B is a specific diagram showing the data structure for a payment offer response according to the first embodiment of the present invention.
Figure 36A:
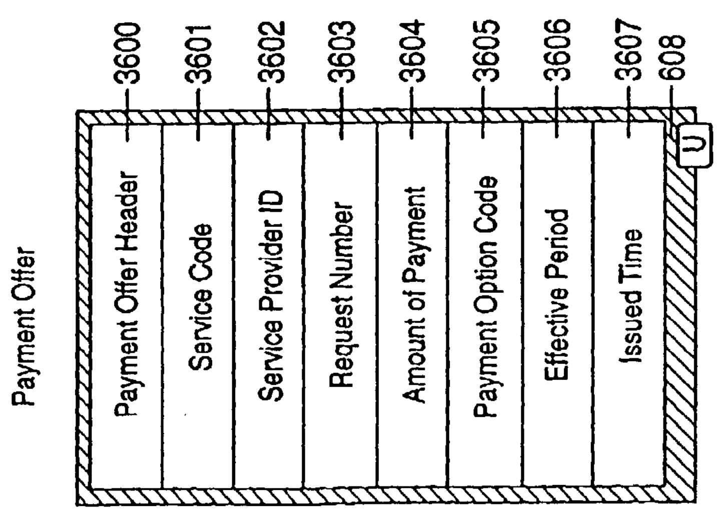
FIG. 36A is a specific diagram showing the data structure for a payment offer according to the first embodiment of the present invention.

As is shown in FIG. 36A, for the payment offer 608, a digital signature of a user is provided for data that consists of a payment offer header 3600, which is header information indicating that the message is the payment offer 608; a service code 3601; a service provider ID 3602; a request number 3603, which is arbitrarily generated as a number that uniquely represents the dealing with a merchant; an amount of payment 3604, which is entered by the user; a payment option code 3605, which indicates the payment option input by the user; an effective period 3606 of the payment offer 608; and an issued time 3607, which indicates the date when the payment offer 608 was issued. Upon receipt of the payment offer 608, the credit settlement terminal 300 compares the amount of payment 3604 with an amount of sale, determines whether the payment option 3605 can be employed, transmits a payment offer response 609 to the personal credit terminal 100 via infrared communication, and generates an authorization request 610 and transmits it to the service providing system 102 through digital telephone communication.

As is shown in FIG. 36B, for the payment offer response 609, a digital signature of a merchant is provided for data that consists of a payment offer response header 3608, which is header information indicating that the message is the payment offer response 609; a response message 3609, which is displayed on the LCD 203 when the personal credit terminal 100 receives the payment offer response 609; a transaction number 3610, which is arbitrarily generated as a number that uniquely represents the dealing with the user; an amount of sale 3611; an effective period 3612 of the payment offer response 609; a merchant IF 3613; and an issued date 3614, which indicates the date when the payment offer response 609 was issued. The response message 3609 is a text message set in accordance with the merchant option, which is not always set.

As is shown in FIG. 36D, a digital signature of a merchant is provided for data that consists of a payment request header 3623, which is header information indicating that the message is the payment request 613; the payment offer 608; the payment offer response 609; a user ID 3624; and an issued time 3625, which indicates the date when the payment request 613 was issued. The data are closed to address to the user, thereby providing the payment request 613.

Upon receipt of the authorization request 610 as shown in FIG. 36C and the payment request 613, the service providing system 102 decrypts them and examines their digital signatures. Then, the service providing system 102 compares the request number 3603, the transaction number 3610 and the merchant ID 3617, obtains the correlation between the authorization request 610 and the payment request 613, which were issued by the merchant and the user who deal with each other, compares the contents of the authorization request 610 with those of the payment request 613 to generate an authorization response 614, and transmits the response 614 to the credit settlement terminal 300 through the digital telephone communication.

As is shown in FIG. 36E, a digital signature of a service provider is provided for data that consists of an authorization response header 3630, which is header information indicating that the message is the authorization response 614; a transaction number 3631; an authorization number 3632; an authorization result 3633; user portrait image data 3634; an effective period 3635; a service provider ID 3636; and an issued time 3637, which indicates the date when the authorization response 614 was issued. The data are closed to address to the merchant, thereby providing the authorization response 614. When the credit condition of the user is not satisfactory, the portrait image data 3634 are not set.

The credit settlement terminal 300 receives the authorization response 614, decrypts it, examines the digital signature and displays the results of the authorization on the LCD 302.

Then, when the person in charge of merchant performs the clearing process request operation 616, the credit settlement terminal 300 generates a settlement request 617 and transmits it to the service providing system 102 via the digital telephone communication.

As is shown in FIG. 36F, a digital signature of a service provider is provided for data that consists of a settlement request header 3642, which is header information indicating that the message is the settlement request 617; a payment offer 608; a payment offer response 609; an authorization number 3643, which is issued by the service providing system 102; an effective period 3644 for the settlement request 617; an operator name 3645; a merchant ID 3646; and an issued time 3647, which indicates the date when the settlement request 617 was issued. The data are closed to address to the service provider, thereby providing the settlement request 617. Since the operator name 3616 is set in accordance with the option of the merchant, it is not always set.

Upon receipt of the settlement request 617, the service providing system 102 decrypts it, examines its digital signature, and compares the contents of the settlement request 617 with those of the payment request 613. Then, the service providing system 102 examines the settlement processors table 3204 to determine a settlement processor to which the clearing is requested, and generates and transmits a settlement request 609 to the settlement system 103 of the selected settlement processor.

Figures 37A, 37B, 37C:
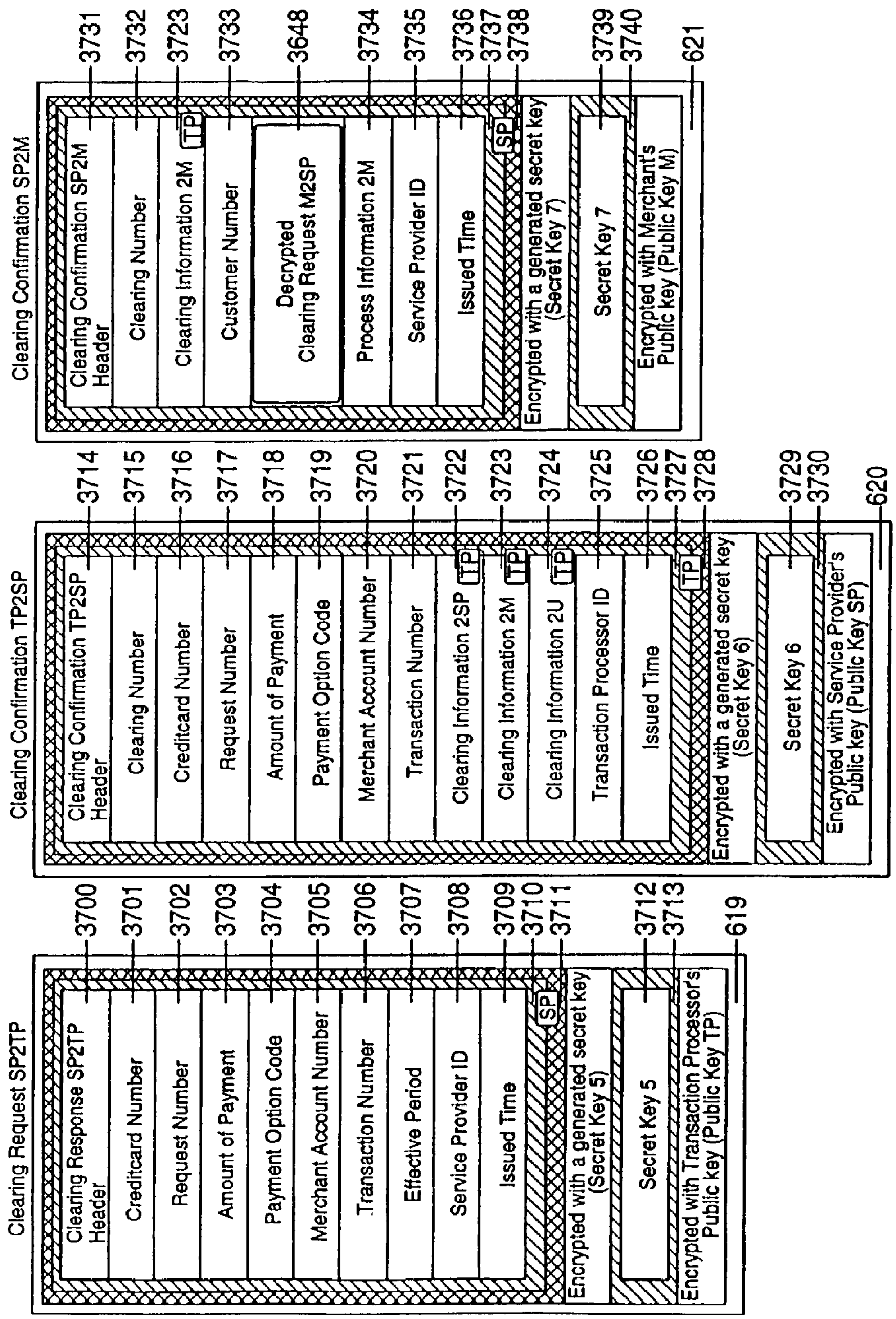
FIG. 37A is a specific diagram showing the data structure for a settlement request that is transmitted by the service providing system to the settlement system according to the first embodiment of the present invention.
FIG. 37B is a specific diagram showing the data structure for a clearing confirmation notification that is transmitted by the settlement system to the service providing system according to the first embodiment of the present invention.
FIG. 37C is a specific diagram showing the data structure for a clearing confirmation notification that is transmitted by the service providing system to the credit settlement terminal according to the first embodiment of the present invention.

As is shown in FIG. 37A, a digital signature of a service provider is provided for data that consists of a settlement request header 3700, which is header information indicating that the message is the settlement request 619; a credit card number 3701, which corresponds to the service code designated by the user; a request number 3702, which is issued by the personal credit terminal 100; an amount of payment 3703; a payment option code 3704; a merchant account number 3705, which indicate the account number of the merchant; a transaction number 3706; an effective period 3707 for the settlement request 619; a service provider ID 3708; and an issued time 3709, which indicates the date when the settlement request 619 was issued. The data are closed to address to the settlement processor, thereby providing the settlement request 619.

Upon receipt of the settlement request 619, the settlement system 103 decrypts it, examines the digital signature, performs an settling process, and generates and transmits a clearing confirmation notification 620 to the service providing system 102.

As is shown in FIG. 37B, a digital signature of a settlement processor is provided for data that consists of a clearing confirmation header 3714, which is header information indicating that the message is the clearing confirmation notification 620; a clearing number 3715, which is arbitrarily generated as a number that uniquely represents the settling process of the settlement system 103; a credit card number 3716; a request number 3717; an amount of payment 3718; a payment option code 3719; a merchant account number 3720; a transaction number 3721; clearing information 3722, for a service provider, with the digital signature of the settlement processor; clearing information 3723, for a merchant, with the digital signature of the settlement processor; a settlement processor ID 3725; and an issued date 3726, which indicates the date when the clearing confirmation notification 620 was issued. The data are closed to address to the service provider, thereby providing the clearing confirmation request 620.

Upon receipt of the clearing confirmation notification 620, the service providing system 102 decrypts it, examines the digital signature, generates a clearing confirmation notification 621 and transmits it to the credit settlement terminal 300 through the digital telephone communication.

As is shown in FIG. 37C, a digital signature of a service provider is provided for data that consists of a clearing confirmation header 3731, which is header information indicating that the message is the clearing confirmation notification 621; a clearing number 3732; clearing information 3723, for a merchant, with the digital signature of the settlement processor; a customer number 3733, which is generated as a number that uniquely represents a user for a merchant; a decrypted settlement request 3648; process information 3734, which concerns the process performed by the service providing system 102; a service provider ID 3735; and an issued date 3736, which indicates the date when the clearing confirmation notification 621 was issued. The data are closed to address to the merchant, thereby providing the clearing confirmation request 621. Since the service providing process information 3734 is set in accordance with the operation of the service provider, it may not always be set.

Upon receipt of the clearing confirmation notification 621, the credit settlement terminal 300 decrypts it, examines the digital signature and displays the contents on the LCD 302. In addition, the credit settlement terminal 300 generates a receipt 623 and transmits it to the service providing system 102 through the digital telephone communication.

Figure 38A:
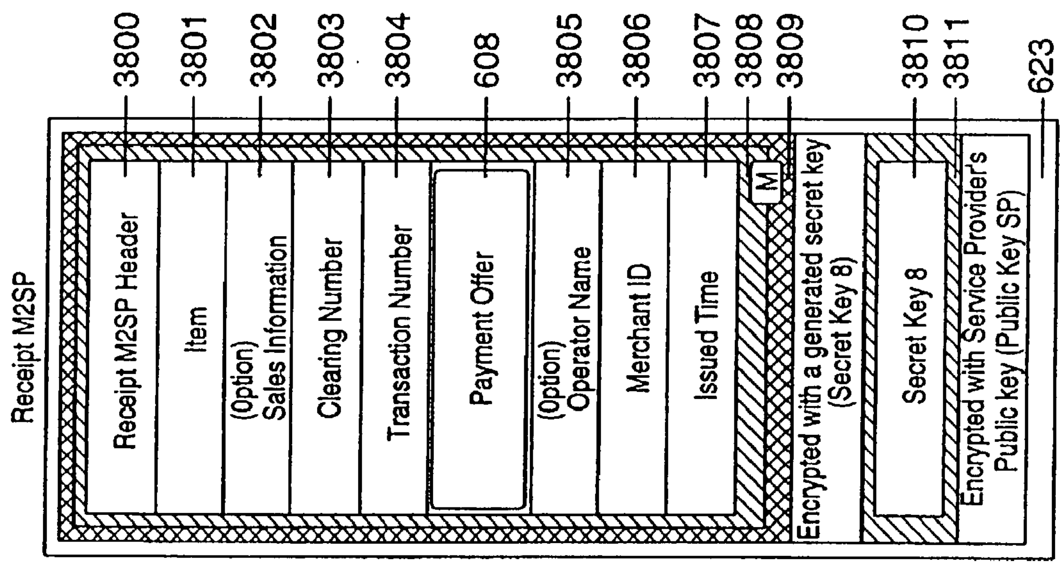
FIG. 38A is a specific diagram showing the data structure for a receipt that is transmitted by the credit settlement terminal to the service providing system according to the first embodiment of the present invention.

As is shown in FIG. 38A, a digital signature of a merchant is provided for data that consists of a receipt header 3800, which is header information indicating that the message is the receipt 623; an item name 3801, which indicates the name of an item that is sold; sales information 3802, which is additional information concerning the transaction from the merchant to the user; a clearing number 3803; a transaction number 3804; a payment offer 608; an operator name 3805; a merchant ID 3806; and an issued date 3807, which indicates the date when the receipt 623 was issued. The data are closed to address to the service provider, thereby providing the receipt 623. Since the sales information 3802 and the operator name 3805 are set in accordance with the operation of the merchant, they may not always be set.

Upon receipt of the receipt 623, the service providing system 102 decrypts it, examines the digital signature, and generates and transmits a receipt 624 to the personal credit terminal 100 through the digital wireless telephone communication.

Figure 38B:
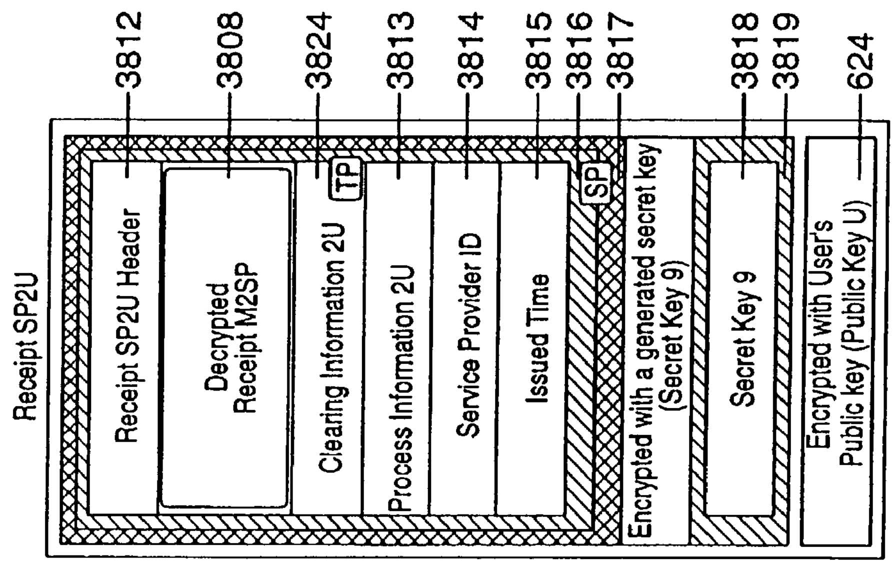
FIG. 38B is a specific diagram showing the data structure for a receipt that is transmitted by the service providing system to the personal credit terminal according to the first embodiment of the present invention.

As is shown in FIG. 38B, a digital signature of a service provider is provided for data that consists of a receipt header 3812, which is header information indicating that the message is the receipt 624; a decrypted receipt 3808; clearing information 3824, for a user, with the digital signature of the settlement processor; process information 3813, which is information concerning the process performed by the service providing system 102; a service provider ID 3814; and an issued date 3815, which indicates the date when the receipt 624 was issued. The data are closed to address to the user, thereby providing the receipt 624. Since the service provider process information 3813 is set in accordance with the operation of the service provider, it may not always be set.

Upon receipt of the receipt 624, the personal credit terminal 100 decrypts it, examines the digital signature, and displays the contents on the LCD 203.

The contents of data exchanged between devices in the cancellation process will now be described in detail.

In FIGS. 39A to 39F are shown the contents of data to be exchanged in the cancellation process.

First, when the person in charge of merchant conducts the cancellation operation 901, the credit settlement terminal 300 generates a cancellation request 903, and transmits it to the service providing system 102 through digital telephone communication.

When the user conducts the cancellation operation 904, the personal credit terminal 100 generates a cancellation request 906, and transmits it to the service providing system 102 through digital wireless telephone communication.

Figure 39A:
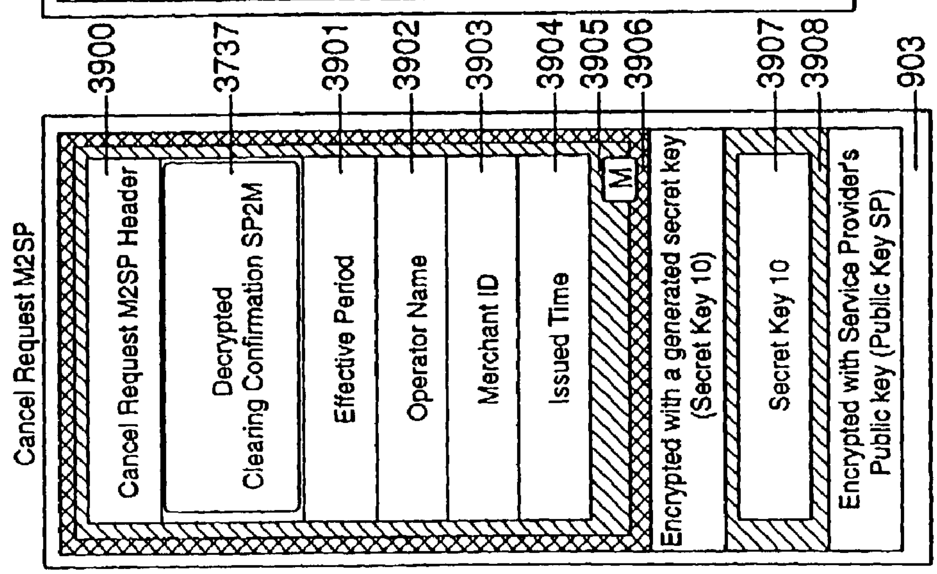
FIG. 39A is a specific diagram showing the data structure for a cancellation request that is transmitted by the credit settlement terminal to the service providing system according to the first embodiment of the present invention.
Figure 39:
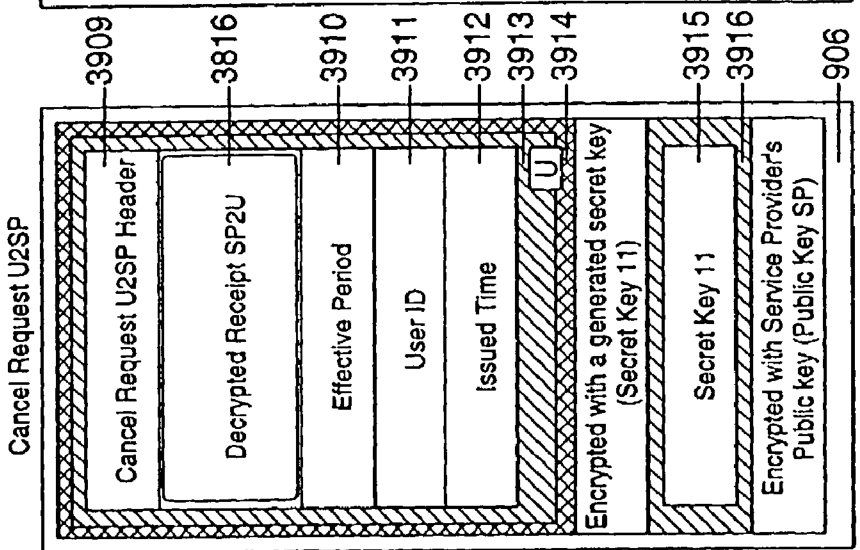
FIG. 39B is a specific diagram showing the data structure for a cancellation request that is transmitted by the personal credit terminal to the service providing system according to the first embodiment of the present invention.
FIG. 39C is a specific diagram showing the data structure for a cancellation request that is transmitted by the service providing system to the settlement system according to the first embodiment of the present invention.
FIG. 39D is a specific diagram showing the data structure for a cancellation confirmation notification that is transmitted by the settlement system to the service providing system according to the first embodiment of the present invention.
FIG. 39E is a specific diagram showing the data structure for a cancellation confirmation notification that is transmitted by the service providing system to the credit settlement terminal according to the first embodiment of the present invention.
FIG. 39F is a specific diagram showing the data structure for a cancellation receipt according to the first embodiment of the present invention.
Figure 39:
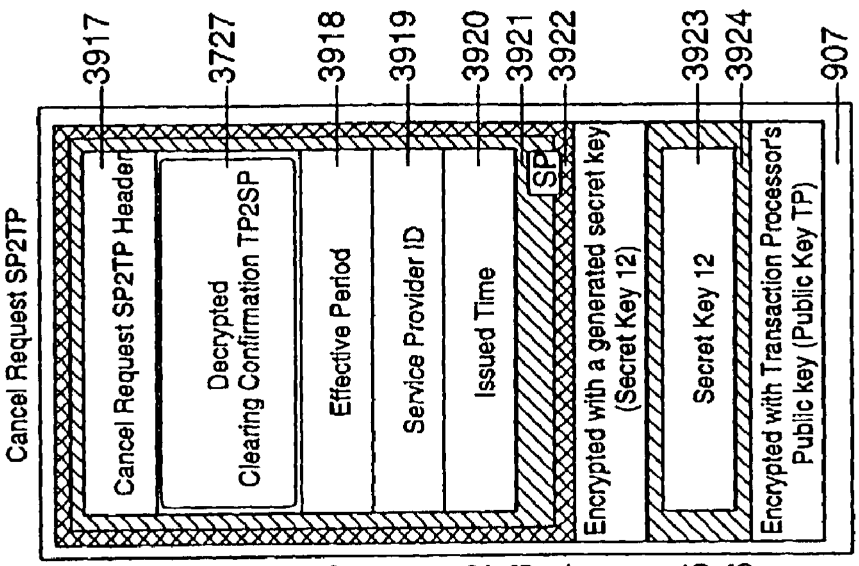

As is shown in FIG. 39A, a digital signature of a merchant is provided for data that consists of a cancellation request header 3900, which is header information indicating that the message is the cancellation request 903; a decrypted clearing confirmation notification 3737; an effective period 3901 for the cancellation request 903; an operator name 3902; a merchant ID 3903; and an issued time 3904, which indicates the date when the cancellation request 903 was issued. The data are closed to address to the service provider, thereby providing the cancellation request 903. Since the operator name 3902 is set in accordance with the option of the merchant, it is not always set.

As is shown in FIG. 39B, a digital signature of a user is provided for data that consists of a cancellation request header 3909, which is header information indicating that the message is the cancellation request 906; a decrypted receipt 3816; an effective period 3910 for the cancellation request 906; a user ID 3911; and an issued time 3912, which indicates the date when the cancellation request 906 was issued. The data are closed to address to the service provider, thereby providing the cancellation request 906.

Upon receipt of the cancellation request 903 and the cancellation request 906, the service providing system 102 decrypts it and examines the digital signature. Then, the service providing system 102 compares the request number, the transaction number and the merchant ID, and obtains the correlation between the cancellation request 903 and the cancellation request 906, which were issued by the merchant and the user who deal with each other. Further, the service providing system 102 compares the contents of the cancellation request 903 with those of the cancellation request 906 to generate an cancellation response 907, and transmits the request 907 to the settlement system 103.

As is shown in FIG. 39C, a digital signature of a service provider is provided for data that consists of a cancellation request header 3917, which is header information indicating that the message is the cancellation request 907; a decrypted clearing confirmation notification 3727; an effective period 3918 for the cancellation request 907; a service provider ID 3919; and an issued time 3920, which indicates the date when the cancellation request 907 was issued. The data are closed to address to the settlement processor, thereby providing the cancellation request 907.

Upon receipt of the cancellation request 907, the settlement system 103 decrypts it, examines the digital signature, performs the cancellation process, and generates and transmits a cancellation confirmation notification 908 to the service providing system 102.

Figure 39D:
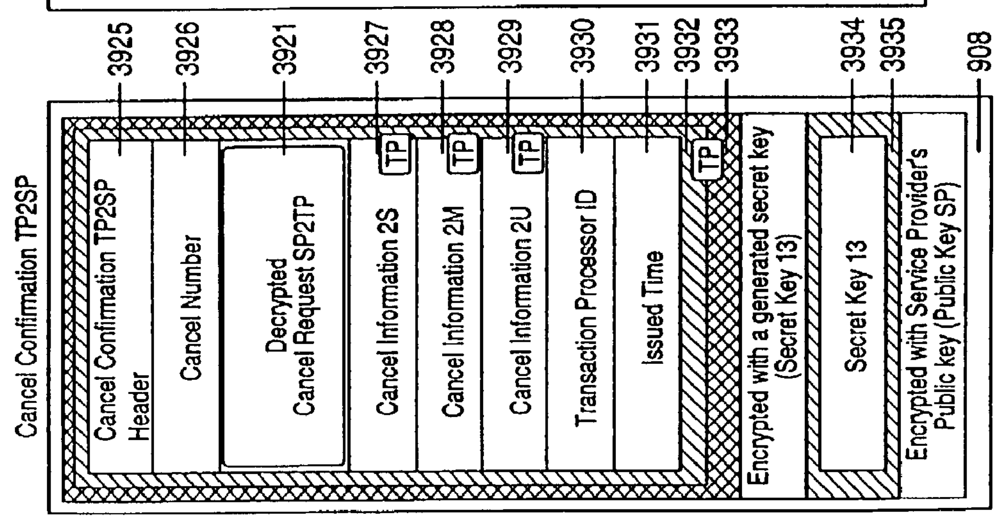

As is shown in FIG. 39D, a digital signature of a settlement processor is provided for data that consists of a cancellation confirmation header 3925, which is header information indicating that the message is the cancellation confirmation notification 908; a cancellation number 3926, which uniquely represents the cancellation process performed by the settlement system 103; a decrypted cancellation request 3921; clearing information 3927, for a service provider, with the digital signature of the settlement processor; cancellation information 3928, for a merchant, with the digital signature of the settlement processor; cancellation information 3929, for a user, with the digital signature of the settlement processor; a settlement processor ID 3930; and an issued date 3931, which indicates the date when the cancellation confirmation notification 908 was issued. The data are closed to address to the service provider, thereby providing the cancellation confirmation request 908. Upon receipt of the cancellation confirmation notification 908, the service providing system 102 decrypts it, examines the digital signature, generates a cancellation confirmation notification 909 and a cancellation receipt 910, and transmits them respectively to the credit settlement terminal 300 and the personal credit terminal 100.

Figure 39E:
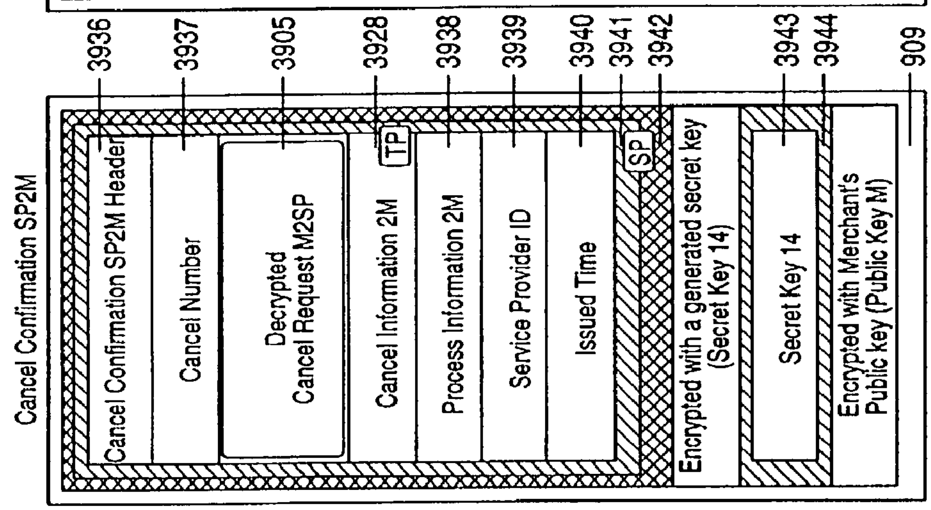

As is shown in FIG. 39E, a digital signature of a service provider is provided for data that consists of a cancellation confirmation header 3936, which is header information indicating that the message is the cancellation confirmation notification 909; a cancellation number 3937; a decrypted cancellation request 3905; cancellation information 3928, for a merchant, with the digital signature of the settlement processor; process information 3938, which concerns the process performed by the service providing system 102; a service provider ID 3939; and an issued date 3940, which indicates the date when the cancellation confirmation notification 909 was issued. The data are closed to address to the merchant, thereby providing the cancellation confirmation request 909. Since the service providing process information 3938 is set in accordance with the operation of the service provider, it may not always be set.

Figure 39F:
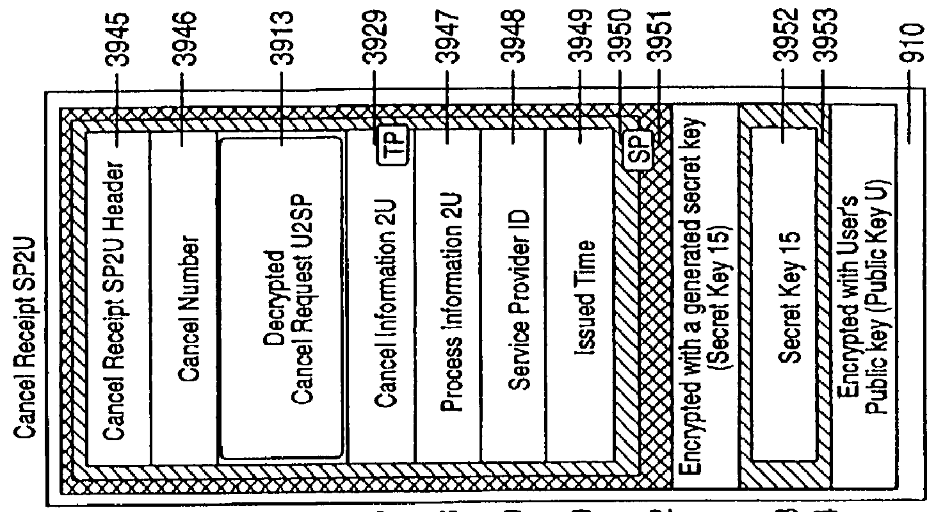

As is shown in FIG. 39F, a digital signature of a service provider is provided for data that consists of a cancellation receipt header 3945, which is header information indicating that the message is a cancellation receipt 910; a cancellation number 3946; a decrypted cancellation request 3913; cancellation information 3929, for a user, with the digital signature of the settlement processor; process information 3947, which concerns the process performed by the service providing system 102; a service provider ID 3948; and an issued date 3949, which indicates the date when the cancellation receipt 910 was issued. The data are closed to address to the user, thereby providing the cancellation receipt 910. Since the service providing process information 3947 is set in accordance with the operation of the service provider, it may not always be set.

Upon receipt of the cancellation confirmation notification 909, the credit settlement terminal 300 decrypts it, examines the digital signature, and displays the contents on the LCD 302. Upon receipt of the cancellation receipt 910, the personal credit terminal 100 decrypts it, examines the digital signature, and displays the contents on the LCD 203.

The contents of data exchanged between devices in the customer service process will now be described in detail.

Figures 40A, 40B, 40C:
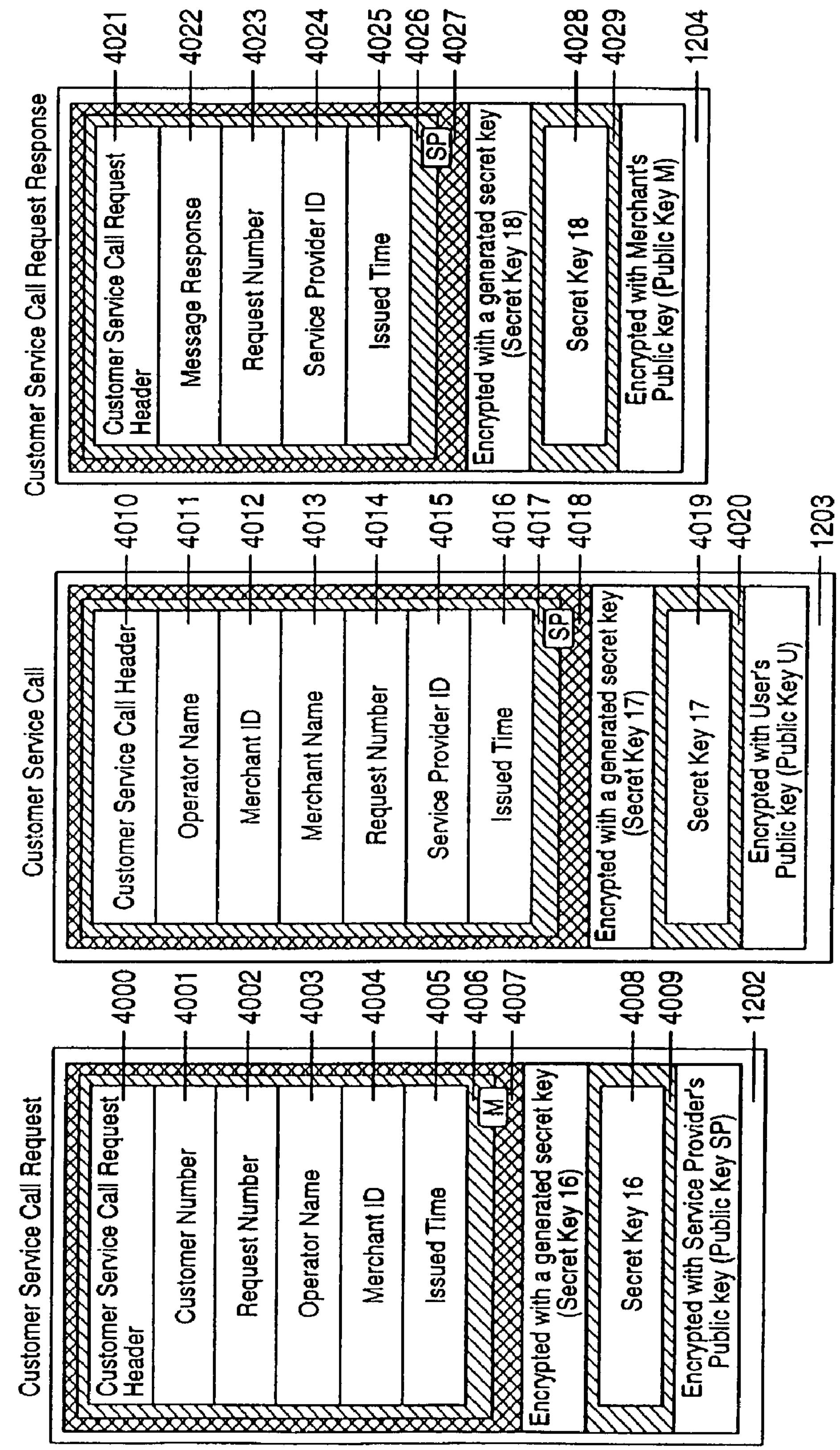
FIG. 40A is a specific diagram showing the data structure for a customer service call request according to the first embodiment of the present invention.
FIG. 40B is a specific diagram showing the structure for a customer service call according to the first embodiment of the present invention.
FIG. 40C is a specific diagram showing the data structure for a response to a customer service call request according to the first embodiment of the present invention.

In FIGS. 40A to 40C are shown the contents of data to be exchanged in the customer service call process.

First, when the person in charge of merchant conducts the customer service operation 1200, the credit settlement terminal 300 generates a customer service call request 1201, and transmits it to the service providing system 102 through digital telephone communication.

As is shown in FIG. 40A, a digital signature of a merchant is provided for data that consists of a customer service call request header 4000, which is header information indicating that the message is the customer service call request 1202; a customer number 4001, which is issued during the settlement processing as a number that indicates a user; a request number 4002, which uniquely represents the customer service call request 1202; an operator name 4003; a merchant ID 4004; and an issued time 4005, which indicates the date when the customer service call request 1202 was issued. The data are closed to address to the service provider, thereby providing the customer service call request 1202. Since the operator name 4003 is set in accordance with the option of the merchant, it is not always set.

The service providing system 102 receives the customer service call request 1201, decrypts it and examines the digital signature. Then, the service providing system 102 determines a user from the customer table, and compares the user with the user's access control information to generate a customer service call 1203 and a customer service call request response 1204, and transmits them respectively to the personal credit terminal 100 and the credit settlement terminal 300.

As is shown in FIG. 40B, a digital signature of a service provider is provided for data that consists of a customer service call header 4010, which is header information indicating that the message is the customer service call 1203; an operator name 4011; a merchant ID 4012; a merchant name 4013; a request number 4014, which is set by the credit settlement terminal 300; a service provider ID 4015; and an issued time 4016, which indicates the date when the customer service call 1203 was issued. The data are closed to address to the user, thereby providing the customer service call 1203. Since the operator name 4011 is set in accordance with the option of the merchant, it is not always set.

As is shown in FIG. 40C, the digital signature of a service provider is provided for data that consist of a customer service call request response header 4021, which is header information indicating that the message is the customer service call request response 1204; a message response 4022 from the service providing system 102; a request number 4023, which is set by the credit settlement terminal 300; a service provider ID 4024; and an issued time 4025, which indicates the date on which the customer service call request response 1204 was issued. These data are closed and addressed to the merchant, thereby providing the customer service call request response 1204.

Upon receiving the customer service call request response 1204, the credit settlement terminal 300 decrypts it, examines the digital signature, and displays "calling in process."

The personal credit terminal 100 receives and encrypts the customer service call 1203, examines the digital signature, and notifies the user of the reception of the call. When the user performs the speech operation 1207, the personal credit terminal 100 transmits the arrival response 1208 to the service providing system 102. Upon receiving the arrival response 1208, the service providing system 102 transmits a call response 1210 to the credit settlement terminal 300, so that the credit settlement terminal 300 and the personal credit terminal 100 are now on line.

Figure 40D:
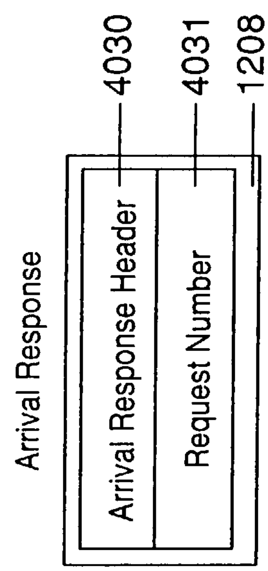
FIG. 40D is a specific diagram showing the data structure for a response to reception of a customer service call according to the first embodiment of the present invention.

As is shown in FIG. 40D, the arrival response 1208 is composed of an arrival response header 4030, which is header information indicating that the message is the arrival response 1208, and a request number 4031, which is set by the credit settlement terminal 300.

Figure 40E:
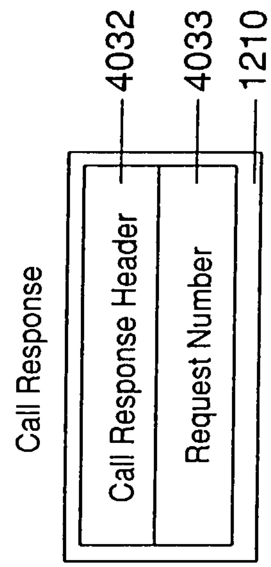
FIG. 40E is a specific diagram showing the structure of a response to a customer service call according to the first embodiment of the present invention.

Further, as is shown in FIG. 40E, the call response 1220 is composed of a call response header 4032, which is header information indicating that the message is the call response 1210, and a request number 4033, which is set by the credit settlement terminal 300.

The contents of data exchanged between devices in the inquiry call process will now be described in detail.

In FIGS. 41A to 41E are shown the contents of the data to be exchanged during the inquiry call process.

First, when the user conducts the inquiry operation 1213, the personal credit terminal 100 generates an inquiry call request 1215, and transmits it to the service providing system 102 by employing digital wireless phone communication.

Figure 41C:
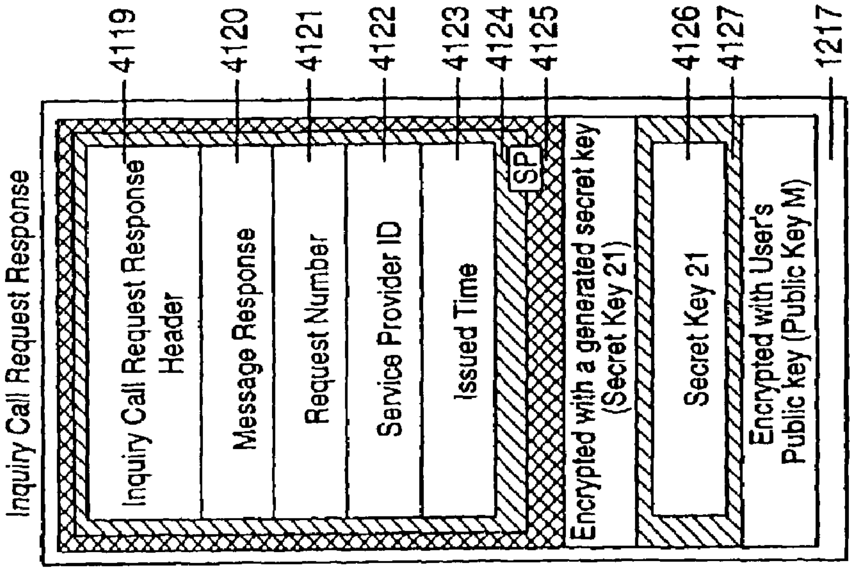
FIG. 41C is a specific diagram showing the data structure for a response to an inquiry call request according to the first embodiment of the present invention.
Figure 41B:
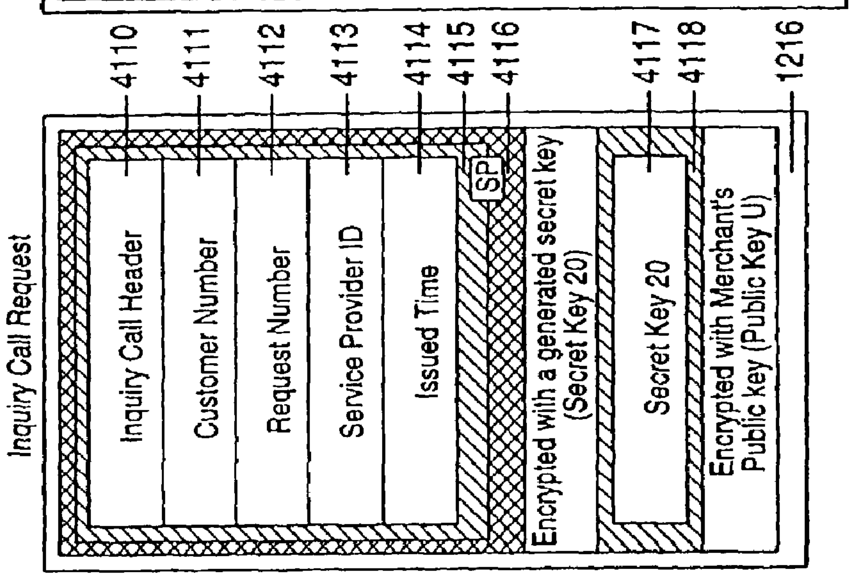
FIG. 41B is a specific diagram showing the data structure for an inquiry call according to the first embodiment of the present invention.
Figure 41A:
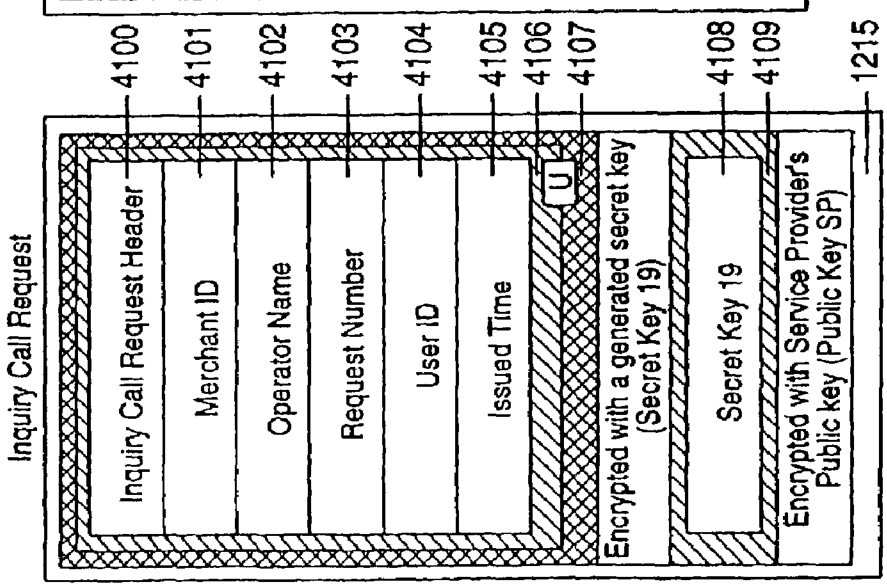
FIG. 41A is a specific diagram showing the structure for an inquiry call request according to the first embodiment of the present invention.

As is shown in FIG. 41A, the digital signature of a user is provided for data that consist of an inquiry call request header 4100, which is header information indicating that the message is the inquiry call request 1215; a merchant ID number 4101; an operator name 4102; a request number 4103, which uniquely represents the inquiry call request 1215; a user ID 4104; and an issued time 4105, which indicates the date on which the inquiry call request 1215 was issued. These data are closed and addressed to the service provider, thereby providing the inquiry call request 1215. Since setting the operator name 4102 for the settlement processing is an optional operation performed by the merchant, it is not always set.

The service providing system 102 receives the inquiry call request 1215, decrypts it and examines the digital signature. Then, the service providing system 102 generates an inquiry call 1216 and an inquiry call request response 1217, and transmits them to the credit settlement terminal 300 of the merchant and the personal credit terminal 100, respectively.

As is shown in FIG. 41B, the digital signature of a service provider is provided for data that consist of an inquiry call header 4110, which is header information indicating that the message is the inquiry call 1216; a customer number 4111; a request number 4112, which is set by the personal credit terminal 100; a service provider ID 4113; and an issued time 4114, which indicates the date on which the inquiry call 1216 was issued. These data are closed and addressed to the merchant, thereby providing the inquiry call 1216.

As is shown in FIG. 41C, the digital signature of a service provider is provided for data that consist of an inquiry call request response header 4119, which is header information indicating that the message is an inquiry call request response 1217; a message response 4120 from the service providing system 102; a request number 4121, which is set by the personal credit terminal 100; a service providing ID 4122; and an issued time 4123, which indicates the date on which the inquiry call request response 1217 was issued. These data are closed and addressed to the user, thereby providing the inquiry call request response 1217.

Upon receiving the inquiry call request response 1217, the personal credit terminal 100 decrypts it, examines the digital signature, and displays "calling in process."

The credit settlement terminal 300 receives and encrypts the inquiry call 1216, examines the digital signature, and notifies the merchant of the reception of the call. When the merchant performs the speech operation 1220, the credit settlement terminal 300 transmits the arrival response 1221 to the service providing system 102. Upon receiving the arrival response 1221, the service providing system 102 transmits a call response 1223 to the personal credit terminal 100, so that the personal credit terminal 100 and the credit settlement terminal 300 are now on line.

Figure 41E:
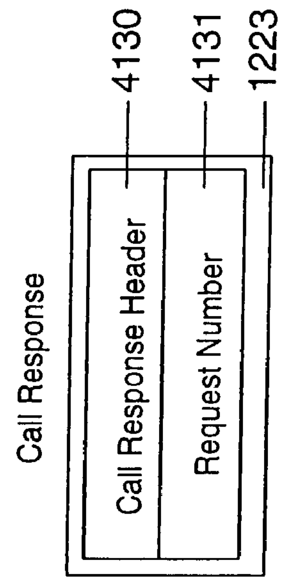
FIG. 41E is a specific diagram showing the data structure for a response to an inquiry call according to the first embodiment of the present invention.
Figure 41D:
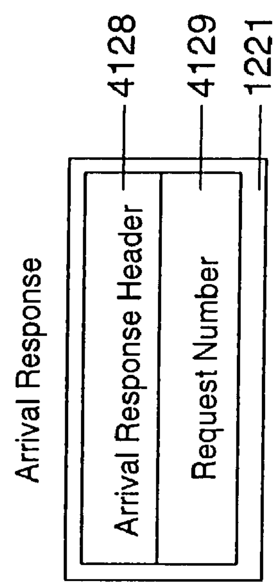
FIG. 41D is a specific diagram showing the data structure for a response to reception of an inquiry call according to the first embodiment of the present invention.
Figure 42:
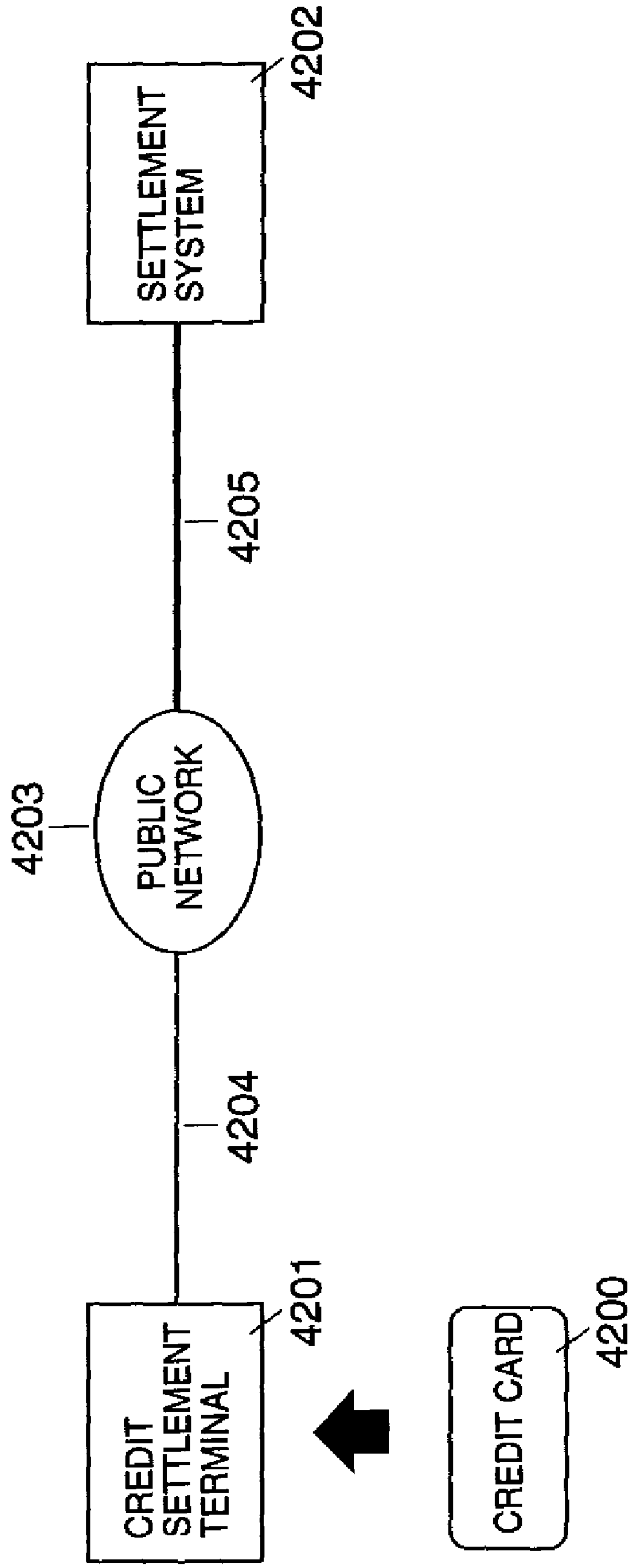
FIG. 42 is a block diagram illustrating a conventional settlement system.

As is shown in FIG. 41D, the arrival response 1221 is composed of an arrival response header 4128, which is header information indicating that the message is the arrival response 1221, and a request number 4129, which is set by the personal credit terminal 100. Further, as is shown in FIG. 41E, the call response 1223 is composed of a call response header 4130, which is header information indicating that the message is the call response 1223, and a request number 4131, which is set by the personal credit terminal 100.

Second Embodiment

A second embodiment of the present invention will now be described. In the second embodiment, a personal remote credit settlement system that improves the efficiency of the processing for of the personal remote credit transaction service will be described.

As in the first embodiment, the fundamental arrangement of the personal remote credit settlement system comprises, as is shown in FIG. 1: a personal credit terminal 100 having two types of bidirectional radio communication functions and an electronic credit card function; a credit settling device 101 for performing a credit transaction at a store; an settlement system 103 for performing credit settling at a credit service company or a transaction company; a service providing system 102, which is located at the center of a network that links it to the personal credit terminal 100, the credit settling device 101 and the settlement system 103, which provide a personal remote credit settling service; a digital public line network 108 to provide a data transmission path; and a wireless telephone base station 104, which links the personal credit terminal 100 to the digital public line network 108.

The personal credit terminal 100 is a portable wireless telephone terminal that has two types of bidirectional wireless communication functions, i.e., an infrared communication function and a digital wireless telephone function, and an electronic credit card function. A credit settling device 101 that performs a credit settlement processing at a store also has two types of bidirectional communication functions, i.e., an infrared communication and a digital telephone communication.

In FIG. 1, reference numeral 105 denotes a transmission path for infrared communication performed between the personal credit terminal 100 and the credit settling device 101; 106, a transmission path for digital radio communication performed between the personal credit terminal 100 and the base station 104; 107, a digital communication line connecting the base station 104 and the digital public line network 108; 109, a digital communication line connecting the digital public line network 108 and the service providing system 102; 110, a digital telephone communication line connecting the credit settling device 101 and the digital public line network 108; and 111, a digital communication line connecting the service providing system 102 and the settlement system 103.

Especially, the digital communication lines 109 and 111 are multiplexed to serve as a multiple communication line.

The following mode is assumed as the operating mode for the personal remote credit settling service.

Assume that the settlement system 103 is installed at a credit card company or a transaction company, the credit settling device 101 is installed in a store, and the personal credit terminal 100 is carried by a consumer. The service providing system 102 is installed at a company that provides the personal remote credit settling service, and when the credit card company provides that service, the service providing system 102 is installed at the credit card company.

As a further assumption, for the credit service the consumer enters into a membership contract with the credit card company, a membership contract for the personal remote credit settling service with the company that provides the personal remote credit settling service, and a contract for wireless telephone service with a telephone company. Similarly, the store enters into a member contract with the credit card company for credit service; a member contract with the company that provides the personal remote credit settling service for the personal remote credit settling service; and a contract for digital telephone communication service with the telephone company.

When the personal remote credit settling service is provided by a company other than the credit card company, the company that provides the personal remote credit settling service enters into a contract with a member who has a contract for a credit service with one or more credit card companies, so that the personal remote credit settling service providing company can take the place of the credit card company and can issue an electronic credit card and operate a personal remote settling service.

When the transaction company employs the settlement system 103 to perform a credit settlement processing, the credit card company enters into a contract with the transaction company so that the transaction company can act to perform the credit transaction.

When the settlement system that performs the credit settlement processing differs for each credit card, a plurality of settlement systems having the same structure as that of the settlement system 103 in FIG. 1 are connected to the service providing system 102 by employing digital communication lines.

To simplify the explanation of the system of the present invention, a consumer who owns the personal credit terminal 100 is called a user, a store wherein the credit settling device 101 is installed is called a merchant, a sales clerk who operates the credit settling device 101 is called an operator, a company that provides the personal remote credit settling service is called a service provider, and a credit card company or a transaction company that employs the settlement system 103 to perform the credit transaction is called a settlement processor.

With this system, when a user employs credit to pay a merchant the cost of a product, to perform the credit settlement processing the personal credit terminal 100, the credit settling device 101 and the service providing system 102 exchange transaction information electronically, and the service providing system 102 and the settlement system 103 exchange transaction information electronically.

In essence, the service providing system 102 receives a payment request and a settlement request from the personal credit terminal 100 and the credit settling device 101, compares these requests, and acts for the user and the merchant by requesting that the settlement system 100 perform the settlement processing. Then, the settlement system 103 performs the actual transaction.

At this time, the personal credit terminal 100 and the credit settling device 101 engage in infrared communication across the transmission path 105. And the personal credit terminal 100 and the service providing system 102 use a digital wireless telephone to engage in digital telephone communication via the transmission path 106 to the base station 104 and across the digital communication line 107, the digital public line network 108 and the digital communication line 109. Further, the credit settling device 101 and the service providing system 102 engage in digital telephone communication across the digital telephone communication line 110, the digital public line network 108 and the digital communication line 109. In addition, the service providing system 102 and the settlement system 103 engage in digital data communication across the digital communication line 111.

The transaction information that is encrypted is exchanged by the personal credit terminal 100 and the service providing system 102, by the credit settling device 101 and the service providing system 102, and by the service providing system 102 and the settlement system 103. An encryption method that uses a secret key and an encryption method that uses a public key are combined to electronically close information and transmit it.

The individual components of the system in this embodiment will now be described.

First, an explanation for the personal credit terminal 100 will be given. As well as in the first embodiment, FIGS. 2A and 2B are a front view and a rear view of the personal credit terminal 100.

The personal credit terminal 100 has three operating modes: a credit card mode, a digital wireless telephone mode and a personal information management mode, which can be alternately selected using the mode switch 204.

The personal credit terminal 100 serves as a digital wireless telephone in the digital wireless telephone mode, and as an electronic credit transmission means, i.e., an electronic credit card, in the credit card mode.

The electronic credit card is registered at the personal credit terminal 100 while it is assumed that the user has entered into a membership contact for the credit service with the credit card company. When the user has membership contracts for a plurality of credit services, a corresponding number of credit cards are registered at the terminal 100.

The personal information management mode is an operating mode for managing the personal information for a user that is stored in the personal credit terminal 100. In the personal information management mode, the user refers to personal information and portrait image data that are registered, and sets user preference information.

In order to make a call using the personal credit terminal 100, first, the user selects the digital wireless telephone mode using the mode switch 204, and then enters a telephone number using the number key switch 208 and depresses the speech switch 205. Through this process, the user can complete a call to the destination represented by the telephone number that was entered.

When a call is received at the personal credit terminal 100, it generates a call arrival tone, regardless of its current operating mode. In this case, the user need only depress the speech switch 205 to automatically change the operating mode to the digital wireless telephone mode and answer the call.

In order to use credit to make a payment to a merchant, first, the user employs the mode switch 204 to set the operating mode to the credit card mode, following which he employs the function switch 207 to select a credit card to use for the payment. Then, the user enters the amount of the payment using the number key switch 208, and depresses the execution switch 211, while at the same time pointing the communication port 200 toward the credit settling device 101 of the merchant. Through the execution of the above process, the personal credit terminal 100 engages in infrared communication with the credit settling device 101 and digital wireless telephone communication with the service providing system 102, while exchanging transaction information with them and thus performing the credit settlement processing.

The credit settling device 101 will now be explained. The credit settling device 101, as in the first embodiment, has the external appearance shown in FIG. 3.

The credit settlement terminal 300 has three operating modes: a credit transaction mode, a digital telephone mode and a merchant information management mode, which can be alternately selected using the mode switch 304. The credit settlement terminal 300 serves as a digital telephone in the digital telephone mode, and as a credit settlement terminal for the personal remote credit transaction service in the credit transaction mode.

The merchant information management mode is an operating mode for managing the information that is stored for a merchant in the credit settlement terminal 300. In the merchant information management mode, the merchant refers to merchant information that is registered, and sets merchant preference information.

In order to make a call using the credit settlement terminal 300, first, an operator selects the digital telephone mode using the mode switch 304, following which he enters a telephone number using the number key switch 307. Through this process, the operator can complete a call to the destination represented by the telephone number that was entered.

When a call is received at the credit settlement terminal 300, it generates a call arrival tone, regardless of its current operating mode. In this case, the operator need only raise the telephone handset 303 or depress the hook switch 305 to automatically change the operating mode to the digital telephone mode and answer the call.

In order to perform the credit settlement processing, first, the operator uses the cash register 311 to calculate a total for the price of a product and the sales tax, and transmits the total to the user. Then, in accordance with the user's request to use credit for the payment, the operator depresses the credit transaction switch 312 of the cash register 311 and waits until the user has completed the payment operation using the personal credit terminal 100. When the user has executed the payment process, the payment price that the user entered is displayed on the LCD 302 along with the results of the credit reference check performed for the user. The operator confirms the display contents and depresses the execution switch 308.

Through the execution of this process, the credit settling device 101 exchanges transaction information with the personal credit terminal 100 and the service providing system 102, and performs the credit settlement processing.

The service providing system 102 will now be described. The service providing system 102, as in the first embodiment, has the block arrangement shown in FIG. 4, the service providing system 102 comprises: a service server 400, which processes transaction information, for the personal remote credit transaction service, that is to be exchanged with the personal credit terminal 100, the credit settling device 101 and the settlement system 103; a service director information server 401, which manages attribute information that concerns the user, the merchant and the settlement processor, and service history information that is provided by the service providing system 102; a user information server 402, which manages the attribute information for the user, and the data stored in the personal credit terminal 100; a merchant information server 403, which manages the attribute information for the merchant, and data stored in the credit settlement terminal 300; a settlement processor information server 404, which manages the attribute information for the settlement processor, and history information for the settlement processing; and a management system 407, with which a service provider operates and manages the service providing system 102. Each of the servers 400 to 404, and the management system 407, is constituted by one or more computers.

The service server 400, the service director information server 401, the user information server 402, the merchant information server 403 and the settlement processor information server 404 are respectively connected to an ATM-LAN switch 405 by ATM-LAN cables 409, 410, 411, 412 and 413. The service server 400 accesses the service director information server 401, the user information server 4402, the merchant information server 403 or the settlement processor information server 404 via the ATM-LAN switch 405.

The ATM-LAN switch 405 is connected to an ATM switch board 406 by an ATM-LAN cable 415. The ATM switch board 406 is connected to the digital communication line 109, which is extended to the digital public line network 108, and the digital communication line 111, which extends to the settlement system 103. The service server 400 communicates, along the ATM-LAN switch 405 and the ATM switch board 406, with the personal credit terminal 100, the credit settling device 101 and the settlement system 103.

The management system 407 is connected by an ATM-LAN cable 414 to an ATM-LAN switch 408, and from there to the ATM switch board 406 by an ATM-LAN cable 416. The management system 407 accesses the service server 400, the service director information server 401, the user information server 402, the merchant information server 403 or the settlement processor information server 404 via the ATM-LAN switch 408, the ATM switch board 406 and the ATM-LAN switch 405, and operates and manages the service providing system 102.

The ATM switch board 406 serves as a data communication switch board for external/internal communication by the service providing system 102 and inter-communication therefor. The ATM switch board 405 serves as a communication adaptor that is compatible with a plurality of communication types. For example, for communications conducted between the service server 400 and the credit settling device 101, first, an ISDN packet is exchanged by the credit settling device 101 and the ATM switch board 406. Then, the ATM switch board 406 converts the ISDN data packet into an ATM packet, an inverted conversion, and exchanges the ATM packet with the service server 400. Similarly, for communications conducted between the service server 400 and the personal credit terminal 100, and between the service server 400 and the settlement system 103, the ATM switch board 406 converts data in accordance with a corresponding communication type.

In addition, in order to reduce the expenses for communication between the personal credit terminal 100 and the service providing system 102, and between the credit settling device 101 and the service providing system 102, generally a service providing system 102 is installed in each area (service area) to provide the personal remote credit settling service. For this purpose, a special digital communication line 417 is connected to the ATM switch board 406 that links it with a service providing system 102 in each area. In this case, all the service providing systems 102 share data, and cooperate in the processing of the data.

The process sharing and the cooperative processing of performed by the service providing systems will be described in detail later.

The settlement system 103 will now be explained. The settlement system 103, as in the first embodiment, has the block arrangement shown in FIG. 5.

For the personal remote credit transaction service, the credit settlement processing performed by the settlement system 103 is initiated when, after a transaction request is received from the service providing system 102, the transaction server 500 updates data stored in the subscriber information server 501, the member information storage server 502, and the transaction information server 503.

The ATM switch board 505 is connected not only to the digital communication line 111 that extends to the service providing system 102, but also to a bank line 515 that is connected to a bank on-line system, and to a special digital line 516 that is connected to an settlement system for another settlement processor.

The settlement system 103 communicates with the bank on-line system and the settlement system for the other settlement processor when performing a settlement processing between financial organizations.

The management system 506 is connected to an ATM-LAN switch 507 by an ATM-LAN cable 512, and to the ATM switch board 505 by an ATM-LAN cable 514. The management system 506 accesses the transaction server 500, the subscriber information server 501, the member information storage server 502, or the transaction information server 503 via the ATM-LAN switch 507, the ATM switch board 505 and the ATM-LAN switch 504, and operates and manages the settlement system 103.

The ATM switch board 505 serves as a data communication switch board for the external-internal communication of the settlement system 103 and the inter-communication therefor. The ATM switch board 505 serves as a communication adaptor that is compatible with a plurality of communication types, and performs data conversion in accordance with the communication type used for communication between the transaction server 500 and the service providing system 102, between the transaction server 500 and the bank on-line system, and between the transaction server 500 and the settlement system for the other settlement processor.

The personal remote credit transaction service provided by the system in this embodiment will now be described.

Roughly four processes are employed for the personal remote credit transaction service: "transaction," "cancellation," "customer service call," and "inquiry call."

The settlement processing is one whereby a credit transaction, for which a user employs credit to make a payment to a merchant, is performed by employing wireless communication, without the direct exchange of a credit card or payment specifications. The cancellation process is one whereby trading that has been completed as a transaction performed by the personal remote credit transaction service is canceled, based on an agreement reached by a user and a merchant while employing wireless communication. The customer service call process is a process whereby a merchant can contact a user for whom a personal remote credit transaction service has been completed, even when the merchant does not know the telephone number of the user. The inquiry call process is a process whereby a user can place an inquiry call to a merchant to whom the results of a personal remote credit transaction service has been provided, without the merchant being notified of the telephone number of the user.

Figure 43:
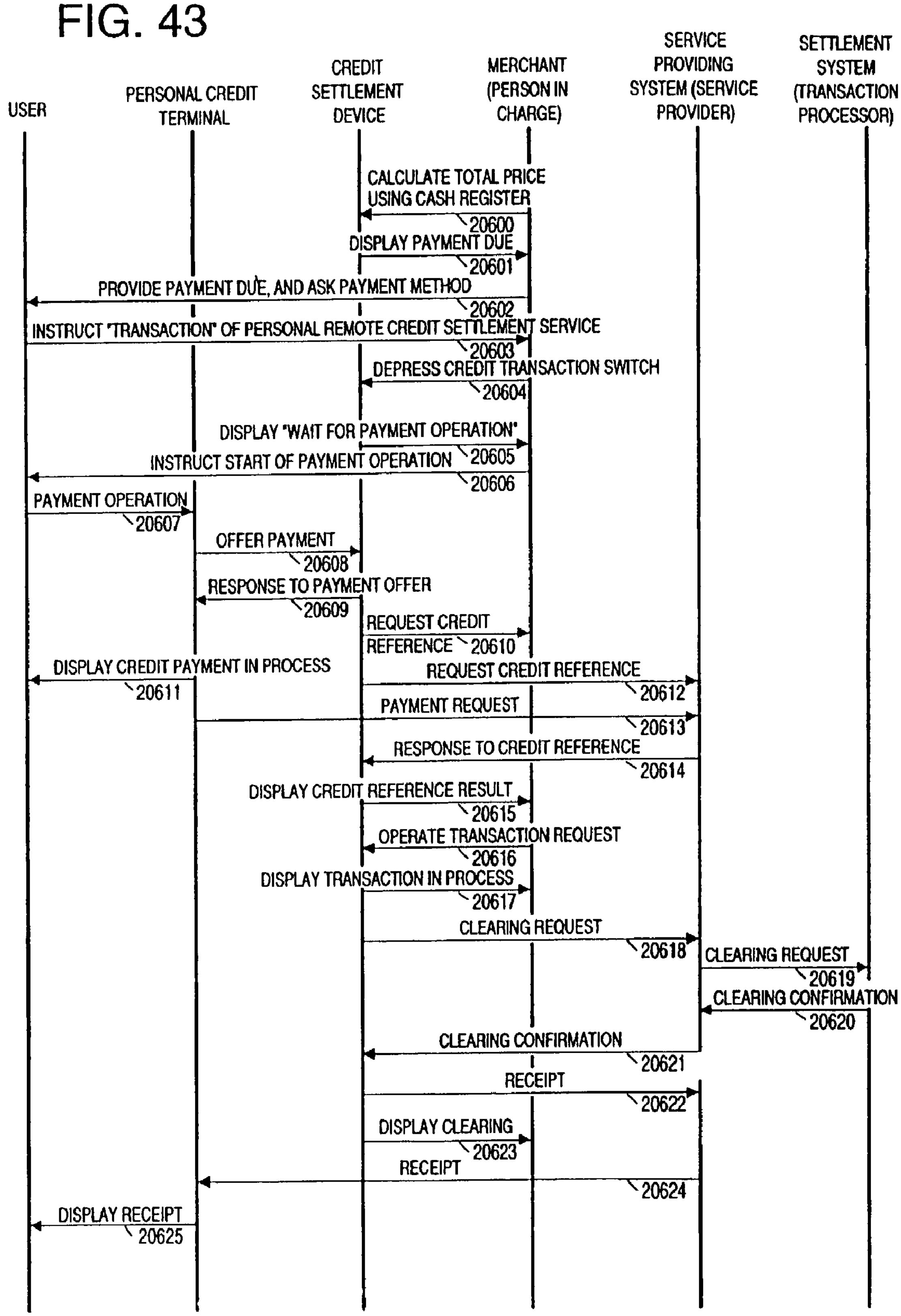
FIG. 43 is a flowchart for settlement processing according to the second embodiment of the present invention.

In FIG. 43 is shown a flowchart for the settlement processing for the personal remote credit transaction service. In FIGS. 44A to 44I are shown examples of displays on the LCD 203 of the personal credit terminal 100 during the settlement processing, and in FIGS. 8A to 8G are shown examples of displays on the LCD 302 of the credit settlement terminal 300.

Further, in FIG. 9 is shown a flowchart for the cancellation process for the personal remote credit transaction service; in FIG. 10A to 10H are shown examples of displays on the LCD 203 of the personal credit terminal during the cancellation process, and in FIGS. 11A to 11G are shown examples of displays on the LCD 302 of the credit settlement terminal 300.

Figure 45A:
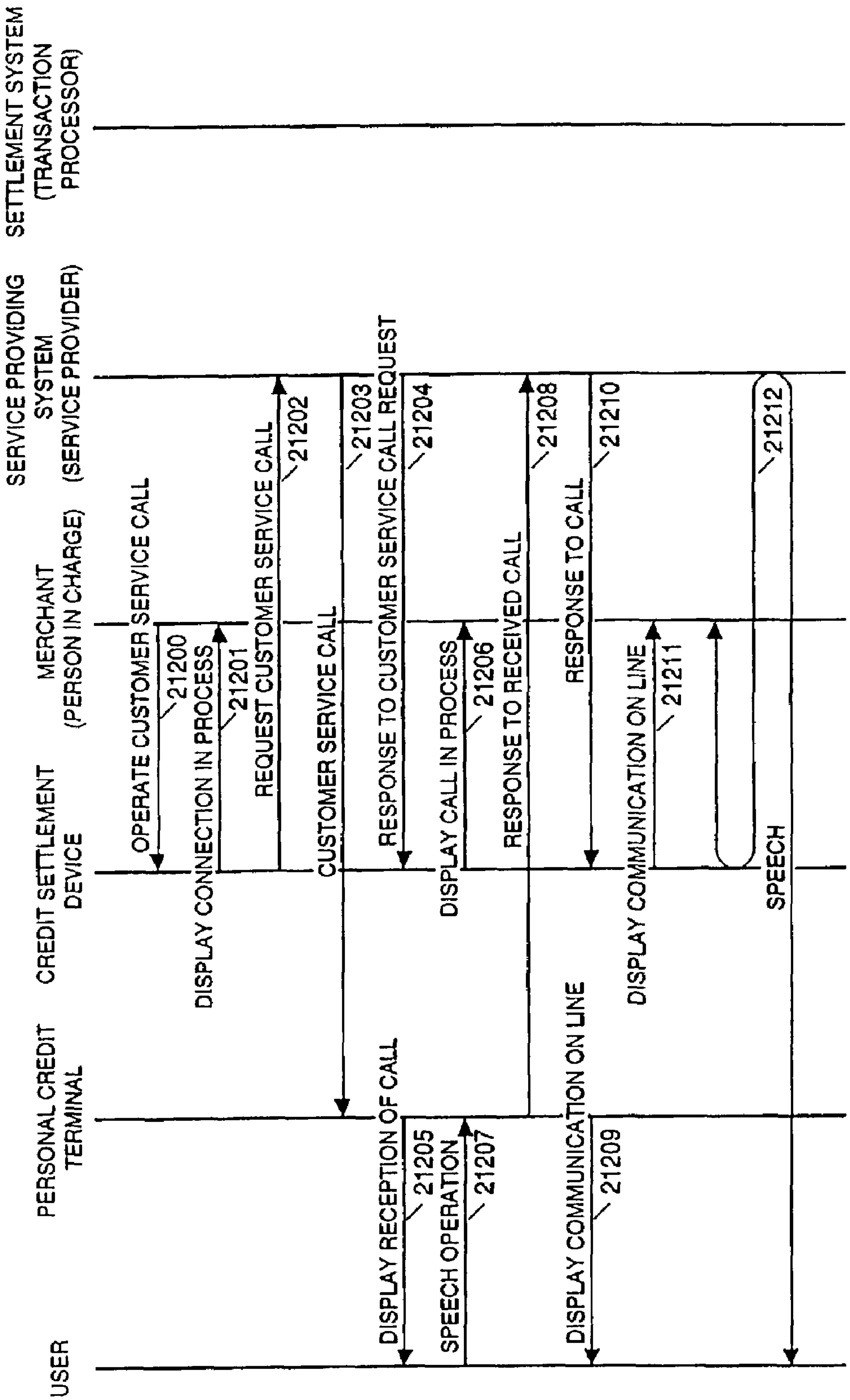
FIG. 45A is a flowchart for customer service call processing according to the second embodiment of the present invention.

In FIG. 45A is shown a flowchart for the customer service call process for the personal remote credit transaction service; in FIGS. 13A and 13B are shown examples of displays on the LCD 203 of the personal credit terminal 100 during the customer service call process; and in FIGS. 14A to 14G are shown examples of displays on the LCD 302 of the credit settlement terminal 300.

Figure 45B:
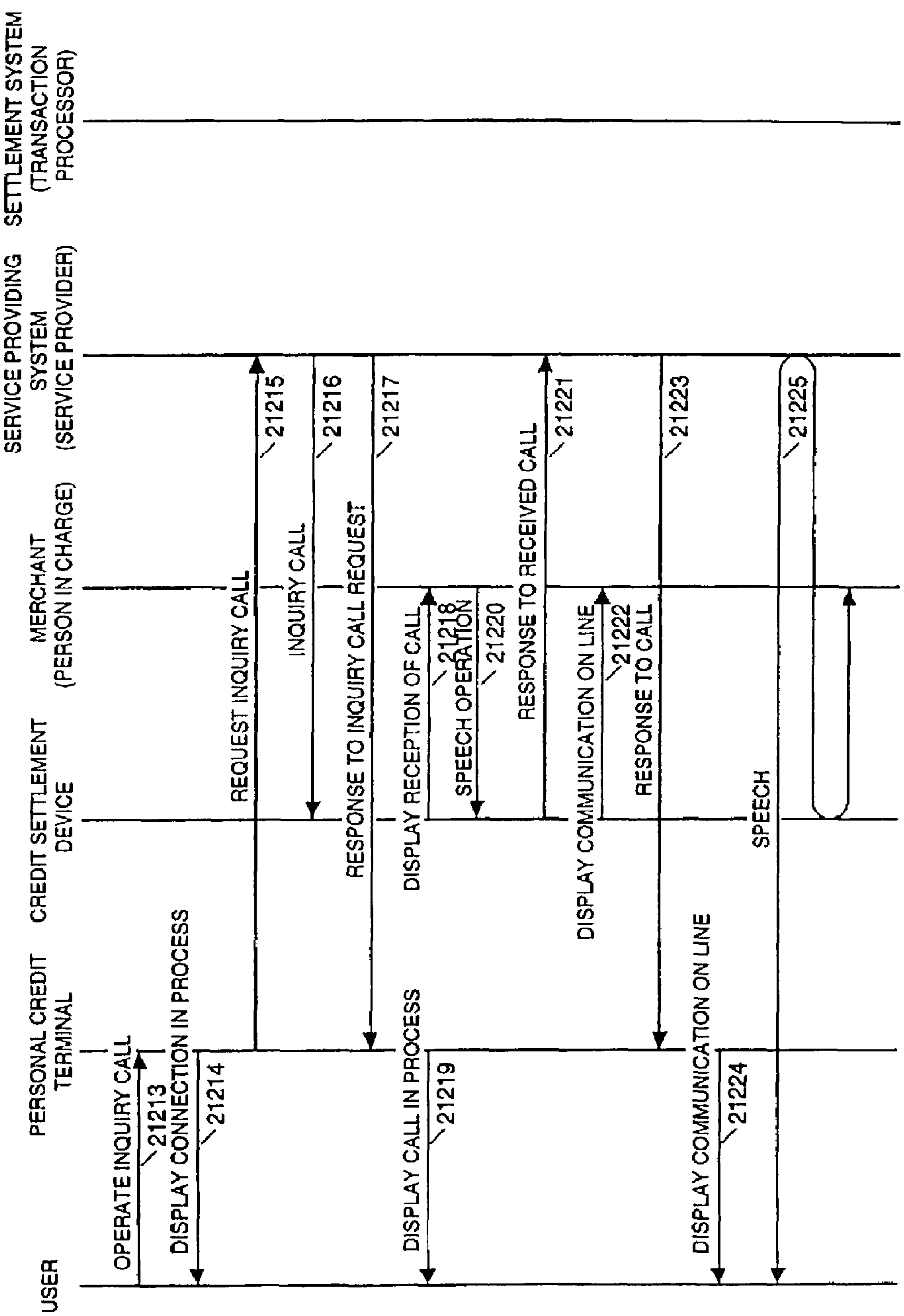
FIG. 45B is a flowchart for inquiry call processing according to the second embodiment of the present invention.

Further, in FIG. 45B is shown a flowchart for the inquiry call process for the personal remote credit transaction service; in FIG. 13C to 13F are shown examples of displays on the LCD 203 of the personal credit terminal during the inquiry process, and in FIGS. 14F and 14H are shown examples of displays on the LCD 302 of the credit settlement terminal 300.

These processes are performed in substantially the same manner as in the first embodiment.

The internal structure of the personal credit terminal 100 will now be described.

FIG. 15A is a block diagram illustrating the arrangement of the personal credit terminal 100. This terminal 100 comprises: a CPU (Central Processing Unit) 1500, which processes data to be transmitted, receives data, and controls the other components via a bus 1529; a RAM (Random Access Memory) 1502, in which data processed by the CPU 1500 are stored; a EEPROM (Electric Erasable Programmable Read Only Memory) 1503, in which are stored a terminal ID for the personal credit terminal 100, a user ID for a user, a private key and a public key, a service provider ID for the service providing system 102, and the telephone number (the digital signature of a service provider is provided for the telephone number for the service provider) and the public key of a service provider; an LCD controller 1504, which operates the LCD 203 under the control of the CPU 1500, and which displays on the LCD 203 an image set by the CPU 1500; an encryption processor 1505, which encrypts and decrypts data under the control of the CPU 1500; a data codec 1506, which codes data to be transmitted and decodes received data under the control of the CPU 1500; an infrared communication module 1507, which transmits and receives infrared rays during infrared communication; a key operation controller 1509, which detects the manipulation by the user of the mode switch 204, the speech switch 205, the end switch 206, the function switch 207, the number key switch 208, the power switch 209 and the execution switch 211; an audio processor 1511, which drives a loudspeaker 1510, a receiver 202 or a headphone jack 212, and amplifies an analog audio signal that is input through the microphone 210 or the headphone jack 212; an audio codec 1512, which encodes an analog audio signal 1542 to provide digital audio data, and decodes digital audio data to provide an analog audio signal 1543; a channel codec 1513, which generates data to be transmitted along a radio channel, and extracts, from received data, data that is addressed to the personal credit terminal 100; a modulator 1514, which modulates a serial digital signal 1547 input by the channel codec 1513 to obtain an analog transmission signal 1549 that employs as a baseband an electric signal 1552 that is generated and transmitted by a PLL 1516; a demodulator 1515, which, to obtain a serial digital signal 1548, demodulates a received analog signal 1550 that employs as a baseband an electric signal 1553 that is generated and supplied by the PLL 1516, and which transmits the serial digital signal 1548 to the channel codec 1513; an RF unit 1517, which changes the analog transmission signal 1549 received from the modulator 1514 into a radio wave and outputs it through an antenna 201, and which, upon receiving a radio wave through the antenna 201, transmits an analog reception signal 1550 to the demodulator 1515; a battery capacity detector 1518, which detects the capacity of the battery of the personal credit terminal 100; and a logic controller 1508, which activates the channel codec 1513, the PLL 1516 and the RF unit 1517, and which processes interrupt signals that are transmitted by the key operation controller 1509, the channel codec 1513 and the battery capacity detector 1518, and serves as an interface when the PU 1500 accesses the internal registers of the key operation controller 1509, the audio processor 1511 and the channel codec 1513.

The encryption processor 1505 includes a secret key encryption and decryption function and a public key encryption and decryption function. The encryption processor 1505 employs an encryption method determined by the CPU 1500, and keys to encrypt or decrypt data set by the CPU 1500. The encryption and the decryption functions of the encryption processor 1505 are employed to perform a digital signature process or a closing process for a message, to decrypt a closed and encrypted message, or to verify a digital signature accompanying a message.

The data codec 1506 encodes data to be transmitted or decodes received data under the control of the CPU 1500. In this case, the encoding is a process for generating data to be transmitted that includes communication control information and error correction information, and the decoding is a process for performing error correction on the received data and removing extra communication control information in order to obtain the data that a sender was to originally transmit.

The data codec 1506 has a function for encoding or decoding data during data communication over a digital wireless phone, and a function for encoding or decoding data during infrared communication. The data codec 1506 performs encoding or decoding determined by the CPU 1500 for data that are set by the CPU 1500.

When, for example, a closed message accompanied by a digital signature is transmitted through the employment of digital telephone communication, the CPU 1500 employs the encryption processor 1505 to perform a digital signature process and a closing process for a message, employs the data codec 1506 to encode the resultant message in a digital communication data form for a digital telephone, and transmits the message through the logic controller 1508 to the channel codec 1513.

When a closed message accompanied by a digital signature is received through the employment of digital wireless phone communication, the CPU 1500 reads the message from the channel codec 1513 via the logic controller 1508, employs the data codec 1506 to decode the message, and permits the encryption processor 1505 to decrypt the closed message and to verify the digital signature accompanying the message.

Similarly, when a closed message accompanied by a digital signature is to be transmitted by employing infrared communication, the CPU 1500 employs the encryption processor 1505 to provide a digital signature for the message and to close the message, and employs the data codec 1506 to encode the closed message accompanied by the digital signature to provide a data format suitable for infrared communication. Then, the resultant message is transmitted to the infrared communication module 1507.

When a closed message accompanied by a digital signature is received through the employment of infrared communication, the CPU 1500 reads the received message from the infrared communication module 1507, employs the data codec 1506 to decode the message, and employs the encryption processor 1505 to decrypt the closed message and to verify the digital signature accompanying the message.

The infrared communication module 1507 internally includes, as is shown in FIG. 15B, a serial/parallel converter 1560, which performs the bidirectional conversion of parallel data and serial data; a modulator/demodulator 1561, which receives a serial digital signal 1562 from the serial-parallel converter 1560 and modulates it to obtain an infrared transmission signal 1564, and which demodulates a received analog signal 1565 to obtain a serial digital signal 1563; and an infrared ray reception/emission unit 200, which converts a signal 1564 obtained by the modulator/demodulator 1561 into an infrared ray and emits it, and which converts a received infrared ray into an analog signal 1565.

Figure 46:
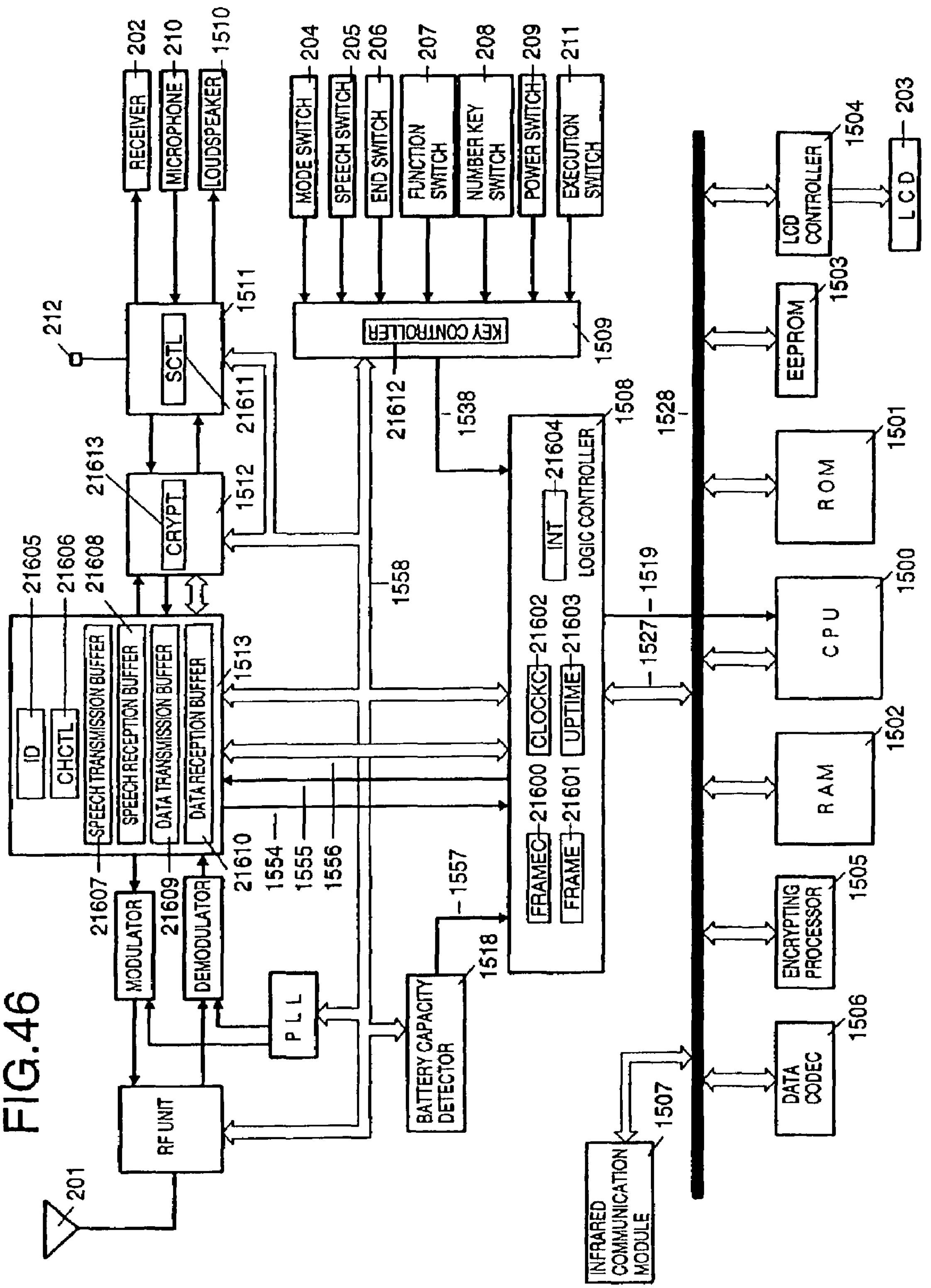
FIG. 46 is a diagram illustrating the arrangement of an internal register in the personal credit terminal according to the second embodiment of the present invention.

When the user depresses either the mode switch 204, the speech switch 205, the end switch 206, the function switch 207, the number key switch 208, the power switch 209, or the execution switch 211, the key operation controller 1509 detects the manipulation of the switch by the user and asserts an interrupt signal 1538 requesting the CPU 1500 perform a process corresponding to the switch that was manipulated. As is shown in FIG. 46, the key operation controller 1509 includes a key control register (KEYCTL) 21612 for setting the valid/invalid state of each switch. The CPU 1500 accesses the key control register (KEYCTL) 21612 to set the valid/invalid state of each switch.

The audio processor 1511 includes an audio control register (SCTL) 21611 for controlling the audio process, as is shown in FIG. 46. The CPU 1500 accesses the audio control register (SCTL) 21611 to control the operation of the audio processor 1511. When, for example, a call request transmitted over a digital wireless phone is received, the CPU 1500 accesses the audio control register (SCTL) 21611 to output a call tone for a digital wireless phone. As a result, the audio processor 1511 drives the loudspeaker 1510 to output the call tone for a digital wireless phone. It should be noted that, when a call request is from the service providing system 102, no call tone is output and the CPU 1500 begins a process for establishing a session with the service providing system 102. The process for establishing the session will be described in detail later.

The audio codec 1512 encodes an analog audio signal 1542 received from the audio processor 1511 to provide digital audio data, and decodes digital audio data received from the channel codec 1513 to provide an analog audio signal 1543. The analog audio signal 1543 is transmitted to the audio processor 1511, which amplifies the signal 1543 and drives the receiver 202 to produce sounds. The encoded digital audio data are transmitted to the channel codec 1513, which changes the data into data that can be transmitted across the radio channel.

In addition, the audio codec 1512 includes an audio data encryption key register (CRYPT) 21613 in which is stored an encryption key for the secret key cryptography method that is employed for encryption and decryption of audio data. When the audio data encryption key is set to the audio data encryption key register (CRYPT) 21613 by the CPU 1500, the audio codec 1512 encodes the analog audio signal 1542 to provide digital audio data and at the same time encrypts the digital audio data, or decodes the digital audio data to provide an analog audio signal 1543 and at the same time decrypts the digital audio data.

Two types of data to be transmitted are received by the channel codec 1513: one type is digital audio data originating at the audio codec 1512 as a digital audio signal 1546, and the other type is data-communication data originating at the CPU 1500 that pass through the logic controller 1508 as a digital signal 1566.

The channel codec 1513 adds identification data, as header information, to digital audio data and data communication data, and then converts the data into a serial digital signal 1547 having a data format suitable for a digital wireless telephone and transmits the signal 1547 to the modulator 1514.

In addition, upon receiving a serial digital signal 1548 from the demodulator 1515, the channel codec 1513 examines a terminal ID and extracts only such data as is addressed to the channel codec 1513, removes the communication control information for the digital wireless phone, identifies the digital audio data and the data communication data using the header information, and transmits these data as a digital audio signal 1546 and a digital signal 1556 to the audio codec 1512 and the logic controller 1508 respectively.

Further, upon receipt of a digital wireless call or data-communication data, the channel codec 1513 asserts an interrupt signal 1554, and upon receipt of digital audio data, brings the control signal 1544 low. The interrupt signal 1554 is a signal requesting that the CPU 1500 perform the process for a received digital wireless phone communication and a process for data communication data. The control signal 1544 ia a low-active signal for requesting the audio codec 1512 to process the received digital audio data.

In order to perform these processes, as is shown in FIG. 46, the channel codec 1513 includes: an ID register (ID) 21605, in which is stored a terminal ID; a channel codec control register (CHCTL) 21606, which controls the operation of the channel codec 1513; a audio transmission buffer 21607, in which are stored digital audio data received from the audio codec 1512; an audio reception buffer 21608, in which are stored digital audio data extracted from received data; a data transmission buffer 21609, in which are stored data communication data received from the logic controller 1508; and a data reception buffer 21610, in which are stored communication data extracted from received data.

A control signal 1545 is a control signal directing the audio codec 1512 to write and read data relative to the data transmission buffer 26107 and the data reception buffer 21608. When the control signal 1545 goes low, the digital audio data are written to the data transmission buffer 21607, and when the control signal 1545 goes high, the digital audio data are read from the data reception buffer 21609.

A control signal 1555 is a control signal directing the CPU 1500 to use the logic controller 1508 to write and read data relative to the data transmission buffer 26109 and the data reception buffer 21610. When the control signal 1555 goes low, the data-communication data are written to the data transmission buffer 21609, and when the control signal 1555 goes high, the data-communication data are read from the data reception buffer 21610.

The modulator 1514 modulates a serial digital signal 1547 received from the channel codec 1513 to provide an analog transmission signal 1549, which is employed as a baseband for an electric signal 1552 that is generated and supplied by the PLL 1516, and transmits the signal 1549 to the RF unit 1517. The analog transmission signal 1549 received by the RF unit 1517 is output as a radio wave through the antenna 201.

When a radio wave is received at the antenna 201, an analog reception signal 1550 is transmitted by the RF unit 1517 to the demodulator 1515. The demodulator 1515 demodulates the analog signal 1550, while employing as its baseband an electric signal 1553 that is generated and supplied by the PLL 1516, and transmits an obtained serial digital signal 1548 to the channel codec 1513.

The battery capacity detector 1518, for detecting the capacity of a battery, asserts an interrupt signal 1557 when the remaining capacity of the battery of the personal credit terminal 100 is equal to or less than a value Q (Q>0) set by the CPU 1500. The interrupt signal 1557 is a signal for requesting the CPU 1500 to perform a data backup process for the RAM 1502.

The value Q is large enough for the personal credit terminal 100 to communicate with the service providing system 102 in order to backup data in the RAM 1502 for the service providing system 102 (backup process)

The logic controller 1508 includes five internal registers, as is shown in FIG. 46: a frame counter (FRAMEC) 21600, a start frame register (FRAME) 21601, a clock counter (CLOCKC) 21602, an update time register (UPTIME) 21603 and an interrupt register (INT) 21604.

The frame counter 21600 is employed to count the number of frames for the digital wireless phone; the start frame register 21601 is employed to store the frame number of the frame that is to be activated next; the clock counter 21602 is employed to measure the current time; the update time register 21603 is employed to store the time at which the personal credit terminal 100 will communicate with the service providing system 102 to update data in the RAM 1502; and the interrupt register 21604 is employed to indicate the reason an interrupt is generated for the CPU 1500.

Generally, to receive a call, the digital wireless telephone intermittently acquires control data for a control channel and compares it with the terminal ID. The personal credit terminal 100 employs the frame counter 21600 and the start frame register 21601 to intermittently acquire control data. First, the number of the frame to be activated next is stored in advance in the start frame register 21601, and when the count value of the frame counter 21600 equals the value held by the start frame register 21601, to acquire control data the logic controller 1508 activates the channel codec 1513, the PLL 1516 and the RF unit 1517 via an address data signal line 1558.

When the value of the clock counter 21602 matches the value in the update time register 21603, or when one of the interrupt signals 1558, 1554 and 1557 is asserted, the logic controller 1508 writes the reason for the interrupt in the interrupt register (INT) 21604, and asserts an interrupt signal 1519 requesting the CPU 1500 perform an interrupt process. For the interrupt processing, the CPU 1500 reads the reason stored in the interrupt register 1804 and then performs a corresponding process.

The individual bit fields in the interrupt register (INT) 21604 are defined as is shown in FIG. 47A. These definitions are the same as those explained in the first embodiment while referring to FIG. 18B.

Data stored in the RAM 1502 will now be described.

Figure 48:
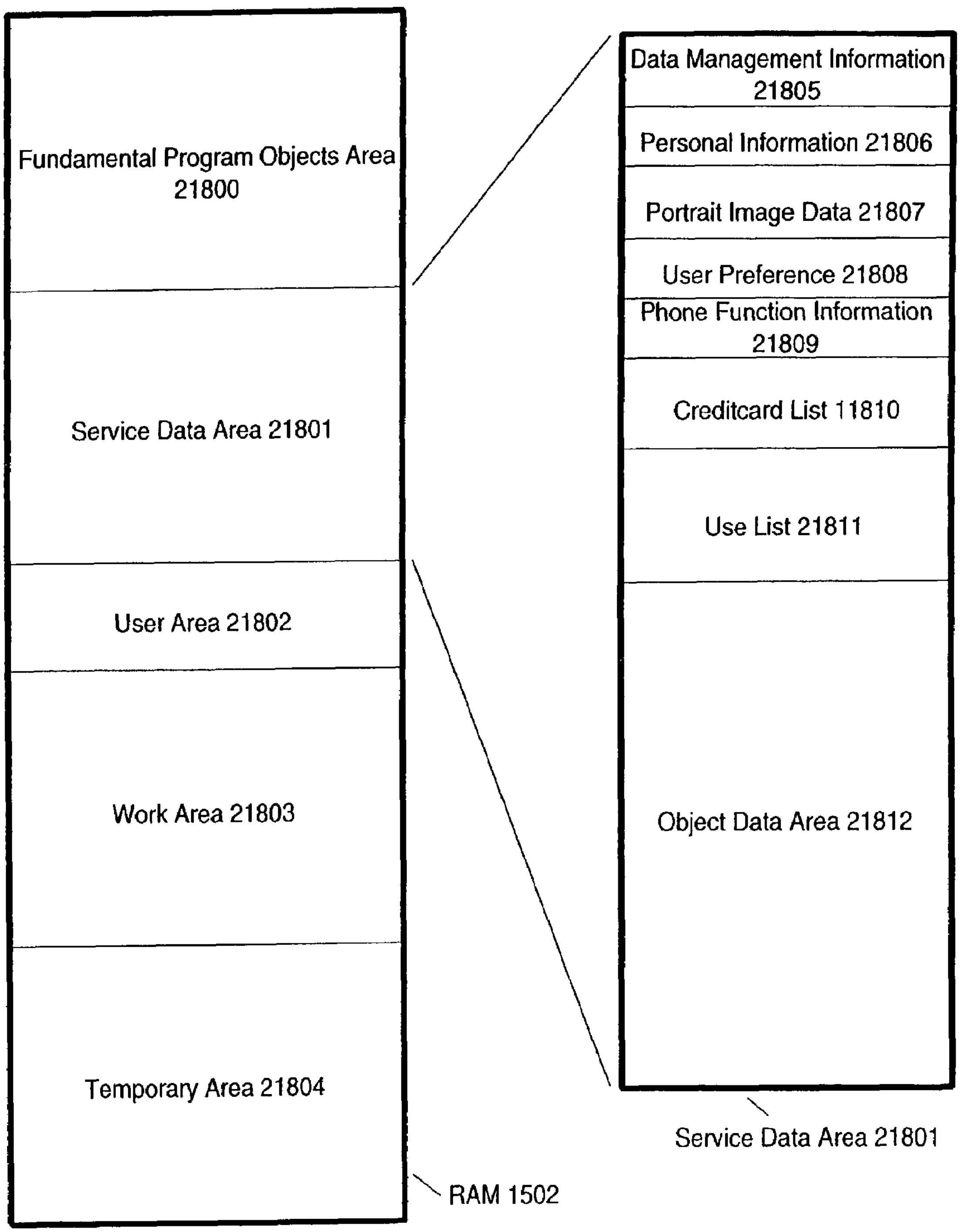
FIG. 48 is a specific diagram showing a RAM map in the personal credit terminal according to the second embodiment of the present invention.

FIG. 48 is a specific diagram showing a RAM map for data stored in the RAM 1502.

In FIG. 47B, the bit fields are characterized in terms of "interrupt" fields.

The RAM 1502 is constituted by five areas: a fundamental program objects area 21800, a service data area 21801, a user area 21802, a work area 21803, and a temporary area 21804. In the fundamental program objects area 21800 are stored an upgraded module for a program stored in the ROM 1501, and a patch program.

The user area 21802 is an area that can be freely used by a user, the work area 21803 is a work area that the CPU 1500 employs when executing a program, and the temporary area 21804 is an area in which information received by the personal credit terminal 100 is stored temporarily. The service data area 21801 is an area in which is stored ID information for the personal remote credit transaction service, credit card information, and history information; the data in this area are managed by the service providing system 102.

The service data area 21801 is constituted by eight subareas: a data management information area 21805, a personal information area 21806, a portrait image data area 21807, a user preference area 21808, a telephone function area 21809, a credit card list area 21810, a use list area 21811, and an object data area 21812. The data management information area 21805 is an area in which is stored management information for data stored in the service data area 21801; the personal information area 21806 is an area in which are stored the name, age and gender of a user; the portrait image data area 21807 is an area in which the portrait image data for the face of a user are stored; the user preference area 21808 is an area in which is stored preference information for a user concerning the personal remote credit transaction service; the telephone function information area 21809 is an area in which information concerning a digital wireless telephone is stored; the credit card list area 21810 is an area in which list information for credit cards registered by a user is stored; the use list area 21811 is an area in which is stored use history information for the personal remote credit transaction service; and the object data area 1612 is an area in which are stored object data for information managed in the other seven areas.

The information stored in the service data area 21801 will now be described in detail.

Figure 49:
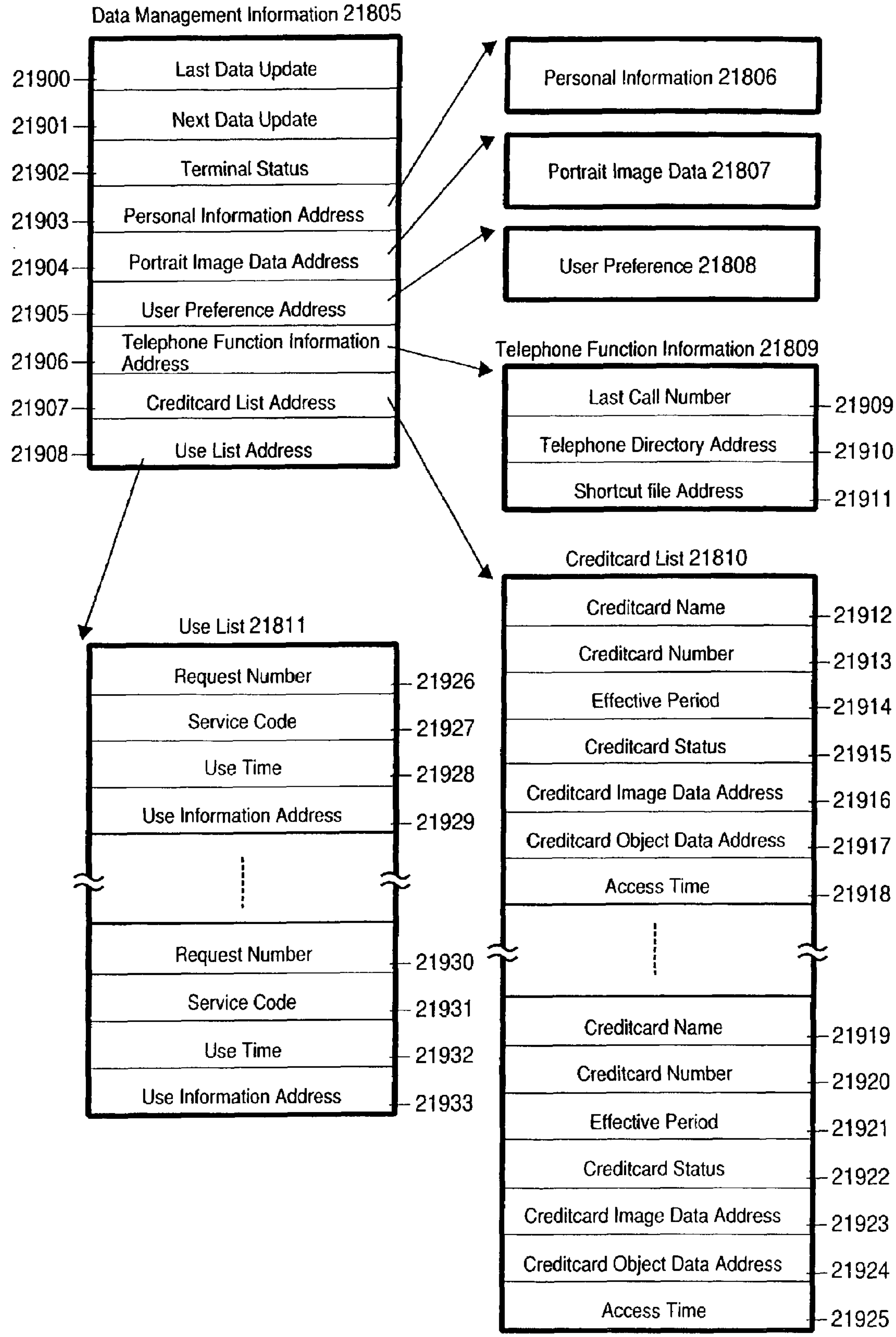
FIG. 49 is a specific diagram showing data stored in a service data area in the personal credit terminal according to the second embodiment of the present invention.

FIG. 49 is a detailed, specific diagram showing the relationship existing between information stored in the service data area 21801.

The data management information 21805 consists of nine types of information: a last data update date 21900, a next data update date 21901, a terminal status 21902, a personal information address 21903, a portrait data address 21904, a user preference address 21905, a telephone function information address 21906, a credit card list address 21907, and a use list address 21908.

The last data update date 21900 represents the date on which the service providing system 102 last updated the data in the RAM 1502, and the next data update date 21901 represents the date on which the service providing system 102 will next update data in the service data area 21801.

The value of the next data update date 21901 is set in the update time register 21603. When the next data update date 21901 is reached, the personal credit terminal 100 initiates the data updating process.

During the data updating process, the service providing system 102 updates data stored in the RAM 1502. This process is performed daily in a time period (e.g., at night) during which communication traffic is not very heavy.

The terminal status 21902 represents the status of the personal credit terminal 100; and the personal information address 21903, the portrait data address 21904, the user preference address 21905, the telephone function information address 21906, the credit card list address 21907, and the user list address 21908 respectively represent the first addresses of the areas in which a restored personal information 21806, portrait image data 21807, user preference information 21808, telephone function information 21809, a credit card list 21810, and a use list 21811.

The telephone function information 21809 consists of three types of information: a last called number 21909, an address book address 21910, and a shortcut file address 21911. The last called number 21909 represents a telephone number employed for a prior call, and is employed when re-dialing a digital wireless phone. The address book address 21910 and the shortcut file address 21911 respectively represent addresses in the object data area 21812 at which address book information and a shortcut file are stored.

The credit card list 21810 includes list information for credit cards that are registered by a user. In the credit card list 21810, seven types of information are entered for each credit card: a credit card name 21912 (21919), a credit card number 21913 (21920), an effective period 21914 (21921), a credit card status 21915 (21922), an image data address 21916 (21923), an object data address 21917 (21924), and an access time 21918 (21925).

The credit card status 21915 (21922) indicates whether or not the credit card is effective, and also the credit limit, while the image data address 21916 (21923) represents an address in the object data area 21812 at which image data for the credit card are stored. The object data address 21917 (21924) represents an address at which are stored object data for a program for the credit card, and the access time 21918 (21925) represents the last time that the user employed the credit card.

At the object data address 21917 (21924) is stored a local address that is an address in the object data area 21812, or a remote address that is an address in the user information server 402 of the service providing system 102. When a remote address is stored at the object data address 21917 (21924), and when the user selects a corresponding credit card, the personal credit terminal 100 downloads object data from the service providing system 102 to the temporary area 21804 (remote access), and executes a program for the credit card. In order to simply display the credit card, the image data at the image data address 21916 (21923) in the object data area 21812 are displayed, and object data are not downloaded.

An address to be stored at the object data address 21917 (21924) is determined by the service providing system 102. As part of the data updating process, the access times for the individual credit cards are compared, and a local address is assigned for the credit card having the latest access time. When there is adequate space in the object data area 21812, the object data addresses of all the credit cards can be local addresses.

In the use list 21811, four types of information are stored for one personal remote credit transaction service: a request number 21926 (21930), a service code 21927 (21931), a use time 21928 (21932), and a use information address 21929 (21933).

The request number 21926 (21930) uniquely represents the deal with the merchant (for a user), and is issued by the personal credit terminal 100 when it generates the payment offer 608. The service code 21927 (21931) is a code number that indicates the type of credit card service that is provided. The use time 21928 (21932) is the time at which when the personal remote credit transaction service is provided, and the use information address 21979 (21933) is an address at which a receipt is stored.

At the use information address 21929 (21933) is stored a local address that is an address in the object data area 21812, or a remote address that is an address in the user information server 402 of the service providing system 102.

When a remote address is stored at the use information address 21929 (21933), and when the user accesses the use information, the personal credit terminal 100 downloads the use information from the service providing system 102 to the temporary area 21804 and displays it on the LCD 203 (remote access).

The address stored at the use information address 21929 (21933) is also determined by the service providing system 102. A part of the data updating process, the use times for the individual use information items are compared, and a local address is assigned for the use information having the latest use time. When there is adequate space in the object data area 21812, all the use information addresses can be local addresses.

The process performed by the CPU 1500 will now be described.

FIG. 50A provides a list and descriptions of processes performed by the CPU.

Figure 51A:
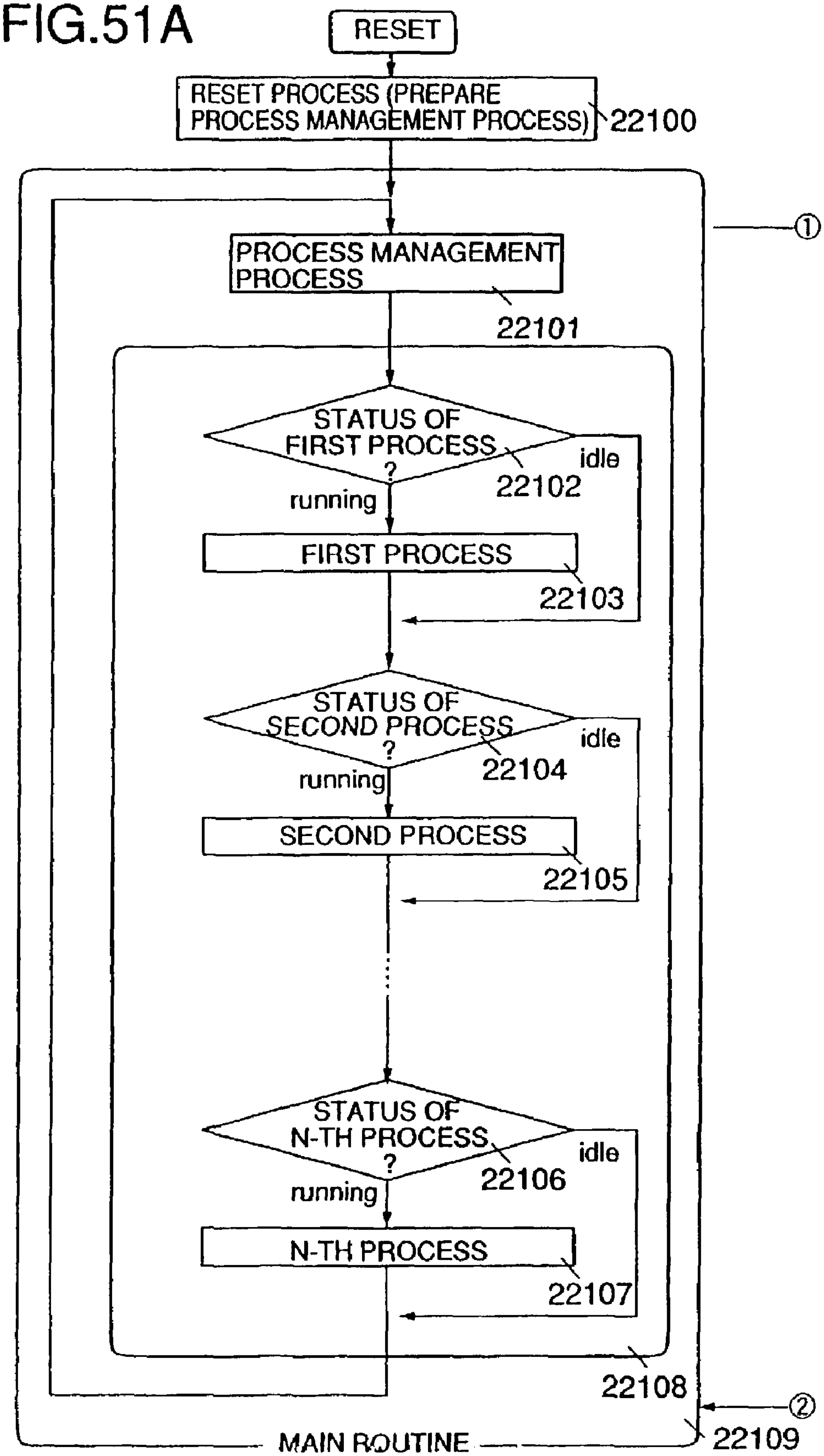
FIG. 51A is a flowchart showing one part of the processing performed by the CPU of the personal credit terminal according to the second embodiment of the present invention.
Figure 51B:
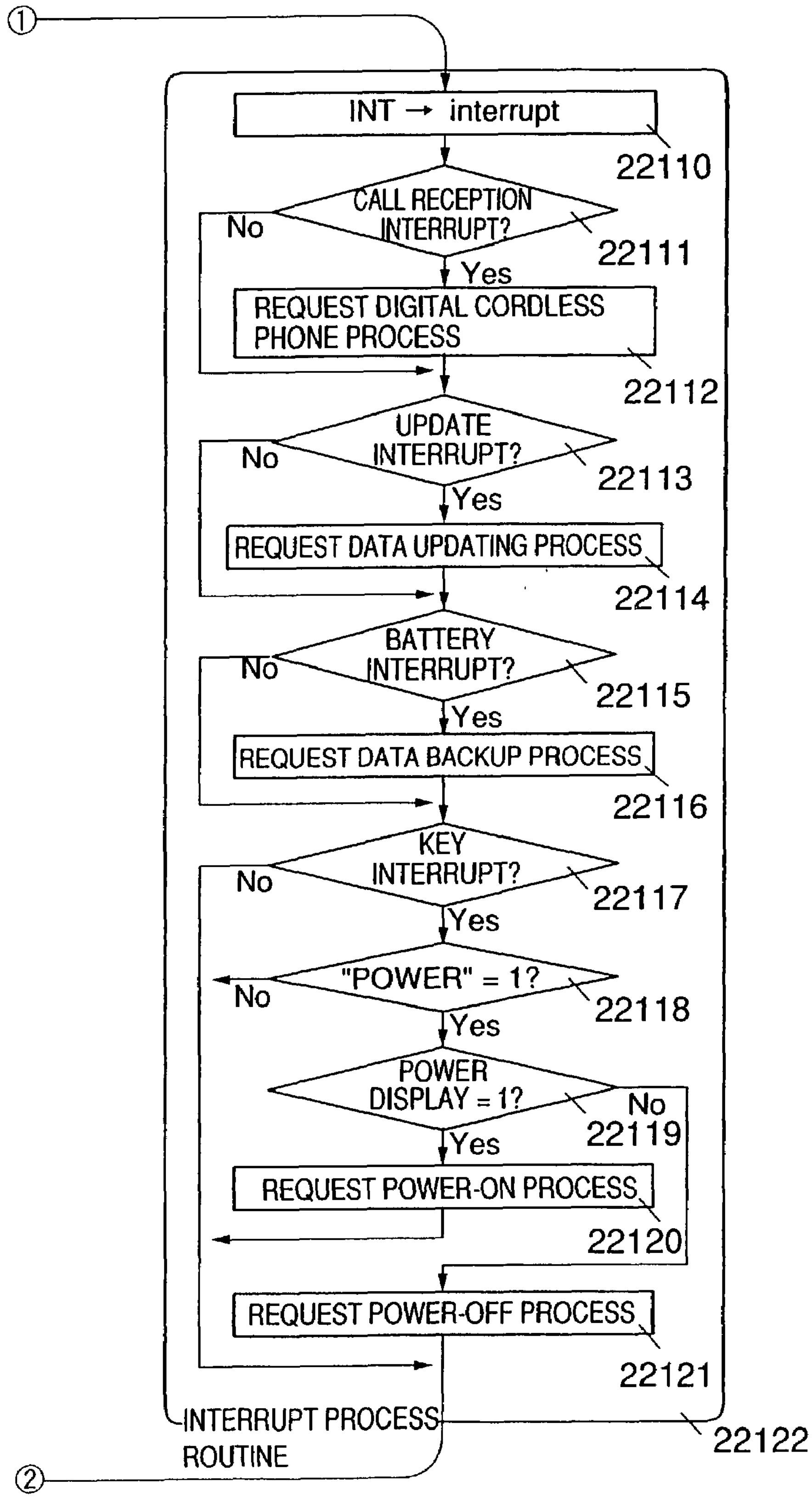
FIG. 51B is a flowchart showing the processing that follows the process shown in FIG. 51A.

FIGS. 51A and 51B are conceptual flowcharts for the processing performed by the CPU 1500.

As is shown in FIGS. 51A and 51B, the CPU 1500 performs two processes: a main routine 22109 and an interrupt process routine 22122. The main routine is a routine for processing data to be transmitted and data that are received, and for controlling the other components. The interrupt process routine is a routine for detecting a process that is required by an external interrupt. Therefore, the CPU 1500 normally performs the main routine. When an interrupt signal 1519 is asserted, the CPU 1500 jumps from the main routine to the interrupt process routine, and performs the interrupt process. When the CPU 1500 terminates the interrupt process, it returns to the main routine and restarts the process in the main routine.

There are 17 types of processes performed by the CPU 1500 in the main routine. The CPU 1500 dynamically selects a process and performs the selected process in a time-sharing manner. In FIG. 50A are shown 17 processes to be performed in the main routine.

The 17 processes performed in the main routine are: a process management process for selecting and managing a process to be performed by the CPU 1500; a power-ON process for initialization when a power switch is turned on; a power-OFF process to perform an end process when the power switch is turned off; a digital wireless phone process for a GUI (Graphical User Interface) process and a data process (e.g., setup of a shortcut dial) in a digital wireless phone mode; a credit card process for a GUI (e.g., display of a use history) and a data process in a credit card mode; a personal information management process for a GUI process (e.g., display of personal information) and a data process in a personal information management mode; a settlement processing for "transaction"; a cancellation process for "cancel"; a customer service call process for a "customer service call"; an inquiry call process for an "inquiry call"; a data updating process for updating data; a forcible data updating process for forcibly updating data; a data backup process for backing up data; a remote access process for effecting a remote access; a session establishment process for establishing a session with a service providing system; a digital wireless phone communication process for controlling digital wireless phone communication; and an infrared communication process for controlling infrared communication.

For each process, a corresponding program module is present in the fundamental program area 21802 of the ROM 1501 and the RAM 1502, and when the CPU executes these program modules, the individual processes are performed.

Furthermore, information concerning the status of the process is present for each process in the work area 21803 of the RAM 1502, and indicates the activation state ("active" or "inactive") of the process, the operating state ("running" or "idle"), and the current process step. The "active" state is used to indicate a pertinent process has been activated as a process to be performed in the main routine; the "inactive" state is used to indicate that a process has not been activated; the "running" state is used to indicate that a process is currently being performed; and the "idle" state is used to indicate that a process has been halted temporarily.

In particular, the operating states of the digital wireless phone process, the credit card process, and the personal information management process correspond to the operating modes of the personal credit terminal 100. When the operating state of the digital wireless phone process is "running," the personal credit terminal 100 is being operated in the digital wireless phone mode. When the operating state of the credit card process is "running," the personal credit terminal 100 is being operated in the credit card mode. When the operating state of the personal information management process is "running," the personal credit terminal 100 is being operated in the personal information management mode.

In all cases, the operating state "running" will refer to only one of the digital wireless phone process, the credit card process, and the personal information management process, while the state of the other processes will be "idle." Information concerning the status of a process is called a process status.

In the main routine, the CPU 1500 repetitiously performs the process management process and the process registered in the process list in a time-sharing manner. The process list is a list for processes, other than the process management process, that are being activated. The process list is updated during the process management process. The process management process is always performed in the main routine for updating the process list and the process statuses, and for selecting a process to be performed in the main routine.

Figure 50B:
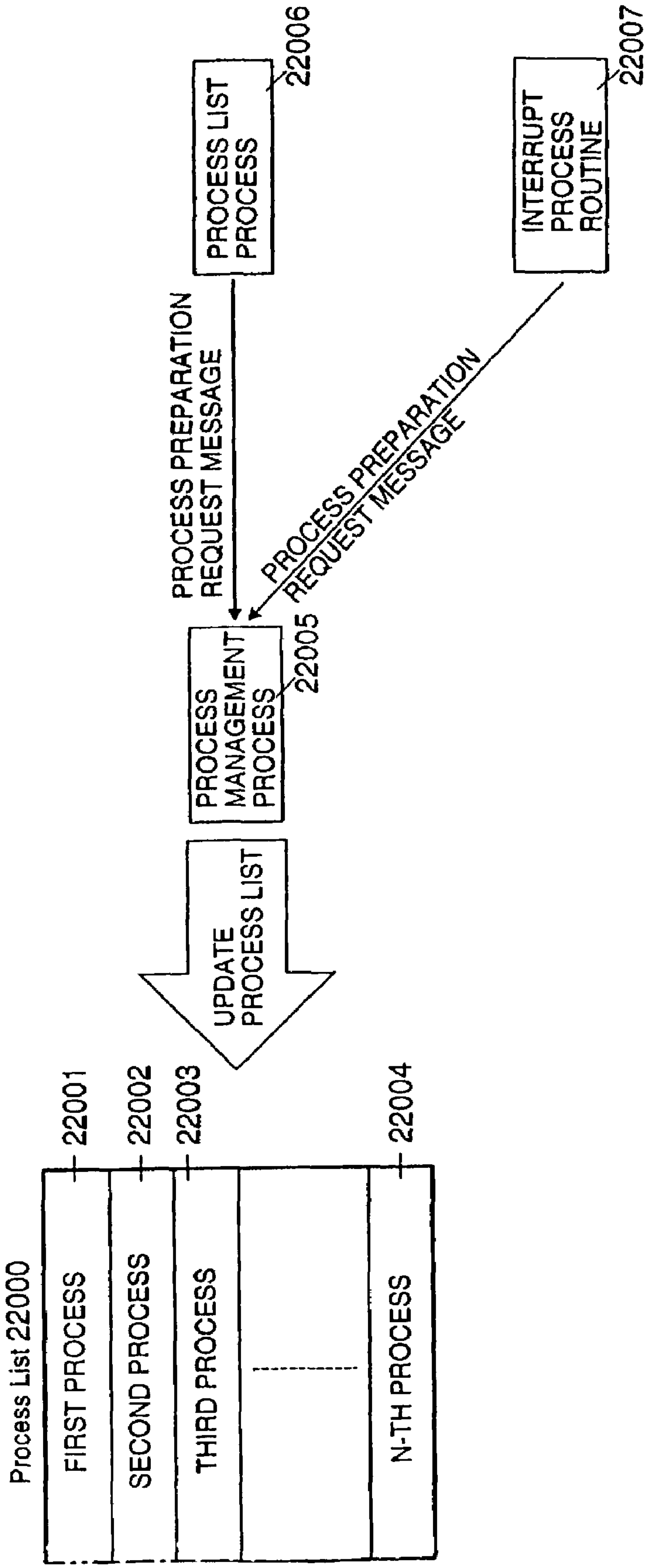
FIG. 50B is a diagram for explaining a process list updating process performed by a process management processor in the personal credit terminal according to the second embodiment of the present invention.

The process management processor 22005 updates the process list based on a process generation request, which is issued by a process in the interrupt process routine, and the process status of each process (see FIG. 50B).

FIGS. 51A and 51B are conceptual flowcharts showing the general processing performed by the CPU 1500. For this processing, N (N is an integer of 0 or greater) processes are entered in the process list, as is shown in FIG. 50B.

In FIGS. 51A and 51B, first, when the personal credit terminal 100 is reset, program control advances to step 22100, where at the CPU 1500 performs a reset process. When the reset process is completed, program control advances to step 22101. During the reset process, a variable defined in the RAM 1502 is initialized, the internal register is initialized and the process management process is generated.

At step 22101, the CPU 1500 performs the process management process to update the process list and the process statuses of the individual processes. Program control thereafter advances to step 22102 (N≧1) (when N=1, program control returns to step 22101).

At step 22102, (when N≧1) a check is performed to determine whether the status of the first process in the process list 22000 is "running" or "idle." When the status is "idle," program control advances to step 22104 (when N≧2) (when N=1, program control returns to step 22101). When the process status is "running," program control advances to step 22103, where at the first process is performed. Program control thereafter goes to step 22104 (N≧2) (when N=1, program control returns to step 22101).

At step 22104 and the following steps, the second to the N-th processes in the process list are performed following the same procedures (steps 22101 and 22103) as those employed for the first process in the process list (N≧2). When the CPU 1500 terminates the performance of the N-th process (steps 22106 and 22107), program control returns to step 22101. In other words, the CPU 1500 repeats the process at step 22101 and the process corresponding to steps 22102 to step 22107. It should be noted that the contents of the process corresponding to steps 22102 to 22107 are changed in accordance with the process management process at step 22101.

When the interrupt signal 1519 is asserted during the execution of the main routine 22109, the CPU 1500 jumps to the interrupt process routine 22122. In the interrupt process routine 22122, first, at step 22110 the CPU 1500 reads the interrupt register (INT) 21604, and copies it to the word "interrupt" in the RAM (work area). The interrupt register (INT) 21604 read by the CPU 1500 is echo-reset, and the interrupt signal 1519 is negated.

At step 22111, the interrupt bit value 28 is employed to determine whether the interrupt 1519 is a reception interrupt. When the interrupt 1519 is not a reception interrupt (interrupt (bit28)=0), program control advances to step 22113. When the interrupt 1519 is a reception interrupt (interrupt (bit28)=1), program control moves to step 22112, where at a request for generating a digital wireless phone process is transmitted to the process management processor 22005. Program control thereafter moves to step 22113.

At step 22113, the interrupt bit value 26 is employed to determine whether the interrupt 1519 is an update interrupt. When the interrupt 1519 is not an update interrupt (interrupt (bit26)=0), program control advances to step 22115. When the interrupt 1519 is an update interrupt (interrupt (bit26)=1), program control moves to step 22114, where at a request for generating a data update process is transmitted to the process management processor 22005. Program control thereafter moves to step 22115.

At step 22115, the interrupt bit value 25 is employed to determine whether the interrupt 1519 is a backup interrupt. When the interrupt 1519 is not a backup interrupt (interrupt (bit25)=0), program control advances to step 22117. When the interrupt 1557 is a backup interrupt (interrupt (bit25)=1), program control moves to step 22116, where at a request for generating a data backup process is transmitted to the process management processor 22005. Program control thereafter moves to step 22117.

At step 22117, the interrupt bit value 24 is employed to determine whether the interrupt 1519 is a key interrupt. When the interrupt 1519 is not a key interrupt (interrupt (bit24)=0), the interrupt process is terminated and program control returns to the main routine. When the interrupt 1519 is a key interrupt (interrupt (bit24)=1), program control moves to step 22118.

At step 22118, the value of the "power" bit (bit16) in the interrupt is examined. When the power bit value is 0, the interrupt process is terminated, and program control returns to the main routine. When the bit value is 1, it is assumed that the power switch has been manipulated, and program control advances to step 22119.

At step 22119, the value of the "power display" bit (bit31) in the interrupt is examined. When the value of the power display bit is 0, it is assumed that the power switch is turned off, and program control advances to step 22121. When the value of the power display bit is 1, it is assumed that the power switch is turned on, and program control advances to step 22120.

At step 22120, a request for generating a power-ON process is transmitted to the process management processor 22005, and the interrupt process is terminated.

Program control thereafter returns to the main routine.

At step 22121, a request for generating a power-OFF process is transmitted to the process management processor 22005, and the interrupt process is terminated.

Program control thereafter returns to the main routine.

When the CPU 1500 returns from the interrupt process routine 22122 to the main routine 22109, it restarts the process in the main routine beginning at the step immediately before the CPU 1500 jumped to the interrupt process routine. The process generation request, which was transmitted to the process management process in the interrupt process routine, is evaluated during the process management process at step 22101, which is first performed by the CPU 1500 when it has returned from the interrupt process routine to the main routine.

Then, the requested process is registered in the process list, and is performed during the following process in the main routine.

Figure 52A:
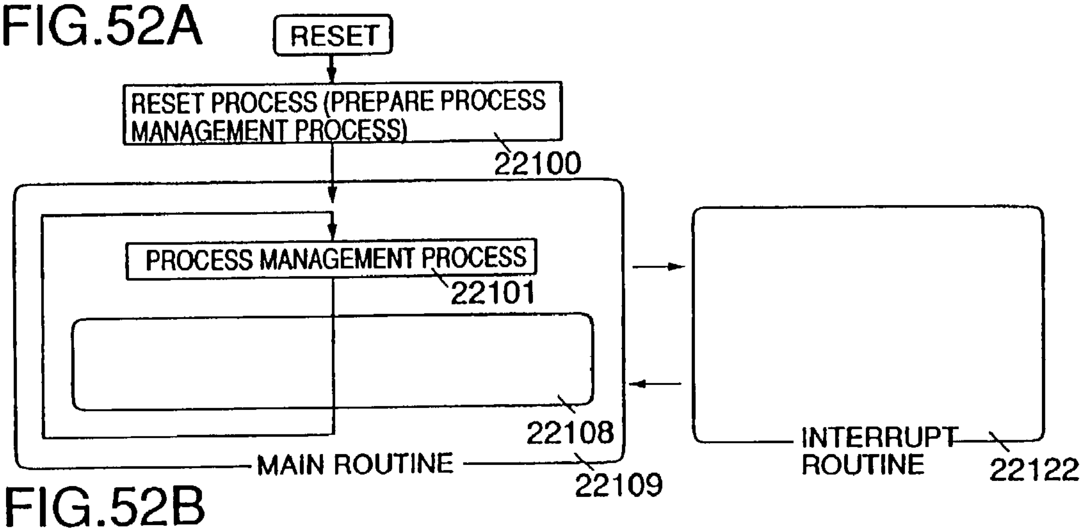
FIG. 52A is a conceptual flowchart for the reset processing performed by the CPUs of the personal credit terminal and the credit settlement terminal according to the second embodiment of the present invention.

For example, immediately after the personal credit terminal 100 is reset, no process is entered in the process list. Therefore, in the main routine the CPU 1500 repeats the process management process generated during the reset process at step 22100 (see FIG. 52A). By resetting the terminal 100, the logic controller 1508 sets a "1" in bit 24 (key interrupt) and in bit 16 ("power") in the interrupt register (INT) 21604, and the interrupt signal 1519 is asserted. At this time, if the power switch 209 is on, the CPU 1500 performs the interrupt process routine, and then performs the power-ON process in the main routine. If the power switch 209 is off, the CPU 1500 performs the interrupt process routine, and then performs the power-OFF process in the main routine.

Figure 52B:
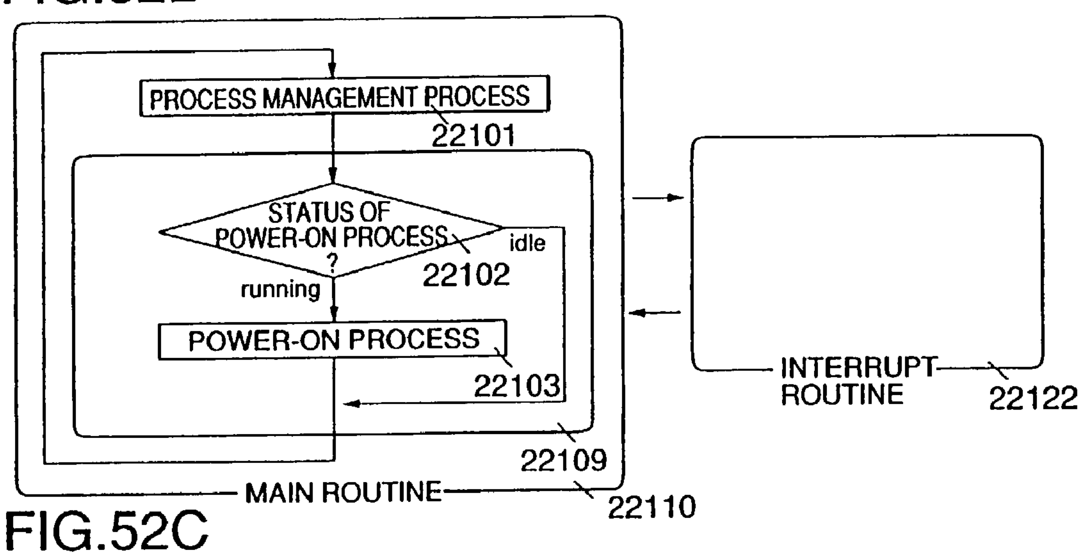
FIG. 52B is a conceptual flowchart for the power-ON processing performed by the CPUs of the personal credit terminal and the credit settlement terminal according to the second embodiment of the present invention.
Figure 52C:
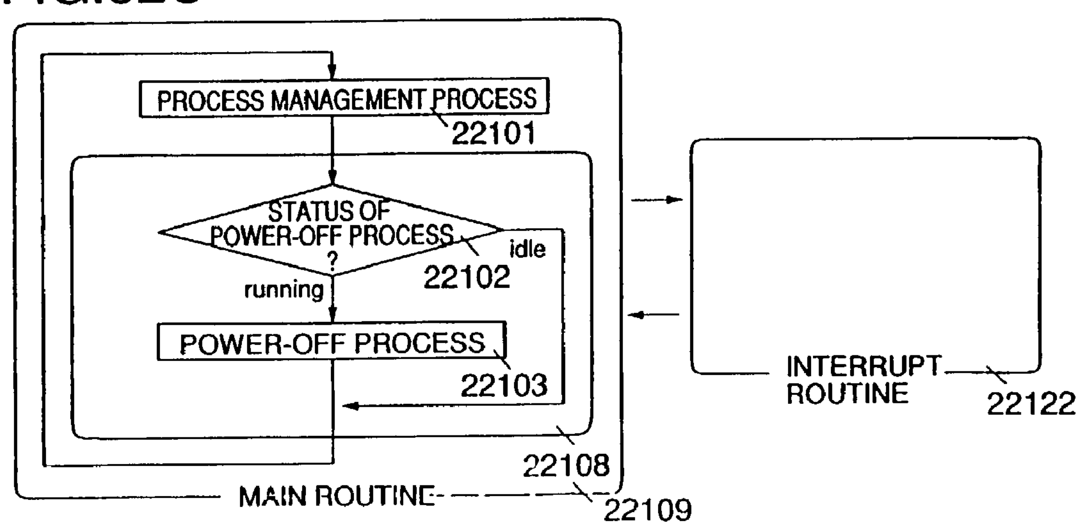
FIG. 52C is a conceptual flowchart for the power-OFF processing performed by the CPUs of the personal credit terminal and the credit settlement terminal according to the second embodiment of the present invention.

FIG. 52C is a flowchart showing the processing when the power switch 209 is turned off, or when the power switch 209 is off at the time of a reset. For the power-OFF process, the end process is performed to erase a display on the LCD or to access the key control register (KEYCTL) 21612 to set only the power switch 209 as effective. When the power-OFF process is terminated, the CPU 1500 is shifted to the halted state, and halts the process in main routine. Only when responding to an interrupt due to the power-ON operation, an update interrupt, or a backup interrupt is the CPU 1500 returned from the halted state to the normal operating state. In this case CPU 1500 performs the interrupt process routine and then restarts the process in the main routine.

FIG. 52B is a flowchart showing the processing when the power switch 209 is turned on, or when the power switch 209 is on at the time of a reset. During the power-ON process, the initial operation is performed to initialize a display on the LCD, to initialize both a variable that is defined in the RAM 1502 and an internal register, and to transmit to the process management processor 22005 requests for generating a digital wireless phone process, a credit card process and a personal information management process. Upon receiving these requests, the digital wireless phone process, the credit card process and the personal information management process are registered in the process list, and are performed in the main routine. It should be noted that since the operating state for each process is held in the process status area, the operating mode when the power switch is turned on is the operating mode existing when the power switch was powered off.

Figure 53:
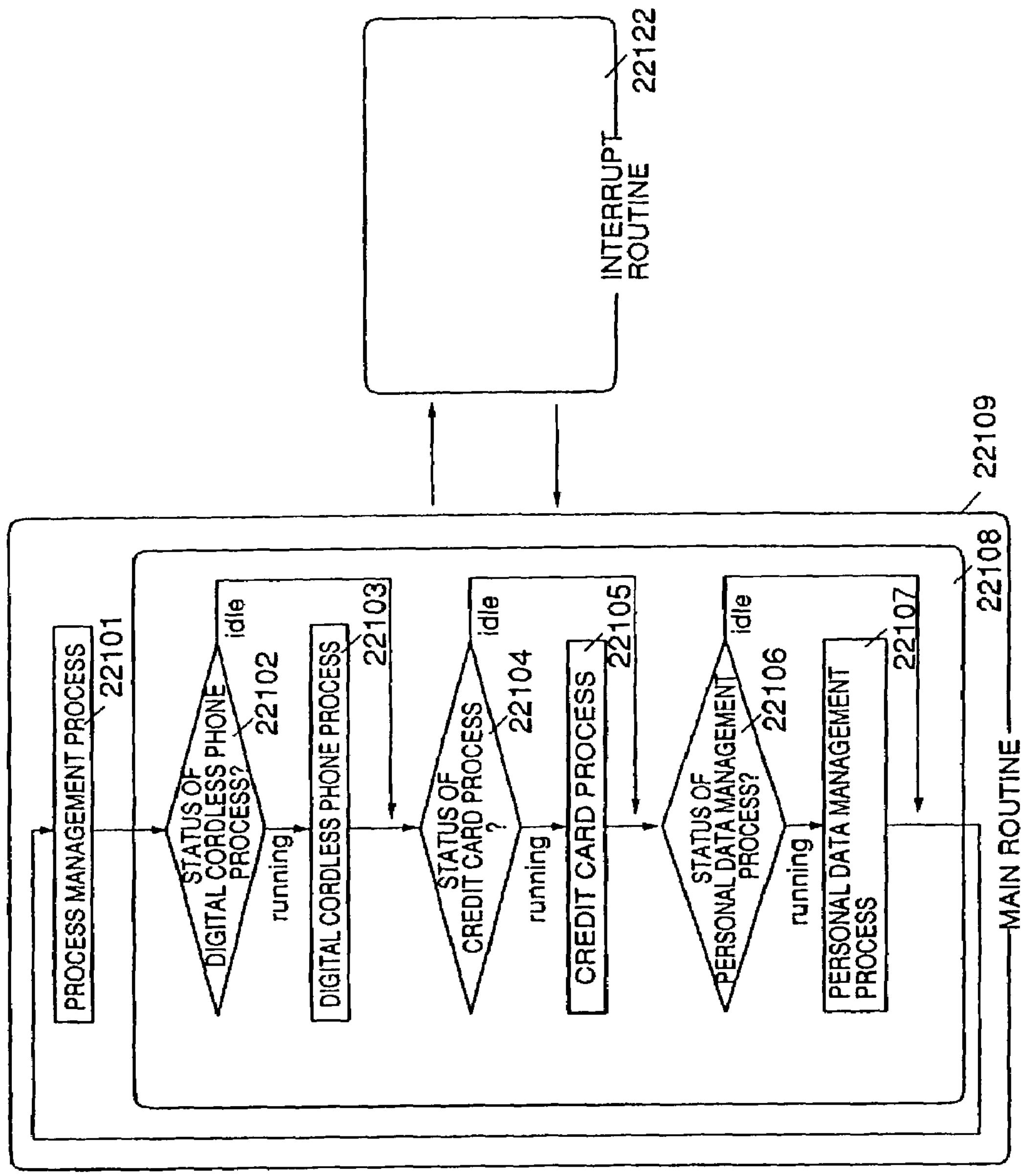
FIG. 53 is a conceptual flowchart for the normal processing performed by the CPU of the personal credit terminal according to the second embodiment of the present invention.

FIG. 53 is a flowchart showing the processing performed by the CPU 1500 when the power-ON process has been terminated, or in the normal state when the personal credit terminal 100 does not perform the process for a transaction, a cancellation, a customer service call, an inquiry call, a data update or a remote access. At this time, while the digital wireless phone process, the credit card process and the personal information management process are registered in the process list, for only one process in the process status area is "running" the operating state, and the operating mode of the personal credit terminal corresponds to the process that is in the "running" state.

As the interrupt factor for the interrupt register (INT) 21604, key manipulation by a user is copied to the word "interrupt" in the RAM 1502. The key manipulation is interpreted in the process corresponding to the operating mode of the personal credit terminal 100 (the digital wireless phone process, the credit card process or the personal information management process), and a corresponding process is performed. When the payment operation 607, the cancellation operation 904 or the inquiry call operation 1213 is performed, or when the customer service call operation 1203 is received, a request for generating a corresponding process, such as the settlement processing, the cancellation process, the inquiry call process or the customer call process, is transmitted to the process management processor 22005.

Figure 54:
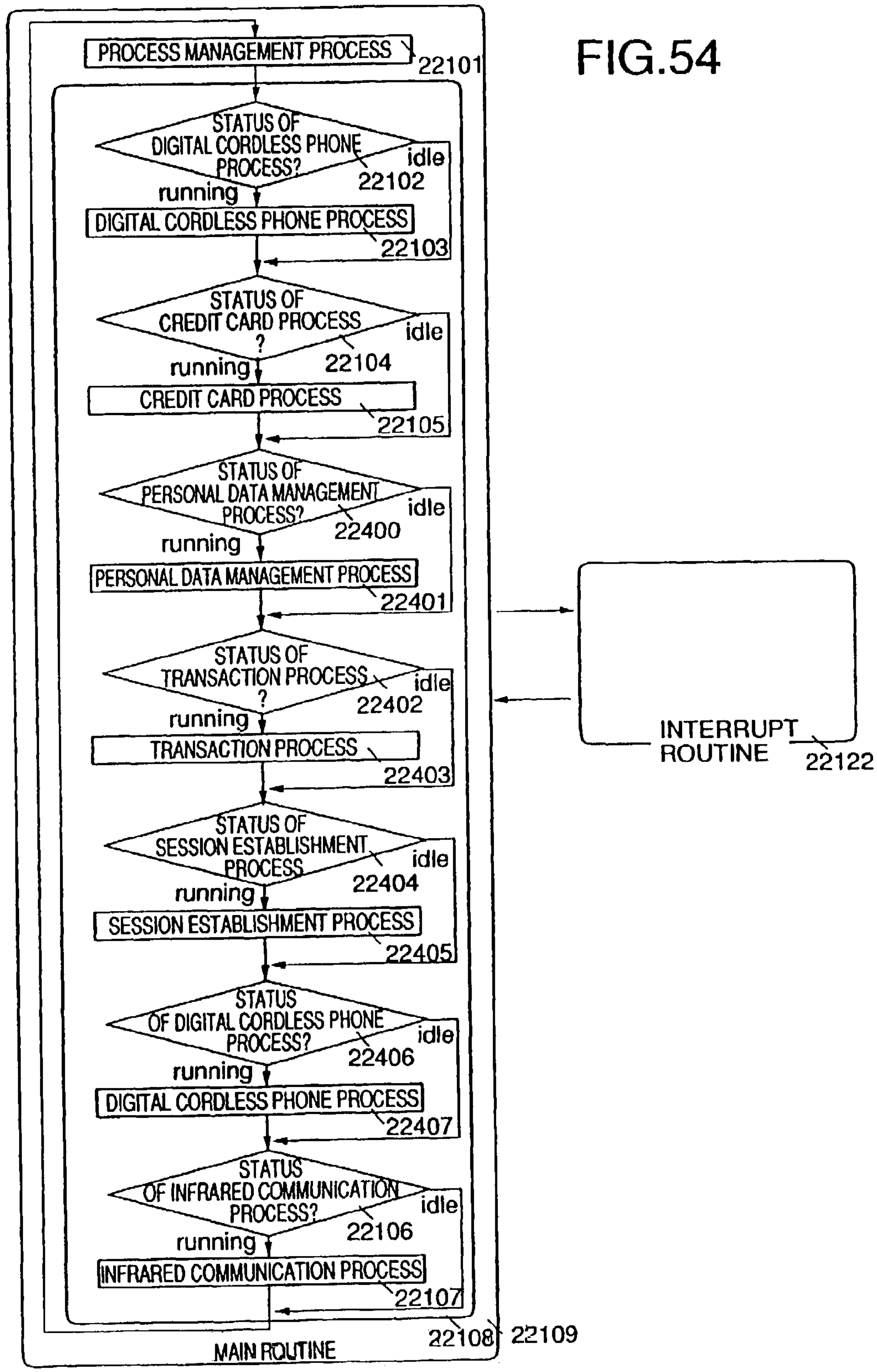
FIG. 54 is a conceptual flowchart for the settlement processing performed by the CPU of the personal credit terminal according to the second embodiment of the present invention.

FIG. 54 is a flowchart showing the processing performed by the CPU 1500 for a transaction. When the user performs the payment operation, not only the normal process, but also the settlement processing, the session establishment process, the digital wireless phone communication process and the infrared communication process are activated.

The internal structure of the credit settlement terminal 300 will now be explained.

Figures 55A, 55B:
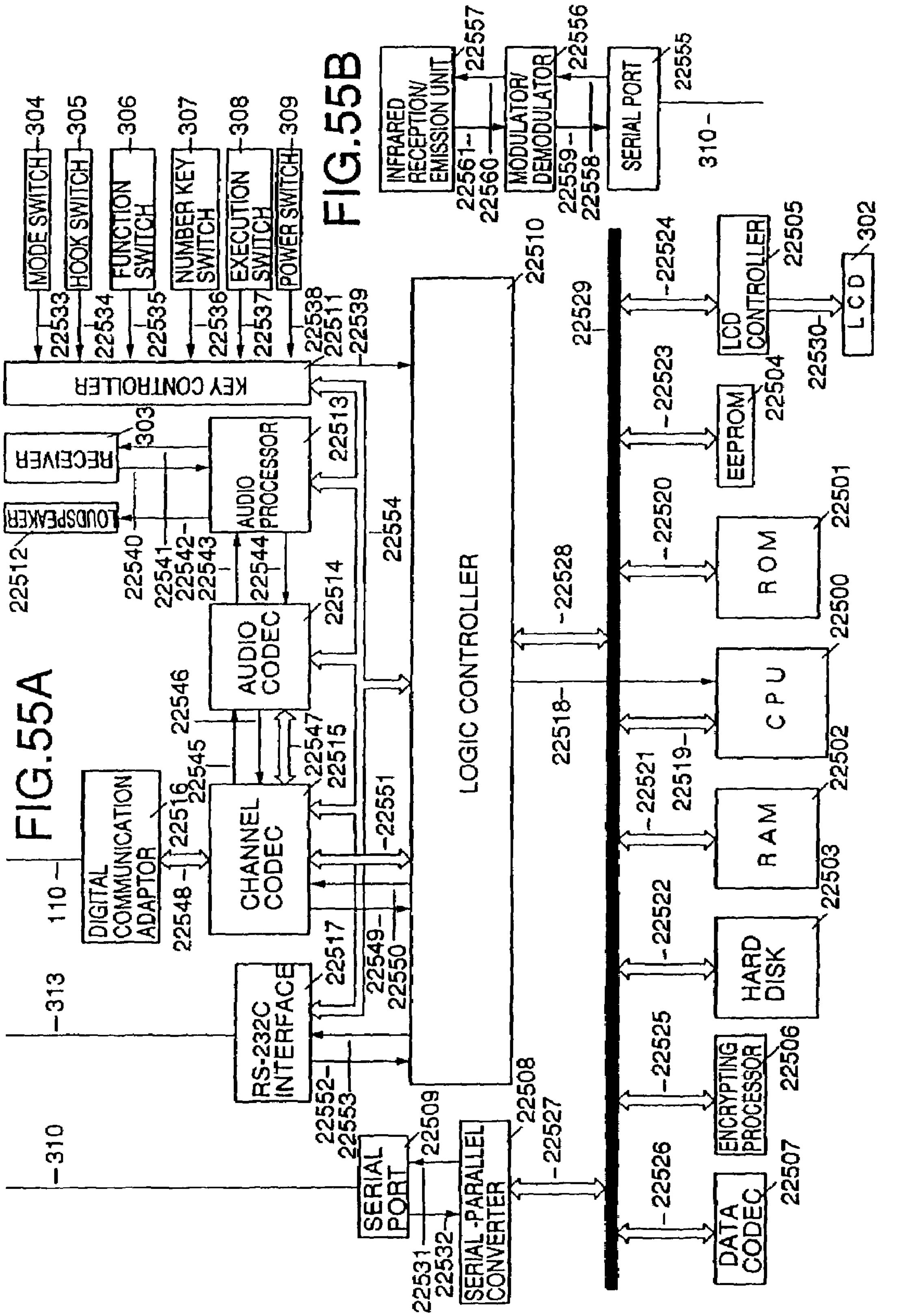
FIG. 55A is a block diagram illustrating the arrangement of the credit settlement terminal according to the second embodiment of the present invention.
FIG. 55B is a block diagram illustrating the arrangement of an infrared reception/emission module in the credit settlement terminal according to the second embodiment of the present invention.

FIG. 55A is a block diagram illustrating the arrangement of the credit settlement terminal 300.

The terminal 300 comprises: a CPU (Central Processing Unit) 22500, which processes data that is to be transmitted and data that is received in accordance with a program stored in a ROM (Read Only Memory) and which controls the other components via a bus 22529; a RAM (Random Access Memory) 22502 in which are stored data that are to be processed and data that have been processed by the CPU 22500; a hard disk 22503, on which a restored object data for information that is designated by management information for data in the RAM 22502; a EEPROM (Electric Erasable Programmable Read Only Memory) 22504, in which are stored the terminal ID of the credit settlement terminal 300, a telephone number, a merchant ID for a merchant, a private key and a public key, the service provider ID of the service providing system 102, a telephone number (a digital signature of a service provider is provided for the telephone number of the service provider), and the public key of the service provider; an LCD controller 22505, which operates the LCD 302 under the control of the CPU 22500 and which displays on the LCD 302 an image set by the CPU 22500; an encryption processor 22506, which encrypts or decrypts data under the control of the CPU 22500; a data codec 22507, which encodes data to be transmitted and decodes received data under the control of the CPU 22500; a serial-parallel converter 22508, which is connected to the infrared module 301 by the serial cable 310 at a serial port 22509 that is connected to the infrared ray emission/reception module 301, and which performs bidirectional conversion of parallel data and serial data; a key operation controller 22511, which detects a manipulation of a mode switch 304, a hook switch 305, a function switch 306, a number key switch 307, an execution switch 308 or a power switch 309, and which asserts an interrupt signal 22539; an audio processor 22513, which drives a loudspeaker 22512 and the receiver of a telephone handset 303, and which amplifies an analog audio signal received at the microphone of the telephone handset 303 and supplies the resultant signal to an audio codec 22514; an audio codec 22514 which encodes an analog audio signal 22544 to provide digital audio data and decodes digital audio data to provide an analog audio signal 22543; a channel codec 22515, which multiplexes digital audio data and data-communication data to generate data to be transmitted, and extracts digital audio data and data-communication data from multiplexed data that is received; a digital communication adaptor 22516, which is a communication adaptor for the digital phone communication line; an RS-232C interface 22517, which is an interface circuit for the RS-232C cable 313 that communicates with the cash register 311; and a logic controller 22510, which processes interrupt signals input by the key operation controller 22513, the channel codec 22515 and the RS-232C interface 22517, and which serves as an interface when the CPU 22500 accesses the internal registers of the key operation controller 22513, the audio processor 22513, the audio codec 22514, and the channel codec 22515.

The encryption processor 22506 includes a secret key encryption and decryption function and a public key encryption and decryption function. The encryption processor 22506 employs an encryption method determined by the CPU 22500, and keys to encrypt or decrypt data set by the CPU 22500. The encryption and the decryption functions of the encryption processor 22506 are employed to perform a digital signature process or a closing process for a message, to decrypt a closed and encrypted message, or to verify a digital signature accompanying a message.

The data codec 22507 encodes data to be transmitted or decodes received data under the control of the CPU 22500. In this case, the encoding is a process for generating data to be transmitted that includes communication control information and error correction information, and the decoding is a process for performing error correction on the received data and removing extra communication control information in order to obtain the data that a sender was to originally transmit. The data codec 22507 has a function for encoding or decoding data during data communication over a digital wireless phone, and a function for encoding or decoding data during infrared communication. The data codec 22507 performs encoding or decoding determined by the CPU 22500 for data that are set by the CPU 22500.

When, for example, a closed message accompanied by a digital signature is transmitted through the employment of digital telephone communication, the CPU 22500 employs the encryption processor 22506 to perform a digital signature process and a closing process for a message, employs the data codec 22507 to encode the resultant message in a digital communication data form for a digital telephone, and transmits the message through the logic controller 22510 to the channel codec 22515.

When a closed message accompanied by a digital signature is received through the employment of digital wireless phone communication, the CPU 22500 reads the message from the channel codec 225015 via the logic controller 22510, employs the data codec 22507 to decode the message, and permits the encryption processor 22506 to decrypt the closed message and to verify the digital signature accompanying the message.

Similarly, when a closed message accompanied by a digital signature is to be transmitted by employing infrared communication, the CPU 22500 employs the encryption processor 22506 to provide a digital signature for the message and to close the message, and employs the data codec 22507 to encode the closed message accompanied by the digital signature to provide a data format suitable for infrared communication. Then, the resultant message is transmitted to the serial-parallel converter 22508.

When a closed message accompanied by a digital signature is received through the employment of infrared communication, the CPU 22500 reads the received message from the serial-parallel converter 22508, employs the data codec 22507 to decode the message, and employs the encryption processor 22506 to decrypt the closed message and to verify the digital signature accompanying the message.

The infrared communication module 301 is connected via the serial cable 310 and the serial port 22509 to the serial-parallel converter 22508. As is shown in FIG. 55B, the infrared communication module 301 includes internally a serial port 25555, which functions as an interface with the credit settlement terminal 300; a modulator/demodulator 22556, which receives a digital signal 22556 from the serial-parallel converter 22508 and modulates it provide an infrared transmission signal, and which demodulates a received analog signal 22561 to provide a serial digital signal 22559; and an infrared ray reception/emission unit 22557, which converts a signal 2460 received from the modulator/demodulator 22556 into an infrared ray and then emits it, and which converts a received infrared ray into an analog signal 22561.

Figure 56:
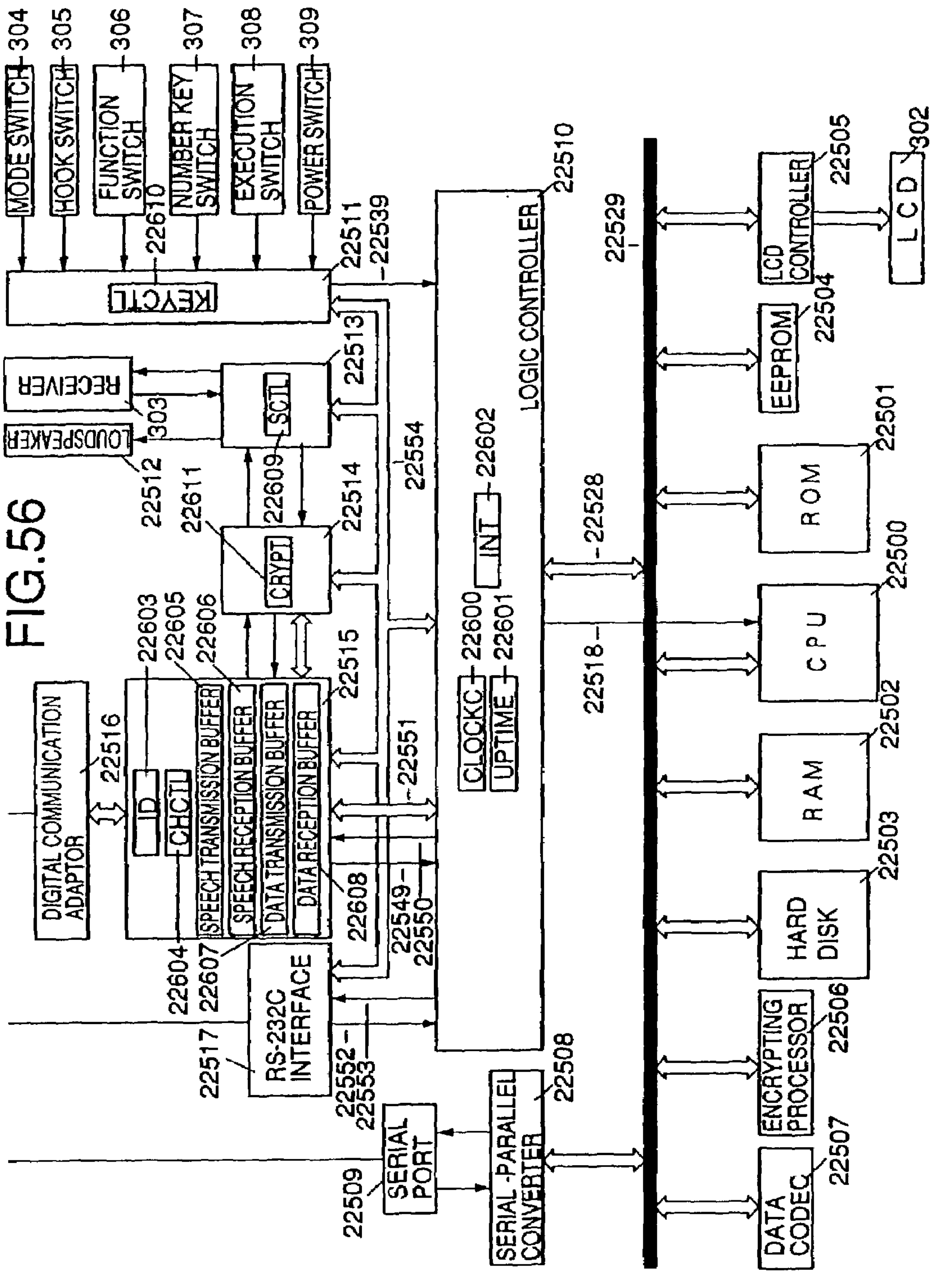
FIG. 56 is a diagram illustrating the arrangement of an internal register in the credit settlement terminal according to the second embodiment of the present invention.

When the merchant depresses either the mode switch 304, the hook switch 305, the function switch 306, the number key switch 307, the execution switch 308 or the power switch 209, the key operation controller 22511 asserts an interrupt signal 22539 requesting the CPU 22500 perform a process corresponding to the switch manipulation. As is shown in FIG. 56, the key operation controller 22511 includes a key control register (KEYCTL) 22610 for setting the valid/invalid state of each switch. The CPU 22500 accesses the key control register (KEYCTL) 22610 to set the valid/invalid state of each switch.

The audio processor 22513 includes an audio control register (SCTL) 22609 for controlling the audio process, as is shown in FIG. 56. The CPU 22500 accesses the audio control register (SCTL) 22609 to control the operation of the audio processor 22513. When, for example, a call request transmitted over a digital wireless phone is received, the CPU 22500 accesses the audio control register (SCTL) 22609 to output a call tone for a digital wireless phone. As a result, the audio processor 22513 drives the loudspeaker 22512 to output the call tone for a digital wireless phone. It should be noted that, when a call request is from the service providing system 102, no call tone is output and the CPU 22500 begins a process for establishing a session with the service providing system 102.

The audio codec 22514 encodes an analog audio signal 22544 received from the audio processor 22513 to provide digital audio data, and decodes digital audio data received from the channel codec 22515 to provide an analog audio signal 22543. The analog audio signal 22543 is transmitted to the audio processor 22513, which amplifies the signal 22543 and drives the receiver 303 to produce sounds. The encoded digital audio data are transmitted to the channel codec 22515, which changes the data into data that can be transmitted across the radio channel.

In addition, the audio codec 22514 includes an audio data encryption key register (CRYPT) 22611 in which is stored an encryption key for the secret key cryptography method that is employed for encryption and decryption of audio data. When the audio data encryption key is set to the audio data encryption key register (CRYPT) 22611 by the CPU 22500, the audio codec 22514 encodes the analog audio signal 22544 to provide digital audio data and at the same time encrypts the digital audio data, or decodes the digital audio data to provide an analog audio signal 22543 and at the same time decrypts the digital audio data.

Two types of data to be transmitted are received by the channel codec 22515: one type is digital audio data originating at the audio codec 22514 as a digital audio signal 22547, and the other type is data-communication data originating at the CPU 22500 that pass through the logic controller 22510 as a digital signal 22551.

The channel codec 22515 adds identification data, as header information, to digital audio data and data communication data, and then converts the data into a digital signal 22548 and transmits it to the digital communication adaptor 22516.

In addition, upon receiving a digital signal 22548 from the digital communication adaptor 22516, the channel codec 22515 examines a terminal ID, identifies the digital audio data and the data communication data using the header information, and transmits the respective data to the audio codec 22512 and the logic controller 22510. Further, upon receipt of a digital wireless call or data-communication data, the channel codec 22515 asserts an interrupt signal 22549, and upon receipt of digital audio data, brings the control signal 22545 low. The interrupt signal 22549 is a signal requesting that the CPU 22500 perform the process for a received digital wireless phone communication and a process for data communication data. The control signal 22545 ia a low-active signal for requesting the audio codec 22514 to process the received digital audio data.

In order to perform these processes, as is shown in FIG. 56, the channel codec 22515 includes: an ID register (ID) 22603, in which is stored a terminal ID; a channel codec control register (CHCTL) 22604, which controls the operation of the channel codec 22514; a audio transmission buffer 22605, in which are stored digital audio data received from the audio codec 22514; an audio reception buffer 22606, in which are stored digital audio data extracted from received data; a data transmission buffer 22607, in which are stored data communication data received from the logic controller 1508; and a data reception buffer 22608, in which are stored communication data extracted from received data.

A control signal 22546 is a control signal directing the audio codec 22514 to write and read data relative to the data transmission buffer 22605 and the data reception buffer 22606. When the control signal 22546 goes low, the digital audio data are written to the data transmission buffer 22605, and when the control signal 22546 goes high, the digital audio data are read from the data reception buffer 22606.

A control signal 22550 is a control signal directing the CPU 22500 to use the logic controller 22510 to write and read data relative to the data transmission buffer 22607 and the data reception buffer 22608. When the control signal 22550 goes low, the data-communication data are written to the data transmission buffer 22607, and when the control signal 22550 goes high, the data-communication data are read from the data reception buffer 22608.

The digital communication adaptor 22516 encodes a digital signal 22548 to obtain data having a format suitable for digital telephone communication, and outputs the resultant signal to a digital telephone communication line 110. The digital communication adaptor 22516 further decodes a signal received along the digital telephone communication line 110, and supplies an obtained digital signal 22548 to the channel codec 22515.

The RS-232C interface 22517 is an interface circuit for connecting the RS-232C cable 313. The credit settlement terminal 300 communicates with the cash register 311 via the RS-232C interface 22517. The RS-232C interface 22517 receives data from the cash register 311 and asserts an interrupt signal 22552 requesting the CPU 22500 exchange data with the cash register 311 via the RS-232C interface 22517.

The logic controller 22510 internally includes three registers as is shown in FIG. 56: a clock counter (CLOCKC) 22600, an update time register (UPTIME) 22601, and an interrupt register (INT) 22602.

The clock counter 22600 measures the current time; the update time register 22601 is used to store the time at which the credit settlement terminal 300 updates data in the RAM 22502 and on the hard disk 22503 through communication conducted with the service providing system 102; and the interrupt register 22602 is used to indicate for the CPU the reason an interrupt is generated.

When the value of the clock counter 22600 matches the value in the update time register 22601, or when one of the interrupt signals 22539, 22549 and 22552 is asserted, the logic controller 22510 writes the reason for the interrupt in the interrupt register (INT) 22602, and asserts an interrupt signal 22518 requesting the CPU 22500 perform an interrupt process. For the interrupt processing, the CPU 22500 reads the reason stored in the interrupt register 22602 and then performs a corresponding process.

The individual bit fields in the interrupt register (INT) 22602 are defined as is shown in FIG. 57A. These definitions are the same as those explained in the first embodiment while referring to FIG. 27B.

In FIG. 57B, the bit fields are characterized in terms of "interrupt" fields.

Data stored in the RAM 22502 will now be described.

Figure 58:
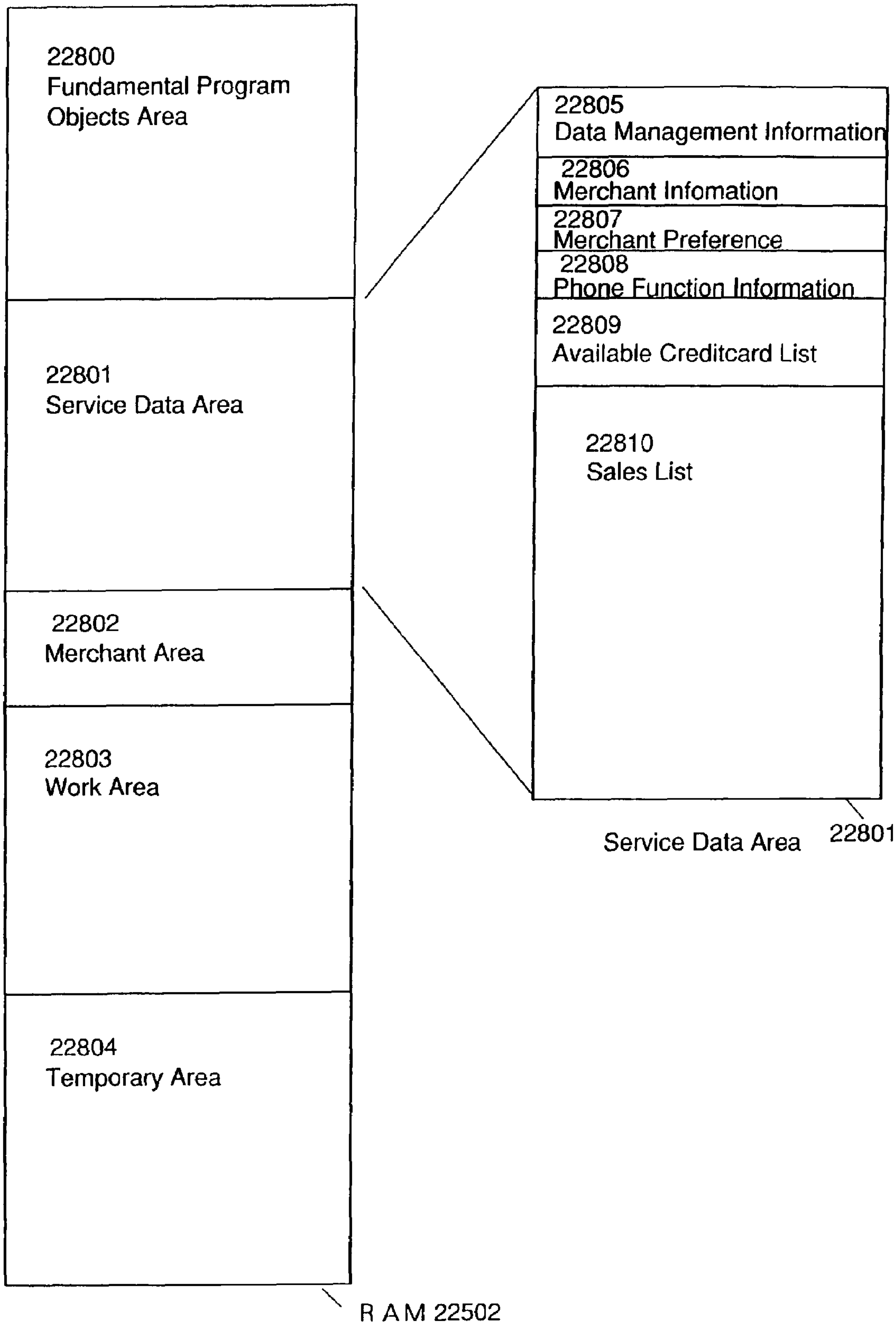
FIG. 58 is a specific diagram showing a RAM map in the credit settlement terminal according to the second embodiment of the present invention.

FIG. 58 is a specific diagram showing a RAM map for data stored in the RAM 22502.

The RAM 22502 is constituted by five areas: a fundamental program objects area 22800, a service data area 22801, merchant data 22802, a work area 22803, and a temporary area 22804. In the fundamental program objects area 22800 are stored an upgraded module for a program stored in the ROM 22501, and a patch program. The merchant area 22802 is an area that can be freely used by a merchant, the work area 22803 is a work area that the CPU 22500 employs when executing a program, and the temporary area 22804 is an area in which information received by the personal credit terminal 100 is stored temporarily.

The service data area 22801 is an area in which is stored ID information for the personal remote credit transaction service, credit card information, and history information; the data in this area are managed by the service providing system 102.

The service data area 22801 is constituted by six sub-areas: a data management information area 22805, a merchant information area 22806, a merchant preference area 22807, a telephone function area 22808, an available credit card list area 22809 and a sales list area 22810.

The data management information area 22805 is an area in which is stored management information for data stored in the service data area 22801; the merchant information area 22806 is an area in which is stored information such as the name of a merchant and the contents of a contract with a service provider; the merchant preference area 22807 is an area in which is stored preference information for a merchant that concerns the personal remote credit transaction service; the telephone function information area 22808 is an area in which information concerning a digital telephone is stored; the available credit card list area 22809 is an area in which is stored list information for credit cards the merchant can handle; and the sales list area 22810 is an area in which is stored sales information for the personal remote credit transaction service.

The information stored in the service data area 22801 will now be described in detail.

Figure 59:
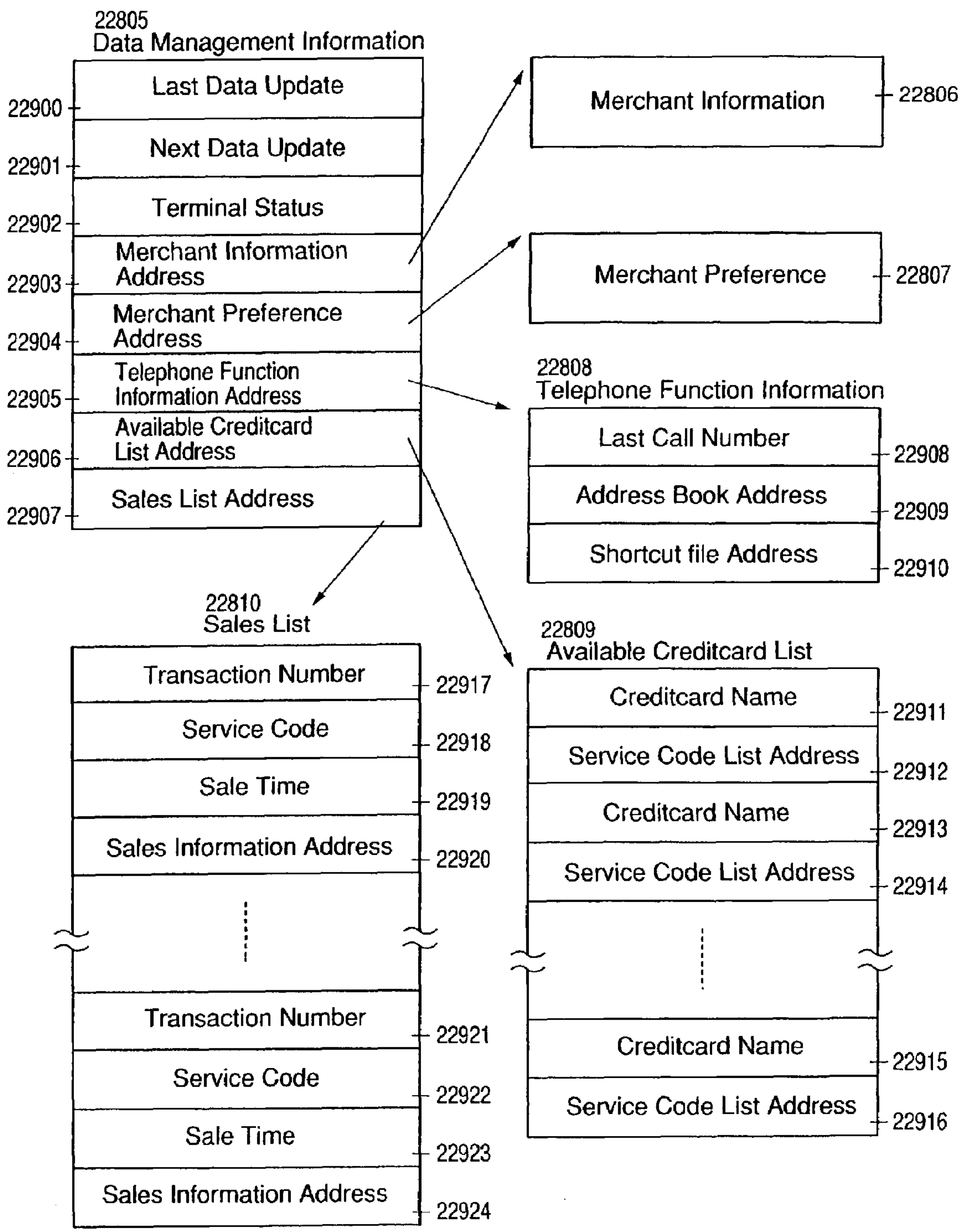
FIG. 59 is a specific diagram showing data stored in a service data area in the credit settlement terminal according to the second embodiment of the present invention.

FIG. 59 is a detailed, specific diagram showing the relationships established for information stored in the service data area 22801.

The data management information 22805 consists of eight types of information: a last data update date 22900, a next data update date 22901, a terminal status 22902, a merchant information address 22903, a merchant preference address 22904, a telephone function information address 22905, a credit card list address 22906, and a sales list address 22907.

The last data update date 22900 represents the date on which the service providing system 102 last updated the data in the RAM 22502 and on the hard disk 22503, and the next data update date 22901 represents the date on which the service providing system 102 will next update the data in the service data area 22801. The credit settlement terminal 300 automatically initiates an update process when the time set according to the next data update date 22901 is reached. The data updating process is a process whereby the service providing system 102 updates the data held in the service data area 22801.

The value of the next data update date 22901 is set in the update time register 21603. When the next data update date 21901 is reached, the personal credit terminal 100 initiates the data updating process.

During the data updating process, the service providing system 102 updates data stored in the RAM 22502 or on the hard disk 22503. This process is performed daily in a time period (e.g., at night) during which communication traffic is not very heavy.

The terminal status 22902 represents the status of the credit settlement terminal 300; and the merchant information address 22903, the merchant preference address 22904, the telephone function information address 22905, the credit card list address 22906, and the sales list address 22907 respectively represent the first addresses for the areas in which are stored the merchant information 22806, the merchant preference information 22807, the telephone function information 22808, the available credit card list 22809 and the sales list 22810.

The telephone function information 22808 consists of three types of information: a last called number 22908, an address book address 22909 and a shortcut file address 22910. The last called number 22908 represents a telephone number for a prior call placed by the merchant, and is employed for the re-dialing of a digital telephone. The address book address 22909 and the shortcut file address 22910 respectively represent addresses on the hard disk 22503 at which address book information and a shortcut file are stored.

The available credit card list 22809 includes list information for credit cards that can be handled by a merchant. In the available credit card list 22809, two types of information are entered for each credit card: a credit card name 22911 (22913 or 22915), and a service code list address 22912 (22914 or 22916). The credit card name 22911 (22913 or 22915) represents the name of a credit card that the merchant can handle, and the service code list address 22912 (22914 or 22916) is an address on the hard disk 22503 at which is stored a service code list that shows the types of services that can be provided by the merchant when the credit card is used. The service code list is a list for service codes that the merchant can handle and payment option codes.

The sales list 22810 is used to store sales information for the personal remote credit transaction service. In the sales list 22810, four types of information are stored for one personal remote credit transaction service: a transaction number 22917 (22921), a service code 22918 (22922), a sale time 22919 (22923) and a sales information address 22920 (22924).

The transaction number 22917 (22921) uniquely represents a deal with the user, and is issued by the credit settlement terminal 300 when it generates the payment offer response 609. The service code 22918 (22922) is a code number that indicates the type of credit card service that is provided for the user.

The sale time 22919 (22923) is the time at which the personal remote credit transaction service was provided, and the sales information address 22920 (22924) is an address at which a clearing confirmation notification is stored.

At the sales information address 22920 (22924) is stored a local address, which is an address on the hard disk 22503, for a remote address that is an address entered in the merchant information server 403 of the service providing system 102. When a remote address is stored at the sales information address 22920 (22924), and when the merchant accesses the sales information, the credit settlement terminal 300 downloads the sales information from the service providing system 102 to the temporary area and displays it on the LCD 302.

The address stored at the sales information address 22920 (22924) is also determined by the service providing system 102. As part of the data updating process, the sale times for the individual sales information items are compared, and a local address is assigned to the sales information for the latest sale time. When there is adequate on the hard disk 22503, all the sales information addresses can be local addresses.

The process performed by the CPU 22500 will now be described.

Figure 61A:
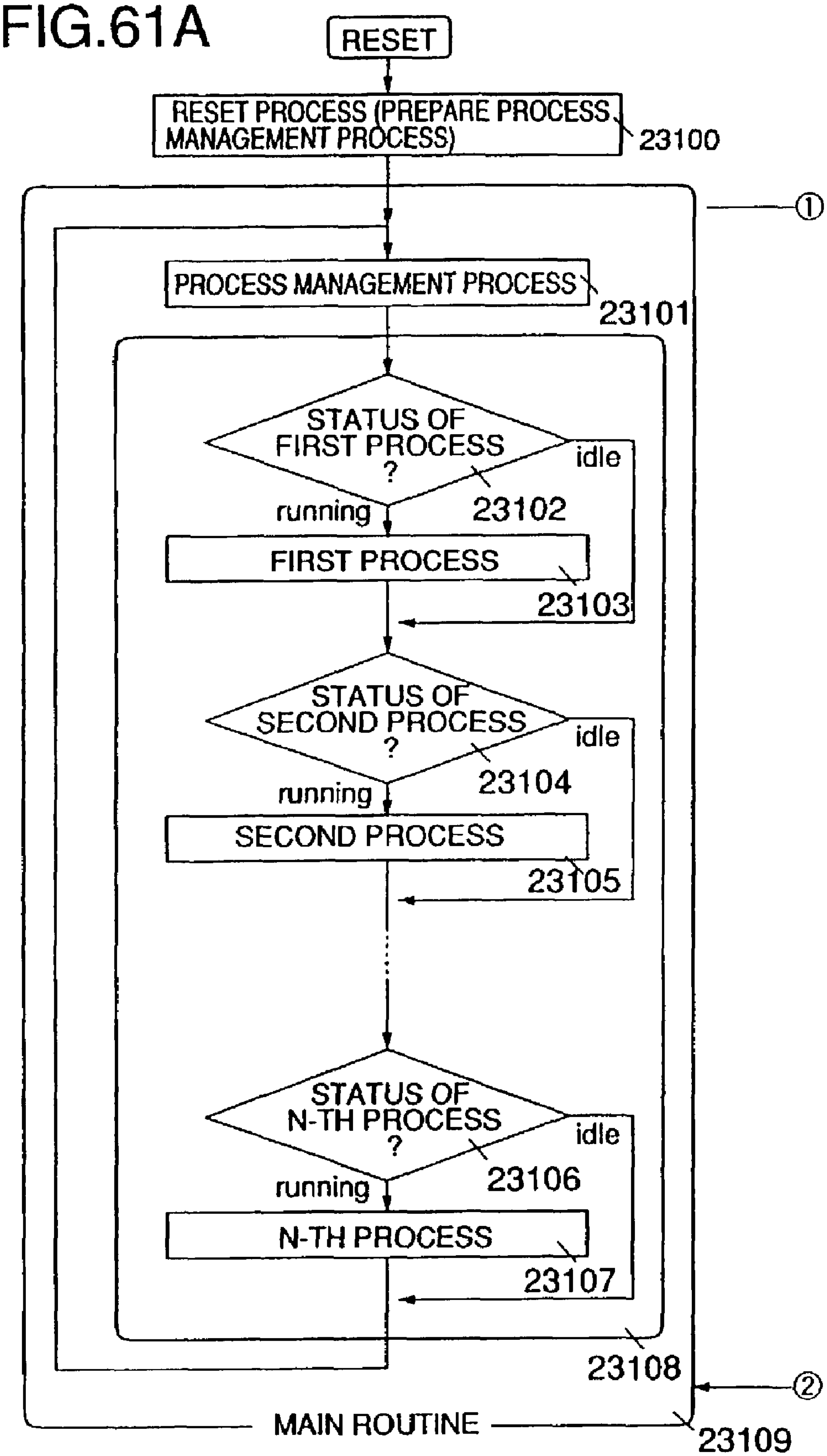
FIG. 61A is a flowchart showing one part of the processing performed by the CPU of the credit settlement terminal according to the second embodiment of the present invention.
Figure 61B:
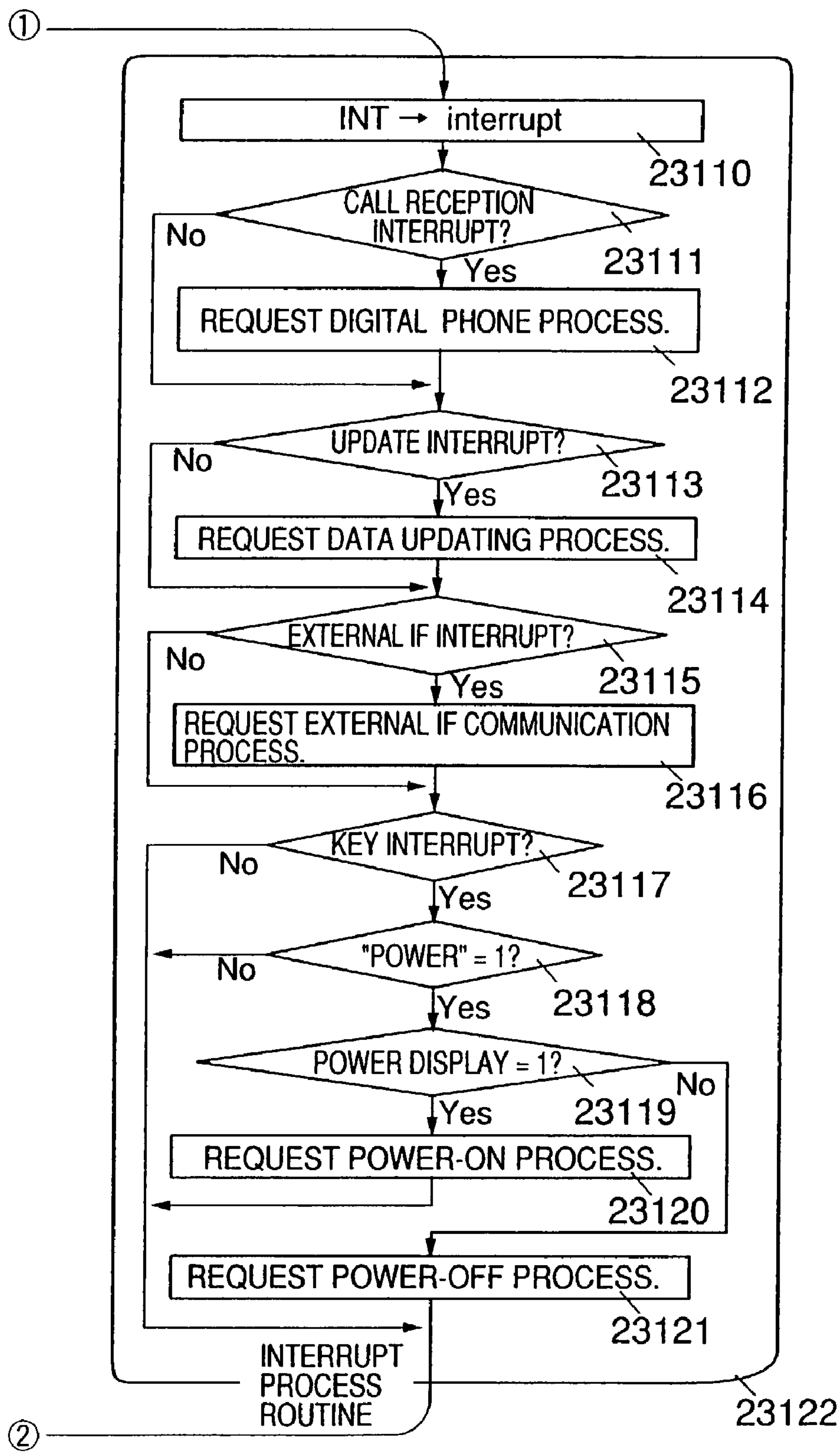
FIG. 61B is a flowchart showing the processing that follows the process shown in FIG. 61A.

FIGS. 61A and 61B are conceptual flowcharts for the processing performed by the CPU 22500.

As is shown in FIGS. 61A and 61B, the CPU 22500 performs two processes: a main routine 23109 and an interrupt process routine 23122. The main routine is a routine for processing data to be transmitted and data that are received, and for controlling the other components. The interrupt process routine is a routine for detecting a process that is required by an external interrupt. Therefore, the CPU 22500 normally performs the main routine. When an interrupt signal 1519 is asserted, the CPU 22500 jumps from the main routine to the interrupt process routine, and performs the interrupt process. When the CPU 22500 terminates the interrupt process, it returns to the main routine and restarts the process in the main routine.

There are 17 types of processes performed by the CPU 22500 in the main routine. The CPU 22500 dynamically selects a process and performs the selected process in a time-sharing manner. In FIGS. 60A, 60A-1, 60A-2 and 60A-3 are shown 17 processes to be performed in the main routine.

The 17 processes performed in the main routine are: a process management process for selecting and managing a process to be performed by the CPU 22500; a power-ON process for initialization when a power switch is turned on; a power-OFF process to perform an end process when the power switch is turned off; a digital phone process for a GUI (Graphical User Interface) process and a data process (e.g., setup of a shortcut dial) in a digital phone mode; a credit settlement processing for a GUI (e.g., display of a sales history) and a data process in a credit card mode; a merchant information management process for a GUI process (e.g., display of merchant information) and a data process in a merchant information management mode; a settlement processing for "transaction"; a cancellation process for "cancel"; a customer service call process for a "customer service call"; an inquiry call process for an "inquiry call"; a data updating process for updating data; a forcible data updating process for forcibly updating data; a remote access process for effecting a remote access; a session establishment process for establishing a session with a service providing system; a digital phone communication process for controlling digital phone communication; an infrared communication process for controlling infrared communication; and an external interface communication process for controlling data communication via an RS-232C interface.

For each process, a corresponding program module is present in the fundamental program area 21802 of the ROM 22501 and the RAM 22502, and when the CPU 22500 executes these program modules, the individual processes are performed.

Furthermore, information concerning the status of the process is present for each process in the work area 21803 of the RAM 22502, and indicates the activation state ("active" or "inactive") of the process, the operating state ("running" or "idle"), and the current process step. The "active" state is used to indicate a pertinent process has been activated as a process to be performed in the main routine; the "inactive" state is used to indicate that a process has not been activated; the "running" state is used to indicate that a process is currently being performed; and the "idle" state is used to indicate that a process has been halted temporarily.

In particular, the operating states of the digital phone process, the credit settlement processing, and the merchant information management process correspond to the operating modes of the credit settlement terminal 300. When the operating state of the digital phone process is "running," the credit settlement terminal 300 is being operated in the digital phone mode. When the operating state of the credit settlement processing is "running," the credit settlement terminal 300 is being operated in the credit transaction mode. When the operating state of the merchant information management process is "running," the credit settlement terminal 300 is being operated in the merchant information management mode. In all cases, the operating state "running" will refer to only one of the digital phone process, the credit settlement processing, and the merchant information management process, while the state of the other processes will be "idle." Information concerning the status of a process is called a process status.

In the main routine, the CPU 22500 repetitiously performs the process management process and the process registered in the process list in a time-sharing manner. The process list is a list for processes, other than the process management process, that are being activated. The process list is updated during the process management process. The process management process is always performed in the main routine for updating the process list and the process statuses, and for selecting a process to be performed in the main routine.

Figure 60B:
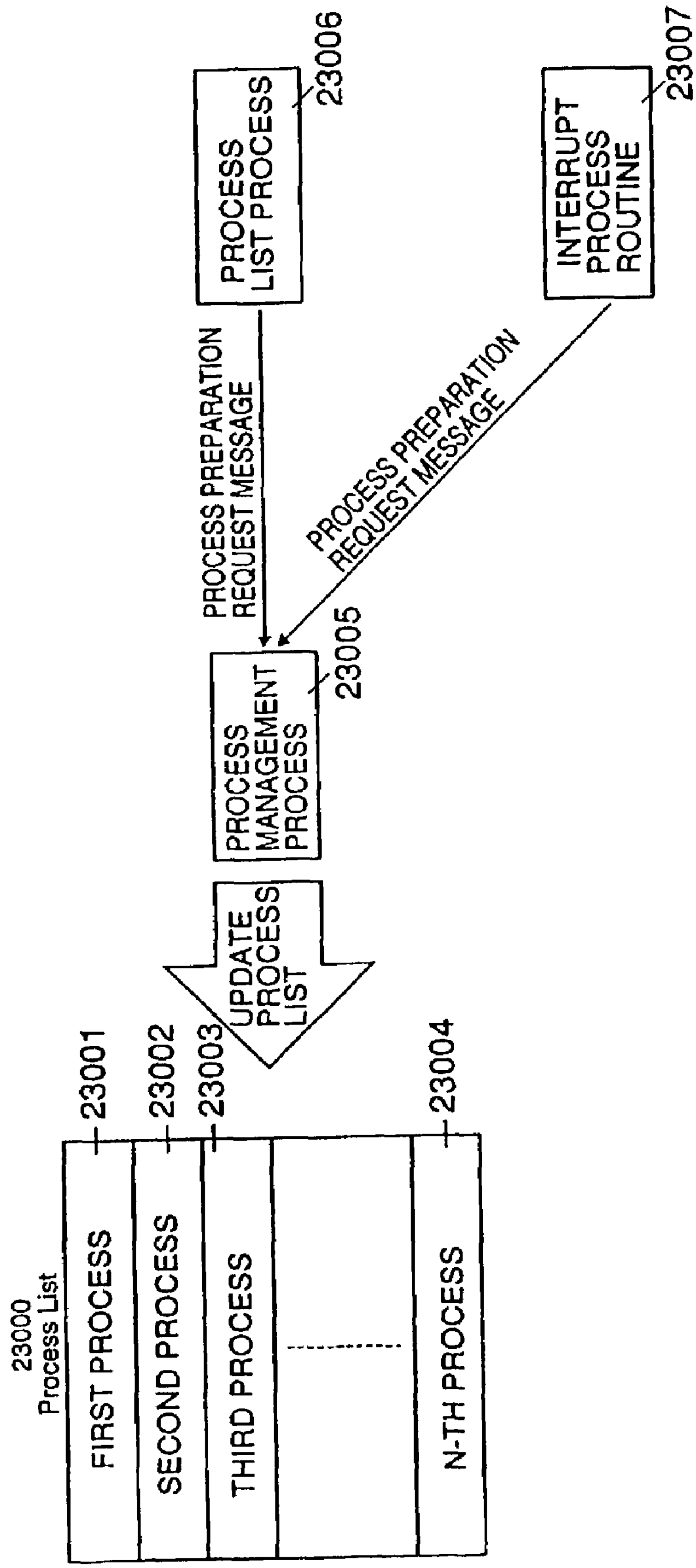
FIG. 60B is a diagram for explaining a process list updating process performed by a process management processor in the credit settlement terminal according to the second embodiment of the present invention.

The process management processor 22005 updates the process list based on a process generation request, which is issued by a process in the interrupt process routine, and the process status of each process (see FIG. 60B).

FIGS. 61A and 61B are conceptual flowcharts showing the general processing performed by the CPU 22500. For this processing, N (N is an integer of 0 or greater) processes are entered in the process list, as is shown in FIG. 60B.

In FIGS. 61A and 61B, first, when the credit settlement terminal 300 is reset, program control advances to step 23100, where at the CPU 22500 performs a reset process. When the reset process is completed, program control advances to step 23101. During the reset process, a variable defined in the RAM 22502 is initialized, the internal register is initialized and the process management process is generated.

At step 23101, the CPU 22500 performs the process management process to update the process list and the process statuses of the individual processes. Program control thereafter advances to step 23102 (N>1) (when N=1, program control returns to step 23101).

At step 23102, (when N≧1) a check is performed to determine whether the status of the first process in the process list 23000 is "running" or "idle." When the status is "idle," program control advances to step 23104 (when N≧2) (when N=1, program control returns to step 23101). When the process status is "running," program control advances to step 23103, where at the first process is performed. Program control thereafter goes to step 23104 (N≧2) (when N=1, program control returns to step 23101).

At step 23104 and the following steps, the second to the N-th processes in the process list are performed following the same procedures (steps 23101 and 23103) as those employed for the first process in the process list (N≧2). When the CPU 22500 terminates the performance of the N-th process (steps 23106 and 23107), program control returns to step 23101. In other words, the CPU 22500 repeats the process at step 23101 and the process corresponding to steps 23102 to step 23107. It should be noted that the contents of the process corresponding to steps 23102 to 23107 are changed in accordance with the process management process at step 22101.

When the interrupt signal 22518 is asserted during the execution of the main routine 23109, the CPU 22500 jumps to the interrupt process routine 23122. In the interrupt process routine 23122, first, at step 23110 the CPU 22500 reads the interrupt register (INT) 22602, and copies it to the word "interrupt" in the RAM (work area). The interrupt register (INT) 22602 read by the CPU 22500 is echo-reset, and the interrupt signal 22518 is negated.

At step 23111, the interrupt bit value 28 is employed to determine whether the interrupt 22518 is a reception interrupt. When the interrupt 22518 is not a reception interrupt (interrupt (bit28)=0), program control advances to step 23113. When the interrupt 22518 is a reception interrupt (interrupt (bit28)=1), program control moves to step 23112, where at a request for generating a digital phone process is transmitted to the process management processor 23005. Program control thereafter moves to step 23113.

At step 23113, the interrupt bit value 26 is employed to determine whether the interrupt 22518 is an update interrupt. When the interrupt 22518 is not an update interrupt (interrupt (bit26)=0), program control advances to step 23115. When the interrupt 22518 is an update interrupt (interrupt (bit26)=1), program control moves to step 23114, where at a request for generating a data update process is transmitted to the process management processor 23005. Program control thereafter moves to step 23115.

At step 23115, the interrupt bit value 25 is employed to determine whether the interrupt 22518 is an external IF interrupt. When the interrupt 22518 is not an external IF interrupt (interrupt (bit25)=0), program control advances to step 23117. When the interrupt 22518 is an external IF interrupt (interrupt (bit25)=1), program control moves to step 23116, where at a request for generating an external IF communication process is transmitted to the process management processor 23005. Program control thereafter moves to step 23117.

At step 23117, the interrupt bit value 24 is employed to determine whether the interrupt 22518 is a key interrupt. When the interrupt 22518 is not a key interrupt (interrupt (bit24)=0), the interrupt process is terminated and program control returns to the main routine. When the interrupt 22518 is a key interrupt (interrupt (bit24)=1), program control moves to step 23118.

At step 23118, the value of the "power" bit (bit16) in the interrupt is examined. When the power bit value is 0, the interrupt process is terminated, and program control returns to the main routine. When the bit value is 1, it is assumed that the power switch has been manipulated, and program control advances to step 23119.

At step 23119, the value of the "power display" bit (bit31) in the interrupt is examined. When the value of the power display bit is 0, it is assumed that the power switch is turned off, and program control advances to step 23121. When the value of the power display bit is 1, it is assumed that the power switch is turned on, and program control advances to step 23120.

At step 23120, a request for generating a power-ON process is transmitted to the process management processor 23005, and the interrupt process is terminated. Program control thereafter returns to the main routine.

At step 23121, a request for generating a power-OFF process is transmitted to the process management processor 23005, and the interrupt process is terminated. Program control thereafter returns to the main routine.

When the CPU 22500 returns from the interrupt process routine 23122 to the main routine 23109, it restarts the process in the main routine beginning at the step immediately before the CPU 22500 jumped to the interrupt process routine. The process generation request, which was transmitted to the process management process in the interrupt process routine, is evaluated during the process management process at step 23101, which is first performed by the CPU 22500 when it has returned from the interrupt process routine to the main routine. Then, the requested process is registered in the process list, and is performed during the following process in the main routine.

For example, immediately after the credit settlement terminal 300 is reset, no process is entered in the process list. Therefore, in the main routine the CPU 22500 repeats the process management process generated during the reset process at step 22100 (see FIG. 52A). By resetting the terminal 300, the logic controller 22510 sets a "1" in bit 24 (key interrupt) and in bit 16 ("power") in the interrupt register (INT) 22602, and the interrupt signal 22518 is asserted. At this time, if the power switch 209 is on, the CPU 22500 performs the interrupt process routine, and then performs the power-ON process in the main routine. If the power switch 209 is off, the CPU 22500 performs the interrupt process routine, and then performs the power-OFF process in the main routine.

FIG. 52C is a flowchart showing the processing when the power switch 209 is turned off, or when the power switch 209 is off at the time of are set. For the power-OFF process, the end process is performed to erase a display on the LCD or to access the key control register (KEYCTL) 22610 to set only the power switch 209 as effective. When the power-OFF process is terminated, the CPU 22500 is shifted to the halted state, and halts the process in main routine. Only when responding to an interrupt due to the power-ON operation, an update interrupt, or a backup interrupt is the CPU 22500 returned from the halted state to the normal operating state. In this case CPU 22500 performs the interrupt process routine and then restarts the process in the main routine.

FIG. 52B is a flowchart showing the processing when the power switch 209 is turned on, or when the power switch 209 is on at the time of a reset. During the power-ON process, the initial operation is performed to initialize a display on the LCD, to initialize both a variable that is defined in the RAM 22502 and an internal register, and to transmit to the process management processor 23005 requests for generating a digital phone process, a credit settlement processing and a merchant information management process. Upon receiving these requests, the digital phone process, the credit card process and the personal information management process are registered in the process list, and are performed in the main routine. It should be noted that since the operating state for each process is held in the process status area, the operating mode when the power switch is turned on is the operating mode existing when the power switch was powered off.

Figure 62:
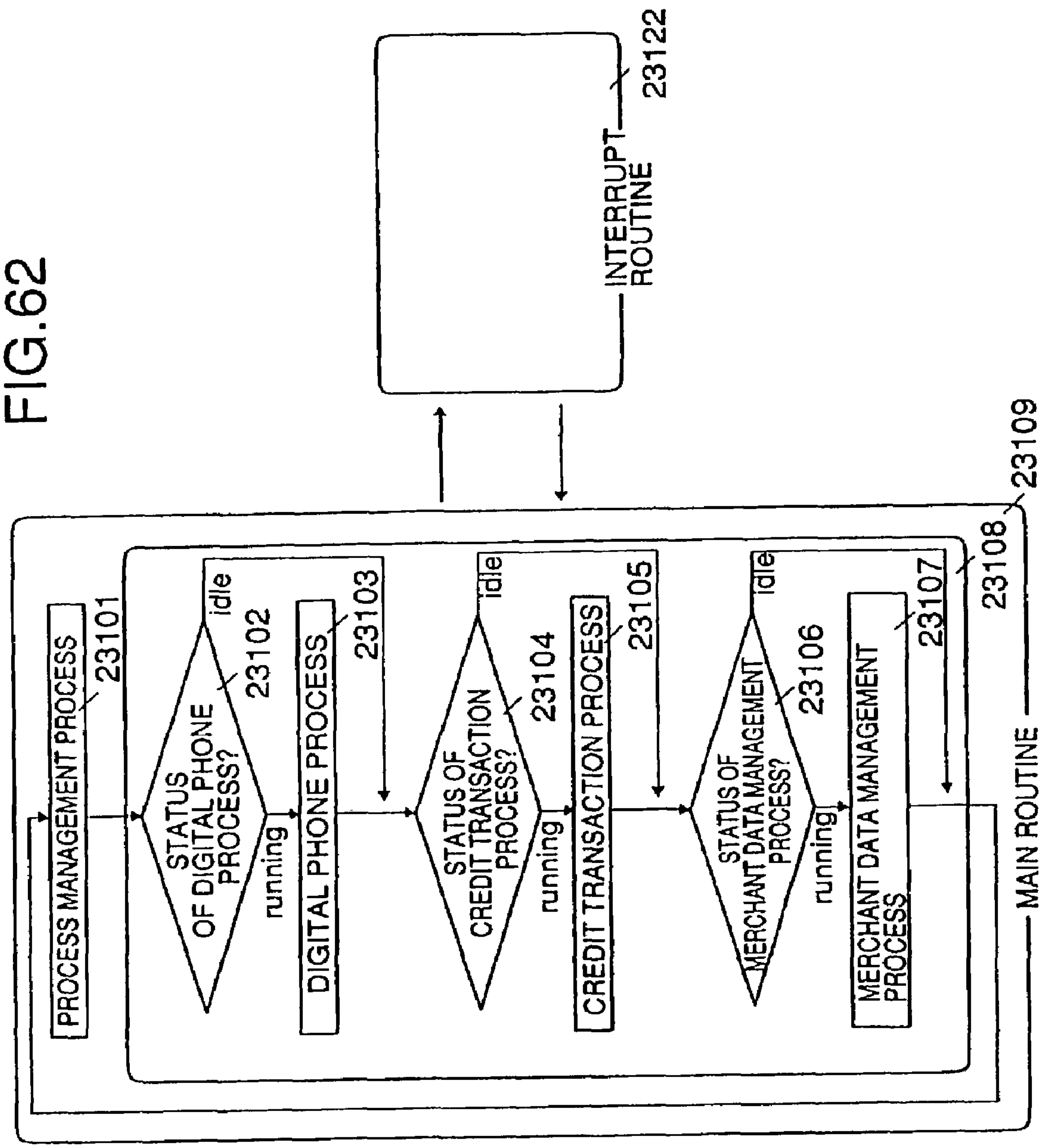
FIG. 62 is a conceptual flowchart for the normal processing performed by the CPU of the credit settlement terminal according to the second embodiment of the present invention.

FIG. 62 is a flowchart showing the processing performed by the CPU 22500 when the power-ON process has been terminated, or in the normal state when the credit settlement terminal 300 does not perform the process for a transaction, a cancellation, a customer service call, an inquiry call, a data update or a remote access. At this time, while the digital phone process, the credit settlement processing and the merchant information management process are registered in the process list, for only one process in the process status area is "running" the operating state, and the operating mode of the credit transaction terminal corresponds to the process that is in the "running" state.

As the interrupt factor for the interrupt register (INT) 22602, key manipulation by a user is copied to the word "interrupt" in the RAM 22502. The key manipulation is interpreted in the process corresponding to the operating mode of the credit settlement terminal 300 (the digital phone process, the credit settlement processing or the merchant information management process), and a corresponding process is performed.

When the credit transaction operation 604, the cancellation operation 901 or the customer service call operation 1200 is performed, or when the inquiry call operation 1216 is received, a request for generating a corresponding process, such as the settlement processing, the cancellation process, the customer call process or the inquiry call process, is transmitted to the process management processor 23005.

Figure 63:
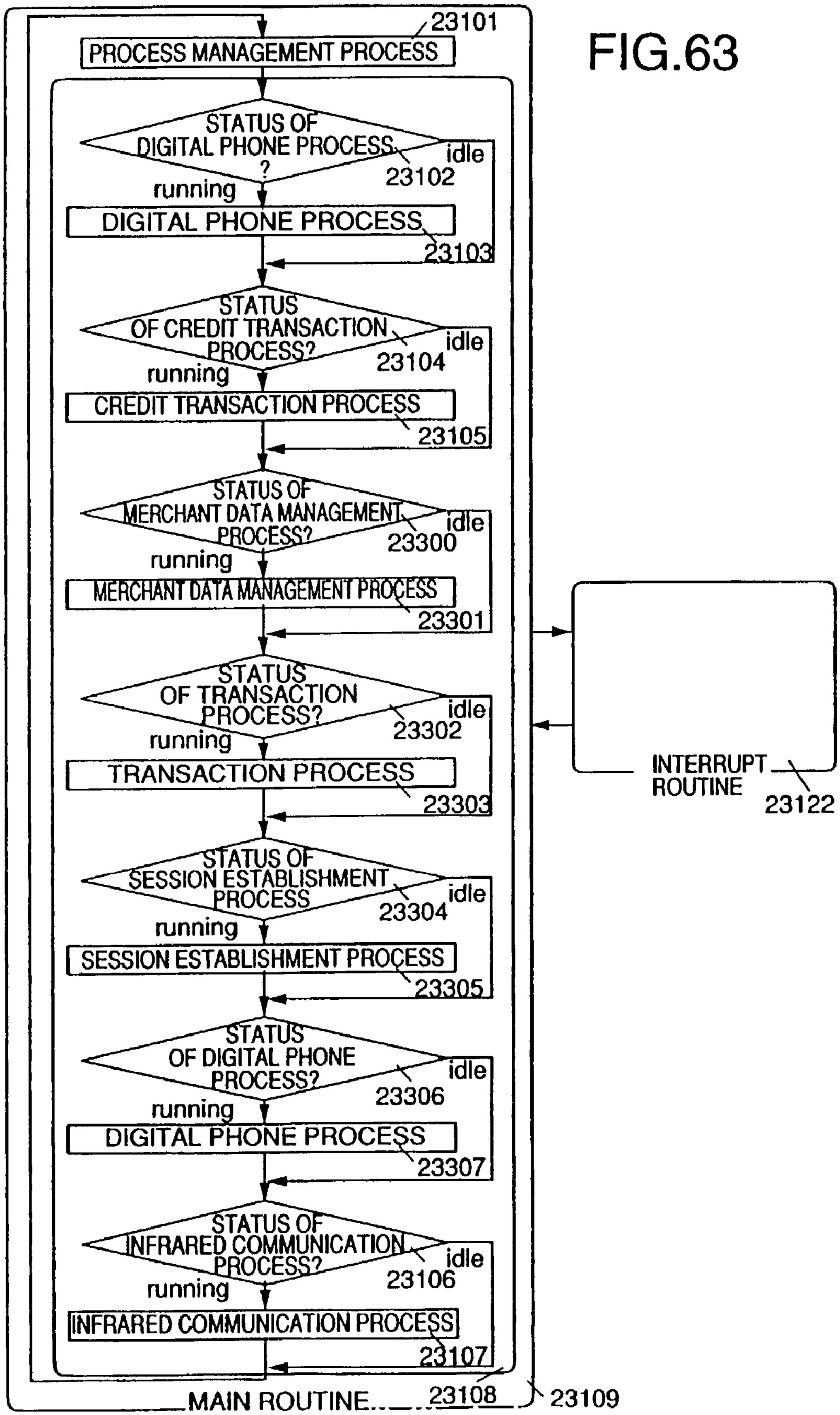
FIG. 63 is a conceptual flowchart for the settlement processing performed by the CPU of the credit settlement terminal according to the second embodiment of the present invention.

FIG. 63 is a flowchart showing the processing performed by the CPU 22500 for a transaction. When the merchant performs the credit transaction operation, not only the normal process, but also the settlement processing, the session establishment process, the digital phone communication process and the infrared communication process are activated.

Figure 64B:
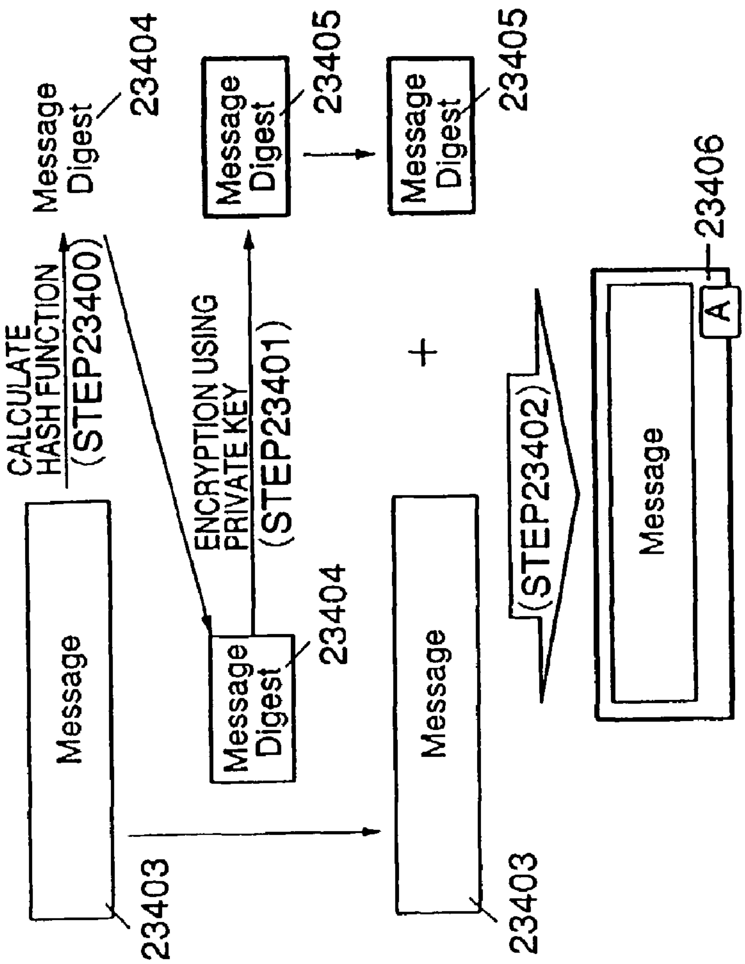
FIG. 64A is a flowchart showing digital signature processing according to the second embodiment of the present invention.
Figure 64A:
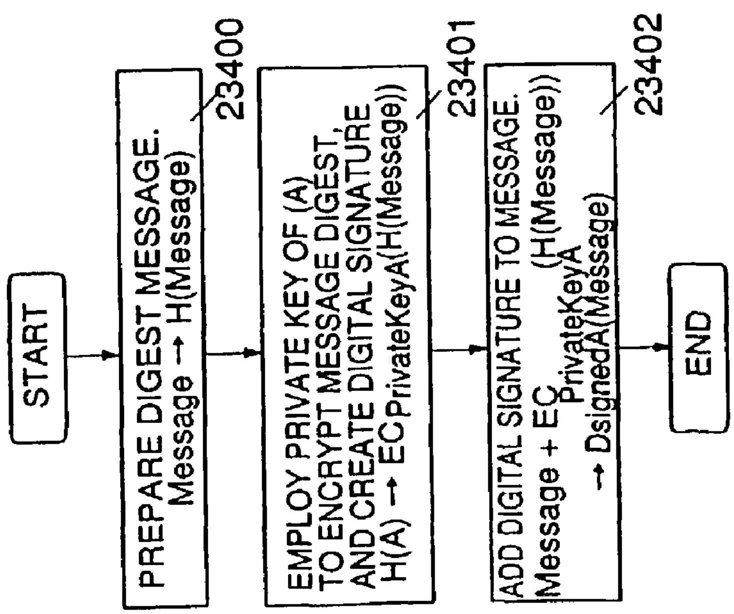
Figures 65A, 65B:
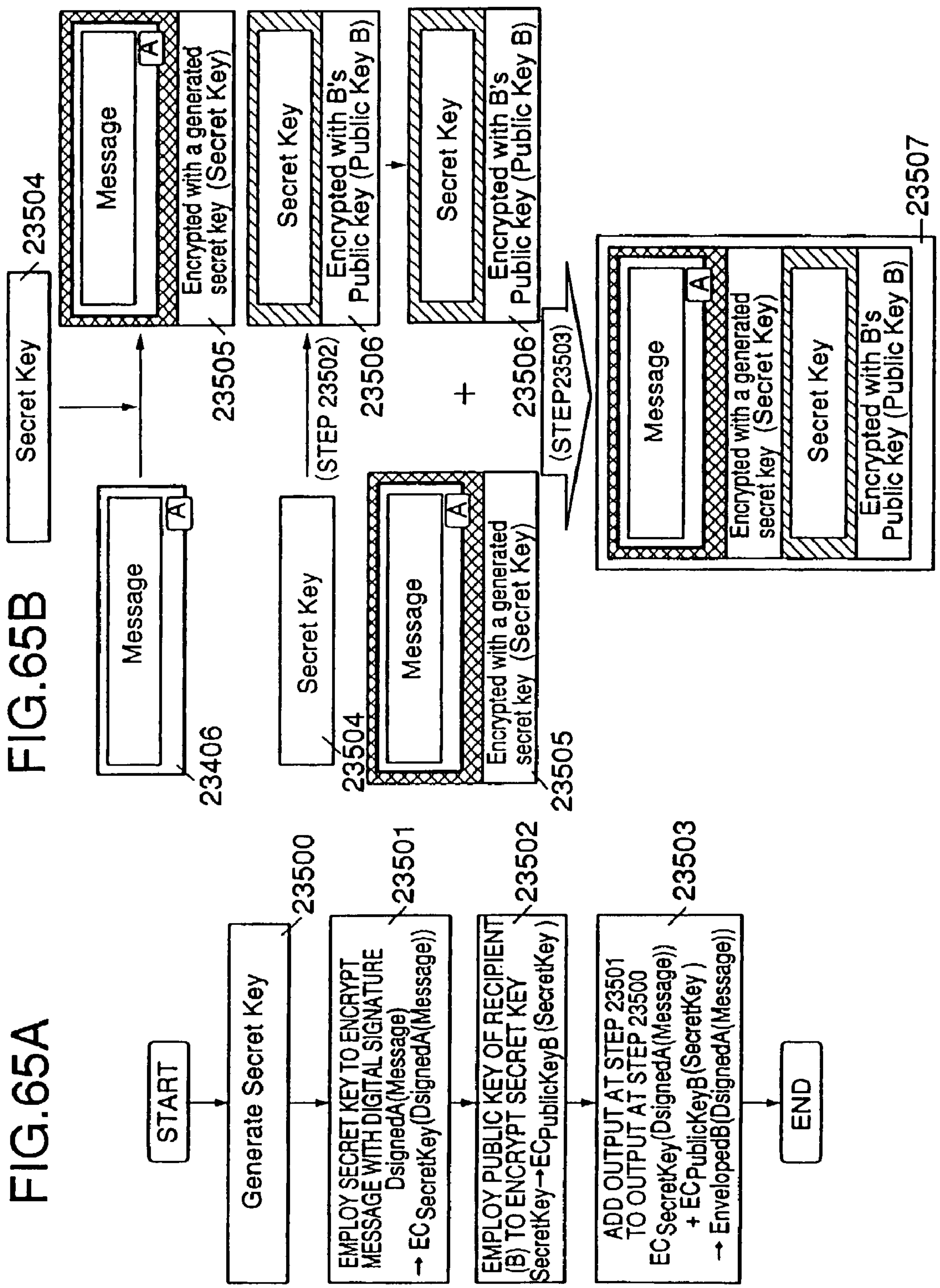
Figure 66A:
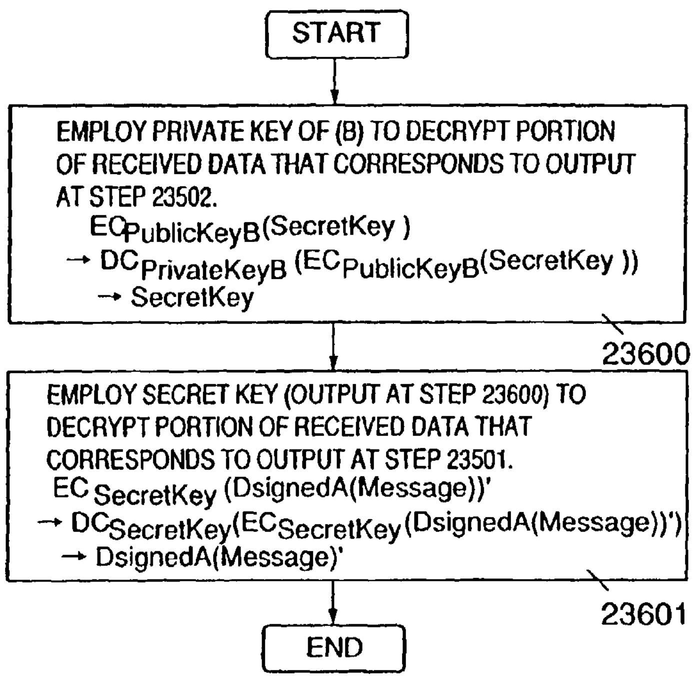
Figure 66B:
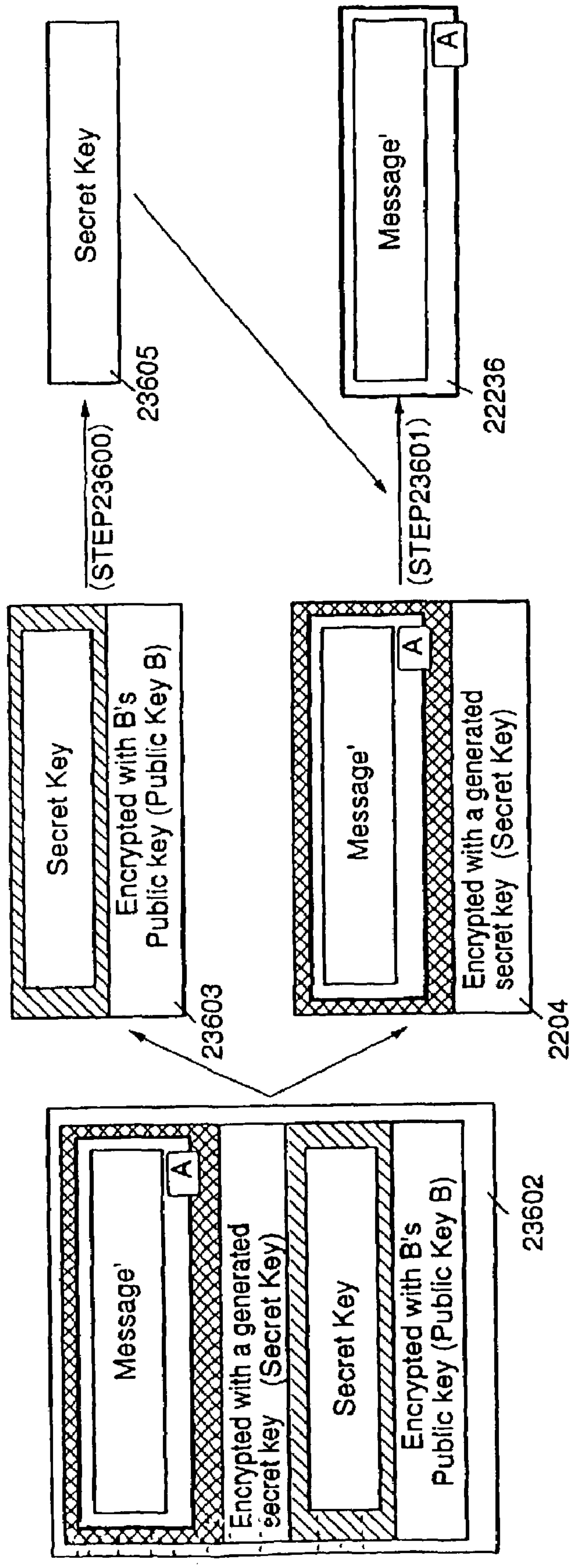
Figure 67A:
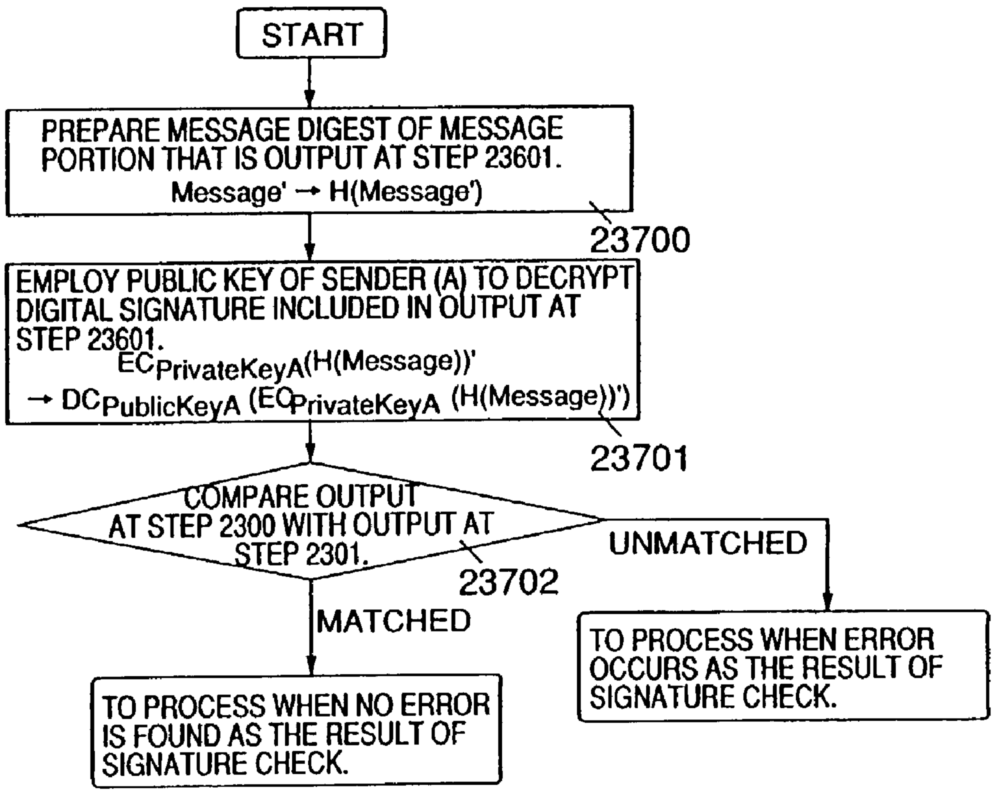
Figure 67B:
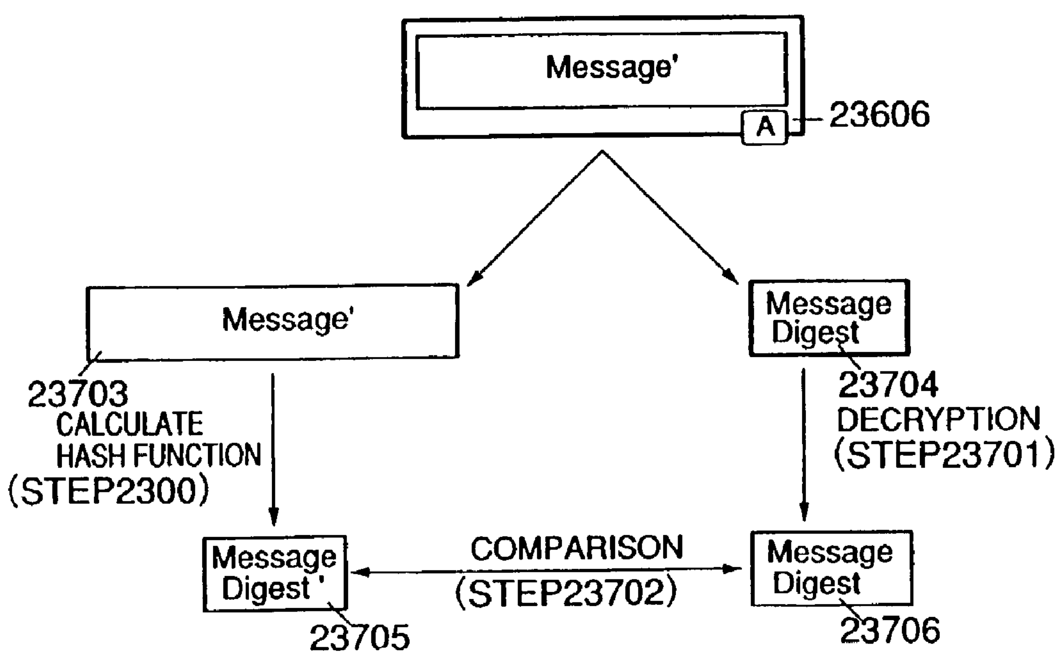

The digital signature process and the closing process will now be explained. These processes are performed when the personal credit terminal 100 generates a message to be transmitted to the credit settlement terminal 300 and the service providing system 102, or when the credit settlement terminal 300 generates a message to be transmitted to the personal credit terminal 100 and the service providing system 102. The digital signature process is shown in FIGS. 64A and 64B, and the closing process is shown in FIGS. 65A and 65B. The decryption process for a closed message is shown in FIGS. 66A and 66B, and the verification process for a digital signature accompanying a message is shown in FIGS. 67A and 67B. These processes are substantially the same as those explained while referring to FIGS. 20 to 23.

The processing performed by the service providing system 102 will now be described.

The service providing system 102 communicates with the personal credit terminal 100, the credit settlement device 101 and the settlement system 103, and functions as an intermediate system for a user, a merchant and a settlement processor in order to provide a personal remote credit settlement service for the user and the merchant.

Figure 68:
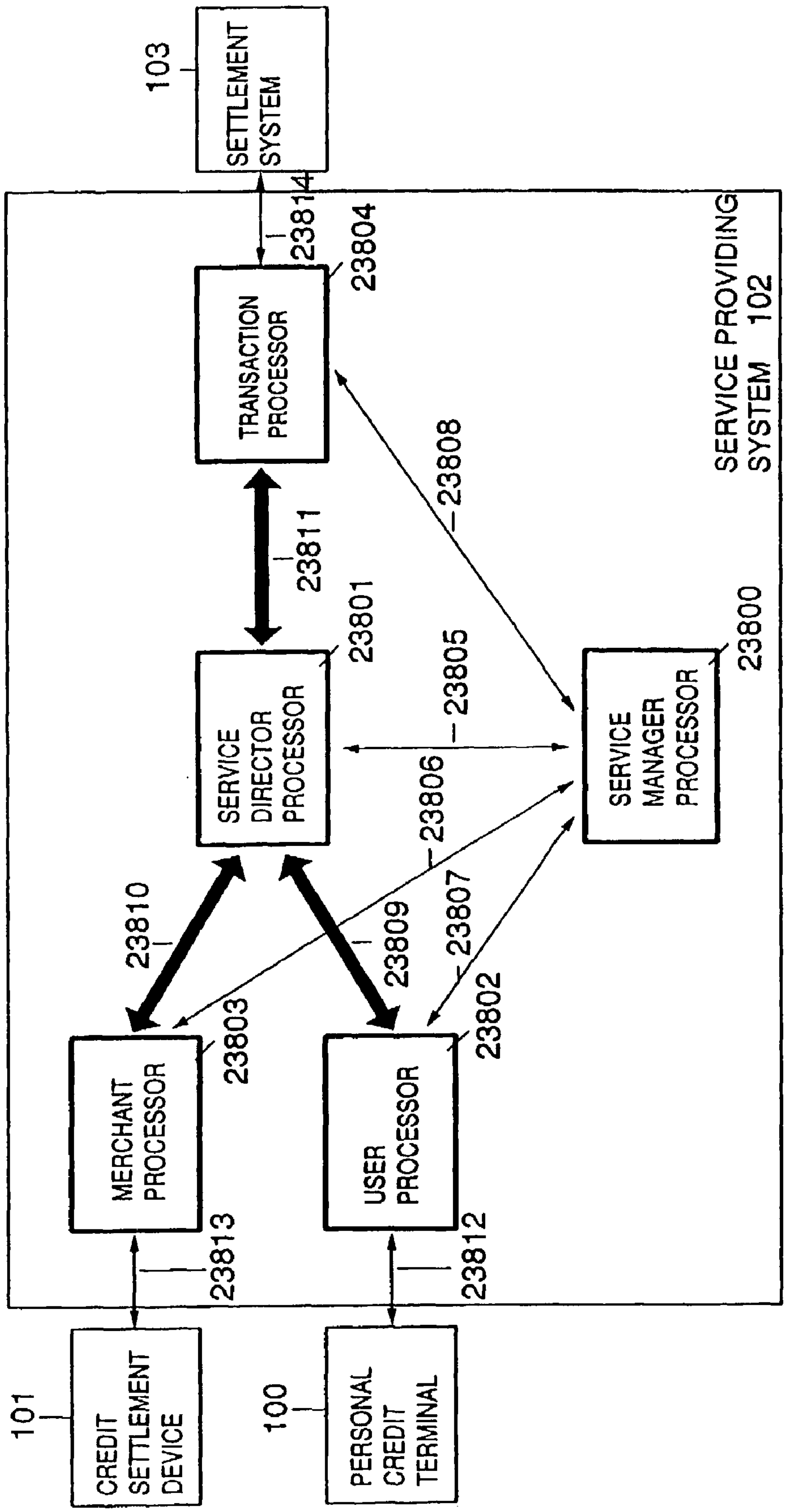

In FIG. 68 is shown the process architecture for the service providing system 102.

The service providing system 102 provides a personal remote transaction credit service through the coordinated performances of a user processor (UP) 23802, a merchant processor (MP) 23803, a settlement processor (TPP) 23804, a service director processor (SDP) 23801 and a service manager process (SMP) 23800. In FIG. 68, the user processor 23802 has a one-to-one correspondence with the personal credit terminal 100, and serves as an interface for communication between the personal credit terminal 100 and the service providing system 102. The merchant processor 23803 has a one-to-one correspondence with the credit settlement terminal 300, and serves as an interface for communication between the service providing system 102 and the credit settlement terminal 300. The settlement processor 23804 corresponds to the settlement system 103, and serves as an interface for communication between the service providing system 102 and the settlement system 103. The service director processor 23801 "produces" a personal remote credit settlement service by communicating with the user processor 23802, the merchant processor 23803 and the settlement processor 23804. The service manager processor 23800 manages the user processor 23802, the merchant processor 23803, the settlement processor 23804 and the service director processor 23801. The meaning of the expression "produces personal remote credit settlement service" will be described in detail later.

The list of the five processors is shown in FIGS. 69, 69A, 69B, 70, 70A and 70B.

The service providing system 102 may simultaneously communicate with a plurality of personal credit terminals and a plurality of credit transaction terminals, may simultaneously process a plurality of personal remote credit settlement services, or may simultaneously communicate with a plurality of settlement systems in order to process a plurality of personal remote credit settlement services. Accordingly, in the service server 400 there may be a plurality of units for the user process, the merchant process, the settlement processor process, and the service director processor. These processors are generated or deleted by the service manager processor.

When the service server 400 is constituted by a plurality of computers, the user process, the merchant processor, the settlement processor and the service director processor are separately generated by a plurality of computers, so that the load imposed on the individual processor can be distributed to the computers.

A set of cooperative processors to provide one personal remote credit settlement service is determined by the service manager processor, and is composed of at least one of the user processor, the merchant processor and the settlement processor, and one service director processor. The set of cooperating processes is called a process group.

First, the user processor 23802 will be described.

The user processor 23802 controls communication with the personal credit terminal 100, verifies users, encrypts data to be transmitted to the personal credit terminal 100, decrypts data received from the personal credit terminal 100, examines the validity of the data received from the personal credit terminal 100, and performs a remote access process, a data updating process, and a data backup process for the personal credit terminal 100.

The user processor 23802 is generated by the service manager processor 23800 when the service providing system 102 communicates with the personal credit terminal 100. The service manager processor 23800 generates one user processor 23802 for one personal credit terminal 100 that is in communication with the service providing system 102. At this time, to manage the generated user processor 23802, the service manager processor 23800 prepares, in the memory or on the hard disk of the computer that constitutes the service server 400, the user process management information 4400 shown in FIG. 75A.

The user processor 23802 is permitted to access only the user process management information 4400, the attribute information of the owner (the user) of the personal credit terminal 100 that is managed by the user information server 402, and data in the RAM 1502 of the personal credit terminal 100. In other words, the user processor 23802 can not access other information.

One personal credit terminal 100 corresponds to one user processor 23802, and the user processor 23802 can effectively engage only for its corresponding personal credit terminal 100; it can not communicate directly with another personal credit terminal.

Messages described in columns 23901 and 23902 in FIG. 69A are employed for communication between the user processor 23802 and the personal credit terminal 100. The messages described in column 23901 (an authentication test A response, an authentication test C, an authentication test D response, a remote access request, a data update request, an upload data message, a payment request, a cancellation request, a call reception response, an inquiry call request, a time-out error message, and a session error message) are those transmitted by the personal credit terminal 100 to the user processor 23802. The messages described in column 23902 (an authentication test A, an authentication test B response, an authentication test C response, a remote access data message, a data update response, an update data message, a data update command, a mandatory expiration command, a receipt, a cancellation receipt, a customer service call, an inquiry call response, a call response, a time-out error message, a session error message and a time-out message) are those transmitted by the user processor 23802 to the personal credit terminal 10. The user processor 23802 and the personal credit terminal 100 do not interpret as valid messages any other messages that they may receive.

Figure 69B:
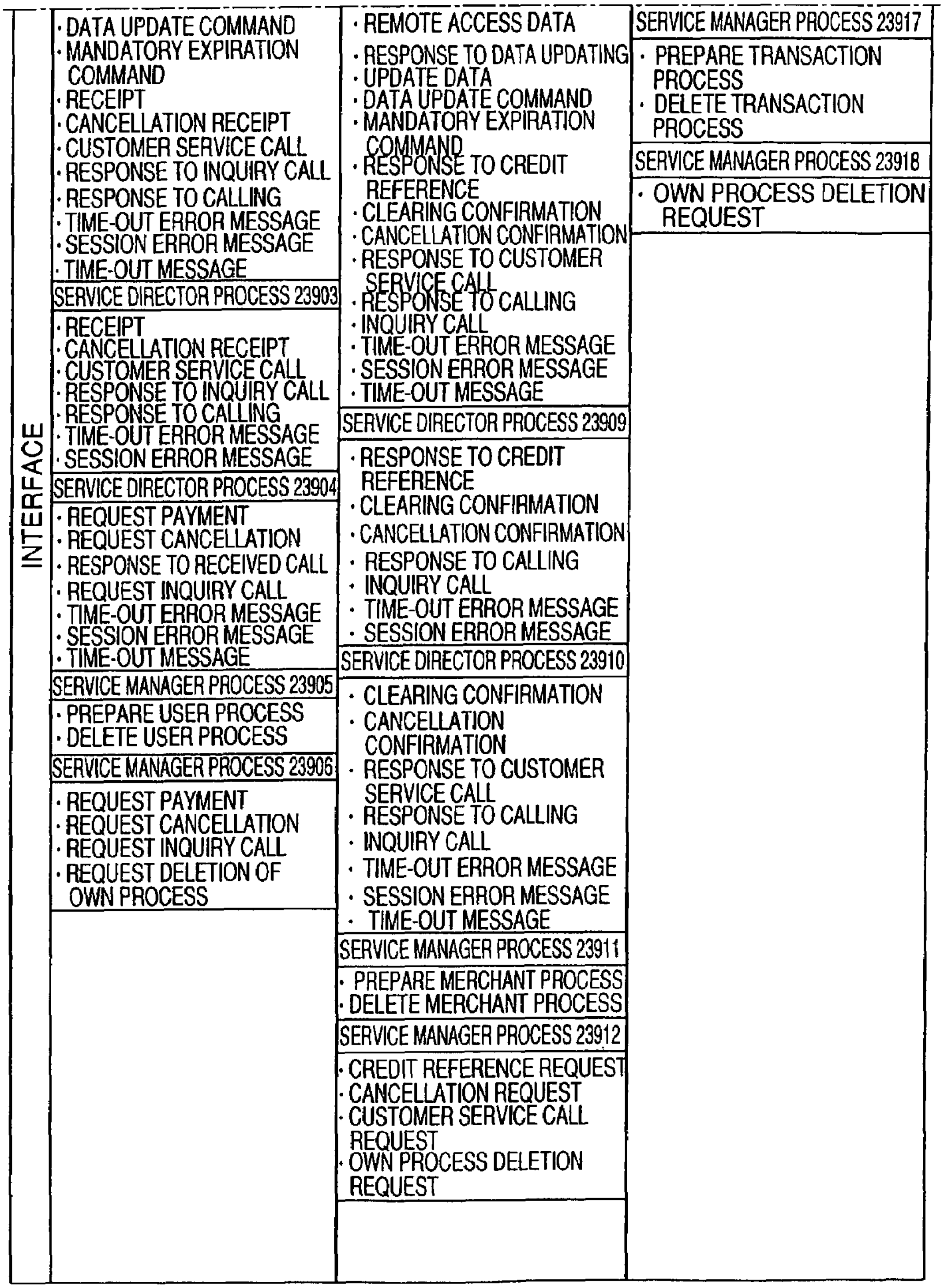

In addition, as an interface, the user processor 23802 exchanges, with the service director processor 23801 that belongs to the same process group, messages that are described in columns 23903 and 23904 in FIG. 69B. The messages described in column 23903 (a receipt, a cancellation receipt, a customer service call, an inquiry call response, a call response, a time-out error message and a session error message) are those transmitted by the service director processor 23801 to the user processor 23802. The messages described in column 23904 (a payment request, a cancellation request, a call reception response, an inquiry call request, a time-out error message, a session error message and a time-out message) are those transmitted by the user processor 23802 to the service director processor 23801. The user processor 23802 and the service director processor 23801 do not interpret as valid messages any other messages that they may receive.

Furthermore, as an interface, the user processor 23802 exchanges, with the service director processor 23801, messages that are described in column 23906 in FIG. 69B. The messages described in column 23906 (a payment request, a cancellation request, an inquiry call request, a request for deleting the user processor 23802) are those transmitted by the user processor 23802 to the service director processor 23801. The messages described in column 23905 (generation and deletion of a user processor 23802) are those that the service director processor 23801 acts on for the user processor 23802. The service manager processor performs the generation and the deletion of the user processor 23802. The contents of the messages will be described in detail later.

Since there is no communication interface between a user processor and another user processor, the user processors can not directly communicate with each other. Similarly, since there is no communication interface between a user processor and a merchant processor, between a user processor and a settlement processor, and between a user processor and a service director processor that belongs to a different group, the user processor can directly communicate neither with a merchant processor, nor a settlement processor, nor with a service director that belongs to a different group.

When the personal credit terminal 100 is employed in a service area other than that where the user stays, a user processor may be generated in a service providing system in the service area in which the user then is, and in a service providing system in a service area in which the personal credit terminal 100 is employed. This case will be described in detail later.

The merchant processor 23803 will now be described.

The merchant processor 23803 controls communication with the credit settlement terminal 300, verifies a merchant, encrypts data to be transmitted to the credit settlement terminal 300, decrypts data received from the credit settlement terminal 300, examines the validity of the data received from the credit settlement terminal 300, and performs a remote access process and a data updating process for the credit settlement terminal 300.

The merchant processor 23803 is generated by the service manager processor 23800 when the service providing system 102 communicates with the credit settlement terminal 300. The service manager processor 23800 generates one merchant processor 23803 for one credit settlement terminal 300 that communicates with the service providing system 102. At this time, to manage the generated merchant processor 23803, the service manager processor 23800, in the memory or on the hard disk of the computer that constitutes the service server 400, prepares the merchant process management information 4401 shown in FIG. 75B.

The merchant processor 23803 is permitted to access only the merchant process management information 4401, the attribute information for the owner (the merchant) of the credit settlement terminal 300 that is managed by the merchant information server 403, and data in the RAM 22502 and on the hard disk 22503 of the credit settlement terminal 300. In other words, the merchant processor 23803 can not access other information.

One credit settlement terminal 300 corresponds to one merchant processor 23803, and the merchant processor 23803 is effective only for a corresponding credit settlement terminal 300; it can not communicate directly with another credit transaction terminal.

Messages described in columns 23907 and 23908 in FIG. 69A are employed for communication between the merchant processor 23803 and the credit settlement terminal 300. The messages described in column 23907 (an authentication test A response, an authentication test C, an authentication test D response, a remote access request, a data update request, an upload data message, an authorization request, a settlement request, a receipt, a cancellation request, a call reception response, a customer service call request, a time-out error message and a session error message) are those transmitted by the credit settlement terminal 300 to the merchant processor 23803. The messages described in column 23908 (authentication test A, an authentication test B response, an authentication test C response, a remote access data message, a data updating response, an update data message, a data update command, a mandatory expiration command, an authorization response, a clearing confirmation, a cancellation confirmation, a customer service call response, a call response, an inquiry call, a time-out error message, a session error message and a time-out message) are those transmitted by the merchant processor 23803 to the credit settlement terminal 300. The merchant processor 23803 and the credit settlement terminal 300 do not interpret as being valid any other messages they may receive.

In addition, as an interface, the merchant processor 23803 exchanges, with the service director processor 23801 that belongs to the same process group, messages that are described in columns 23909 and 23910 in FIG. 69B. The messages described in column 23909 (an authorization response, a clearing confirmation, a cancellation confirmation, a customer service call response, a call response, an inquiry call, a time-out error message and a session error message) are those transmitted by the service director processor 23801 to the merchant processor 23802. The messages described in column 23910 (a clearing confirmation, a cancellation confirmation, a customer service call response, a call response, an inquiry call, a time-out error message, a session error message and a time-out message) are those transmitted by the merchant processor 23803 to the service director processor 23801. The merchant processor 23803 and the service director processor 23801 do not interpret as valid any other messages they may receive.

Furthermore, as an interface, the merchant processor 23803 exchanges, with the service director processor 23801, messages that are described in column 23912 in FIG. 69B. The messages described in column 23912 (an authorization request, a cancellation request, a customer service call request and a request for deleting the merchant processor 23803) are those transmitted by the merchant processor 23803 to the service director processor 23801. The messages described in column 23911 (generation and deletion of a merchant processor 23803) are those that the service director processor 23801 acts on for the merchant processor 23803. The service manager processor performs the generation and the deletion of the merchant processor 23803. The contents of the messages will be described in detail later.

Since there is no communication interface between a merchant processor and another merchant processor, the merchant processors can not directly communicate with each other. Similarly, since there is no communication interface between a merchant processor and a user processor, between a merchant processor and a settlement processor, and between a merchant processor and a service director processor that belongs to a different group, a merchant processor can communicate directly neither with a user processor, nor a settlement processor, nor with a service director that belongs to a different group.

The settlement processor 23804 will now be described.

The settlement processor 23804 controls communication with the settlement system 103, verifies a settlement processor, encrypts data to be transmitted to the settlement system 103, decrypts data received from the settlement system 103, and examines the validity of the data received from the settlement system 103.

The settlement processor 23804 is generated by the service manager processor 23800 when the service providing system 102 communicates with the settlement system 103. One settlement processor 23804 is generated to control communication across one communication line between the service providing system 102 and the settlement system 103.

The digital communication line 111 linking the service providing system 102 and the settlement system 103 are multiplexed to serve as a plurality of communication lines. To perform communication between the service providing system 102 and the settlement system 103 across a plurality of communication lines during the same period, the service manager processor 23800 generates several settlement processor processes 23804 that are equivalent in number to the communication line count. At this time, to manage the generated settlement processor 23803, the service manager processor 23800 prepares, in the memory or on the hard disk of the computer that constitutes the service server 400, the settlement processor process management information 4402 shown in FIG. 75C.

The settlement processor 23804 is permitted to access only the settlement processor process management information 4402, and the attribute information and transaction history information for the settlement processor in the area wherein is installed the settlement system 103 that is managed by the settlement processor information server 404. In other words, the settlement processor 23804 can not access other information.

The settlement processor 23804 is effective only when employed with a corresponding settlement system 103, and can not communicate directly with another settlement system.

Messages described in columns 23913 and 23914 in FIG. 69A are employed for communication between the settlement processor 23804 and the settlement system 103. The messages described in column 23913 (a clearing confirmation, a cancellation confirmation, a time-out error message, and a session error message) are those transmitted by the settlement system 103 to the settlement processor 23804. The messages described in column 23914 (a settlement request, a cancellation request, a time-out error message, a session error message, and a time-out message) are those transmitted by the settlement processor 23804 to the settlement system 103. The settlement processor 23804 and the settlement system 103 do not interpret as being valid any other messages that they may receive.

In addition, as an interface, the settlement processor 23804 exchanges, with the service director processor 23801 that belongs to the same process group, messages that are described in columns 23915 and 23916 in FIG. 69A. The messages described in column 23915 (a settlement request, a cancellation request, a time-out error message, and a session error message) are those transmitted by the service director processor 23801 to the settlement processor 23804. The messages described in the column 23916 (a clearing confirmation, a cancellation confirmation, a session error message, and a time-out message) are those transmitted by the settlement processor 23804 to the service director processor 23801. The settlement processor 23804 and the service director processor 23801 do not interpret as valid any other messages that they may receive.

Furthermore, as an interface, the settlement processor 23804 exchanges, with the service director processor 23801, a message that is described in column 23918 in FIG. 69B. The message described in column 23918 (a request for the deletion of the settlement processor 23804) is one that is transmitted by the settlement processor 23804 to the service director processor 23801. The messages described in column 23917 (generation and deletion of a settlement processor 23804) are those that the service director processor 23801 acts on for the settlement processor 23804. The service manager processor performs the generation and the deletion of the settlement processor 23804. The contents of the messages will be described in detail later.

Since there is no communication interface between settlement processors, they cannot directly communicate with each other. Similarly, since there is no communication interface between a settlement processor and a user processor, between a settlement processor and a merchant processor, and between a settlement processor and a service director processor that belongs to a different group, the settlement processor communicate directly neither with a user processor, nor a merchant processor, nor with a service director that belongs to a different group.

The service director processor 23801 will now be described.

The service director processor communicates with the user processor, the merchant processor and the settlement processor that belong to the same group, and produces the personal remote credit settlement service.

The expression "produces the personal remote credit settlement service" means that the service director processor cooperates with the other member processors in the same process group, and takes the initiative in performing the processing for the personal remote credit settlement service.

The service director processor 23801 is generated by the service manager processor 23800 when the service providing system 102 performs one of the processes for clearing for a personal remote credit settlement service, a cancellation, a customer service call, or an inquiry call. In order to manage the service director processor 23801, the service manager processor 23800 prepares, in the memory or on the hard disk of a computer that constitutes the service server 400, the service director process management information 4403 shown in FIG. 75D.

The individual processes for performing the clearing for a personal remote credit settlement service, a cancellation, a customer service call, and an inquiry call have a specified process sequence. In accordance with the process sequence, the service director processor 23801 handles a message received from a member processor in the same group, and transmits a message requesting a process be performed to each member process. Upon receiving the message from the service director processor 23801, a member process performs a corresponding process. Since the service director processor cooperates with the other member processors in the same group, the processing for the personal remote credit settlement service can be performed.

To perform the clearing process and the cancellation process, the service director processor, the user processor, the merchant processor, and the settlement processor are assembled into one processing group. To perform the customer service call process and the inquiry call process, the service director processor, the user processor, and the merchant processor are assembled into one processing group.

The service director processor 23801 is permitted to access only the service director process management information 4403 that is managed by the service director information server 404, and information that a member process in the same group is permitted to access. In other words, the service director processor 23801 can not access other information.

In addition, as an interface, the service director processor 23801 exchanges, with the user processor 23801 that belongs to the same process group, messages that are described in columns 23904 and 23903 in FIG. 70A. The messages described in column 23904 (a payment request, a cancellation request, a call reception response, an inquiry call request, a time-out error message, a session error message, and a time-out message) are those transmitted by the user processor 23802 to the service director processor 23801. The messages described in column 23903 (a receipt, a cancellation receipt, a customer service call, an inquiry call response, a call response, a time-out error message, and a session error message) are those transmitted by the service director processor 23801 to the user processor 23802. The user processor 23802 and the service direct or processor 23801 do not interpret as valid messages any other messages that they might receive.

Figure 70B:
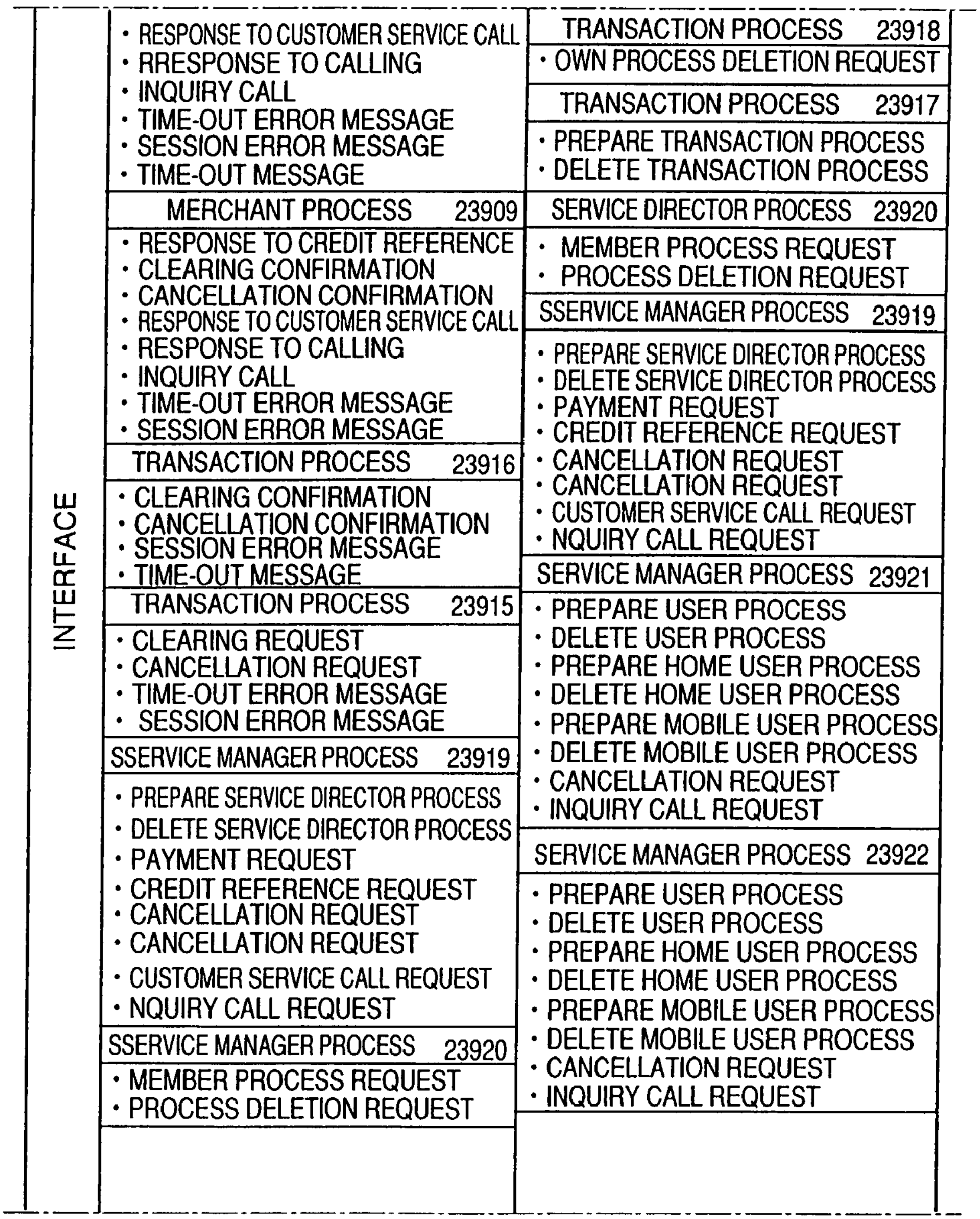

Furthermore, as an interface, the service director processor 23801 exchanges, with the merchant processor 23803 that belongs to the same process group, messages that are described in columns 23910 and 23909 in FIGS. 70A and 70B. The messages described in column 23910 (a clearing confirmation, a cancellation confirmation, a customer service call response, a call response, an inquiry call, a time-out error message, a session error message, and a time-out message) are those transmitted by the merchant processor 23803 to the service director processor 23801. The messages described in column 23909 (an authorization response, a clearing confirmation, a cancellation confirmation, a customer service call response, a call response, an inquiry call, a time-out error message, and a session error message) are those transmitted by the service director processor 23801 to the merchant processor 23802. The merchant processor 23803 and the service director processor 23801 do not interpret as valid messages any other messages they might receive.

Further, as an interface, the service director processor 23801 exchanges, with the settlement processor 23804 that belongs to the same process group, messages that are described in columns 23916 and 23915 in FIG. 70B. The messages described in column 23916 (a clearing confirmation, a cancellation confirmation, a session error message, and a time-out message) are those transmitted by the settlement processor 23804 to the service director processor 23801. The messages described in column 23915 (a settlement request, a cancellation request, a time-out error message, and a session error message) are those transmitted by the service director processor 23801 to the settlement processor 23804. The settlement processor 23804 and the service director processor 23801 do not interpret as valid messages any other messages they might receive.

Moreover, as an interface, the service director processor 23801 exchanges, with the service manager processor 23800, messages that are described in a column 23920 in FIG. 70B. The messages described in column 23920 (generation and deletion of a member process) are those transmitted by the service director processor 23801 to the service manager processor 23800. Messages described in a column 23919 in FIG. 70B (generation and deletion of a serviced director process, a payment request, an authorization request, a cancellation request, a customer service call request and an inquiry call request) are those that the service manager processor 23800 acts on for the service director processor 23801. The service manager processor performs the generation and the deletion of the service director processor 23801. The contents of the messages will be described in detail later.

There is no communication interface between service director processors that belong to different process groups, between a service director processor, and a merchant processor that belongs to a different process group, and between a service director processor and a settlement processor that belongs to a different process group. Therefore, the service director processor can not directly communicate with a user processor, a merchant processor, and a settlement processor that belong to a different group.

The service manager processor 23800 will now be described.

In the service manager processor 23800, the user processor 23802, the merchant processor 23803, the settlement processor 23804, and the service director processor 23801 are generated or deleted, and a process group is generated or deleted.

To manage the individual processes, the service manager processor 23800 prepares six types of management data in FIGS. 75A, 75B, 75C, 75D, 75E and 75F, i.e., user process management information 4400, merchant process management information 4401, settlement processor process management information 4402, service director process management information 4403, process group management information 4404, and a message list 4405, and stores them in the memory or on the hard disk of a computer that constitutes the service server 400.

The process group management information 4404 is data for managing a process group, and the message list 4405 is a list of messages for which the process is suspended by the service manager process. The role of the message list 4405 will be explained in detail later.

The service manager processor 23800 is always activated when the service providing system 102 provides the personal remote credit transaction terminal. The generation and deletion of the service manager processor is controlled by the management system 407.

The service manager processor 23800 is permitted to access only information that is managed by the service director information server 404. In other words, the service manager processor 23800 can not access other information.

Furthermore, as an interface, the service manager processor 23800 exchanges, with the user processor 23802, messages that are described in column 23906 in FIG. 70A. The messages described in column 23906 (a payment request, a cancellation request, an inquiry call request, and a request for deleting the service manager processor 23800) are those transmitted by the user processor 23802 to the service manager processor 23800. Messages described in column 23905 in FIG. 70A (generation and deletion of a user processor 23802) are those that the service manager processor 23800 acts on for the user processor 23802. The service manager processor performs the generation and the deletion of the user processor 23802.

Similarly, as an interface, the service manager processor 23800 exchanges, with the merchant processor 23803, messages that are described in column 23912 in FIG. 70A. The messages described in column 23912 (an authorization request, a cancellation request, a customer service call request, and a request for deleting the merchant processor 23803) are those transmitted by the merchant processor 23803 to the service manager processor 23800. Messages described in column 23911 in FIG. 70A (generation and deletion of a merchant processor 23803) are those that the service manager processor 23800 acts on for the merchant processor 23803. The service manager processor performs the generation and the deletion of the merchant processor 23803.

Likewise, as an interface, the service manager processor 23800 exchanges, with the settlement processor 23804, a message that is described in column 23918 in FIG. 70A. The message described in column 23918 (a request for deleting the settlement processor 23800) is that transmitted by the settlement processor 23804 to the service director processor 23801. The messages described in column 23917 in FIG. 70A (generation and deletion of a settlement processor 23804) are those that the service manager processor 23800 acts on for the settlement processor 23804. The service manager processor performs the generation and the deletion of the settlement processor 23804.

Also, as an interface, the service manager processor 23800 exchanges, with the service director processor 23801, messages that are described in column 23920 in FIG. 70A. The messages described in column 23920 (generation and deletion of a member process) are those transmitted by the service director processor 23801 to the service manager processor 23800. Messages described in column 23919 in FIG. 70A (generation and deletion of a serviced director process, a payment request, an authorization request, a cancellation request, a customer service call request and an inquiry call request) are those that the service manager processor 23800 acts on for the service director processor 23801. The service manager processor performs the generation and the deletion of the service director processor 23801.

Furthermore, as an interface, the service manager processor 23800 exchanges, with a service manager processor 23800 of a service providing system in another service area, messages that are described in columns 23921 and 23922 in FIG. 70B. The messages described in column 23921 (generation and deletion of a user process, generation and deletion of a home user process, generation and deletion of a mobile user process, a cancellation request and an inquiry call request) are those transmitted to the service manager processor 23800 from a service manager processor of a service providing system in a different service area. The messages described in column 23922 (generation and deletion of a user process, generation and deletion of a home user process, generation and deletion of a mobile user process, a cancellation request and an inquiry call request) are those transmitted by the service manager processor 23800 to a service manager processor 23800 in a service providing system in a different service area. The communication between the service manager processors of different service providing systems is performed to provide personal remote credit settlement services across the service areas. This case will be explained in detail later.

Information that is managed by the user information server 402 of the service providing system 102 will now be explained. The user information server 402 manages attribute information for a user, and data in the RAM 1502 of the personal credit terminal 100 of the user. It should be noted that one user information server 402 does not manage attribute information for all users and data in the RAMs 1502 of the personal credit terminals 100 of all the users, and separate servers are required for each service area for management. Therefore, the user information server 402 manages the attribute information and data in the RAMs of the personal credit terminals of users who are present in the service area of a service providing system 102 (herein after the service area where the user is present is called a "home service area.").

Figure 71:
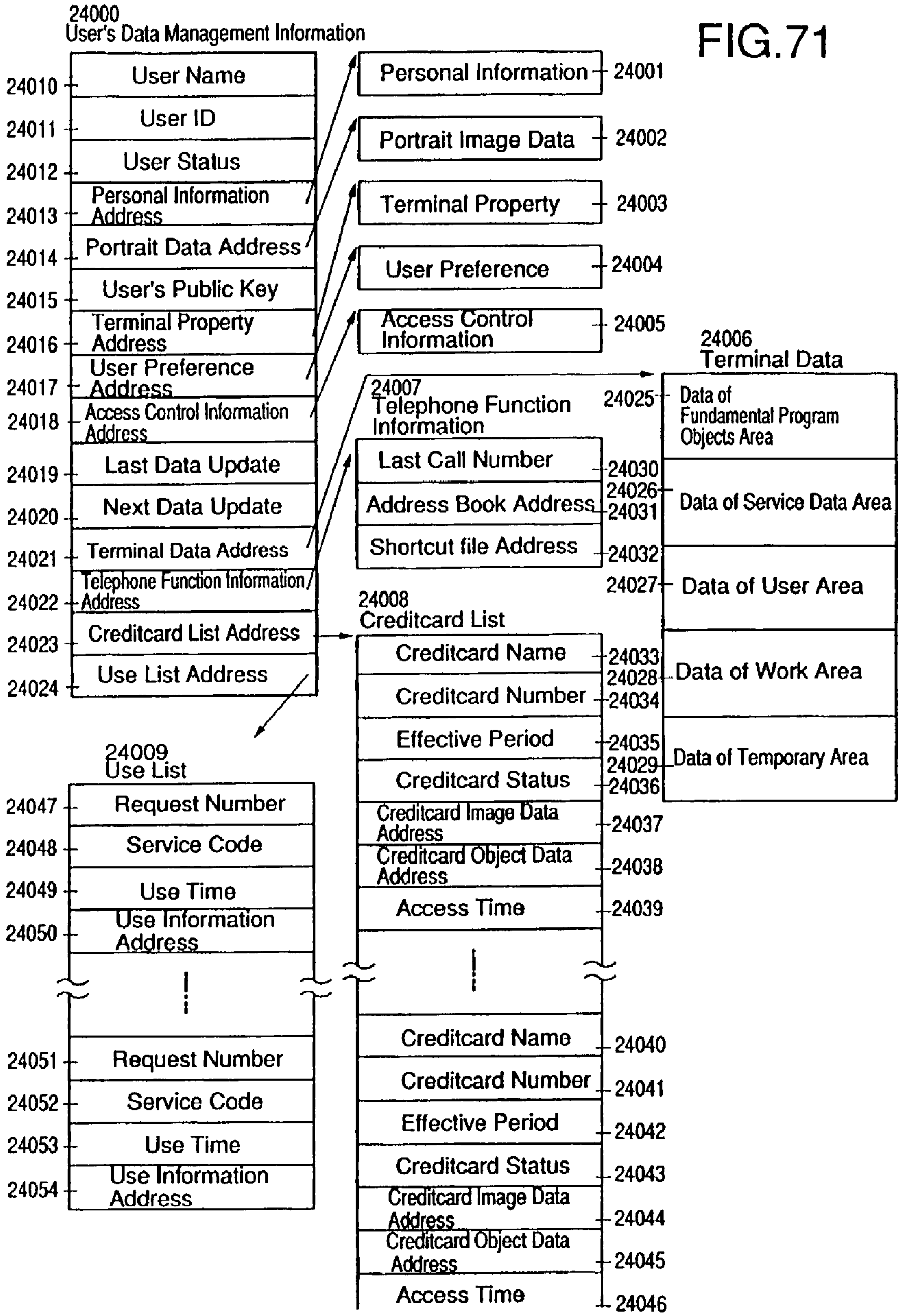

FIG. 71 is a specific diagram showing information stored for each user in the user information server 402. The user information server 402 stores ten types of information for each user: user's data management information 24000, personal information 24001, portrait image data 24002, a terminal property 24003, user preference 24004, access control information 24005, terminal data 24006, telephone function information 24007, a credit card list 24008, and a use list 24009. The contents of the information are the same as those explained for the first embodiment while referring to FIG. 29.

Information that is managed by the merchant information server 403 of the service providing system 102 will now be explained. The merchant information server 403 manages attribute information for a merchant, and data in the RAM 22502 of the credit settlement terminal 300 of the merchant. It should be noted that one merchant information server 403 does not manage attribute information for all merchants and data in the RAMs 22502 of the credit settlement terminals 300 of all the merchants, and separate servers are required for each service area for management. Therefore, the merchant information server 403 manages the attribute information and data in the RAMs of the credit settlement terminals of merchants who are present in the service area of a service providing system 102.

Figure 72:
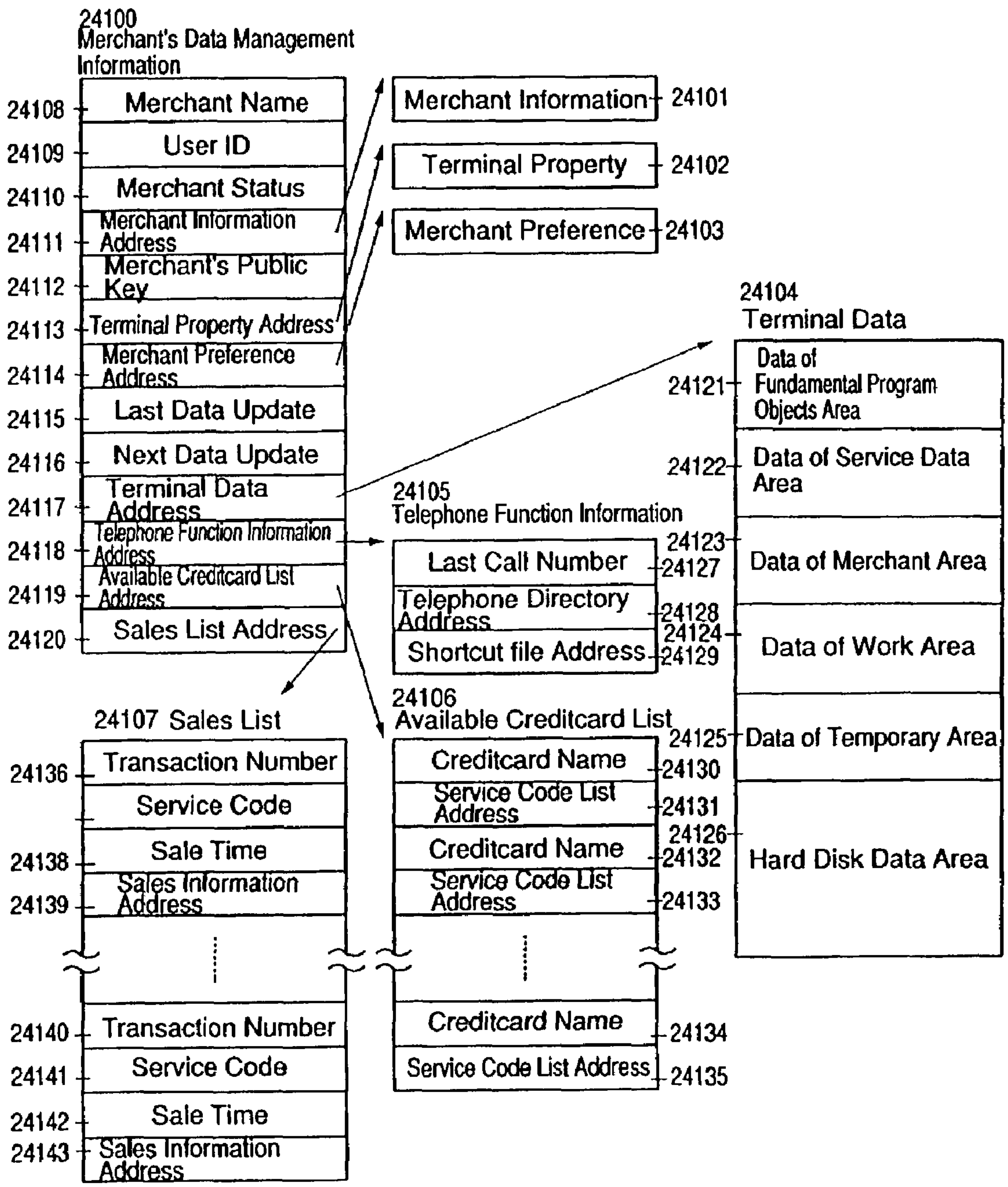

FIG. 72 is a specific diagram showing information stored for each merchant in the merchant information server 403. The merchant information server 403 stores eight types of information for each merchant: merchant's data management information 24100, merchant information 24101, a terminal property 24102, merchant preference 24103, terminal data 24104, telephone function information 24105, an available credit card list 24106, and a sales list 24107. The contents of the information are the same as those explained for the first embodiment while referring to FIG. 30. The merchant information 24101 is information concerning a merchant, such as the address and the account number of a merchant and the contents of a contract, and one part of this information corresponds to the merchant information 2506 of the credit settlement terminal 300.

The information managed by the settlement processor information server 404 of the service providing system 102 will now be explained. The settlement processor information server 404 manages the attribute information for a settlement processor, and history information for transactions performed by the settlement processor.

FIG. 73 is a specific diagram showing information stored for each settlement processor in the settlement processor information server 404. The settlement processor information server 404 stores four types of information for each settlement processor: settlement processor's data management information 24200, settlement processor information 24201, an available credit card list 24202, and a clearing list 24203. The contents of the information are the same as those explained for the first embodiment while referring to FIG. 31.

The information stored in the service director information server 401 in the service providing system 102 will now be explained.

FIG. 74 is a specific diagram showing information stored in the service director information server 401.

The service director information server 401 stores five types of information: a user list 4300, a merchant list 4301, a settlement processor list 4302, a provided service list 4302, and a settlement processor table 4304.

The user list 4300 is a list of attribute information for all the users who have entered into contracts with a service provider; the merchant list 4301 is a list of attribution information for all the merchants who have enter into a contract with the service provider; the settlement processor list 4302 is a list of attribution information for all the settlement processors that have entered into a contract with the service provider; the provided service list 4303 is a list of information for service provided through the personal remote credit settlement service by the service providing system 102; and the settlement processor table 4304 is a table in which are entered requests for personal remote credit settlement service by users, and merchants, and corresponding optimal settlement processors.

In the user list 4300, five types of information are stored for each user: a user name 4305 (4310), a user ID 4306 (4311), a user's telephone number 4307 (4312), and a service list address 4308 (4313).

In the service list address 4308 (4313) is an address in the service director information server 401 in which is stored a list of service codes that the user can employ.

The user information address 4309 (4314) is an address at which user data management information for the pertinent user is stored. The list of the service codes that the user can employ and the user data management information are respectively managed by the service director information server and the user information server of the service providing system that is located in a home service area for the user. Therefore, when the service providing system 102 is the one in the home service area for the user, the service list address and the user information address are respectively an address in the service director information server 401 and an address in the user information server 402. When the home service area of the user differs from that of the service providing system 102, the service list address and the user information address are respectively an address in the service director information server of a service providing system in the home service area for the user, and an address in the user information server therein.

In the merchant list 4301, six types of information a restored for each merchant: a merchant name 4315 (4321) a merchant ID 4316 (4322), a merchant's telephone number 4317 (4323), an available service list address 4318 (4324), a customer table address 4319 (4325), and a merchant information address 4320 (4326).

The available service list address 4308 (4312) indicates an address at which is stored a list of service code that the merchant can handle. The customer table address 4317 (4322) indicates the address at which is stored table information (a customer table) that represents the correspondence of the customer number and the user ID. The merchant information address 4320 (4326) is an address in which the merchant data management information for the merchant is stored.

The service code list and the customer table that the merchant can employ, and the merchant data management information are managed respectively by the service director information server and the user information server of the service providing system that is located in a home service area of the merchant. Therefore, when the service providing system 102 is the one in the home service area for the merchant, the service list address and the customer table address are addresses in the service director information server 401, and the user information address is an address in the user information server 402. When the home service area of the merchant differs from that of the service providing system 102, the service list address and the customer table address are addresses in the service director information server of a service providing system in the home service area for the merchant, and the user information address is an address in the user information server in a service providing system in the home service area for the merchant.

In the settlement processor list 4302 five types of information are stored for each settlement processor: a settlement processor name 4327 (4332); a settlement processor ID 4328 (4333), a settlement processor's communication ID 4329 (4334), a service list address 4330 (4335), and a settlement processor information address 4331 (4336).

The settlement processor's communication ID 4329 (4334) is an ID for the settlement system 103 when the service providing system 102 communicates with the settlement system 103 via the digital communication line 111. The service list address 4330 (4335) is an address in the service director information server 401 at which is stored a list of service code that the settlement processor can handle. The settlement processor information address 4331 (4336) is an address in the settlement processor information server 404 at which the settlement processor data management information of the settlement processor is stored.

In the provided service list 4303 four types of information are stored for one provided service through the personal remote credit settlement service: a service providing number 4337 (4341), a service code 4338 (4342), a service providing time 4339 (4343), and a provided service information address 4340 (4344).

The service providing number 4337 (4341) uniquely represents the process performed by the service providing system 102 to provide one service. The service code 4338 (4342) is a code number indicating the type of credit card service used by the user. The service providing time 4339 (4343) is the time at which the service is provided by means of the personal remote credit settlement service. The provided service information address 4340 (4344) is an address in the service director information server 401 at which is stored history information for the processes performed by the service providing system 102 to provide one service.

An explanation will be given for process management data that are prepared when the service manager processor 23800 generates the user processor, the merchant processor, the settlement processor, and the service director processor.

In FIGS. 75A to 75F are shown the structures of process management data that are prepared by the service manager processor 23800.

In FIG. 75A is shown the data structure for the user process management information 4400 that is prepared for one user process. The user process management information 4400 includes seven types of information: a user process ID 4406 indicating a process ID for a user process; a user ID 4407 for a user corresponding to a user process; a home process ID 4408 indicating a process ID for the user process of a service providing system in a home service area for the user; a mobile process ID 4409 indicating the process ID for the user process of a service providing system in a service area other than the home service area for the user; a service director process ID 4410 indicating a process ID for a service director process that belongs to the same process group as the user process; a process status 4411 indicating the operating state of the user process; and a process data area pointer 4412 indicating a memory area assigned for the user process.

When the personal credit terminal 100 communicates with the service providing system 102 in the home service area of the user, the service manager processor 23800 in the service providing system 102 in the home service area generates one user processor that corresponds to the personal credit terminal 100. Through the service providing systems in all the service areas, the service manager processor 23800 sets an ID that uniquely represents the user processor in the field of the user process ID 4406, and sets a "0" in the fields of the home process ID 4408 and the mobile process ID 4409.

When the user employs the personal credit terminal 100 in a service area other than the home service area to communicate with a service providing system in a service area other than the home service area, a user processor that corresponds to the personal credit terminal 100 is generated for the service providing system in the home service area of the user and of the service providing system with which the personal credit terminal 100 communicates.

In this case, the user processor in the service providing system in the home service area is called a home user processor (HUP), and the user processor in the service providing system with which the personal credit terminal communicates is called a mobile user processor (MUP). The home user process and the mobile user process are linked together and function cooperatively, so that they function as a single process. Specifically, the home user processor accesses the user's attribute information that is managed by the user information server, and the data in the RAM of the personal credit terminal, and the mobile user processor controls the communication with the personal credit terminal, and processes data. In other words, the mobile user processor accesses the user information server through the home user processor.

Through the service providing systems in all the service areas, the service manager processor of the service providing system in the home service area sets an ID in the field of the user process ID 4406, in the user process management information for the home user process, that uniquely represents the home user process, and also sets a "0" in the field of the home process ID 4408, as well as a mobile user process ID in the field of the mobile process ID 4409.

Further, through the service providing systems in all the service areas, the service manager processor of the service providing system with which the personal credit terminal communicates sets an ID in the field of the user process ID 4406, in the user process management information for the mobile user process, that uniquely represents the mobile user process, and also sets the home user process ID in the field of the home process ID 4408 and a "0" in the field of the mobile process ID 4409.

In addition, the user ID 4407 and the service director process ID 4410 uniquely represent the user and the service director process through the service providing systems in all the service areas.

In FIG. 75B is shown the data structure for the merchant process management information 4401 that is prepared for one merchant process. The merchant process management information 4401 includes five types of information: a merchant process ID 4413 representing a process ID for a merchant process; a merchant ID 4414 for a merchant corresponding to a merchant process; a service director process ID 4415 representing a process ID for a service director process that belongs to the same process group as the merchant process; a process status 4416 for the operating state of the merchant process; and a process data area pointer 4417 designating a memory area assigned for the merchant process. The merchant process ID 4413, the merchant ID 4414, and the service director process ID 4415 uniquely represent the merchant process, the merchant, and the service director process through all the service providing systems in all the service areas.

In FIG. 75C is shown the data structure for the settlement processor process management information 4402 that is prepared for one settlement processor process. The settlement processor process management information 4402 includes five types of information: a settlement processor process ID 4418 representing a process ID for a settlement processor process; a settlement processor ID 4419 for a settlement processor that corresponds to a settlement processor process; a service director process ID 4420 representing a process ID for a service director process that belongs to the same process group as the settlement processor process; a process status 4421 for the operating state of the settlement processor process; and a process data area pointer 4422 designating a memory area assigned for the settlement processor process. The settlement processor process ID 4418, the settlement processing ID 4419, and the service director process ID 4420 uniquely represent the settlement processor process, the settlement processor, and the service director process through all the service providing systems in all the service areas.

In FIG. 75D is shown the data structure for the service director process management information 4403 that is prepared for one service director process. The service director process management information 4403 includes five types of information: a service director process ID 4423 representing a process ID for a service director process; a process group ID 4424 representing a process group ID that the service director process belongs to; a process status 4425 for the operating state of the service director process; a member list 4426 including a list of process IDs for processes that belong to the same group as the service director process; and a process data area pointer 4427 designating a memory area assigned for the service director process. The service director process ID 4423, and the process group ID 4424 uniquely represent the service director process, and the process group through all the service providing systems in all the service areas.

In FIG. 75E is shown the data structure for the process group management information 4404 that is prepared for one process group. The process group management information 4404 includes three types of information: a process group ID 4428 representing an ID for a process group; a service director process ID 4429 representing a process ID for a service director process in the process group; and a member list 4430 including a list of process IDs for processes that belong to the process group. The process group ID 4428 and the service director process ID 4429 uniquely represent the process group and the service director process through all the service providing systems in all the service areas.

In FIG. 75F is shown the data structure of a message list 4405 in which are entered messages by which the process for the service manager processor is suspended.

Among the messages transmitted to the service manager processor, the process for a payment request, a cancellation request issued by the user processor for an authorization request, and a cancellation request issued by the merchant processor may be temporarily suspended. At this time, these requests are registered in the message list 4405 by the service manager processor.

In the clearing process, for example, when a payment request is transmitted to the service manager processor earlier than an authorization request, the payment request is held in the message list 4405 until a corresponding authorization request is transmitted to the service manager processor. When the corresponding authorization request is received by the service manager process, it generates a service director processor, which then processes the payment request and the authorization request. When an authorization request is transmitted to the service manager processor earlier than a payment request, the authorization request is held in the message list 4405 until a corresponding payment request is transmitted to the service manager processor. When the corresponding payment request is received by the service manager process, it generates a service director processor, which then processes the payment request and the authorization request.

Furthermore, in the cancellation process, when a cancellation request from the user processor is transmitted to the service manager processor earlier than a cancellation request from the merchant processor, the cancellation request from the user process is held in the message list 4405 until a cancellation request from a corresponding merchant processor is transmitted to the service manager processor. When the cancellation request from the corresponding merchant is received by the service manager process, it generates a service director processor, which then processes the cancellation requests from both the user processor and the merchant processor. When a cancellation request from a merchant processor is transmitted to the service manager processor earlier than a cancellation request from a user processor, the cancellation request from the merchant processor is held in the message list 4405 until a cancellation request from a corresponding user processor is transmitted to the service manager processor. When the cancellation request from the corresponding user processor is received by the service manager process, it generates a service director processor, which then processes the cancellation requests from both the user processor and the merchant processor.

The service manager processor compares the message registered in the message list 4405 with the contents of the message, and detects a message that corresponds to a payment request, an authorization request, or a cancellation request from a user processor or a merchant processor.

In the message list 4405 three types of information are registered for one message: a message pointer 4431 (4434), which points to a message; a matching data pointer 4432 (4435), which points to data used for a comparison to detect a corresponding message; and a process ID 4433 (4436), which represents a process of a message sender.

A detailed explanation will now be given for messages that are exchanged in the process for establishing a session between the personal credit terminal 100, or the credit settlement terminal 300, and the service providing system 102. To establish the session, the personal credit terminal 100 and the service providing system 102, or the credit settlement terminal 300 and the service providing system 102, authenticate each other before beginning to communicate. This process is herein after called a session establishment process.

In FIG. 76 is shown the session establishment processing when the personal credit terminal 100 accesses the service providing system 102. In FIGS. 78A, 78B and 78C are shown the contents of messages to be exchanged between the personal credit terminal 100 and the service providing system 102.

In FIG. 77 is shown the session establishment processing when the service providing system 102 accesses the personal credit terminal 100. In FIGS. 78D, 78E and 78F are shown the contents of messages to be exchanged between the personal credit terminal 100 and the service providing system 102.

When the personal credit terminal 100 accesses the service providing system 102, first, the personal credit terminal 100 makes a call to the service providing system 102 to connect the line (4505: line connection). At this time, the personal credit terminal 100 transmits to the digital public network 108 a call request 4500, which is a message for requesting the line connection for a digital wireless telephone, and the digital public network 108 transmits to the service providing system 102 a call reception request 4501, which that is a message for calling the service providing system 102. Upon receiving the request 4501, the service providing system 102 transmits to the digital public network 108 a call reception response 4503, which is a message for permitting a call, and the digital public network 108 transmits to the personal credit terminal 100 a call response 4504, which is a message permitting the line connection. As a result, the personal credit terminal 100 is connected to the service providing system 102 via the line (4505: line connection).

The call request 4500, the call reception request 4501, the call reception response 4503, and the call response 4505, which are exchanged by the personal credit terminal 100 and the digital public network 108, and by the digital public network and the service providing system 102, conform to the protocol for the line connection of the digital wireless telephone passing through the transmission path 106, the base station 104, the digital communication line 107, the digital public network 108, and the digital communication line 109.

Furthermore, the service manager processor in the service providing system 102 receives the call reception request 4501 from the digital public network 108. The service manager processor employs the telephone number information for the calling personal credit terminal 100, which is included in the call reception request 4501, to generate a user processor that corresponds to the personal credit terminal 100 (4502: process generation), and the generated user processor transmits the call reception response 4503 and connects the personal credit terminal 100 to the line.

When the personal credit terminal 100 is connected to the user processor via a line (4505: line connection), the user processor generates and transmits to the personal credit terminal 100 an authentication test A 4506, which that is a test message for authenticating the personal credit terminal 100.

As is shown in FIG. 78A, the authentication test A 4506 consists of an authentication test A header 4700, which is header information indicating the message is the authentication test 4506; and a test pattern A 4702, which is obtained by encrypting, using a public key of a user, a test pattern A 4701, which is an arbitrary bit pattern.

The personal credit terminal 100 decrypts the received authentication test A 4506 using the private key of the user, and generates and transmits to the user processor an authentication test A response 4507, which is a response to the authentication test A 4506 and is a test message for authenticating the user processor.

As is shown in FIG. 78B, the authentication test A response 4507 consists of an authentication test A response header 4703, which is header information indicating the message is the authentication test A response 4507; a decrypted test pattern A 4704; and a test pattern B 4706 that is obtained by encrypting, using the public key of a service provider, a test pattern B 4705, which is an arbitrary bit pattern. In other words, the authentication test A response 4507 includes an authentication test B that corresponds to the authentication test A for the test pattern A and is used to authenticate the user processor.

Upon receiving the authentication test A response 4507, the user processor compares the test pattern A 4701 with the received test pattern A 4704, and authenticates the user. The authentication of the user in this case is based on an assumption such that the test pattern A encrypted using the public key of the user can be decrypted only by the personal credit terminal 100 that has the private key of the user.

In addition, the user processor decrypts the encrypted test pattern B using the private key of the service provider, and generates and transmits to the personal credit terminal 100 an authentication test B response 4508 that is a response to the authentication test B.

As is shown in FIG. 78C, the authentication test B response 4508 consists of an authentication test B response header 4707, which is header information indicating the message is the authentication test B response 4508; a decrypted test pattern A 4708; and a session permission message 4710, which is obtained by encrypting a session permission message 4709 using the public key of a user. The session permission message 4709 is a message granting permission for a session with the personal credit terminal 100, and includes information concerning a communication condition.

Upon receiving the authentication test B response 4508, the personal credit terminal 100 compares the test pattern B 4705 with the received test pattern B 4708, and authenticates the user processor. The authentication of the user processor in this case is based on an assumption such that the test pattern B encrypted using the public key of the service provider can be decrypted only by the service providing system 102 that has the private key of the service provider.

In addition, the personal credit terminal decrypts the encrypted session permission message using the private key of the user, and changes the communication condition with the user processor to a communication condition for the session permission message.

The personal credit terminal 100 and the user processor authenticate each other, and initiate communications based on the same communication condition (4509: session establishment). This state is herein after called a session established state.

When the service providing system 102 accesses the personal credit terminal 100, first, the service providing system 102 makes a call to the personal credit terminal 100 to connect the line (4605: line connection). At this time, in the service providing system 102, the service manager processor generates a user processor that corresponds to the personal credit terminal 100 that is to be connected (4600: process generation). The generated user processor transmits to the digital public network 108 a call request 4601 that is a message requesting a line connection for a digital wireless telephone, and the digital public network 108 transmits to the personal credit terminal 100 a call reception request 4602, which is a message for calling the personal credit terminal 100. Upon receiving the request 4602, the personal credit terminal 100 transmits to the digital public network 108 a call reception response 4603, which is a message permitting a call, and the digital public network 108 transmits to the user processor a call response 4604, which is a message permitting the line connection. As a result, the user processor and the personal credit terminal 100 are connected across through the line (4605: line connection). The call request 4601, the call reception request 4602, the call reception response 4603 and the call response 4604, which are exchanged by the user processor and the digital public network 108, and by the digital public network and the personal credit terminal 100, conform to the protocol for the line connection of the digital wireless telephone passing through the digital communication line 109, the digital public network 108, the digital communication line 107, the base station 104 and the transmission path 106.

When the user processor is connected to the personal credit terminal 100 via a line (4605: line connection), the personal credit terminal 100 generates and transmits to the user processor an authentication test C 4606, which that is a test message for authenticating the user processor.

As is shown in FIG. 78D, the authentication test C 4606 consists of an authentication test C header 4711, which is header information indicating the message is the authentication test C 4606; and a test pattern C 4713, which is obtained by encrypting, using a public key of a user, a test pattern C 4712, which is an arbitrary bit pattern.

The user processor decrypts the received authentication test C 4606 using the private key of the service provider, and generates and transmits to the personal credit terminal 100 an authentication test C response 4607, which is a response to the authentication test C 4606 and is a test message for authenticating the personal credit terminal 100.

As is shown in FIG. 78E, the authentication test C response 4607 consists of an authentication test C response header 4714, which is header information indicating the message is the authentication test C response 4607; a decrypted test pattern C 4715; and a test pattern D 4717 that is obtained by encrypting, using the public key of a user, a test pattern D 4716, which is an arbitrary bit pattern. In other words, the authentication test C response 4607 includes an authentication test D that corresponds to the authentication test C for the test pattern C and is used to authenticate the personal credit terminal 100.

Upon receiving the authentication test C response 4607, the personal credit terminal 100 compares the test pattern C 4712 with the received test pattern C 4715, and authenticates the user processor. The authentication of the user processor in this case is based on an assumption such that the test pattern C encrypted using the public key of the service provider can be decrypted only by the service providing system 102 that has the private key of the service provider.

In addition, the personal credit terminal 100 decrypts the encrypted test pattern D using the private key of the user, and generates and transmits to the user processor an authentication test D response 4608 that is a response to the authentication test D.

As is shown in FIG. 78F, the authentication test D response 4608 consists of an authentication test D response header 4718, which is header information indicating the message is the authentication test D response 4608; a decrypted test pattern D 4719; and a session permission message 4721, which is obtained by encrypting a session permission message 4720 using the public key of a service provider. The session permission message 4720 is a message granting permission for a session with the user processor, and includes information concerning a communication condition.

Upon receiving the authentication test D response 4608, the user processor compares the test pattern D 4716 with the received test pattern D 4719, and authenticates the personal credit terminal 100. The authentication of the personal credit terminal 100 in this case is based on an assumption such that the test pattern B encrypted using the public key of the user can be decrypted only by the personal credit terminal 100 that has the private key of the user.

In addition, the user processor decrypts the encrypted session permission message using the private key of the service provider, and changes the communication condition with the personal credit terminal 100 to a communication condition for the session permission message.

The user processor and the personal credit terminal 100 and authenticate each other, and initiate communications based on the same communication condition (4609: session establishment). This state is herein after called a session established state.

The session establishment process for the credit settlement terminal 300 and the service providing system 102 is performed in the same manner as for the session establishment process for the personal credit terminal 100 and the service providing system 102.

In FIG. 79 is shown the session establishment processing when the credit settlement terminal 300 accesses the service providing system 102. In FIGS. 81A, 81B and 81C are shown the contents of messages to be exchanged between the credit settlement terminal 300 and the service providing system 102.

In FIG. 80 is shown the session establishment processing when the service providing system 102 accesses the credit settlement terminal 300. In FIGS. 81D, 81E and 81F are shown the contents of messages to be exchanged between the credit settlement terminal 300 and the service providing system 102.

When the credit settlement terminal 300 accesses the service providing system 102, first, the credit settlement terminal 300 makes a call to the service providing system 102 to connect the line (4805: line connection). At this time, the credit settlement terminal 300 transmits to the digital public network 108 a call request 4800, which is a message for requesting the line connection for a digital telephone, and the digital public network 108 transmits to the service providing system 102 a call reception request 4801, which that is a message for calling the service providing system 102. Upon receiving the request 4801, the service providing system 102 transmits to the digital public network 108 a call reception response 4803, which is a message for permitting a call, and the digital public network 108 transmits to the credit settlement terminal 300 a call response 4804, which is a message permitting the line connection. As a result, the credit settlement terminal 300 is connected to the service providing system 102 via the line (4805: line connection).

The call request 4800, the call reception request 4801, the call reception response 4803, and the call response 4805, which are exchanged by the credit settlement terminal 300 and the digital public network 108, and by the digital public network and the service providing system 102, conform to the protocol for the line connection of the digital telephone passing through the transmission path 106, the base station 104, the digital communication line 107, the digital public network 108, and the digital communication line 109.

Furthermore, the service manager processor in the service providing system 102 receives the call reception request 4801 from the digital public network 108. The service manager processor employs the telephone number information for the calling credit settlement terminal 300, which is included in the call reception request 4801, to generate a merchant processor that corresponds to the credit settlement terminal 300 (4802: process generation), and the generated merchant processor transmits the call reception response 4803 and connects the credit settlement terminal 300 to the line.

When the credit settlement terminal 300 is connected to the merchant processor via a line (4805: line connection), the merchant processor generates and transmits to the credit settlement terminal 300 an authentication test A 4806, which that is a test message for authenticating the credit settlement terminal 300.

As is shown in FIG. 81A, the authentication test A 4806 consists of an authentication test A header 5000, which is header information indicating the message is the authentication test 4806; and a test pattern A 5002, which is obtained by encrypting, using a public key of a user, a test pattern A 5001, which is an arbitrary bit pattern.

The credit settlement terminal 300 decrypts the received authentication test A 4806 using the private key of the merchant, and generates and transmits to the merchant processor an authentication test A response 4807, which is a response to the authentication test A 4806 and is a test message for authenticating the merchant processor.

As is shown in FIG. 81B, the authentication test A response 4807 consists of an authentication test A response header 5003, which is header information indicating the message is the authentication test A response 4807; a decrypted test pattern A 5004; and a test pattern B 5006 that is obtained by encrypting, using the public key of a service provider, a test pattern B 5005, which is an arbitrary bit pattern. In other words, the authentication test A response 4807 includes an authentication test B that corresponds to the authentication test A for the test pattern A and is used to authenticate the merchant processor.

Upon receiving the authentication test A response 4807, the merchant processor compares the test pattern A 5001 with the received test pattern A 5004, and authenticates the merchant. The authentication of the merchant in this case is based on an assumption such that the test pattern A encrypted using the public key of the merchant can be decrypted only by the credit settlement terminal 300 that has the private key of the merchant.

In addition, the merchant processor decrypts the encrypted test pattern B using the private key of the service provider, and generates and transmits to the credit settlement terminal 300 an authentication test B response 4808 that is a response to the authentication test B.

As is shown in FIG. 81C, the authentication test B response 4808 consists of an authentication test B response header 5007, which is header information indicating the message is the authentication test B response 4808; a decrypted test pattern A 5008; and a session permission message 5010, which is obtained by encrypting a session permission message 5009 using the public key of a merchant. The session permission message 5009 is a message granting permission for a session with the credit settlement terminal 300, and includes information concerning a communication condition.

Upon receiving the authentication test B response 4808, the credit settlement terminal 300 compares the test pattern B 5005 with the received test pattern B 5008, and authenticates the merchant processor. The authentication of the merchant processor in this case is based on an assumption such that the test pattern B encrypted using the public key of the service provider can be decrypted only by the service providing system 102 that has the private key of the service provider.

In addition, the credit settlement terminal 300 decrypts the encrypted session permission message using the private key of the merchant, and changes the communication condition with the merchant processor to a communication condition for the session permission message.

The credit settlement terminal 300 and the merchant processor authenticate each other, and initiate communications based on the same communication condition (4809: session establishment).

When the service providing system 102 accesses the credit settlement terminal 300, first, the service providing system 102 makes a call to the credit settlement terminal 300 to connect the line (4905: line connection). At this time, in the service providing system 102, the service manager processor generates a user processor that corresponds to the credit settlement terminal 300 that is to be connected (4900: process generation). The generated merchant processor transmits to the digital public network 108 a call request 4901 that is a message requesting a line connection for a digital telephone, and the digital public network 108 transmits to the credit settlement terminal 300 a call reception request 4902, which is a message for calling the credit settlement terminal 300. Upon receiving the request 4902, the credit settlement terminal 300 transmits to the digital public network 108 a call reception response 4903, which is a message permitting a call, and the digital public network 108 transmits to the merchant processor a call response 4904, which is a message permitting the line connection. As a result, the merchant processor and the credit settlement terminal 300 are connected across through the line (4905: line connection). The call request 4901, the call reception request 4902, the call reception response 4903 and the call response 4904, which are exchanged by the merchant processor and the digital public network 108, and by the digital public network and the credit settlement terminal 300, conform to the protocol for the line connection of the digital telephone passing through the digital communication line 109, the digital public network 108 and the digital telephone communication line 110.

When the merchant processor is connected to the credit settlement terminal 300 via a line (4905: line connection), the credit settlement terminal 300 generates and transmits to the merchant processor an authentication test C 4906, which that is a test message for authenticating the merchant processor.

As is shown in FIG. 81D, the authentication test C 4906 consists of an authentication test C header 5011, which is header information indicating the message is the authentication test C 4906; and a test pattern C 5013, which is obtained by encrypting, using a public key of a service provider, a test pattern C 5012, which is an arbitrary bit pattern.

The merchant processor decrypts the received authentication test C 4906 using the private key of the service provider, and generates and transmits to the credit settlement terminal 300 an authentication test C response 4907, which is a response to the authentication test C 4906 and is a test message for authenticating the credit settlement terminal 300.

As is shown in FIG. 81E, the authentication test C response 4907 consists of an authentication test C response header 5014, which is header information indicating the message is the authentication test C response 4907; a decrypted test pattern C 5015; and a test pattern D 5017 that is obtained by encrypting, using the public key of a merchant, a test pattern D 5016, which is an arbitrary bit pattern. In other words, the authentication test C response 4907 includes an authentication test D that corresponds to the authentication test C for the test pattern C and is used to authenticate the credit settlement terminal 300.

Upon receiving the authentication test C response 4907, the credit settlement terminal 300 compares the test pattern C 5012 with the received test pattern C 5015, and authenticates the merchant processor. The authentication of the merchant processor in this case is based on an assumption such that the test pattern C encrypted using the public key of the service provider can be decrypted only by the service providing system 102 that has the private key of the service provider.

In addition, the credit settlement terminal 300 decrypts the encrypted test pattern D using the private key of the user, and generates and transmits to the merchant processor an authentication test D response 4908 that is a response to the authentication test D.

As is shown in FIG. 81F, the authentication test D response 4908 consists of an authentication test D response header 5018, which is header information indicating the message is the authentication test D response 4908; a decrypted test pattern D 5019; and a session permission message 5021, which is obtained by encrypting a session permission message 5020 using the public key of a service provider. The session permission message 5020 is a message granting permission for a session with the merchant processor, and includes information concerning a communication condition.

Upon receiving the authentication test D response 4908, the merchant processor compares the test pattern D 5016 with the received test pattern D 5019, and authenticates the credit settlement terminal 300. The authentication of the credit settlement terminal 300 in this case is based on an assumption such that the test pattern B encrypted using the public key of the merchant can be decrypted only by the credit settlement terminal 300 that has the private key of the merchant.

In addition, the merchant processor decrypts the encrypted session permission message using the private key of the service provider, and changes the communication condition with the credit settlement terminal 300 to a communication condition for the session permission message.

The merchant processor and the credit settlement terminal 300 and authenticate each other, and initiate communications based on the same communication condition (4909: session establishment).

An explanation will now be given for the contents of messages that the personal credit terminal 100 and the credit settlement terminal 300 exchange with the service providing system 102 during the processing for the remote access. In the processing for the remote access, data are downloaded from the service providing system 102 in order to access data at the remote address. This process is herein after called a remote access process.

In FIG. 82A is shown the remote access process performed by the personal credit terminal 100, and in FIGS. 83A and 83B are shown the contents of messages that are exchanged by the personal credit terminal 100 and the user processor. When data to be accessed is at the remote address, the personal credit terminal 100 generates a remote access processor to initiate the remote access processing. First, in the remote access process, a session is established with the service providing system 102. Then, a remote access request 5100, i.e., a message requesting the user processor of the service providing system 102 access data, is generated and transmitted to the user processor.

As is shown in FIG. 83A, a digital signature 5204 of a user is provided for data that consists of a remote access header 5200, which is header information indicating the message is the remote access request 5100; a data address 5201, which indicates a remote address; a user ID 5202; and an issued time 5203, which indicates the date when the remote access request 5100 is issued, and the data are closed to address to the service provider, thereby providing the remote access request 5100.

The user processor of the service providing system 102 receives the remote access request 5100, decrypts it, examines the digital signature, generates a remote access data message 5101 and transmits it to the personal credit terminal 100.

As is shown in FIG. 83B, a digital signature of a service provider is provided for data that consists of a remote access header 5208, which is header information indicating that the message is the remote access data 5101; data that are requested 5209; a service provider ID 5210; and an issued time 5211, which indicates the date when the remote access data 5101 is issued. The data are closed to address to the user, thereby providing the remote access data 5101.

The personal credit terminal 100 receives the remote access data 5101, decrypts it, examines the digital signature, stores it in the temporary area, and accesses the data.

Similarly, in FIG. 85A is shown the remote access process performed by the credit settlement terminal 300, and in FIGS. 86A and 86B are shown the contents of messages that are exchanged between the credit settlement terminal 300 and the merchant processor. When data to be accessed is at the remote address, the credit settlement terminal 300 generates a remote access processor to initiate the remote access processing. First, in the remote access process, a session is established with the service providing system 102. Then, a remote access request 5400, i.e., a message requesting the merchant processor of the service providing system 102 access data, is generated and transmitted to the merchant processor.

As is shown in FIG. 86A, a digital signature 5504 of a merchant is provided for data that consists of a remote access header 5500, which is header information indicating the message is the remote access request 5400; a data address 5501, which indicates a remote address; a merchant ID 5502; and an issued time 5503, which indicates the date when the remote access request 5400 is issued, and the data are closed to address to the service provider, thereby providing the remote access request 5400.

The service providing system 102 receives the remote access request 5400, decrypts it, examines the digital signature, generates a remote access data message 5401 and transmits it to the credit settlement terminal 300.

As is shown in FIG. 86B, a digital signature of a service provider is provided for data that consists of a remote access header 5508, which is header information indicating that the message is the remote access data 5401; data that are requested 5509; a service provider ID 5510; and an issued time 5511, which indicates the date when the remote access data 5401 is issued. The data are closed to address to the merchant, thereby providing the remote access data 5401.

The credit settlement terminal 300 receives the remote access data 5401, decrypts it, examines the digital signature, stores it in the temporary area, and accesses the data.

An explanation will now be given for the contents of messages that the personal credit terminal 100 and the credit settlement terminal 300 exchange with the service providing system 102 during the processing for updating data. In the processing for updating data, the service providing system 102 updates the contents of the RAM 1502 of the personal credit terminal 100, or the contents of the RAM 22502 and the hard disk 22503 of the credit settlement terminal 300. This process is herein after called a data updating process.

In FIG. 82B is shown the data updating process performed by the personal credit terminal 100, and in FIGS. 83C to 83F and FIG. 84A are shown the contents of messages that are exchanged by the personal credit terminal 100 and the service providing system.

When the value held by a clock counter reaches the value held in an update time register, the personal credit terminal 100 generates a data updating processor to initiate the data updating process. First, in the data updating process a session is established with the service providing system 102. Then, a data update request 5102, i.e., a message requesting the user processor of the service providing system 102 update data, is generated and transmitted to the user processor.

As is shown in FIG. 83C, a digital signature of a user is provided for data that consists of a data update request header 5216, which is header information indicating the message is the data update request 5102; a user ID (or a merchant ID) 5217; and an issued time 5218, which indicates the date when the data update request 5102 is issued. The data are closed to address to the service provider, thereby providing the data updating request 5102.

The user processor of the service providing system 102 receives the data update request 5102, decrypts it, examines the digital signature, generates a data update request response 5103, i.e., a message indicating that the system is ready for accepting the request, and transmits it to the personal credit terminal 100.

As is shown in FIG. 83D, a digital signature of a service provider is provided for data that consists of a data update request response header 5223, which is header information indicating that the message is the data update request response 5103; a service provider ID 5224; and an issued time 5225, which indicates that the date when the data update request response 5103 is issued. The data are closed to address the user, thereby providing the data update request response 5103.

The personal credit terminal 100 receives the data update request response 5103, decrypts it, examines the digital signature, generates upload data 5104, i.e., a message that indicates to upload the data from the RAM 1502 to the service providing system 102, and transmits the data 5104 to the service providing system 102.

As is shown in FIG. 83E, a digital signature of a user is provided for data that consists of an upload data header 5230, which is header information indicating that the message is the upload data 5104; terminal data 5231 that are obtained by compressing the data in the RAM 1502; a user ID 5232; and an issued time 5233, which indicates the date when the upload data 5104 is issued. The data are closed to address to the service provider, thereby providing the upload data 5104.

The user processor of the service providing system 102 receives the upload data 5104, decrypts it, examines the digital signature, decompresses the terminal data 5231 and compares the obtained terminal data 5231 with the terminal data 24006 in the user information server 402 and the data held in the other user data management information area 24000.

Then, the service providing system 102 generates new terminal data and the update data 5105, which is a message for updating data in the personal credit terminal 100, and transmits them to the personal credit terminal 100.

As is shown in FIG. 83F, a digital signature of a service provider is provided for data that consists of an updated at a header 5238, which is header information indicating that the message is the update data 5105; terminal data 5239 that are obtained by compressing new terminal data; a service provider ID 5240; and an issued time 5241, which indicates the date when the update data 5105 is issued. The data are closed to address to the user, thereby providing the update data 5105.

The personal credit terminal 100 receives the update data 5105, decrypts it, examines the digital signature, decompresses the terminal data 5239, and updates the data in the RAM 1502.

In order to generate new terminal data, when there is no extra space in the object data area 21812, the user processor of the service providing system 102 compares the access times for the individual credit cards, and assigns a local address to the object data address for the credit card that has the latest access time.

The user processor also compares the use times of the information items, and assigns a local address to the use information address for the information that has the latest use time. When the version of a program for the personal credit terminal 100 needs to be upgraded, data in the fundamental program area are updated.

When the user processor of the service providing system 102 compares the upload data with the terminal data and finds the illegal alteration of the data, the service providing system 102 generates, instead of the update data 5105, a mandatory expiration command 5105' that is a message for halting the function of the personal credit terminal 100, and transmits the command 5105' to the personal credit terminal 100.

As is shown in FIG. 84A, a digital signature of a service provider is provided for data that consists of a mandatory expiration header 5300, which is header information indicating that the message is the mandatory expiration command 5105'; a service provider ID 5301; and an issued time 5302, which indicates that the date when the mandatory expiration command 5105' is issued. The data are closed to address to the user, thereby providing the mandatory expiration command 5105'.

Upon receipt of the mandatory expiration command 5105', the personal credit terminal 100 decrypts it, examines the digital signature, changes the terminal status 21902 to "use disabled." As a result, the use of the personal credit terminal 100 is inhibited.

As a result of the data updating process, information that is employed comparatively frequently is stored in the RAM 1502 of the personal credit terminal 100, the version of the program used for the terminal 100 is the latest, and the illegal alteration of the terminal data can be prevented.

In FIG. 85B is shown the data updating process performed by the credit settlement terminal 300, and in FIGS. 86C to 86F and FIG. 84A are shown the contents of messages that are exchanged by the credit settlement terminal 300 and the service providing system.

When the value held by a clock counter reaches the value held in an update time register, the credit settlement terminal 300 generates a data updating processor to initiate the data updating process. First, in the data updating process, a session is established with the service providing system 102. Then, a data update request 5402, i.e., a message requesting the merchant processor of the service providing system 102 updated at a, is generated and transmitted to the merchant processor.

As is shown in FIG. 86C, a digital signature of a merchant is provided for data that consists of a data update request header 5516, which is header information indicating the message is the data update request 5402; a merchant ID 5517; and an issued time 5518, which indicates the date when the data update request 5402 is issued. The data are closed to address to the service provider, thereby providing the data updating request 5402.

The merchant processor of the service providing system 102 receives the data update request 5402, decrypts it, examines the digital signature, generates a data update request response 5403, i.e., a message indicating that the system is ready for accepting the request, and transmits it to the credit settlement terminal 300.

As is shown in FIG. 86D, a digital signature of a service provider is provided for data that consists of a data update request response header 5523, which is header information indicating that the message is the data update request response 5503; a service provider ID 5524; and an issued time 5525, which indicates that the date when the data update request response 5403 is issued. The data are closed to address the merchant, thereby providing the data update request response 5403.

The credit settlement terminal 300 receives the data update request response 5403, decrypts it, examines the digital signature, generates upload data 5404, i.e., a message that indicates to upload the data from the RAM 22502 and the hard disk 22503 to the service providing system 102, and transmits the data to the service providing system 102.

As is shown in FIG. 86E, a digital signature of a merchant is provided for data that consists of an upload data header 5530, which is header information indicating that the message is the upload data 5404; terminal data 5531 that are obtained by compressing the data in the RAM 22502 and the hard disk 22503; a merchant ID 5532; and an issued time 5533, which indicates the date when the upload data 5404 is issued. The data are closed to address to the merchant, thereby providing the upload data 5404.

The service providing system 102 receives the upload data 5404, decrypts it, examines the digital signature, decompresses the terminal data 5531 and compares the obtained terminal data 5531 with the terminal data 24104 in the merchant information server 403 and data managed in the other merchant data management area 24100.

Then, the service providing system 102 generates new terminal data and the update data 5405, which is a message for updating data in the credit settlement terminal 300, and transmits them to the credit settlement terminal 300.

As is shown in FIG. 86F, a digital signature of a service provider is provided for data that consists of an updated at a header 5538, which is header information indicating that the message is the update data 5405; terminal data 5539 that are obtained by compressing new terminal data; a service provider ID 5540; and an issued time 5541, which indicates the date when the update data 5405 is issued. The data are closed to address to the merchant, thereby providing the update data 5405.

The credit settlement terminal 300 receives the update data 5405, decrypts it, examines the digital signature, decompresses the terminal data 5539, and updates the data in the RAM 22502 and the hard disk 22503.

In order to generate new terminal data, when there is no extra space on the hard disk 22503 of the credit settlement terminal 300, the merchant processor of the service providing system 102 compares the use times for the sales information, and assigns a local address to the sales information address for the sale information that has the latest use time. When the version of a program for the credit terminal 100 needs to be upgraded, data in the fundamental program area are updated.

When the service providing system 102 compares the upload data with the terminal data and finds the illegal alteration of the data, the service providing system 102 generates, instead of the update data 5405, a mandatory expiration command 5405' that is a message for halting the function of the credit settlement terminal 300, and transmits the command 5405' to the credit settlement terminal 300.

As is shown in FIG. 87A, a digital signature of a service provider is provided for data that consists of a mandatory expiration header 5600, which is header information indicating that the message is the mandatory expiration command 5405'; a service provider ID 5601; and an issued time 5602, which indicates that the date when the mandatory expiration command 5405' is issued. The data are closed to address to the merchant, thereby providing the mandatory expiration command 5405'.

Upon receipt of the mandatory expiration command 5405, the credit settlement terminal 300 decrypts it, examines the digital signature, changes the terminal status 22902 to "use disabled." As a result, the use of the credit settlement terminal 300 is inhibited.

As a result of the data updating process, information that is employed comparatively frequently is stored in the RAM and on the hard disk of the credit settlement terminal 300, the version of the program for the terminal 300 is the latest, and the illegal alteration of the terminal data can be prevented.

An explanation will now be given for the contents of messages that the personal credit terminal 100 and the credit settlement terminal 300 exchange with the service providing system 102 during the processing for forcibly updating data. During the processing for forcibly updating data, upon the need of urgent data dating, the service providing system 102 forcibly updates the contents of the RAM 1502 of the personal credit terminal 100, or the contents of the RAM 22502 and the hard disk 22503 of the credit settlement terminal 300. This process is herein after called a forcible data updating process.

In FIG. 82C is shown the forcible data updating process performed by the personal credit terminal 100, and in FIGS. 83E and 83F and FIG. 84A are shown the contents of messages that are exchanged between the personal credit terminal 100 and the service providing system.

When the data in the RAM of the personal credit terminal 100 must be urgently updated, such as when the contents of a contract with the user are changed, the service providing system 102 establishes a session with personal credit terminal 100. Then, the service providing system generates a data update command 5106, i.e., a message instructing the personal credit terminal 100 to perform the forcible data updating process, and transmits it to the personal credit terminal 100.

As is shown in FIG. 84B, the digital signature of a service provider is provided for data that consists of a data update command header 5307, which is header information indicating that the message is the data update command 5106; a service provider ID 5308; and an issued time 5309, which indicates the date on which the data update command 5106 is issued. These data are closed and addressed to the user, thereby providing the data update command 5106.

Upon receiving the data update command 5106, the personal credit terminal 100 decrypts it, examines the digital signature, generates forcible upload data, and begins the forcible data updating process. First, the personal credit terminal 100 generates upload data 5107, which is a message for uploading the data from the RAM 1502 to the service providing system 102, and transmits the data 5107 to the service providing system 102.

The user processor of the service providing system 102 receives the upload data 5107, decrypts it, examines the digital signature, decompresses the terminal data 5231 and compares the obtained terminal data 5231 with the terminal data 24006 in the user information server 402.

Then, the service providing system 102 generates new terminal data and the update data 5108, which is a message for updating data in the personal credit terminal 100, and transmits them to the personal credit terminal 100.

The personal credit terminal 100 receives the update data 5108, decrypts it, examines the digital signature, decompresses the terminal data 5239, and updates the data in the RAM 1502.

When the user processor of the service providing system 102 compares the upload data with the terminal data and finds the illegal alteration of the data, the service providing system 102 generates, instead of the update data 5108, a mandatory expiration command 5108' that is a message for halting the function of the personal credit terminal 100, and transmits the command 5108' to the personal credit terminal 100.

Upon receipt of the mandatory expiration command 5108', the personal credit terminal 100 decrypts it, examines the digital signature, changes the terminal status 21902 to "use disabled." As a result, the use of the personal credit terminal 100 is inhibited.

In FIG. 85C is shown the forcible data updating process performed by the credit settlement terminal 300, and in FIGS. 86E and 86F and FIG. 87A are shown the contents of messages that are exchanged by the credit settlement terminal 300 and the service providing system.

When the data in the RAM and on the hard disk of the credit settlement terminal 300 must be urgently updated, such as when the contents of a contract with the user are changed, the service providing system 102 establishes a session with credit settlement terminal 300. Then, the service providing system 102 generates a data update command 5406, i.e., a message instructing the credit settlement terminal 300 to perform the forcible data updating process, and transmits it to the credit settlement terminal 300.

As is shown in FIG. 87B, the digital signature of a service provider is provided for data that consists of a data update command header 5607, which is header information indicating that the message is the data update command 5406; a service provider ID 5608; and an issued time 5609, which indicates the date on which the data update command 5406 is issued. These data are closed and addressed to the user, thereby providing the data update command 5406.

Upon receiving the data update command 5406, the credit settlement terminal 300 decrypts it, examines the digital signature, generates forcible upload data, and begins the forcible data updating process. First, the credit settlement terminal 300 generates upload data 5407, which is a message for uploading the data from the RAM and the hard disk to the service providing system 102, and transmits the data 5407 to the service providing system 102.

The merchant processor of the service providing system 102 receives the upload data 5407, decrypts it, examines the digital signature, decompresses the terminal data 5531 and compares the obtained terminal data 5531 with the terminal data 24104 in the merchant information server 403.

Then, the service providing system 102 generates new terminal data and the update data 5408, which is a message for updating data in the credit settlement terminal 300, and transmits them to the credit settlement terminal 300.

The credit settlement terminal 300 receives the update data 5108, decrypts it, examines the digital signature, decompresses the terminal data 5539, and updates the data in the RAM and the hard disk.

When the merchant processor of the service providing system 102 compares the upload data with the terminal data and finds the illegal alteration of the data, the service providing system 102 generates, instead of the update data 5408, a mandatory expiration command 5408' that is a message for halting the function of the credit settlement terminal 300, and transmits the command 5408' to the credit settlement terminal 300.

Upon receipt of the mandatory expiration command 5408', the credit settlement terminal 300 decrypts it, examines the digital signature, changes the terminal status 22902 to "use disabled." As a result, the use of the credit settlement terminal 300 is inhibited.

An explanation will now be given for the contents of messages that the personal credit terminal 100 and the credit settlement terminal 300 exchange with the service providing system 102 during the processing for the data backup. During this processing, when the remaining battery capacity of the personal credit terminal 100 is small, the contents of the RAM 1502 are automatically backed up in the user information server of the service providing system 102. This process is herein after called a data backup process.

In FIG. 82D is shown the data backup process performed by the personal credit terminal 100, and in FIGS. 83C to 83F and FIG. 84A are shown the contents of messages that are exchanged by the personal credit terminal 100 and the service providing system. The data backup process is performed in substantially the same manner as for the data updating process. In the backup process, when the personal credit terminal 100 receives the update data 5112 and updates the data in the RAM 1502, the terminal 100 changes the terminal status 21902 to "write disabled," and inhibits the input of new data to the RAM until there is an adequate available battery capacity.

When the battery capacity is reduced until it is equal to or smaller than Q, the personal credit terminal 100 generates a data backup processor to initiate the data backup process. First, the personal credit terminal establishes a session with the service providing system 102. Then, the personal credit terminal 100 generates a data backup request 5109, i.e., a message requesting that the user processor of the service providing system 102 perform the data backup process, and transmits it to the user processor.

The user processor of the service providing system 102 receives the data update request 5109, decrypts it, examines the digital signature, generates a data update request response 5110, i.e., a message indicating that the system is ready for accepting the request, and transmits it to the personal credit terminal 100.

The personal credit terminal 100 receives the data update request response 5110, decrypts it, examines the digital signature, generates upload data 5111, i.e., a message that indicates to upload the data from the RAM 1502 to the service providing system 102, and transmits the data 5111 to the service providing system 102.

The user processor of the service providing system 102 receives the upload data 5111, decrypts it, examines the digital signature, decompresses the terminal data 5231 and compares the obtained terminal data 5231 with the terminal data 24006 in the user information server 402.

Then, the service providing system 102 generates new terminal data and the update data 5112, which is a message for updating data in the personal credit terminal 100, and transmits them to the personal credit terminal 100.

The personal credit terminal 100 receives the update data 5112, decrypts it, examines the digital signature, decompresses the terminal data 5239, and updates the data in the RAM 1502. In addition, the personal credit terminal 100 changes the terminal status 21902 to "writing disabled," and inhibits the entry of new data in the RAM until there is an adequate battery capacity.

When the user processor of the service providing system 102 compares the upload data with the terminal data and finds the illegal alteration of the data, the service providing system 102 generates, instead of the update data 5112, a mandatory expiration command 5112' that is a message for halting the function of the personal credit terminal 100, and transmits the command 5112' to the personal credit terminal 100.

Upon receipt of the mandatory expiration command 5112', the personal credit terminal 100 decrypts it, examines the digital signature, changes the terminal status 21902 to "use disabled." As a result, the use of the personal credit terminal 100 is inhibited.

An explanation will now be given for the contents of messages to be exchanged between the devices in the settlement processing.

In FIG. 88 is shown the process for exchanging messages between the devices in the settlement processing, and in FIGS. 89A to 89F, FIGS. 90A to 90C, and FIGS. 91A and 91B are shown the contents of messages that are exchanged by the devices during the settlement processing. FIG. 88 is a diagram extracted from FIG. 43 showing the messages exchanged by the devices, and the settlement processing in FIG. 43 is also shown in FIG. 88.

First, when the merchant depresses the credit transaction switch of the register (20604), the credit settlement terminal 300 generates a clearing processor to begin the clearing process. The credit settlement terminal 300 generates a plurality of payment offer responses 5701 (20609), and waits to receive a payment offer 5700.

When the user performs the payment operation 20607, the personal credit terminal 100 generates a clearing processor to begin the clearing process. The personal credit terminal 100 generates a payment offer 5700 (20608), and transmits it to the credit settlement terminal 300 by employing infrared communication.

As is shown in FIG. 89A, for the payment offer 5700 the digital signature of a user is provided for data that consist of a payment offer header 5800, which is header information indicating that the message is the payment offer 5700; a service code 5801; a service provider ID 5802; a request number 5803, which is arbitrarily generated as a number that uniquely represents the deal with a merchant; the amount of a payment 5804, which is entered by the user; a payment option code 5805, which reflects the payment option input by the user; an effective period 5806 for the payment offer 5700; and an issued time 5807, which indicates the date on which the payment offer 5700 was issued.

Upon receiving the payment offer 5700, the credit settlement terminal 300 compares the amount of the payment 5804 with the amount for the sale, determines whether the payment option 5805 can be employed, selects a payment offer response 5701 from a plurality of types of responses 5701, transmits it to the personal credit terminal 100 by employing infrared communication, and generates an authorization request 5702 (20610) that it transmits to the merchant processor of the service providing system 102 by employing digital telephone communication.

As is shown in FIG. 89B, for the payment offer response 5701, the digital signature of a merchant is provided for data that consist of a payment offer response header 5808, which is header information indicating that the message is the payment offer response 5701; a response message 5809, which is displayed on the LCD 203 when the personal credit terminal 100 receives the payment offer response 5701; a transaction number 5810, which is arbitrarily generated as a number that uniquely represents the deal with the user; the amount of the sale 5811; a service provider telephone number 5812, which indicates the telephone number of a service provider in a service area for a merchant; an effective period 5813 for the payment offer response 5701; a merchant ID 5814; and an issued date 5815, which indicates the date on which the payment offer response 5701 was issued. The digital signature of the service provider is provided for the service provider telephone number 5812. Since the response message 5809 is a text message that is optionally set by the merchant, it is not always set.

As is shown in FIG. 89C, the digital signature of a merchant is provided for data that consist of an authorization request header 5816, which is header information indicating that the message is the authorization request 5702; the payment offer 5700; the payment offer response 5701; an operator name 5817; a merchant ID 5818; and an issued time 5819, which indicates the date on which the authorization request 5702 was issued. These data are closed and addressed to the service provider, thereby providing the authorization request 5702. Since the operator name 5817 is optionally set by the merchant, it is not always set.

The personal credit terminal 100 receives the payment offer 5700, compares the amount of payment 5804 with the amount of the sale 5811, and generates and transmits a payment request 5703 (20613) to the user processor of the service providing system 102 through digital wireless telephone communication.

As is shown in FIG. 89D, the digital signature of a merchant is provided for data that consist of a payment request header 5824, which is header information indicating that the message is the payment request 5703; the payment offer 5700; the payment offer response 5701; a user ID 5825; and an issued time 5826, which indicates the date on which the payment request 5703 was issued. These data are closed and addressed to the user, thereby providing the payment request 5703.

Either the transmission of the authorization request 5702 from the credit settlement terminal 300 to the merchant processor, or the transmission of the payment request 5703 from the personal credit terminal 100 to the user processor may be performed first, or the two transmissions may be performed at the same time.

Upon receiving the authorization request 5702 and the payment request 20613, the merchant processor and the user processor of the service providing system 102 respectively decrypt them and examine their accompanying digital signatures. Then, the merchant processor and the user processor transmit an authorization request 5820, and a payment request 5827 to the service manager processor. The service manager processor compares the request number, the transaction number, and the merchant ID to obtain the correlation between the authorization request 5820 and the payment request 5827, and generates a service director processor to generate a process group to handle the two requests. The service director processor compares the contents of the authorization request 5702 with those of the payment request 5700, authorizes the user and generates an authorization response 5840. The merchant processor closes the authorization response 5840 and addresses it to the merchant, and transmits it as an authorization response 5704 (20614) to the credit settlement terminal 300 by employing digital telephone communication.

As is shown in FIG. 89E, the digital signature of a service provider is provided for data that consists of an authorization response header 5831, which is header information indicating that the message is the authorization response 5704; a transaction number 5832; an authorization number 5833; an authorization result 5834; user personal information data 5835, which includes the name and the age of the user and portrait image data for the user; a customer number 5836, which uniquely depicts the user for the merchant; an effective period 5837 for the authorization response 5704; a service provider ID 5838; and an issued time 5839, which indicates the date on which the authorization response 5704 was issued. These data are closed and addressed to the merchant, thereby providing the authorization response 614. When the credit condition of the user is not satisfactory, the user personal information 5834 are not set. In addition, the customer number 5836 is set when the user had a previous deal with the merchant that was handled by the personal remote credit settlement service.

The credit settlement terminal 300 receives the authorization response 5704 and decrypts it, examines the digital signature, and displays the results of the authorization on the LCD 302.

Then, when the person in charge for the merchant performs the clearing process request operation 20616, the credit settlement terminal 300 generates a settlement request 5705 (20618) and transmits it to the service providing system 102 by employing digital telephone communication.

As is shown in FIG. 89F, the digital signature of a service provider is provided for data that consist of a settlement request header 5844, which is header information indicating that the message is the settlement request 5705; a payment offer 5700; a payment offer response 5701; an authorization number 5845, which is issued by the service providing system 102; an effective period 5846 for the settlement request 5705; an operator name 5847; a merchant ID 5848; and an issued time 5849, which indicates the date on which the settlement request 5705 was issued. These data are closed and addressed to the service provider, thereby providing the settlement request 5705. Since setting the operator name 5847 is an optional operation performed by the merchant, it is not always set.

Upon receiving the settlement request 5705, the merchant processor of the service providing system 102 decrypts it, examines its accompanying digital signature, and transmits the settlement request to the service director processor. The service director processor compares the contents of the settlement request 5705 with those of the payment request 5700, and generates a settlement request 5906 for the settlement processor. The settlement processor closes the settlement request 5906 and addresses it to the settlement processor, and transmits it as a settlement request 5706 (20619) to the settlement system 103.

As is shown in FIG. 90A, the digital signature of a service provider is provided for data that consist of a settlement request header 5900, which is header information indicating that the message is the settlement request 5706; a credit card number 5901, which corresponds to the service code designated by the user; a request number 5902, which is issued by the personal credit terminal 100; an amount of payment 5903; a payment option code 5904; a merchant account number 5905, which reflects the account number of the merchant; a transaction number 5906; an effective period 5907 for the settlement request 5706; a service provider ID 5908; and an issued time 5909, which indicates the date on which the settlement request 5706 was issued. These data are closed and addressed to the settlement processor, thereby providing the settlement request 5706.

Upon receiving the settlement request 5706, the settlement system 103 decrypts it, examines the digital signature, performs an accounting process, and generates and transmits to the service providing system 102 a clearing confirmation notification 5707 (20620).

As is shown in FIG. 90B, the digital signature of a settlement processor is provided for data that consist of a clearing confirmation header 5914, which is header information indicating that the message is the clearing confirmation notification 5707; a clearing number 5915, which is arbitrarily generated as a number that uniquely represents the accounting process of the settlement system 103; a credit card number 5916; a request number 5917; an amount of payment 5918; a payment option code 5919; a merchant account number 5920; a transaction number 5921; clearing information 5922, for a service provider, accompanied by the digital signature of the settlement processor; clearing information 5923, for a merchant, accompanied by the digital signature of the settlement processor;

clearing information 5924, for a user, accompanied by the digital signature of the settlement processor; a settlement processor ID 5925; and an issued date 5926, which indicates the date when the clearing confirmation notification 5707 was issued. The data are closed to address to the service provider, thereby providing the clearing confirmation request 5707.

Upon receiving the clearing confirmation notification 5707, the settlement processor of the service providing system 102 decrypts it, examines the accompanying digital signature and transmits the clearing confirmation notification 5927 to the service director processor. Thereafter, the service director processor employs the clearing confirmation notification 5927 to generate a clearing confirmation notification 5937 for the merchant, and the merchant processor closes the notification 5937 and addresses it to the merchant, and transmits it as a clearing confirmation notification 5708 (20621) to the credit settlement terminal 300 by employing the digital telephone communication.

As is shown in FIG. 90C, a digital signature of a service provider is provided for data that consist of a clearing confirmation header 5931, which is header information indicating that the message is the clearing confirmation notification 5708; a clearing number 5932; clearing information 5923, for a merchant, accompanied by the digital signature of the settlement processor; a customer number 5933, which is generated as a number that uniquely represents a user for a merchant; a decrypted settlement request 5850; process information 5934, which concerns the process performed by the service providing system 102; a service provider ID 5935; and an issued date 5936, which indicates the date when the clearing confirmation notification 5708 was issued. The data are closed to address to the merchant, thereby providing the clearing confirmation notification 5708.

Since the service providing process information 5934 is set in accordance with the operation of the service provider, it may not always be set.

Upon receiving the clearing confirmation notification 5708, the credit settlement terminal 300 decrypts it, examines the digital signature, and generates a receipt 5709 (20622) and transmits it to the service providing system 102 through the digital telephone communication.

As is shown in FIG. 91A, a digital signature of a merchant is provided for data that consist of a receipt header 6000, which is header information indicating that the message is the receipt 5709; an item name 6001, which indicates the name of an item that is sold; sales information 6002, which is additional information concerning the transaction from the merchant to the user; a clearing number 6003; a transaction number 6004; a payment offer 5700; an operator name 6005; a merchant ID 6006; and an issued date 6007, which indicates the date when the receipt 5709 was issued. The data are closed to address to the service provider, thereby providing the receipt 5709. Since the sales information 6002 and the operator name 6005 are set in accordance with the operation of the merchant, they may not always be set.

Upon receiving the receipt 5709, the merchant processor of the service providing system 102 decrypts it, examines the accompanying digital signature and transmits a receipt 6008 to the service director processor. The service director processor employs the receipt 6008 to generate a receipt 6016 for the user. The user processor closes the receipt 6016 and addresses it to the user, and transmits it as a receipt 5710 (20624) to the personal credit terminal 100 by employing the digital wireless telephone communication.

As is shown in FIG. 91B, a digital signature of a service provider is provided for data that consist of a receipt header 6012, which is header information indicating that the message is the receipt 5710; a decrypted receipt 6008; clearing information 5924, for a user, accompanied by the digital signature of the settlement processor; process information 6013, which is information concerning the process performed by the service providing system 102; a service provider ID 6014; and an issued date 6015, which indicates the date when the receipt 5710 was issued. The data are closed to address to the user, thereby providing the receipt 5710. Since the service provider process information 3813 is set in accordance with the option selected by the service provider, it may not always be set.

Upon receiving the receipt 5710, the personal credit terminal 100 decrypts it, examines the digital signature, and displays the contents on the LCD 203.

An explanation will now be given for the contents of messages to be exchanged by the devices in the cancellation process.

In FIG. 92 is shown the process for exchanging messages by the devices in the cancellation process, and in FIGS. 93A to 93F are shown the contents of messages that are exchanged by the devices during the cancellation process. FIG. 92 is a diagram extracted from FIG. 9, showing the messages exchanged by the devices. The cancellation process in FIG. 9 is also shown in FIG. 92.

First, when the merchant performs the cancellation operation 901, the credit settlement terminal 300 generates a cancellation processor to begin the cancellation process. The credit settlement terminal 300 generates a cancellation request 6100 (903) from the clearing confirmation notification of the business that is to be canceled, and transmits the cancellation request 6100 to the merchant processor of the service providing system 102 by employing digital telephone communication.

When the user performs the cancellation operation 904, the personal credit terminal 100 generates a cancellation processor to begin the cancellation process. The personal credit terminal 100 generates a cancellation request 6101 (906) from the receipt for the business that is to be canceled, and transmits the cancellation request 6101 to the user processor of the service providing system 102 by employing digital wireless telephone communication.

As is shown in FIG. 93A, the digital signature of a merchant is provided for data that consist of a cancellation request header 6200, which is header information indicating that the message is the cancellation request 6100; a decrypted clearing confirmation notification 5937; an effective period 6201 for the cancellation request 6100; an operator name 6202; a merchant ID 6203; and an issued time 6204, which indicates the date on which the cancellation request 6100 was issued. These data are closed and addressed to the service provider, thereby providing the cancellation request 6100. Since setting the operator name 6202 is an optional operation performed by the merchant, it is not always set.

As is shown in FIG. 93B, the digital signature of a user is provided for data that consist of a cancellation request header 6209, which is header information indicating that the message is the cancellation request 6101; a decrypted receipt 6016; an effective period 6210 for the cancellation request 6101; a user ID 6211; and an issued time 6212, which indicates the date on which the cancellation request 6101 was issued. These data are closed and are addressed to the service provider, thereby providing the cancellation request 6101.

Either the transmission of the cancellation request 6100 from the credit settlement terminal 300 to the merchant processor, or the transmission of the cancellation request 6101 from the personal credit terminal 100 to the user processor, may be performed first, or the two transmissions may be performed at the same time.

Upon receiving the cancellation requests 6100 and 6101, the merchant processor and the user processor of the service providing system 102 respectively decrypt them and examine their accompanying digital signatures. Then, the merchant processor and the user processor transmit cancellation requests 6205 and 6213 to the service manager processor. The service manager processor compares the request number, the transaction number and the merchant ID to obtain the correlation between the two cancellation requests 6205 and 6213, and generates a service director processor to generate a process group to handle the two requests. The service director processor compares the contents of the cancellation requests 6205 and 6213, and generates a cancellation request 6221 for the settlement processor. The settlement processor closes the cancellation response 6221 and addresses it to the settlement processor, and transmits it as a cancellation request 6102 (907) to the settlement system 103.

As is shown in FIG. 93C, the digital signature of a service provider is provided for data that consist of a cancellation request header 6217, which is header information indicating that the message is the cancellation request 6102; a decrypted clearing confirmation notification 5927; an effective period 6218 for the cancellation request 61027; a service provider ID 6219; and an issued time 6220, which indicates the date on which the cancellation request 6102 was issued. These data are the closed and addressed to the settlement processor, thereby providing the cancellation request 6102.

Upon receiving the cancellation request 6102, the settlement system 103 decrypts it, examines the digital signature, performs the cancellation process, and generates and transmits to the service providing system 102 a cancellation confirmation notification 6103 (908).

As is shown in FIG. 93D, the digital signature of a settlement processor is provided for data that consist of a cancellation confirmation header 6225, which is header information indicating that the message is the cancellation confirmation notification 6103; a cancellation number 6226, which uniquely represents the cancellation process performed by the settlement system 103; a decrypted cancellation request 6221; clearing information 6227, for a service provider, accompanied by the digital signature of the settlement processor; cancellation information 6228, for a merchant, accompanied by the digital signature of the settlement processor; cancellation information 6229, for a user, accompanied by the digital signature of the settlement processor; a settlement processor ID 6230; and an issued date 6231, which indicates the date on which the cancellation confirmation notification 6103 was issued. These data are then closed and addressed to the service provider, thereby providing the cancellation confirmation request 6103.

Upon receiving the cancellation confirmation notification 6103, the settlement processor of the service providing system 102 decrypts it and examines its accompanying digital signature. Then, the settlement processor transmits a cancellation confirmation notification 6104 to the service director processor. The service director processor employs the cancellation confirmation notification 6104 to generate a cancellation confirmation notification 6241, and a cancellation receipt 6105. The merchant processor closes the cancellation confirmation notification 6241 and addresses it to the merchant, and transmits it as a cancellation confirmation notification 6104 (909) to the credit settlement terminal 300. The user processor closes the cancellation receipt 6105 and addresses it to the user, and transmits it as a cancellation receipt 6105 (910) to the personal credit terminal 100.

As is shown in FIG. 93E, the digital signature of a service provider is provided for data that consist of a cancellation confirmation header 6236, which is header information indicating that the message is the cancellation confirmation notification 6104; a cancellation number 6237; a decrypted cancellation request 6205; cancellation information 6228, for a merchant, accompanied by the digital signature of the settlement processor; process information 6238, which concerns the process performed by the service providing system 102; a service provider ID 6239; and an issued date 6240, which indicates the date on which the cancellation confirmation notification 6104 was issued. These data are the closed and addressed to the merchant, thereby providing the cancellation confirmation request 6104. Since setting the service providing process information 6238 is an optional operation of the service provider, it may not always be set.

As is shown in FIG. 93F, the digital signature of a service provider is provided for data that consist of a cancellation receipt header 6245, which is header information indicating that the message is a cancellation receipt 6105; a cancellation number 6246; a decrypted cancellation request 6213; cancellation information 6229, for a user, accompanied by the digital signature of the settlement processor; process information 6247, which concerns the process performed by the service providing system 102; a service provider ID 6248; and an issued date 6249, which indicates the date on which the cancellation receipt 6105 was issued. These data are closed and addressed to the user, thereby providing the cancellation receipt 6105. Since setting the service providing process information 6247 is an optional operation of the service provider, it may not always be set.

Upon receiving the cancellation confirmation notification 6104, the credit settlement terminal 300 decrypts it, examines the digital signature, and displays the contents on the LCD 302. Upon receiving the cancellation receipt 6105, the personal credit terminal 100 decrypts it, examines the digital signature, and displays the contents on the LCD 203.

An explanation will now be given for the contents of messages to be exchanged by the devices in the customer service call process.

In FIG. 94A is shown the process for exchanging messages by the devices in the customer service call process, and in FIGS. 95A to 95E are shown the contents of messages that are exchanged by the devices during the customer service call process. FIG. 94A is a diagram extracted from FIG. 45A, showing the messages exchanged by the devices. Reference numeral 6305 indicates telephone communication between a credit settlement terminal and a personal credit terminal via a service provider. The customer service call process in FIG. 45A is also shown in FIG. 94A.

First, when the merchant performs the customer service call operation 21200, the credit settlement terminal 300 generates a customer service call processor to begin the customer service call process. The credit settlement terminal 300 generates a customer service call request 6300 (21202) and transmits it to the merchant processor of the service providing system 102 by employing digital telephone communication.

As is shown in FIG. 95A, the digital signature of a merchant is provided for data that consist of a customer service call request header 6400, which is header information indicating that the message is the customer service call request 6300; a customer number 6401, which is issued during the settlement processing as a number that represents a user; a request number 6402, which uniquely represents the customer service call request 6300; an operator name 6403; a merchant ID 6404; and an issued time 6405, which indicates the date on which the customer service call request 6300 was issued. These data are closed and addressed to the service provider, thereby providing the customer service call request 6300. Since setting the operator name 6403 is an optional operation performed by the merchant, it is not always set.

Upon receiving the customer service call request 6300, the merchant processor of the service providing system 102 decrypts it, examines its accompanying digital signature, and transmits a customer service call request 6406 to the service manager processor. The service manager processor generates a service director processor to generate a process group to handle the customer service call request 6406. The service director processor examines the customer table to determine which user corresponds to the customer number, compares the user with the access control information, and generates a customer service call 6417 and a response 6426 to it. The user processor closes the customer service call 6417 and addresses it to the user, and transmits it as a customer service call 6301 (21203) to the personal credit terminal 100. The merchant processor closes the customer service call response 6426 and addresses it to the merchant, and transmits it as a customer service call response 6302 (21204) to the credit settlement terminal 300.

As is shown in FIG. 95B, the digital signature of a service provider is provided for data that consist of a customer service call header 6410, which is header information indicating that the message is the customer service call 6301; an operator name 6411; a merchant ID 6412; a merchant name 6413; a request number 6414, which is set by the credit settlement terminal 300; a service provider ID 6415; and an issued time 6416, which indicates the date on which the customer service call 6301 was issued. These data are closed and addressed to the user, thereby providing the customer service call 6301. Since setting the operator name 6411 is an optional operation performed by the merchant, it is not always set.

As is shown in FIG. 95C, the digital signature of a service provider is provided for data that consist of a customer service call response header 6421, which is header information indicating that the message is the customer service call request response 6302; a message response 6422 from the service providing system 102; a request number 6423, which, is set by the credit settlement terminal 300; a service provider ID 6424; and an issued time 6425, which indicates the date on which the customer service call request response 6302 was issued. These data are closed and addressed to the merchant, thereby providing the customer service call request response 6302.

Upon receiving the customer service call request response 6302, the credit settlement terminal 300 decrypts it, examines the digital signature, and displays "calling in process."

The personal credit terminal 100 receives and encrypts the customer service call 6301, examines the accompanying digital signature, and generates the customer service call processor to begin the customer service call process. First, the personal credit terminal 100 outputs an arrival tone through the loudspeaker to notify the user the call has been received. When the user performs the speech operation 21207, the personal credit terminal 100 generates and transmits an arrival response 6303 (21208) to the service providing system 102.

Upon receiving the arrival response 6303, the user processor of the service providing system 102 decrypts it, and transmits an arrival response 6433 to the service director processor. The service director processor employs the arrival response 6433 to generate a call response 6440. The merchant processor closes the call response 6440 and addresses it to the merchant, and transmits it as a call response 6304 (21210) to the credit settlement terminal 300.

The credit settlement terminal 300 receives the call response 6304 and decrypts it, so that the credit settlement terminal 300 and the personal credit terminal 100 are now on line.

As is shown in FIG. 95D, the arrival response 6303 is composed of an arrival response header 6430, which is header information indicating that the message is the arrival response 6303; a request number 6431, which is set by the credit settlement terminal 300; and an audio data encryption key 6432, and is closed and addressed to the service provider.

Further, as is shown in FIG. 95E, the call response 6304 is composed of a call response header 6437, which is header information indicating that the message is the call response 6304; a request number 6438, which is set by the credit settlement terminal 300; and an audio data encryption key 6439, and is closed and addressed to the merchant.

The audio data encryption keys 6432 and 6439 are those used in common to encrypt audio data for the speech.

The audio data encryption key is set to the audio data key register (CRYPT) 21613 of the personal credit terminal 100 and to the audio data key register (CRYPT) 22611 of the credit settlement terminal 300. The personal credit terminal 100 and the credit settlement terminal 300 encrypt the audio data for speech communication. When encryption of the audio data is not necessary, the audio data encryption keys are not set.

An explanation will now be given for the contents of messages to be exchanged by the devices in the inquiry call process.

In FIG. 94B is shown the process for exchanging messages by the devices in the inquiry call process, and in FIGS. 96A to 96E are shown the contents of messages that are exchanged by the devices during the inquiry call process. FIG. 94B is a diagram extracted from FIG. 45B, showing the messages exchanged by the devices. The inquiry call process in FIG. 45B is also shown in FIG. 94B.

First, when the user performs the inquiry call, operation 21213, the personal credit terminal 100 generates an inquiry call processor to begin the inquiry call process. The personal credit terminal 100 then generates an inquiry call request 6306 (21215) and transmits it to the user processor of the service providing system 102 by employing digital wireless telephone communication. Reference number 6311 shows telephone communication between a personal credit terminal and a credit settlement terminal via a service provider.

As is shown in FIG. 96A, the digital signature of a user is provided for data that consist of an inquiry call request header 6500, which is header information indicating that the message is the inquiry call request 6306; a merchant ID number 6501; an operator name 6502; a request number 6503, which uniquely represents the inquiry call request 6306; a user ID 6504; and an issued time 6505, which indicates the date on which the inquiry call request 6307 was issued. These data are closed and addressed to the service provider, thereby providing the inquiry call request 6306. Since setting the operator name 6503 for the settlement processing is an optional operation performed by the merchant, it is not always set.

Upon receiving the inquiry call request 6306, the user processor of the service providing system 102 decrypts it, examines its accompanying digital signature, and transmits an inquiry call request 6506 to the service manager processor. The service manager processor generates a service director processor to generate a process group to handle the inquiry call request 6506.

The service director processor examines the customer table of the merchant to generate an inquiry call 6515 and a response 6524 to it. The merchant processor closes the inquiry call 6515 and addresses it to the merchant, and transmits it as an inquiry call 6307 (21216) to the credit settlement terminal 300. The user processor closes the inquiry call response 6524 and addresses it to the user, and transmits it as an inquiry call response 6308 (21217) to the personal credit terminal 100.

As is shown in FIG. 96B, the digital signature of a service provider is provided for data that consist of an inquiry call header 6510, which is header information indicating that the message is the inquiry call 6307; a customer number 6511; a request number 6512, which is set by the personal credit terminal 100; a service provider ID 6513; and an issued time 6514, which indicates the date on which the inquiry call 6307 was issued. These data are closed and addressed to the merchant, thereby providing the inquiry call 6307.

As is shown in FIG. 96C, the digital signature of a service provider is provided for data that consist of an inquiry call request response header 6519, which is header information indicating that the message is an inquiry call request response 6308; a message response 6520 from the service providing system 102; a request number 6521, which is set by the personal credit terminal 100; a service providing ID 6522; and an issued time 6523, which indicates the date on which the inquiry call request response 6308 was issued. These data are closed and addressed to the user, thereby providing the inquiry call request response 6308.

Upon receiving the inquiry call request response 6308, the personal credit terminal 100 decrypts it, examines the digital signature, and displays "calling in process."

The credit settlement terminal 300 receives and encrypts the inquiry call 6307, examines the accompanying digital signature, and generates the inquiry call processor to begin the inquiry call process. First, the credit settlement terminal 300 outputs an arrival tone through the loudspeaker to notify the merchant the call has been received. When the merchant performs the speech operation 1220, the credit settlement terminal 300 generates and transmits an arrival response 6309 (21221) to the merchant processor of the service providing system 102.

Upon receiving the arrival response 6309, the merchant processor of the service providing system 102 decrypts it, and transmits an arrival response 6531 to the service director processor. The service director processor employs the arrival response 6531 to generate a call response 6538. The user processor closes the call response 6538 and addresses it to the user, and transmits it as a call response 6310 (21223) to the personal credit terminal 100.

The personal credit terminal 100 receives the call response 6310 and decrypts it, so that the personal credit terminal 100 and the credit settlement terminal 300 are now on line.

As is shown in FIG. 96D, the arrival response 6309 is composed of an arrival response header 6528, which is header information indicating that the message is the arrival response 6309; a request number 6529, which is set by the personal credit terminal 100; and an audio data encryption key 6530, and is closed and addressed to the service provider.

Further, as is shown in FIG. 96E, the call response 6310 is composed of a call response header 6535, which is header information indicating that the message is the call response 6310; a request number 6536, which is set by the personal credit terminal 100; and an audio data encryption key 6537, and is closed and addressed to the user.

The audio data encryption keys 6530 and 6537 are those used in common to encrypt audio data for the speech.

The audio data encryption key is set to the audio data key register (CRYPT) 21613 of the personal credit terminal 100 and to the audio data key register (CRYPT) 22611 of the credit settlement terminal 300. The personal credit terminal 100 and the credit settlement terminal 300 encrypt the audio data for speech communication. When encryption of the audio data is not necessary, the audio data encryption keys are not set.

A detailed explanation will mow be given for the session establishment process, the remote access process, the data updating process, the forcible data updating process, the data backup process, the clearing process, the cancellation process, the customer service call process and the inquiry call process, which are performed by the personal credit terminal 100, the credit settlement terminal 300, the settlement system 103, and the service manager processor, the service director processor, the user processor, the merchant processor and the settlement processor of the service providing system 102.

The general processing performed by the personal credit terminal 100 and the credit settlement terminal 300 have been explained while referring to FIGS. 51A and 51B, and FIGS. 61A and 61B. The personal credit terminal 100 and the credit settlement terminal 300 register enter in the process lists the session establishment process, the remote access process, the data updating process, the forcible data updating process, the data backup process, the clearing process, the cancellation process, the customer service call process and the inquiry call process, and perform the individual processes by executing the main routine.

On the other hand, the service providing system 102 executes the above processes by employing the cooperative performance of five processors: the service manager processor, the service director processor, the user processor, the merchant processor and the settlement processor.

Of the five processors, the service manager processor manages the service director manager, the user processor, the merchant processor and the settlement processor in accordance with the flowchart in FIGS. 97A and 97B and FIG. 98.

At step 6600, the service manager processor, which operates constantly, waits for a call reception request from the personal credit terminal 100 or the credit settlement terminal 300, and for a message from each processor. When the service manager processor receives a message, it performs a corresponding process at steps 6601 to 6618, or at steps 6700 to 6709, and returns to step 6600.

When the received message is a call reception request, at step 6606 the service manager processor generates a user processor or a merchant processor that corresponds to a caller. Otherwise, step 6602 is executed to determine whether the message is an authorization request.

When the message is an authorization request from the merchant processor, at step 6607 the service manager processor examines the message list 4405 to determine whether a payment request that corresponds to the received authorization request has been registered. When a corresponding payment request has not registered, at step 6608, the received message is registered in the message list 4405. When a corresponding payment request has been registered, at step 6609 the service manager processor generates a service director processor and forms a process group that consists of the service director processor, the user processor and the merchant processor. At step 6610, the service manager processor deletes the registered message from the message list 4405, and at step 6611, transmits an authorization request and a payment request to the service director processor.

If the message is not an authorization request, step 6603 is executed to determine if it a payment request.

When the received message is a payment request from the user processor, at step 6612 the service manager processor examines the message list 4405 to determine whether an authorization request that corresponds to the received payment request has been registered. When a corresponding authorization request has not been registered, at step 6613, the received message is registered in the message list 4405. When a corresponding authorization request has been registered, program control advances to step 6609, and the service manager processor performs the same process as is performed when the received message is an authorization request.

If the message is not a payment request, step 6604 is executed to determine if it is a cancellation request from the merchant processor.

When the message is a cancellation request from the merchant processor as determined by step 6604, at step 6614 the service manager processor examines the message list 4405 to determine whether a cancellation request from a user processor that corresponds to the received cancellation request has been registered. When a corresponding cancellation request has not been registered, at step 6615 the received message is registered in the message list 4405. When a corresponding cancellation request has been registered, at step 6616 the service manager processor generates a service director processor and forms a process group that consists of the service director processor, the user processor and the merchant processor. At step 6617, the service manager processor deletes the registered message from the message list 4405, and at step 6618, transmits to the service director processor the cancellation request from the merchant processor and the cancellation request from the user processor.

If the message is not a cancellation request from the merchant processor, step 6605 is executed to determine if it is a cancellation request from the user processor.

When the received message is a cancellation request from the user processor as determined by step 6605, at step 6619 the service manager processor examines the message list 4405 to determine whether a cancellation request from the merchant processor that corresponds to the received cancellation request has been registered. When a corresponding cancellation request has not been registered, at step 6620 the received message is registered in the message list 4405. When a corresponding cancellation request has been registered, program control advances to step 6616, and the service manager processor performs the same process as is performed when the received message is a cancellation request from the merchant processor.

If the message is not a cancellation request from the user processor, step 6700 is executed to determine if it is a customer service call request.

At steps 6608, 6613, 6615 and 6620, comparison data are generated from a merchant ID, a transaction number, and a request number that are included in the received message to register the message in the message list 4405.

At steps 6609 and 6616, first, the service director processor is generated and the process group management information and the service director process management information are registered. Then the user process management information and the merchant process management information are updated, and the process group that consists of the service director processor, the user processor and the merchant processor is provided.

When a received message is a customer service call request as determined by step 6700, at step 6704 the service manager processor generates a service director processor and forms a process group that consists of the service director processor and the merchant processor. At step 6705 the service manager processor transmits the customer service call request to the service director processor.

At step 6704, first, the service director processor is generated, and the process group management information and the service director process management information are registered. Then, the merchant process management information is updated and the process group that consists of the service director processor and the merchant processor is provided.

If the message is not a customer service call request, step 6701 is executed to determine if it is an inquiry call request.

When a received message is an inquiry call request as determined by step 6701, at step 6706 the service manager processor generates a service director processor and forms a process group that consists of the service director processor and the user processor. At step 6707 the service manager processor transmits the inquiry call request to the service director processor.

At step 6706, first, the service director processor is generated and the process group management information and the service director process management information are registered. Then, the user process management information is updated and the process group that consists of the service director processor and the user processor is provided.

If the message is not an inquiry call request, step 6702 is executed to determine if it a member process request.

When a received message is a member process generation request from the service director processor as determined by step 6702, at step 6708 the service manager processor performs a member processor generation process to add the requested processor in the process group that the service director processor belongs to. At this time, the service manager processor generates the requested processor, as needed.

If the message is not a member process request, step 6703 is executed to determine if it is a process deletion request.

When a received message is a process deletion request as determined by step 6703, at step 6709 the service manager processor deletes a requested member processor. At this time, the service manager processor updates the process management information, the process group management information 4404 and the message list 4405, as needed.

If the message is not a process deletion request, step 6600 is returned to.

The processor generation process at step 6606 is performed as shown in the flowchart in FIG. 99.

At step 6800, to determine a requester, the service manager processor compares telephone number information for a caller included in the call reception request with the user telephone number in the user list 4300 and the merchant telephone number in the merchant list 4301.

When the telephone number information matches the user telephone number, it is assumed that the user is the requester, and program control moves to step 6801. When the telephone number information matches the merchant telephone number, it is assumed that the merchant is the requester and program control goes to step 6804. When the telephone number does not match either telephone number, it is assumed that the call request is not from the user or the merchant, and no processor is generated. The processor generation is thereafter terminated.

At step 6801, the registered user process management information is examined to determine whether a user processor that corresponds to a requesting user no longer exists. When the user processor no longer exists, program control advances to step 6802, where at the user processor is generated and the user process management information is registered. The processor generation process is thereafter terminated. When the user processor exists, an illegal activity, such as the impersonation of an authenticated user, may have occurred. Therefore, program control moves to step 6803, where at an error message is transmitted to the management system. The processor generation process is thereafter terminated.

At step 6804, the registered merchant process management information is examined to determine whether a merchant processor that corresponds to a requesting merchant no longer exists. When the merchant processor no longer exists, program control advances to step 6805, where at the merchant processor is generated and the merchant process management information is registered. The processor generation process is thereafter terminated. When the merchant processor exists, an illegal activity, such as the impersonation of an authenticated merchant, may have occurred. Therefore, program control moves to step 6806, where at an error message is transmitted to the management system. The processor generation process is thereafter terminated.

The user processor performs processing that corresponds to a message received from the personal credit terminal or the service director processor, as shown in the flowchart in FIG. 100.

First, at step 6900 the user processor, which is generated by the service manager processor, establishes a session with the personal credit terminal 100, and at steps 6901 and 6905 waits for a message from the personal credit terminal 100 or from the service director processor. At step 6901 the user processor determines whether a message has been received, and at step 6905, determines whether a time-out has occurred.

When the user processor receives a message, at step 6902 the user processor changes its process status to the "active" state, and at step 6903 it performs a process corresponding to the received message. When the user processor receives, for example, a payment request from the personal credit terminal 100, at step 6903 the user processor performs the clearing process. When the process at step 6903 is terminated, at step 6904 the user processor changes the process status to the "idle" state. Program control thereafter returns to step 6901.

At step 6905 to make a decision concerning the occurrence of a time-out, when a new message is not received until a time-out period $T_{NRU}$ ($T_{NRU}$>0) has elapsed, the user processor determines that the time has expired, and at step 6906, performs the user process time-out process. During this time-out process, the user processor is deleted by the service manager processor, and the line between the user processor and the personal credit terminal 100 is disconnected.

That is, when the user processor does not receive a new message from the personal credit terminal 100 or from the service director processor until the time-out $T_{NRU}$ has ended, the user processor is automatically deleted, and the line with the personal credit terminal 100 is disconnected.

The merchant processor performs processing that corresponds to a message received from the credit or the service director processor, as shown in the flowchart in FIG. 101.

First, at step 7000 the merchant processor, as well as the user processor, which is generated by the service manager processor, establishes a session with the credit settlement terminal 300, and at steps 7001 and 7005 waits for a message from the credit settlement terminal 300 or from the service director processor. At step 7001 the merchant processor determines whether a message has been received, and at step 7005, determines whether a time-out has occurred.

When the merchant processor receives a message, at step 7002 the merchant processor changes its process status to the "active" state, and at step 7003 it performs a process corresponding to the received message. When the merchant processor receives, for example, an authorization request from the credit settlement terminal 300, at step 7003 the merchant processor performs the clearing process. When the process at step 7003 is terminated, at step 7004 the merchant processor changes the process status to the "idle" state. Program control thereafter returns to step 7001.

At step 7005 to make a decision concerning the occurrence of a time-out, when a new message is not received until a time-out period $T_{NRM}$ ($T_{NRM}$>0) has elapsed, the merchant processor determines that the time has expired, and at step 7006, performs the merchant process time-out process. During this time-out process, the merchant processor is deleted by the service manager processor, and the line between the merchant processor and the credit settlement terminal 300 is disconnected.

That is, when the merchant processor does not receive a new message from the credit settlement terminal 300 or from the service director processor until the time-out $T_{NRM}$ has ended, the merchant processor is automatically deleted, and the line with the credit settlement terminal 300 is disconnected.

The settlement processor performs processing that corresponds to a message received from the settlement system 103 or the service director processor, as shown in the flowchart in FIG. 102.

First, at step 7100 the settlement processor, which is generated by the service manager processor, initializes the line with the settlement system 103, and at steps 7101 and 7105 waits for a message from the settlement system 103 or from the service director processor. At step 7101 the settlement processor determines whether a message has been received, and at step 7105, determines whether a time-out has occurred.

When the settlement processor receives a message, at step 7102, the settlement processor changes its process status to the "active" state, and at step 7103 it performs a process corresponding to the received message. When the settlement processor receives, for example, a settlement request from the service director, at step 7103 the settlement processor performs the clearing process. When the process at step 7103 is terminated, at step 7104 the settlement processor changes the process status to the "idle" state. Program control thereafter returns to step 7101.

At step 7105 to make a decision concerning the occurrence of a time-out, when a new message is not received until a time-out period $T_{NRTP}$ ($T_{NRTP}$>0) has elapsed, the settlement processor determines that the time has expired, and at step 7106, performs the settlement processor process time-out process. During this time-out process, the settlement processor is deleted by the service manager processor, and the line between the settlement processor and the settlement system 103 is disconnected.

That is, when the settlement processor does not receive a new message from the settlement system 103 or from the service director processor until the time-out $T_{NRU}$ has ended, the settlement processor is automatically deleted, and the line with the settlement system 103 is disconnected.

When the fee for communication between the user processor and the personal credit terminal 100 depends on the period the communication line has been in use, the determination of the time-out period $T_{NRU}$ depends on a communication charge system. When, for example, a charge is added step by step for the time the communication line is in use, the time-out period $T_{NRU}$ is equal to or greater than a constant time $T_{NRU0}$ ($T_{NRU0}>0$) and is the maximum value that does not exceed a change point at the next communication charge. In this case, the personal credit terminal 100 and the user processor are connected as long as possible within a range wherein the communication fee does not increase. When the charge is linearly added for the time the communication line is in use, the time-out period $T_{NRU}$ is a constant time $T_{NRU0}$.

Similarly, when the fee for communication between the merchant processor and the credit settlement terminal 300, or between the settlement processor and the settlement system 103, depends on the period the communication line is in use, the length of the time-out periods $T_{NRM}$ and $T_{NRTP}$, as well as the period $T_{NRU}$, depend on a communication charge system.

The service director processor will be described in detail in the following explanation for the clearing, the cancellation, the customer service call, and the inquiry call processes. The settlement system will also be described in detail in the following explanation for the clearing and cancellation processes.

An explanation will now be given for the session establishment process when the personal credit terminal 100 accesses the user processor.

FIGS. 103A and 103B and FIG. 104 are flowcharts showing the session establishment processing, which is performed by the session establishment processor of the personal credit terminal 100 and by the user processor when the personal credit terminal 100 accesses the user processor.

First, at step 7200 the personal credit terminal 100 transmits a call request 4500 to the digital public network 108, and receives a call response 4504 from the digital public network 108 for connecting the line with the user processor. At this time, the service manager processor receives a call reception request 4501 from the digital public network 108, and generates a user processor at step 6606 for processor generation. At step 7300, the generated user processor transmits a call reception request 4503 to the digital public network for connecting the line with the personal credit terminal 100. Then, at step 7301, the user processor generates a test pattern A 4701, and at step 7302, encrypts the test pattern A using the user's public key to generate an authentication test A 4506. At step 7303, the user processor transmits the authentication test A to the personal credit terminal 100.

At step 7201, the personal credit terminal 100 generates a test pattern B 4705, and at step 7202 encrypts the test pattern B using the public key of a service provider to generate an authentication test B. At steps 7203 and 7211, the personal credit terminal 100 waits for receipt of the authentication test A from the user processor. At step 7203 the personal credit terminal 100 determines whether the authentication test A has been received, and at step 7211, determines whether the time has expired.

At step 7211, for the time-out decision, when the authentication test A is not received until the time-out $T_{TAU}$ ($T_{TAU}>0$) has ended, the personal credit terminal determines that the time has expired. At step 7212, the personal credit terminal 100 displays an error message on the LCD, and at step 7213, disconnects the line. The session establishment process is thereafter terminated.

When the authentication test A is received, at step 7204 the personal credit terminal 100 decrypts the encrypted test pattern A using the private key of the user. At step 7205 the personal credit terminal 100 employs the authentication test B and the decrypted test pattern A to generate an authentication test A response 4507, and at step 7206 transmits it to the user processor.

After the authentication test A has been transmitted to the personal credit terminal 100, at steps 7304 and 7312 the user processor waits for the receipt of the authentication test A response 4507 from the personal credit terminal 100. At step 7304, the user processor determines whether the authentication test A response has been received, and at step 7312, determines whether the time has expired.

At step 7312, for the time-out determination, when the authentication test A response is not received until the time-out $T_{TARU}$ ($T_{TARU}>0$) is ended, the user processor determines that the time has expired, and at step 7313 performs the session establishment error process. The session establishment process is thereafter terminated. During the session establishment error process, the user processor is deleted by the service manager processor and the line is disconnected.

When the authentication test A response is received, at step 7305 the user processor compares the test pattern A for the transmitted authentication test A with the test pattern A for the received authentication test A response. When the two test patterns match, program control advances to step 7306. When the two test patterns do not match, it is assumed that the authentication for a user has failed. At step 7314 the session establishment error process is performed, and the session establishment process is thereafter terminated.

At step 7306, the user processor decrypts the encrypted test pattern B using the private key of the service provider. At step 7307 the user processor generates a session permission message 4709. At step 7308 the user processor encrypts the session permission message using the public key of the user, and generates an authentication test B response 4508 using the decrypted test pattern B and the encrypted session permission message. At step 7309, the user processor transmits the authentication test B response to the personal credit terminal 100. At step 7310 the user status is changed to the session establishment state, and at step 7311 the process status is changed to the idle state. The session establishment process is thereafter terminated, and the user process advances to step 6901 in FIG. 100.

When the personal credit terminal 100 has transmitted the authentication test A response to the user processor, at steps 7207 and 7214, the personal credit terminal 100 waits for the receipt of the authentication test B response from the user processor. At step 7207 the personal credit terminal 100 determines whether the authentication test B response has been received, and at step 7214 determines whether the time has elapsed.

At step 7214, for the time-out determination, when the authentication test B response is not received until the time-out period $T_{TBRU}$ ($T_{TBRU}>0$) has ended, the personal credit terminal 100 determines the time has expired, and at step 7215 displays an error message on the LCD. At step 7216 the personal credit terminal 100 disconnects the line, and the session establishment process is thereafter terminated.

When the authentication test B response is received, at step 7208 the personal credit terminal 100 compares the test pattern B for the transmitted authentication test B with the test pattern B for the received authentication test B response. When the two test patterns match, program control advances to step 7209. When the two test patterns do not match, it is assumed that the authentication of a service provider has failed. At step 7217 an error message is displayed on the LCD, and at step 7218 the line is disconnected. The session establishment process is thereafter terminated.

At step 7209 the personal credit terminal 100 decrypts the encrypted session permission message using the private key of the user, and at step 7210 changes the terminal status to the session established state. The session establishment process is thereafter terminated.

When the credit settlement terminal 300 accesses the merchant processor, the session establishment process is performed in the same manner as for the session establishment process when the personal credit terminal 100 accesses the user processor. FIG. 105 and FIGS. 106A and 106B are flowcharts showing the session establishment processing, which is performed by the session establishment processor of the credit settlement terminal 300 and by the merchant processor when the credit settlement terminal 300 accesses the merchant processor.

First, at step 7400 the credit settlement terminal 300 transmits a call request 4800 to the digital public network 108, and receives a call response 4804 from the digital public network 108 for connecting the line with the merchant processor. At this time, the service manager processor receives a call reception request 4801 from the digital public network 108, and generates a merchant processor at step 6606 for processor generation. At step 7500, the generated merchant processor transmits a call reception request 4803 to the digital public network for connecting the line with the credit settlement terminal 300. Then, at step 7501, the merchant processor generates a test pattern A 5001, and at step 7502, encrypts the test pattern A using the merchant's public key to generate an authentication test A 4806. At step 7503, the merchant processor transmits the authentication test A to the credit settlement terminal 300.

At step 7401, the credit settlement terminal 300 generates a test pattern B 5005, and at step 7402 encrypts the test pattern B using the public key of a service provider to generate an authentication test B. At steps 7403 and 7411, the credit settlement terminal 300 waits for receipt of the authentication test A from the merchant processor. At step 7403 the credit settlement terminal 300 determines whether the authentication test A has been received, and at step 7411, determines whether the time has expired.

At step 7411, for the time-out decision, when the authentication test A is not received until the time-out $T_{TAM}$ ($T_{TAM}$>0) has ended, the credit settlement terminal 300 determines that the time has expired. At step 7412, the credit settlement terminal 300 displays an error message on the LCD, and at step 7413, disconnects the line. The session establishment process is thereafter terminated.

When the authentication test A is received, at step 7404 the credit settlement terminal 300 decrypts the encrypted test pattern A using the private key of the merchant. At step 7405 the credit settlement terminal 300 employs the authentication test B and the decrypted test pattern A to generate an authentication test A response 4807, and at step 7406 transmits it to the merchant processor.

After the authentication test A has been transmitted to the credit settlement terminal 300, at steps 7504 and 7512 the merchant processor waits for the receipt of the authentication test A response 4807 from the credit settlement terminal 300. At step 7504, the merchant processor determines whether the authentication test A response has been received, and at step 7512, determines whether the time has expired.

At step 7512, for the time-out determination, when the authentication test A response is not received until the time-out $T_{TARM}$ ($T_{TARM}$>0) is ended, the merchant processor determines that the time has expired, and at step 7513 performs the session establishment error process. The session establishment process is thereafter terminated. During the session establishment error process, the merchant processor is deleted by the service manager processor and the line is disconnected.

When the authentication test A response is received, at step 7505 the merchant processor compares the test pattern A for the transmitted authentication test A with the test pattern A for the received authentication test A response. When the two test patterns match, program control advances to step 7506. When the two test patterns do not match, it is assumed that the authentication for a merchant has failed. At step 7514 the session establishment error process is performed, and the session establishment process is thereafter terminated.

At step 7506, the merchant processor decrypts the encrypted test pattern B using the private key of the service provider. At step 7507 the merchant processor generates a session permission message 4709. At step 7508 the merchant processor encrypts the session permission message using the public key of the merchant, and generates an authentication test B response 4808 using the decrypted test pattern B and the encrypted session permission message. At step 7509, the merchant processor transmits the authentication test B response to the credit settlement terminal 300. At step 7510 the merchant status is changed to the session establishment state, and at step 7511 the process status is changed to the idle state. The session establishment process is thereafter terminated, and the merchant process goes to step 7001 in FIG. 101.

When the credit settlement terminal 300 has transmitted the authentication test A response to the merchant processor, at steps 7407 and 7414, the credit settlement terminal 300 waits for the receipt of the authentication test B response from the merchant processor. At step 7407 the credit settlement terminal 300 determines whether the authentication test B response has been received, and at step 7414 determines whether the time has elapsed.

At step 7414, for the time-out determination, when the authentication test B response is not received until the time-out period $T_{TBRM}$ ($T_{TBRM}$>0) has ended, the credit settlement terminal 300 determines the time has expired, and at step 7415 displays an error message on the LCD. At step 7416 the credit settlement terminal 300 disconnects the line, and the session establishment process is thereafter terminated.

When the authentication test B response is received, at step 7408 the credit settlement terminal 300 compares the test pattern B for the transmitted authentication test B with the test pattern B for the received authentication test B response. When the two test patterns match, program control advances to step 7409. When the two test patterns do not match, it is assumed that the authentication of a service provider has failed. At step 7417 an error message is displayed on the LCD, and at step 7418 the line is disconnected. The session establishment process is thereafter terminated.

At step 7409 the credit settlement terminal 300 decrypts the encrypted session permission message using the private key of the user, and at step 7410 changes the terminal status to the session established state. The session establishment process is thereafter terminated.

An explanation will now be given for the session establishment process when the user processor accesses the personal credit terminal 100.

FIGS. 107A and 107B and FIG. 108 are flowcharts showing the session establishment processing, which is performed by the user processor and by the session establishment processor of the personal credit terminal 100 when the user processor accesses the personal credit terminal 100.

First, at step 7600 the user processor, which is generated by the service manager processor, transmits a call request 4601 to the digital public network 108, and receives a call response 4604 from the digital public network 108 to connect the line with the personal credit terminal 100. At this time, at step 7700 the personal credit terminal 100 receives a call reception request 4602 from the digital public network 108, and transmits a call reception request response 4603 to the digital public network to connect the line with the user processor. Then, at step 7701, the personal credit terminal 100 generates a test pattern C 4712, and at step 7702, encrypts the test pattern C using the public key of a service provider to generate an authentication test C 4606. At step 7703, the personal credit terminal 100 transmits the authentication test C to the user processor.

At step 7601, the user processor generates a test pattern D 4716, and at step 7602 encrypts the test pattern D using the public key of the service provider to generate an authentication test D. At steps 7603 and 7612, the user processor waits for receipt of the authentication test C from the personal credit terminal. At step 7603 the user processor determines whether the authentication test C has been received, and at step 7612, determines whether the time has expired.

At step 7612, for the time-out decision, when the authentication test C is not received until the time-out $T_{TCU}$ ($T_{TCU}>0$) has ended, the user processor determines the time has expired, and at step 7613, performs the session establishment error process. The session establishment process is thereafter terminated.

When the authentication test C is received, at step 7604 the user processor decrypts the encrypted test pattern C using the private key of the service provider. At step 7605 the user processor employs the authentication test D and the decrypted test pattern C to generate an authentication test C response 4607, and at step 7606, transmits the response 4607 to the personal credit terminal 100.

After the authentication test C has been transmitted to the user processor, at steps 7704 and 7711 the personal credit terminal 100 waits for the receipt of the authentication test C response from the user processor. At step 7704, the personal credit terminal 100 determines whether the authentication test C response has been received, and at step 7711, determines whether the time has expired.

At step 7711, for the time-out determination, when the authentication test C response is not received until the time-out $T_{TCRU}$ ($T_{TCRU}>0$) has ended, the personal credit terminal 100 determines that the time has expired, and at step 7712 displays an error message on the LCD. In addition, the personal credit terminal 100 disconnects the line as shown in step 7713, and the session establishment process is thereafter terminated.

When the authentication test C response is received, at step 7705 the personal credit terminal 100 compares the test pattern C for the transmitted authentication test C with the test pattern C for the received authentication test C response. When the two test patterns match, program control advances to step 7706. When the two test patterns do not match, it is assumed that the authentication of a service provider has failed. At step 7714 an error message is displayed on the LCD and at step 7615 the line is disconnected. The session establishment process is thereafter terminated.

At step 7706, the personal credit terminal 100 decrypts the encrypted test pattern D using the private key of the user. At step 7707 the personal credit terminal 100 generates a session permission message 4710. At step 7708 the personal credit terminal 100 encrypts the session permission message using the public key of the service provider, and generates an authentication test D response 4608 using the decrypted test pattern D and the encrypted session permission message. At step 7709, the personal credit terminal 100 transmits the authentication test D response to the user processor. At step 7710 the terminal status is changed to the session establishment state, and the session establishment process is thereafter terminated.

When the user processor has transmitted the authentication test C response to the personal credit terminal 100, at steps 7607 and 7614, the user processor waits for the receipt of the authentication test D response from the personal credit terminal 100. At step 7607 the user processor determines whether the authentication test D response has been received, and at step 7614 determines whether the time has elapsed.

At step 7614, for the time-out determination, when the authentication test D response is not received until the time-out period $T_{TDRU}$ ($T_{TDRU}>0$) has ended, the user processor determines the time has expired, and at step 7615 the session establishment error process is performed. The session establishment process is thereafter terminated.

When the authentication test D response is received, at step 7608 the user processor compares the test pattern D for the transmitted authentication test D with the test pattern D for the received authentication test D response. When the two test patterns match, program control advances to step 7609. When the two test patterns do not match, it is assumed that the authentication of a user has failed. At step 7616 the session establishment error process is performed, and the session establishment process is thereafter terminated.

At step 7609 the user processor decrypts the encrypted session permission message using the private key of the service provider. At step 7610 the user status is changed to the session established state, and at step 7611 the process status is changed to the idle state. The session establishment process is thereafter terminated, and the user processor advances to step 6901 in FIG. 100.

The session establishment process when the merchant processor accesses the credit settlement terminal 300 is performed in the same manner as is the session establishment process when the user processor accesses the personal credit terminal 100. FIGS. 109A and 109B and FIG. 110 are flowcharts showing the session establishment processing, which is performed by the merchant processor and by the session establishment processor of the credit settlement terminal 300 when the merchant processor accesses the credit settlement terminal 300.

First, at step 7800 the merchant processor, which is generated by the service manager processor, transmits a call request 4901 to the digital public network 108, and receives a call response 4904 from the digital public network 108 to connect the line with the credit settlement terminal 300. At this time, at step 7900 the credit settlement terminal 300 receives a call reception request 4902 from the digital public network 108, and transmits a call reception request response 4903 to the digital public network to connect the line with the merchant processor. Then, at step 7901, the credit settlement terminal 300 generates a test pattern C 5012, and at step 7902, encrypts the test pattern C using the public key of a service provider to generate an authentication test C 4906. At step 7903, the credit settlement terminal 300 transmits the authentication test C to the merchant processor.

At step 7801, the merchant processor generates a test pattern D 5016, and at step 7802 encrypts the test pattern D using the public key of the service provider to generate an authentication test D. At steps 7803 and 7812, the merchant processor waits for receipt of the authentication test C from the credit settlement terminal 300. At step 7803 the merchant processor determines whether the authentication test C has been received, and at step 7812, determines whether the time has expired.

At step 7812, for the time-out decision, when the authentication test C is not received until the time-out $T_{TCM}$ ($T_{TCM}>0$) has ended, the merchant processor determines the time has expired, and at step 7813, performs the session establishment error process. The session establishment process is thereafter terminated.

When the authentication test C is received, at step 7804 the merchant processor decrypts the encrypted test pattern C using the private key of the service provider.

At step 7805 the merchant processor employs the authentication test D and the decrypted test pattern C to generate an authentication test C response 4907, and at step 7806, transmits the response 4907 to the credit settlement terminal 300.

After the authentication test C has been transmitted to the merchant processor, at steps 7904 and 7911 the credit settlement terminal 300 waits for the receipt of the authentication test C response from the merchant processor. At step 7904, the credit settlement terminal 300 determines whether the authentication test C response has been received, and at step 7911, determines whether the time has expired.

At step 7911, for the time-out determination, when the authentication test C response is not received until the time-out $T_{TCRU}$ ($T_{TCRU}>0$) has ended, the credit settlement terminal 300 determines that the time has expired, and at step 7912 displays an error message on the LCD. In addition, the credit settlement terminal 300 disconnects the line as shown in step 7913, and the session establishment process is thereafter terminated.

When the authentication test C response is received, at step 7905 the credit settlement terminal 300 compares the test pattern C for the transmitted authentication test C with the test pattern C for the received authentication test C response. When the two test patterns match, program control advances to step 7906. When the two test patterns do not match, it is assumed that the authentication of a service provider has failed. At step 7914 an error message is displayed on the LCD and at step 7915 the line is disconnected. The session establishment process is thereafter terminated.

At step 7906, the credit settlement terminal 300 decrypts the encrypted test pattern D using the private key of the merchant. At step 7907 the credit settlement terminal 300 generates a session permission message 5020. At step 7908 the credit settlement terminal 300 encrypts the session permission message using the public key of the service provider, and generates an authentication test D response 4908 using the decrypted test pattern D and the encrypted session permission message. At step 7909, the credit settlement terminal 300 transmits the authentication test D response to the merchant processor. At step 7910 the terminal status is changed to the session establishment state, and the session establishment process is thereafter terminated.

When the merchant processor has transmitted the authentication test C response to the credit settlement status is changed to the session established state, and at step 7811 the process status is changed to the idle state. The session establishment process is thereafter terminated, and the merchant processor moves to step 7001 in FIG. 101.

The remote access processing will now be explained.

FIGS. 111A and 111B and FIG. 112A are flowcharts showing the remote access processing performed by the remote access processor in the personal credit terminal 100, and by the user processor of the service providing system 102.

The remote access process is initiated when the user accesses data at a remote address. first, at step 8000 the personal credit terminal 100 generates a remote access request 5100 for data to be accessed, and at step 8001 it examines the terminal status to determine whether the session has been established. When the session has been established, at step 8003 the generated remote access request is transmitted to the user processor. When the session has not been established, at step 8002 the session establishment process is performed. After the session with the service providing system 102 has been established, program control moves to step 8003.

After the personal credit terminal 100 has transmitted the remote access request 5100, at steps 8004 and 8011 the terminal 100 waits for the reception of remote access data 5101. At step 8004 the personal credit terminal 100 determines whether the remote access data have been received, and at step 8011, determines whether the time has elapsed.

At step 8011, for the time-out decision, when the remote access data are not received until the time-out period $T_{RADU}$ ($T_{RADU}>0$) has ended, the personal credit terminal 100 determines the time has expired, and at step 8012 performs the user time-out error process. The remote access process is thereafter terminated. During the user time-out error process, the personal credit terminal 100 transmits a user time-out error message to the user processor of the service providing system 102, disconnects the line from the session with the user processor, and displays a time-out error on the LCD.

When the remote access data are received, at step 8005 the personal credit terminal 100 decrypts the encrypted remote access data using the private key of the user, and at step 8006 it examines the user's validity to verify the validity of remote access data.

When the examination of the user's validity is successful, at step 8007 the personal credit terminal 100 stores the data portion 5209 of the remote access data in the temporary area of the RAM. At step 8008 the data address information is updated to a local address at which the data are stored, and at step 8009 the data terminal 300, at steps 7807 and 7814, the merchant processor waits for the receipt of the authentication test D response from the credit settlement terminal 300. At step 7807 the merchant processor determines whether the authentication test D response has been received, and at step 7814 determines whether the time has elapsed.

At step 7814, for the time-out determination, when the authentication test D response is not received until the time-out period $T_{TDRM}$ ($T_{TDRM}>0$) has ended, the merchant processor determines the time has expired, and at step 7815 the session establishment error process is performed. The session establishment process is thereafter terminated.

When the authentication test D response is received, at step 7808 the merchant processor compares the test pattern D for the transmitted authentication test D with the test pattern D for the received authentication test D response. When the two test patterns match, program control advances to step 7809. When the two test patterns do not match, it is assumed that the authentication of a merchant has failed. At step 7816 the session establishment error process is performed, and the session establishment process is thereafter terminated.

At step 7809 the merchant processor decrypts the encrypted session permission message using the private key of the service provider. At step 7810 the merchant stored in the RAM are accessed. At step 8010 the personal credit terminal 100 examines temporary area to determine the capacity of the free space, and to determine whether the data updating process is required. When the capacity of the free space available in the temporary area is equal to or greater than setup value AU (AU>0), the remote access processing is terminated without performing another process. When the empty capacity is smaller than the setup value AU, the data updating processor is generated to initiate the data updating process.

When the examination of the user's validity fails, at step 8013 the personal credit terminal 100 performs a user session error process, and the remote access process is terminated. During the user session error process, the personal credit terminal 100 transmits a user session error message to the user processor of the service providing system, disconnects the line from the user processor, and displays a session error on the LCD.

The examination of the user's validity is a process for verifying the validity of a message that is received from the user processor of the service providing system 102. As is shown in FIG. 111B, three types of verifications are performed to establish the validity of the user. First, at step 8014 the digital signature of the service provider is examined, then at step 8015 the service provider ID is compared, and at step 8016 the time at which the received message was issued is examined. At step 8016, for verifying the issued time, a difference between the time at which the received information was issued and the current time is examined. When the difference is time $T_U$ ($T_U$>0) or longer, the received information is regarded as invalid. Thus, only when the digital signature of the service provider is verified, the service providers ID are matched and the examination of the issued time is successful, is it ascertained that the examination of the user's validity is successful. In all other cases, it is ascertained that the examination has failed.

For the user processor, the remote access process is begun upon receiving the remote access request 5100. First, at step 8100, the user processor decrypts the remote access request 5100 using the private key of the service provider, and at step 8101 examines the validity of the user processor to verify the remote access request.

When the examination for the validity of the user processor is successful, at step 8102 the user processor generates remote access data 5101, and at step 8103 it transmits the remote access data 5101 to the personal credit terminal 100. The remote access process is thereafter terminated.

When the examination for the validity of the user processor fails, the user processor ascertains that the received message is not valid, and at step 8104 performs a user process session error process. The remote access process is thereafter terminated. In the user process session error process, the user processor is deleted by the service manager processor, and the line for the session with the personal credit terminal is disconnected. In this case, the user processor transmits to the management system 407 a session error message that indicates the invalid message was received.

The examination of the validity of the user processor is a process employed for verifying information that is received from the personal credit terminal 100. As is shown in FIG. 112B, three types of verifications are performed when examining the validity of the user processor. First, at step 8105 the digital signature of the user is examined, at step 8106 the user ID is compared, and at step 8107 the time at which the received information was issued is examined. Further, at step 8107 for the examination of the issued time, a difference between the issued time for the received information and the current time is examined. When the time difference is equal to or greater than time $T_{UP}$ ($T_{UP}$>0), the received information is regarded as invalid. Therefore, only when the digital signature of the user is verified, the user IDs are matched, and the issued time is verified, is it assumed that the examination of the validity of the user processor is successful. In all other cases, it is ascertained the validity examination has failed.

FIGS. 113A and 113B and FIG. 114A are flowcharts showing the remote access processing performed by the remote access processor in the credit settlement terminal 300, and by the merchant processor of the service providing system 102.

The remote access process is initiated when the merchant accesses data at a remote address. First, at step 8200 the credit settlement terminal 300 generates a remote access request 5400 for data to be accessed, and at step 8201 it examines the terminal status to determine whether the session has been established. When the session has been established, at step 8203 the generated remote access request is transmitted to the merchant processor. When the session has not been established, at step 8202 the session establishment process is performed. After the session with the service providing system 102 has been established, program control moves to step 8203.

After the credit settlement terminal 300 has transmitted the remote access request 5400, at steps 8204 and 8211 the terminal 300 waits for the reception of remote access data 5401. At step 8204 the credit settlement terminal 300 determines whether the remote access data have been received, and at step 8211, determines whether the time has elapsed.

At step 8211, for the time-out decision, when the remote access data are not received until the time-out period $T_{RADM}$ ($T_{RADM}$>0) has ended, the credit settlement terminal 300 determines the time has expired, and at step 8212 performs the merchant time-out error process. The remote access process is thereafter terminated. During the merchant time-out error process, the credit settlement terminal 300 transmits a merchant time-out error message to the merchant processor of the service providing system 102, disconnects the line from the session with the merchant processor, and displays a time-out error on the LCD.

When the remote access data are received, at step 8205 the credit settlement terminal 300 decrypts the encrypted remote access data using the private key of the merchant, and at step 8206 it examines the merchant's validity to verify the validity of remote access data.

When the examination of the merchant's validity is successful, at step 8207 the credit settlement terminal 300 stores the data portion 5509 of the remote access data in the temporary area of the RAM. At step 8208 the data address information is updated to a local address at which the data are stored, and at step 8209 the data stored in the RAM are accessed. At step 8210 the credit settlement terminal 300 examines temporary area to determine the capacity of the free space, and to determine whether the data updating process is required. When the capacity of the free space available in the temporary area is equal to or greater than setup value AM (AM>0), the remote access processing is terminated without performing another process. When the empty capacity is smaller than the setup value AM, the data updating processor is generated to initiate the data updating process.

When the examination of the merchant's validity fails, at step 8213 the credit settlement terminal 300 performs a merchant session error process, and the remote access process is terminated. During the merchant session error process, the credit settlement terminal 300 transmits a merchant session error message to the merchant processor of the service providing system, disconnects the line from the merchant processor, and displays a session error on the LCD.

The examination of the merchant's validity is a process for verifying the validity of a message that is received from the merchant processor of the service providing system 102. As is shown in FIG. 113C, three types of verifications are performed to establish the validity of the merchant. First, at step 8214 the digital signature of the service provider is examined, then at step 8215 the service provider ID is compared, and at step 8216 the time at which the received message was issued is examined. At step 8216, for verifying the issued time, a difference between the time at which the received information was issued and the current time is examined. When the difference is time $T_M$ ($T_M$>0) or longer, the received information is regarded as invalid. Thus, only when the digital signature of the service provider is verified, the service providers ID are matched and the examination of the issued time is successful, is it ascertained that the examination of the merchant's validity is successful. In all other cases, it is ascertained that the examination has failed.

For the merchant processor, the remote access process is begun upon receiving the remote access request 5400. First, at step 8300, the merchant processor decrypts the remote access request 5100 using the private key of the service provider, and at step 8301 examines the validity of the merchant processor to verify the remote access request.

When the examination for the validity of the merchant processor is successful, at step 8302 the merchant processor generates remote access data 5401, and at step 8203 it transmits the remote access data 5401 to the credit settlement terminal 300. The remote access process is thereafter terminated.

When the examination for the validity of the merchant processor fails, the merchant processor ascertains that the received message is not valid, and at step 8204 performs a merchant process session error process. The remote access process is thereafter terminated. In the merchant process session error process, the merchant processor is deleted by the service manager processor, and the line for the session with the credit settlement terminal 300 is disconnected. In this case, the merchant processor transmits to the management system 407 a session error message that indicates the invalid message was received.

The examination of the validity of the merchant processor is a process employed for verifying information that is received from the credit settlement terminal 300. As is shown in FIG. 114B, three types of verifications are performed when examining the validity of the merchant processor. First, at step 8305 the digital signature of the merchant is examined, at step 8306 the merchant ID is compared, and at step 8107 the time at which the received information was issued is examined. Further, at step 8307 for the examination of the issued time, a difference between the issued time for the received information and the current time is examined. When the time difference is equal to or greater than time $T_{MP}$ ($T_{MP}$>0), the received information is regarded as invalid. Therefore, only when the digital signature of the merchant is verified, the merchant IDs are matched, and the issued time is verified, is it assumed that the examination of the validity of the merchant processor is successful. In all other cases, it is ascertained the validity examination has failed.

The data update process will now be described.

FIGS. 115A and 115B and FIG. 116 are flowcharts showing the data updating processing performed by the data updating processor in the personal credit terminal 100, and by the user processor of the service providing system 102.

When the clock counter value of the personal credit terminal 100 matches the value of the update time register, or when the capacity of the free space in the temporary area is smaller than the setup value AU, the personal credit terminal 100 generates a data update processor to initiate the data updating process.

First, at step 8400 the personal credit terminal 100 displays "data update in progress" on the LCD, at step 8401 generates a data update request 5401, and at step 8402 examines the terminal status to determine whether the session has been established. When the session has been established, at step 8404 the generated data update request is transmitted to the user processor. When the session has not been established, at step 8403 the session establishment process is performed. After the session with the service providing system has been established, program control advances to step 8404.

After the data update request has been transmitted, at steps 8405 and 8416 the personal credit terminal 100 waits for the receipt of a data update response 5103. At step 8405 the personal credit terminal 100 determines whether the data update response has been received, and at step 8416 it determines whether the time has expired.

At step 8416, for the time-out determination, when the data update response is not received until the time-out period $T_{RURU}$ ($T_{RURU}$>0) has ended, the personal credit terminal 100 determines the time has expired, and at step 8417 it performs a user time-out error process. The data updating process is thereafter terminated.

When the data update response is received, at step 8406 the personal credit terminal 100 decrypts the data update response using the private key of the user. At step 8407 the personal credit terminal 100 examines the validity of the user to verify the validity of the data update response.

When the examination of the user's validity is successful, at step 8408 the personal credit terminal 100 compresses the data in the RAM and prepares upload data 5104, and at step 8409 it transmits the upload data to the user processor.

When the examination of the validity of the user fails, at step 8418 the personal credit terminal 100 performs a user session error process. The data updating process is thereafter terminated.

After the personal credit terminal 100 has transmitted the upload data, at steps 8410 and 8419, the terminal 100 waits for the reception of a message from the user processor. At step 8410 the personal credit terminal 100 determines whether the message has been received, and at step 8419, determines whether the time has elapsed.

At step 8419, for the time-out decision, when the message is not received until the time-out period $T_{DU}$ ($T_{DU}$>0) has ended, the personal credit terminal 100 determines the time has expired, and at step 8420 it performs the user time-out error process. The data updating process is thereafter terminated.

Upon receiving a message from the user processor, at step 8411 the personal credit terminal 100 decrypts the received message using the private key of the user, and at step 8412, examines the validity of the user in order to verify the validity of the received message.

When the examination of the user's validity is successful, the personal credit terminal 100 moves to step 8413. When the examination of the user's validity fails, at step 8421 the personal credit terminal 100 performs a user session error process. The data updating process is thereafter terminated.

At step 8413 the personal credit terminal 100 determines whether the received message is data-update data 5105 or a mandatory expiration command 5105'. When the received message is data-update data 5105, at step 8414 the terminal data 5239 of the update data are decompressed, and the data in the RAM are updated. At step 8415 the display "data updating in progress" is canceled. The data updating process is thereafter terminated.

When the received message is a mandatory expiration command 5105', at step 8422 the personal credit terminal 100 displays "operation disabled" on the LCD, and at step 8423 clears the terminal enable bit of the EEPROM 1503 to inhibit the operation. At step 8424 the terminal status is changed to "operation disabled," and the data updating process is thereafter terminated.

For the user processor, the data updating process is begun upon receiving the data update request 5102. First, at step 8500, the user processor decrypts the data update request 5102 using the private key of the service provider, and at step 8501 it examines the validity of the user processor to verify the data update request.

When the validation of the user processor is successful, at step 8502 the user processor generates a data update response 5103, and at step 8503, transmits the data update response 5103 to the personal credit terminal 100.

When the examination for the validity of the user processor fails, the user processor ascertains that the received message is not valid, and at step 8514, performs a user process session error process. The remote access process is thereafter terminated.

After the user processor has transmitted the data update response, at steps 8504 and 8515 the user processor waits for the reception of upload data 5104. At step 8504 the user processor determines whether the upload data have been received, and at step 8515, determines whether the time has elapsed.

At step 8515, for the time-out decision, when the upload data are not received until the time-out period $T_{UDU}$ ($T_{UDU}$>0) has ended, the user processor determines the time has expired, and at step 8516 it performs the user process time-out error process. The data updating process is thereafter terminated. During the user process session error process, the user processor is deleted by the service manager processor, and the line for the session with the personal credit terminal is disconnected. In this case, the user processor transmits to the management system 407 a session error message that indicates the time has expired.

Upon receiving upload data, at step 8505 the user processor decrypts the received upload data using the private key of the service provider, and at step 8506 examines the validity of the user processor in order to verify the validity of the upload data.

When the examination of the validity of the user processor is successful, the user processor advances to step 8507. When the examination of the validity of the user processor fails, the user processor ascertains that the received message is not valid, and at step 8517 it performs the user processor session error process. The data updating process is thereafter terminated.

At step 8507, the user processor decompresses the terminal data 5231 of the upload data, and at step 8508 it performs data comparison to verify that the terminal data have not been illegally altered. In the data comparison, the decompressed terminal data are compared with the terminal data 24006 of the user information server and data that are managed by using the other user data management information 24000.

When the data comparison is successful, at step 8509 the user processor employs the decompressed terminal data to update the access time in the credit card list 24008 of the user information server. At step 8510 the capacity of the object data area of the personal credit terminal 100, the data generation time, and the access time are employed to generate new terminal data. At step 8511 a difference between the decompressed terminal data and the new terminal data is calculated, and update data 5105 are generated. At step 8512 the generated update data 5105 are transmitted to the personal credit terminal 100. At step 8513 the terminal data 24006 for the user information service are updated, and the data updating process is thereafter terminated.

When the data comparison fails, it is assumed that the terminal data may have been illegally altered. At step 8518 the user processor generates a mandatory expiration command 5105', and at step 8519 it transmits it to the personal credit terminal 100. At step 8520, the user status 24102 of the user information server is changed to "operation disabled," and at step 8521 the user process session error process is performed. The data updating process is thereafter terminated.

At step 8510, for generating new terminal data, the data to be stored in the RAM are rearranged so that the temporary area is empty. Especially when there is no extra space in the object data area 21812, the access times for individual credit cards are compared, and a local address is assigned as the object data address of the credit card that has the latest access time. In addition, the use times for the individual use information items are compared, and a local address is assigned as the use information address for the use information having the latest use time. When the version of the program of the personal credit terminal 100 needs to be upgraded, the data in the fundamental program area are updated. It should be noted that the data in the user area are updated to the data in the user area that is included in the terminal data received from the personal credit terminal 100.

FIGS. 117 and 118 are flowcharts showing the data updating processing performed by the data updating processor in the credit settlement terminal 300, and by the merchant processor of the service providing system 102.

When the clock counter value of the credit settlement terminal 300 matches the value of the update time register, or when the capacity of the free space in the temporary area is smaller than the setup value AM, the credit settlement terminal 300 generates a data update processor to initiate the data updating process.

First, at step 8600 the credit settlement terminal 300 displays "data update in progress" on the LCD, and at step 8601 generates a data update request 5402, and at step 8602 examines the terminal status to determine whether the session has been established. When the session has been established, at step 8604 the generated data update request is transmitted to the merchant processor. When the session has not been established, at step 8603 the session establishment process is performed. After the session with the service providing system has been established, program control advances to step 8604.

After the data update request has been transmitted, at steps 8605 and 8616 the credit settlement terminal 300 waits for the receipt of a data update response 5403. At step 8605 the credit settlement terminal 300 determines whether the data update response has been received, and at step 8616 it determines whether the time has expired.

At step 8616, for the time-out determination, when the data update response is not received until the time-out period $T_{RURM}$ ($T_{RURM}$>0) has ended, the credit settlement terminal 300 determines the time has expired, and at step 8617 it performs a merchant time-out error process. The data updating process is thereafter terminated.

When the data update response is received, at step 8606 the credit settlement terminal 300 decrypts the data update response using the private key of the merchant. At step 8607 the credit settlement terminal 300 examines the validity of the merchant to verify the validity of the data update response.

When the examination of the merchant's validity is successful, at step 8608 the credit settlement terminal 300 compresses the data in the RAM and prepares upload data 5404, and at step 8609 it transmits the upload data to the merchant processor.

When the examination of the validity of the merchant fails, at step 8618 the credit settlement terminal 300 performs a merchant session error process. The data updating process is thereafter terminated.

After the credit settlement terminal 300 has transmitted the upload data, at steps 8610 and 8619, the terminal 300 waits for the reception of a message from the merchant processor. At step 8610 the credit settlement terminal 300 determines whether the message has been received, and at step 8619, determines whether the time has elapsed.

At step 8619, for the time-out decision, when the message is not received until the time-out period $T_{DM}$ ($T_{DM}>0$) has ended, the credit settlement terminal 300 determines the time has expired, and at step 8620 it performs the merchant time-out error process. The data updating process is thereafter terminated.

Upon receiving a message from the merchant processor, at step 8611 the credit settlement terminal 300 decrypts the received message using the private key of the merchant, and at step 8612, examines the validity of the merchant in order to verify the validity of the received message.

When the examination of the merchant's validity is successful, the credit settlement terminal 300 moves to step 8613. When the examination of the merchant's validity fails, at step 8621 the credit settlement terminal 300 performs a merchant session error process. The data updating process is thereafter terminated.

At step 8613 the credit settlement terminal 300 determines whether the received message is data-update data 5405 or a mandatory expiration command 5405'. When the received message is data-update data 5405, at step 8614 the terminal data 5539 of the update data are decompressed, and the data in the RAM are updated. At step 8615 the display "data updating in progress" is canceled. The data updating process is thereafter terminated.

When the received message is a mandatory expiration command 5405', at step 8622 the credit settlement terminal 300 displays "operation disabled" on the LCD, and at step 8623 clears the terminal enable bit of the EEPROM 22504 to inhibit the operation. At step 8624 the terminal status is changed to "operation disabled," and the data updating process is thereafter terminated.

For the merchant processor, the data updating process is begun upon receiving the data update request 5402. First, at step 8700, the merchant processor decrypts the data update request 5402 using the private key of the service provider, and at step 8701 it examines the validity of the merchant processor to verify the data update request.

When the validation of the merchant processor is successful, at step 8702 the merchant processor generates a data update response 5403, and at step 8703, transmits the data update response 5403 to the credit settlement terminal 300.

When the examination for the validity of the merchant processor fails, the merchant processor ascertains that the received message is not valid, and at step 8713, performs a merchant process session error process. The remote access process is thereafter terminated.

After the merchant processor has transmitted the data update response, at steps 8704 and 8714 the merchant processor waits for the reception of upload data 5404. At step 8704 the merchant processor determines whether the upload data have been received, and at step 8714, determines whether the time has elapsed.

At step 8714, for the time-out decision, when the upload data are not received until the time-out period $T_{UDM}$ ($T_{UDM}>0$) has ended, the merchant processor determines the time has expired, and at step 8715 it performs the merchant process time-out error process. The data updating process is thereafter terminated. During the merchant process session error process, the merchant processor is deleted by the service manager processor, and the line for the session with the credit transaction terminal is disconnected. In this case, the merchant processor transmits to the management system 407 a session error message that indicates the time has expired.

Upon receiving upload data, at step 8705 the merchant processor decrypts the received upload data using the private key of the service provider, and at step 8706 examines the validity of the merchant processor in order to verify the validity of the upload data.

When the examination of the validity of the merchant processor is successful, the merchant processor advances to step 8507. When the examination of the validity of the merchant processor fails, the merchant processor ascertains that the received message is not valid, and at step 8716 it performs the merchant processor session error process. The data updating process is thereafter terminated.

At step 8707, the merchant processor decompresses the terminal data 5531 of the upload data, and at step 8708 it performs data comparison to verify that the terminal data have not been illegally altered. In the data comparison, the decompressed terminal data are compared with the terminal data 24006 of the merchant information server and data that are managed by using the other merchant data management information 24000.

When the data comparison is successful, at step 8709 the capacity of the object data area of the credit settlement terminal 300, the data generation time, and the access time are employed to generate new terminal data. At step 8710 a difference between the decompressed terminal data and the new terminal data is calculated, and update data 5405 are generated. At step 8711 the generated update data 5405 are transmitted to the credit settlement terminal 300. At step 8712 the terminal data 24104 for the merchant information service are updated, and the data updating process is thereafter terminated.

When the data comparison fails, it is assumed that the terminal data may have been illegally altered. At step 8717 the merchant processor generates a mandatory expiration command 5405', and at step 8718 it transmits it to the credit settlement terminal 300. At step 8719, the merchant status 24102 of the merchant information server is changed to "operation disabled," and at step 8720 the merchant process session error process is performed. The data updating process is thereafter terminated.

At step 8709, for generating new terminal data, the data to be stored in the RAM and on the hard disk are rearranged so that the temporary area is empty. Especially when there is no extra space in the object data area, the sale times for individual sales information items are compared, and a local address is assigned as the object data address of the sales information that has the latest sale time. When the version of the program of the credit settlement terminal 300 needs to be upgraded, the data in the fundamental program area are updated. It should be noted that the data in the merchant area are updated to the data in the merchant area that is included in the terminal data received from the credit settlement terminal 300.

The forcible data updating process is performed when the data in the RAM of the personal credit terminal 100 must be updated urgently, such as when the contents of the contract with the user are changed.

FIG. 119 and FIGS. 120A and 120B are flowcharts showing the forcible data updating processing performed by the forcible data updating processor in the personal credit terminal 100, and by the user processor of the service providing system 102.

First, at step 8900 the personal credit terminal 100 generates a data update command 5106, and at step 8901 examines the terminal status to determine whether the session has been established. When the session has been established, at step 8903 the generated data update request is transmitted to the user processor. When the session has not been established, at step 8902 the session establishment process is performed. After the session with the service providing system has been established, program control advances to step 8903.

After the data update command 5106 has been transmitted, at steps 8904 and 8914 the personal credit terminal 100 waits for the receipt of a upload data 5107. At step 8904 the personal credit terminal 100 determines whether the upload data has been received, and at step 8914 it determines whether the time has expired.

At step 8914, for the time-out determination, when the upload data is not received until the time-out period $T_{UDU}$ ($T_{UDU}$>0) has ended, the personal credit terminal 100 determines the time has expired, and at step 8915 it performs a user process time-out error process. The forcible data updating process is thereafter terminated.

Upon receiving upload data, at step 8905 the user processor decrypts the received upload data using the private key of the service provider, and at step 8906 examines the validity of the user processor in order to verify the validity of the upload data.

When the examination of the validity of the user processor is successful, the user processor advances to step 8907. When the examination of the validity of the user processor fails, the user processor ascertains that the received message is not valid, and at step 8916 it performs the user processor session error process. The data updating process is thereafter terminated.

At step 8907, the user processor decompresses the terminal data 5231 of the upload data, and at step 8908 it performs data comparison to verify that the terminal data have not been illegally altered.

When the data comparison is successful, at step 8909 the user processor employs the decompressed terminal data to update the access time in the credit card list 24008 of the user information server. At step 8910 the capacity of the object data area of the personal credit terminal 100, the data generation time, and the access time are employed to generate new terminal data. At step 8911*a* difference between the decompressed terminal data and the new terminal data is calculated, and update data 5108 are generated. At step 8912 the generated update data 5108 are transmitted to the personal credit terminal 100. At step 8913 the terminal data 24006 for the user information service are updated, and the forcible data updating process is thereafter terminated.

When the data comparison fails, it is assumed that the terminal data may have been illegally altered. At step 8917 the user processor generates a mandatory expiration command 5108', and at step 8918 it transmits it to the personal credit terminal 100. At step 8919, the user status 24102 of the user information server is changed to "operation disabled," and at step 8920 the user process session error process is performed. The data updating process is thereafter terminated.

At step 8910, for generating new terminal data, the data to be stored in the RAM are rearranged so that the temporary area is empty. Especially when there is no extra space in the object data area 21812, the access times for individual credit cards are compared, and a local address is assigned as the object data address of the credit card that has the latest access time. In addition, the use times for the individual use information items are compared, and a local address is assigned as the use information address for the use information having the latest use time. When the version of the program of the personal credit terminal 100 needs to be upgraded, the data in the fundamental program area are updated. It should be noted that the data in the user area are updated to the data in the user area that is included in the terminal data received from the personal credit terminal 100.

The personal credit terminal 100 receives a data update command 5106 and generates a forcible data update processor to begin the forcible data updating process.

At step 8800, the personal credit terminal 100 decrypts the data update command using the private key of the user. At step 8801 the personal credit terminal 100 examines the validity of the user to verify the validity of the data update command.

When the examination of the user's validity is successful, at step 8802 the personal credit terminal 100 displays "data updating in progress" on the LCD, and at step 8803 compresses the data in the RAM and prepares upload data 5107. Then, at step 8804 the personal credit terminal 100 transmits the upload data to the user processor.

When the examination of the validity of the user fails, at step 8811 the personal credit terminal 100 performs a user session error process. The data updating process is thereafter terminated.

After the personal credit terminal 100 has transmitted the upload data, at steps 8805 and 8812, the terminal 100 waits for the reception of a message from the user processor. At step 8805 the personal credit terminal 100 determines whether the message has been received, and at step 8812, determines whether the time has elapsed.

At step 8812, for the time-out decision, when the message is not received until the time-out period $T_{DU}$ ($T_{DU}$>0) has ended, the personal credit terminal 100 determines the time has expired, and at step 8813 it performs the user time-out error process. The data updating process is thereafter terminated.

Upon receiving a message from the user processor, at step 8806 the personal credit terminal 100 decrypts the received message using the private key of the user, and at step 8807, examines the validity of the user in order to verify the validity of the received message.

When the examination of the user's validity is successful, the personal credit terminal 100 moves to step 8808. When the examination of the user's validity fails, at step 8814 the personal credit terminal 100 performs a user session error process. The data updating process is thereafter terminated.

At step 8808 the personal credit terminal 100 determines whether the received message is data-update data 5108 or a mandatory expiration command 5108'. When the received message is data-update data 5108, at step 8809 the terminal data 5239 of the update data are decompressed, and the data in the RAM are updated. At step 8810 the display "data updating in progress" is canceled. The forcible data updating process is thereafter terminated.

When the received message is a mandatory expiration command 5108', at step 8815 the personal credit terminal 100 displays "operation disabled" on the LCD, and at step 8816 clears the terminal enable bit of the EEPROM 1503 to inhibit the operation. At step 8817 the terminal status is changed to "operation disabled," and the data updating process is thereafter terminated.

FIGS. 121 and 122 are flowcharts showing the forcible data updating processing performed by the forcible data updating processor in the credit settlement terminal 300, and by the merchant processor of the service providing system 102.

The forcible data updating process is performed when the data in the RAM of the credit settlement terminal 300 must be updated urgently, such as when the contents of the contract with the merchant are changed.

First, at step 9100 the credit settlement terminal 300 generates a data update command 5406, and at step 9101 examines the terminal status to determine whether the session has been established. When the session has been established, at step 9103 the generated data update request is transmitted to the merchant processor. When the session has not been established, at step 9102 the session establishment process is performed. After the session with the service providing system has been established, program control advances to step 9103.

After the data update command 5406 has been transmitted, at steps 9104 and 9113 the credit settlement terminal 300 waits for the receipt of a upload data 5407. At step 9104 the credit settlement terminal 300 determines whether the upload data has been received, and at step 9113 it determines whether the time has expired.

At step 9113, for the time-out determination, when the upload data is not received until the time-out period $T_{UDM}$ ($T_{UDM}>0$) has ended, the credit settlement terminal 300 determines the time has expired, and at step 9114 it performs a merchant process time-out error process. The forcible data updating process is thereafter terminated.

Upon receiving upload data, at step 9105 the merchant processor decrypts the received upload data using the private key of the service provider, and at step 9106 examines the validity of the merchant processor in order to verify the validity of the upload data.

When the examination of the validity of the merchant processor is successful, the merchant processor advances to step 9107. When the examination of the validity of the merchant processor fails, the merchant processor ascertains that the received message is not valid, and at step 9115 it performs the merchant processor session error process. The data updating process is thereafter terminated.

At step 9107, the merchant processor decompresses the terminal data 5531 of the upload data, and at step 9108 it performs data comparison to verify that the terminal data have not been illegally altered.

When the data comparison is successful, at step 9109 the capacity of the object data area of the credit settlement terminal 300 and the data generation time are employed to generate new terminal data. At step 9110 a difference between the decompressed terminal data and the new terminal data is calculated, and update data 5408 are generated. At step 9111 the generated update data 5408 are transmitted to the credit settlement terminal 300. At step 9112 the terminal data 24104 for the merchant information service are updated, and the forcible data updating process is thereafter terminated.

When the data comparison fails, it is assumed that the terminal data may have been illegally altered. At step 9116 the merchant processor generates a mandatory expiration command 5408, and at step 9117 it transmits it to the credit settlement terminal 300. At step 9118, the merchant status 24102 of the merchant information server is changed to "operation disabled," and at step 9119 the merchant process session error process is performed. The data updating process is thereafter terminated.

At step 9109, for generating new terminal data, the data to be stored in the RAM and on the hard disk are rearranged so that the temporary area is empty. Especially when there is no extra space in the object data area, the sale times for individual sales information items are compared, and a local address is assigned as the object data address of the sales information item that has the latest access time. When the version of the program of the credit settlement terminal 300 needs to be upgraded, the data in the fundamental program area are updated. It should be noted that the data in the merchant area are updated to the data in the merchant area that is included in the terminal data received from the credit settlement terminal 300.

The credit settlement terminal 300 receives a data update command 5406 and generates a forcible data update processor to begin the forcible data updating process.

At step 9000, the credit settlement terminal 300 decrypts the data update command using the private key of the merchant. At step 9001 the credit settlement terminal 300 examines the validity of the merchant to verify the validity of the data update command.

When the examination of the merchant's validity is successful, at step 9002 the credit settlement terminal 300 displays "data updating in progress" on the LCD, and at step 9003 compresses the data in the RAM and on the hard disk and prepares upload data 5407. Then, at step 9004 the credit settlement terminal 300 transmits the upload data to the merchant processor.

When the examination of the validity of the merchant fails, at step 9011 the credit settlement terminal 300 performs a merchant session error process. The data updating process is thereafter terminated.

After the credit settlement terminal 300 has transmitted the upload data, at steps 9005 and 9012, the terminal 300 waits for the reception of a message from the merchant processor. At step 9005 the credit settlement terminal 300 determines whether the message has been received, and at step 9012, determines whether the time has elapsed.

At step 9012, for the time-out decision, when the message is not received until the time-out period $T_{DU}$ ($T_{DU}>0$) has ended, the credit settlement terminal 300 determines the time has expired, and at step 9013 it performs the merchant time-out error process. The data updating process is thereafter terminated.

Upon receiving a message from the merchant processor, at step 9006 the credit settlement terminal 300 decrypts the received message using the private key of the merchant, and at step 9007, examines the validity of the merchant in order to verify the validity of the received message.

When the examination of the merchant's validity is successful, the credit settlement terminal 300 moves to step 9008. When the examination of the merchant's validity fails, at step 9014 the credit settlement terminal 300 performs a merchant session error process. The data updating process is thereafter terminated.

At step 9008 the credit settlement terminal 300 determines whether the received message is data-update data 5408 or a mandatory expiration command 5408'. When the received message is data-update data 5408, at step 9009 the terminal data 5239 of the update data are decompressed, and the data in the RAM or on the hard disk are updated. At step 9010 the display "data updating in progress" is canceled. The forcible data updating process is thereafter terminated.

When the received message is a mandatory expiration command 5408', at step 9015 the credit settlement terminal 300 displays "operation disabled" on the LCD, and at step 9016 clears the terminal enable bit of the EEPROM 1503 to inhibit the operation. At step 9017 the terminal status is changed to "operation disabled," and the data updating process is thereafter terminated.

FIG. 123 is a flowchart showing the data updating processing performed by the data backup processor in the personal credit terminal 100, and by the user processor of the service providing system 102. The process performed by the user processor is the same as that for the data updating process.

When the battery capacity of the personal credit terminal 100 is equal to or smaller than Q, the personal credit terminal generates a data backup processor to begin the backup process.

First, at step 9200 the personal credit terminal 100 displays "data update in progress" on the LCD, at step 9201 generates a data update request 5109, and at step 9202 examines the terminal status to determine whether the session has been established. When the session has been established, at step 9204 the generated data update request is transmitted to the user processor. When the session has not been established, at step 9203 the session establishment process is performed. After the session with the service providing system has been established, program control advances to step 9204.

After the data update request has been transmitted, at steps 9205 and 9216 the personal credit terminal 100 waits for the receipt of a data update response 5110. At step 9205 the personal credit terminal 100 determines whether the data update response has been received, and at step 9216 it determines whether the time has expired.

At step 9216, for the time-out determination, when the data update response is not received until the time-out period $T_{RURU}$ ($T_{RURU}$>0) has ended, the personal credit terminal 100 determines the time has expired, and at step 9217 it performs a user time-out error process.

The data backup process is thereafter terminated.

When the data update response is received, at step 9206 the personal credit terminal 100 decrypts the data update response using the private key of the user. At step 9207 the personal credit terminal 100 examines the validity of the user to verify the validity of the data update response.

When the examination of the user's validity is successful, at step 9208 the personal credit terminal 100 compresses the data in the RAM and prepares upload data 5111, and at step 9209 it transmits the upload data to the user processor.

When the examination of the validity of the user fails, at step 9218 the personal credit terminal 100 performs a user session error process. The data updating process is thereafter terminated.

After the personal credit terminal 100 has transmitted the upload data, at steps 9210 and 9219, the terminal 100 waits for the reception of a message from the user processor. At step 9210 the personal credit terminal 100 determines whether the message has been received, and at step 9219, determines whether the time has elapsed.

At step 9219, for the time-out decision, when the message is not received until the time-out period $T_{DU}$ ($T_{DU}$>0) has ended, the personal credit terminal 100 determines the time has expired, and at step 9220 it performs the user time-out error process. The data backup process is thereafter terminated.

Upon receiving a message from the user processor, at step 9211 the personal credit terminal 100 decrypts the received message using the private key of the user, and at step 9212, examines the validity of the user in order to verify the validity of the received message.

When the examination of the user's validity is successful, the personal credit terminal 100 moves to step 9213. When the examination of the user's validity fails, at step 9221 the personal credit terminal 100 performs a user session error process. The data updating process is thereafter terminated.

At step 9213 the personal credit terminal 100 determines whether the received message is data-update data 5112 or a mandatory expiration command 5112'. When the received message is data-update data 5112, at step 9214 the terminal data 5239 of the update data are decompressed, and the data in the RAM are updated. At step 9215 the message "DATA UPDATING" is displayed. In addition, at step 9225 the terminal status is changed to "write protect" to inhibit writing of new data to the RAM. The data backup process is thereafter terminated.

When the received message is a mandatory expiration command 5112', at step 9222 the personal credit terminal 100 displays "operation disabled" on the LCD, and at step 9223 clears the terminal enable bit of the EEPROM 1503 to inhibit the operation. At step 9224 the terminal status is changed to "operation disabled," and the data backup process is thereafter terminated.

The clearing processing will now be described.

FIGS. 124A, 124B, 125A and 125B are flowcharts for the clearing processing performed by the credit settlement terminal 300. To begin the settlement processing, the merchant depresses the credit transaction switch on the register, and the credit settlement terminal 300 generates a clearing processor.

First, after a credit transaction switch is pressed in step 20604, at step 9300 the credit settlement terminal 300 generates four types of payment offer responses 5701 that corresponds to the contents of a payment offer 5700 received from the personal credit terminal 100. The four payment offer responses are: a payment offer response indicating that the amount of payment designated by the user is lower than the amount of charge from the merchant; a payment offer response indicating that the user designates a credit card that the merchant can not handle; a payment offer response indicating that the user designates a payment option that the merchant can not handle; and a payment offer response indicating that the merchant can handle the payment offer from the user.

The payment message 5809 and the transaction number 5810 (FIG. 89B) differ for each of four payment offer responses. For the payment offer response indicating that the amount of payment designated by the user is lower than the amount of charge from the merchant, a message indicating the shortage of the amount of payment is set as the response message, and "0" is set as the transaction number. For the payment offer response indicating that the user designates the credit card that the merchant can not handle, a message indicating the credit card is not available is set as the response message, and "0" is set as the transaction number. For the payment offer response indicating that the user designates the payment option the merchant can not handle, the message indicating the payment option is not available is set as the response message, and "0" is set as the transaction number. For the payment offer response indicating that the merchant can handle the payment offer of the user, a greeting message is set as the response message, and a number other than "0" is set as the transaction number to uniquely represent the transaction with the user.

After generating the four payment offer responses, at step 9301 the credit settlement terminal 300 displays "waiting for payment operation" on the LCD, and at step 9302 waits for reception of the payment offer 5700 through infrared communication.

Upon receipt of the payment offer form the personal credit terminal 100, at steps 9303 to 9305 the credit settlement terminal 300 examines the contents of the received payment offer.

When the amount of payment in the payment offer is lower than the amount of charge, at step 9317, through infrared communication, the credit settlement terminal 300 transmits to the personal credit terminal 100 the payment offer response indicating that the user designates the amount of payment lower than the amount of charge. At step 9318 the credit settlement terminal 300 displays the shortage of the amount of payment on the LCD and returns to step 9302 to again wait for the receipt of a payment offer.

When the service code of the payment offer does not exist in the service code list of the credit settlement terminal 300, at step 9319, through infrared communication, the credit settlement terminal 300 transmits to the personal credit terminal 100 the payment offer response indicating that the user designates the credit card the merchant can not handle. At step 9320 the credit settlement terminal 300 displays on the LCD that the credit card is not available, and returns to step 9302 to wait for a payment offer.

When the payment option code of the payment offer does not exist in the service code list of the credit settlement terminal 300, at step 9321, through infrared communication, the credit settlement terminal 300 transmits to the personal credit terminal 100 the payment offer response indicating that the user designates the payment option the merchant can not handle. At step 9322 the credit settlement terminal 300 displays on the LCD that the payment option is not available, and returns to step 9302 to wait for a payment offer.

For the other cases, at step 9306, through infrared communication, the credit settlement terminal 300 transmits to the personal credit terminal to the payment offer response indicating the merchant can handle the payment offer of the user. At step 9307 "authorization in progress" is displayed in the LCD, at step 9308 an authorization request 5702 is generated from the payment offer and the payment offer response, and at step 9309, the terminal status is examined to determine whether the session has been established. If the session has been established, at step 9311 the generated authorization request is transmitted to the merchant processor. If the session is not established, at step 9310 the session establishment process is performed.

When the session with the service providing system 102 is established, program control moves to step 9311.

After the credit settlement terminal 300 has transmitted the authorization request, at steps 9312 and 9323, the terminal 300 waits for the reception of an authorization response 5704. At step 9312 the credit settlement terminal 300 determines whether the response 5704 has been received, and at step 9323, determines whether time has elapsed.

At step 9323 for the time-out decision, when the authorization response is not received until the time-out period $T_{AR}$ ($T_{AR}>0$) elapses, the credit settlement terminal 300 determines the time has expired, and at step 9324, performs the merchant time-out error process. The clearing process is thereafter terminated.

Upon receipt of the authorization response, at step 9313 the credit settlement terminal 300 decrypts it using the private key of the merchant, and at step 9314, examines the validity of the merchant in order to verify the validity of the authorization response.

When the examination of the merchant's validity is successful, the credit settlement terminal 300 moves to step 9315. When the examination of the merchant's validity fails, at step 9325 the credit settlement terminal 300 performs a merchant session error process. The clearing process is thereafter terminated.

At step 9315 the credit settlement terminal 300 determines whether the authorization is successful. When the authorization fails, at step 9326 the authorization results are displayed on the LCD, and the clearing process is thereafter terminated. When the authorization is successful, at step 9316 the authorization results and the contents of the user personal information are displayed on the LCD.

After displaying these data, at steps 9400 and 9413 the credit settlement terminal 300 waits for the settlement request operation 20616 by the merchant. At step 9400 the credit settlement terminal 300 determines whether the settlement request has been issued from the merchant, and at step 9413 determines whether the time has expired.

At step 9413 for time-out decision, when the settlement request is not issued from the merchant until the time-out period $T_{MAO}$ ($T_{MAO}>0$) elapses, the credit settlement terminal 300 ascertains that the time has expired, and at step 9414 performs the merchant time-out error process. The clearing process is thereafter terminated.

When the settlement request is issued from the merchant, at step 9401 the credit settlement terminal 300 displays "clearing in progress" on the LCD, and at step 9402 employs the payment offer and the payment offer response to generate a settlement request 5705. At step 9403 the settlement request 5705 is transmitted to the merchant processor.

After transmitting the settlement request 5705 to the merchant processor, at step 9404 and 9415 the credit settlement terminal 300 waits for the receipt of a clearing confirmation notification 5708 from the merchant processor. At step 9404 the credit settlement terminal 300 determines whether the clearing confirmation notification 5708 is received, and at step 9415 determines whether the time has expired.

At step 9415 for time-out decision, when the clearing confirmation notification 5708 is not received until the time-out period $T_{SPCC}$ ($T_{SPCC}>0$) elapses, the credit settlement terminal 300 ascertains that the time has expired, and at step 9416 performs the merchant time-out error process. The clearing process is thereafter terminated.

When the credit settlement terminal 300 receives the clearing confirmation notification 5708, at step 9405 the terminal 300 decrypts the notification 5708 using the private key of the merchant, and at step 9406 examines the validity of the merchant to verify the validity of the message.

When the examination of the validity of the merchant is successful, the credit settlement terminal 300 goes to step 9407. When the examination of the validity of the merchant fails, at step 9417 the credit settlement terminal 300 performs the merchant session error process, and thereafter the clearing process is terminated.

At step 9407, the credit settlement terminal 300 prepares a receipt 5709, and at step 9408 transmits it to the merchant processor. At step 9409 the decrypted clearing confirmation notification 5708 is stored in the temporary area of the RAM, at step 9410 the sales list and the sales list address are updated, and at step 9411 the message "clearing completed" is displayed on the LCD. At step 9412 the credit settlement terminal 300 determines from the empty capacity of the temporary area to determine whether the date updating process is required. If the empty capacity of the temporary area is equal to or more than the setup value AM (AM>0), the clearing process is terminated. If the empty capacity is smaller than the setup value AM, the data update processor is prepared to begin the data updating process.

FIGS. 126A and 126B and FIG. 127 are flowcharts showing the clearing process performed by the merchant processor.

The merchant processor initiates the clearing process upon receipt of an authorization request 5702 from the credit settlement terminal 300. First, at step 9500 the merchant processor decrypts the received authorization request 5702 using the private key of the service provider, and at step 9501 examines the validity of the merchant processor to verity the validity of the authorization request 5702.

When the examination of the validity of the merchant processor is successful, at step 9502 the merchant processor employs a service director process ID in the merchant process management information to determine whether the service director processor belongs to the process group. When the service director processor belongs to the process group (service director process ID≠0), at step 9515 the decrypted authorization request is transmitted to the service director processor. When the service director processor does not belong to the process group (service director process ID=0), at step 9503 the decrypted authorization request is transmitted to the service manager processor.

When the examination of the validity of the merchant processor fails, the merchant processor ascertains that the received message is not valid, and at step 9514 performs the merchant processor session error process. The clearing process is thereafter terminated.

When the merchant processor has transmitted the authorization request to the service director processor or the service manager processor, at step 9504 the merchant processor waits for receipt of an authorization request 5840 from the service director processor. Upon receipt of the authorization request 5840 from the service director processor, at step 9505 the merchant processor closes it to address to the merchant, and at step 9506 transmits the closed authorization response 5704 to the credit settlement terminal 300.

After transmitting the authorization response 5704 to the credit settlement terminal 300, at step 9507 the merchant processor waits for the receipt of the settlement request 5705 from the credit settlement terminal 300. Upon receipt of the settlement request 5705, at step 9508 the merchant processor decrypts it using the private key of the service provider, and at step 9509 examines the validity of the merchant processor to verity the validity of the settlement request 5705.

When the examination of the validity of the merchant processor is successful, at step 9510 the merchant processor transmits the decrypted settlement request 5705 to the service director processor. When the examination of the validity of the merchant processor fails, the merchant processor ascertains that the received message is not valid, and at step 9516 performs the merchant processor session error process. The clearing process is thereafter terminated.

When the merchant processor has transmitted the settlement request to the service director processor, at step 9511 the merchant processor waits for receipt of a clearing confirmation notification 5937 from the service director processor. Upon the clearing confirmation notification 5937, at step 9512 the merchant processor closes it to address to the merchant, and at step 9513 transmits a clearing confirmation notification to the credit settlement terminal 300.

When the merchant processor has transmitted the clearing confirmation notification 5708 to the credit settlement terminal 300, at step 9600 the merchant processor waits for the reception of a receipt 5709 from the credit settlement terminal 300. When the merchant processor receives the receipt 5709, at step 9601 the merchant processor decrypts it using the private key of the service provider, and at step 9602 examines the validity of the merchant processor to verity the validity of the receipt 5709.

When the examination of the validity of the merchant processor is successful, at step 9603 the merchant processor transmits the decrypted receipt 5709 to the service director processor. At step 9604 the sales list in the merchant information server and the sales list address are updated. The clearing process is thereafter terminated.

When the examination of the validity of the merchant processor fails, the merchant processor ascertains that the received message is not valid, and at step 9605 performs the merchant processor session error process. The clearing process is thereafter terminated.

FIGS. 128A, 128B and 129 are flowcharts for the clearing processing performed by the personal credit terminal 100. To begin the clearing process, the user performs the payment operation, and the personal credit terminal 100 generates a clearing processor.

First, after a payment operation is initiated in step 20606, at step 9700 the personal credit terminal 100 generates a payment offer 5700 based on the credit card, the amount of payment and the payment operation that the user designates during the payment operation. At step 9701, the generated payment offer is transmitted to the credit settlement terminal 300 via infrared communication.

After the personal credit terminal 100 has transmitted the payment offer to the credit settlement terminal 300, at steps 9702 and 9713, the terminal 100 waits for the reception of a payment offer response 5701. At step 9702 the personal credit terminal 100 determines whether the response 5701 has been received, and at step 9713, determines whether time has elapsed.

At step 9713 for the time-out decision, when the payment offer response is not received until the time-out period $T_{POR}$ ($T_{POR}>0$) elapses, the personal credit terminal 100 determines the time has expired, and at step 9714, displays the time-out error message for the payment offer response on the LCD. The clearing process is thereafter terminated.

When the personal credit terminal 100 receives the payment offer response, at step 9703 the terminal 100 examines the digital signature of the service provider that is applied to the telephone number of the service provider in the payment offer response. When the examination of the digital signature is successful, program control advances to step 9704. When the examination of the digital signature fails, it is assumed that the payment offer response is not valid, and at step 9715 the error message for the payment offer response is displayed on the LCD. The clearing process is thereafter terminated.

At step 9704 the personal credit terminal 100 employs the value of the transaction number in the payment offer response to determine whether the merchant can handle the contents of the payment offer transmitted to the credit settlement terminal 300. When the transaction number of the payment offer response is not zero, it is assumed that the contents of the payment offer can be handled by the merchant, and the personal credit terminal 100 thereafter goes to step 9705. When the transaction number of the payment offer response is zero, it is assumed that the contents of the payment offer can not be handled by the merchant. At step 9716, therefore, the personal credit terminal 100 displays the error message for the payment offer response on the LCD, and the clearing process is thereafter terminated.

Figure 44A:
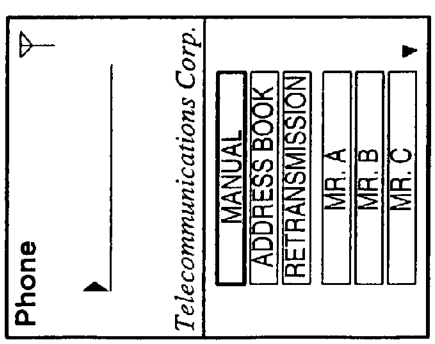
FIGS. 44A to 44I are specific diagrams showing screens to be displayed on the LCD of the credit settlement terminal during the settlement processing.
Figure 44B:
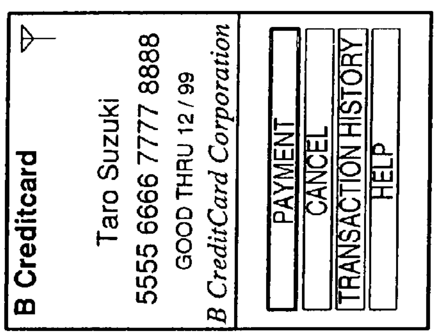
Figure 44C:
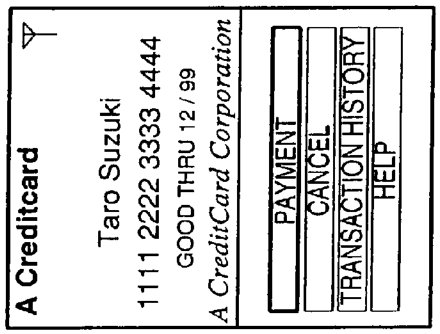
Figure 44D:
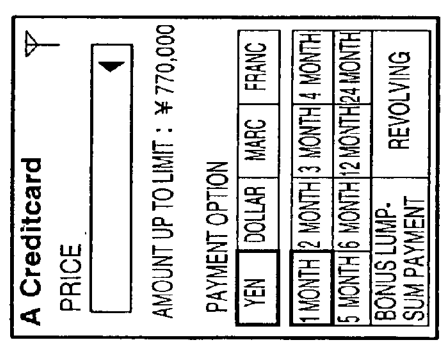
Figure 44E:
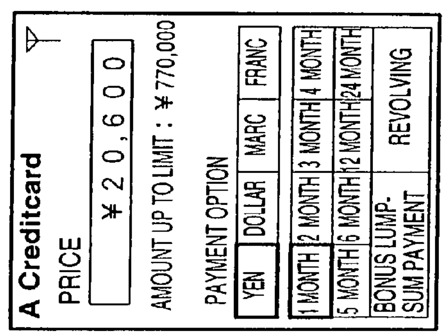
Figure 44F:
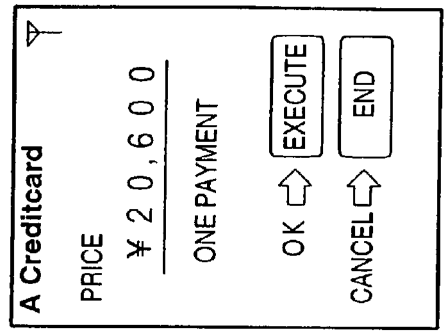
Figure 44G:
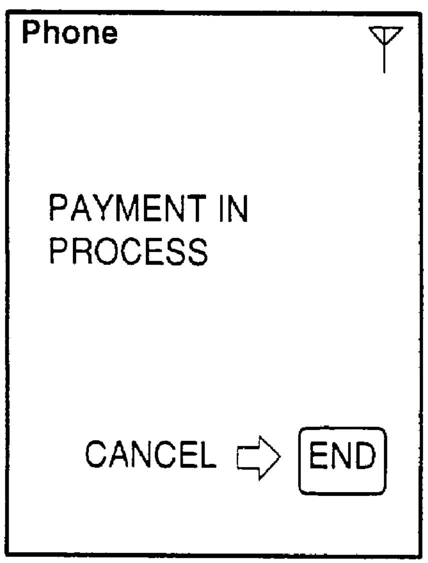
Figure 44H:
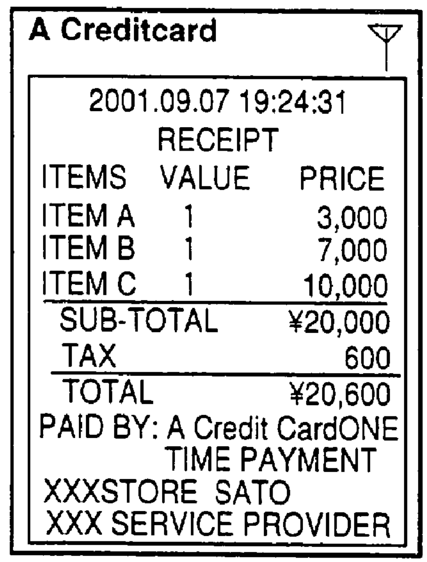
Figure 44I:
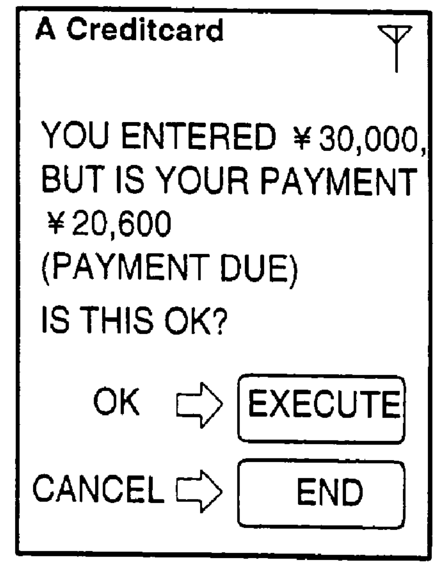

At step 9705 the personal credit terminal 100 compares the amount of payment in the payment offer with the amount of charge in the payment offer response. When the amount of payment is equal to the amount of charge, program control moves to step 9708. When the amount of payment is greater than the amount of charge, at step 9706 a screen for confirming the amount of payment is displayed on the LCD, as is shown in FIG. 44I, and at steps 9707 and 9717 the confirmation from the user is waited for. When the confirmation is performed by the user, the personal credit terminal 100 goes to step 9708. At step 9707 the personal credit terminal 100 determines whether the confirmation is performed by the user, and at step 9717 determines whether the time has expired.

At step 9717 for the time-out decision, when the confirmation is not performed until the time-out period $T_{UAO}$ ($T_{UAO}$>0) elapses, the personal credit terminal 100 determines the time has expired, and at step 9718 displays the time-out error message for the confirmation on the LCD. The clearing process is thereafter terminated.

At step 9708 the personal credit terminal 100 displays "payment process in progress" on the LCD, and at step 9709 generates a payment request 5703 from the payment offer and the payment offer response. At step 9710, the terminal status is examined to determine whether the session has been established. If the session has been established, at step 9712 the generated payment request is transmitted to the user processor. If the session is not established, at step 9711 the session establishment process is performed. When the session with the service providing system 102 is established, program control moves to step 9712.

In the session establishment process at step 9711, the personal credit terminal 100 dials the telephone number of the service provider in the payment offer response, and is connected to the service providing system 102 in the home service area of the merchant. That is, when a session with the service providing system 102 is already established during the clearing process, the terminal 100 performs the clearing process with the service providing system 102. When a session with the service providing system 102 is to be established, the clearing process is performed with a service providing system in the service area where the merchant currently stays.

When the personal credit terminal 100 has transmitted the payment request to the merchant processor, at steps 9800 and 9807 the terminal 100 waits for reception of a receipt 5710 from the personal credit terminal 100. At step 9800 the personal credit terminal 100 determines whether the receipt 5710 is received, and at step 9807 determines whether the time has expired.

At step 9807 for the time-out decision, when the receipt 5710 is not received until the time-out period $T_{SPR}$ ($T_{SPR}$>0), the personal credit terminal 100 determines the time has expired, and at step 9808 performs the user time-out error process. The clearing process is thereafter terminated.

When the personal credit terminal 100 receives the receipt 5710, at step 9801 the terminal 100 decrypts the receipt 5710 using the private key of the user, and at step 9802 examines the validity of the user to verify the validity of the receipt 5710.

When the examination of the validity of the user is successful, the personal credit terminal 100 goes to step 9803. When the examination of the validity of the user fails, at step 9809 the personal credit terminal 100 performs the user session error process. The clearing process is thereafter terminated.

At step 9803 the decrypted receipt 5710 is stored in the temporary area of the RAM, at step 9804 the use list and the use list address are updated, and at step 9805 the receipt is displayed on the LCD. At step 9806 the personal credit terminal 100 determines from the empty capacity of the temporary area to determine whether the date updating process is required. If the empty capacity of the temporary area is equal to or more than the setup value AU (AU>0), the clearing process is terminated. If the empty capacity is smaller than the setup value AU, the data update processor is prepared to begin the data updating process.

FIG. 130 is a flowchart showing the clearing process performed by the user processor.

The user processor initiates the clearing process upon receipt of a payment request 5703 from the personal credit terminal 100. First, at step 9900 the user processor decrypts the received payment request 5703 using the private key of the service provider, and at step 9901 examines the validity of the user processor to verity the validity of the payment request 5703.

When the examination of the validity of the user processor is successful, at step 9902 the user processor employs a service director process ID in the user process management information to determine whether the service director processor belongs to the process group. When the service director processor belongs to the process group (service director process ID≠0), at step 9909 the decrypted payment request is transmitted to the service director processor. When the service director processor does not belong to the process group (service director process ID=0), at step 9903 the decrypted payment request is transmitted to the service manager processor.

When the examination of the validity of the user processor fails, the user processor ascertains that the received message is not valid, and at step 9908 performs the user processor session error process. The clearing process is thereafter terminated.

When the user processor has transmitted the authorization request to the service director processor or the service manager processor, at step 9904 the user processor waits for receipt of a receipt 6016 from the service director processor. Upon receipt of the receipt 6016 from the service director processor, at step 9905 the user processor closes it to address to the user, and at step 9906 transmits the closed receipt 5710 to the personal credit terminal 100. In addition, at step 9907 the receipt the use list in the user information server and the use list address are updated. The clearing process is thus terminated.

FIG. 131A is a flowchart showing the clearing processing performed by the settlement system 103. The clearing process is initiated when a settlement request 5706 is received from the settlement processor in the service providing system 102.

First, at step 10000 the settlement system 103 decrypts the received settlement request 5706 using the private key of the settlement processor, and at step 10001 examines the validity of the settlement processor to verify the validity of the settlement request 5706.

When the examination of the validity of the settlement processor is successful, at step 10002, in accordance with the settlement request 5706 the settlement system 103 updates data in the subscriber information server, the member store information server and the transaction information server to perform the clearing process. At step 10003 the settlement system 103 generates a clearing confirmation notification 5707 and at step 10004 transmits the notification 5707 to the settlement processor. The clearing process is thereafter terminated.

When the examination of the validity of the settlement processor fails, it is assumed that the received message is not valid, and at step 10005 the personal credit terminal 100 performs a settlement processor session error process. The clearing process is terminated. In the settlement processor session error process, the settlement system 103 transmits a session error message to the management system of the settlement system and to the settlement processor of the service providing system, and disconnects the line from the settlement processor.

The examination of the validity of the settlement processor is a process for verifying the validity of a message that is received from the settlement processor of the service providing system 102. As is shown in FIG. 131B, four types of verifications are performed to examine the validity of the settlement processor.

First, at step 10006 the digital signature of the service provider is examined, and at step 10007 the service provider IDs are compared, at step 10008 the effective period for the received message is examined, and at step 10009 the time when the received message was issued is examined. At step 10009 for verifying the issued time, a difference between the time when the received information was issued and the current time is examined. When the difference is time $T_{TP}$ ($T_{TP}>0$) or longer, the received information is regarded as invalid. Thus, only when the digital signature of the service provider is verified, the service providers ID are matched, the period of the message is effective and the issued time is verified, it is ascertained that the examination of the validity of the settlement processor is successful, and for the other cases, it is ascertained that the examination fails.

FIG. 132A is a flowchart showing the clearing processing performed by the settlement processor. The settlement processor initiates the clearing process when a settlement request 5910 is received from the service director processor.

First, at step 10100 the settlement request 5910 is closed to address to the settlement processor, and at step 10101 the settlement request 5706 is transmitted to the settlement system 102.

After the settlement request 5706 is transmitted to the settlement system 102, at step 10102 the settlement processor waits for the reception of a clearing confirmation notification 5707 from the settlement system 102. Upon receipt of the clearing confirmation notification 5707, at step 10103 it is decrypted using the private key of the service provider, and at step 10104 the validity of the settlement processor is examined to verify the validity of the clearing confirmation notification 5707.

When the examination of the validity of the settlement processor is successful, at step 10105 the decrypted clearing confirmation notification 5707 is transmitted to the service director process, and at step 10106 the clearing list in the settlement processor information server and the clearing list address are updated. The clearing process is thereafter terminated.

When the examination of the validity of the settlement processor fails, it is assumed that the received message is not valid, and at step 10107 the settlement processor process session error process is performed. The clearing process is then terminated. In the settlement processor process session error process, the settlement processor is deleted by the service manager, and the line to the settlement system 103 is disconnected. At this time, the settlement processor transmits to the management system 407 a session error message that indicates an invalid message has been received.

The examination of the validity of the settlement processor is a process for verifying the validity of a message that is received from the settlement system 103. As is shown in FIG. 132B, three types of verifications are performed to examine the validity of the settlement processor. First, at step 10108 the digital signature of the settlement processor is examined, and at step 10109 the settlement processor IDs are compared, at step 10110 the time when the received message was issued is examined. At step 10110 for verifying the issued time, a difference between the time when the received information was issued and the current time is examined. When the difference is time $T_{TPP}$ ($T_{TPP}>0$) or longer, the received information is regarded as invalid. Thus, only when the digital signature of the settlement processor is verified, the service providers ID are matched and the issued time is verified, it is ascertained that the examination of the validity of the settlement processor is successful, and for the other cases, it is ascertained that the examination fails.

FIGS. 133A and 133B are flowcharts showing the clearing processing performed by the service director processor. The service director processor initiates the clearing process when an authorization request 5820 and a payment request 5827 are received from the service manager processor, when an authorization request 5820 is received from the merchant processor, or when a payment request 5827 is received from the user processor.

When the authorization request 5820 is received from the merchant processor, at step 10216 the service director processor waits for the reception of the payment request 5827 from the user processor. Upon receipt of the payment request 5827 from the user processor, program control goes to step 10200.

When the payment request 5827 is received from the user processor, at step 10217 the service director processor waits for the reception of the authorization request 5820 from the merchant processor. Upon receipt of the authorization request 5820 from the merchant processor, program control goes to step 10200.

When the authorization request 5820 and the payment request 5827 are received from the service manager processor, the service director processor goes to step 10200 where at the validity for the authorization request 6820 and the payment request 5827 is examined. At step 10200 for the examination for the validity for the authorization request 6820 and the payment request 5827, the service director processor compares the data for the payment offer and payment offer response that are included in the authorization request, with the data for the payment offer and the payment offer response that are included in the payment request, and examines the effective periods for the payment offers and the payment offer responses When the data are matched and the message periods are found effective, the service director processor ascertains that the validity for the authorization request 6820 and the payment request 5827 is verified. For the other cases, the service director processor ascertains that the examination of validity fails.

When the examination of the validity for the authorization request 6820 and the payment request 5827 fails, at step 10212 the service director processor performs the service director session error process, and terminates the clearing process. Through the service director process session error process, the service director processor, and the user processor and the merchant processor, which belong to the same group as the service director processor, are deleted by the service manager processor. At this time, the service director processor transmits to the management system 407 a session error message indicating that the invalid message has been received.

When the examination of the validity for the authorization request 6820 and the payment request 5827 is successful, at step 10201 the service director processor refers to the customer table for the merchant, and specifies the customer number that corresponds to the user ID of the payment request. At step 10202 the service director processor accesses information in the user information server that corresponds to the user and generates an authorization response 5840, and at step 10203 transmits it to the merchant processor. At step 10204 the provided authorization service history is added to the provided service list 4303 to update the list 4303.

At step 10202 for the generation of the authorization response 5840, if the credit condition of the user is unsatisfactory, the service director processor does not set the user personal data 5824. When there is no previous transaction between the user and the merchant, the customer number that corresponds to the user ID can not be specified, and therefore, the customer number 5836 is not set.

When, at step 10204, the service director processor has updated the provided service list, at steps 10205 and 10213 it waits for the reception of a settlement request 5850. At step 10205 the service director processor determines whether the settlement request 5850 is received, and at step 10213 determines whether the time has expired.

At step 10213 for the time-out decision, when the settlement request 5850 is not received until the time-out period $T_{CR}$ ($T_{CR}$>0) elapses, the service director processor ascertains that the time has expired, and at step 10214 performs the service director process time-out error process. The clearing process is thereafter terminated. Through the service director time-out error process, the service manager processor deletes the service director processor, and the user processor and the merchant processor that belong to the same process group as the service director processor. At this time, the service director processor transmits to the management system 407 a time-out error message indicating that the time has expired.

When the settlement request 5850 is received from the merchant processor, at step 10206 the service director processor examines the validity for the settlement request 5050. At step 10206 for the examination for the validity for the settlement request 5740, the service director processor compares the data for the payment offer and payment offer response that are included in the settlement request, with the data for the payment offer and the payment offer response that are included in the payment request; compares the authorization number of the settlement request 5850 with the authorization number of the authorization response; and examines the effective period for the settlement request. When the data are matched, the authorization numbers are matched and the message period is found effective, the service director processor ascertains that the validity for the settlement request 5850 is verified. For the other cases, the service director processor ascertains that the examination of validity fails.

When the examination of the validity for the settlement request 5050 fails, at step 10215 the service director processor performs the service director session error process, and terminates the clearing process.

When the examination of the validity for the settlement request 5050 is successful, at step 10207 the service director processor refers to the settlement processor table 4304 to select a settlement processor to which the clearing process is requested. At step 10208 a member process request is transmitted to the service manage process to request that a settlement processor that corresponds to the selected settlement processor become a member of the same process group. At step 10209 the service director processor waits until the requested settlement processor belongs to the process group.

When the requested settlement processor joins the process group, at step 10210 the service director processor accesses information in the user information server that corresponds to the user, information in the merchant information server and information in the settlement processor information server that corresponds to the settlement processor, and generates a settlement request 5910. At step 10211, the settlement request 5910 is transmitted to the settlement processor.

As shown in FIG. 134, when the service director processor has transmitted the settlement request 5910, at steps 10300 and 10311 it waits for the reception of a clearing confirmation notification 5927 from the settlement processor. At step 10300 the service director processor determines whether the clearing confirmation notification 5927 is received, and at step 10311 determines whether that time has expired.

At step 10311 for the time-out decision, when the clearing confirmation notification 5927 is not received until the time-out period $T_{TPCC}$ ($T_{TPCC}$>0) elapses, the service director processor ascertains that the time has expired, and at step 10312 performs the service director process time-out error process. The clearing process is thereafter terminated.

When the clearing confirmation notification 5927 is received from the settlement processor, at step 10301 the service director processor determines whether there is a customer number that corresponds to the user. When such a customer number exists, program control moves to step 10303. When a corresponding customer number does not exist, at step 10302 a customer number that uniquely represents the user is prepared for the merchant, and is registered in the merchant customer table. Program control then goes to step 10303.

At step 10303 the service director processor employs the clearing confirmation notification 5927 and the settlement request 5850 to generate a clearing confirmation notification 5937 for the merchant. At step 10304 the service director processor transmits the clearing confirmation notification 5937 to the merchant processor.

When the service director processor has transmitted the clearing confirmation notification 5937, at steps 10305 and 10313 it waits for the reception of a receipt 6008 from the merchant processor. At step 10305 the service director processor determines whether the receipt 6008 is received, and at step 10313 determines whether that time has expired.

At step 10313 for the time-out decision, when the receipt 6008 is not received until the time-out period $T_{MR}$ ($T_{MR}$>0) elapses, the service director processor ascertains that the time has expired, and at step 10314 performs the service director process time-out error process. The clearing process is thereafter terminated.

When the receipt 6008 is received from the merchant processor, at step 10306 the service director processor employs the receipt 6008 and the clearing confirmation notification 5927 to generate a receipt for a user. At step 10307 the receipt 6016 is transmitted to the user and at step 10308 the provided service history for the credit accounting is added to the provided service list 4303 to update the list 4303.

When the service director processor has updated the provided service list 4303, at step 10309 the service director processor waits until the user processor completes the clearing process. When the user processor has completed the clearing process, at step 10310 the service director processor transmits to the service manager processor a request for deleting the service director processor. The clearing process is then terminated. Through the transmission of the deletion request, the service director processor is deleted by the service manager processor.

FIGS. 135A and 135B are flowcharts for the cancellation processing performed by the credit settlement terminal 300. To begin the cancellation process, the merchant performs the cancellation operation 901 and the credit settlement terminal 300 generates a cancellation processor.

First, at step 10400 the credit settlement terminal 300 displays message "authorization in progress" on the LCD, and at step 10401 generates a cancellation request 6100 from a clearing confirmation notification 5937 for transaction that is to be canceled. At step 10402 the terminal status is examined to determine whether the session has been established. If the session has been established, at step 10404 the generated cancellation request is transmitted to the merchant processor. If the session is not established, at step 10403 the session establishment process is performed. When the session with the service providing system 102 is established, program control moves to step 10404.

After the credit settlement terminal 300 has transmitted the cancellation request, at steps 10405 and 10412, the terminal 300 waits for the reception of a cancellation confirmation notification 6104 from the merchant processor. At step 10405 the credit settlement terminal 300 determines whether the notification 6104 has been received, and at step 10412, determines whether time has elapsed.

At step 10412 for the time-out decision, when the cancellation confirmation notification 6104 is not received until the time-out period $T_{SPCC}$ ($T_{SPCC}$>0) elapses, the credit settlement terminal 300 determines the time has expired, and at step 10413, performs the merchant time-out error process. The cancellation process is thereafter terminated.

Upon receipt of the cancellation confirmation notification 6104, at step 10406 the credit settlement terminal 300 decrypts it using the private key of the merchant, and at step 10407 examines the validity of the merchant in order to verify the validity of the received message.

When the examination of the merchant's validity is successful, the credit settlement terminal 300 moves to step 10408. When the examination of the merchant's validity fails, at step 10414 the credit settlement terminal 300 performs a merchant session error process. The cancellation process is thereafter terminated.

At step 10408 the decrypted cancellation confirmation notification 6104 is stored in the temporary area of the RAM, at step 10409 the sales list and the sales list address are updated, and at step 10410 the message "cancellation completed" is displayed on the LCD. At step 10411 the credit settlement terminal 300 determines from the empty capacity of the temporary area to determine whether the date updating process is required. If the empty capacity of the temporary area is equal to or more than the setup value AM (AM>0), the cancellation process is terminated. If the empty capacity is smaller than the setup value AM, the data update processor is prepared to begin the data updating process.

FIG. 136 is a flowchart showing the cancellation process performed by the merchant processor.

The merchant processor initiates the cancellation process upon receipt of a cancellation request 6100 from the credit settlement terminal 300. First, at step 10500 the merchant processor decrypts the received cancellation request 6100 using the private key of the service provider, and at step 10501 examines the validity of the merchant processor to verity the validity of the cancellation request 6100.

When the examination of the validity of the merchant processor is successful, at step 10502 the merchant processor employs a service director process ID in the merchant process management information to determine whether the service director processor belongs to the process group. When the service director processor belongs to the process group (service director process ID≠0), at step 10509 the decrypted cancellation request is transmitted to the service director processor. When the service director processor does not belong to the process group (service director process ID=0), at step 10503 the decrypted cancellation request is transmitted to the service manager processor.

When the examination of the validity of the merchant processor fails, the merchant processor ascertains that the received message is not valid, and at step 10508 performs the merchant processor session error process. The cancellation process is thereafter terminated.

When the merchant processor has transmitted the cancellation request 6205 to the service director processor or the service manager processor, at step 10504 the merchant processor waits for receipt of a cancellation confirmation notification 6241 from the service director processor.

Upon receipt of the cancellation confirmation notification 6241 from the service director processor, at step 10505 the merchant processor closes it to address to the merchant, and at step 10506 transmits the closed cancellation confirmation notification 6104 to the credit settlement terminal 300. At step 10507, the sales list in the merchant information server and sales list address are updated. The cancellation process is thereafter terminated.

FIGS. 137A and 137B are flowcharts for the cancellation processing performed by the personal credit terminal 100. To begin the cancellation process, the user performs the cancellation operation 904, and the personal credit terminal 100 generates a cancellation processor.

First, at step 10600 the personal credit terminal 100 displays message "cancellation in progress" on the LCD, and at step 10601 generates a cancellation request 6101 from a receipt 6016 for transaction that is to be canceled. At step 10602 the terminal status is examined to determine whether the session has been established. If the session has been established, at step 10604 the generated cancellation request 6101 is transmitted to the user processor. If the session is not established, at step 10603 the session establishment process is performed. When the session with the service providing system 102 is established, program control moves to step 10604.

After the personal credit terminal 100 has transmitted the cancellation request, at steps 10605 and 10612, the terminal 100 waits for the reception of a cancellation receipt 6105 from the user processor. At step 10605 the personal credit terminal 100 determines whether the receipt 6105 has been received, and at step 10612, determines whether time has elapsed.

At step 10612 for the time-out decision, when the cancellation receipt 6105 is not received until the time-out period $T_{SPCR}$ ($T_{SPCR}$>0) elapses, the personal credit terminal 100 determines the time has expired, and at step 10613, performs the user time-out error process. The cancellation process is thereafter terminated.

Upon receipt of the cancellation receipt 6105, at step 10606 the personal credit terminal 100 decrypts it using the private key of the user, and at step 10607 examines the validity of the user in order to verify the validity of the received message.

When the examination of the user's validity is successful, the personal credit terminal 100 moves to step 10608. When the examination of the user's validity fails, at step 10614 the personal credit terminal 100 performs a user session error process. The cancellation process is thereafter terminated.

At step 10608 the decrypted cancellation receipt 6105 is stored in the temporary area of the RAM, at step 10609 the use list and the use list address are updated, and at step 10610 the cancellation receipt is displayed on the LCD. At step 10611 the personal credit terminal 100 determines from the empty capacity of the temporary area to determine whether the date updating process is required. If the empty capacity of the temporary area is equal to or more than the setup value AU (AU>0), the cancellation process is terminated. If the empty capacity is smaller than the setup value AU, the data update processor is prepared to begin the data updating process.

FIG. 138 is a flowchart showing the cancellation process performed by the user processor.

The user processor initiates the cancellation process upon receipt of a cancellation request 6101 from the personal credit terminal 100. First, at step 10700 the user processor decrypts the received cancellation request 6101 using the private key of the service provider, and at step 10701 examines the validity of the user processor to verify the validity of the cancellation request 6101.

When the examination of the validity of the user processor is successful, at step 10702 the user processor employs a service director process ID in the user process management information to determine whether the service director processor belongs to the process group. When the service director processor belongs to the process group (service director process ID=0), at step 10709 the decrypted cancellation request 6101 is transmitted to the service director processor. When the service director processor does not belong to the process group (service director process ID=0), at step 10703 the decrypted cancellation request 6101 is transmitted to the service manager processor.

When the examination of the validity of the user processor fails, the user processor ascertains that the received message is not valid, and at step 10708 performs the user processor session error process. The cancellation process is thereafter terminated.

When the user processor has transmitted the cancellation request 6213 to the service director processor or the service manager processor, at step 10704 the user processor waits for receipt of a cancellation receipt 6250 from the service director processor.

Upon receipt of the cancellation receipt 6250 from the service director processor, at step 10705 the user processor closes it to address to the user, and at step 10706 transmits the closed cancellation receipt 6105 to the personal credit terminal 100. At step 10707, the use list in the user information server and the use list address are updated. The cancellation process is thereafter terminated.

FIG. 139 is a flowchart showing the cancellation processing performed by the settlement system 103. The cancellation process is initiated when a cancellation request 6102 is received from the settlement processor in the service providing system 102.

First, at step 10800 the settlement system 103 decrypts the received cancellation request 6102 using the private key of the settlement processor, and at step 10801 examines the validity of the settlement processor to verify the validity of the cancellation request 6102.

When the examination of the validity of the settlement processor is successful, at step 10802, in accordance with the cancellation request 6102 the settlement system 103 updates data in the subscriber information server, the member store information server and the transaction information server to perform the cancellation process for the credit transaction. At step 10803 the settlement system 103 generates a cancellation confirmation notification 6103 and at step 10804 transmits the notification 6103 to the settlement processor. The cancellation process is thereafter terminated.

When the examination of the validity of the settlement processor fails, it is assumed that the received message is not valid, and at step 10805 the a settlement processor session error process is performed. The cancellation process is thereafter terminated.

FIG. 140 is a flowchart showing the cancellation processing performed by the settlement processor. The settlement processor initiates the cancellation process when a cancellation request 6221 is received from the service director processor.

First, at step 10900 the cancellation request 6221 is closed to address to the settlement processor, and at step 10901 the cancellation request 6102 is transmitted to the settlement system 102.

After the cancellation request 6102 is transmitted to the settlement system 102, at step 10902 the settlement processor waits for the reception of a cancellation confirmation notification 6103 from the settlement system 102. Upon receipt of the cancellation confirmation notification 6103, at step 10903 it is decrypted using the private key of the service provider, and at step 10904 the validity of the settlement processor is examined to verify the validity of the cancellation confirmation notification 6103.

When the examination of the validity of the settlement processor is successful, at step 10905 the decrypted cancellation confirmation notification 6103 is transmitted to the service director process, and at step 10906 the clearing list in the settlement processor information server and the clearing list address are updated. The cancellation process is thereafter terminated.

When the examination of the validity of the settlement processor fails, it is assumed that the received message is not valid, and at step 10907 the settlement processor process session error process is performed. The cancellation process is then terminated.

FIGS. 141A and 141B are flowcharts showing the cancellation processing performed by the service director processor.

The service director processor initiates the cancellation process when a cancellation requests 6205 and 6213 are received from the service manager processor, when a cancellation request 6205 is received from the merchant processor, or when a cancellation request 6213 is received from the user processor.

When the cancellation request 6205 is received from the merchant processor, at step 11016 the service director processor waits for the reception of the cancellation request 6213 from the user processor. Upon receipt of the cancellation request 6213 from the user processor, program control goes to step 11000.

When the cancellation request 6213 is received from the user processor, at step 11017 the service director processor waits for the reception of the cancellation request 6205 from the merchant processor. Upon receipt of the cancellation request 6205 from the merchant processor, program control goes to step 11000.

When the cancellation requests 6205 and 6213 are received from the service manager processor, the service director processor goes to step 11000 where at the validity for the cancellation requests 6205 and 6213 is examined. At step 11000 for the examination for the validity for the cancellation requests 6205 and 6213, the service director processor compares the clearing confirmation notification 5937 for the cancellation request 6205 with the data in the merchant information server; compares the receipt 6016 for the cancellation 6205 with the data in the user information server; compares the clearing number of the clearing confirmation notification 5937 for the cancellation request 6205 with the clearing number of the receipt 6016 for the cancellation request 6213; and examines the effective periods for the cancellation requests 6205 and 6213. When the data in the clearing confirmation notification 5937 and the receipt 6016 are matched, the clearing numbers are matched and the message periods are found effective, the service director processor ascertains that the validity for the cancellation requests 6205 and 6213. For the other cases, the service director processor ascertains that the examination of validity fails.

When the examination of the validity for the cancellation request and a payment request fails, at step 11013 the service director processor performs the service director session error process, and terminates the cancellation process.

When the examination of the validity for the cancellation request and the payment request is successful, at step 11001 the service director processor transmits a member process request to the service manage process to request, as a member of the same process group, a settlement processor that corresponds to the settlement processor that handled the credit transaction to be canceled. At step 11002 the service director processor waits until the requested settlement processor belongs to the process group.

When the requested settlement processor joins the process group, at step 11003 the service director processor accesses information in the settlement processor information server that corresponds to the settlement processor, and generates a settlement request 6221. At step 11004, the cancellation request 6221 is transmitted to the settlement processor.

When the service director processor has transmitted the cancellation request 6221, at steps 11005 and 11014 it waits for the reception of a cancellation confirmation notification 6232 from the settlement processor. At step 11005 the service director processor determines whether the cancellation confirmation notification 6232 is received, and at step 11014 determines whether that time has expired.

At step 11014 for the time-out decision, when the cancellation confirmation notification 6232 is not received until the time-out period $T_{TPCC}$ ($T_{TPCC}$>0) elapses, the service director processor ascertains that the time has expired, and at step 11015 performs the service director process time-out error process. The cancellation process is thereafter terminated.

When the cancellation confirmation notification 6232 is received from the settlement processor, at step 11006 the service director processor employs the cancellation confirmation notification 6232 and the cancellation request 6205 to generate a cancellation confirmation notification 6241 for the merchant. At step 11007 the service director processor employs the cancellation request 6213 and the cancellation confirmation notification 6232 to generate a cancellation receipt 6250 for the user. At step 11008, "cancel confirmation" is transmitted to the merchant processor. At step 11009 the service director processor transmits the generated cancellation receipt 6250 to the merchant processor. At step 11010 the provided service history for the credit accounting is added to the provided service list 4303 to update the list 4303.

When the service director processor has updated the provided service list 4303, at step 11011 the service director processor waits until the merchant processor and the user processor complete the cancellation process. When the merchant processor and the user processor have completed the cancellation process, at step 11012 the service director processor transmits to the service manager processor a request for deleting the service director processor. The cancellation process is then terminated. Through the transmission of the deletion request at step 11012, the service director processor is deleted by the service manager processor.

The customer service call process will now be explained. FIGS. 142A and 142B are flowcharts for the customer service call processing performed by the credit settlement terminal 300. To begin the customer service call process, the merchant performs the customer service call operation and the credit settlement terminal 300 generates a customer service call processor.

First, after a customer service call operation is initiated as shown in step 21200, at step 11100 the credit settlement terminal 300 displays message "connection in progress" on the LCD, and at step 11101 generates a customer service call request 6300 for transaction that is to be canceled. At step 11102 the terminal status is examined to determine whether the session has been established. If the session has been established, at step 11104 the generated customer service call request is transmitted to the merchant processor. If the session is not established, at step 11103 the session establishment process is performed. When the session with the service providing system 102 is established, program control moves to step 11104.

After the credit settlement terminal 300 has transmitted the customer service call request, at steps 11105 and 11113, the terminal 300 waits for the reception of a customer service call response 6302 from the merchant processor. At step 11105 the credit settlement terminal 300 determines whether the customer service call response 6302 has been received, and at step 11113, determines whether time has elapsed.

At step 11113 for the time-out decision, when the customer service call response 6302 is not received until the time-out period $T_{CSCR}$ ($T_{CSCR}$>0) elapses, the credit settlement terminal 300 determines the time has expired, and at step 11114, performs the merchant time-out error process. The customer service call process is thereafter terminated.

Upon receipt of the customer service call response 6302, at step 11106 the credit settlement terminal 300 decrypts it using the private key of the merchant, and at step 11107 examines the validity of the merchant in order to verify the validity of the received message.

When the examination of the merchant's validity is successful, the credit settlement terminal 300 moves to step 11108. When the examination of the merchant's validity fails, at step 11115 the credit settlement terminal 300 performs a merchant session error process.

The customer service call process is thereafter terminated.

At step 11108, the credit settlement terminal 300 determines whether message for the customer service call response permits or inhibits the speech. When the speech is enabled, at step 11109 the credit settlement terminal 300 displays "calling in progress" on the LCD, and at step 11110 waits for the reception of a calling response 6304 from the merchant processor. When the speech is disabled, at step 11116 the credit settlement terminal 300 displays on the LCD an error message indicating that the access to user is not successful. The customer service call process is thereafter terminated.

When the calling response 6304 is received from the merchant processor, at step 11111 the credit settlement terminal 300 decrypts the calling response 6304 using the private key of the merchant. At step 11112 "speech in progress" is displayed on the LCD, and program control is shifted to the speech state. At this time, when the audio data encryption key 6439 is included in the calling response 6304, the credit settlement terminal 300 sets the audio data encryption key 6439 to the audio data encryption key register (CRYPT) 22611, and encrypts the audio data for speech communication.

FIGS. 143A and 143B are flowcharts showing the customer service call process performed by the merchant processor.

The merchant processor initiates the customer service call process upon receipt of a customer service call 6300 from the credit settlement terminal 300. First, at step 11200 the merchant processor decrypts the received customer service call request 6300 using the private key of the service provider, and at step 11201 examines the validity of the merchant processor to verity the validity of the customer service call request 6300.

When the examination of the validity of the merchant processor is successful, at step 11202 the merchant processor employs a service director process ID in the merchant process management information to determine whether the service director processor belongs to the process group. When the service director processor belongs to the process group (service director process ID≠0), at step 11212 the decrypted customer service call request is transmitted to the service director processor. When the service director processor does not belong to the process group (service director process ID=0), at step 11203 the decrypted customer service call request 6300 is transmitted to the service manager processor.

When the examination of the validity of the merchant processor fails, the merchant processor ascertains that the received message is not valid, and at step 11211 performs the merchant processor session error process. The customer service call process is thereafter terminated.

When the merchant processor has transmitted the customer service call request 6406 to the service director processor or the service manager processor, at step 11204 the merchant processor waits for receipt of a customer service call response 6426 from the service director processor.

Upon receipt of the customer service call response 6426 from the service director processor, at step 11205 the merchant processor closes it to address to the merchant, and at step 11206 transmits the closed customer service call response 6302 to the credit settlement terminal 300.

At step 11207, the credit settlement terminal 300 determines whether message for the customer service call response permits or inhibits the speech. When the speech is enabled, at step 11208 the merchant processor waits for the reception of a calling response 6440 from the service director processor. When the speech is disabled, the customer service call process is terminated.

When the calling response 6440 is received from the service director processor, at step 11209 the merchant processor closes the calling response 6440 to address to the merchant, and at step 11210 transmits the calling response 6304 to the credit settlement terminal 300. Then, program control is shifted to the speech communication state where the digital audio data communication is performed.

FIG. 144 is a flowchart showing the customer service call process performed by the personal credit terminal 100. The customer service call process is begun when the personal credit terminal 100 receives a customer service call 6301 from the service providing system 102 and generates a customer service call processor.

First, at step 11300 the personal credit terminal 100 encrypts the received customer service call 6301 using the private key of the user, and at step 11301 examines the validity of the user to verity the customer service call 6301.

When the examination of the validity for the user is successful, at step 11302 the personal credit terminal 100 outputs an arrival tone through the loudspeaker and displays the reception of the customer service call on the LCD, and at step 11303 waits for the performance of the speech operation by the user.

When the examination of the validity for the user fails, at step 11307, a user session error process is executed. When the user is valid, at step 11304 the personal credit terminal 100 generates an arrival response 6303, and at step 11305 transmits it to the user processor. Further, at step 11306 the message "speech in progress" is displayed on the LCD, and program control is thereafter shifted to the speech communication state.

If step 11303 determines that a user has performed a speech operation, for speech communication using encrypted audio data, at step 11304 the personal credit terminal 100 generates an audio data encryption key 6432 and sets it to the arrival response 6303. In addition, the audio data encryption key 6432 is set to the audio data encryption register (CRYPT) 21613 to encrypt and decrypt the audio data.

FIG. 145 is a flowchart showing the customer service call process performed by the user processor.

The customer service call process is initiated when the user processor receives a customer service call 6417 from the service director processor. First, at step 11400 the user processor closes the received customer service call 6417 to address to the user, and at step 11401 examines the user status to determine whether the session is established. When the session is established, at step 11403 a customer service call 6301 is transmitted to the personal credit terminal 100. When the session is not established, at step 11402 the session establishment process is performed. After the session with the personal credit terminal 100 is established, program control moves to step 11403.

When the user processor has transmitted the customer service all 6301, at step 11404 the terminal 100 waits for the reception of an arrival response from the personal credit terminal 100. Upon receipt of the arrival response 6303, at step 11405 the personal credit terminal 100 decrypts the arrival response 6303 using the private key of the service provider, and at step 11406 transmits the decrypted response to the service director processor. Program control is then shifted to the speech communication state for the digital audio data communication.

FIGS. 146A and 146B are flowcharts showing the customer service call process performed by the service director processor.

The customer service call process is initiated when the service director processor receives a customer service call request 6406 from the service manger processor or from the merchant processor.

First, at step 11500 the service director processor refers to the customer table for the merchant, and specifies the user ID that corresponds to the customer number 6401 of the customer service call request. At step 11501 the service director processor transmits a member process request to the service manager processor, and requests a user processor, as a member processor in the same process group, that corresponds to a user who makes a customer service call. At steps 11502 and 11512 the service director processor waits until the requested user processor joins the member processor. At step 11502 the service director processor determines whether the requested user processor is a member process, and at step 11512 determines whether the time has expired.

At step 11512 for the time-out decision, when the requested user processor does not join the same group process until the time-out period $T_{UPMP}$ ($T_{UPMP}$>0) elapses, the service director processor determines that the time has expired. At step 11513 the service director processor employs the message response 6422 to generate a customer service call response 6426 indicating that the speech is disabled, and at step 11514 transmits the response 6426 to the merchant processor. At step 11515 the service director processor waits until the merchant processor terminates the customer service call process. At step 11516 the service director processor transmits to the service manager processor a request for deleting the service director processor, and the customer service call process is thereafter terminated. Through the transmission of the deletion request at step 11516, the service director processor is deleted by the service manager processor.

When the requested user processor has become the member processor, at step 11503 the service director processor refers to the access control information 24005 of the user to determine whether the user can be accessed.

When, at step 11503, the user can be accessed, at step 11504 the customer service call 6417 is generated, and at step 11505 it is transmitted to the user processor. At step 11506 the response message 6422 is employed to generate a customer service call response 6426 indicating that the speech is enabled, and at step 11507 the response 6426 is transmitted to the merchant processor.

When, at step 11503, the user can not be accessed, program control goes to step 11513, and the service director processor performs the process at steps 11513 to 11516.

After transmitting the customer service call 6426, at steps 11508 and 11517 the service director processor waits for the reception of an arrival response 6433. At step 11508 the service director determines whether the arrival response 6433 is received, and at step 11517, determines whether time has elapsed.

At step 11515 for the time-out decision, when the arrival response 6433 is not received until the time-out period $T_{ARU}$ ($T_{ARU}$>0) elapses, the service director processor determines the time has expired, and at step 11518, performs the service director process time-out error process. The customer service call process is thereafter terminated.

When the arrival response 6433 is received from the user processor, at step 11509 the service director processor employs the arrival response 6433 to generate a calling response 6440, and at step 11510 transmits it to the merchant processor. Further, at step 11511 the provided service history for the customer service call is added to the provided service list 4303 to update the list 4303, and program control is then shifted to the speech state for the digital audio data communication.

The inquiry call process will now be explained.

FIGS. 147A and 147B are flowcharts for the inquiry call processing performed by the personal credit terminal 100. To begin the inquiry call process, the user performs the inquiry call operation and the personal credit terminal 100 generates an inquiry call processor.

First, after an inquiry call operation is initiated as shown in step 21213, at step 11600 the personal credit terminal 100 displays message "connection in progress" on the LCD, and at step 11601 generates an inquiry call request 6306 for transaction that is to be canceled.

At step 11602 the terminal status is examined to determine whether the session has been established. If the session has been established, at step 11604 the generated inquiry call request is transmitted to the merchant processor. If the session is not established, at step 11603 the session establishment process is performed. When the session with the service providing system 102 is established, program control moves to step 11604.

After the personal credit terminal 100 has transmitted the inquiry call request, at steps 11605 and 11613, the terminal 100 waits for the reception of an inquiry call response 6308 from the merchant processor. At step 11105 the personal credit terminal 100 determines whether the inquiry call response 6308 has been received, and at step 11613, determines whether time has elapsed.

At step 11613 for the time-out decision, when the inquiry call response 6308 is not received until the time-out period $T_{ICR}$ ($T_{ICR}$>0) elapses, the personal credit terminal 100 determines the time has expired, and at step 11614, performs the user time-out error process. The inquiry call process is thereafter terminated.

Upon receipt of the inquiry call response 6308, at step 11606 the personal credit terminal 100 decrypts it using the private key of the user, and at step 11607 examines the validity of the merchant in order to verify the validity of the received message.

When the examination of the user's validity is successful, the personal credit terminal 100 moves to step 11608. When the examination of the user's validity fails, at step 11615 the personal credit terminal 100 performs a user session error process. The inquiry call process is thereafter terminated.

At step 11608, the personal credit terminal 100 determines whether message for the inquiry call response permits or inhibits the speech. When the speech is enabled, at step 11609 the personal credit terminal 100 displays "calling in progress" on the LCD, and at step 11610 waits for the reception of a calling response 6310 from the user processor. When the speech is disabled, at step 11616 the personal credit terminal 100 displays on the LCD an error message indicating that the access to merchant is not successful. The inquiry call process is thereafter terminated.

When the calling response 6310 is received from the user processor, at step 11611 the personal credit terminal 100 decrypts the calling response 6310 using the private key of the user. At step 11612 "speech in progress" is displayed on the LCD, and program control is shifted to the speech state. At this time, when the audio data encryption key 6537 is included in the calling response 6310, the personal credit terminal 100 sets the audio data encryption key 6357 to the audio data encryption key register (CRYPT) 21613, and encrypts the audio data for speech communication.

FIGS. 148A and 148B are flowcharts showing the inquiry call process performed by the user processor.

The user processor initiates the inquiry call process upon receipt of an inquiry call 6306 from the personal credit terminal 100. First, at step 11700 the user processor decrypts the received inquiry call request 6306 using the private key of the service provider, and at step 11701 examines the validity of the user processor to verity the validity of the inquiry call request 6306.

When the examination of the validity of the user processor is successful, at step 11702 the user processor employs a service director process ID in the user process management information to determine whether the service director processor belongs to the process group. When the service director processor belongs to the process group (service director process ID≠0), at step 11712 the decrypted inquiry call request is transmitted to the service director processor. When the service director processor does not belong to the process group (service director process ID=0), at step 11703 the decrypted inquiry call request 6306 is transmitted to the service manager processor.

When the examination of the validity of the user processor fails, the user processor ascertains that the received message is not valid, and at step 11711 performs the user processor session error process. The inquiry call process is thereafter terminated.

When the user processor has transmitted the inquiry call request 6506 to the service director processor or the service manager processor, at step 11704 the merchant processor waits for receipt of an inquiry call response 6524 from the service director processor.

Upon receipt of the inquiry call response 6524 from the service director processor, at step 11705 the user processor closes it to address to the user, and at step 11706 transmits the closed inquiry call response 6308 to the personal credit terminal 100. At step 11707, the personal credit terminal 100 determines whether message for the inquiry call response permits or inhibits the speech. When the speech is enabled, at step 11708 the user processor waits for the reception of a calling response 6538 from the service director processor. When the speech is disabled, the inquiry call process is terminated.

When the calling response 6538 is received from the service director processor, at step 11709 the user processor closes the calling response 6538 to address to the user, and at step 11710 transmits the calling response 6310 to the personal credit terminal 100. Then, program control is shifted to the speech communication state where the digital audio data communication is performed.

FIG. 149 is a flowchart showing the inquiry call process performed by the credit settlement terminal 300. The inquiry call process is begun when the credit settlement terminal 300 receives an inquiry call 6307 from the service providing system 102 and generates an inquiry call processor.

First, at step 11800 the credit settlement terminal 300 encrypts the received inquiry call 6307 using the private key of the merchant, and at step 11801 examines the validity of the merchant to verity the inquiry call 6307.

When the examination of the validity for the merchant is successful, at step 11802 the credit settlement terminal 300 outputs an arrival tone through the loudspeaker and displays the reception of the inquiry call on the LCD, and at step 11803 waits for the performance of the speech operation by the merchant.

When the examination of the validity for the merchant fails, at step 11807, a merchant session error process is executed. If the merchant is valid, at step 11804 the credit settlement terminal 300 generates an arrival response 6309, and at step 11805 transmits it to the merchant processor. Further, at step 11806 the message "speech in progress" is displayed on the LCD, and program control is thereafter shifted to the speech communication state.

If step 11803 determines that a user has performed a speech operation, for speech communication using encrypted audio data, at step 11804 the credit settlement terminal 300 generates an audio data encryption key 6530 and sets it for the arrival response 6309. In addition, the audio data encryption key 6530 is set to the audio data encryption register (CRYPT) 22611 to encrypt and decrypt the audio data.

FIG. 150 is a flowchart showing the inquiry call process performed by the merchant processor.

The inquiry call process is initiated when the merchant processor receives an inquiry call 6515 from the service director processor. First, at step 11900 the merchant processor closes the received inquiry call 6515 to address to the user, and at step 11901 examines the merchant status to determine whether the session is established. When the session is established, at step 11903 an inquiry call 6307 is transmitted to the credit settlement terminal 300. When the session is not established, at step 11902 the session establishment process is performed. After the session with the credit settlement terminal 300 is established, program control moves to step 11903.

When the merchant processor has transmitted the inquiry call 6307, at step 11904 the terminal 300 waits for the reception of an arrival response 6309 from the credit settlement terminal 300. Upon receipt of the arrival response 6309, at step 11905 the credit settlement terminal 300 decrypts the arrival response 6309 using the private key of the service provider, and at step 11906 transmits the decrypted response to the service director processor. Program control is then shifted to the speech communication state for the digital audio data communication.

FIGS. 151A and 151B are flowcharts showing the inquiry call process performed by the service director processor.

The inquiry call process is initiated when the service director processor receives an inquiry call request 6506 from the service manager or from the user processor.

First, at step 12000 the service director processor transmits a member process request to the service manager processor, and requests a merchant processor, as a member processor in the same process group, that corresponds to a merchant who makes an inquiry call. At steps 12001 and 12010 the service director processor waits until the requested merchant processor joins the member processor. At step 12001 the service director processor determines whether the requested merchant processor is a member process, and at step 12001 determines whether the time has expired.

At step 12010 for the time-out decision, when the requested merchant processor does not join the same group process until the time-out period $T_{MPMP}$ ($T_{MPMP}>0$) elapses, the service director processor determines that the time has expired. At step 12011 the service director processor employs the message response 6422 to generate an inquiry call response 6524 indicating that the speech is disabled, and at step 12012 transmits the response 6524 to the user processor. At step 12013 the service director processor waits until the user processor terminates the inquiry call process. At step 12014 the service director processor transmits to the service manager processor a request for deleting the service director processor, and the inquiry call process is thereafter terminated. Through the transmission of the deletion request at step 12014, the service director processor is deleted by the service manager processor.

When the requested merchant processor has become the member processor, at step 12002 the inquiry call 6515 is generated, and at step 12003 it is transmitted to the merchant processor. At step 12004 the response message 6422 is employed to generate an inquiry call response 6524 indicating that the speech is enabled, and at step 12005 the response 6524 is transmitted to the user processor.

After transmitting the inquiry call 6524, at steps 12006 and 12015 the service director processor waits for the reception of an arrival response 6531. At step 12006 the service director determines whether the arrival response 6531 is received, and at step 12015, determines whether time has elapsed.

At step 12015 for the time-out decision, when the arrival response 6531 is not received until the time-out period $T_{ARM}$ ($T_{ARM}>0$) elapses, the service director processor determines the time has expired, and at step 12016, performs the service director process time-out error process. The inquiry call process is thereafter terminated.

When the arrival response 6531 is received from the merchant processor, at step 12007 the service director processor employs the arrival response 6531 to generate a calling response 6538, and at step 12008 transmits it to the user processor. Further, at step 12009 the provided service history for the inquiry call is added to the provided service list 4303 to update the list 4303, and program control is then shifted to the speech state for the digital audio data communication.

An explanation will now be given for the processing when the user employs the personal remote credit settlement service in the user's home service area or in another service area.

In FIG. 152A is shown a case where the user performs the clearing process or the cancellation process with the merchant in the same home serviced area.

In this case, the personal credit terminal 100 and the credit settlement terminal 300 perform the clearing process or the cancellation process through the communication with a service providing system 102 in the home service area (service area 1 12100).

In the service providing system 102, a service manager processor 23800 generates a user processor 23802, a merchant processor 23803, a service director processor 23801 and a settlement processor 23804 for the service server of the system 102. The service director processor 23801, the user processor 23802, the merchant processor 23803 and the settlement processor 23804 cooperate to perform the clearing process or the cancellation process.

In FIG. 152B is shown a case where a user and a merchant who has a different home service area perform the clearing process or the cancellation process in the home service area of the merchant.

In this case, the personal credit terminal 100 and the credit settlement terminal 300 perform the clearing process or the cancellation process through the communication with a service providing system 102 in the home service area (service area 1 12100) of the merchant.

In the service providing system 102, a service manager processor 23800 generates a mobile user processor 12105, a merchant processor 23803, a service director processor 23801 and a settlement processor 23804 for the service server of the system 102. In the service providing system 12102 in the home service area (service area 2 12101) of the user, a service manager processor 12103 generates a home user processor 12104 for the service server of the system 12102. The service director processor 23801, the home user processor 12104, the mobile user processor 12105, the merchant processor 23803 and the settlement processor 23804 cooperate to perform the clearing process or the cancellation process.

Before the service process manager 23800 generates the mobile user processor 12105, it transmits to the service manager processor 12103 a message for requesting the generation of the home user processor 12104 that corresponds to the user, and upon the receipt of the request, the service manager processor 12103 generates the home user processor 12104. When the home user processor 12104 can not be generated (for example, when a user processor that corresponds to the user is already generated), the mobile user processor 12105 is not generated.

In FIG. 153A is shown a case where, when the home service areas differ for a user and a merchant, they perform the cancellation process in their home service areas.

In this case, to perform the cancellation process, the personal credit terminal 100 communicates with a service providing system 12202 in the home service area of the user (service area 2 12201), and the credit settlement terminal 300 communicates with a service providing system 102 in the home service area of the merchant (service area 1 12200).

In the service providing system 12202, a service manager processor 12203 generates a user processor 23802 for the service server of the system 12202. In the service providing system 102, a service manager processor 23800 generates a merchant processor 23803, a service director processor 23801 and a settlement processor 23804 for the service server of the system 102. The service director processor 23801, the user processor 23802, the merchant processor 23803 and the settlement processor 23804 cooperate to perform the cancellation process.

A cancellation request 6213 is transmitted from the user processor 23802 to the service manager processor 12203, and is transmitted to the service manager processor 23800. The cancellation request 6213 is compared with a cancellation request 6205 that is transmitted from the merchant processor 23803 to the service manager processor 23800. Then, the service director processor 23801, the user processor 23802, the merchant processor 23803 and the settlement processor 23804 form a process group.

In FIG. 153B is shown a case where, when the home service areas differ for a user and a merchant, a user performs the cancellation process in a service area other than the home service area for the user or the merchant.

In this case, to perform the cancellation process, the personal credit terminal 100 communicates with a service providing system 12206 in the closest service area (service area 2 12204), and the credit settlement terminal 300 communicates with a service providing system 102 in the home service area of the merchant (service area 1 12200).

In the service providing system 12206, a service manager processor 12208 generates a mobile user processor 12211 for the service server of the system 12206. In a service providing system 12207 in the home service area of the user (service area 3 12205), a service manager processor 12209 generates a home user processor 12210 for the service server of the system 12207. In the service providing system 102, a service manager processor 23800 generates a merchant processor 23803, a service director processor 23801 and a settlement processor 23804 for the service server of the system 102. The service director processor 23801, the home user processor 12210, the mobile user processor 12211, the merchant processor 23803 and the settlement processor 23804 cooperate to perform the cancellation process.

Before the service process manager 12208 generates the mobile user processor 12211, it transmits to the service manager processor 12209 a message for requesting the generation of the home user processor 12210 that corresponds to the user, and upon the receipt of the request, the service manager processor 12209 generates the home user processor 12210. When the home user processor 12210 can not be generated (for example, when a user processor that corresponds to the user is already generated), the mobile user processor 12211 is not generated.

A cancellation request 6213 is transmitted from the mobile user processor 12211 to the service manager processor 12208, and is transmitted to the service manager processor 23800. The cancellation request 6213 is compared with a cancellation request 6205 that is transmitted from the merchant processor 23803 to the service manager processor 23800. Then, the service director processor 23801, the mobile user processor 12211, the merchant processor 23803 and the settlement processor 23804 form a process group.

In FIG. 154A is shown a case where the user performs the customer service call process or the inquiry call process with the merchant in the same home serviced area.

In this case, the personal credit terminal 100 and the credit settlement terminal 300 perform the customer service call process or the inquiry call process through the communication with a service providing system 102 in the home service area (service area 1 12300).

In the service providing system 102, a service manager processor 2900 generates a user processor 23802, a merchant processor 23803 and a service director processor 2901 for the service server of the system 102. The service director processor 2901, the user processor 23802 and the merchant processor 23803 cooperate to perform the customer service call process or the inquiry call process.

In FIG. 154B is shown a case where a merchant performs the customer service call process with a user for which the home service area differs. In this case, to perform the customer service call process, the personal credit terminal 100 communicates with a service providing system 12302 in the home service area of the user (service area 2 12301), and the credit settlement terminal 300 communicates with a service providing system 102 in the home service area of the merchant (service area 1 12300).

In the service providing system 102, a service manager processor 23800 generates a merchant processor 23803 and a service director processor 23801 for the service server of the system 102. In the service providing system 12302, a service manager processor 12303 generates a user processor 23802 for the service server of the system 12302. The service director processor 23801, the user processor 23802 and the merchant processor 23803 cooperate to perform the customer service call process.

The user processor 23802 of the service providing system 12302 in the home service area for the user is generated when the service manager processor 23800 receives a member process request from the service director processor 23801 and transmits to the service manager processor 12303 a message for requesting the generation of the user processor that corresponds to the user.

In FIG. 155A is shown a case where, in the home service area of a user, the user performs the inquiry call process with the merchant for which the home service area differs.

In this case, to perform the inquiry call process, the personal credit terminal 100 communicates with a service providing system 12402 in the home service area of the user (service area 2 12401), and the credit settlement terminal 300 communicates with a service providing system 102 in the home service area of the merchant (service area 1 12400).

In the service providing system 12402, a service manager processor 12403 generates a user processor 23802 for the service server of the system 12402. In the service providing system 102, a service manager processor 23800 generates a merchant processor 23803 and a service director processor 23801 for the service server of the system 102. The service director processor 23801, the user processor 23802 and the merchant processor 23803 cooperate to perform the inquiry call process.

An inquiry call request 6506 is transmitted from the user processor 23802 to the service manager processor 12203, and is transmitted to the service manager processor 23800. Then, the service director processor 23801, the user processor 23802 and the merchant processor 23803 form a process group.

In FIG. 155B is shown a case where a user and a merchant for which the home service area differs perform the inquiry call process in a service area other than the home service area for the user or the merchant.

In this case, to perform the inquiry call process, the personal credit terminal 100 communicates with a service providing system 12406 in the closest service area (service area 2 12404), and the credit settlement terminal 300 communicates with a service providing system 102 in the home service area of the merchant (service area 1 12400).

In the service providing system 12406, a service manager processor 12408 generates a mobile user processor 12411 for the service server of the system 12406. In a service providing system 12407 in the home service area of the user (service area 3 12405), a service manager processor 12409 generates a home user processor 12410 for the service server of the system 12407. In the service providing system 102, a service manager processor 23800 generates a merchant processor 23803 and a service director processor 23801 for the service server of the system 102. The service director processor 23801, the home user processor 12410, the mobile user processor 12411 and the merchant processor 23803 cooperate to perform the inquiry call process.

Before the service process manager 12408 generates the mobile user processor 12411, it transmits to the service manager processor 12409 a message for requesting the generation of the home user processor 12410 that corresponds to the user, and upon the receipt of the request, the service manager processor 12409 generates the home user processor 12410. When the home user processor 12410 can not be generated (for example, when a user processor that corresponds to the user is already generated), the mobile user processor 12411 is not generated.

An inquiry call request 6506 is transmitted from the mobile user processor 12411 to the service manager processor 12408, and is transmitted to the service manager processor 23800. Then, the service director processor 23801, the mobile user processor 12411 and the merchant processor 23803 form a process group.

As is described above, the personal remote credit settlement service can be provided by operations of the personal credit terminal 100, the credit settlement terminal 300, the credit settlement device 101, the service providing system 102 and the settlement system 103. The user can receive the same contents of the personal remote credit settlement service in any place so long as the personal remote credit service is provided there.

In the personal credit terminal 100, the ROM 1501 and the EEPROM 1503 can be replaced by a ferroelectric nonvolatile memory, which is a memory device in which are stored a program executed by the CPU 1500 and the public key of a service provider. Data in the ferroelectric nonvolatile memory can be saved without a battery, though the ferroelectric nonvolatile memory is data writable, as well as an EEPROM or a flash memory.

In addition, the reading and writing speed of the ferroelectric nonvolatile memory is higher than those of the EEPROM and the flash memory, and the power consumption is lower.

When the ferroelectric nonvolatile memory is employed instated of the ROM 1501 and the EEPROM 1503, during the same process as, for example, the data updating process, the considerable upgrading of a program for the personal credit terminal 100 and the periodical updating of the public key of service provider can be performed comparatively fast without deteriorating the service life of the battery.

A ferroelectric nonvolatile memory can be employed as the RAM 1502 in which are stored data that are to be processed or have been processed by the CPU 1500. In this case, even when there is no battery power, the data can be held, so that the data backup process and a power source for saving data in the RAM are not requested. As a result, the power consumption of the personal credit terminal can be reduced.

In the above description, the personal credit terminal 100 and the credit settlement device 101, which constitute the personal remote credit settlement system, comprises the optimal hardware arrangement to accomplish the functions for providing the personal remote credit settlement service. These devices 100 and 101 can be provided by computers that have a wireless telephone function (or a telephone function), an infrared communication function, a display, a keyboard (or a pen-type input device), a microphone and a loudspeaker.

In this case, the internal hardware components, of the personal credit terminal 100 or the credit settlement device 101, that are not functionally included in a computer (e.g.: a data codec, an encryption processor, a logic controller) are provided as software programs. Together with a program stored in the ROM 1501 (22501), these programs are changed to those that are operated by an OS (Operating System) for a personal computer, and stored in a location to which the computer can access (e.g., on a hard disk).

INDUSTRIAL USABILITY

As is described above, according to the present invention, a personal electronic settlement system comprises: payment means including a plurality of systems of communication means; charging means including a plurality of systems of communication means; and settlement means (or service providing means) including a plurality of systems of communication means. Since the payment means, the charging means, and the settlement means (or the service providing means) communicate with each other using different systems of communication means, it is possible to prevent the assessment of an illegal charge by the charging means, and to also prevent the leakage of individual data. In addition, since necessary data are exchanged by the communication means, the efficiency of the sale can be improved.

Furthermore, since the wireless communication means using an infrared ray is employed between the payment means and the charging means and a radio communication means is employed between the payment means and the settlement means (or the service providing means) a system condition that is appropriate for the use environment can be provided.

Further, a payment request message is transmitted from the charging means to the payment means, a payment offer is transmitted from the payment means to the charging means, the charging means and the payment means generate a settlement request and a payment request that include information obtained from the received messages, and transmit them to the settlement means (or the service providing means), and the settlement means (or the service providing means) compares these request messages. Therefore, the assessment of an illegal charge by the charging means and the fudging of payment by the payment means can be prevented. Also, the transaction can be performed without notifying the identification number of the payment means or the telephone number of the owner of the payment means.

Since a plurality of payment methods can be selected by a single payment means, a user need not carry many credit cards.

Since the data stored in the payment means and the charging means are moved to the accumulation means of the settlement means (or the service providing means), as needed, the data backup is enabled, and the payment means and the charging means can be compactly made.

In addition, since the data held in the payment means and the charging means are updated, the consistency of the data in the payment means and the data in the settlement means (or the service providing means) can be maintained, and the reliability of the system can be improved. Further, since the latest data are stored in the payment means and the charging means and are updated, the time required for accessing the payment means and the charging means can be reduced.

In the data updating process, alteration of data in the payment means or the charging means can be discovered, so that an illegal activity can be prevented.

Furthermore, this system can easily perform the cancel of the transaction. A person in charge for the charging means can contact the owner of the payment means that paid money, even though the person in charge does not know the telephone number of the owner. Similarly, the owner of the payment means can contact the person in charge without notifying the person in charge of the telephone number of the owner. Therefore, the smooth business transaction can be performed while the privacy of the owner of the payment means is protected.

What is claimed is:

1. A personal electronic settlement system comprising: a payment section, a charging section, and a service providing section; said charging section a) configured to receive first data, from said payment section, said first data including information indicating a type of payment method selected by a user of said payment section and does not include identification information of the user;

b) configured to generate and transmit a second data, based on information in the first data, to said payment section data requesting a payment, said second data including identification information of said service providing section;

c) configured to generate and transmit a third data, based on information in the first data to said service providing section, said third data requesting a settlement processing;

said payment section d) configured to generate and transmit to said charging section said first data;

e) configured to receive said second data from said charging section;

f) configured to access said service providing section specified by the identification information of said service providing section included in said second data;

g) configured to authenticate said service providing section; and h) configured to generate and transmit fourth data to said service providing section, said fourth data requesting a payment processing if the authentication of said service providing section is successful; and said service providing section being i) configured to separately receive said third data from said charging section and said fourth data from said payment section;

j) configured to collate said third data and said fourth data; and k) configured to perform settlement processing.

2. A personal electronic settlement system comprising: a charging device, a payment device, and a service providing device;

said charging device including;

a receiving unit configured to receive first data, said first data including information indicating a type of payment method selected by a user of said payment device, and excluding identification information of the user; a generating unit configured to generate second data based on the type of payment method included in the first data, said second data including identification information of said service providing device, and configured to generate a third data based on the type of payment method included in the first data, said third data including information requesting a settlement processing; and a transmitting unit configured to transmit the second data to said payment device and the third data to said service providing device;

said payment device including;

receiving unit configured to receive the second data from charging device;

a generating unit configured to generate the first data offering the payment, and configured to generate a fourth data requesting a payment processing if an authentication of said service providing device is successful; and an authenticating unit configured to authenticate said service providing unit based on the identification information of said service providing device included in the second data;

a transmitting unit configured to transmit the fourth data to said service providing device; and said service providing device including;

a receiving unit configured to receive the third data from said charging device and said fourth data from said payment device;

a collating unit configured to collate said third data from the charging device and said fourth data from the payment device; and a performing unit configured to perform settlement processing if said collation in the collating unit is successful.

3. The charging device according to claim 2, wherein:

said first data includes a request number set by said payment device for uniquely indicating said payment processing;

said second data includes a transaction number set by a CPU of said charging device for uniquely indicating said payment processing; and said third data includes a request number and a transaction number.

4. The service providing device according to claim 2, wherein:

said second data includes identification information of a user of said payment device; and a CPU is operable to specify the account information of the payment source based on the identification information of the user of said payment device included in the received second data, and is operable to perform settlement processing, and to generate and transmit a third data to said charging device, the third data notifying of the completion of the settlement processing, the third data not including specified payment source account information, and keeps said specified payment source account information from said charging device.

5. The service providing device according to claim 2, wherein:

said first data includes identification information of said settlement processing between said payment device and said charging device;

said second data includes identification information of said settlement processing between said payment device and said charging device; and a CPU is operable to collate said identification information of settlement processing included in said first data and said second data and to specify a pair of said first data and said second data corresponding to each other based on the collated identification information of said settlement processing from the received data from the plurality of payment devices and the plurality of charging devices and is operable to perform settlement processing if said collation and said specification are successful.

6. The service providing device according to claim 5, wherein:

said identification information of settlement processing is based on a request number set by said payment device for uniquely indicating said settlement processing and a transaction number set by said charging device for uniquely indicating said settlement processing.

7. The service providing device according to claim 2, wherein the service providing device:

is operable to receive receipt information, the receipt information not including the identification information of the user of said payment device, from said charging device after completing said settlement processing, generates and transmits to said payment device receipt data, the receipt data including the identification information of the user of said payment device, based on the received said receipt information.

8. A settlement processing method for performing settlement processing between a payment device and a charging device via a service providing device, the settlement processing method comprising:

generating a first data including information indicating a type of payment method selected by a user of said payment device, and not including identification information of the user;

receiving the first data from said payment device in said charging device;

generating a second data, in said charging device, based on the type of payment method included in the first data, said second data including identification information of said service providing device;

generating a third data, in said charging device, based on the type of payment method included in the first data, said third data including information requesting a settlement processing;

transmitting the second data from the charging device to said payment device;

transmitting the third data from the charging device to said service providing device;

receiving the second data in the payment device from the charging device;

generating a fourth data in payment device, said fourth data requesting a payment processing if an authentication of said service providing device is successful;

authenticating said service providing unit based on the identification information of said service providing device included in the second data;

transmitting the fourth data from said payment device to said service providing device after the authentication is successful;

receiving the third data from said charging device in said service providing device;

receiving the fourth data from said payment device in said service providing device;

collating said third data from the charging device and said fourth data and said fourth data from the payment device; and performing settlement processing if said collation in the collating unit is successful.

* * * * *

UNITED STATES PATENT AND TRADEMARK OFFICE

CERTIFICATE OF CORRECTION

PATENT NO. : 7,664,697 B2
APPLICATION NO. : 09/960923
DATED : February 16, 2010
INVENTOR(S) : Hisashi Takayama It is certified that error appears in the above-identified patent and that said Letters Patent is hereby corrected as shown below:

On the cover page at Related U.S. Application Data (62), please correct as follows:
(62) Division of application No. 09/101,356, filed as application No. PCT/JP97/04161 on Sep. 8, 1998, now Pat. No. 6,332,133.

Please add the Foreign Application Priority Data section to the cover page as follows:

(30) Foreign Application Priority Data

| | | |
|---|---|---|
| Nov. 14, 1996 | (JP) | 8-316897 |
| Apr. 22, 1997 | (JP) | 9-117681 |

Signed and Sealed this
Fourth Day of January, 2011

David J. Kappos
*Director of the United States Patent and Trademark Office*